US010787579B2

(12) United States Patent
Advincula et al.

(10) Patent No.: US 10,787,579 B2
(45) Date of Patent: Sep. 29, 2020

(54) SENSORS AND SEPARATION BASED ON MOLECULAR RECOGNITION VIA ELECTROPOLYMERIZATION AND COLLOIDAL LAYER TEMPLATES

(75) Inventors: Rigoberto Advincula, Friendswood, TX (US); Roderick B. Pernites, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 541 days.

(21) Appl. No.: 13/179,516

(22) Filed: Jul. 9, 2011

(65) Prior Publication Data

US 2012/0263922 A1 Oct. 18, 2012

Related U.S. Application Data

(60) Provisional application No. 61/363,738, filed on Jul. 13, 2010.

(51) Int. Cl.
| | | |
|---|---|---|
| *C25D 5/34* | (2006.01) | |
| *C25D 5/48* | (2006.01) | |
| *C25D 13/08* | (2006.01) | |
| *C25D 9/02* | (2006.01) | |
| *C09D 5/16* | (2006.01) | |

(52) U.S. Cl.
CPC ............. *C09D 5/1681* (2013.01); *C25D 5/34* (2013.01); *C25D 5/48* (2013.01); *C25D 9/02* (2013.01); *C25D 13/08* (2013.01); *Y10T 428/24612* (2015.01)

(58) Field of Classification Search
CPC .................................. C25D 9/02; C25D 13/08
USPC ......................................................... 205/317
See application file for complete search history.

(56) References Cited

U.S. PATENT DOCUMENTS

| 2003/0027936 | A1* | 2/2003 | Murray et al. ................. 525/384 |
| 2011/0024302 | A1* | 2/2011 | Li et al. ........................... 205/183 |
| 2011/0079075 | A1* | 4/2011 | Zheng et al. ..................... 73/38 |

OTHER PUBLICATIONS

Li et al., "A Sensitive and Selective Sensor for Dopamine Determination Based on a Molecularly Imprinted Electropolymer of O-Aminophenol" Sens. Actuators B: Chemical 140, pp. 663-669 (2009).*
Taranekar et al., "Quantitative Electrochemical and Electrochromic Behavior of Terthiophene and Carbazole Containing Conjugated Polymer Network Film Precursors: EC-QCM and EC-SPR" Langmuir 23, pp. 908-917 (2007).*
Alexander et al., "Molecular Imprinting Science and Technology: A Survey of the Literature for the Years Up to and Including 2003" J. Mol. Recognit. 19, pp. 106-180 (2006).*
Ozcan et al., "Determination of Paracetamol Based on Electropolymerized-Molecularly Imprinted Polypyrrole Modified Pencil Graphite Electrode" Sens. Actuat. B 127, pp. 362-369 (2007).*
Pietrzyk et al., "Selective Histamine Piezoelectric Chemosensor Using a Recognition Film of the Molecularly Imprinted Polymer of Bis(bithionphene) Derivatives" Anal. Chem. 81, pp. 2633-2643 (2009).*
Sayyah et al., "Electropolymerization Kinetics of o-Aminophenol and Characterization of the Obtained Polymer Films" J. Appl. Polym. Sci. 99, pp. 3093-3109 (2006).*
Pernites et al., "Electropolymerization molecularly imprinted polymer (E-MIP) SPR sensing of drug molecules: Pre-polymerization complexed terthiophene and carbazole electroactive monomers" Biosens. Bioelectron. 26, pp. 2766-2771 (2011).*
Pernites et al., "Surface Plasmon Resonance (SPR) Detection of Theophylline via Electropolymerized Molecularly Imprinted Polythiophenes" Macromolecules 43, pp. 9724-9735 (2010).*
Apodaca et al., "Electropolymerized Molecularly Imprinted Polymer Films of a Bis-Terthiophene Dendron: Folic Acid Quartz Crystal Microbalance Sensing" ACS Appl. Mater. Interfaces 3, pp. 191-203 (2011).*
Gupta et al., "Molecularly imprinted polymer for the recognition of biological warfare agent staphylococcal enterotoxin B based on Surface Plasmon Resonance" Thin Solid Films 519, pp. 1115-1121 (2010).*
L.I. Andersson et al.: "A Highly Selective Solid Phase Extraction Sorbent for Pre-Concentration of Sameridine Made by Molecular Imprinting"; Chromatographia, 1997, 46, No. 1/2; pp. 57-62.
M. T. Muldoon et al.: "Molecularly Imprinted Solid Phase Extraction of Atrazine from Beef Liver Extracts"; Anal. Chem., 1997,69, No. 5, pp. 803-808.
B. Sellergren: "Direct Drug Determination by Selective Sample Enrichment on an Imprinted Polymer"; Anal. Chem., 1994, 66, No. 9, pp. 1578-1582.
J. Matsui et al.: "Solid-phase Extraction of a Triazine Herbicide Using a Molecularly Imprinted Synthetic Receptor"; Anal. Commun., 1997, 34, pp. 85-87.
Polyakov M.V.; "Adsorption properties and structure of silica gel"; Zhur. Fiz. Khim., 1931, 2, pp. 799-805.
C. Alexander et al.: "Molecular imprinting science and technology: a survey of the literature for the years up to and including 2003"; J. Mol. Recognit., 2006, 19, pp. 106-180.
W. M. Mullet et al.: "Determination of Theophylline in Serum by Molecularly Imprinted Solid-Phase Extraction with Pulsed Elution"; Anal. Chem., 1998, 70, No. 17, pp. 3636-3641.

(Continued)

*Primary Examiner* — Brian W Cohen
(74) *Attorney, Agent, or Firm* — Carter, DeLuca & Farrell, LLP; George Likourezos, Esq.

(57) ABSTRACT

Novel coatings are disclosed prepared from electropolymerization of electropolymerizable monomers-analyte complexes onto a conducting layer or non-conducting of a substrate, where the analyte is removed by electrochemically mediated washing permitting linear molecular sensing of the analyte over a wide concentration range. The coating may also include templating particles deposited on the electrode substrate prior to electropolymerization, where the particles can be removed to form a submicron structured coating. Methods for making and using the coatings are also disclosed.

16 Claims, 118 Drawing Sheets

(56) References Cited

OTHER PUBLICATIONS

S. Okada et al.: "Color and Chromism of Polydiacetylene Vesicles"; Acc. Chem. Res., 1998, 31, pp. 229-239.
W. Lu et al.: "Pulsed electrochemical detection of proteins using conducting polymer based sensors"; Anal. Chem. Acta., 1995, 315, pp. 27-32.
M. Leclerc: "Optical and Electrochemical Transducers Based on Functionalized Conjugated Polymers"; Adv. Mater., 1999, 11, No. 18, pp. 1491-1498.
D. T. McQuade et al.: "Conjugated Polymer-Based Chemical Sensors"; Chem. Rev., 2000, 100, pp. 2537-2574.
P. Taranekar et al.: "Quantitative Electrochemical and Electrochromic Behavior of Terthiophene and Carbazole Containing Conjugated Polymer Network Film Precursors: EC-QCM and EC-SPR"; Langmuir, 2007, 23, pp. 908-917.
A. Yassar et al.: "Synthesis and Characterization of Poly(thiophenes) Functionalized by Photochromic Spironaphthoxazine Groups"; Macromolecules, 1995, 28, pp. 4548-4553.
D. Batra et al.: "Combinatorial methods in molecular imprinting"; Curr. Opin. Chem. Biol., 2003, 7, pp. 434-442.
F. J. Wolman et al.: "Peptide imprinted polymer synthesized by radiation-induced graft polymerization"; React. Funct. Polym., 2006, 66, pp. 1199-1205.
Y. Wang et al.: "A potentiometric protein sensor built with surface molecular imprinting method"; Biosens. Bioelectron., 2008, 24, pp. 162-166.
G. Jiang et al.: "Nanopatterning and Fabrication of Memory Devices from Layer-by-Layer Poly(3,4-ethylenedioxythiophene)-Poly(styrene sulfonate) Ultrathin Films"; Langmuir, 2007, 23, pp. 817-825.
F.L.A. Khan et al.: "Infrared studies on hydrogen bonding interaction between acrylic esters with 1-dodeconal and phenol in carbon tetrachloride"; Phys. Chem. Liq., 2008, 46, pp. 504-509.
R. Georgiadis et al.: "Surface Plasmon Resonance Spectroscopy as a Probe of In-Plane Polymerization in Monolayer Organic Conducting Films"; Langmuir, 2000, 16, No. 17, pp. 6759-6762.
A. Baba et al.: "Electropolymerization and doping/dedoping properties of polyaniline thin ?lms as studied by electrochemical-surface plasmon spectroscopy and by the quartz crystal microbalance"; J. Electroanal. Chem., 2004, 562, pp. 95-103.
R. Ravindranath et al.: "Ultrathin Conjugated Polymer Network Films of Carbazole Functionalized Poly(?-Phenylenes) via Electropolymerization"; J. Phys. Chem. B., 2007, 111, pp. 6336-6343.
R. S. Hutchins et al.: "Nitrate-Selective Electrode Developed by Electrochemically Mediated Imprinting/Doping of Polypyrrole"; Anal. Chem., 1995, 67, pp. 1654-1660.
M. Yamaura et al.: "Enhancement of Electrical Conductivity of Poly-Pyrrole Film by Stretching: Counter Ion Effect"; Synth. Met., 1988, 26, pp. 209-224.
B. Deore et al.: "Overoxidized Polypyrrole with Dopant Complementary Cavities as a New Molecularly Imprinted Polymer Matrix"; Anal. Sci., 1999, 15, pp. 827-828.
D. Kuckling et al.: "Photo-Cross-Linkable PNIPAAm Copolymers. 1. Synthesis and Characterization of Constrained Temperature-Responsive Hydrogel Layers"; Macromolecules, 2002, 35, pp. 6377-6383.
G. Schopf et al.: "Advances in Polymer Science: Polythiophenes—Electrically Conductive Polymers—4.1.1 Influence on Properties"; Spinger, 1997, pp. 80-93.
H. Zinke et al.: "Mini-chiuz"; Chemie in unserer Zeit, 1990, 24, pp. 104-107 and 110-114.
M. Niemitz et al.: "Wettability of poly(2,2'-bithienyl-5,5'-diyl) layers"; Angew. Makron. Chem., 185/186, 1991, pp. 147-154 (3268).
G. Kossmehl et al.: "Preparation and Controlled Wettability of Poly(2,2'-Bithienyl-5, 5'-Diyl) Layers"; Synth. Met., 1991, 41-43, pp. 1065-1071.
A. Pietrzyk et al.: "Melamine Acoustic Chemosensor Based on Molecularly Imprinted Polymer Film"; Anal. Chem., 2009, 81, pp. 10061-10070.
P. Fiedler et al.: "Acidity of ortho-substituted benzoic acids: an infrared and theoretical study of the intramolecular hydrogen bonds"; Org. Biomol. Chem., 2006, 4, pp. 2003-2011.
M. Sibrian-Vazquez et al.: "Molecular Imprinting Made Easy"; J. Am. Chem. Soc., 2004, 126, pp. 7827-7833.
G. A. Jeffrey: "An Introduction to Hydrogen Bonding"; Oxford University Press, Oxford New York, 1997, pp. 1-257.
M. Marquez et al.: "The Use of Surface Tension to Predict the Formation of 2D Arrays of Latex Spheres Formed via the Langmuir-Blodgett-Like Technique"; Langmuir, 2004, 20, pp. 10998-11004.
J. Roncali: "Conjugated Poly(thiophenes): Synthesis, Functionalization, and Applications"; Chem. Rev., 1992, 92, pp. 711-738.
L. S. Live et al.: "Propagating Surface Plasmon Resonance on Microhole Arrays"; Anal. Chem., 2010, 82, pp. 3780-3787.

\* cited by examiner

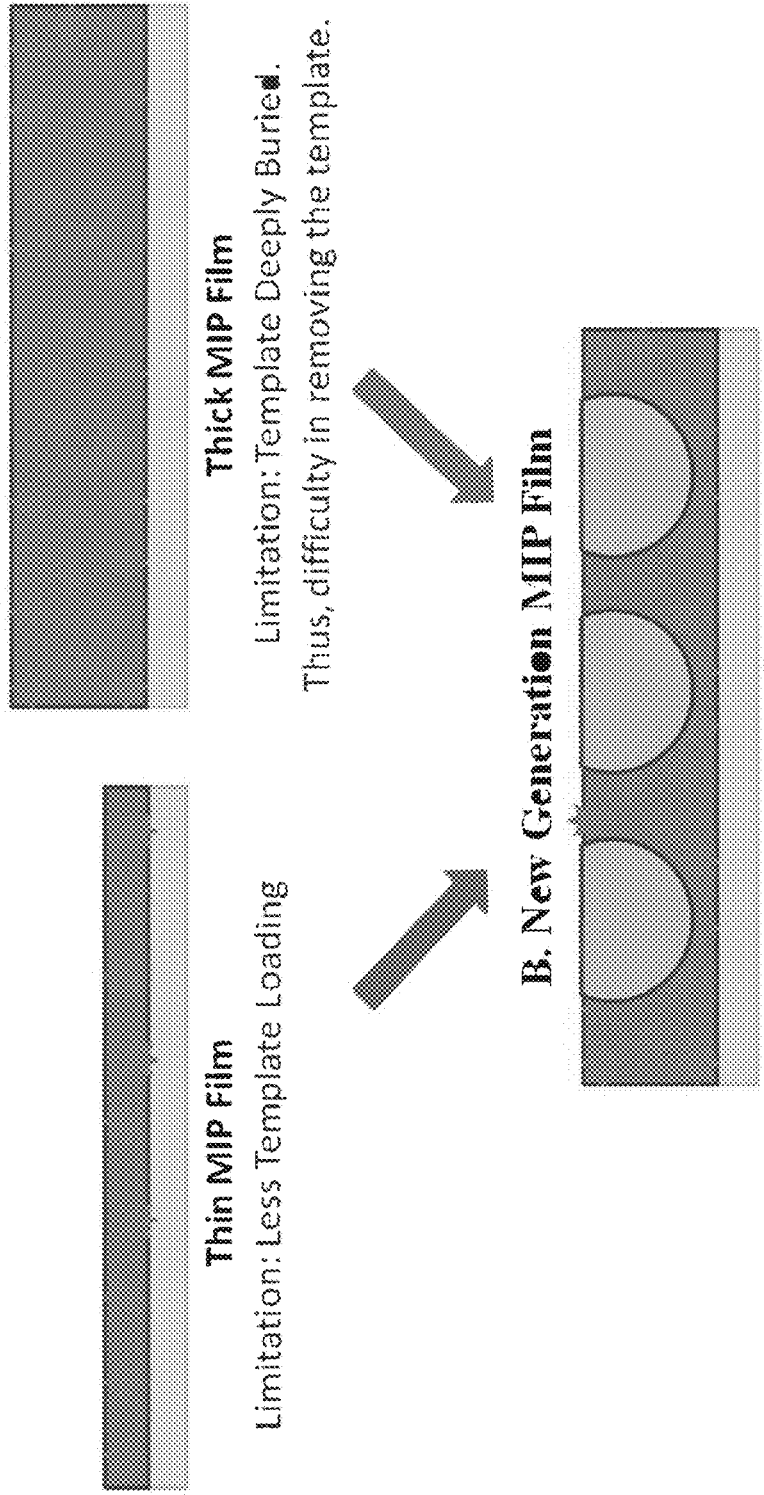
FIG. 1.1

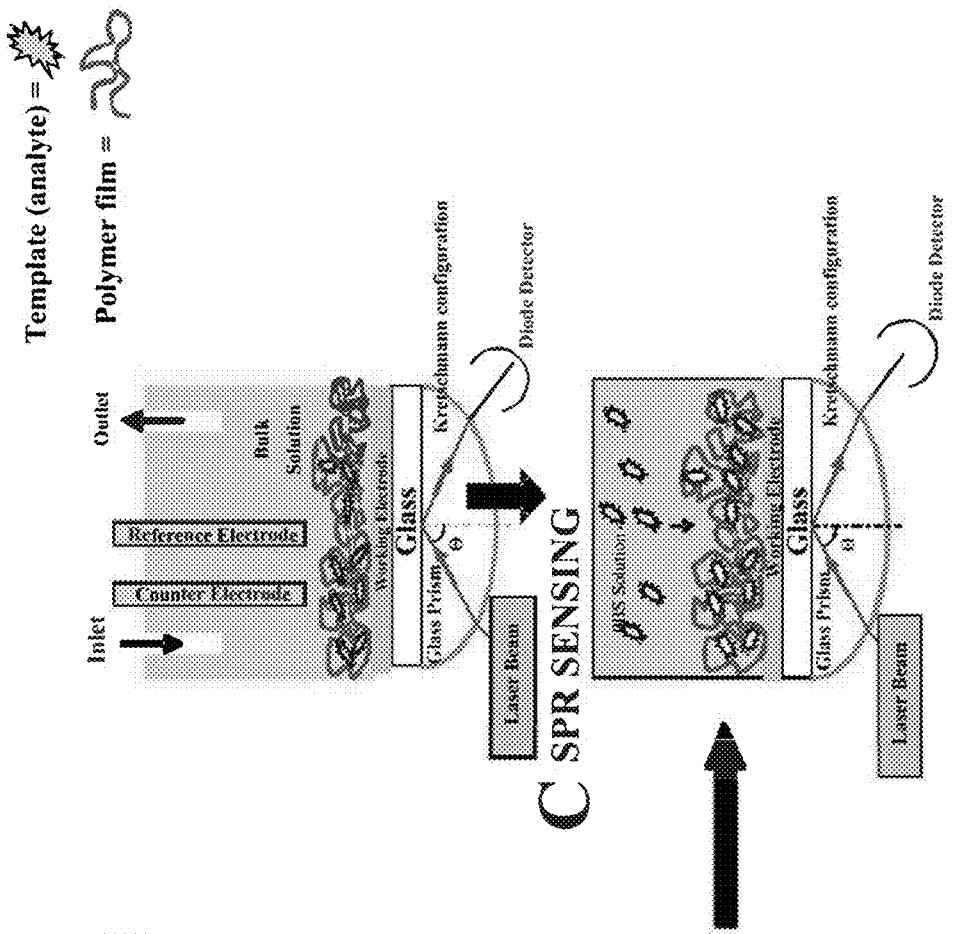
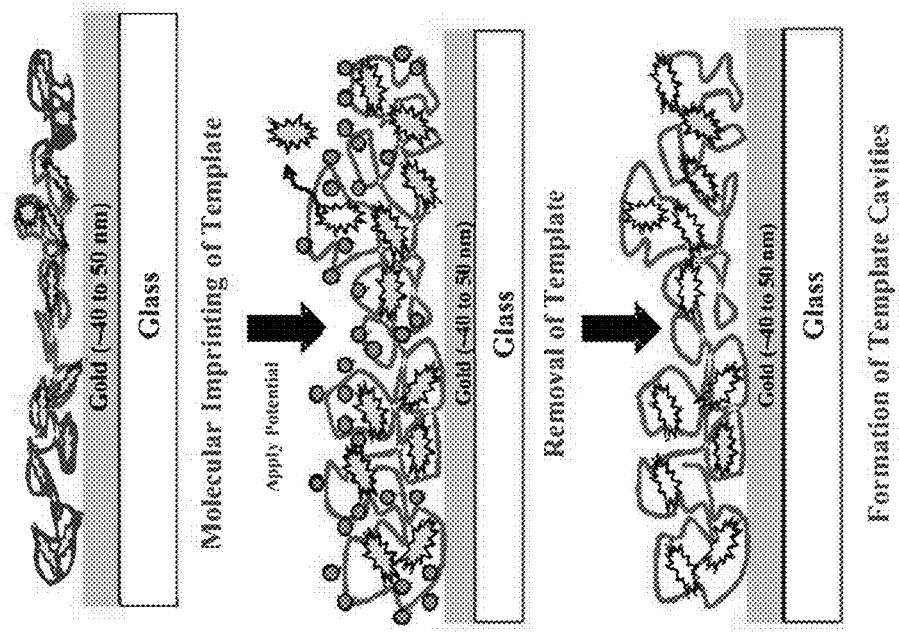
FIG. 1.2A-C

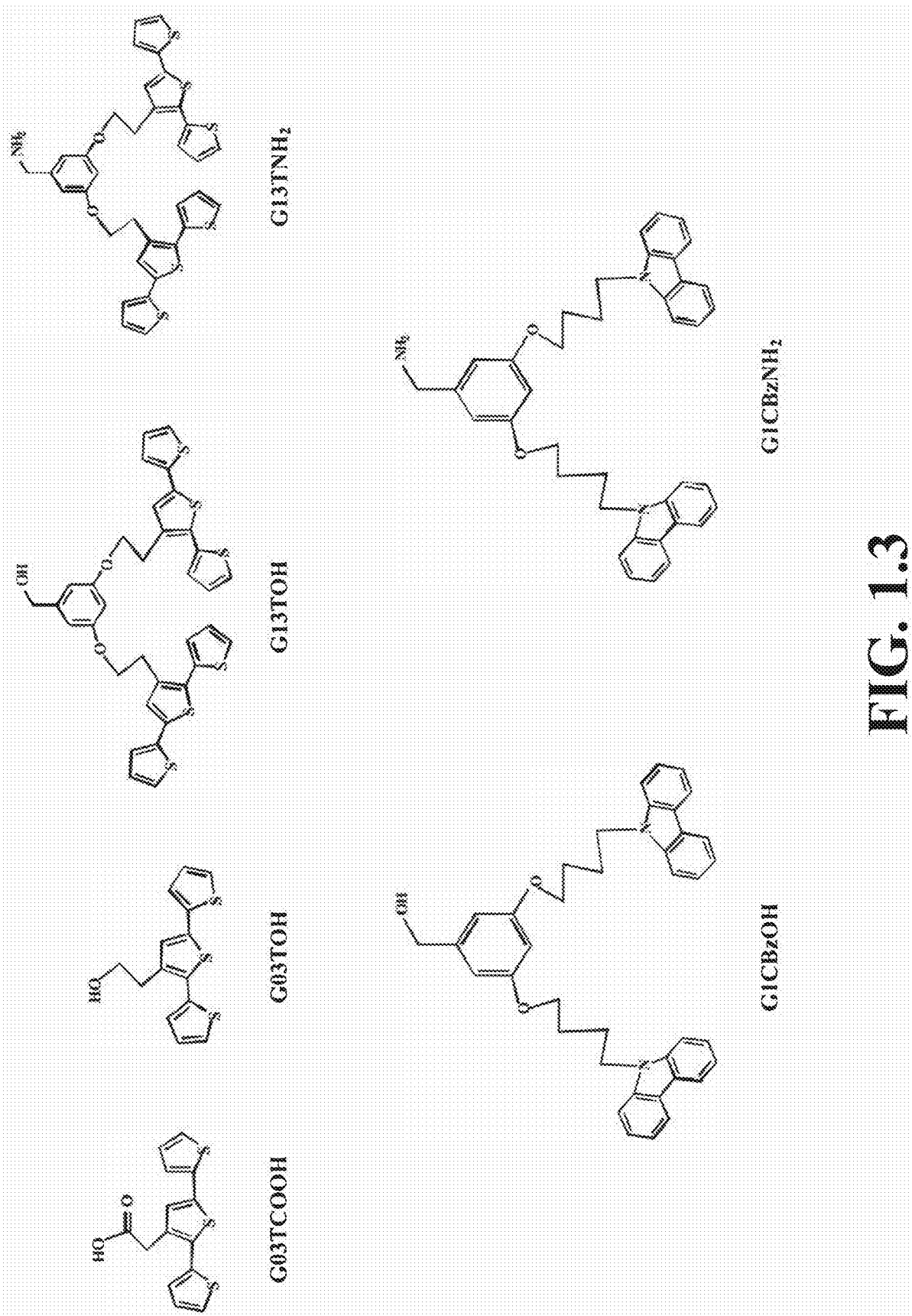
FIG. 1.3

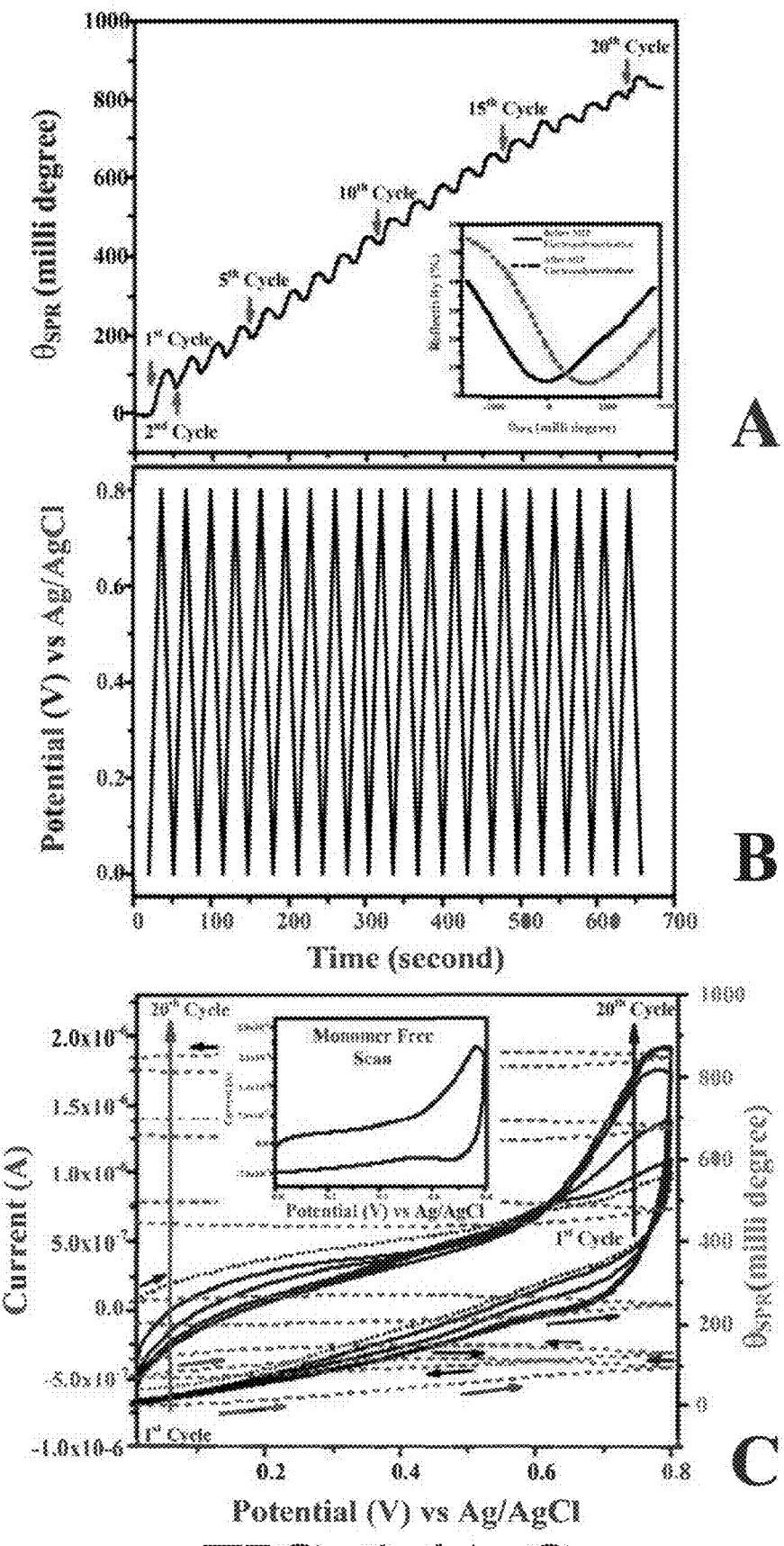
FIG. 1.4A-C

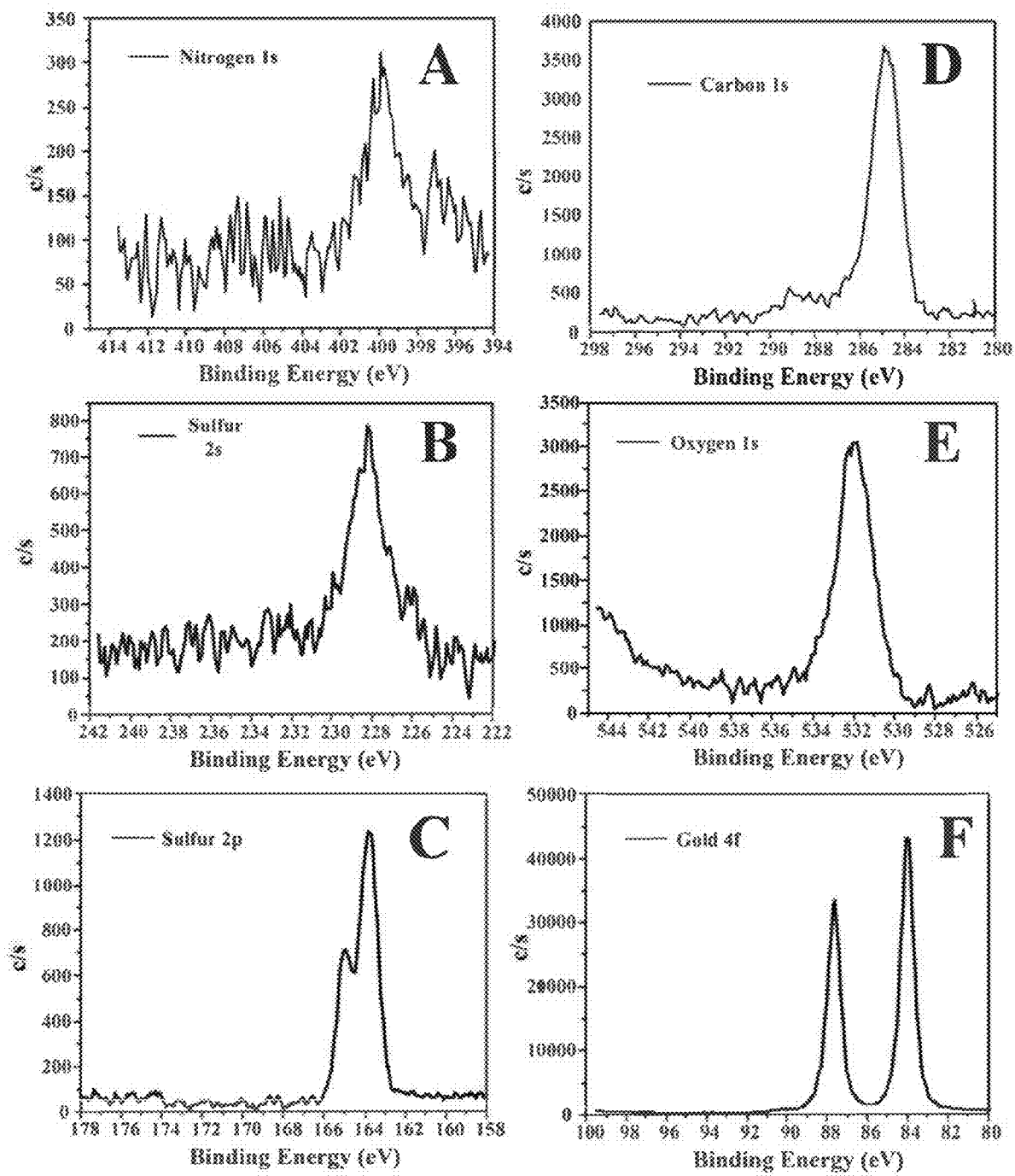
FIG. 1.5A-F

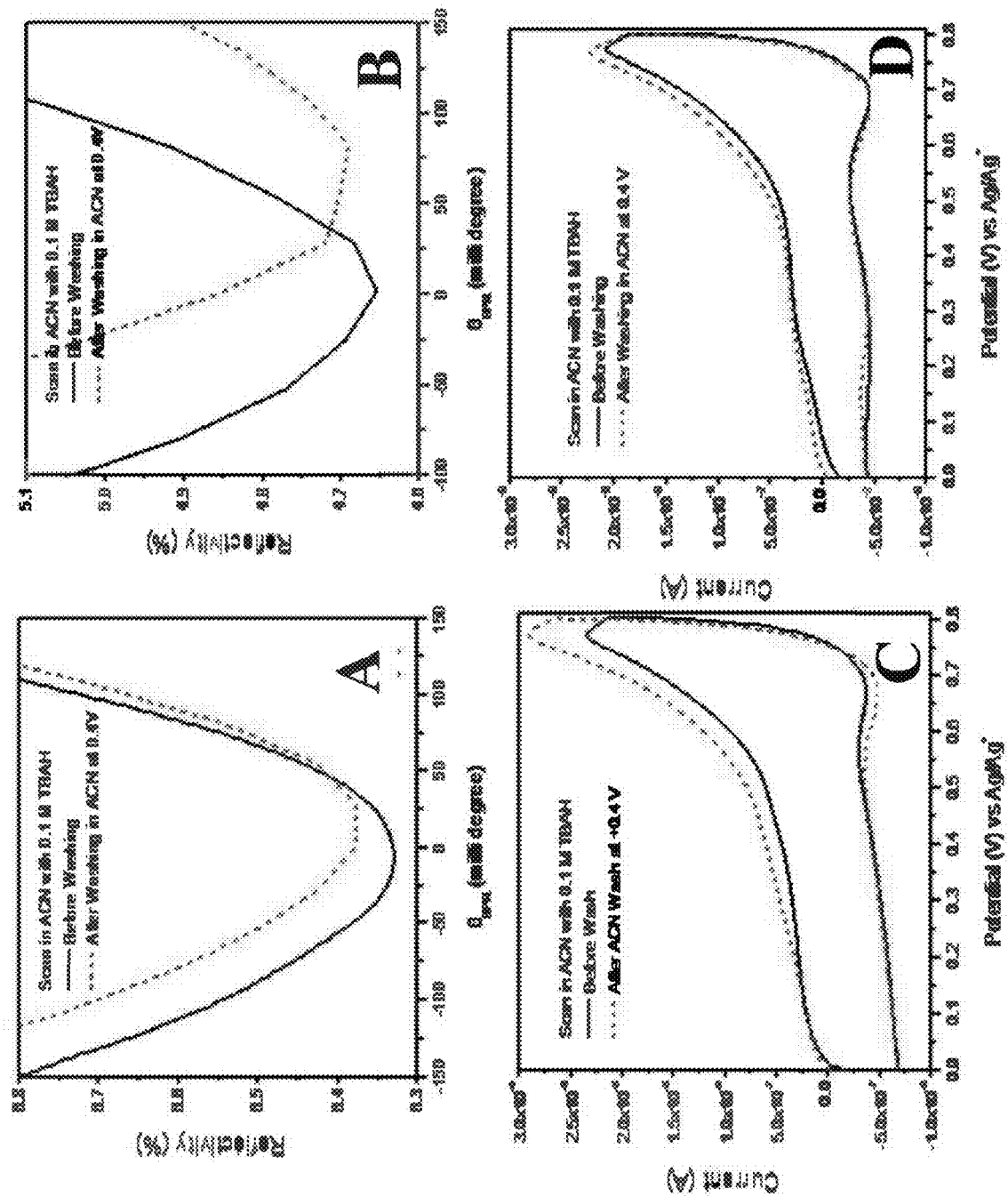
FIG. 1.6A-D

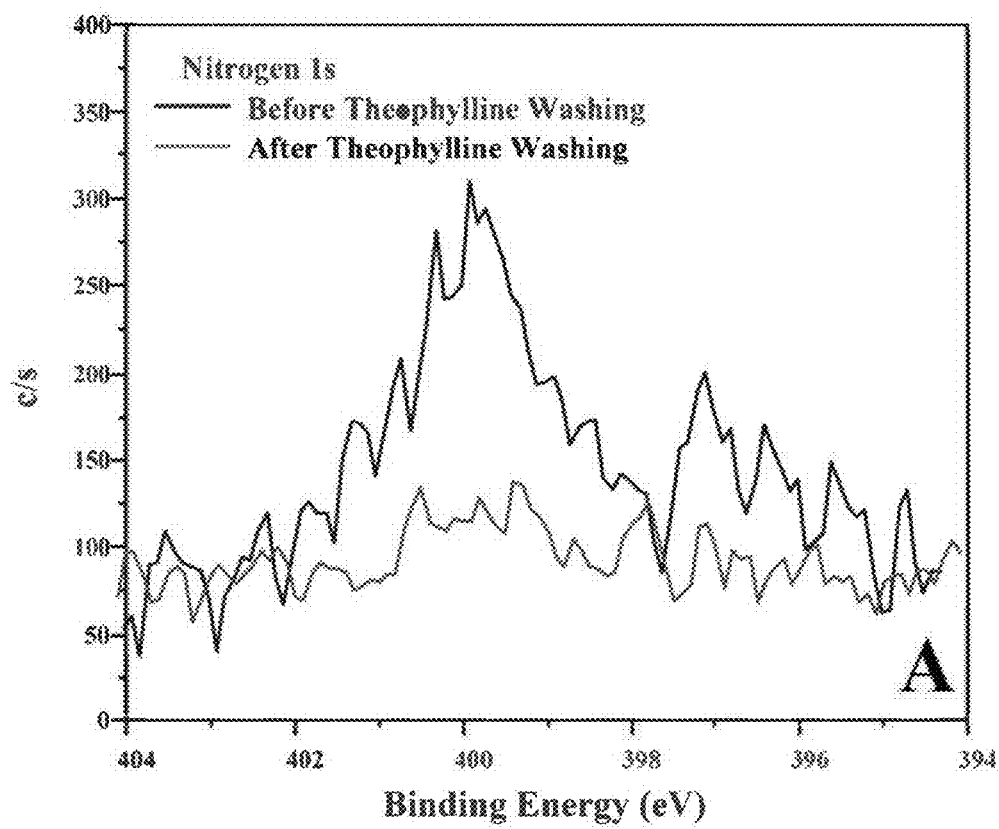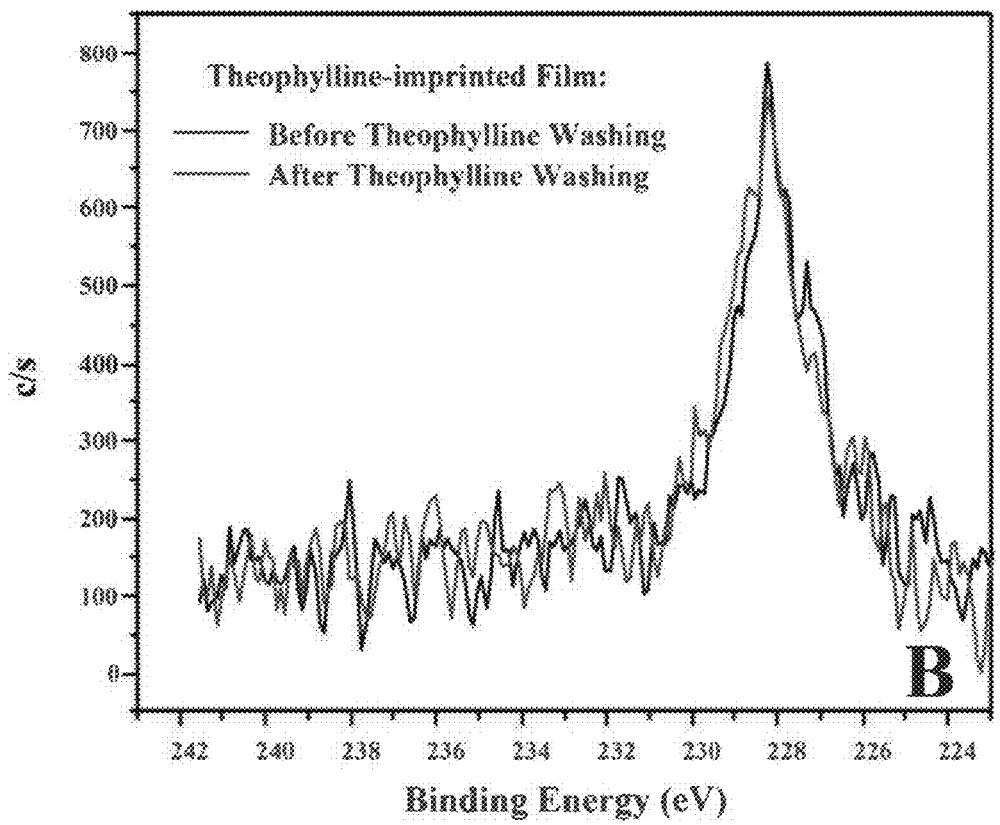
FIG. 1.7A&B

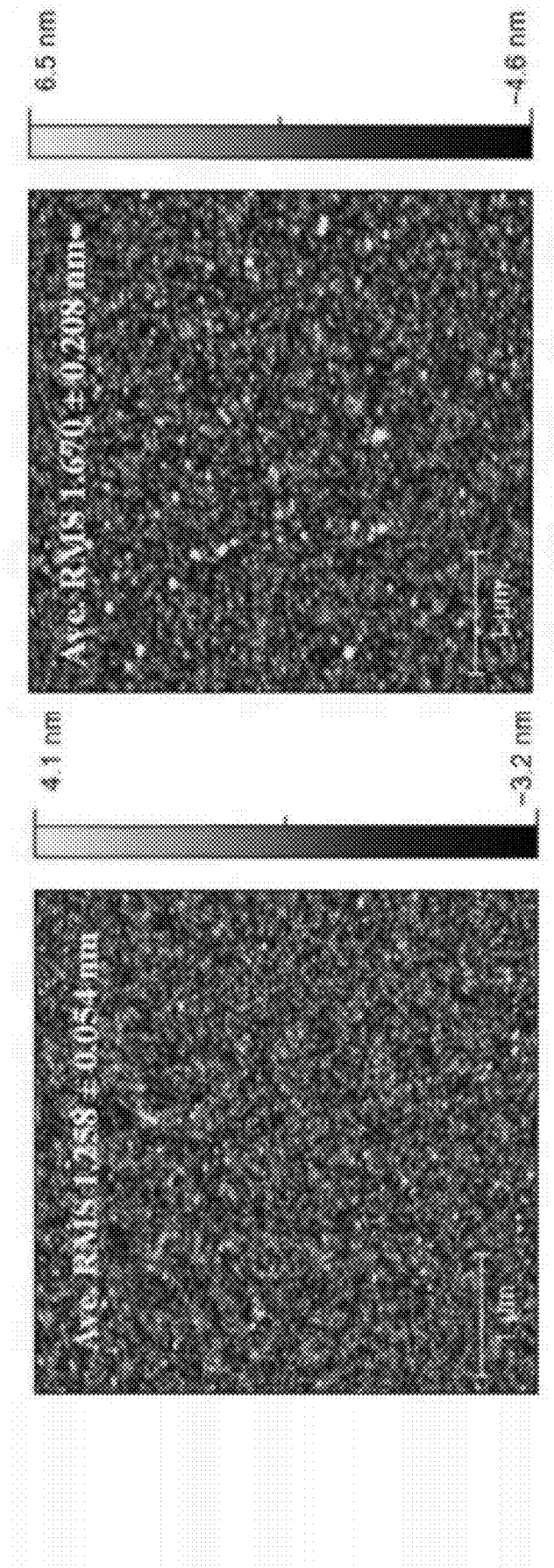
FIG. 1.8A

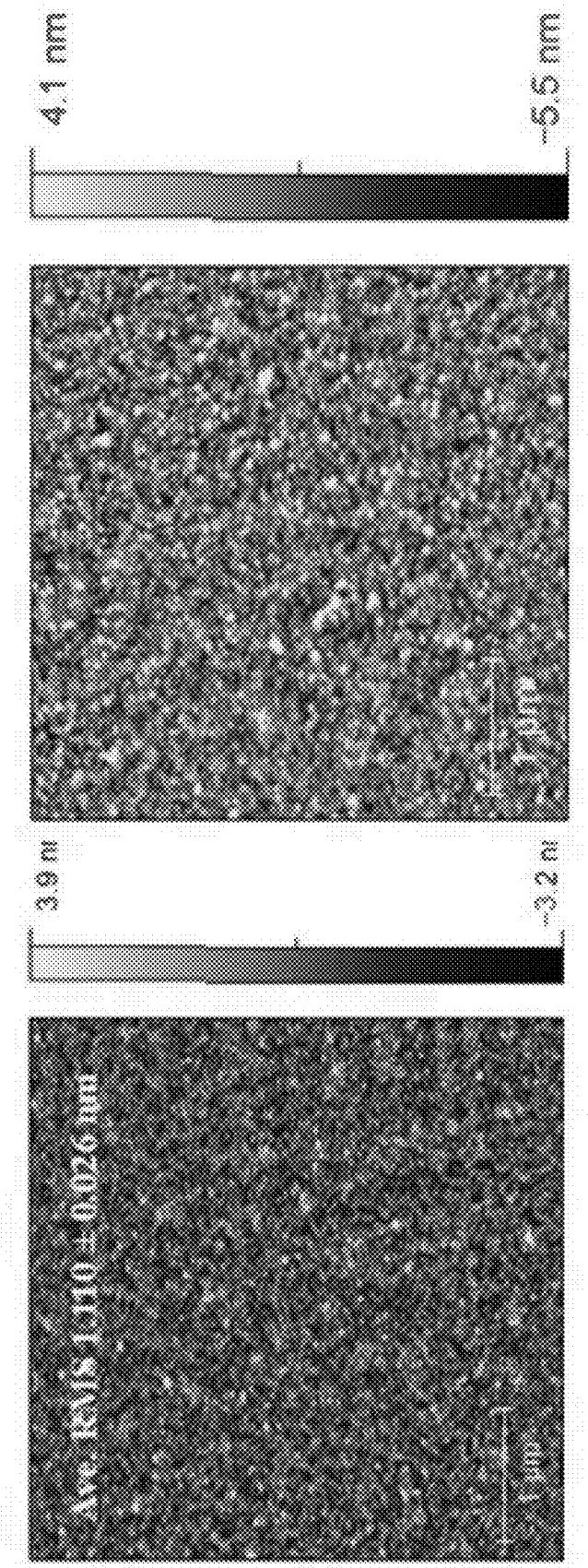
FIG. 1.8B

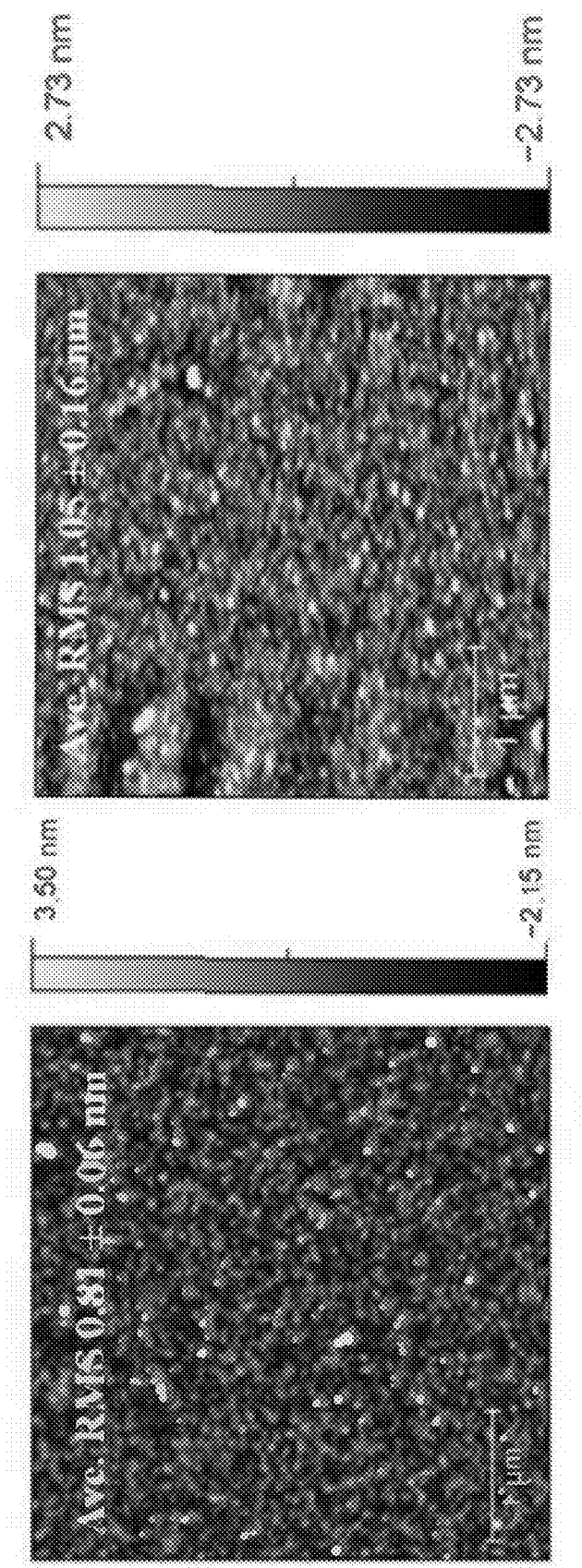
FIG. 1.8C

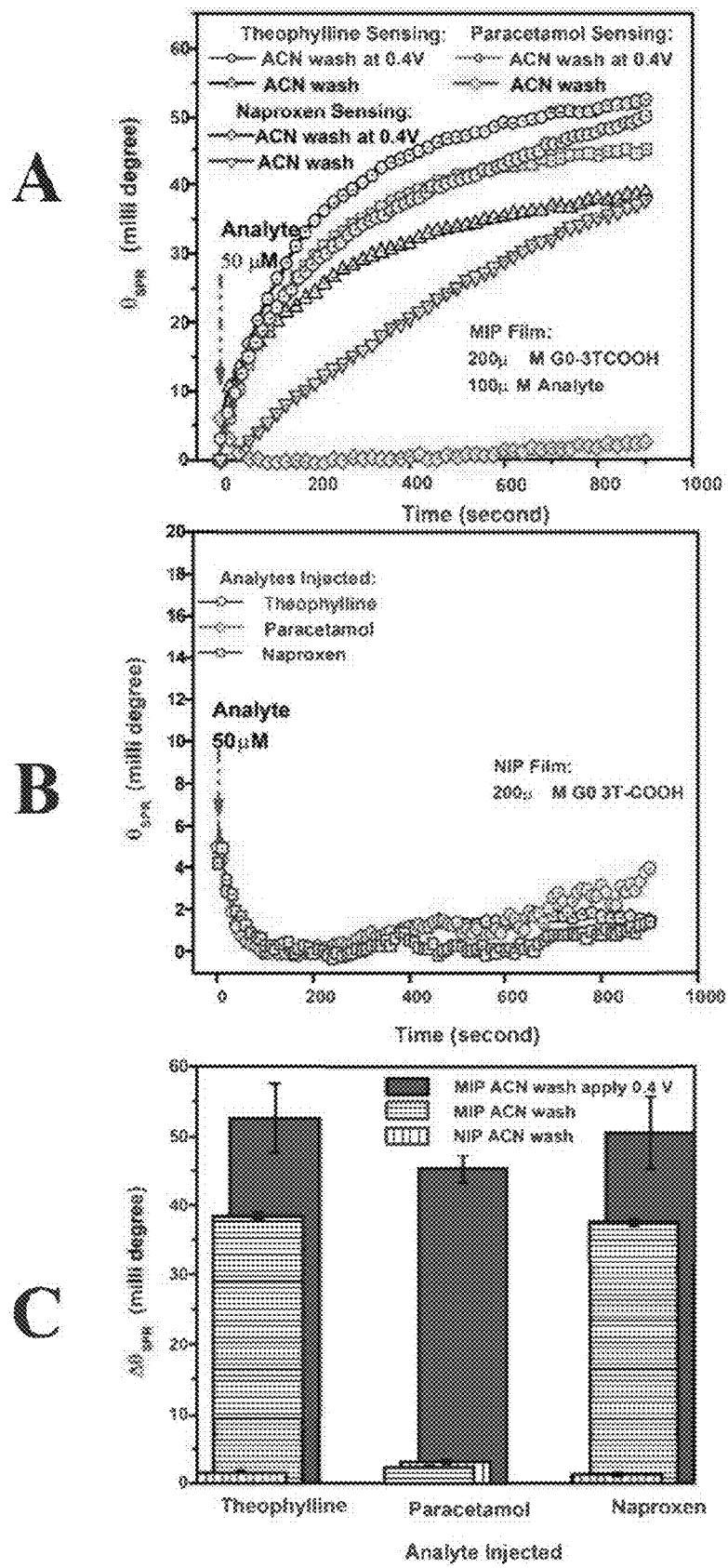
FIG. 1.9A-C

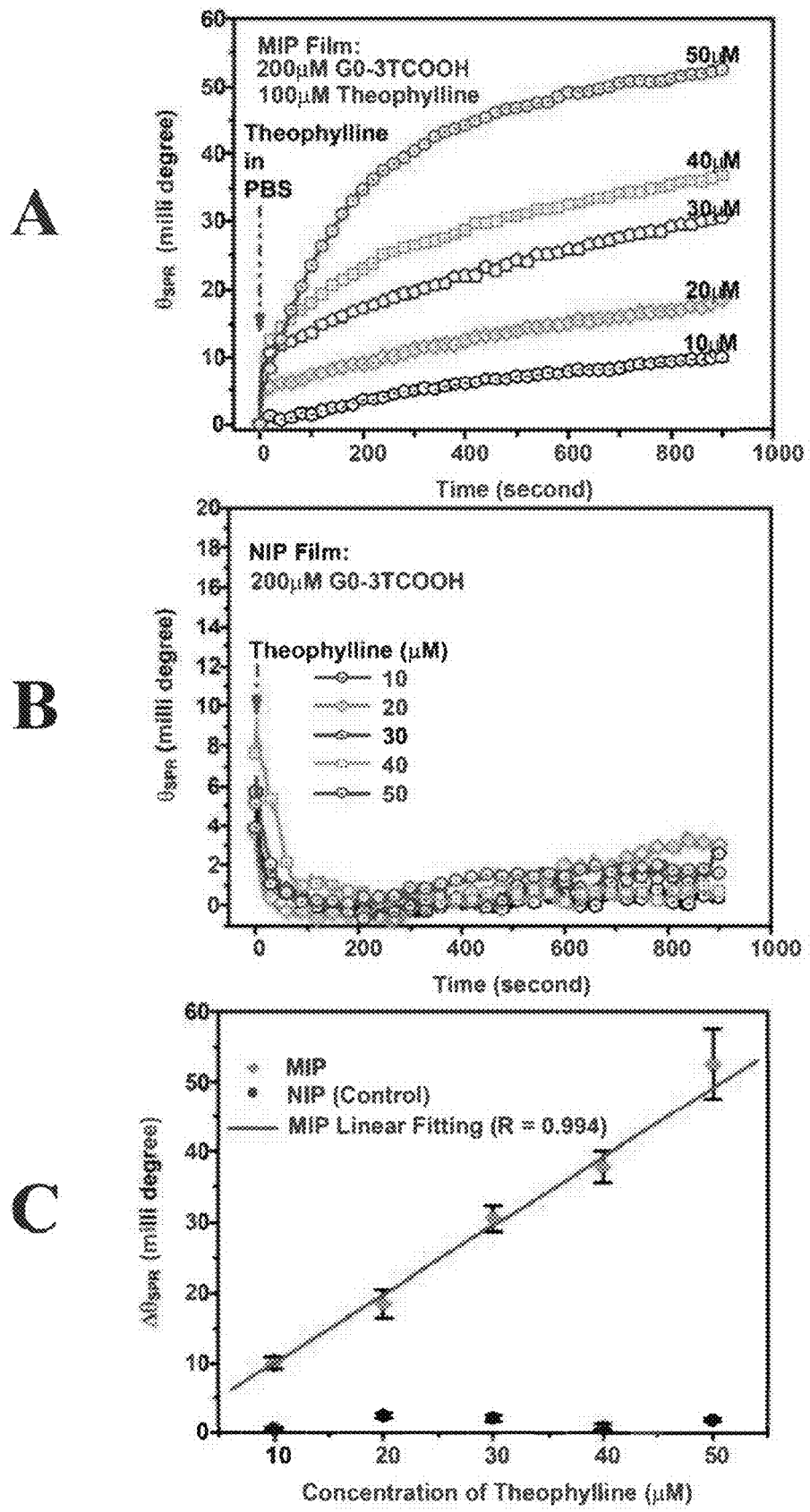
FIG. 1.10A-C

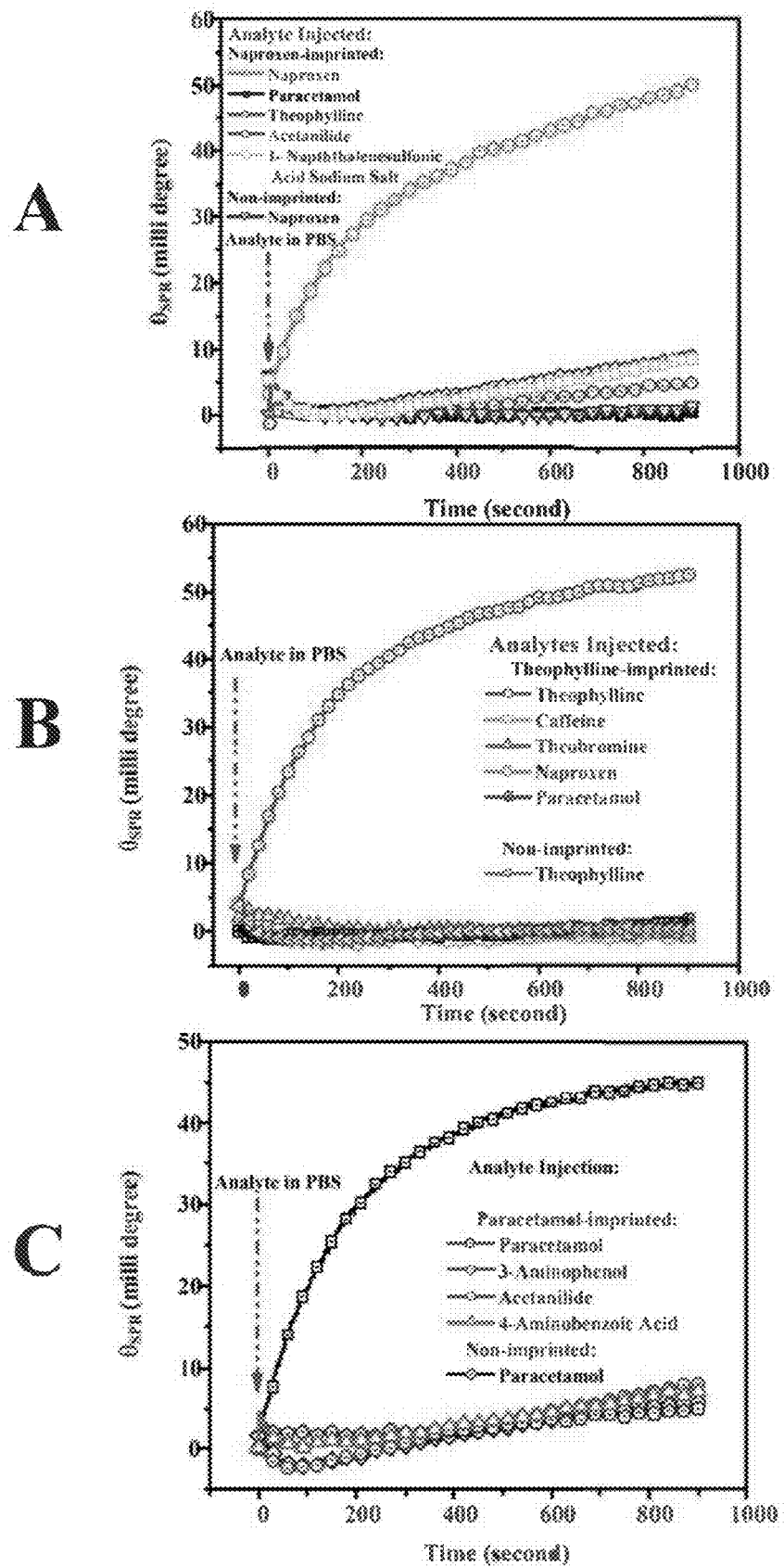
FIG. 1.11A-C

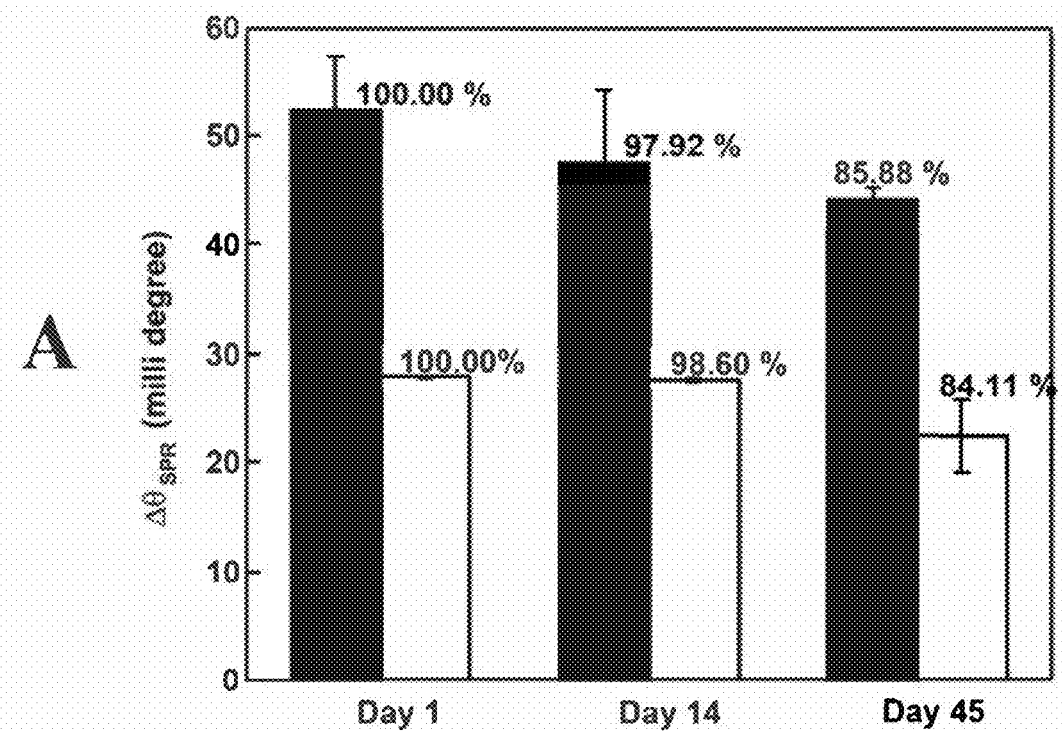
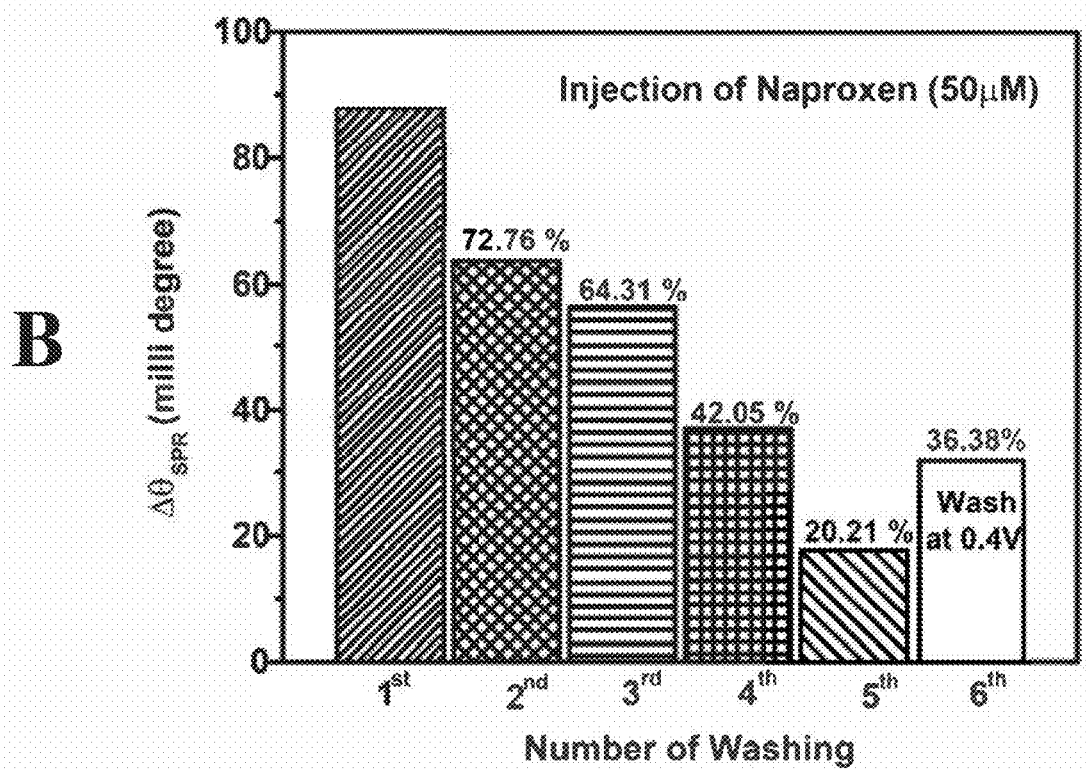
FIG. 1.12A&B

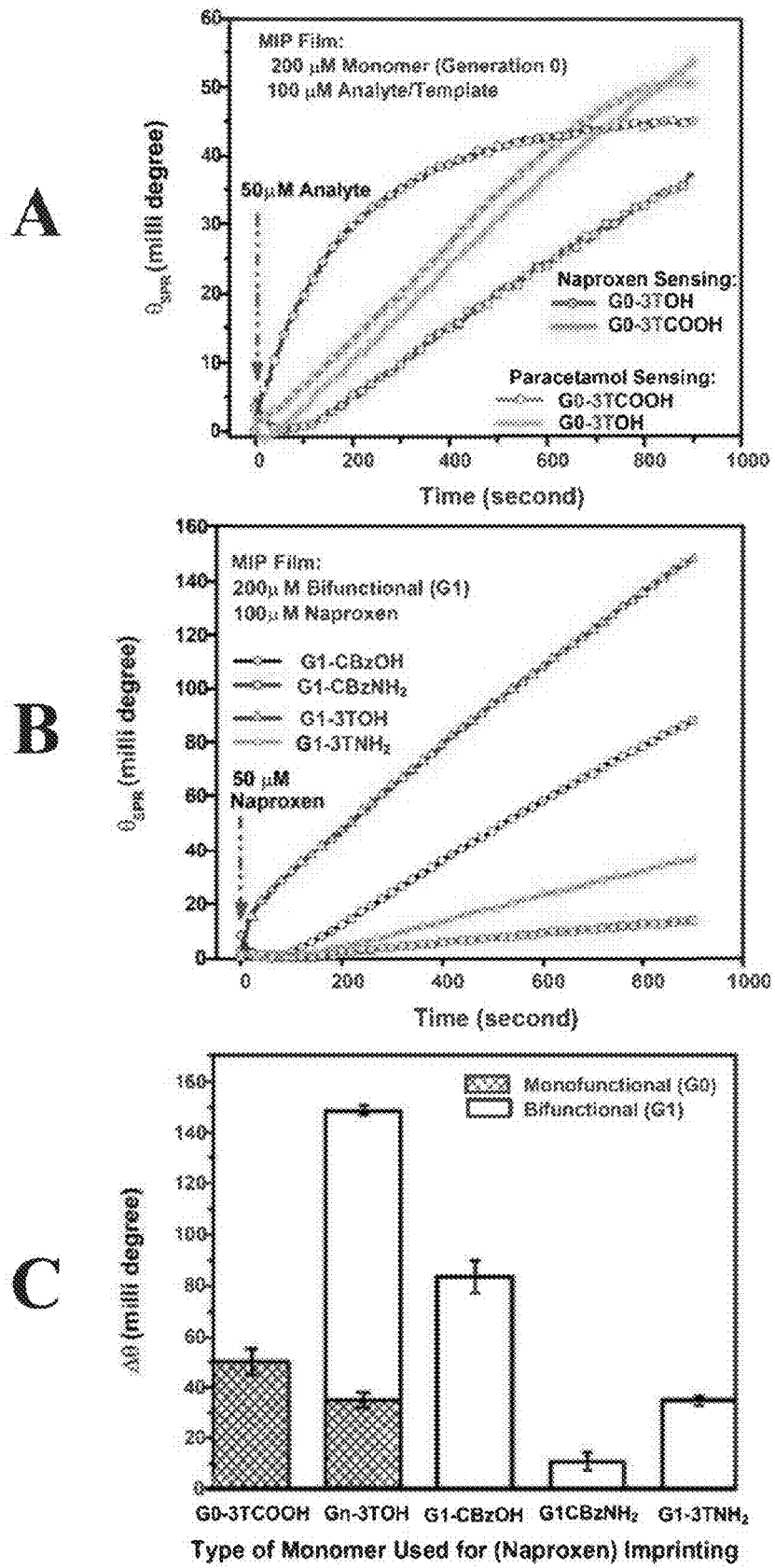
FIG. 1.13A-C

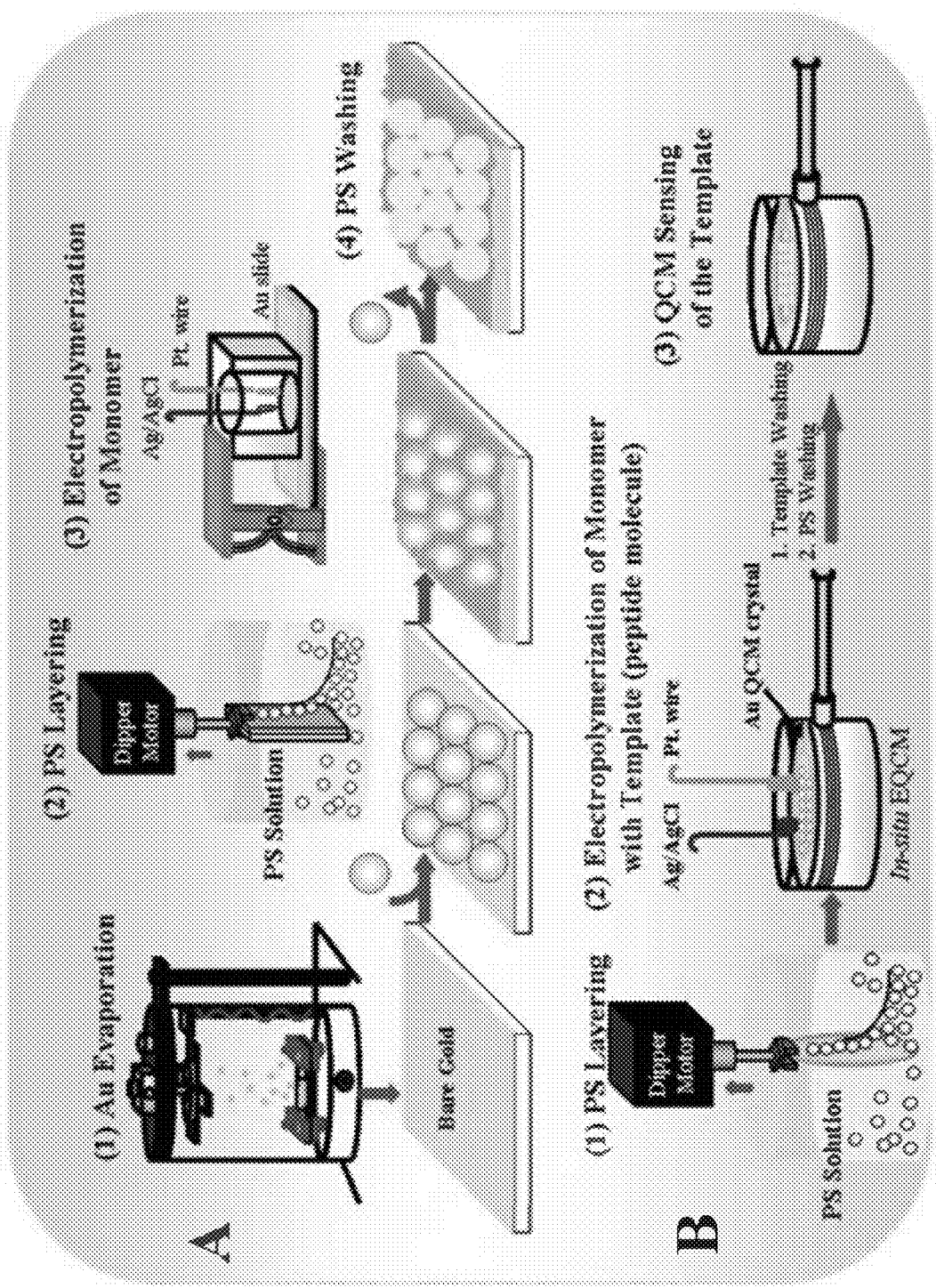
FIG. 1.14 A&B

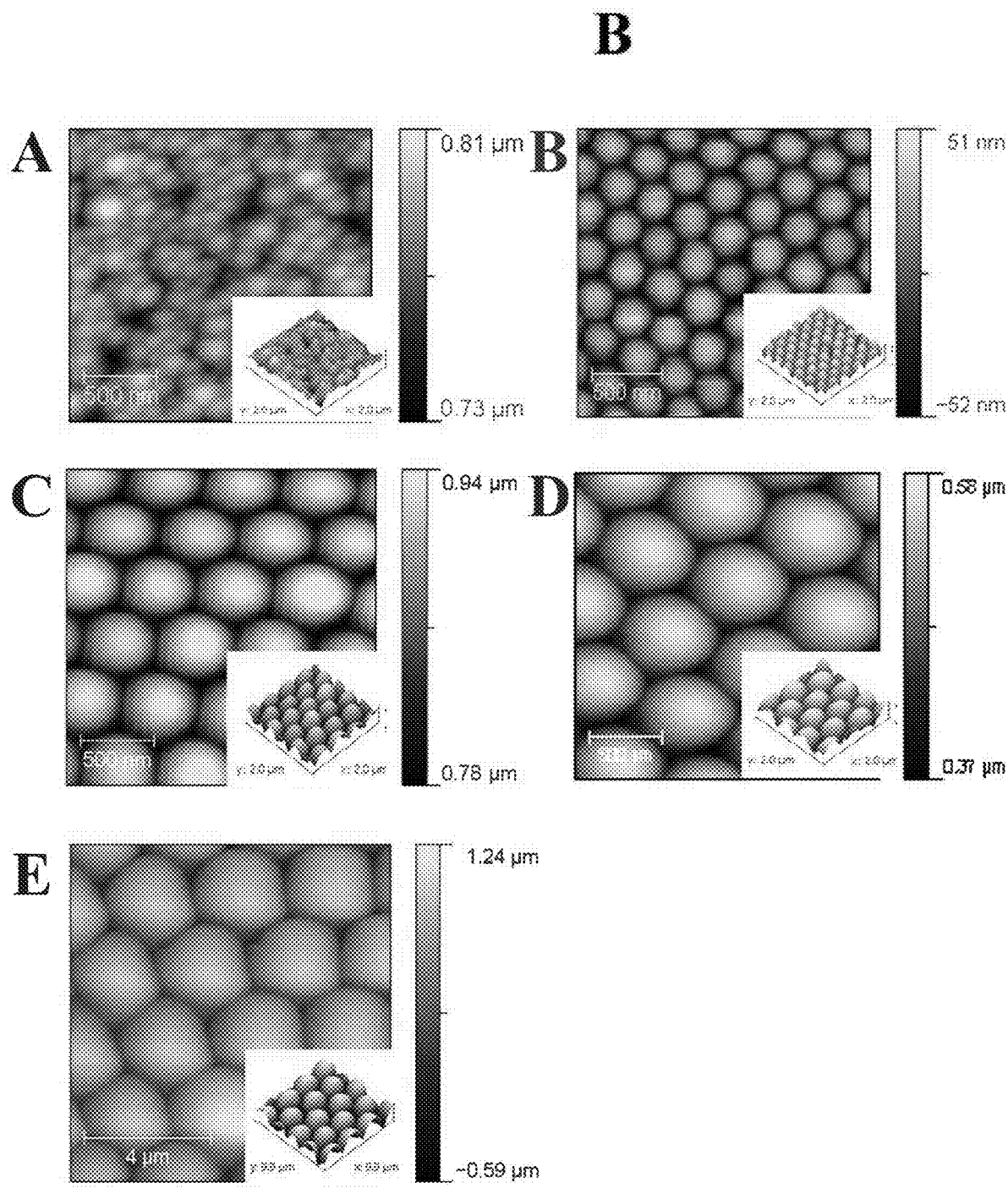
FIG. 1.15A-E

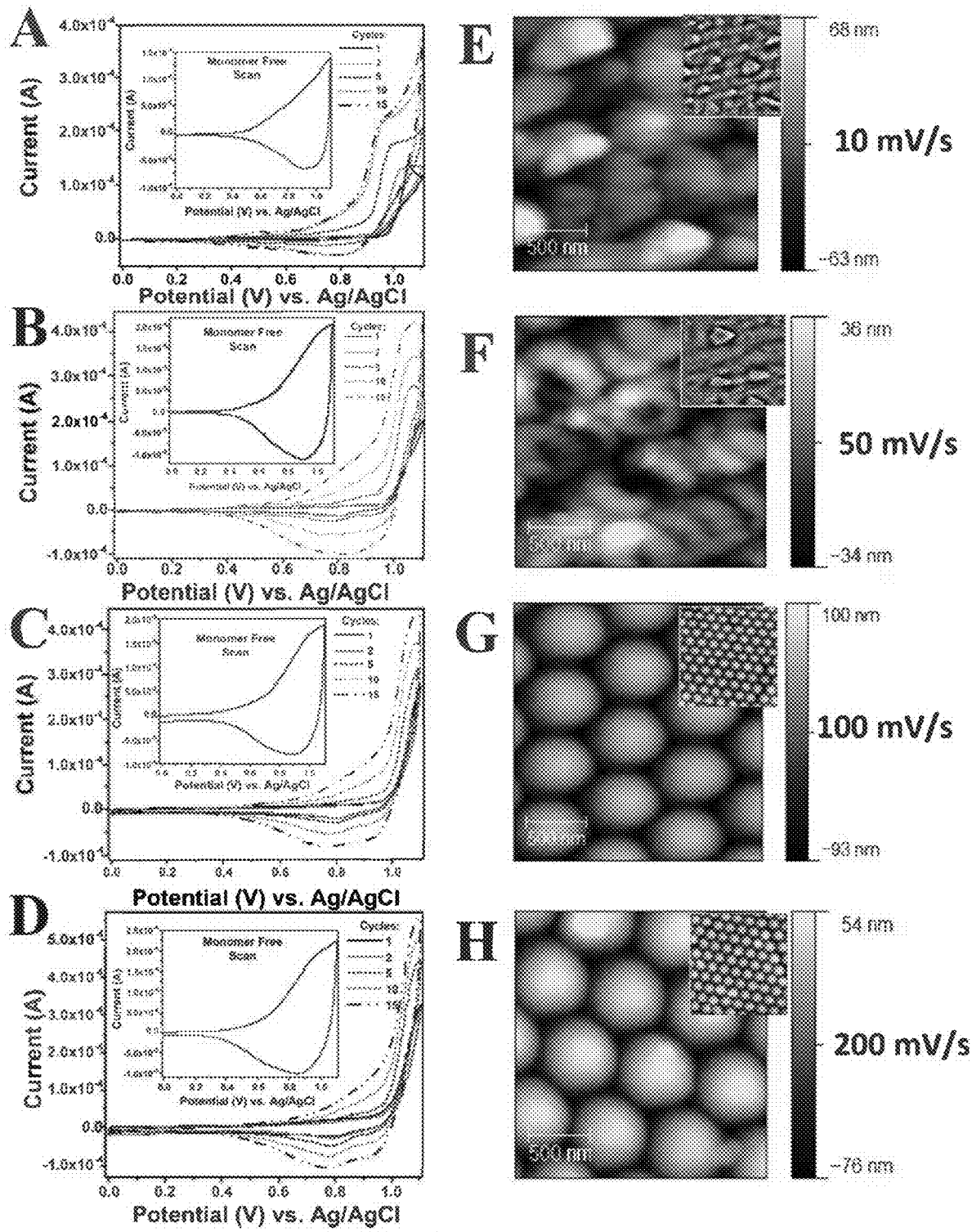
FIG. 1.16A-H

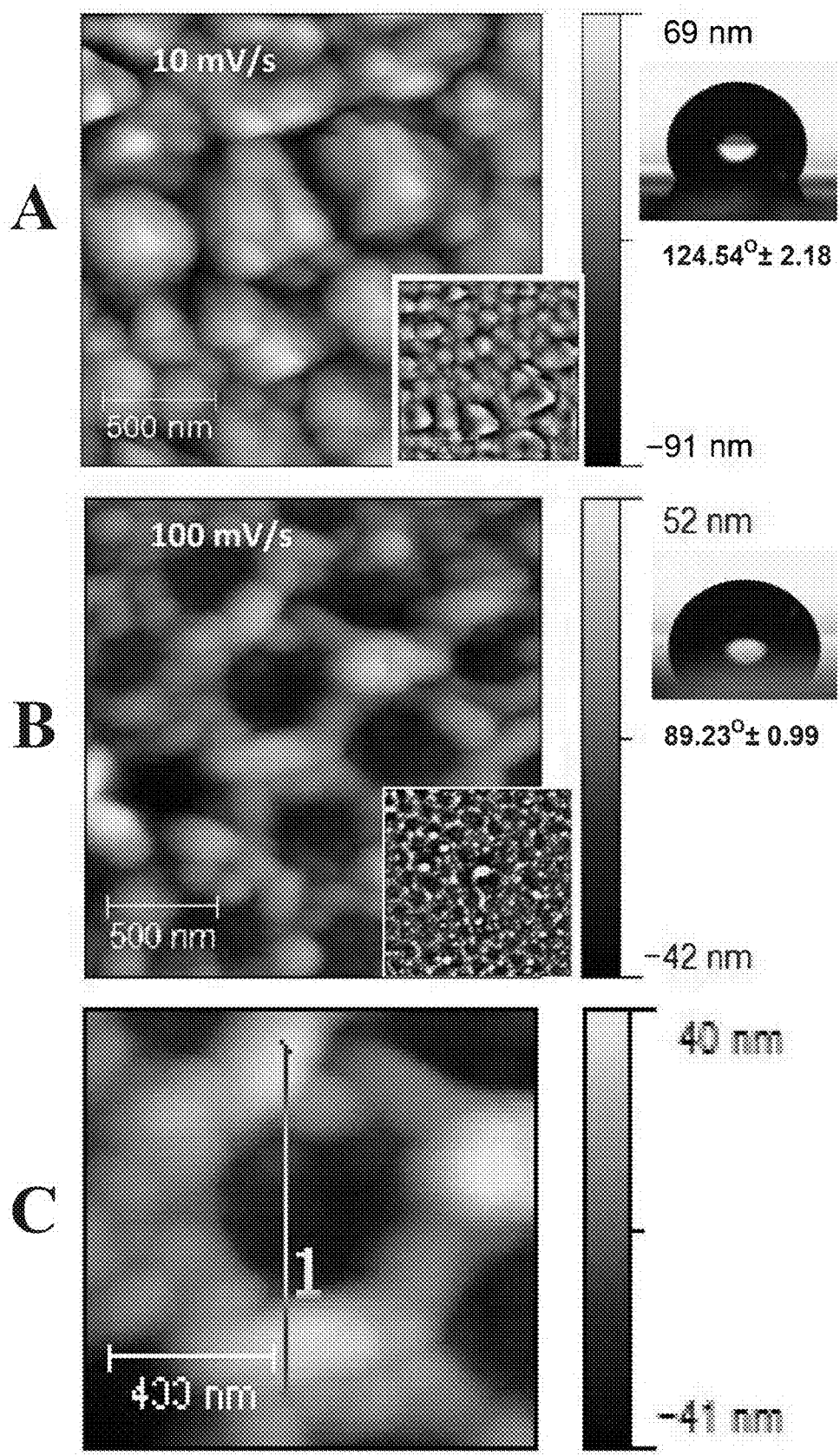
FIG. 1.17A-C

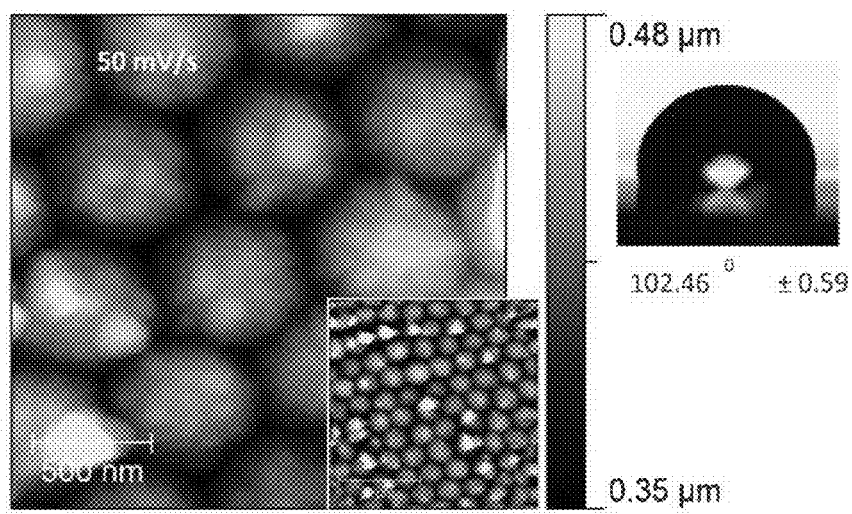
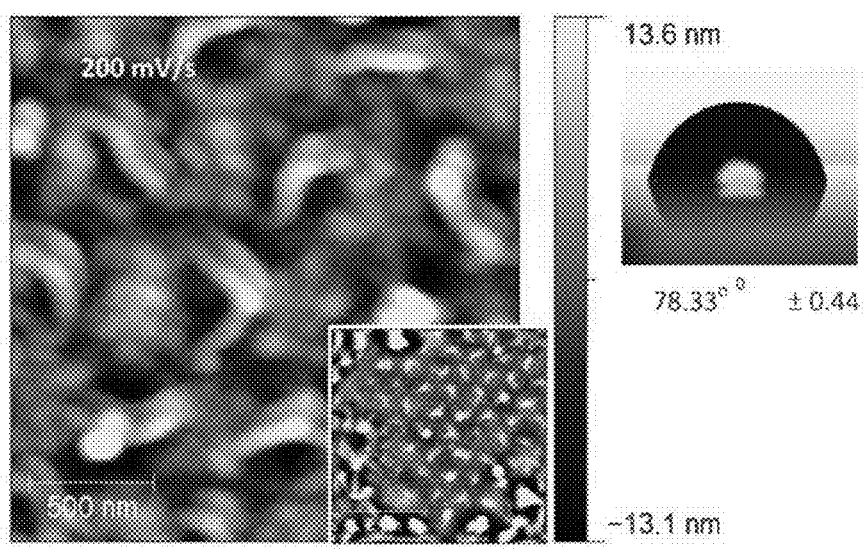
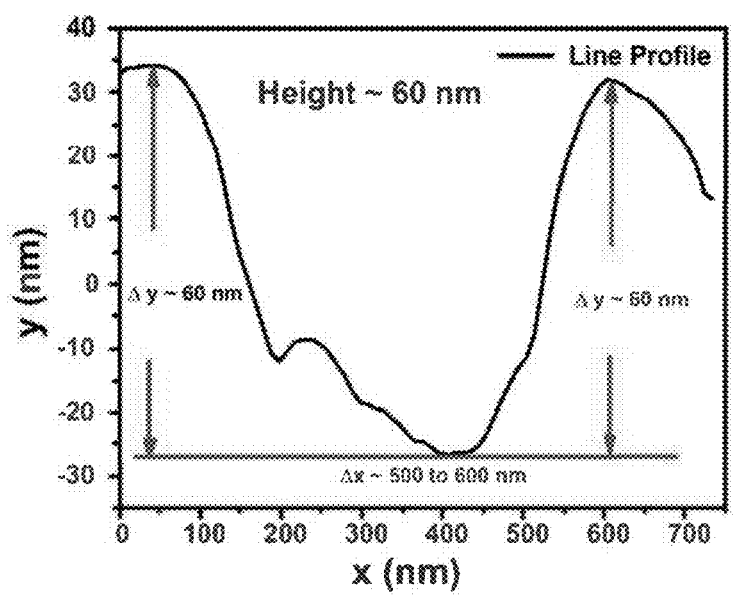
FIG. 1.17D-F

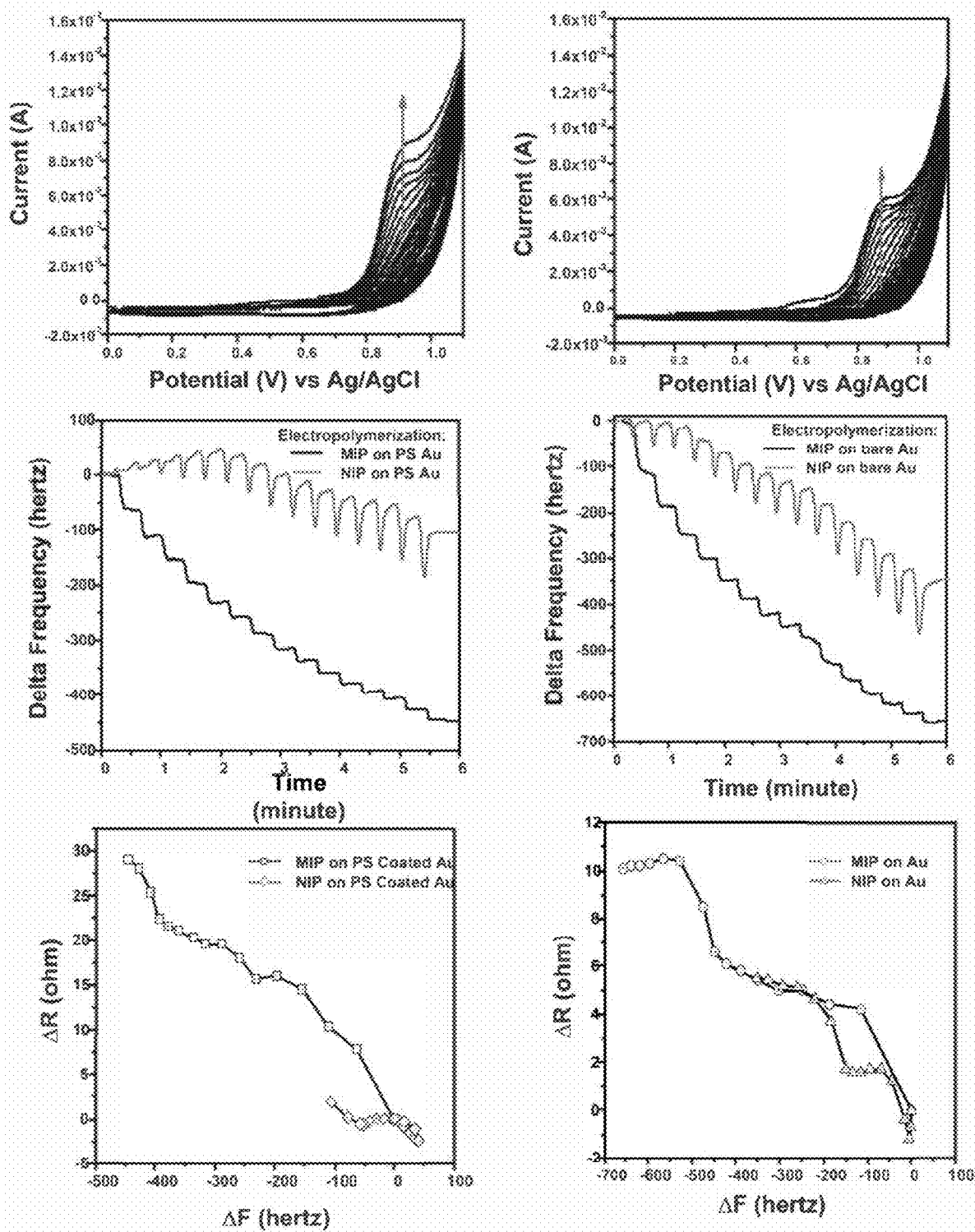
FIG. 1.18A-F

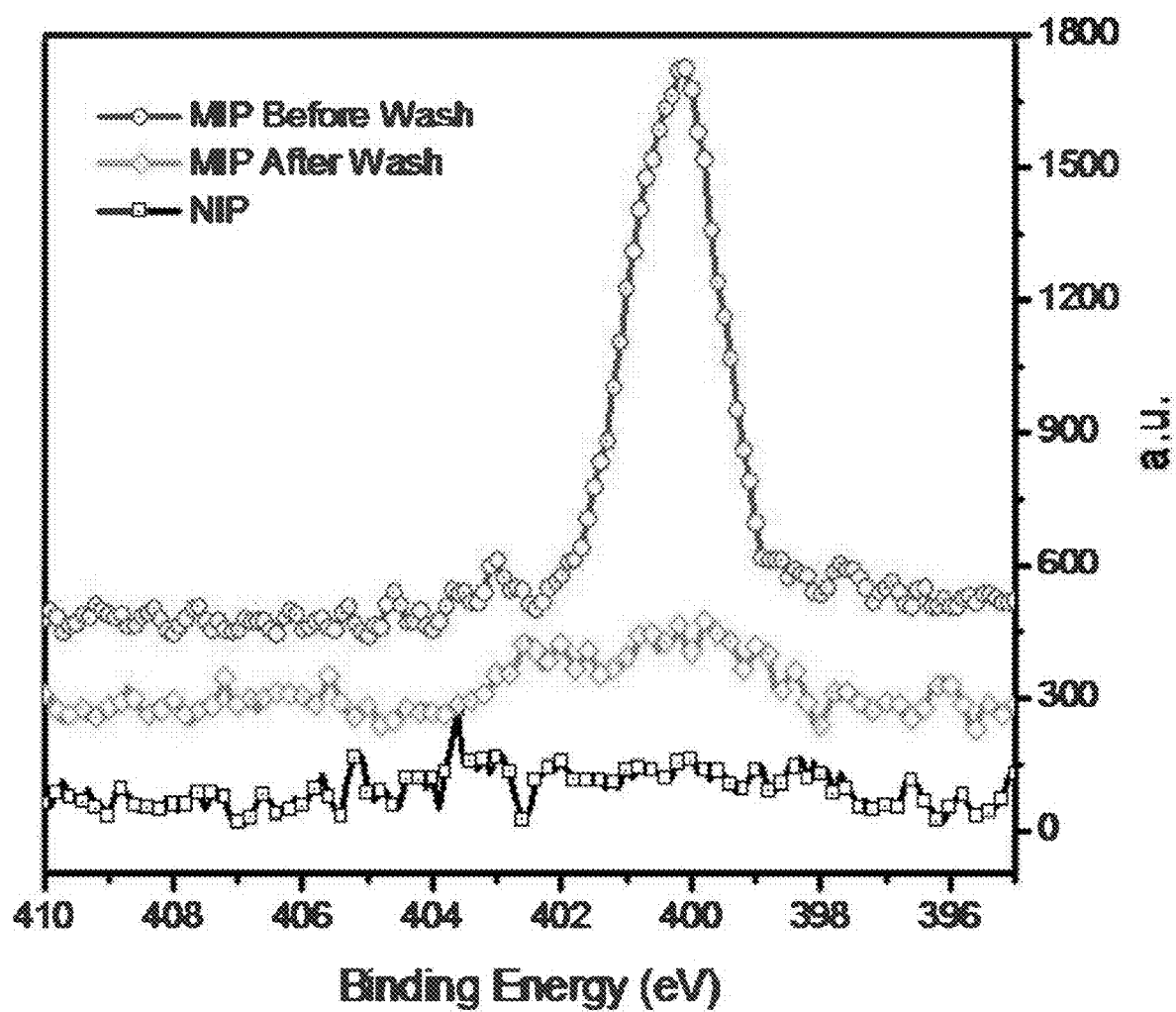
FIG. 1.19

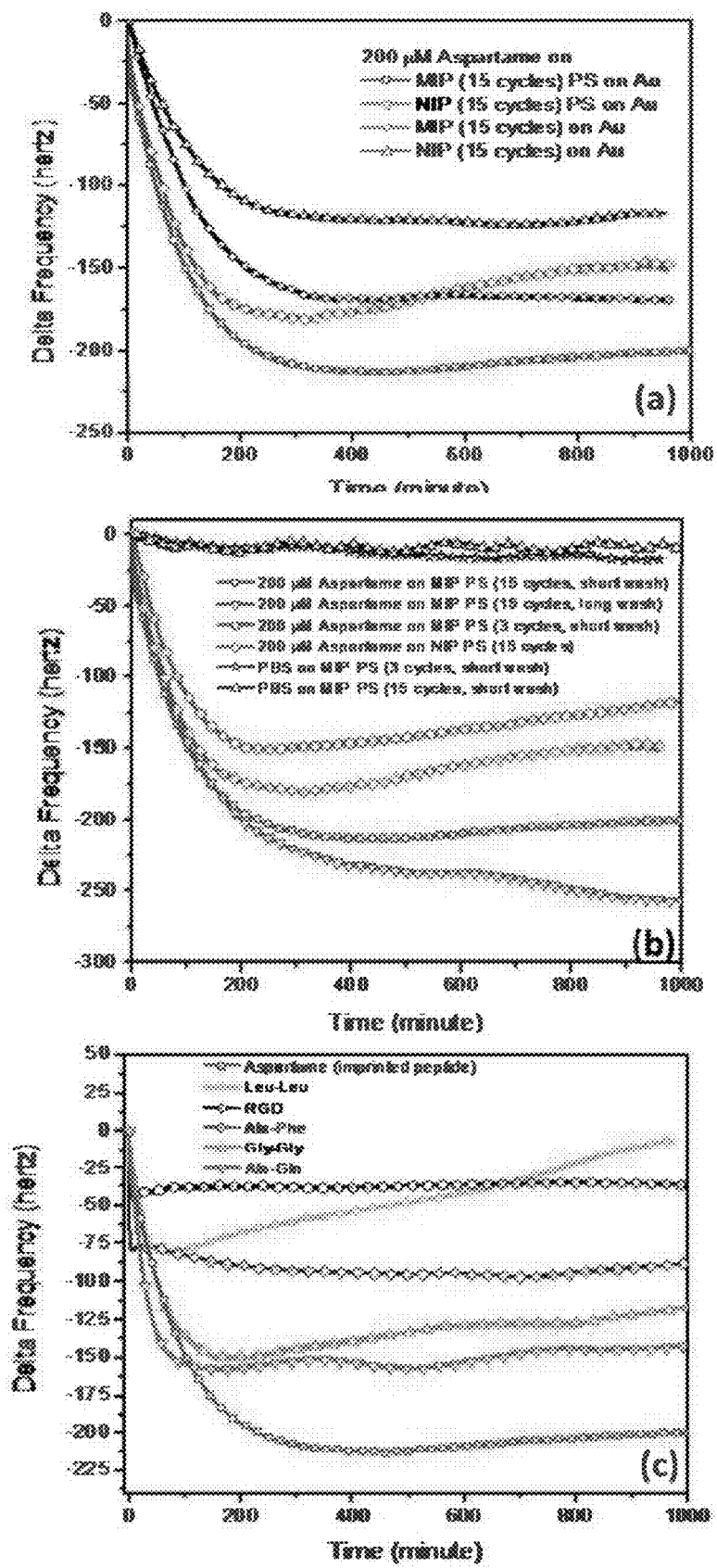
FIG. 1.20A-C

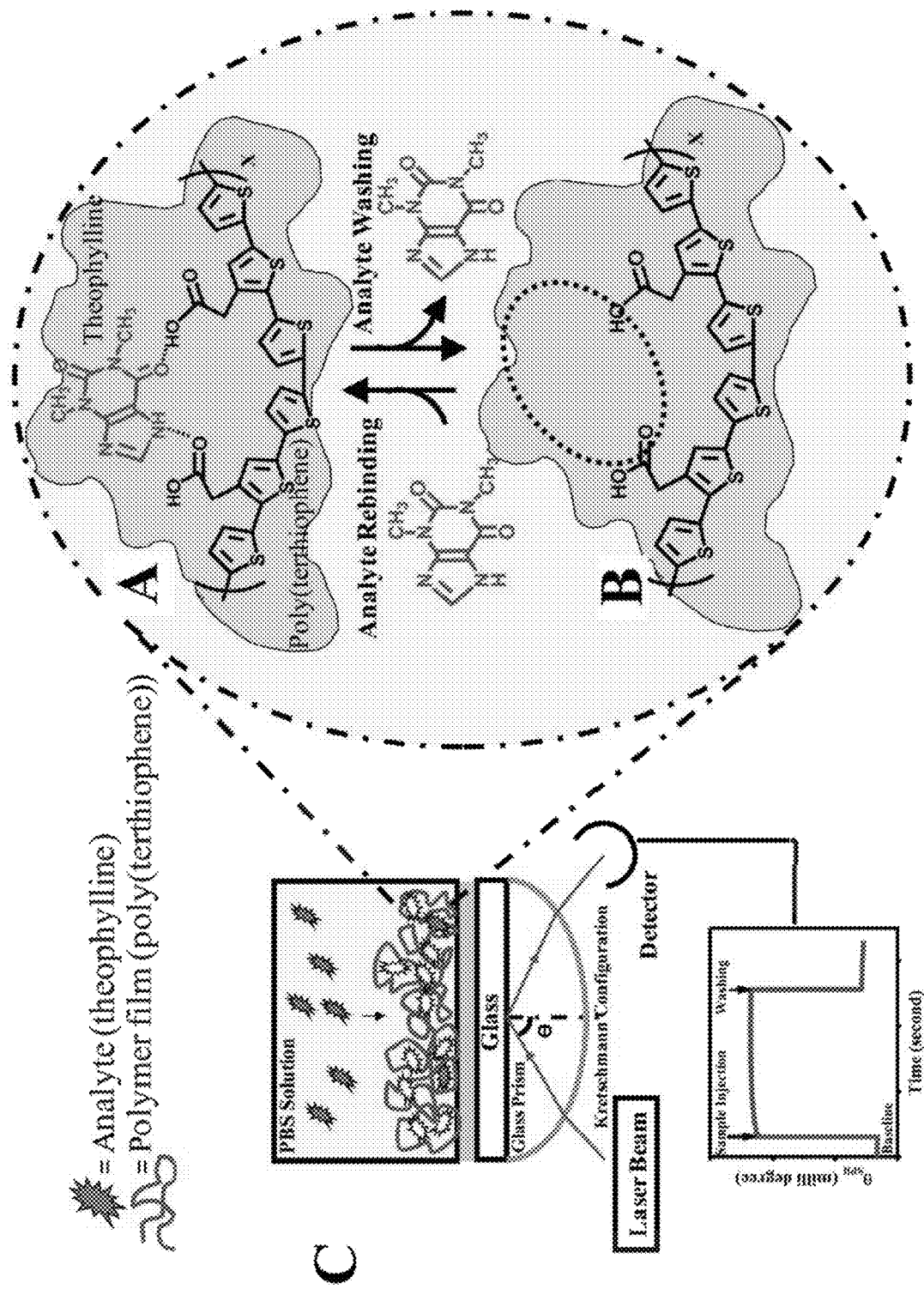
FIG. 2.1A-C

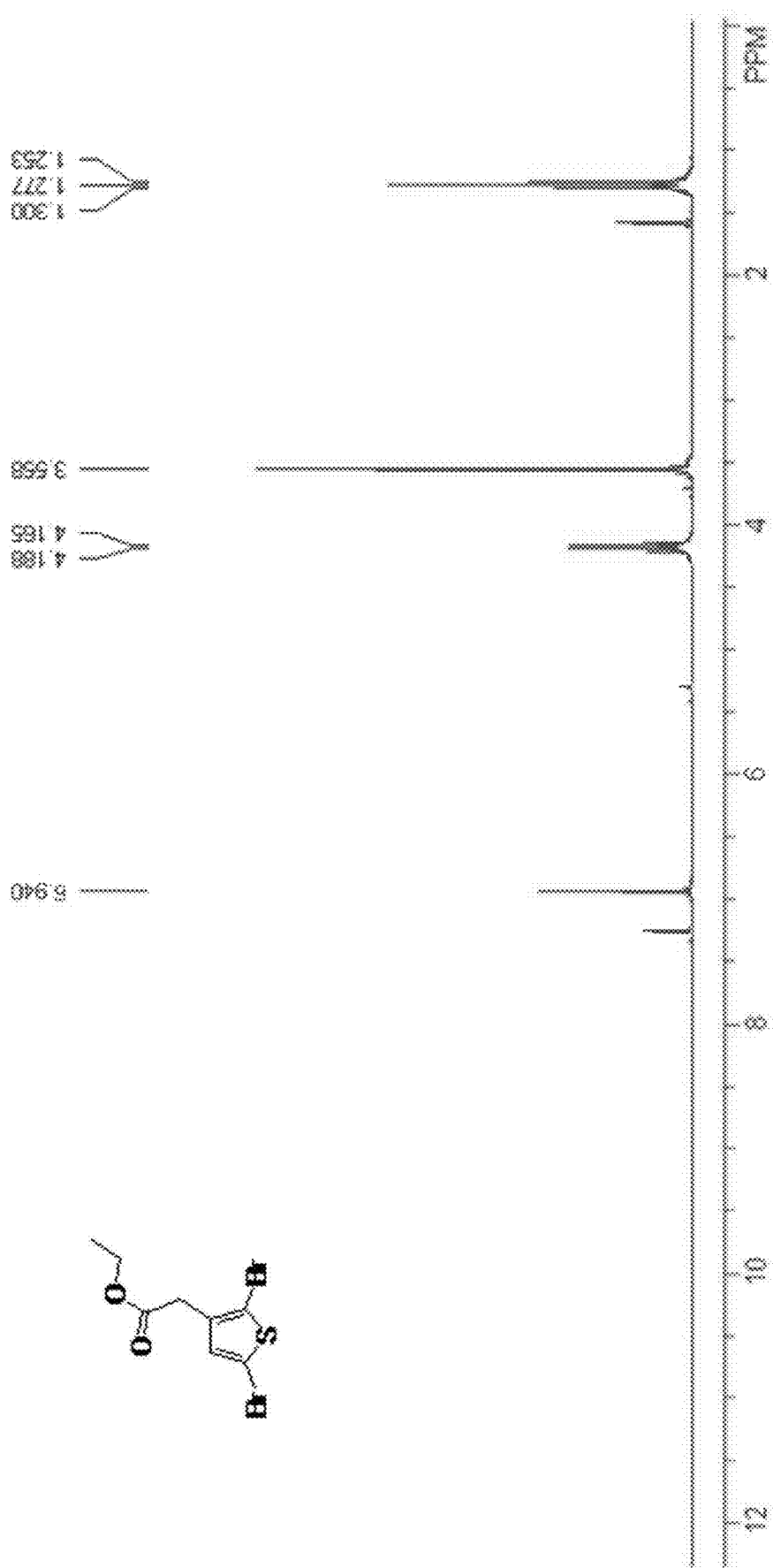
FIG. 2.2

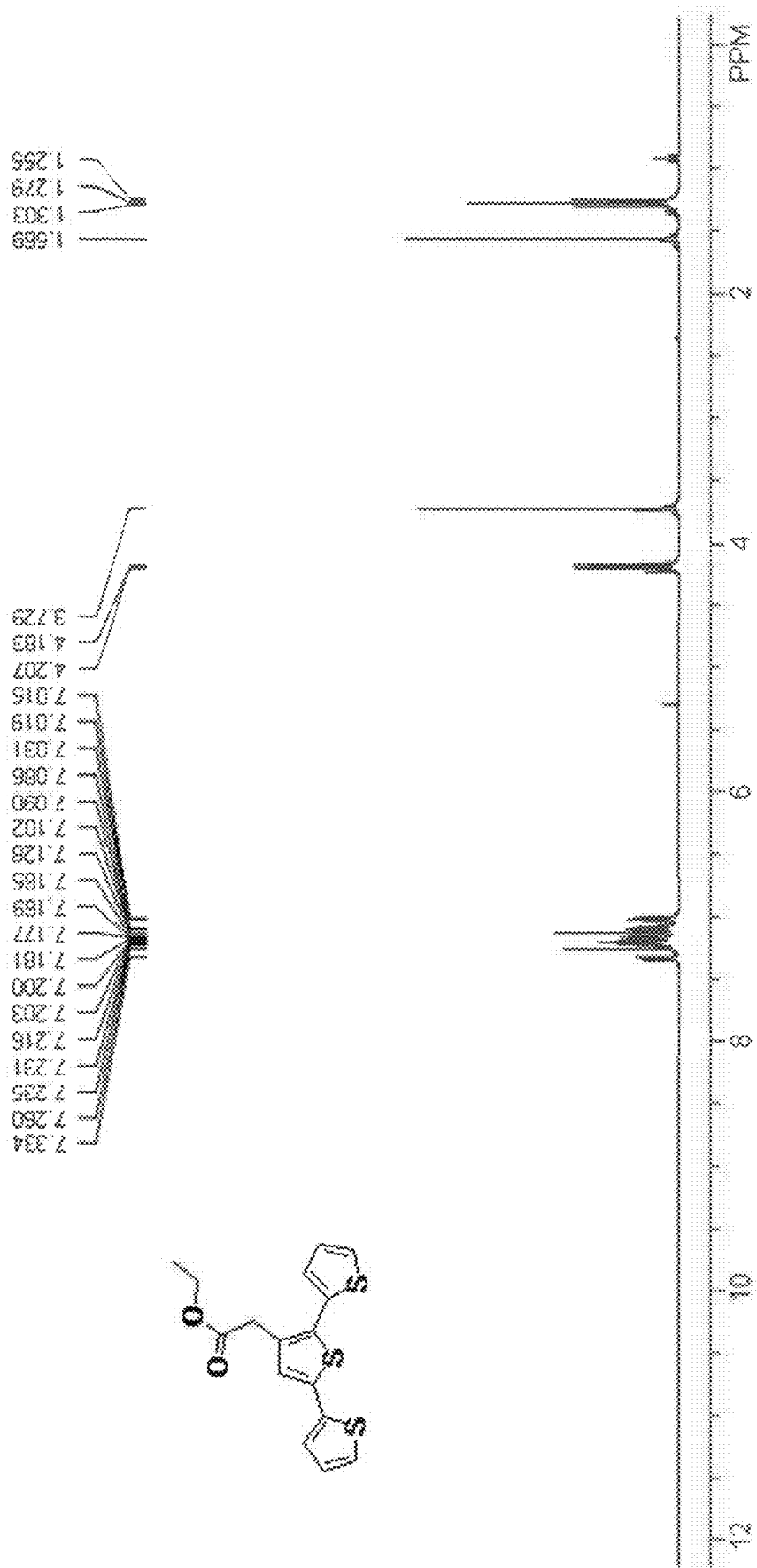
FIG. 2.3

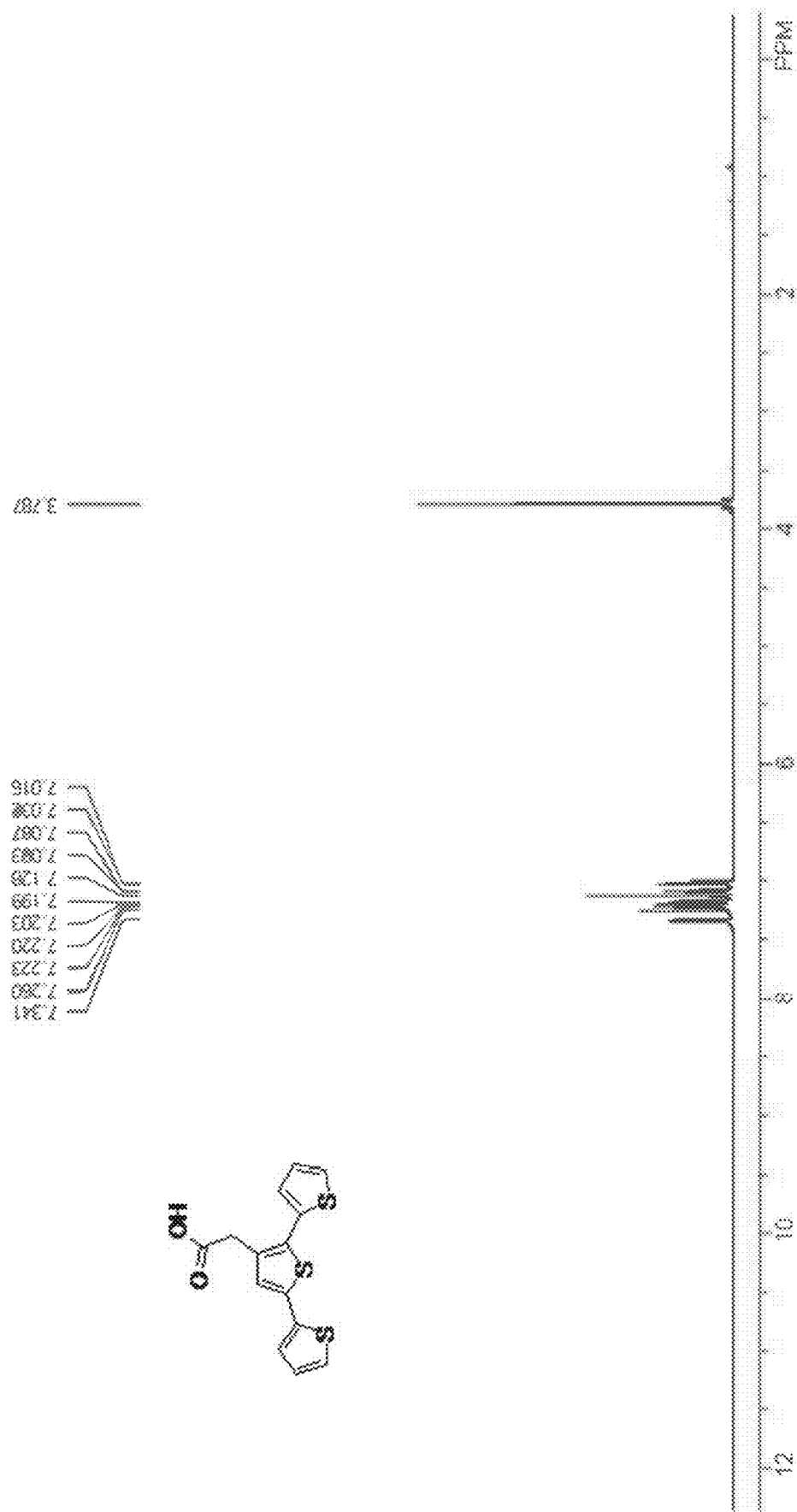
FIG. 2.4

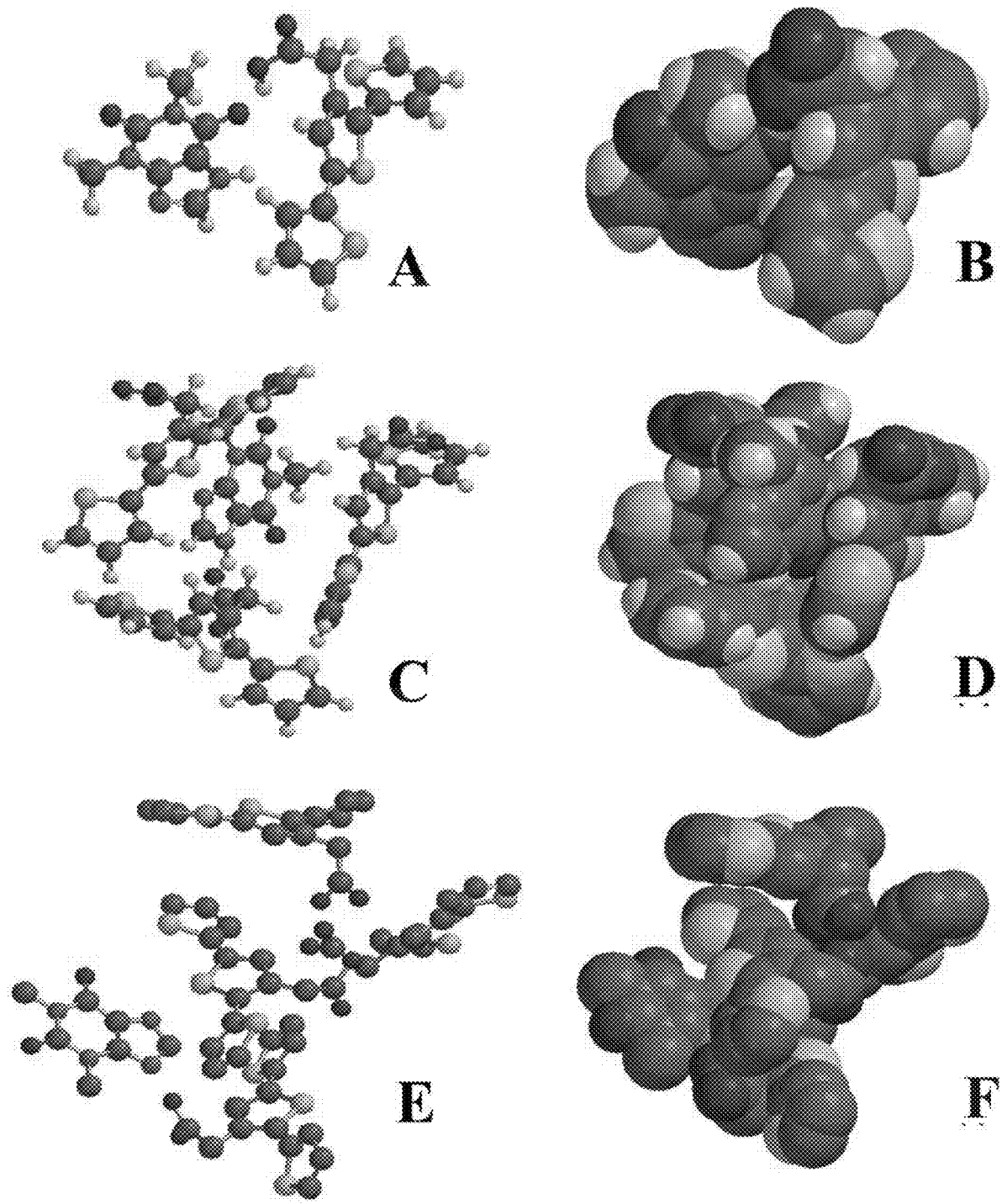
FIG. 2.5A-F

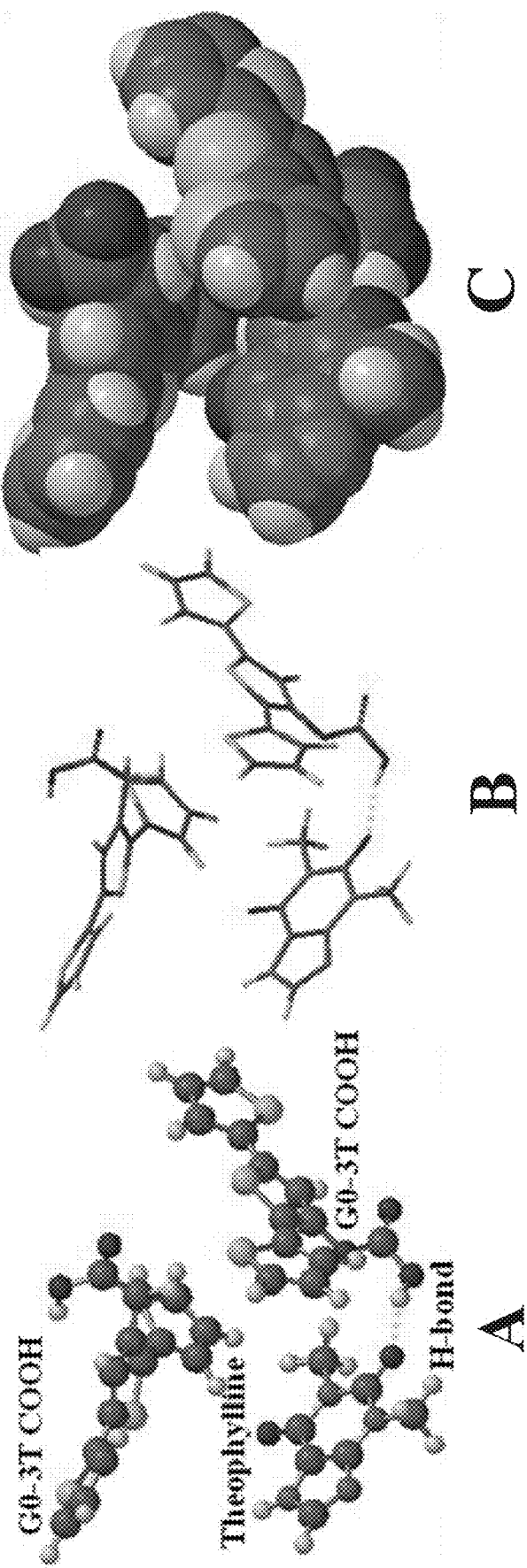
FIG. 2.6A-C

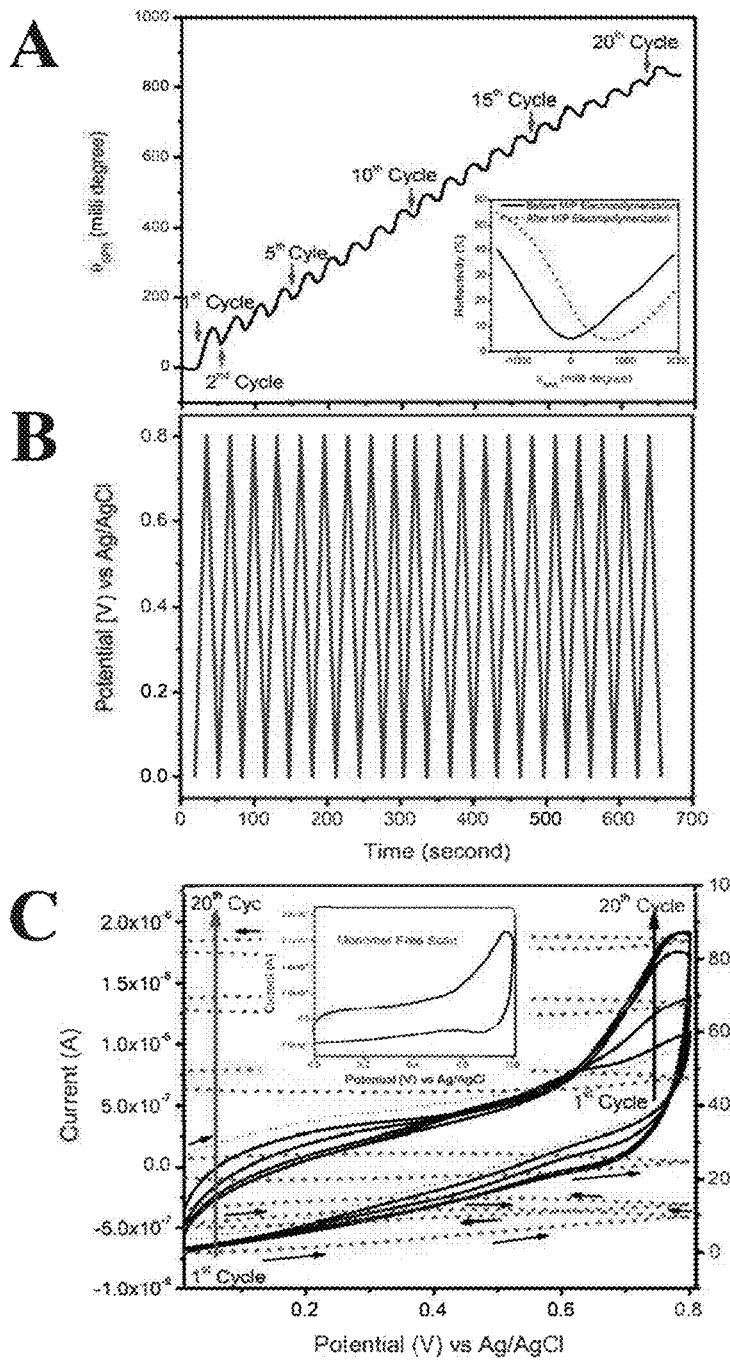
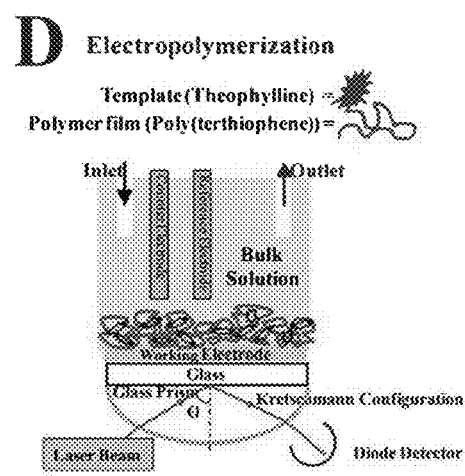
FIG. 2.7A-D

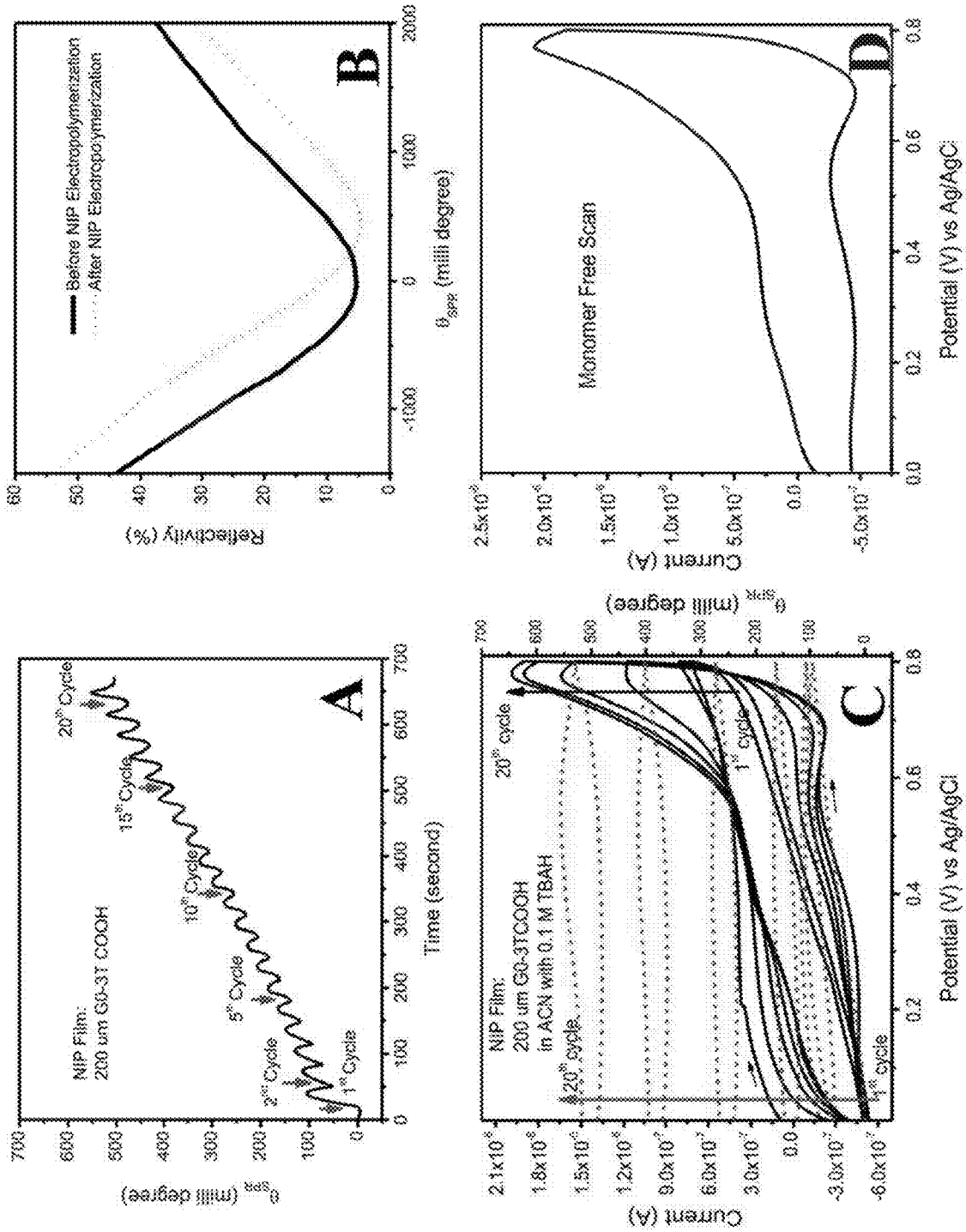
FIG. 2.8A-D

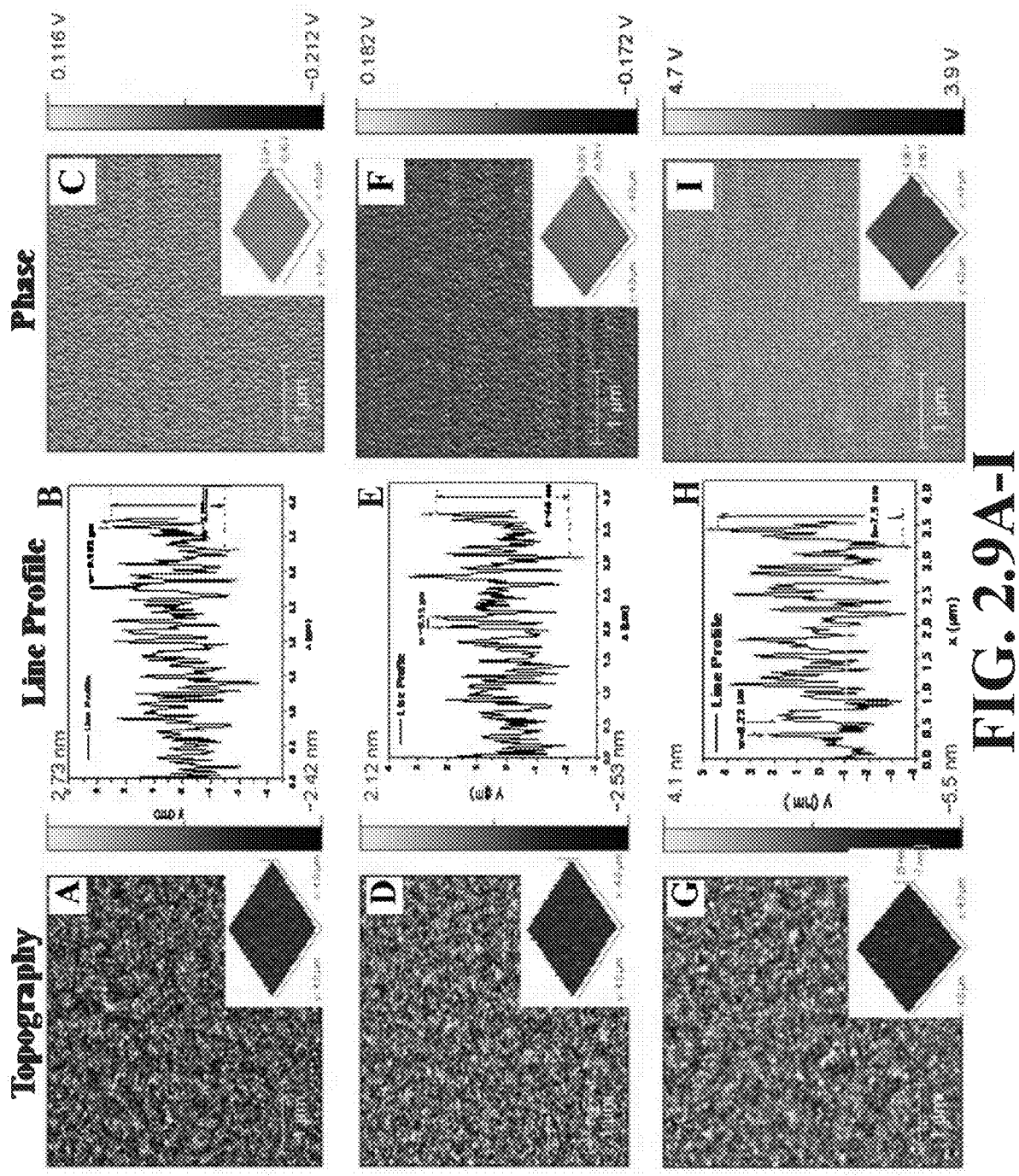
FIG. 2.9A-I

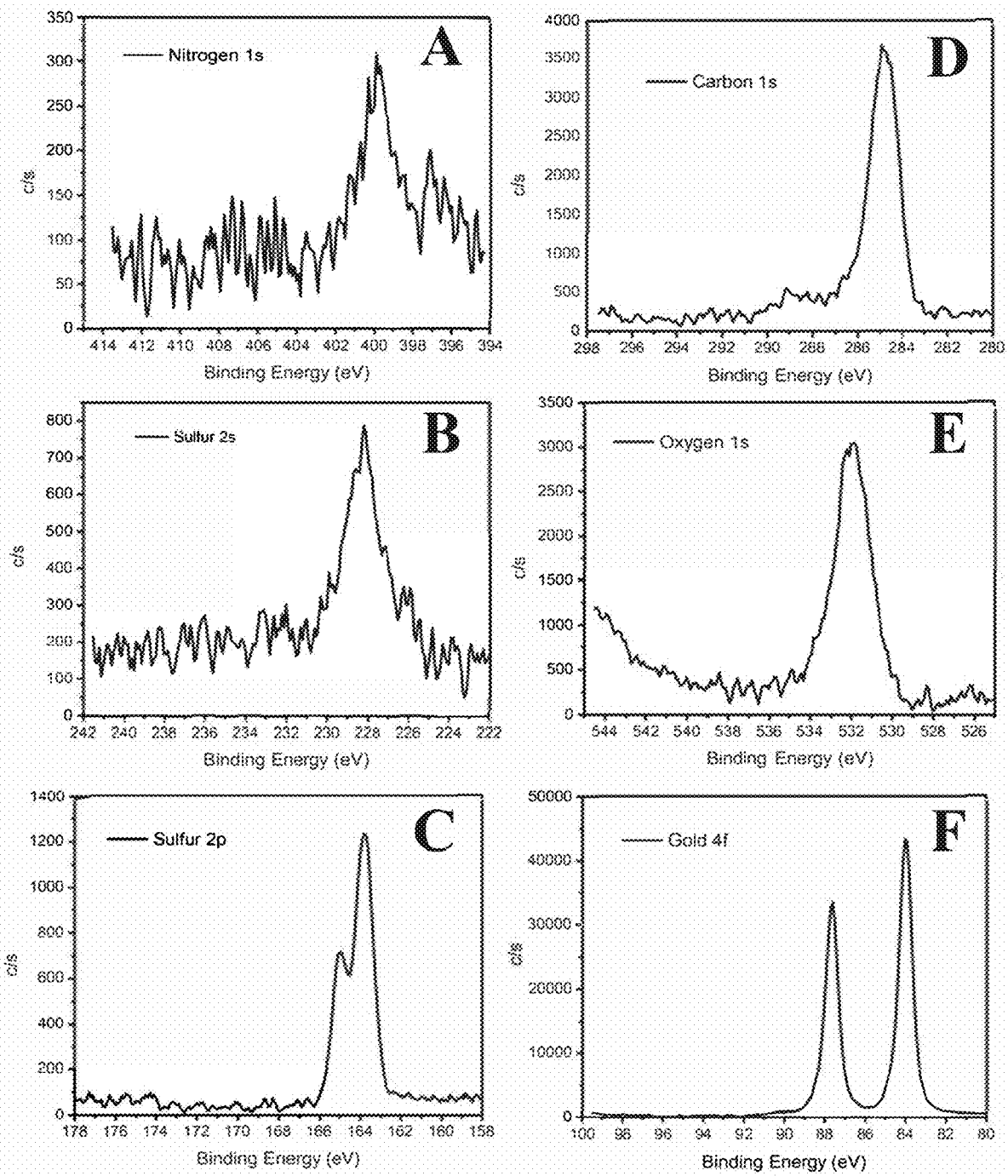
FIG. 2.10A-F

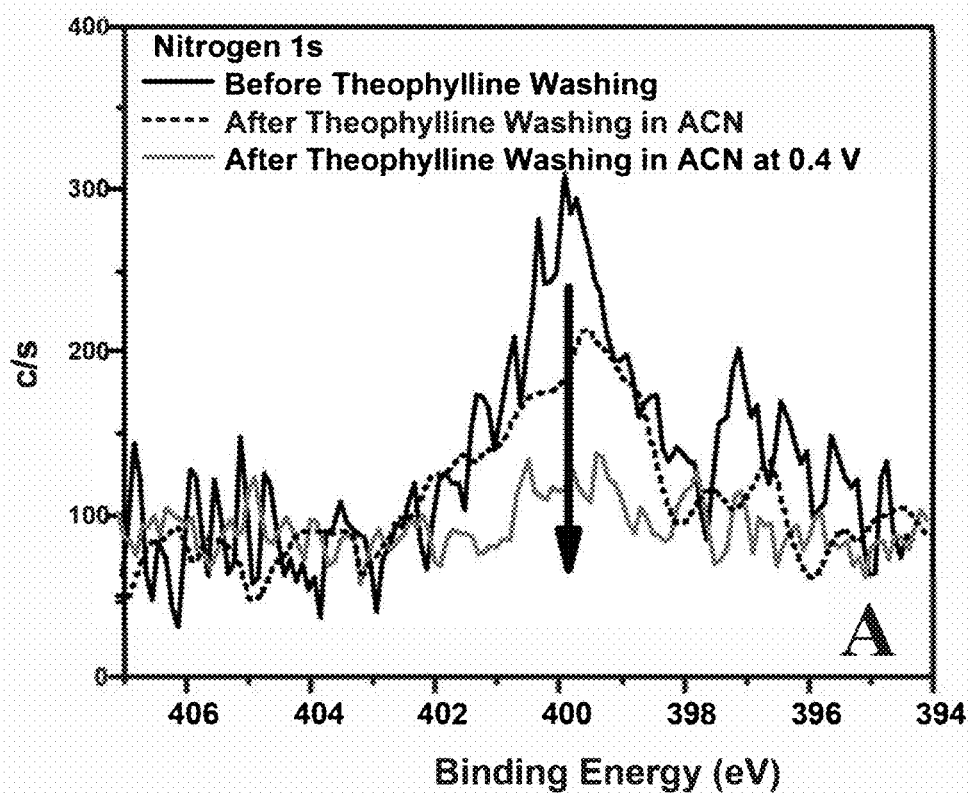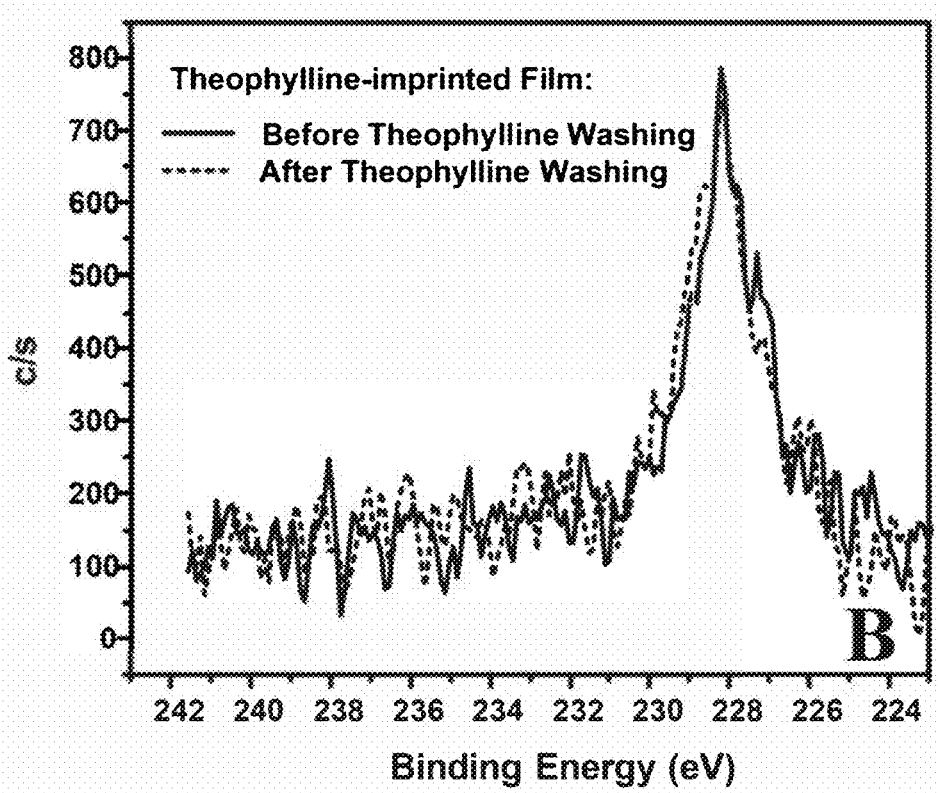
FIG. 2.11A&B

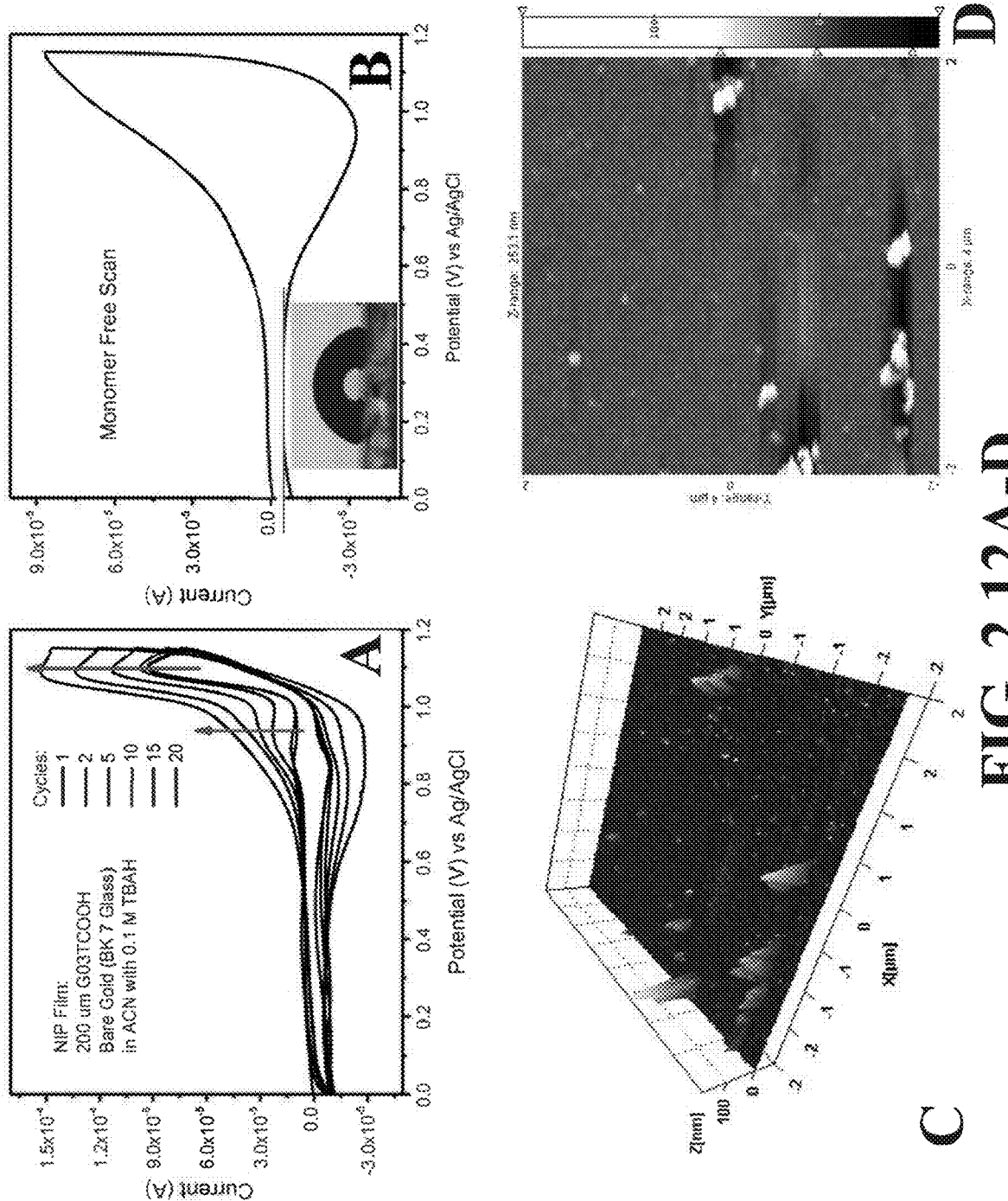
FIG. 2.12A-D

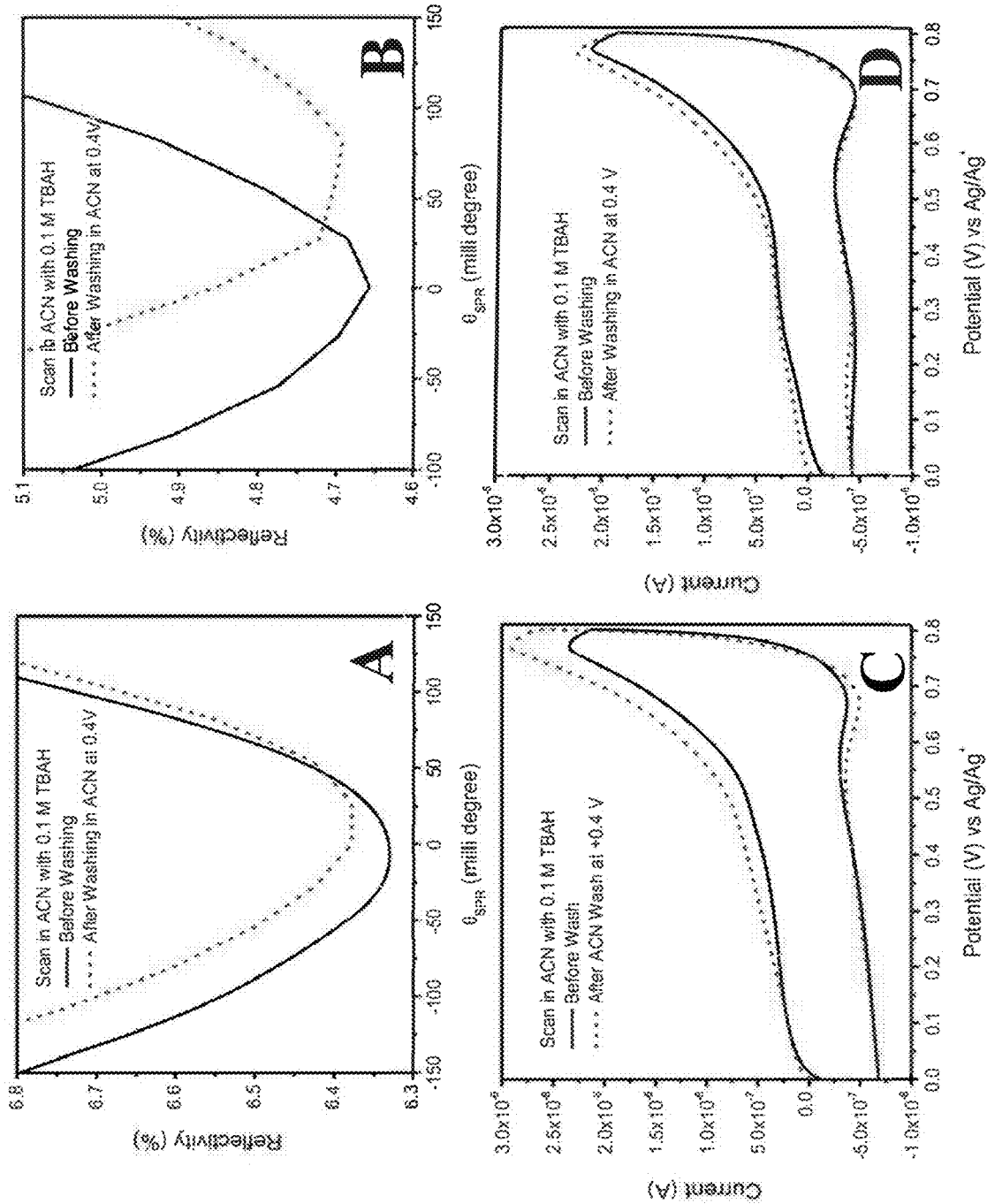
FIG. 2.13A-D

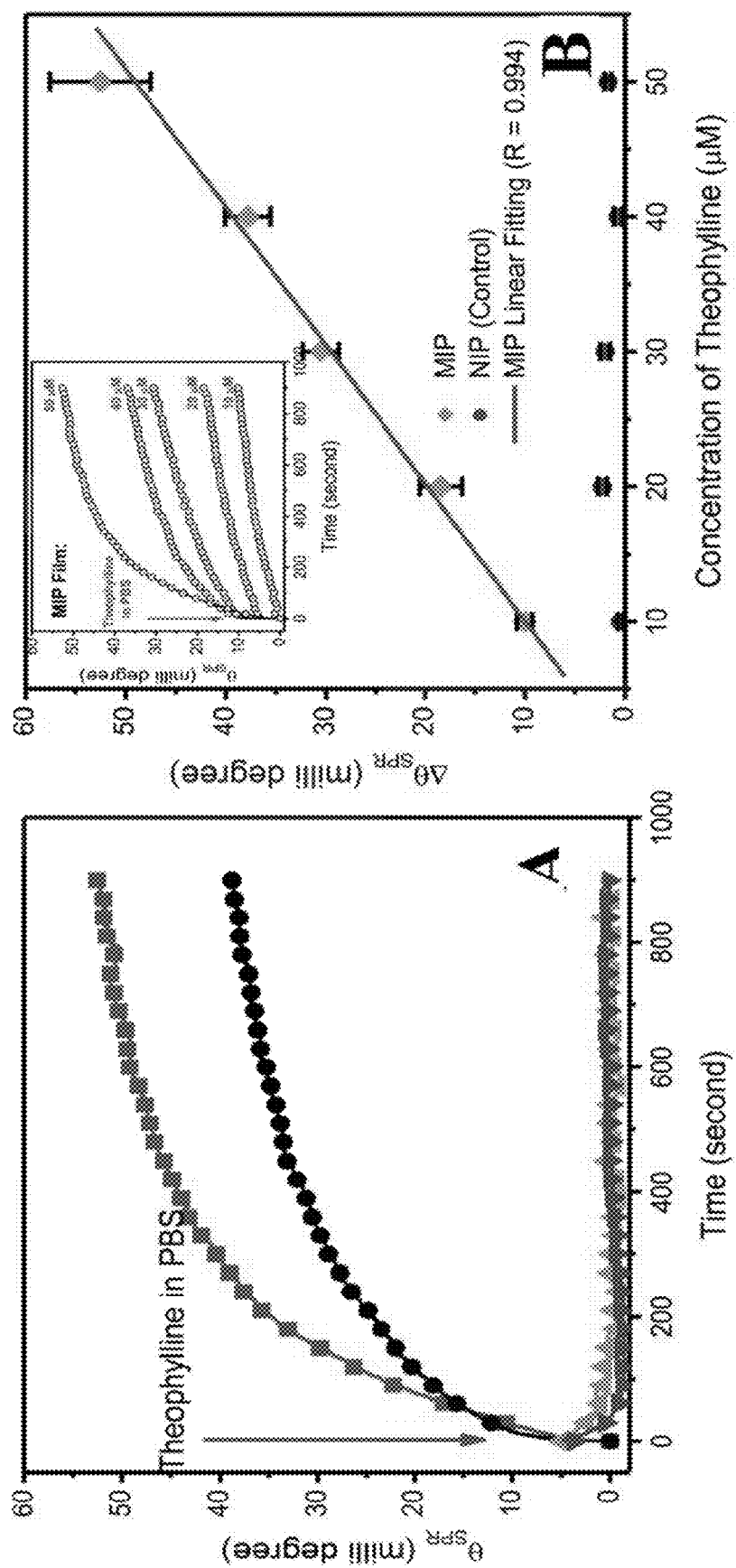
FIG. 2.14B
FIG. 2.14A

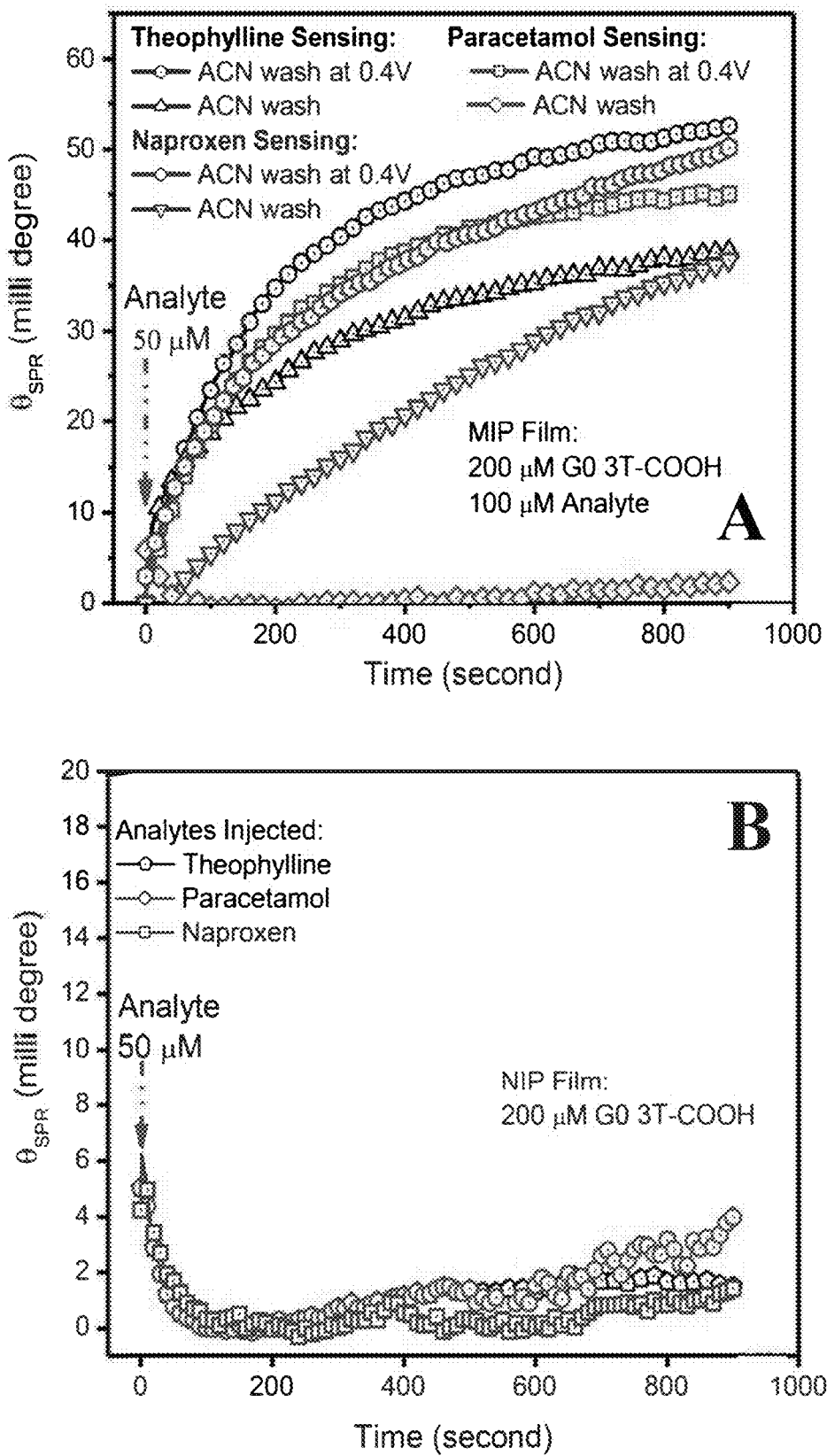
FIG. 2.15A&B

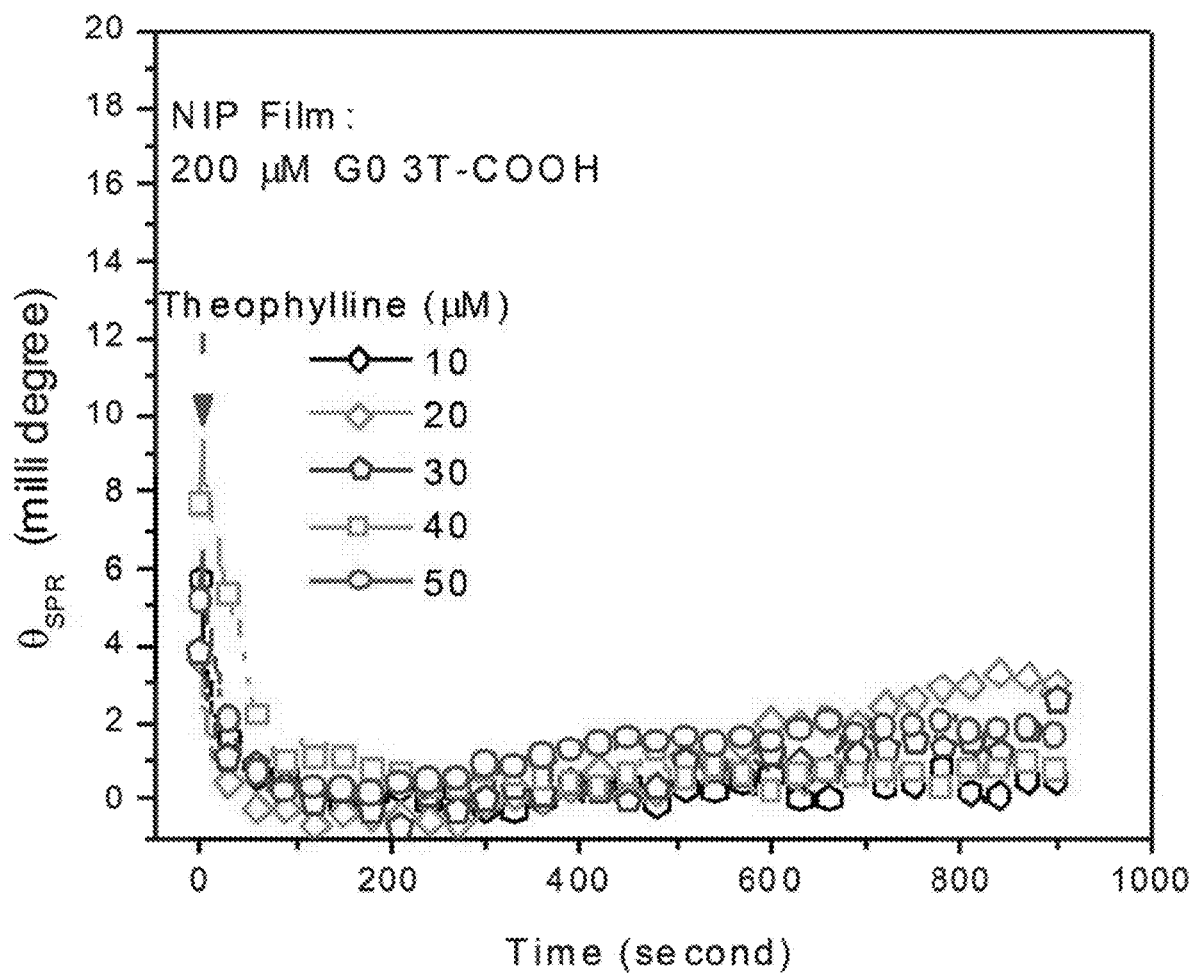
FIG. 2.16

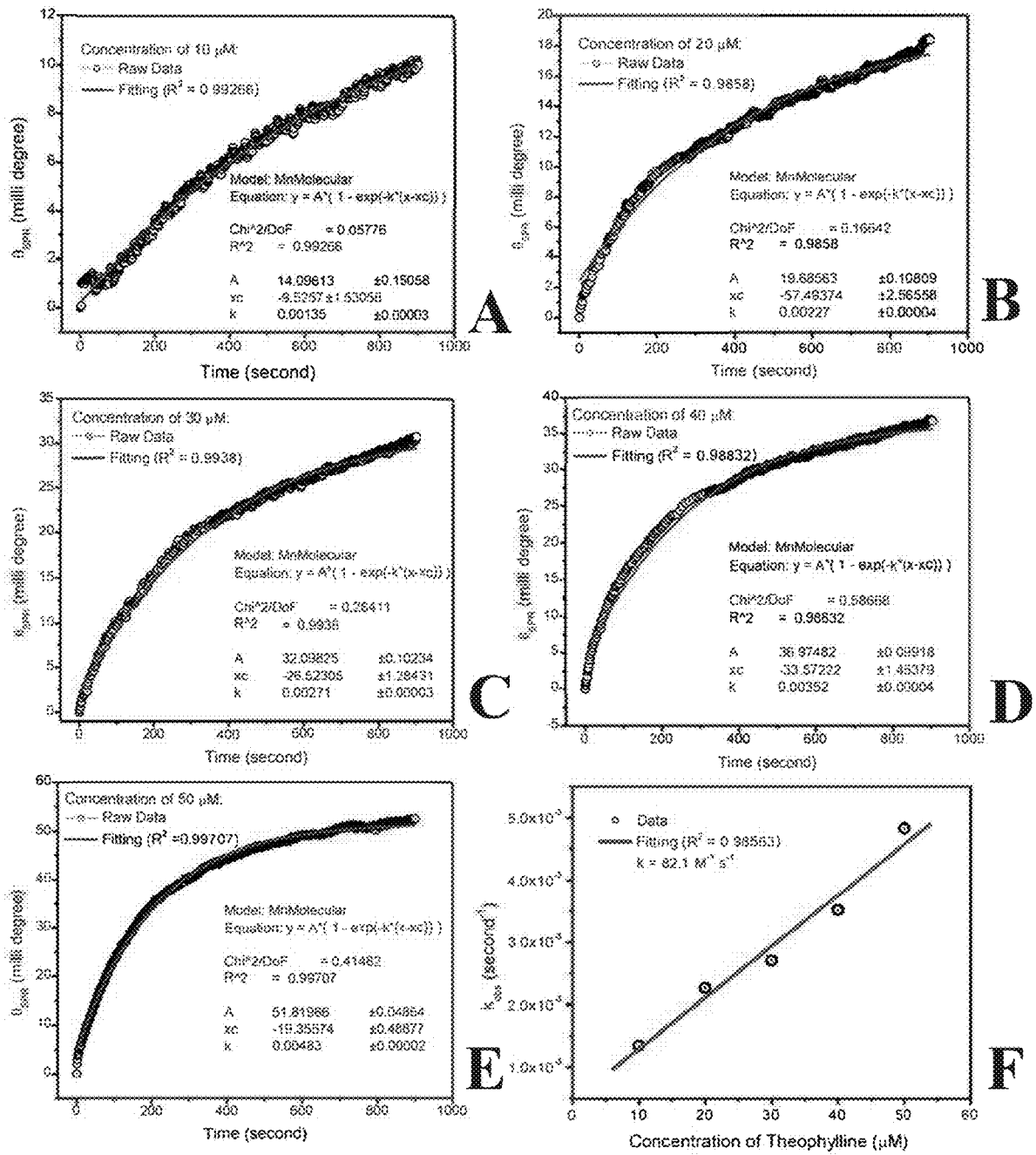
FIG. 2.17A-F

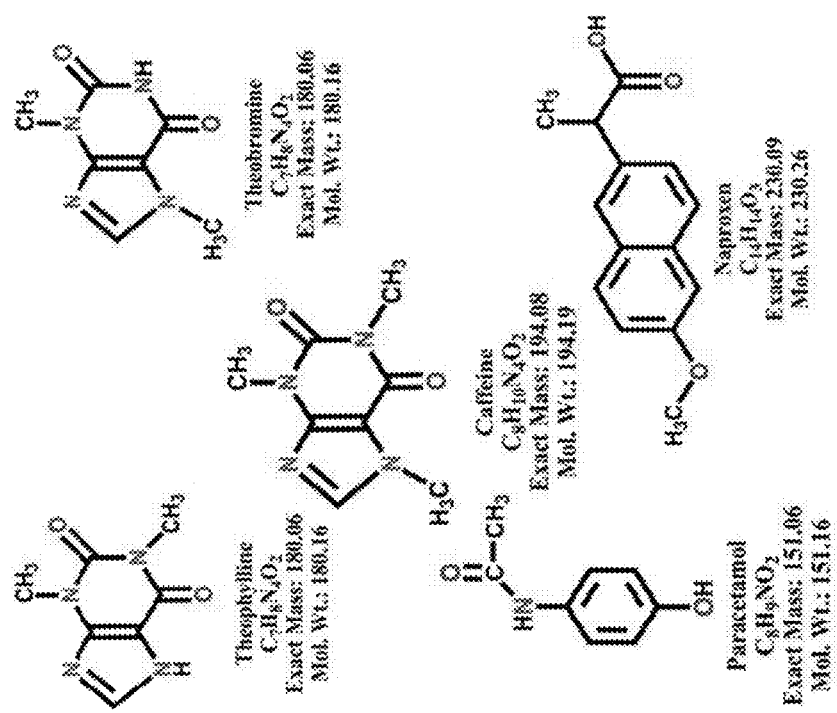
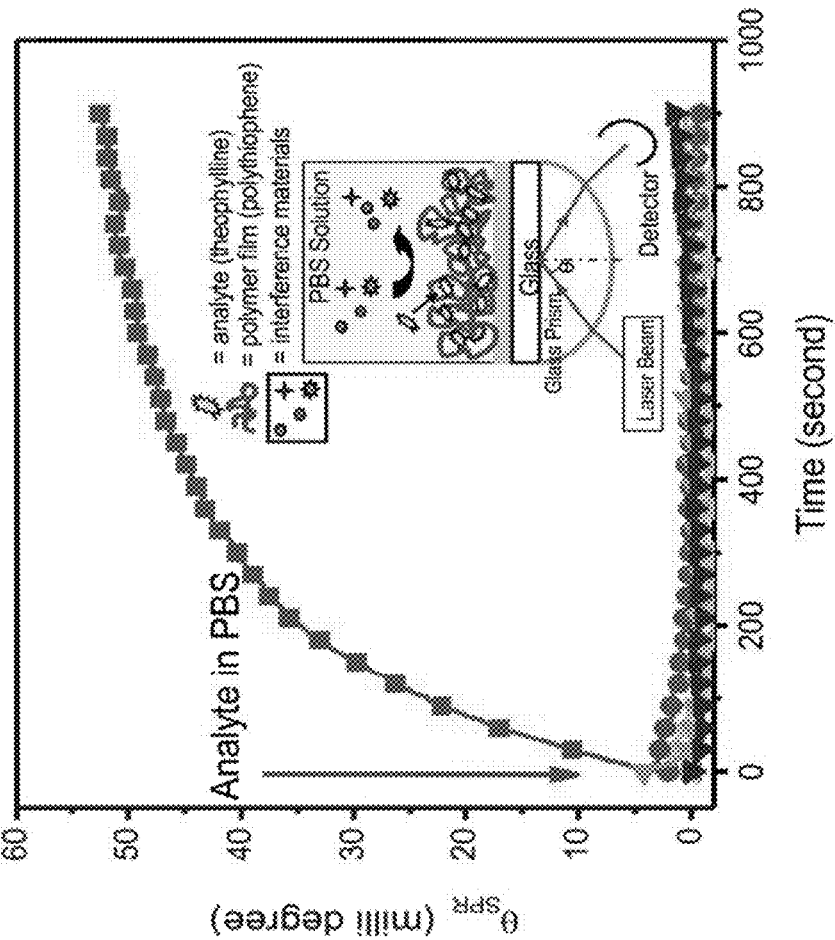
FIG. 2.18A&B

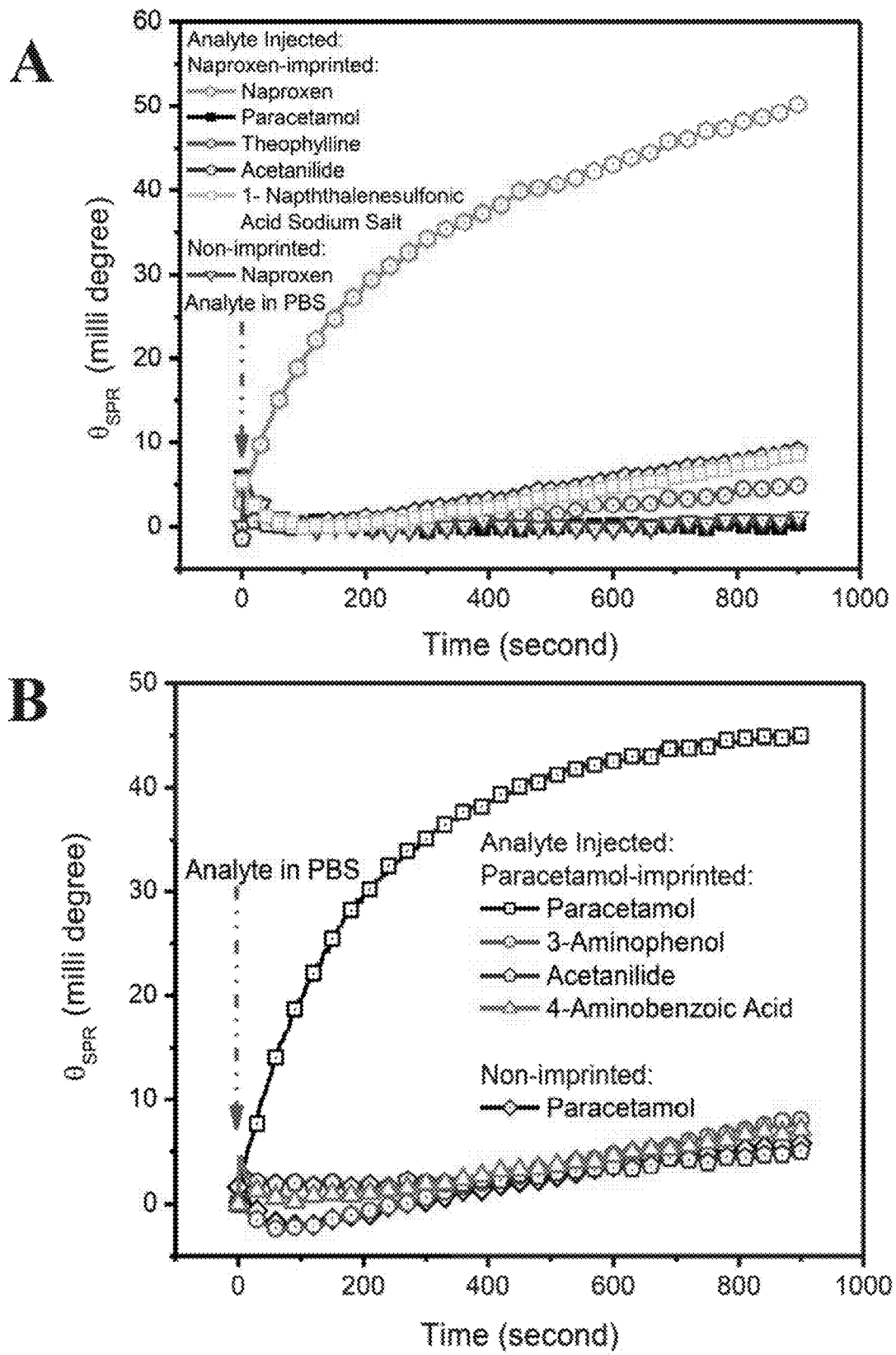
FIG. 2.19A&B

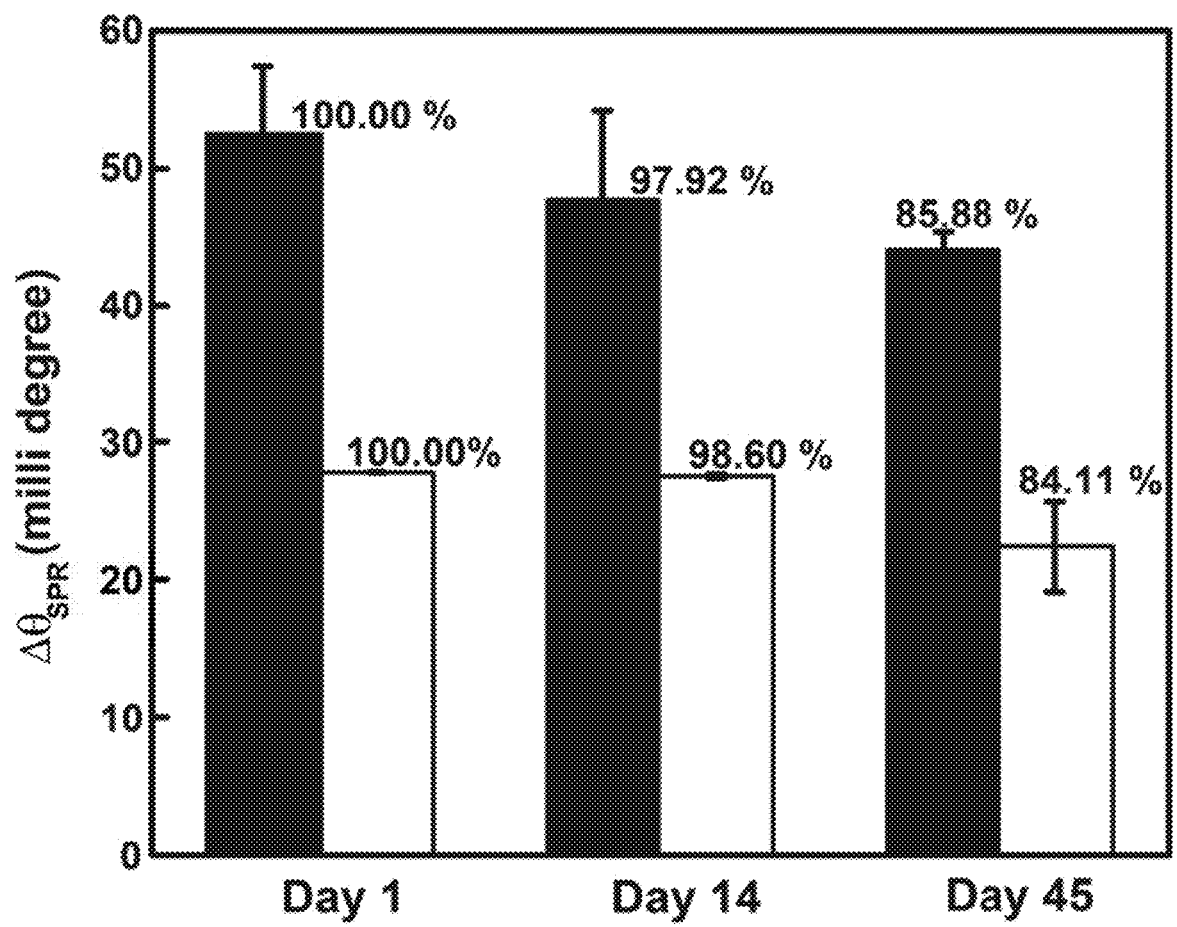
FIG. 2.20

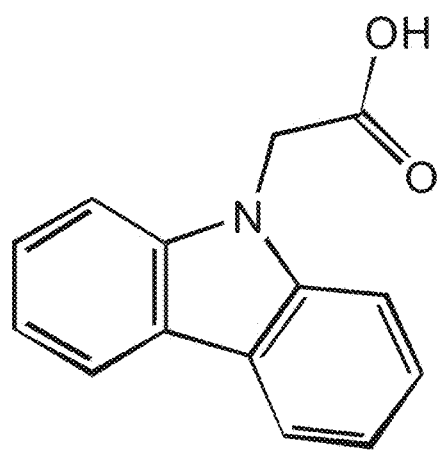
2-(9H-carbazol-9-yl)acetic acid
FIG. 3.1A
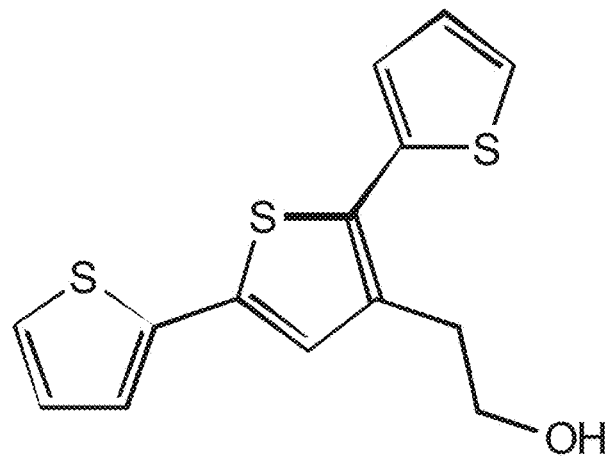
2-(2,5-di(thiophen-2-yl)thiophen-3-yl)ethanol
FIG. 3.1B
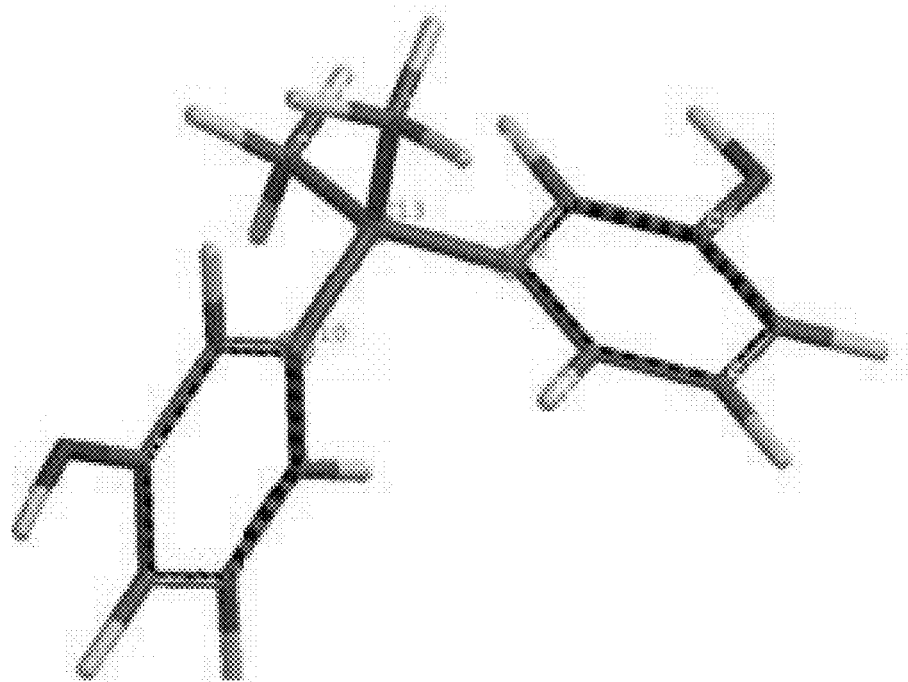
FIG. 3.1C

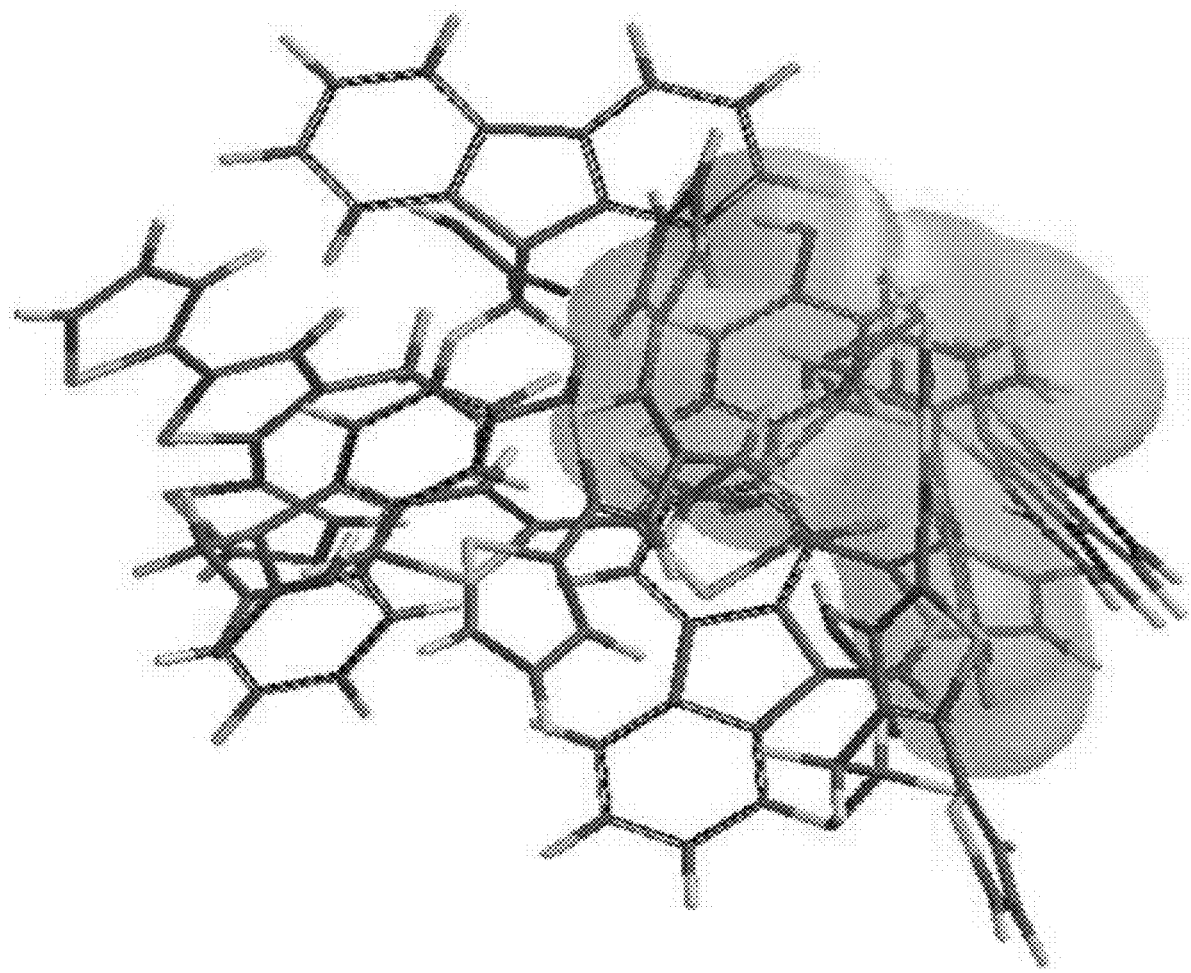
FIG. 3.2

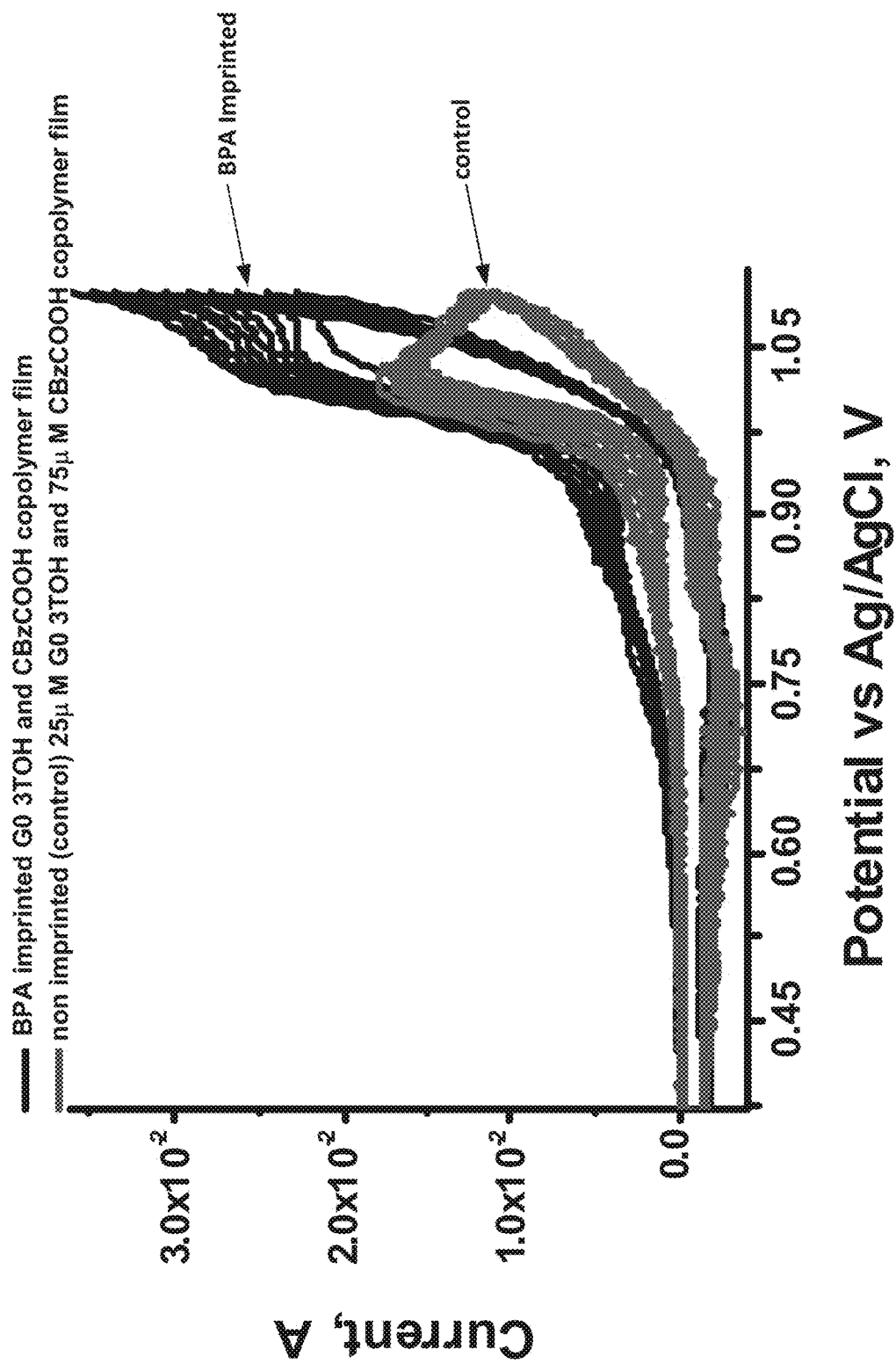
FIG. 3.3A

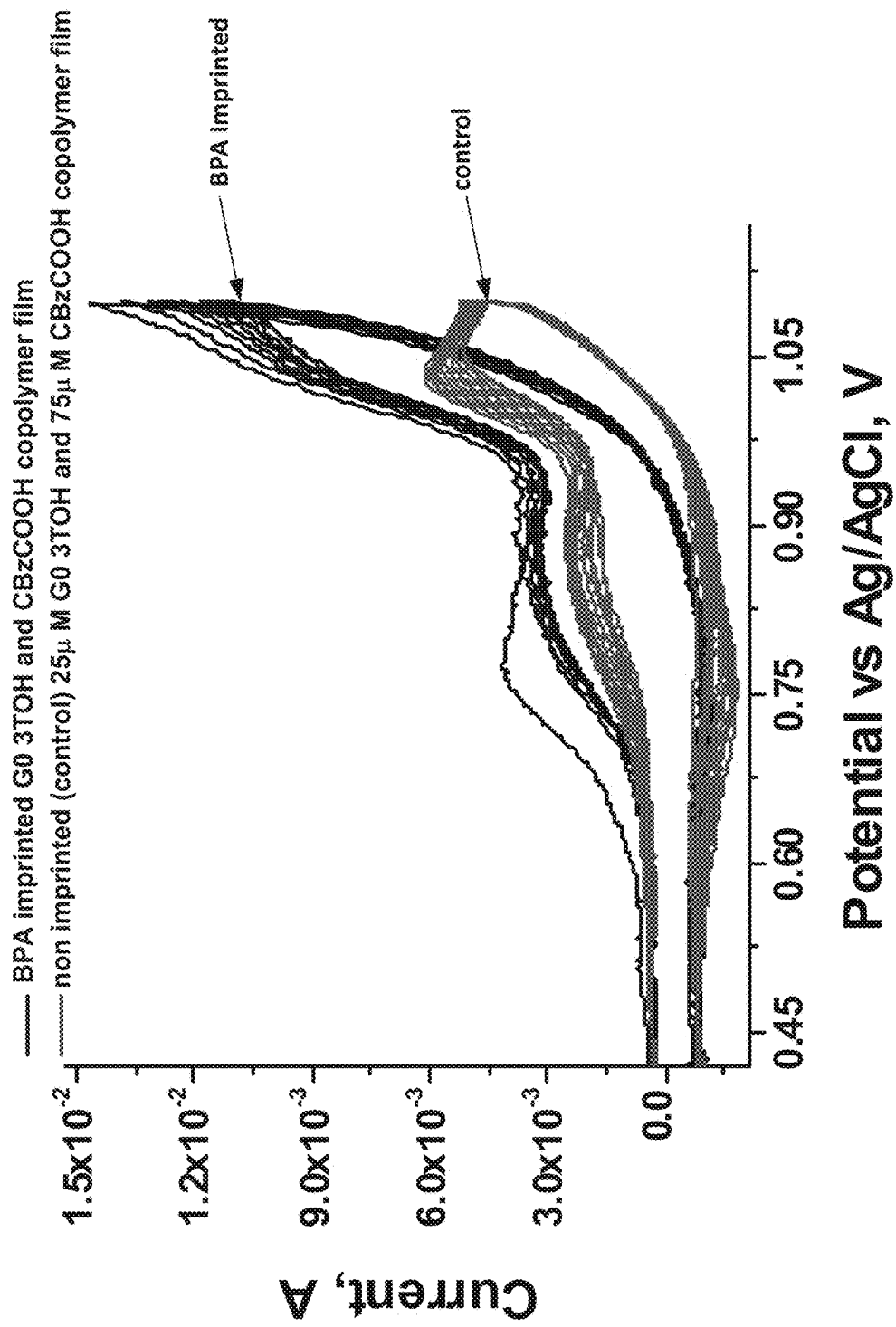
FIG. 3.3B

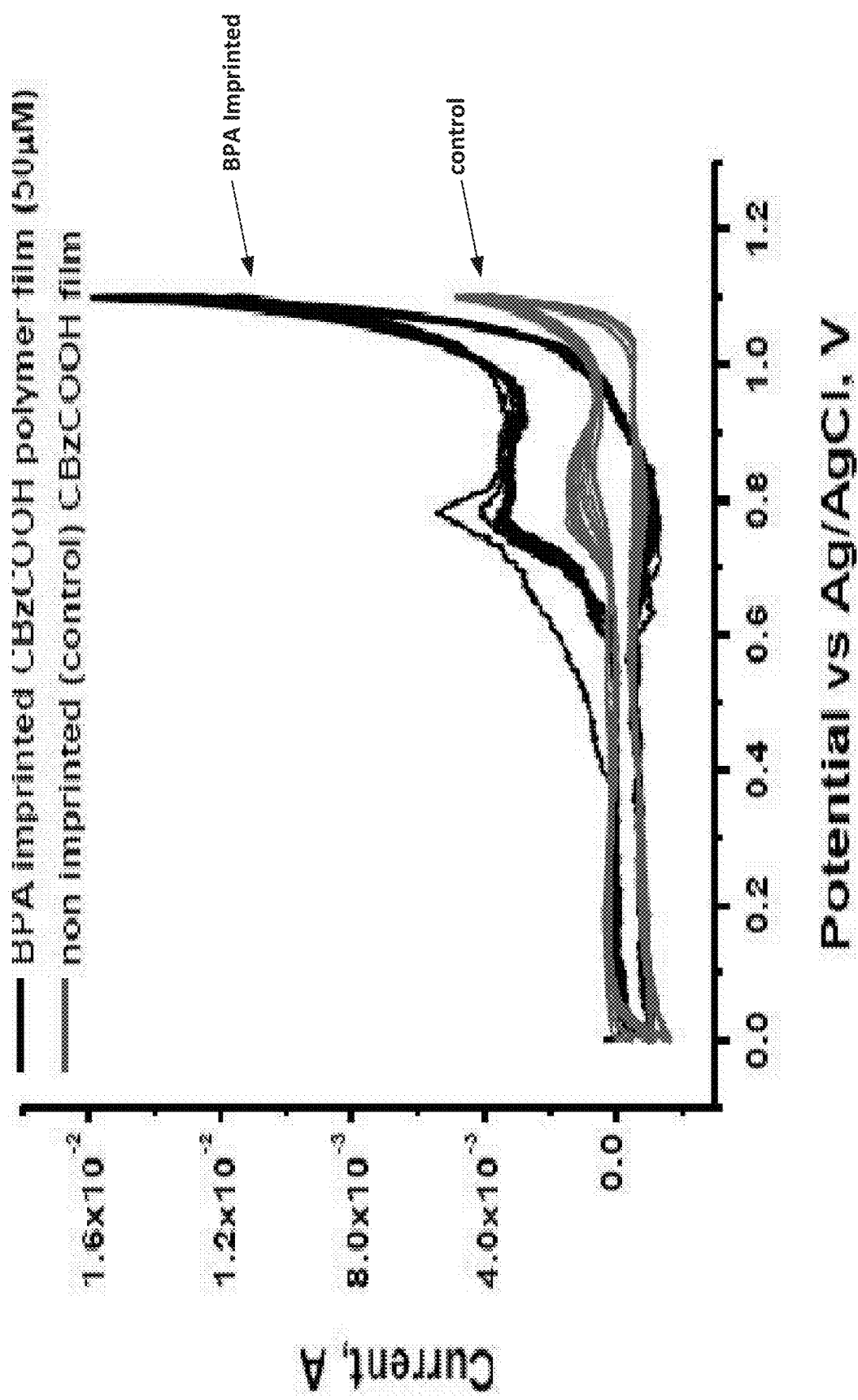
FIG. 3.4A

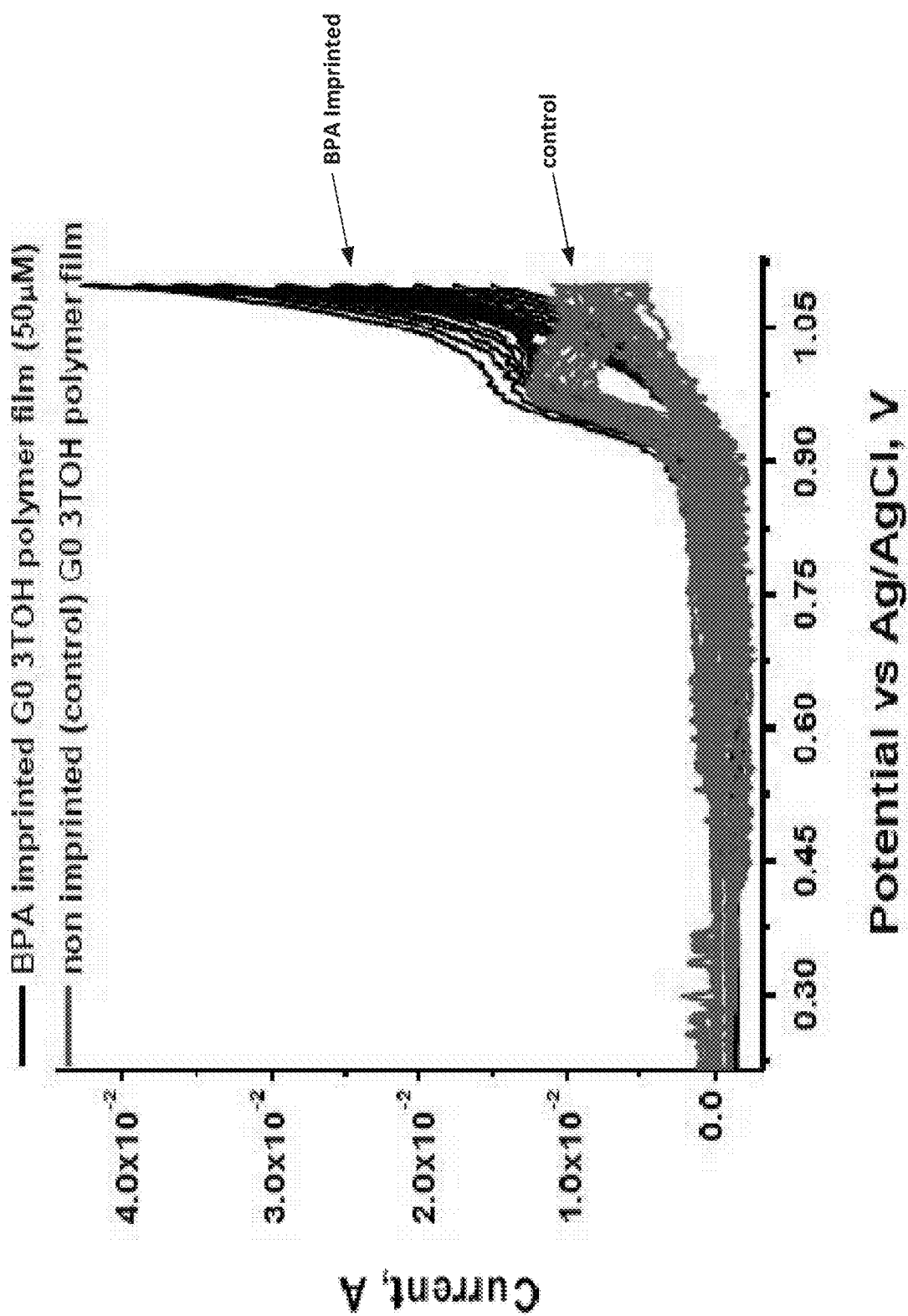
FIG. 3.4B

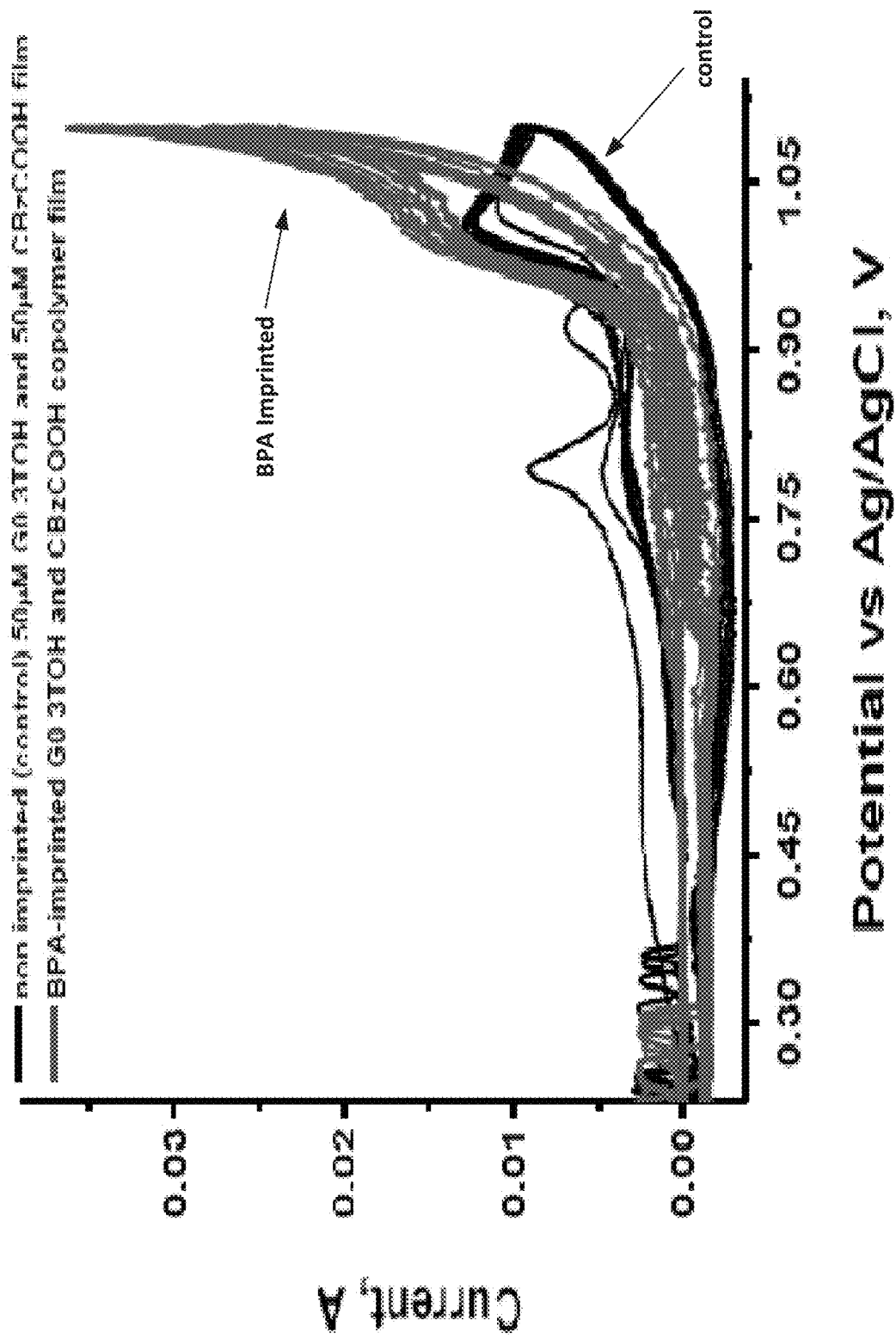
FIG. 3.4C

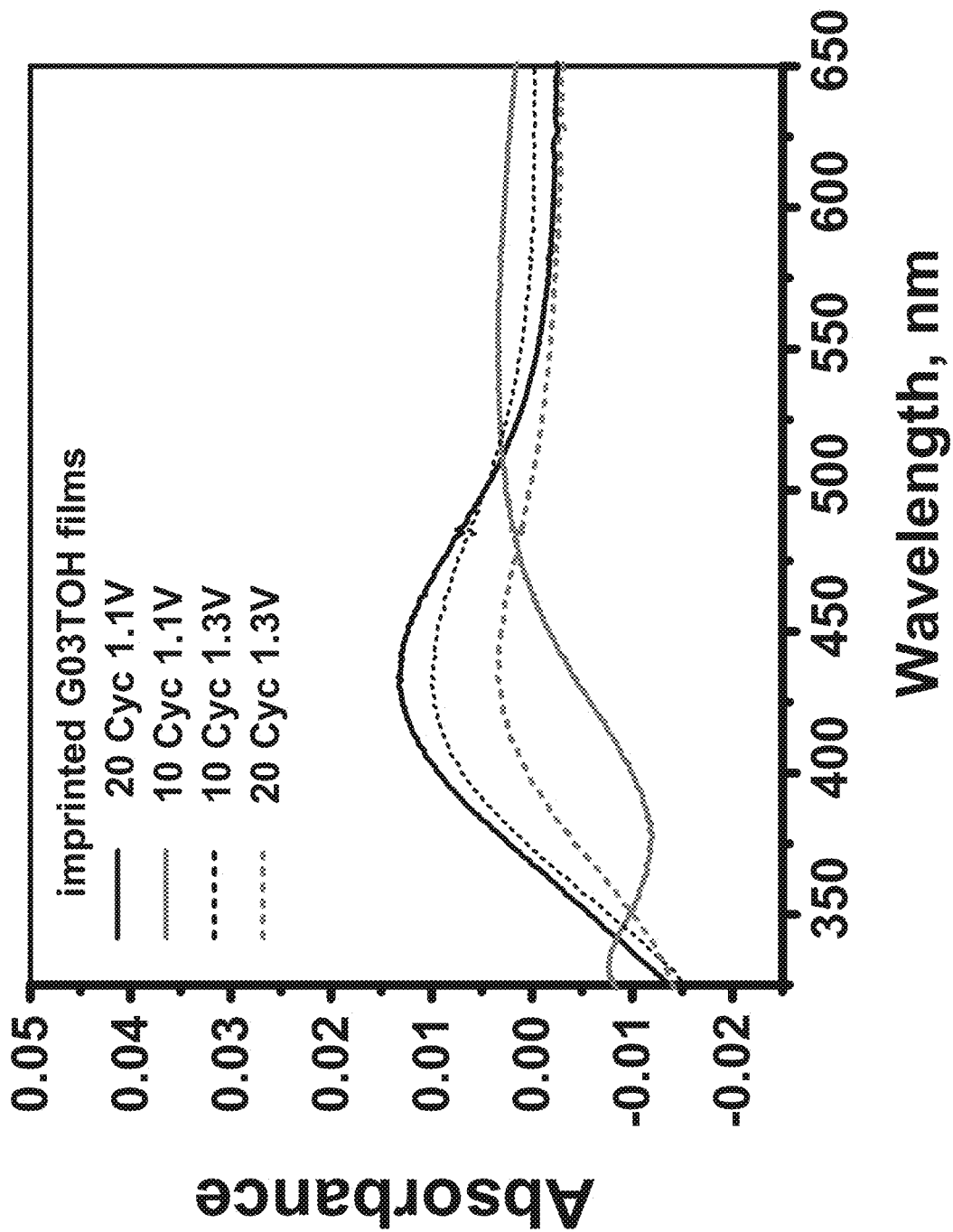
FIG. 3.5A

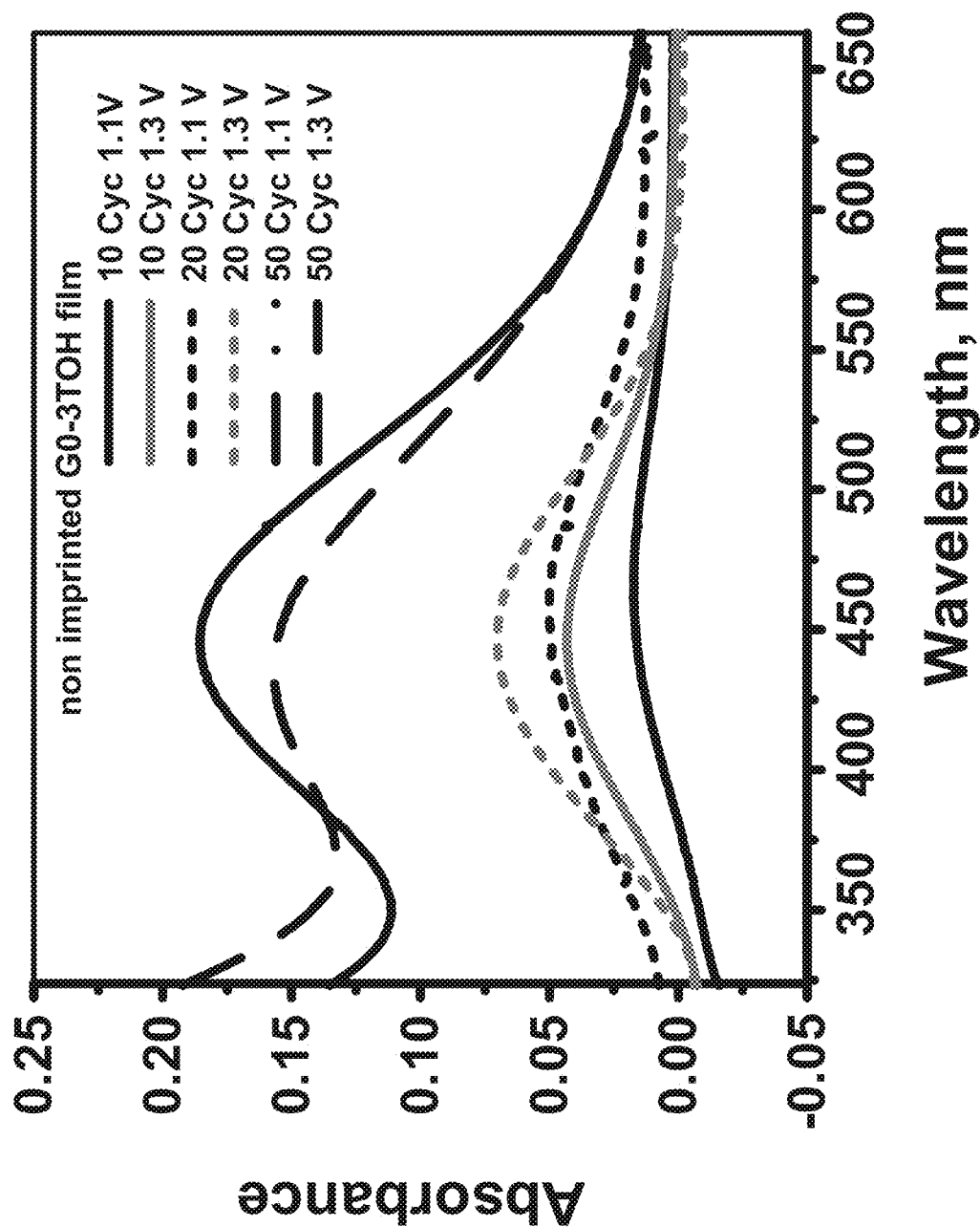
FIG. 3.5B

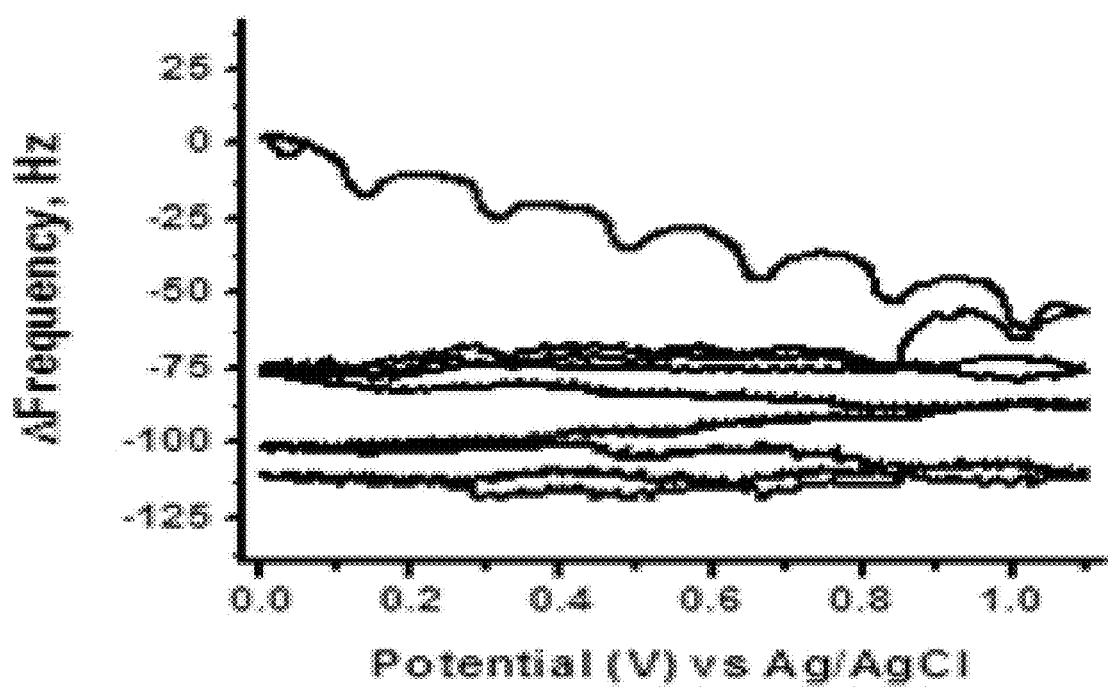
FIG. 3.6A
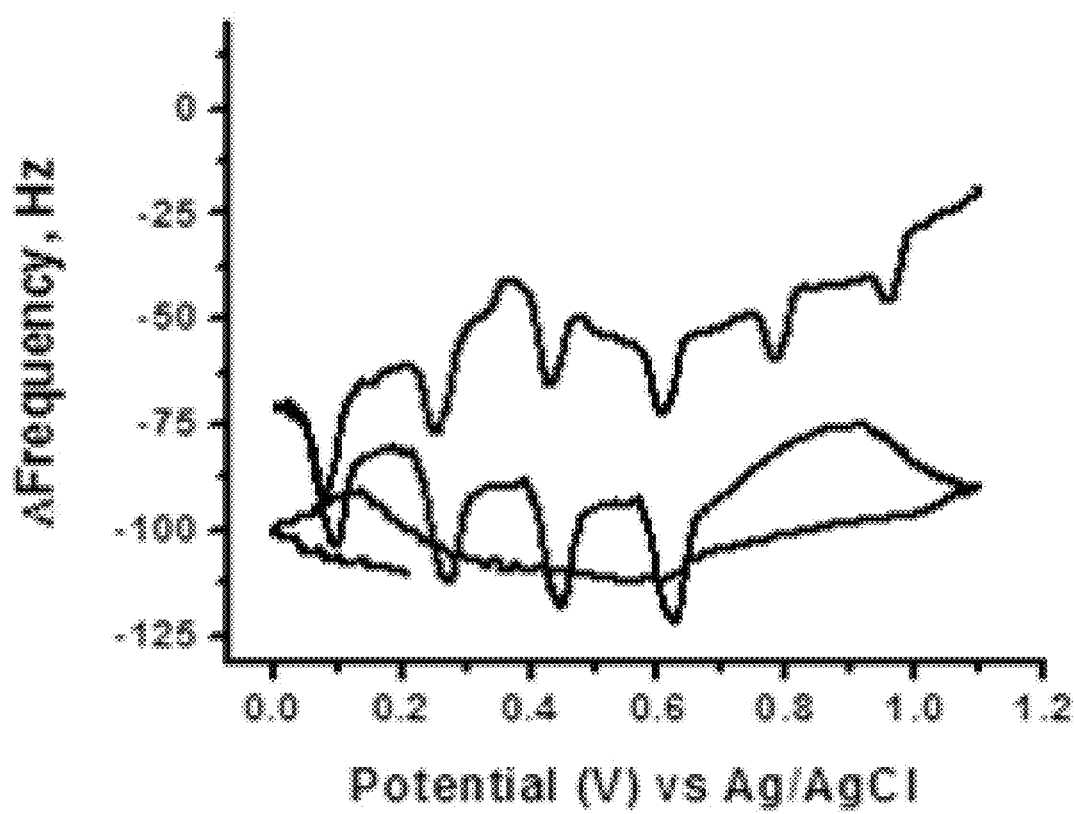
FIG. 3.6B

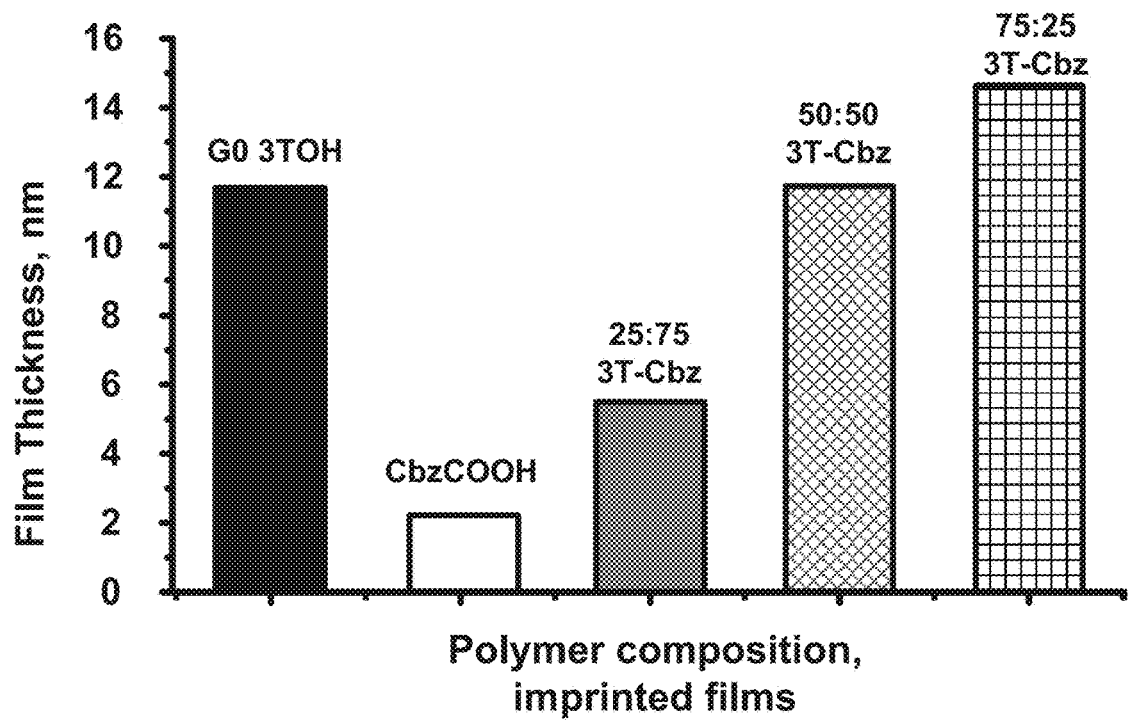
FIG. 3.7A
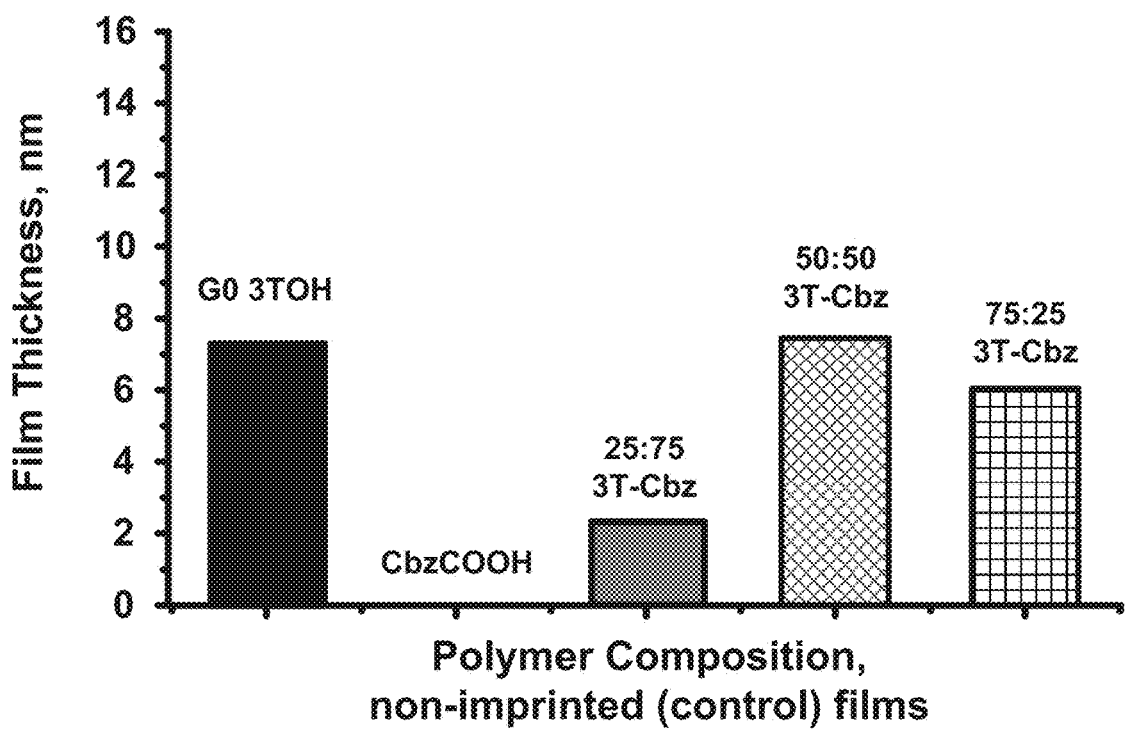
FIG. 3.7B

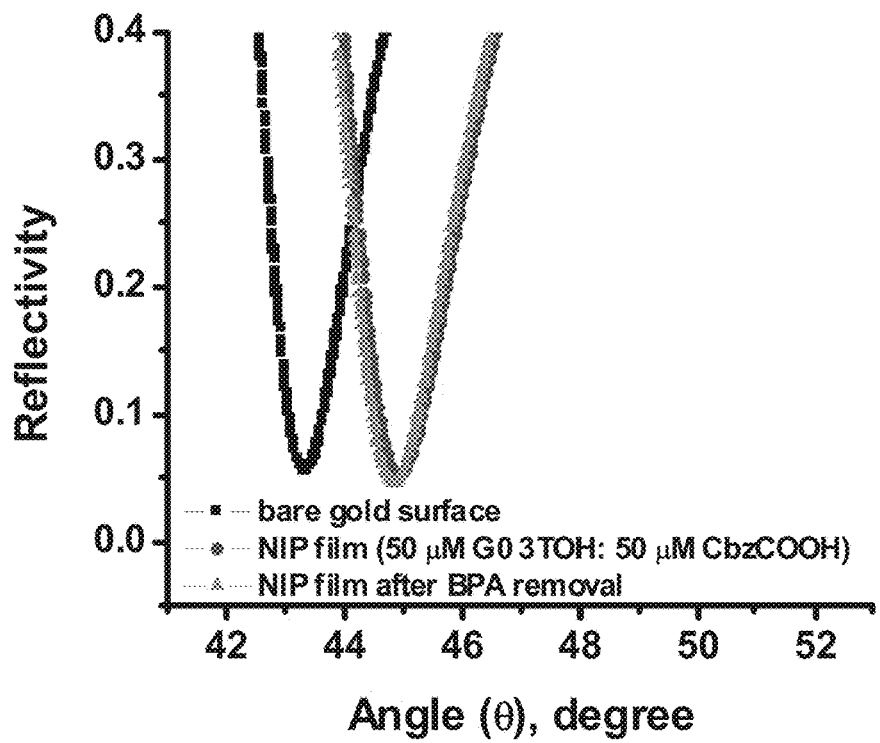
FIG. 3.8A
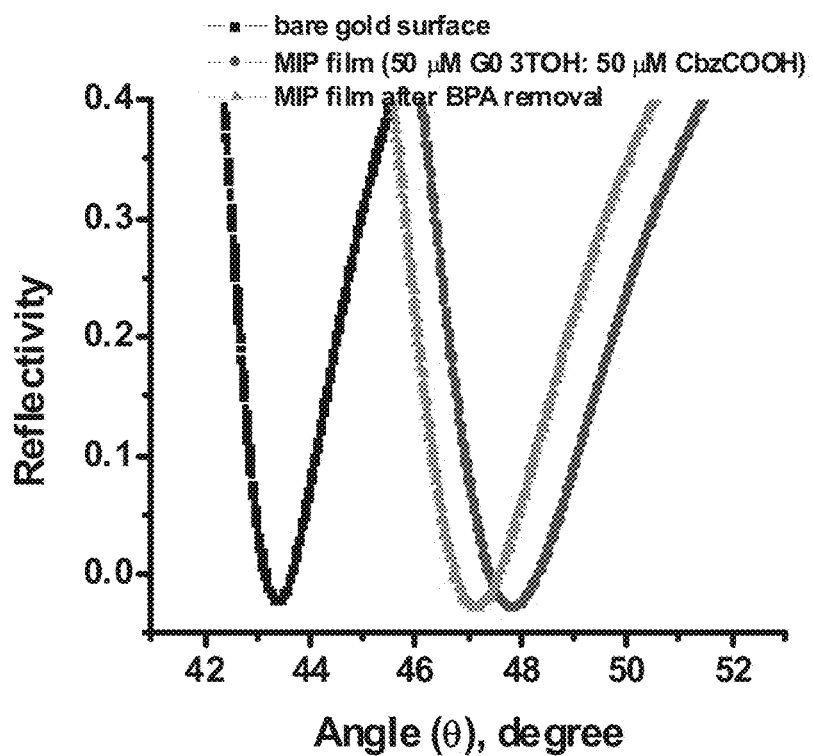
FIG. 3.8B

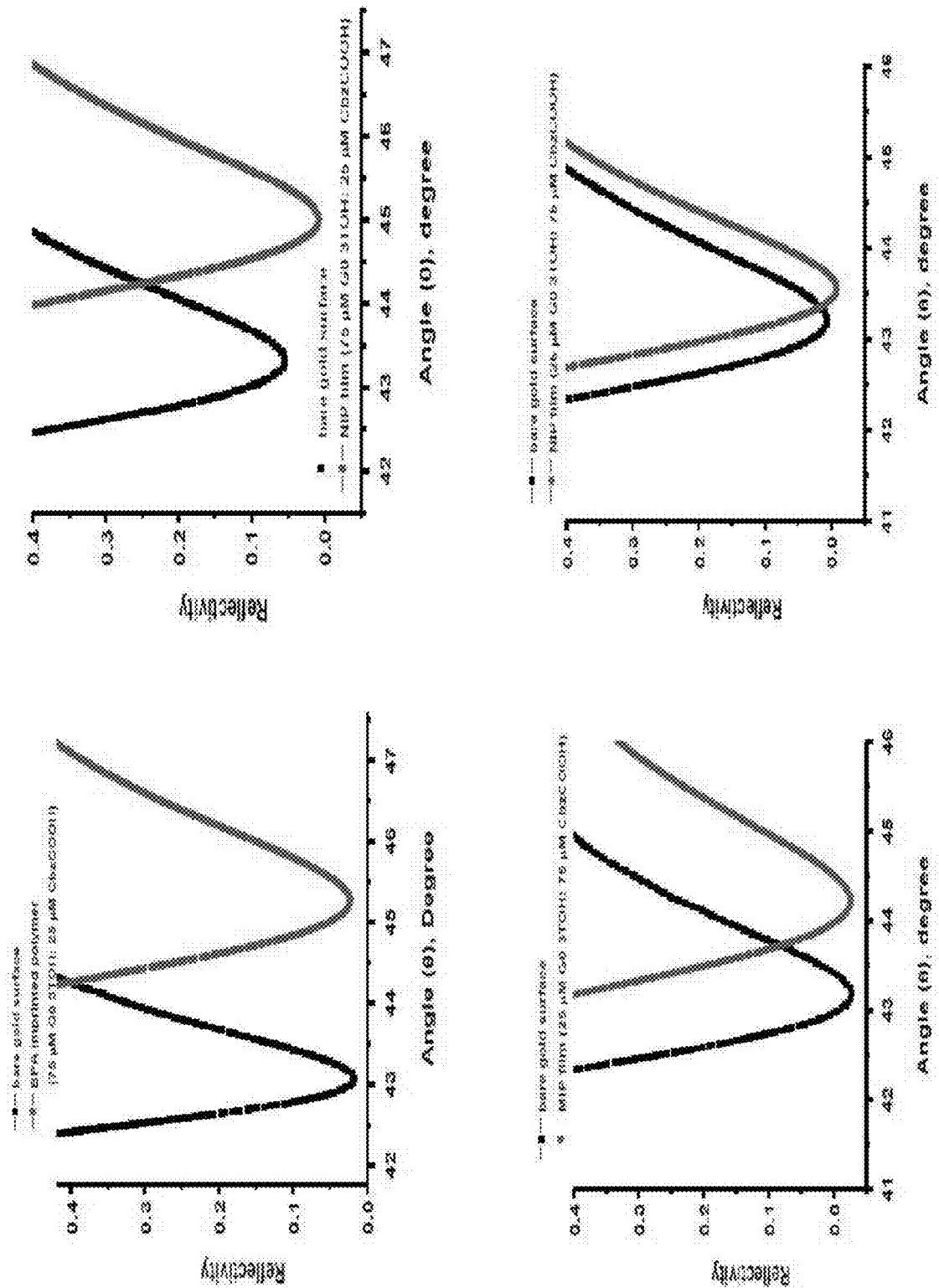
FIG. 3.9

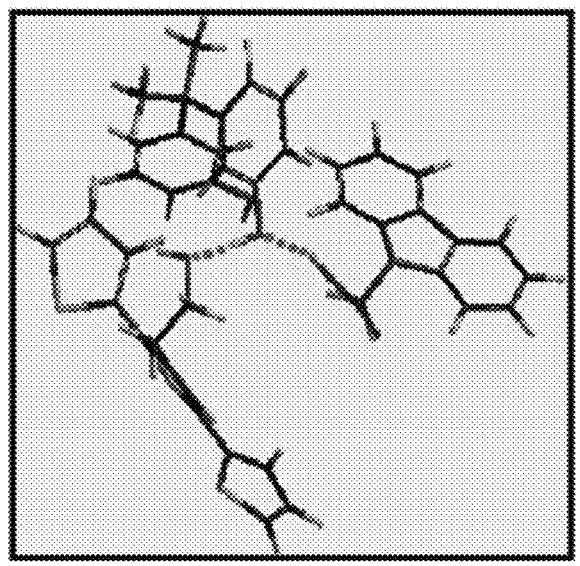 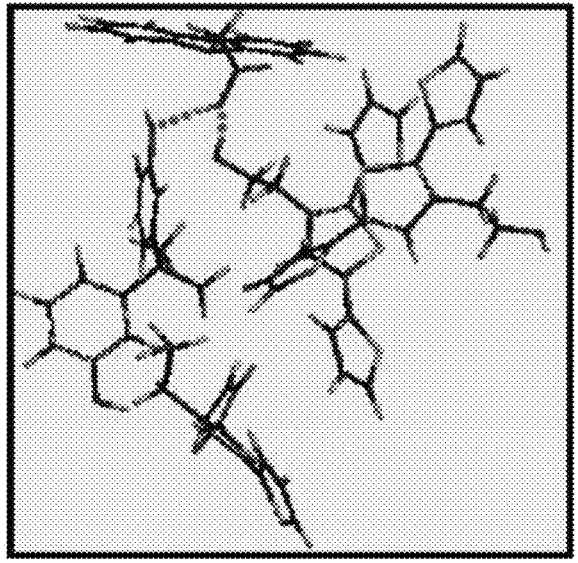
FIG. 3.10A  FIG. 3.10B
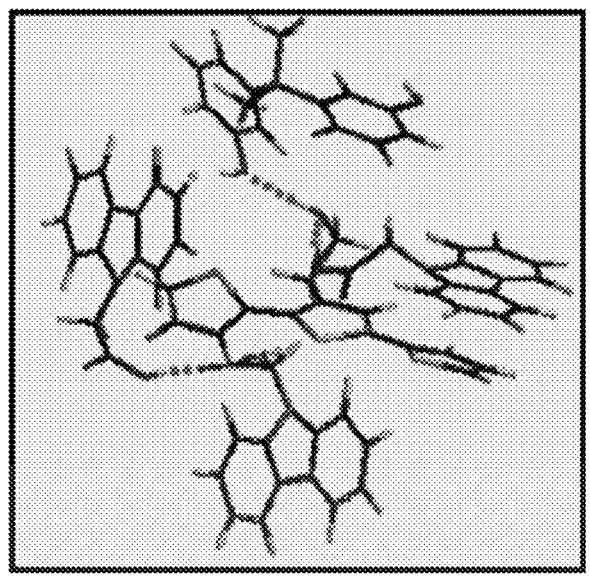
FIG. 3.10C

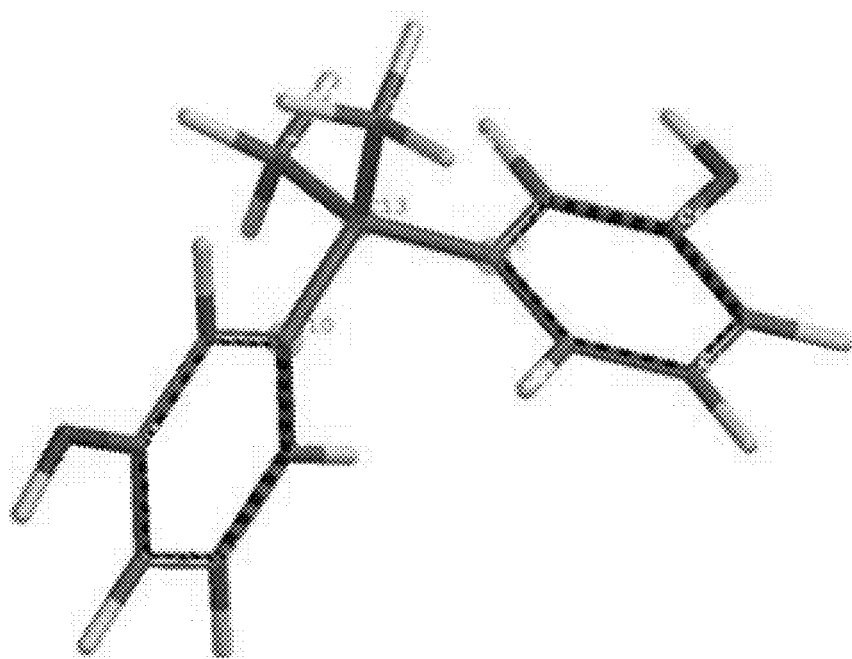
FIG. 3.11A
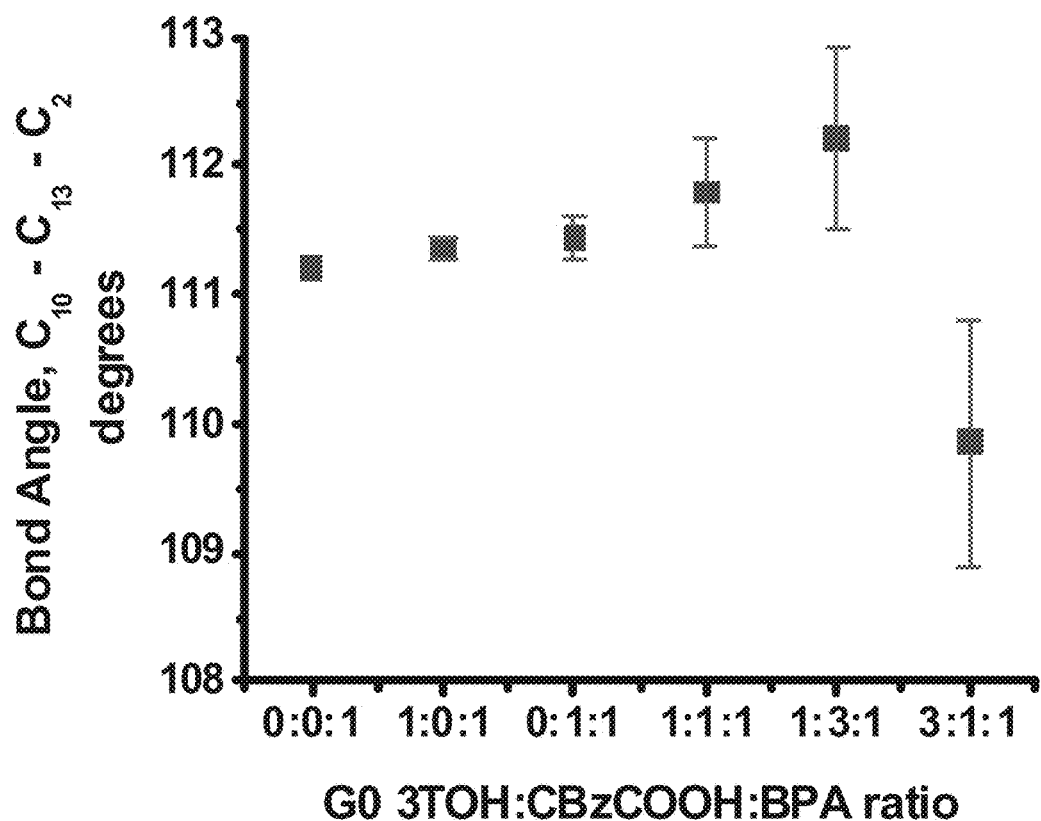
FIG. 3.11B

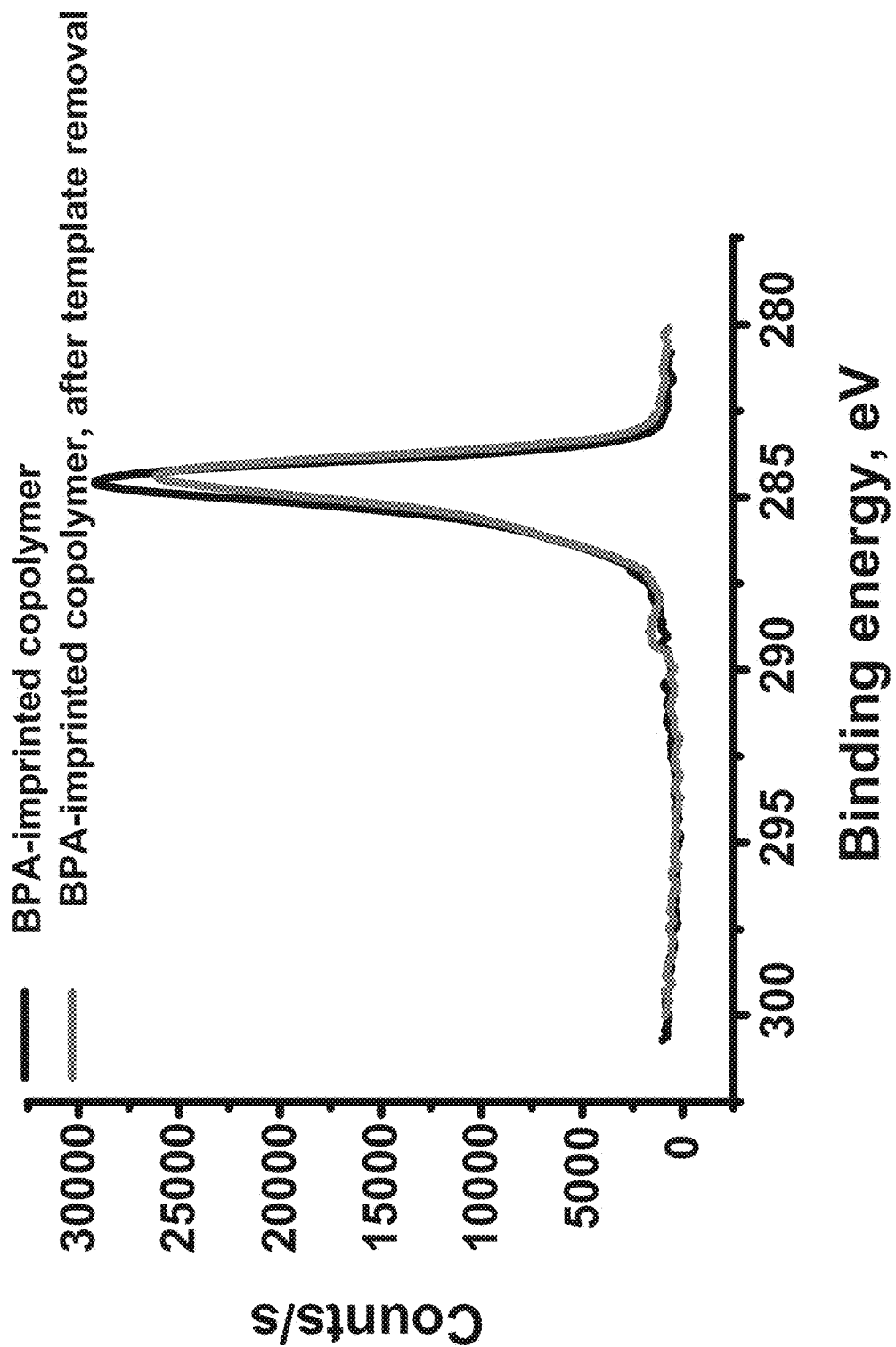
FIG. 3.12

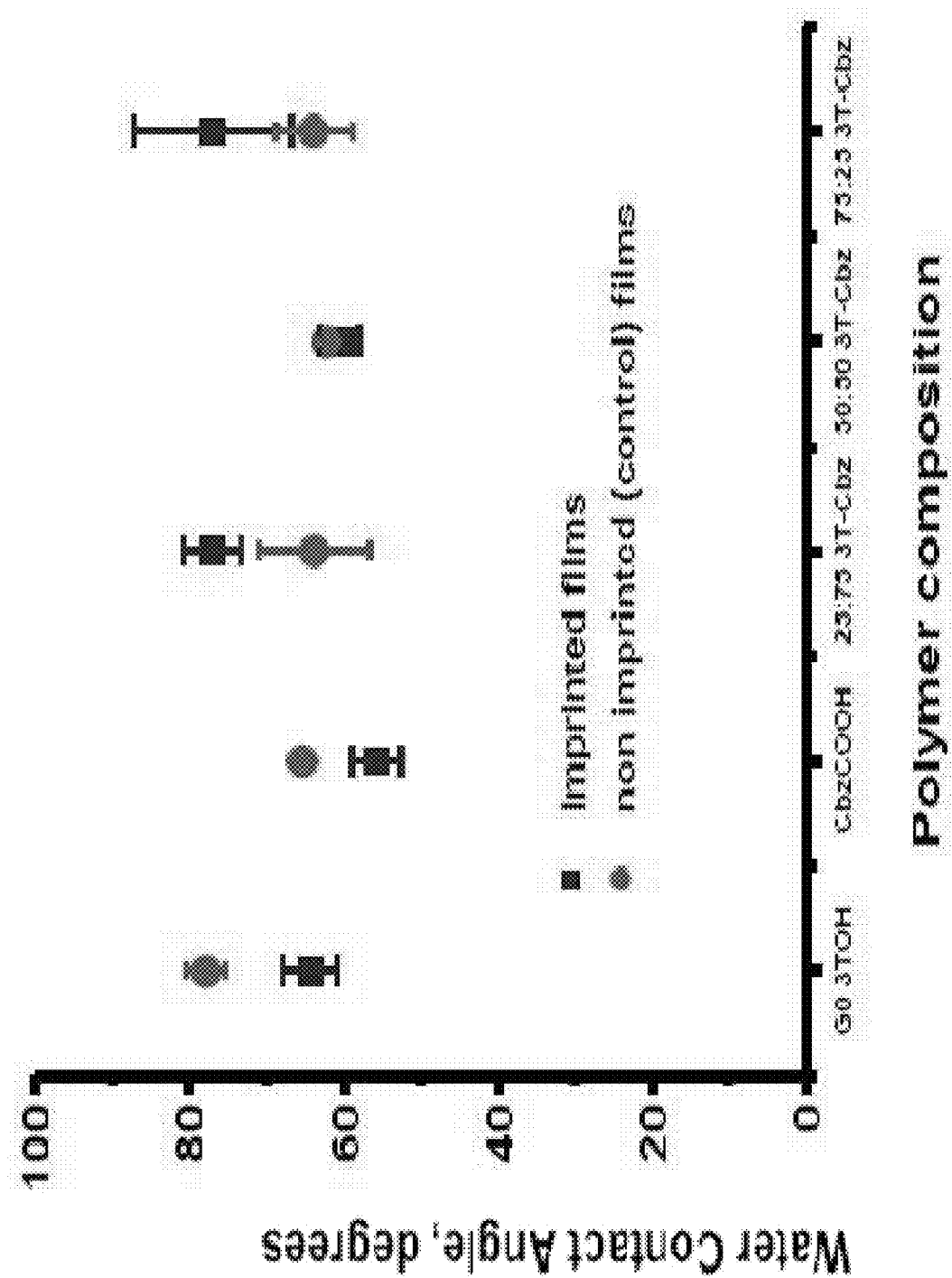
FIG. 3.13

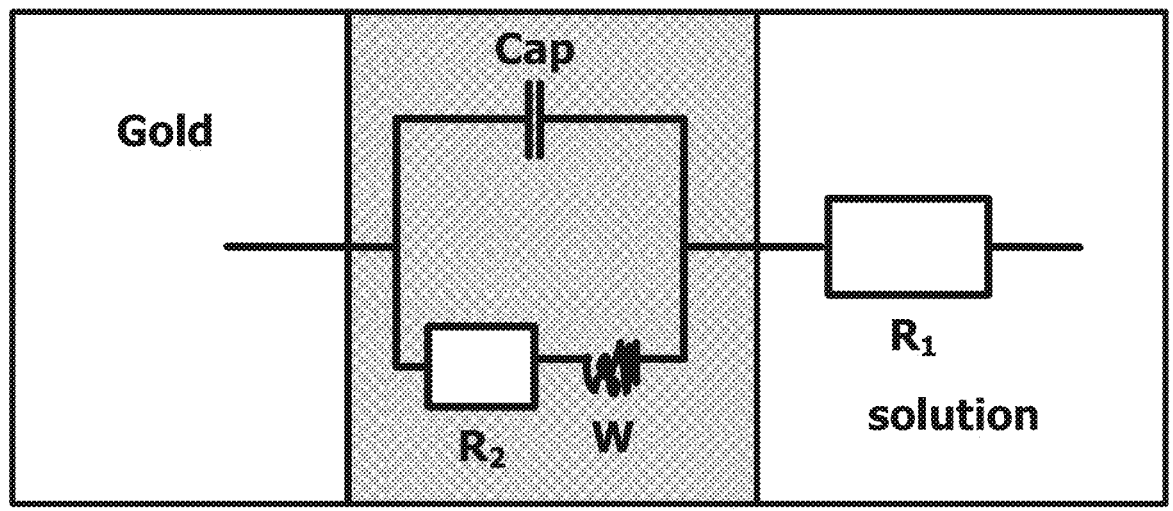
where,
   cap = capacitance
   $R_1$ = solution resistance
   $R_2$ = charge transfer resistance
   W = Warburg impedance
FIG. 3.14

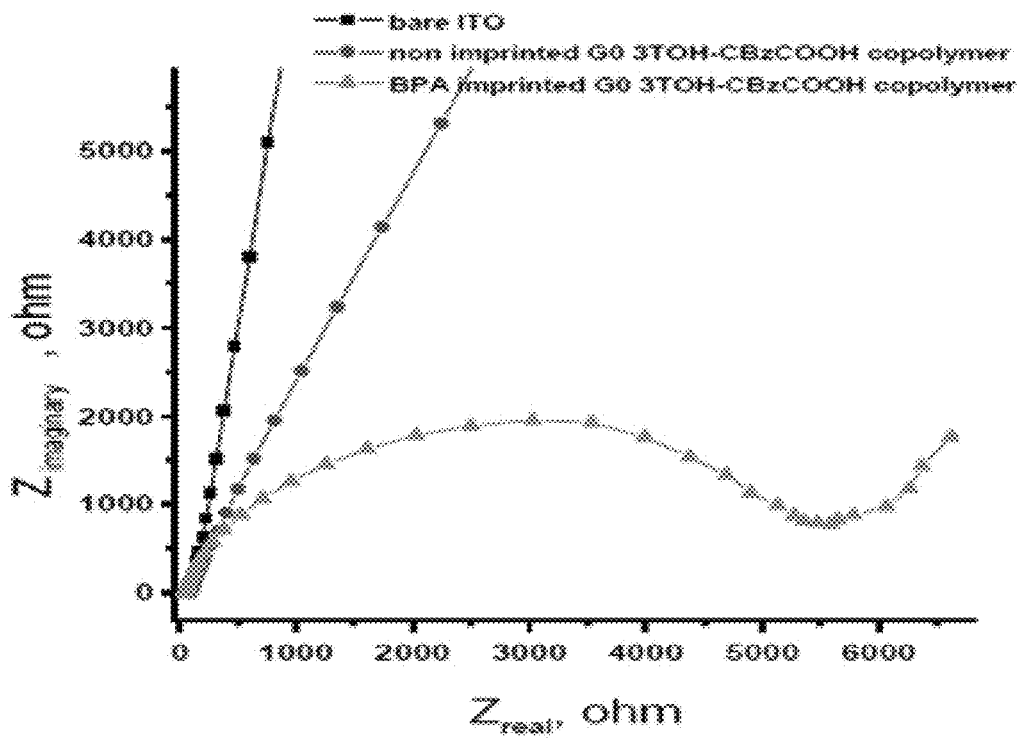
FIG. 3.15A
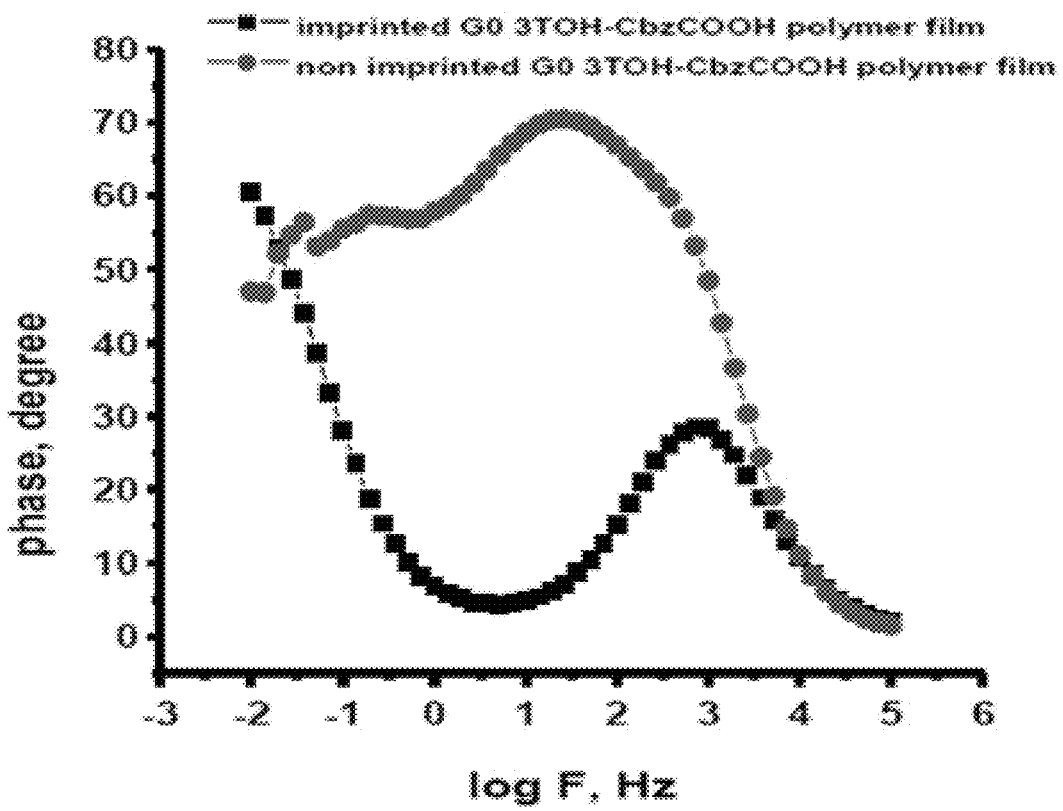
FIG. 3.15B

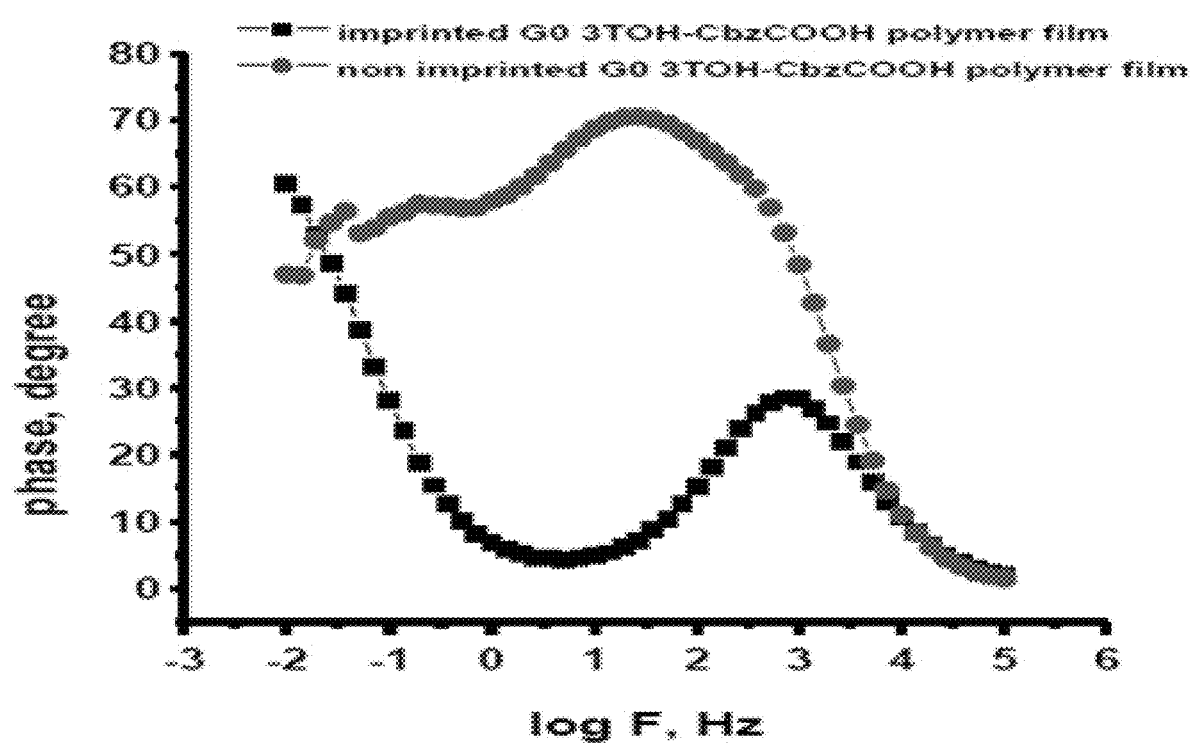
FIG. 3.15C

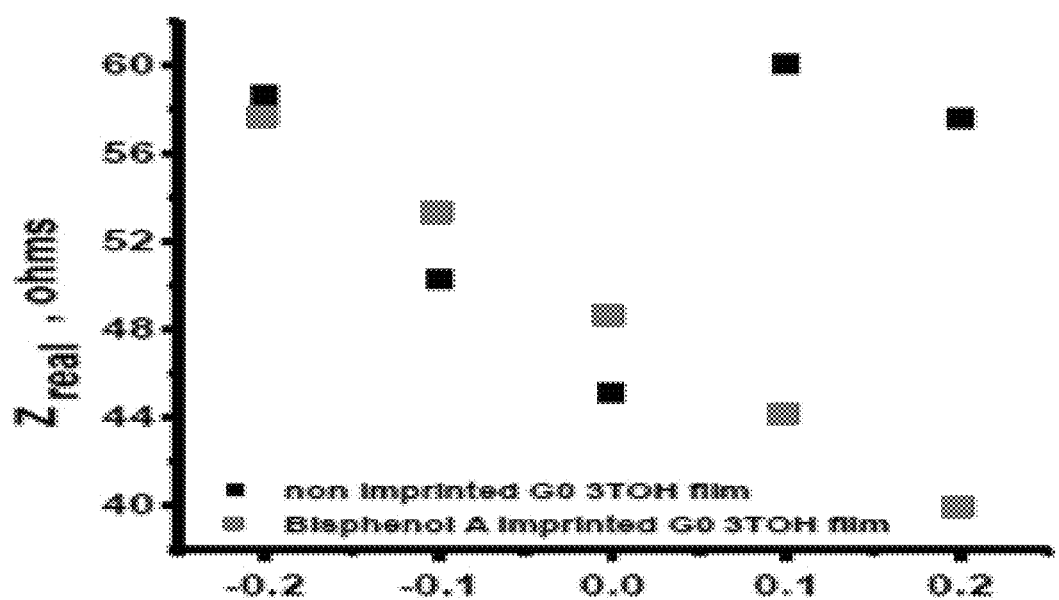
FIG. 3.16A
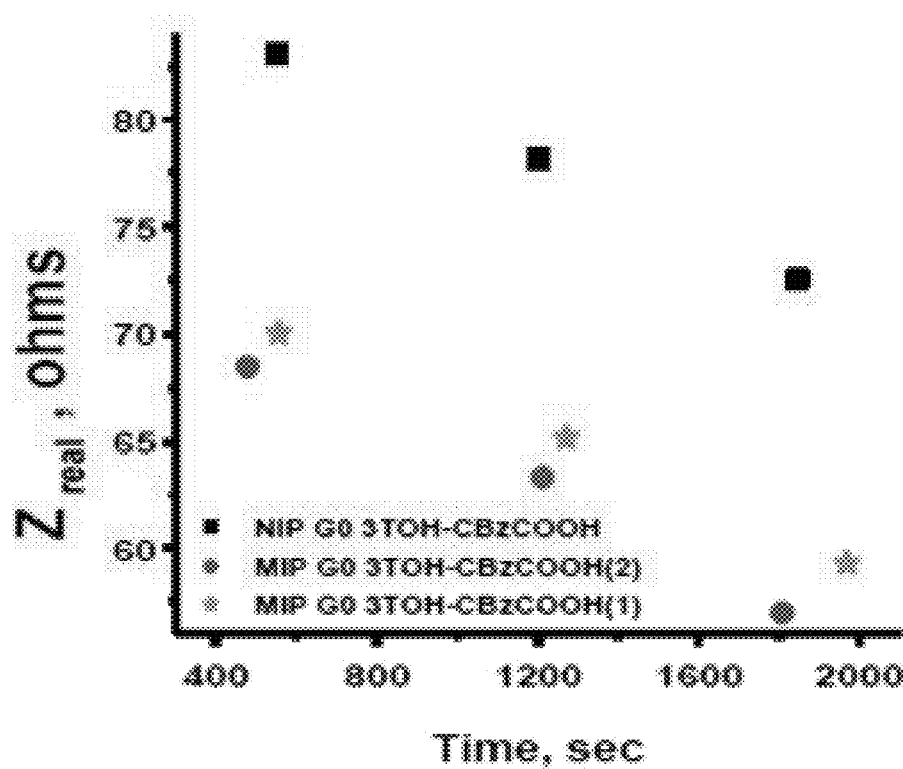
FIG. 3.16B

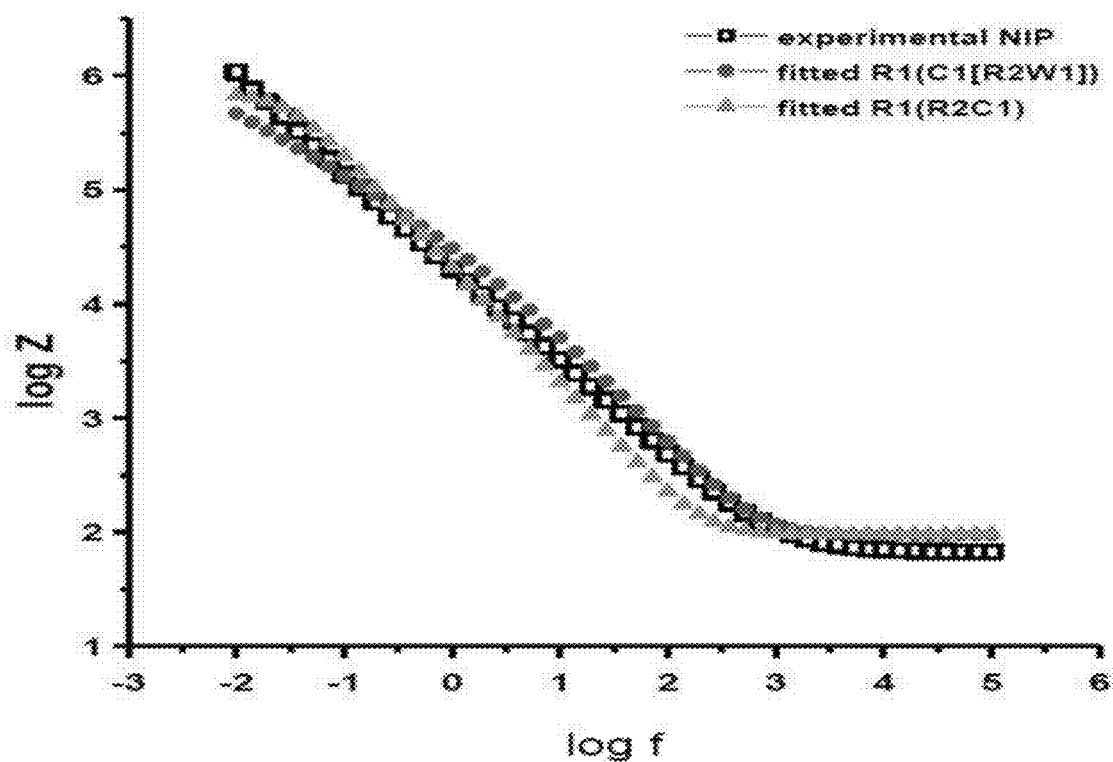
FIG. 3.17A
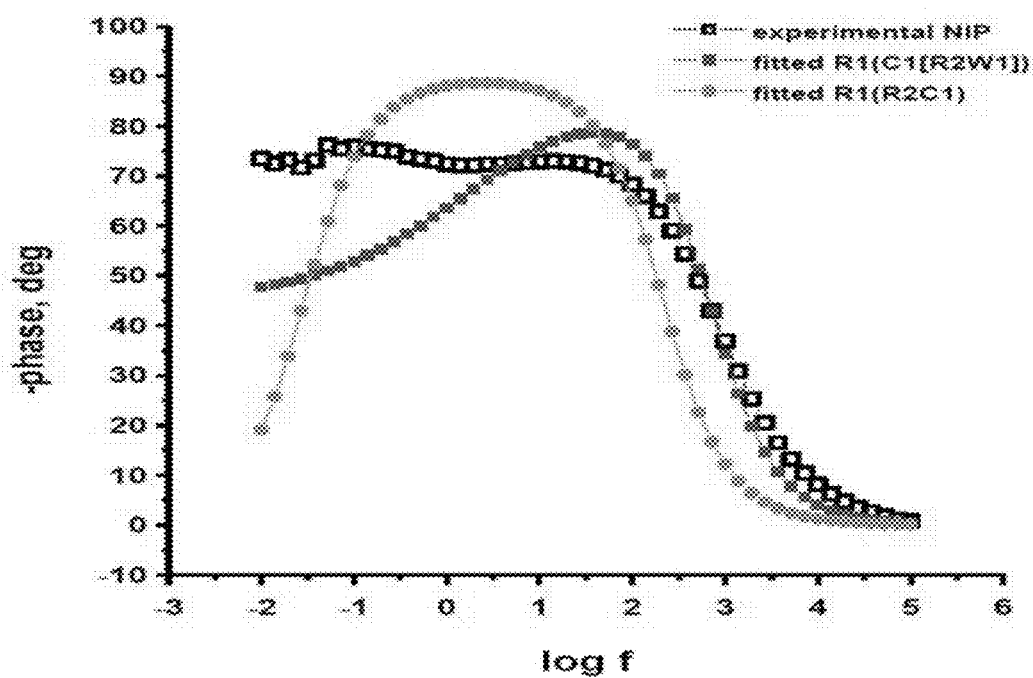
FIG. 3.17B

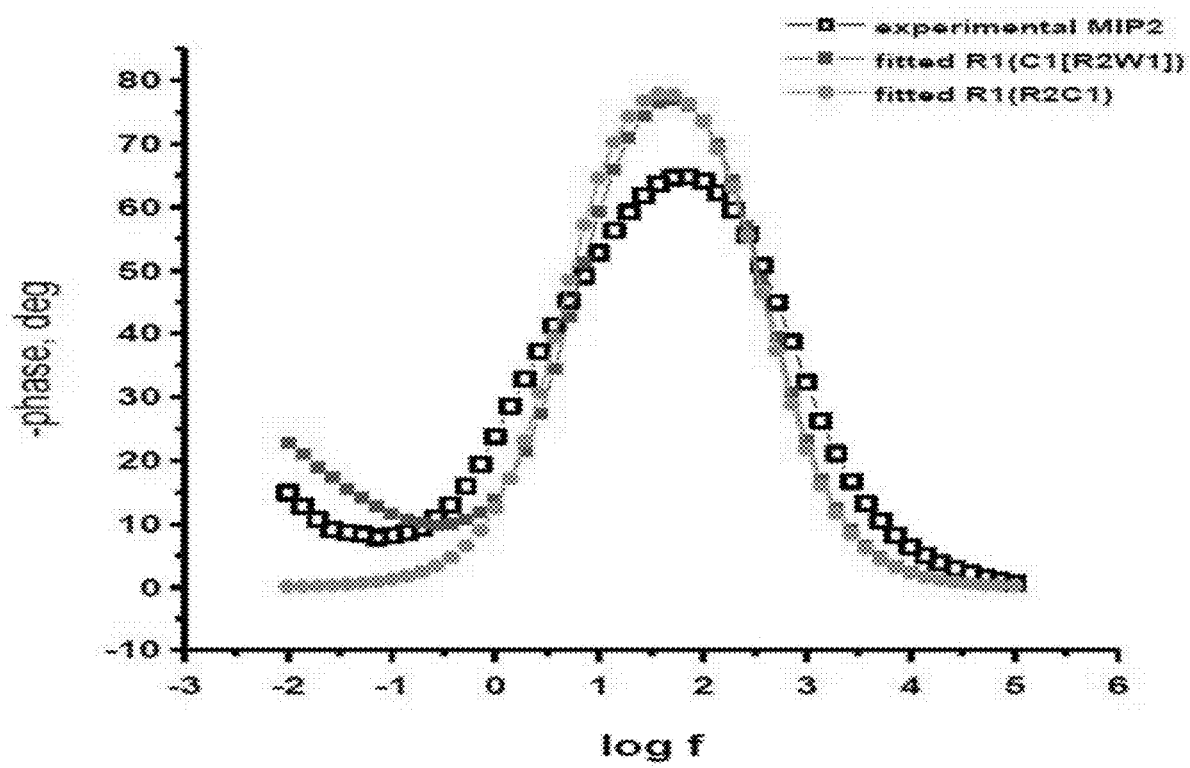
FIG. 3.17C
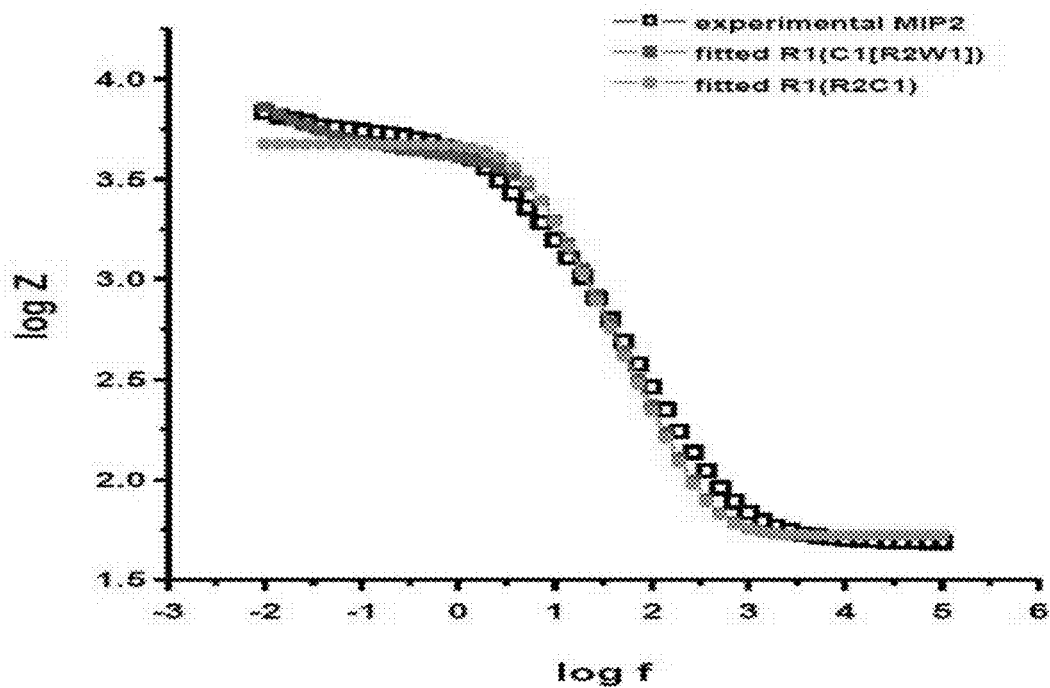
FIG. 3.17D

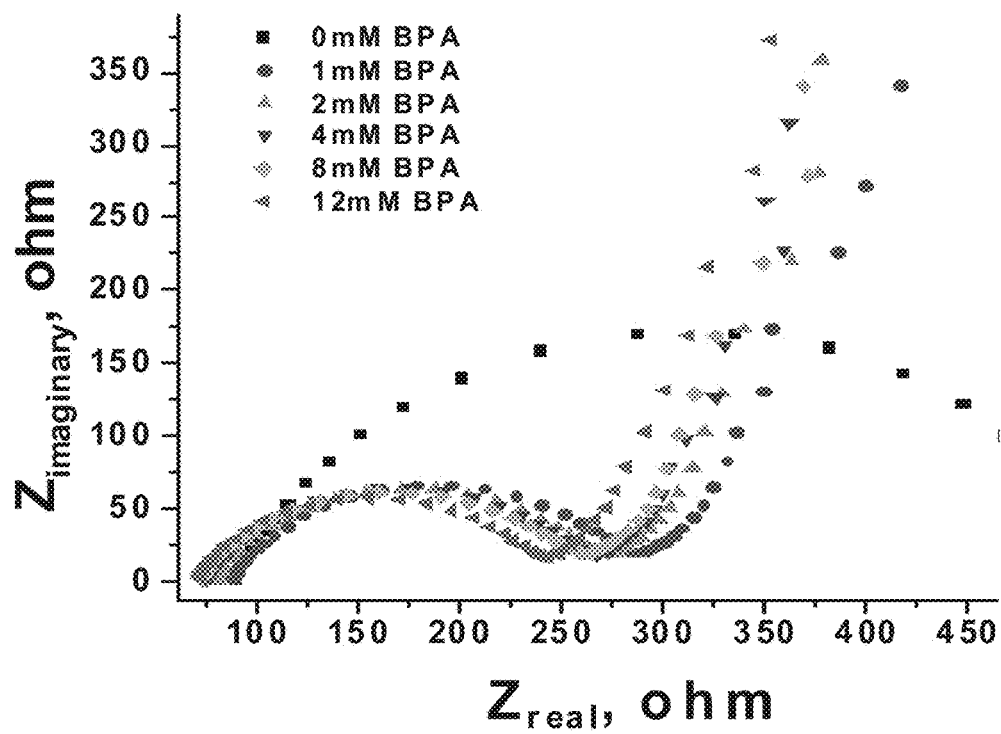
FIG. 3.18A
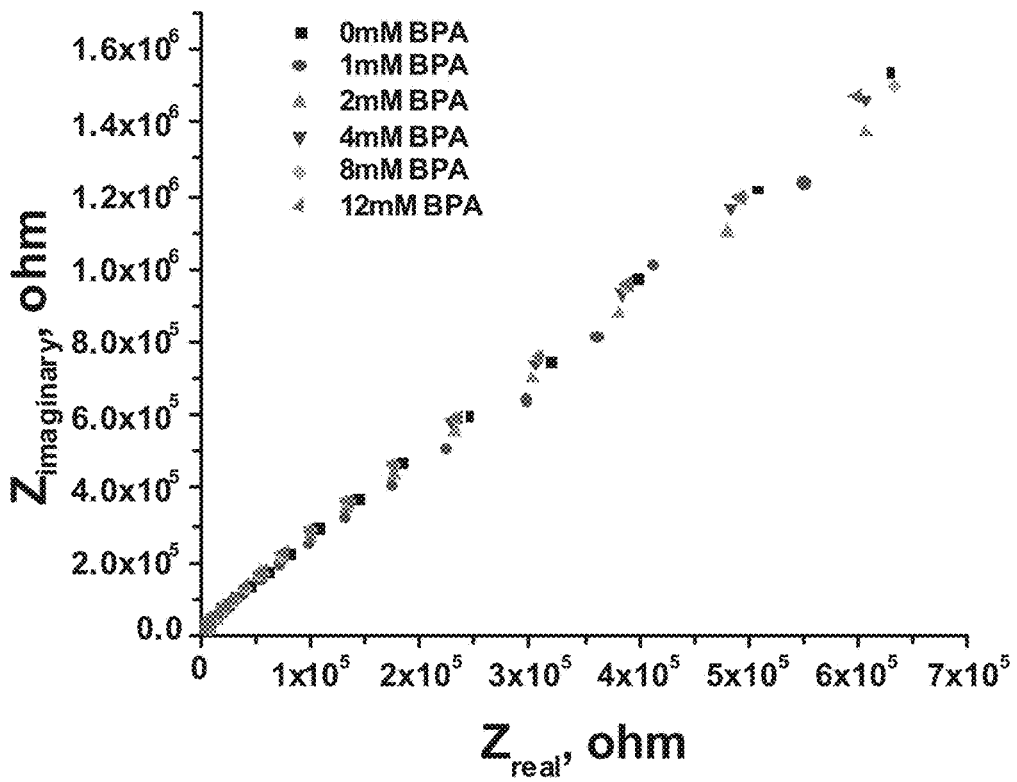
FIG. 3.18B

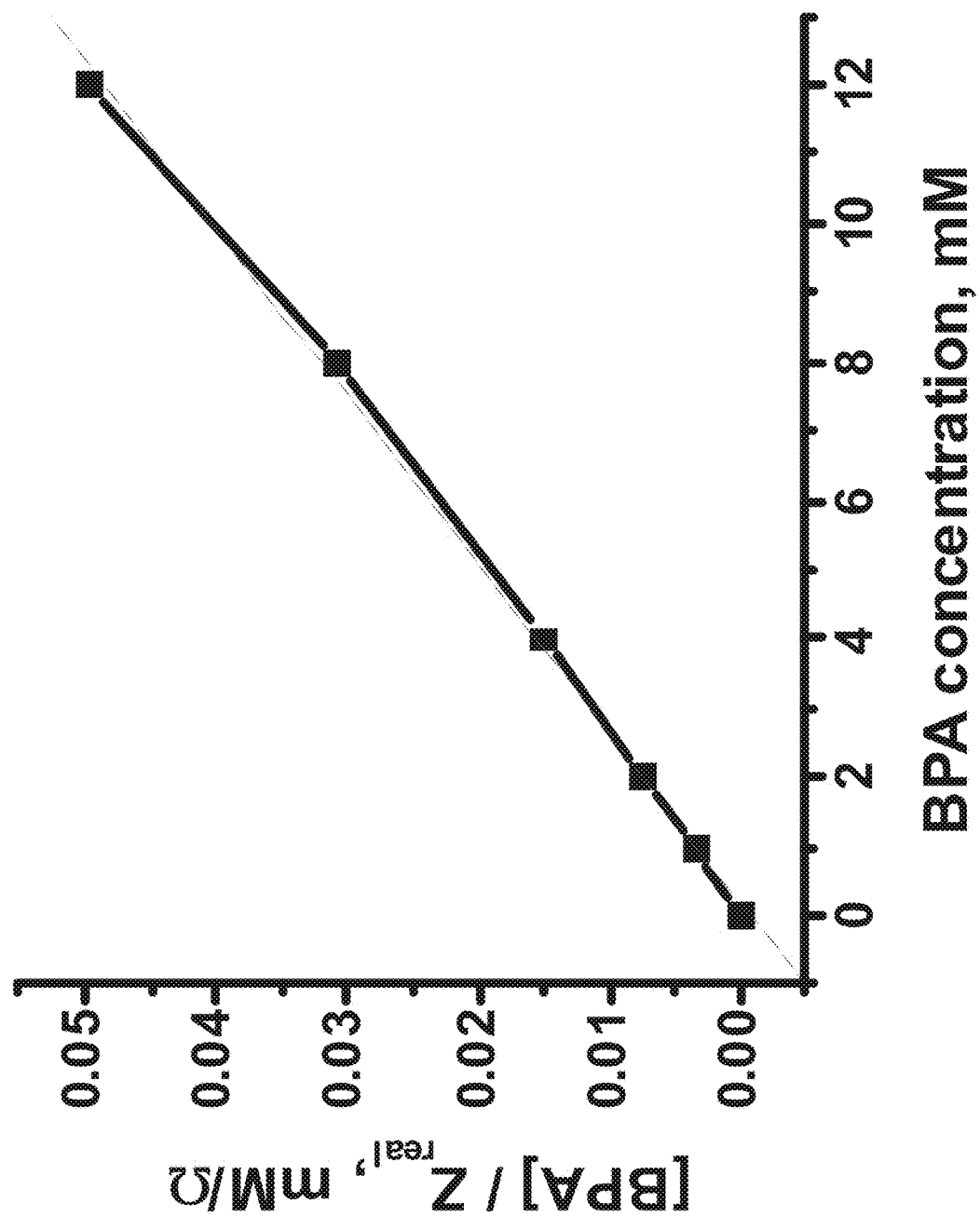
FIG. 3.19

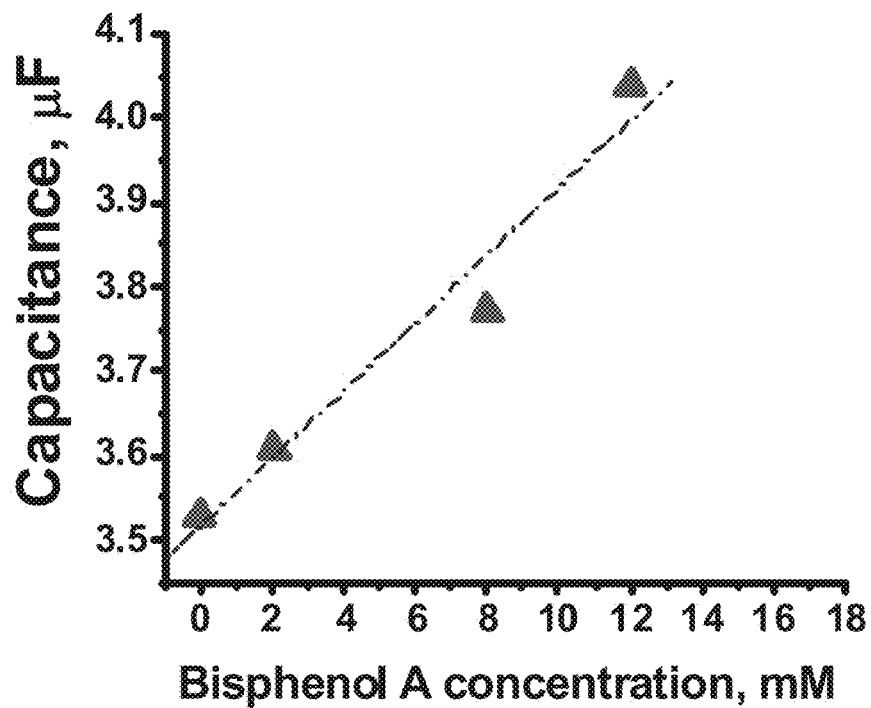
FIG. 3.20A
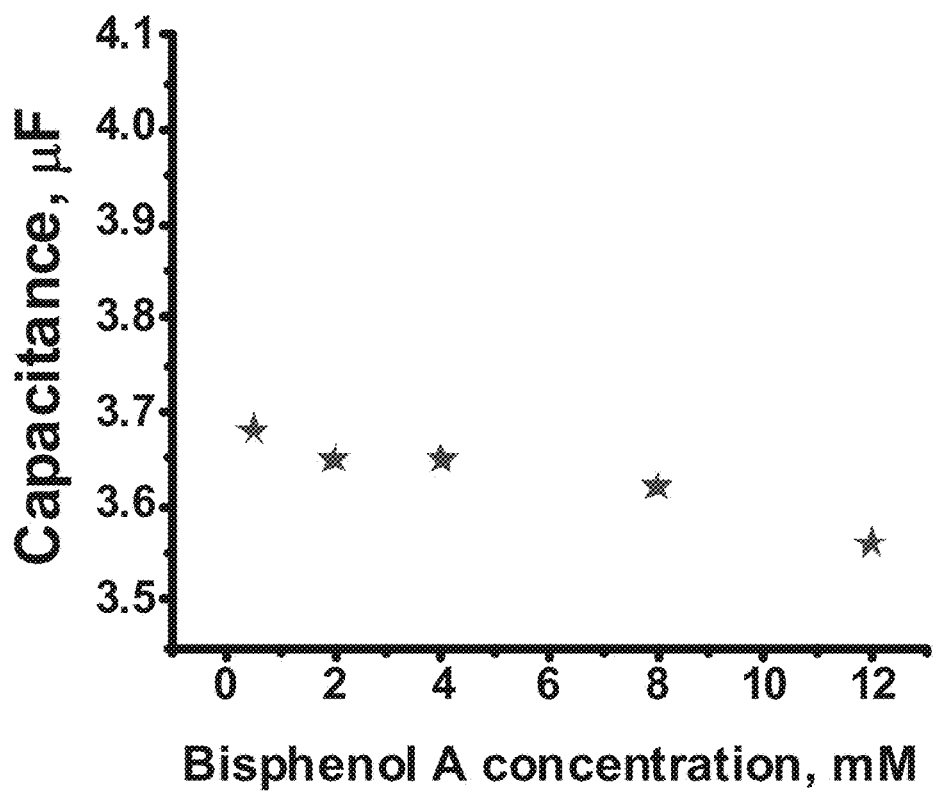
FIG. 3.20B

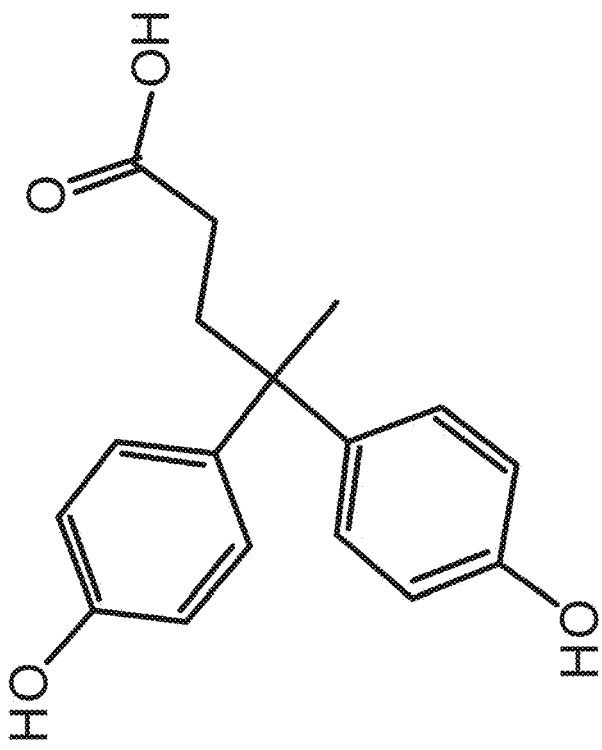
4,4-Bis(4-hydroxyphenyl)valeric acid
Diphenolic Acid
FIG. 3.21B
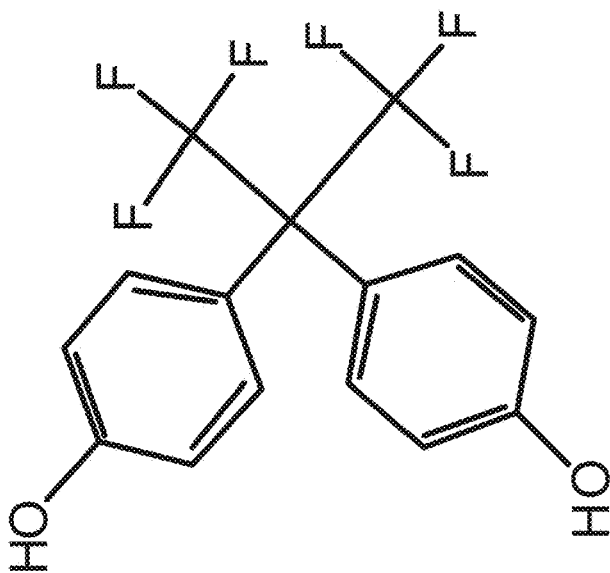
1,1,1,3,3,3-Hexafluoro-2,2-bis(4-hydroxyphenyl)propane
Bisphenol AF
FIG. 3.21A

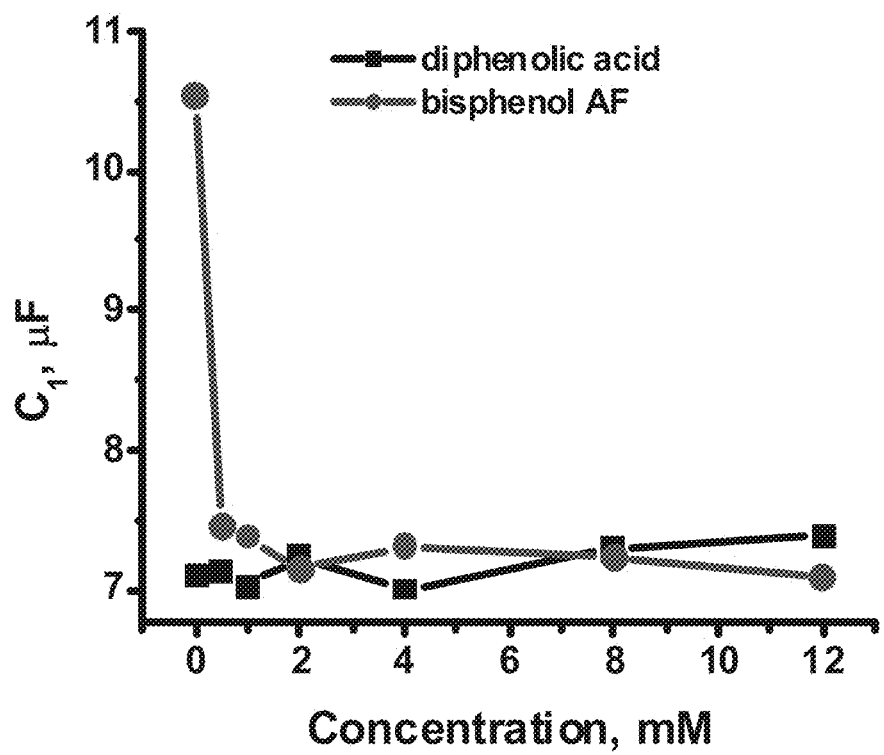
FIG. 3.21C
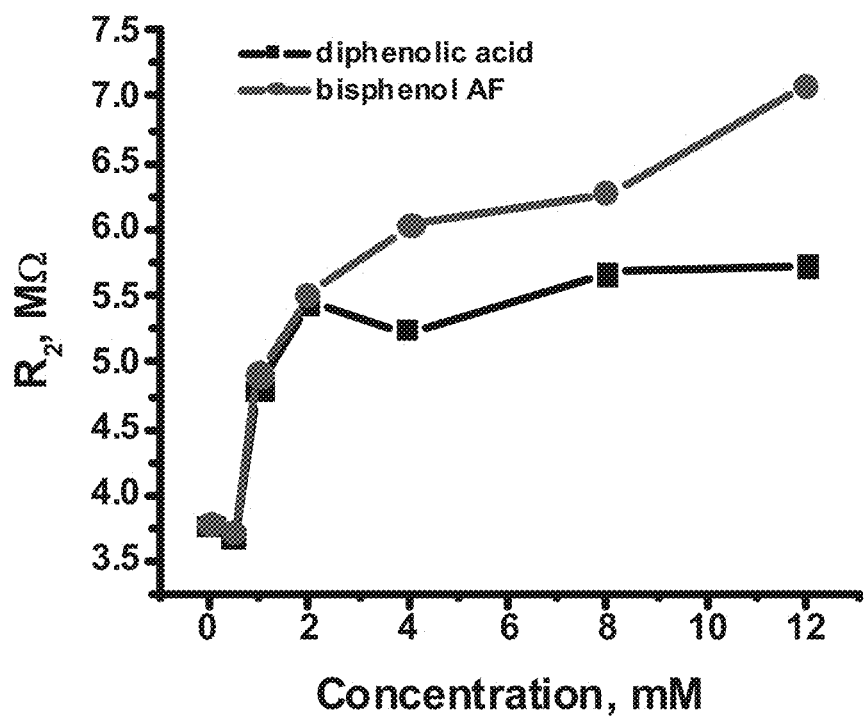
FIG. 3.21D

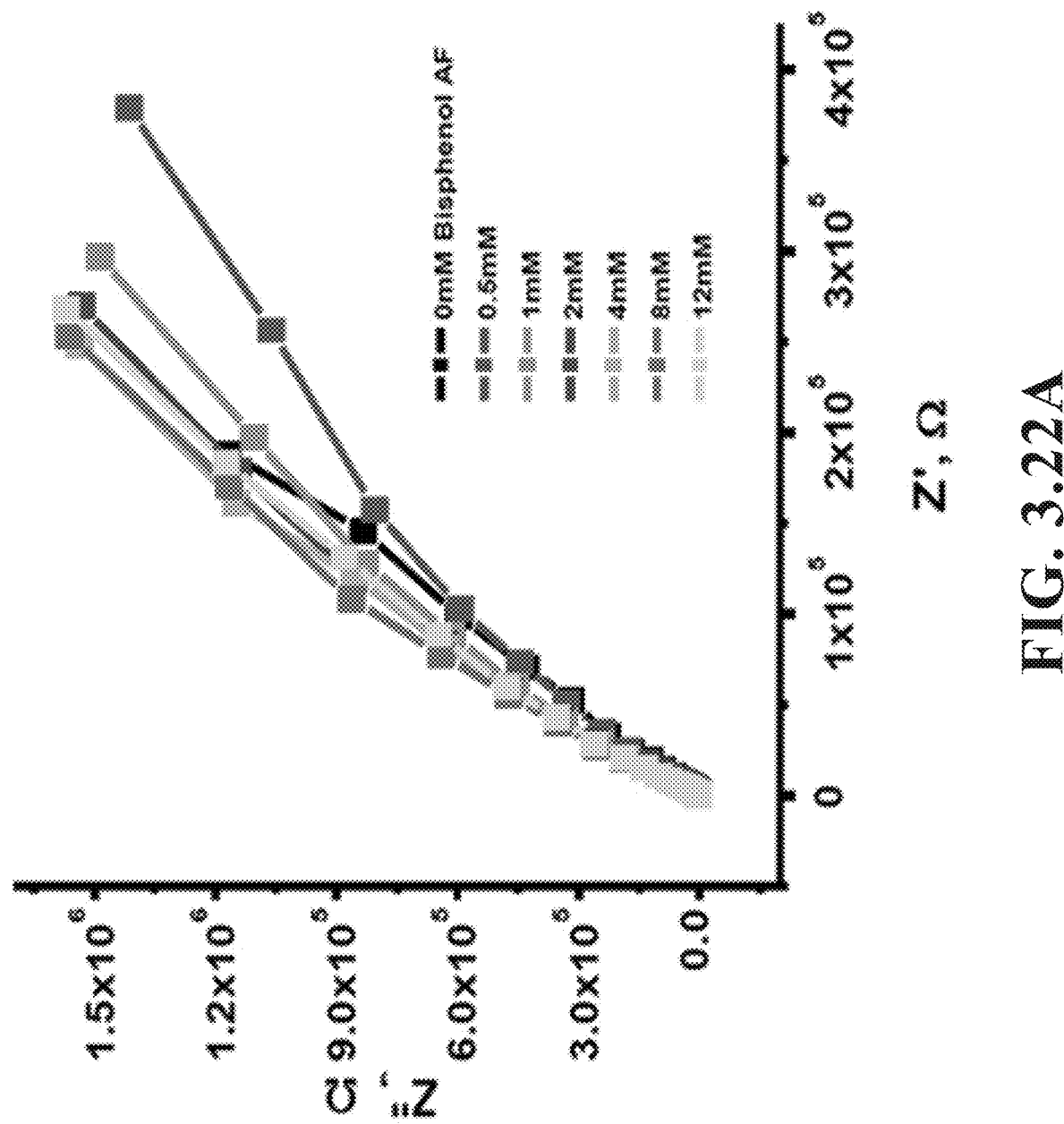
FIG. 3.22A

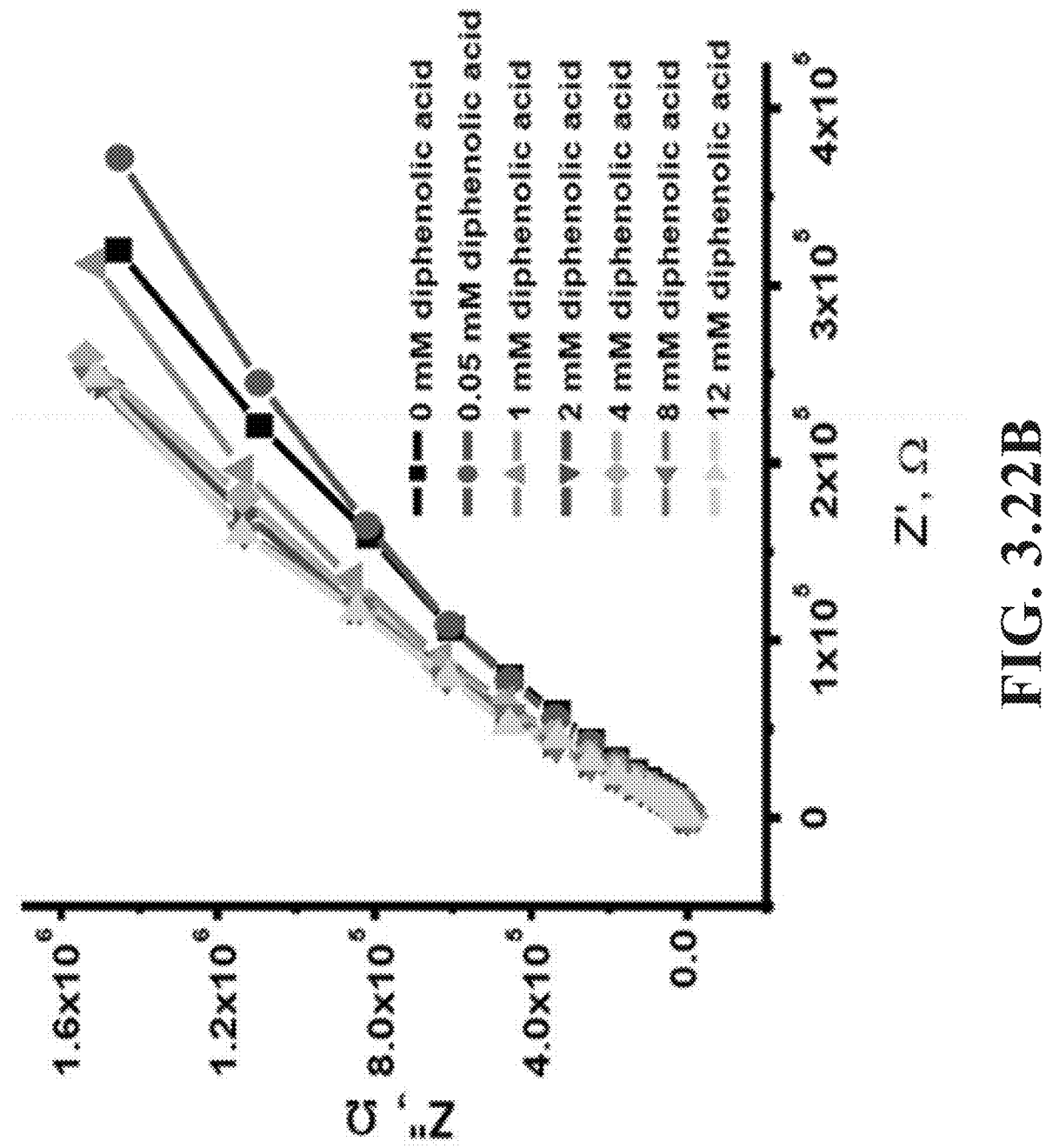
FIG. 3.22B

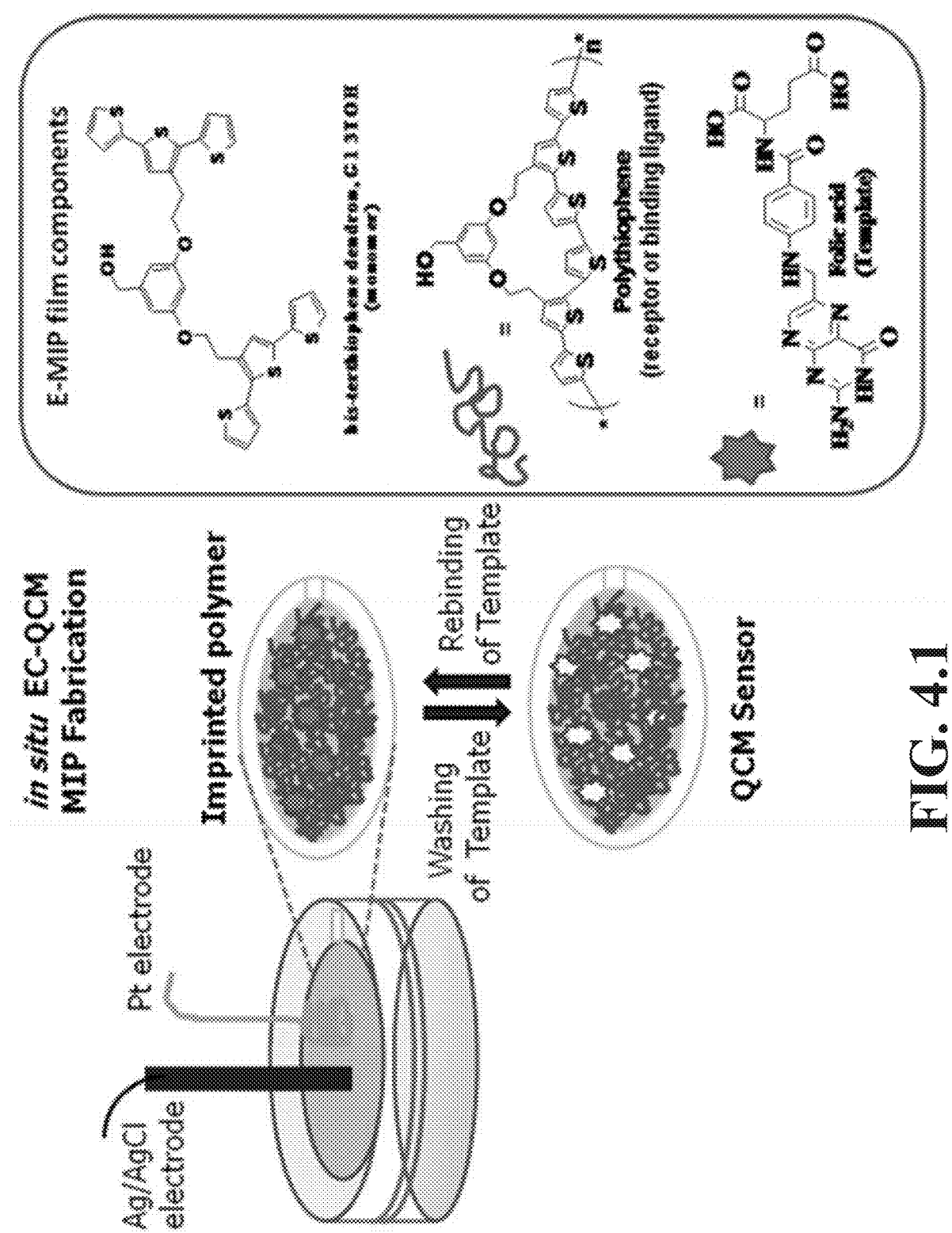
FIG. 4.1

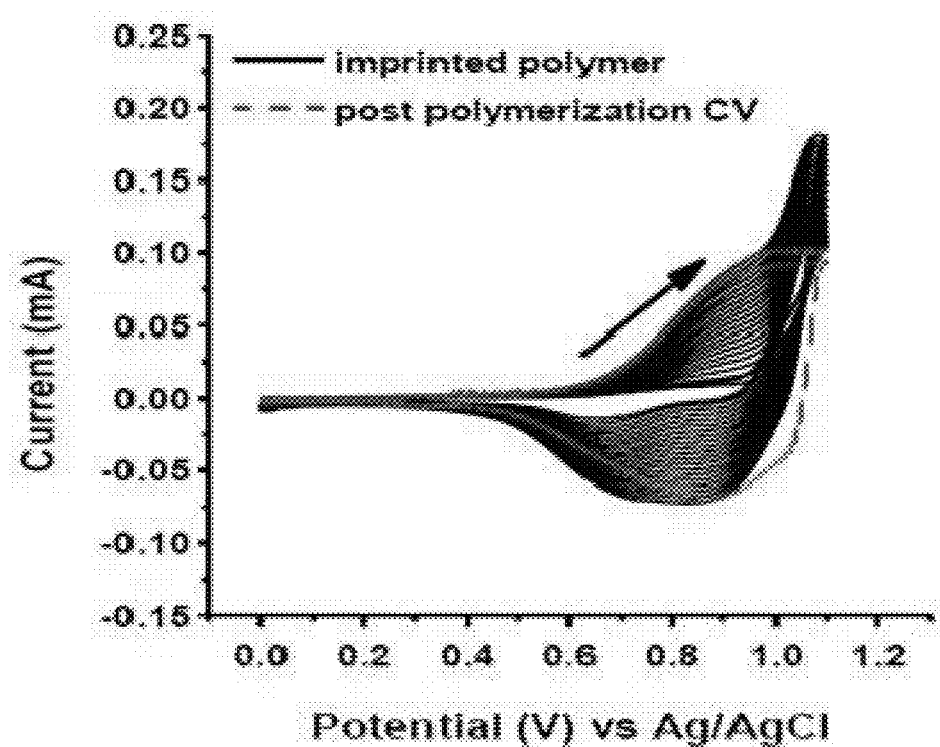
FIG. 4.2A
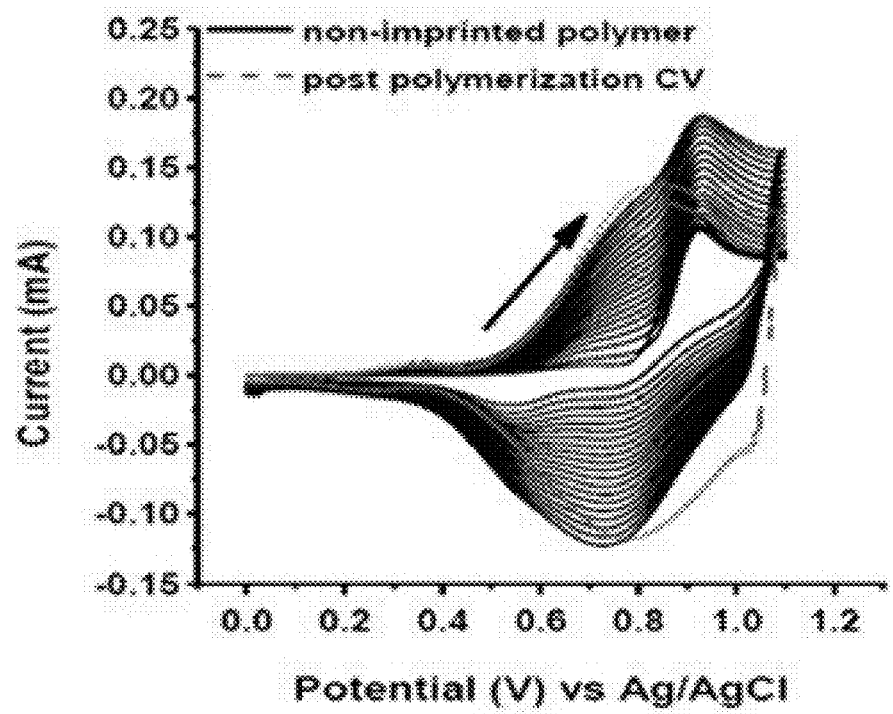
FIG. 4.2B

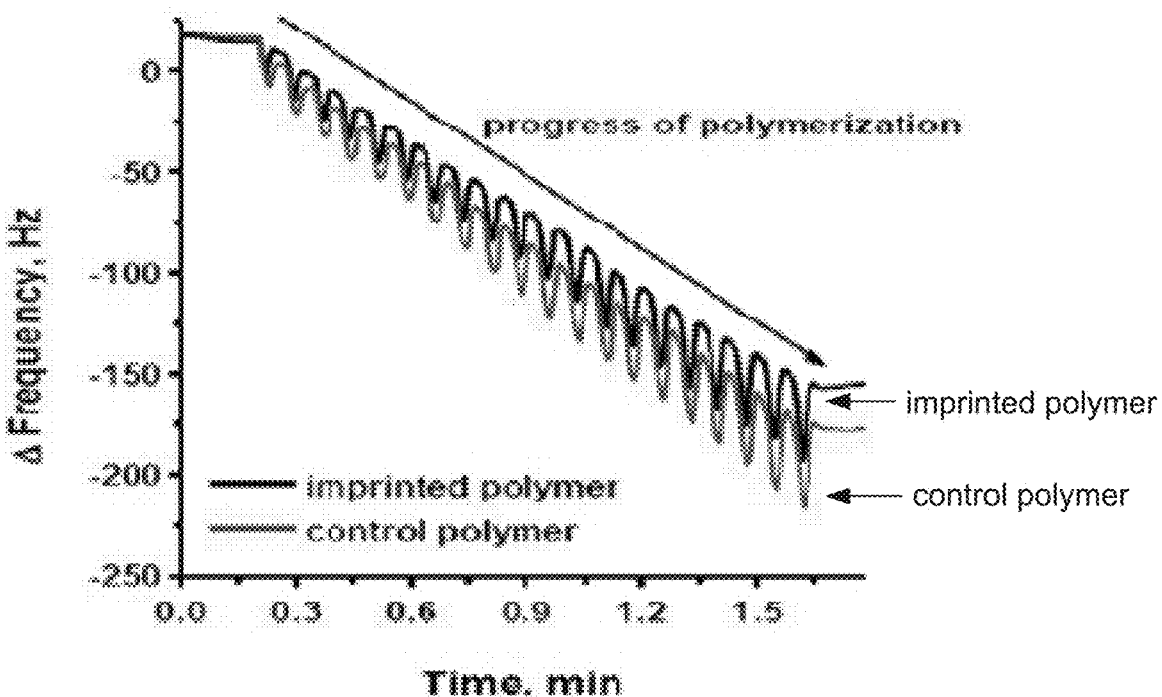
FIG. 4.3A
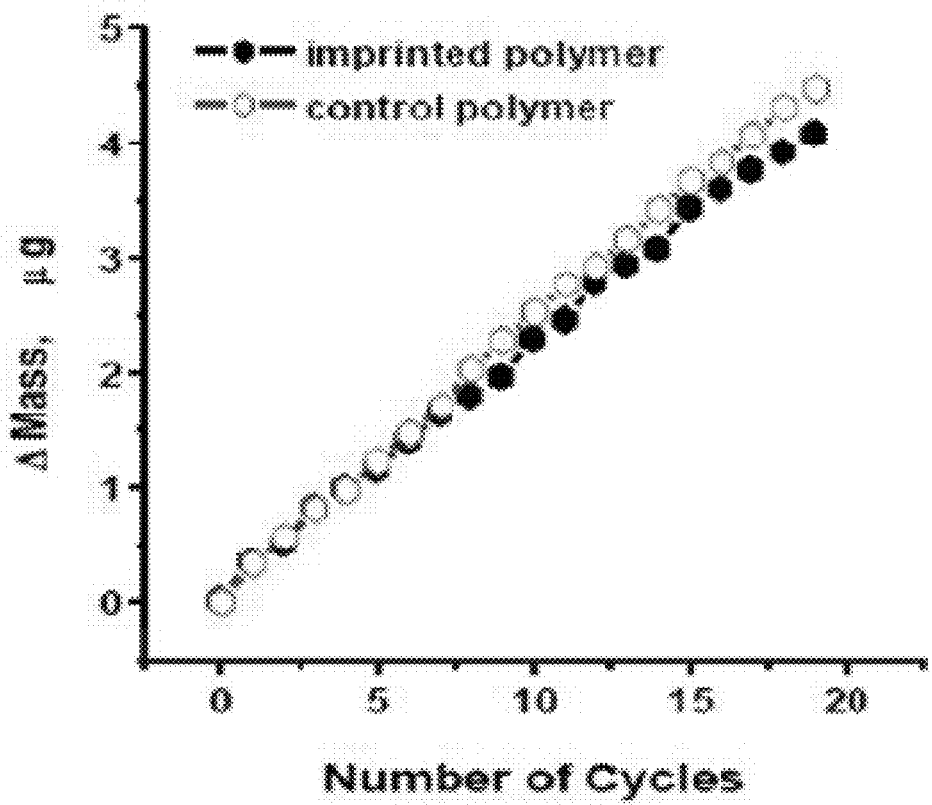
FIG. 4.3B

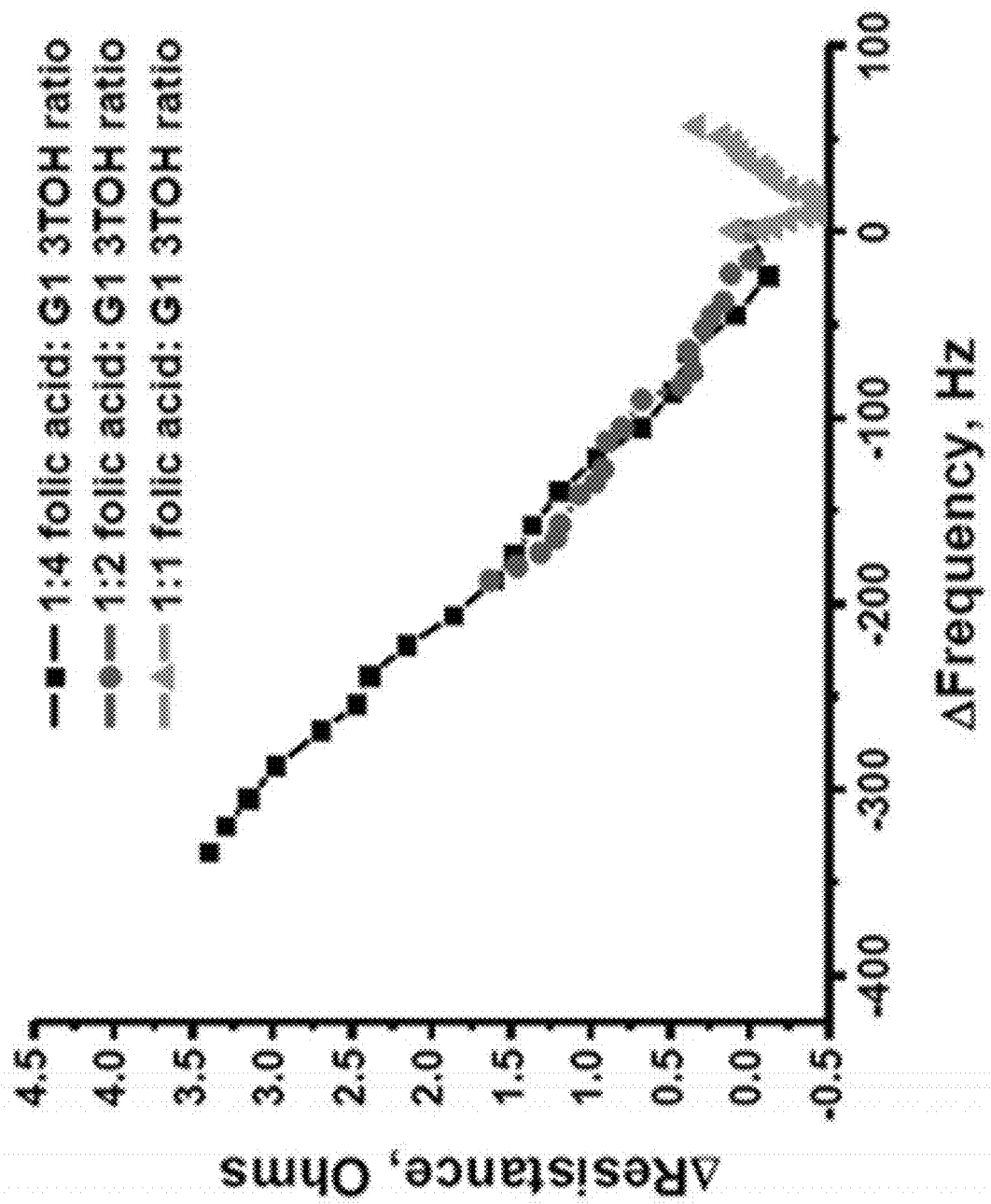
FIG. 4.4

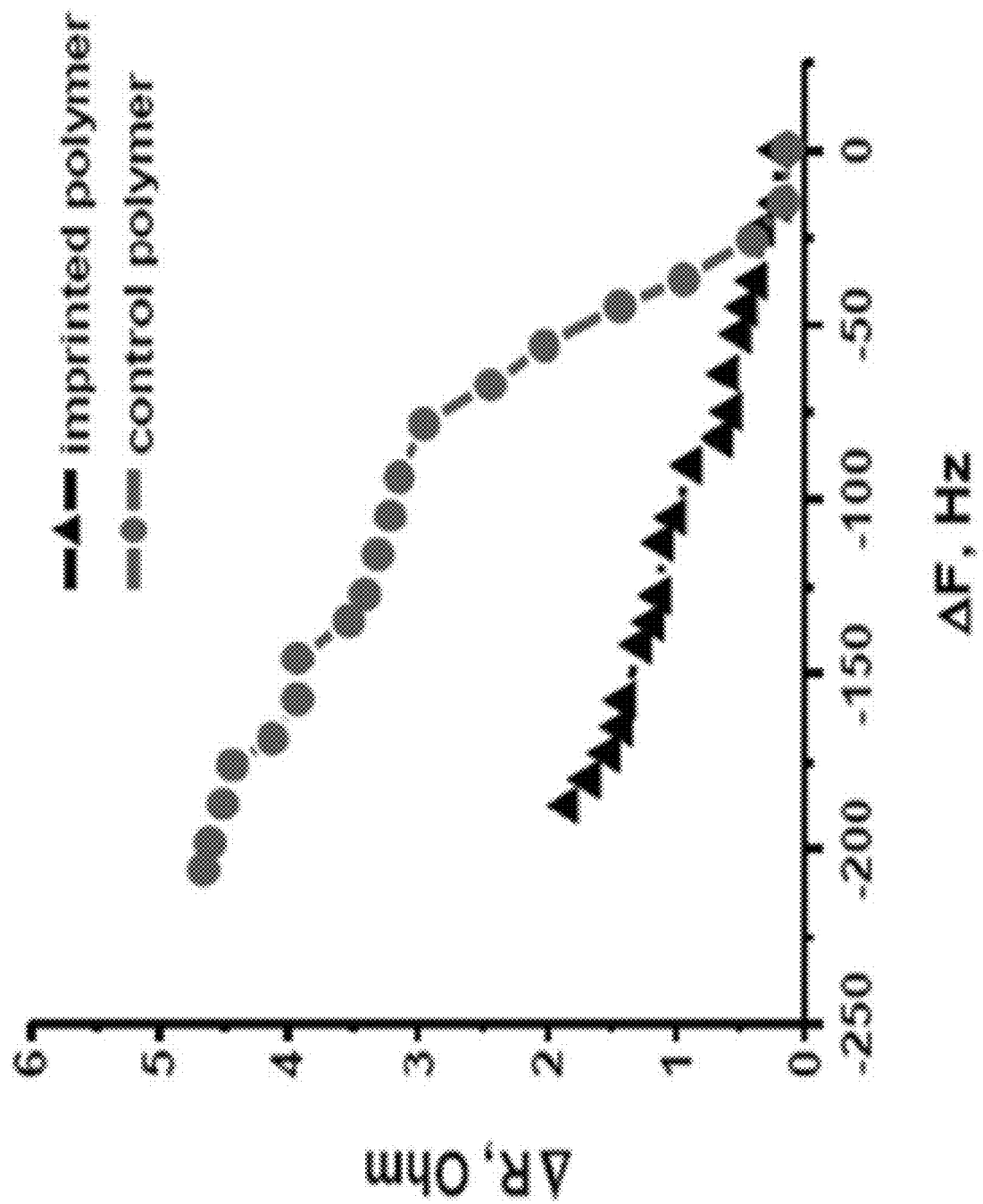
FIG. 4.5

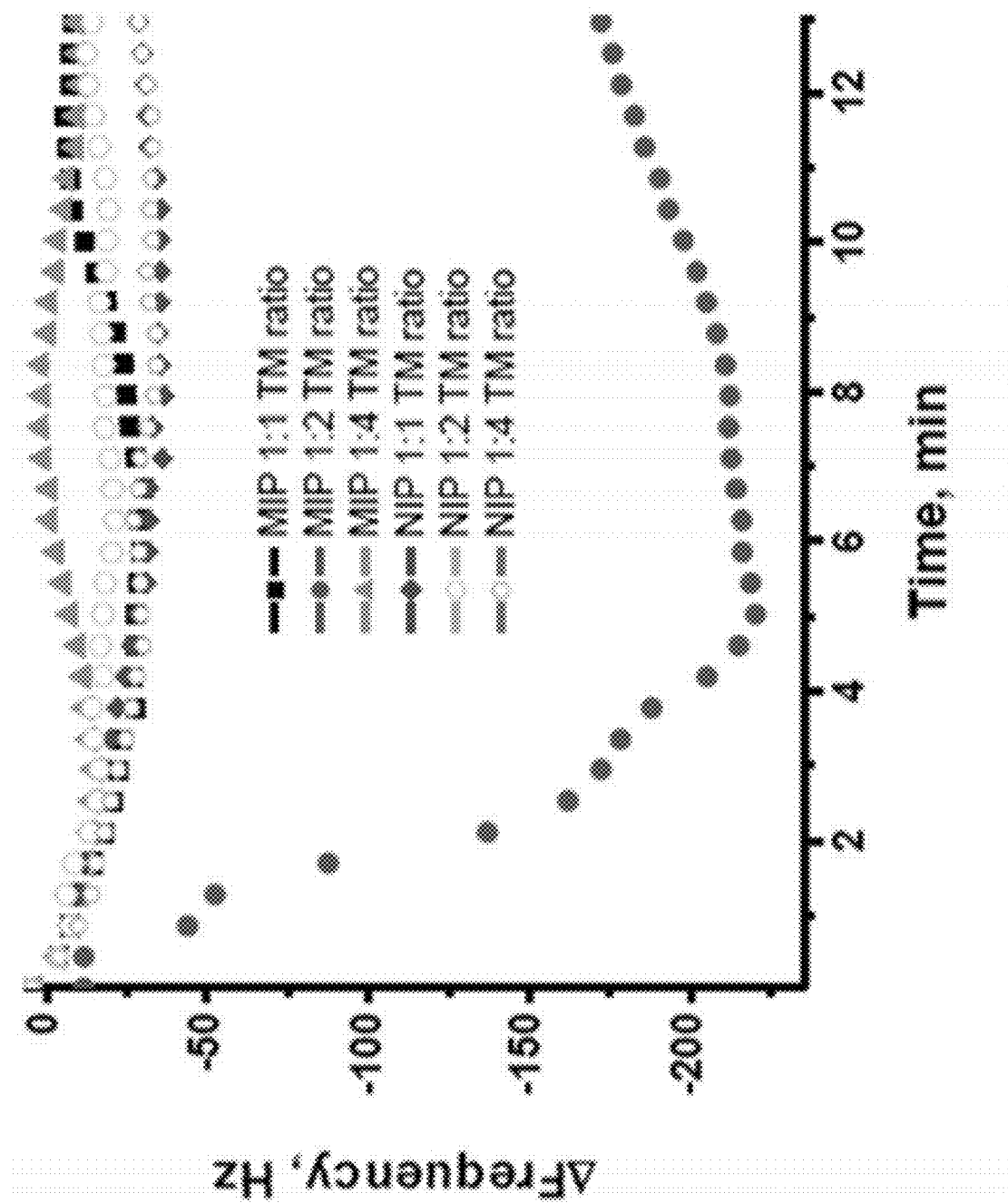
FIG. 4.6

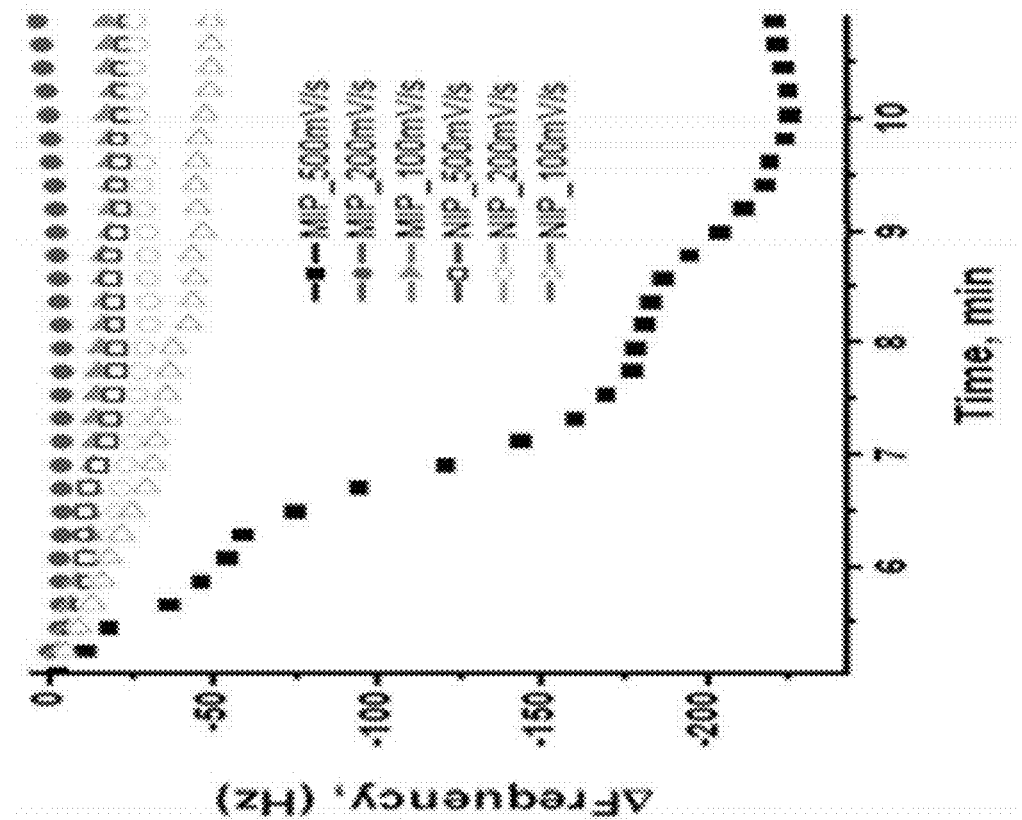
FIG. 4.7B
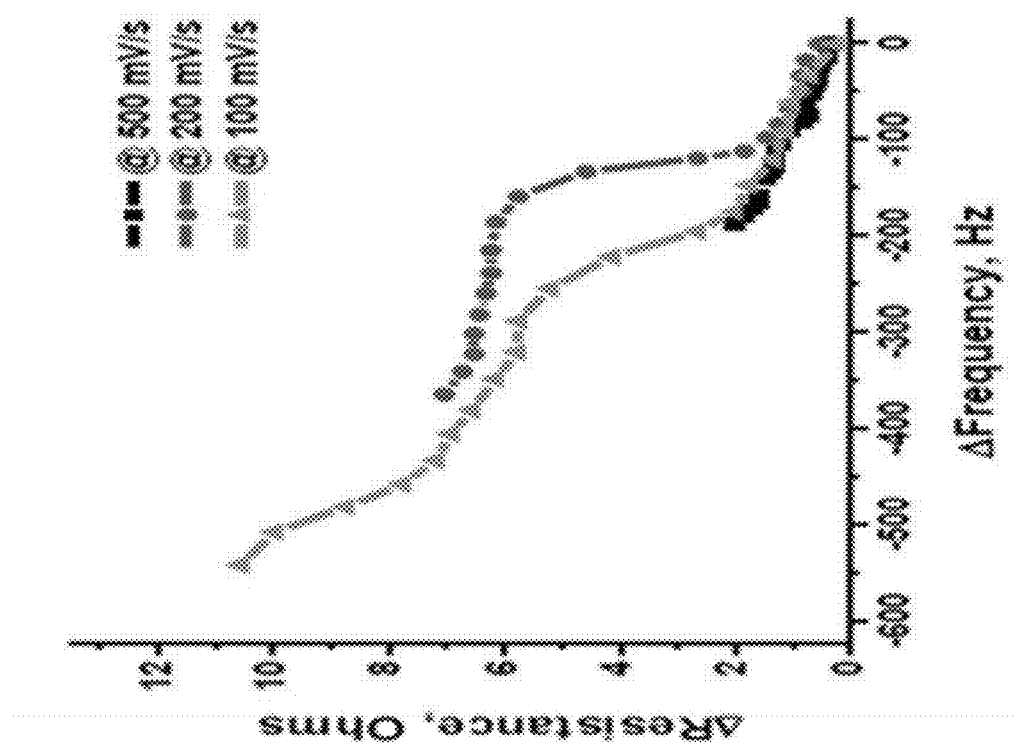
FIG. 4.7A

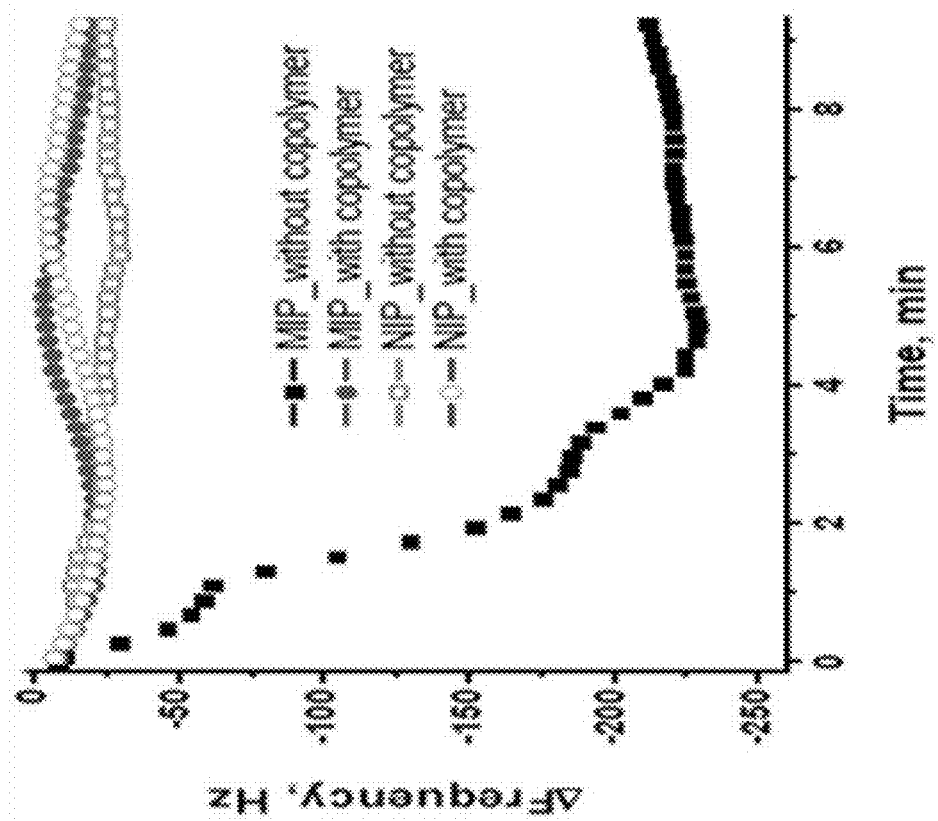
FIG. 4.8B
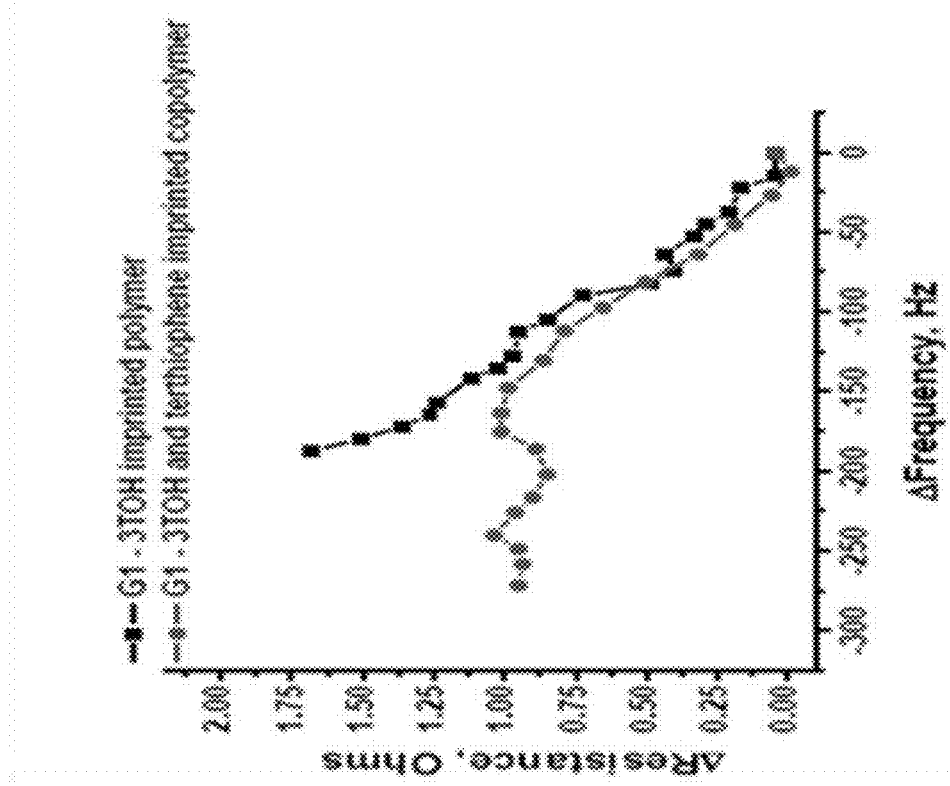
FIG. 4.8A

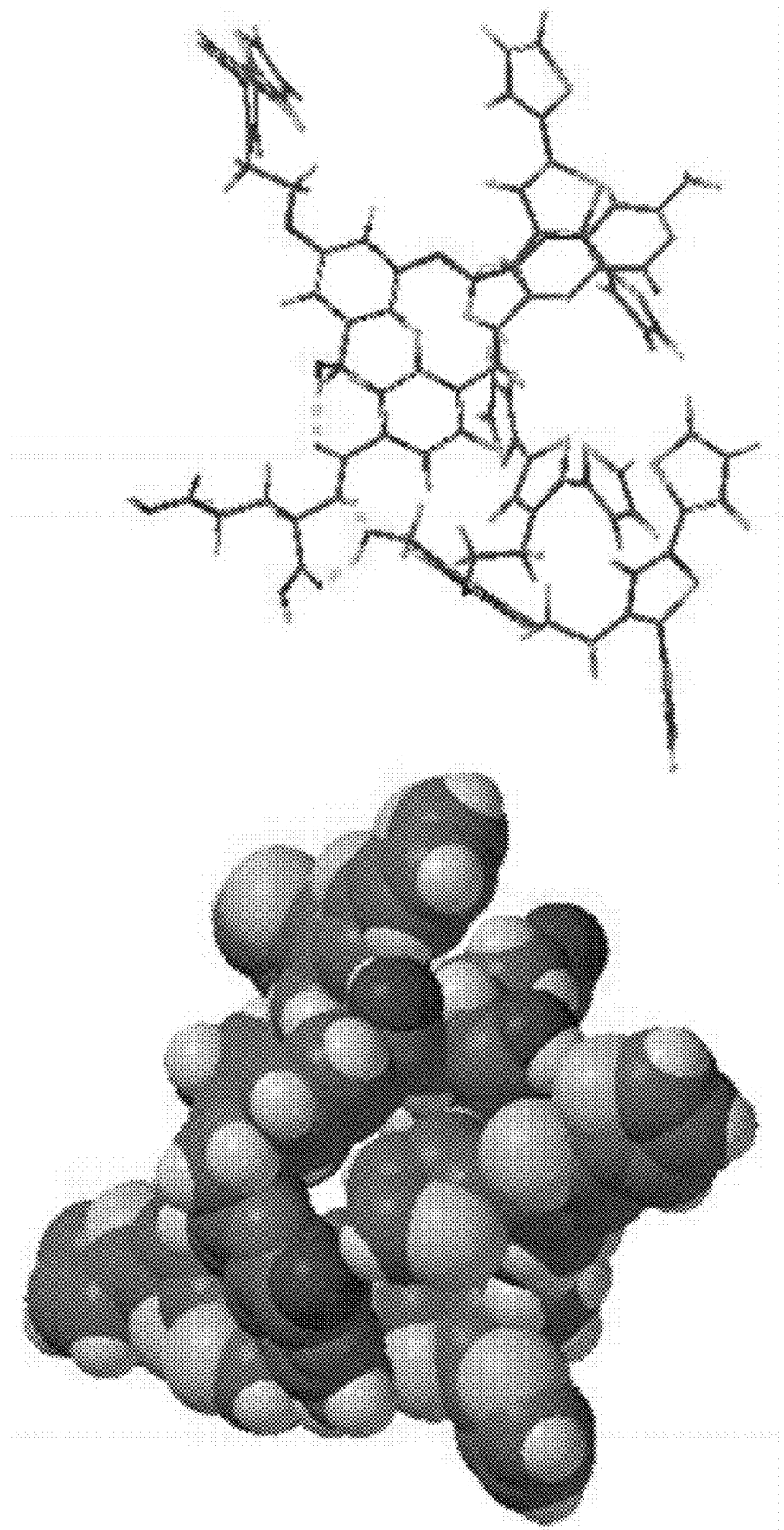
FIG. 4.9

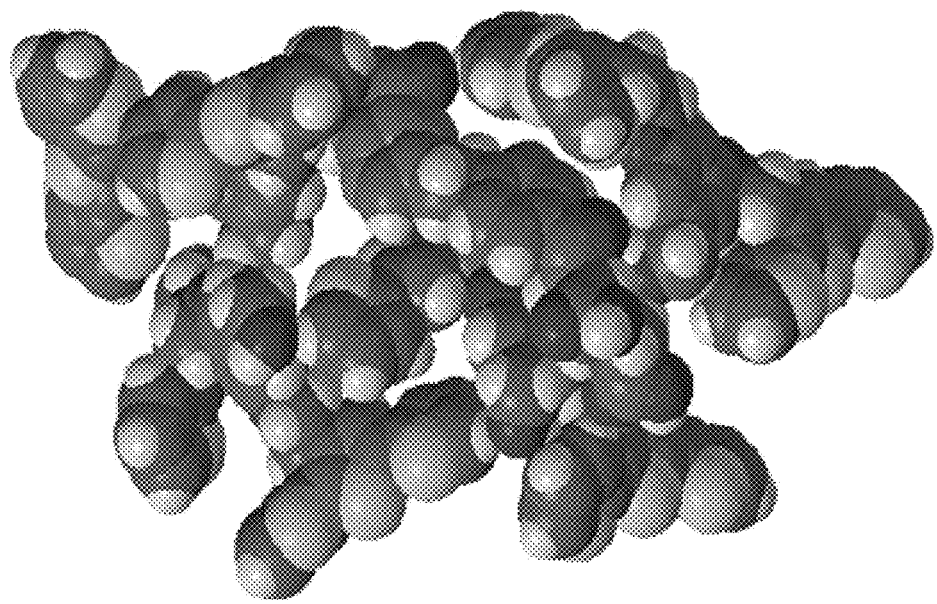
FIG. 4.10A
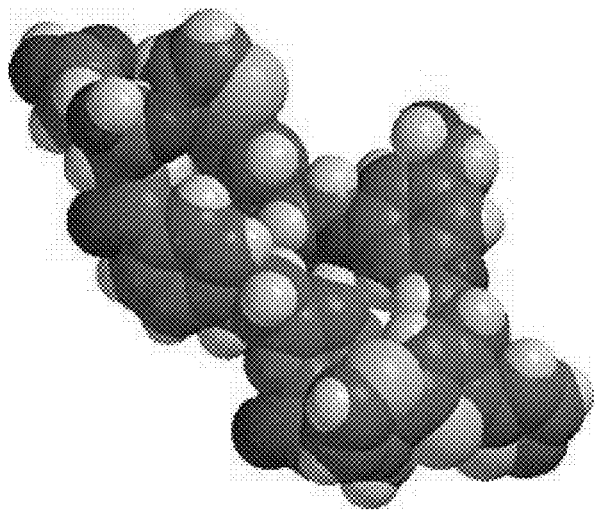 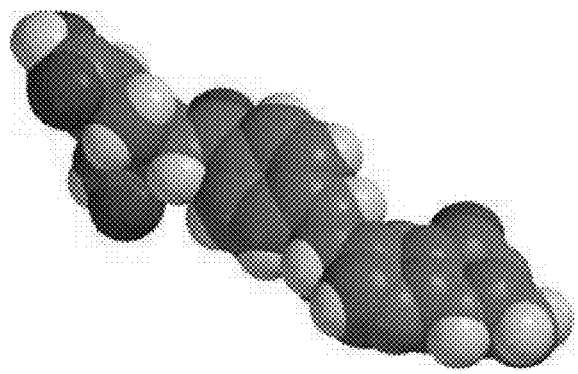
FIG. 4.10B     FIG. 4.10C

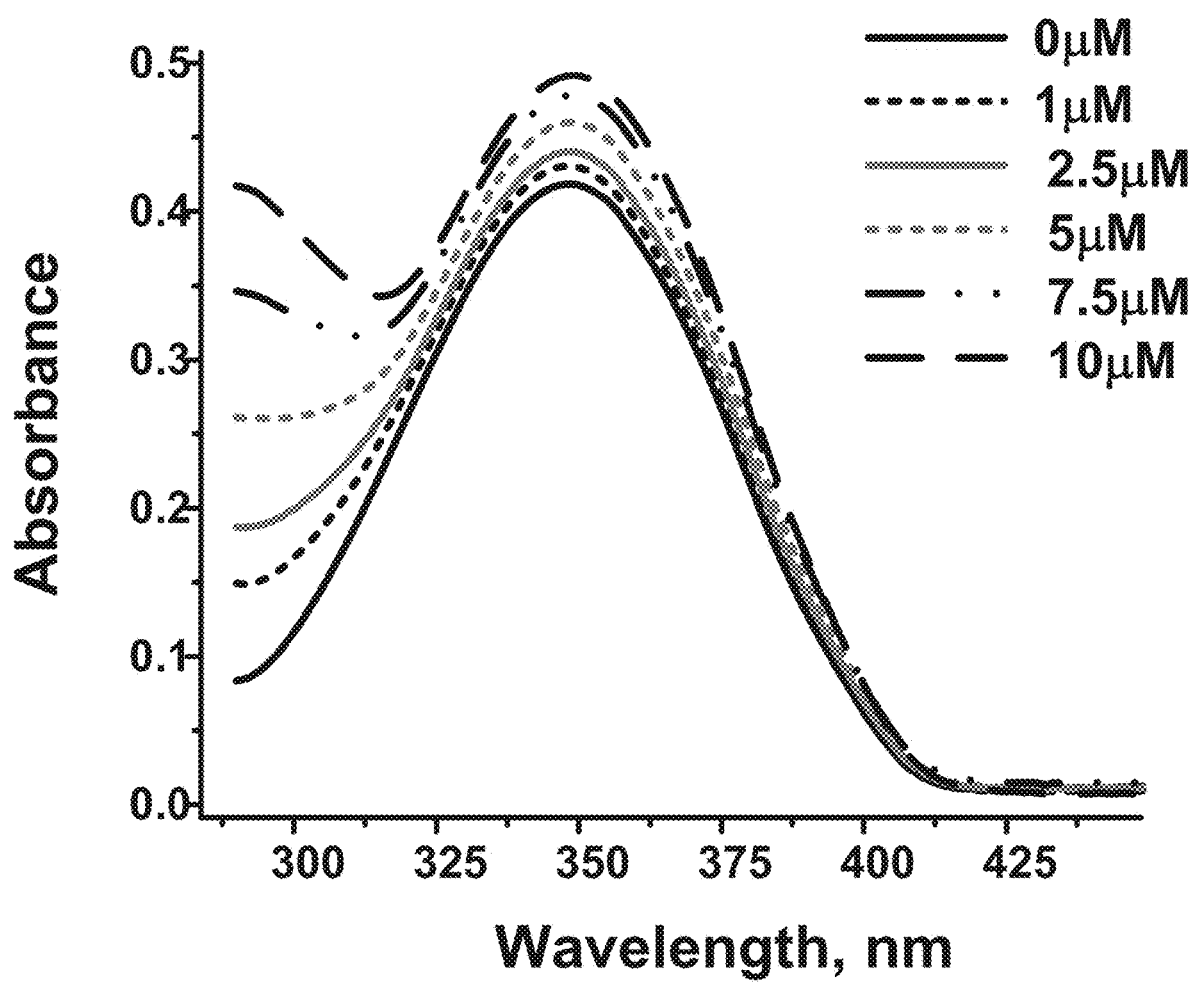
FIG. 4.11

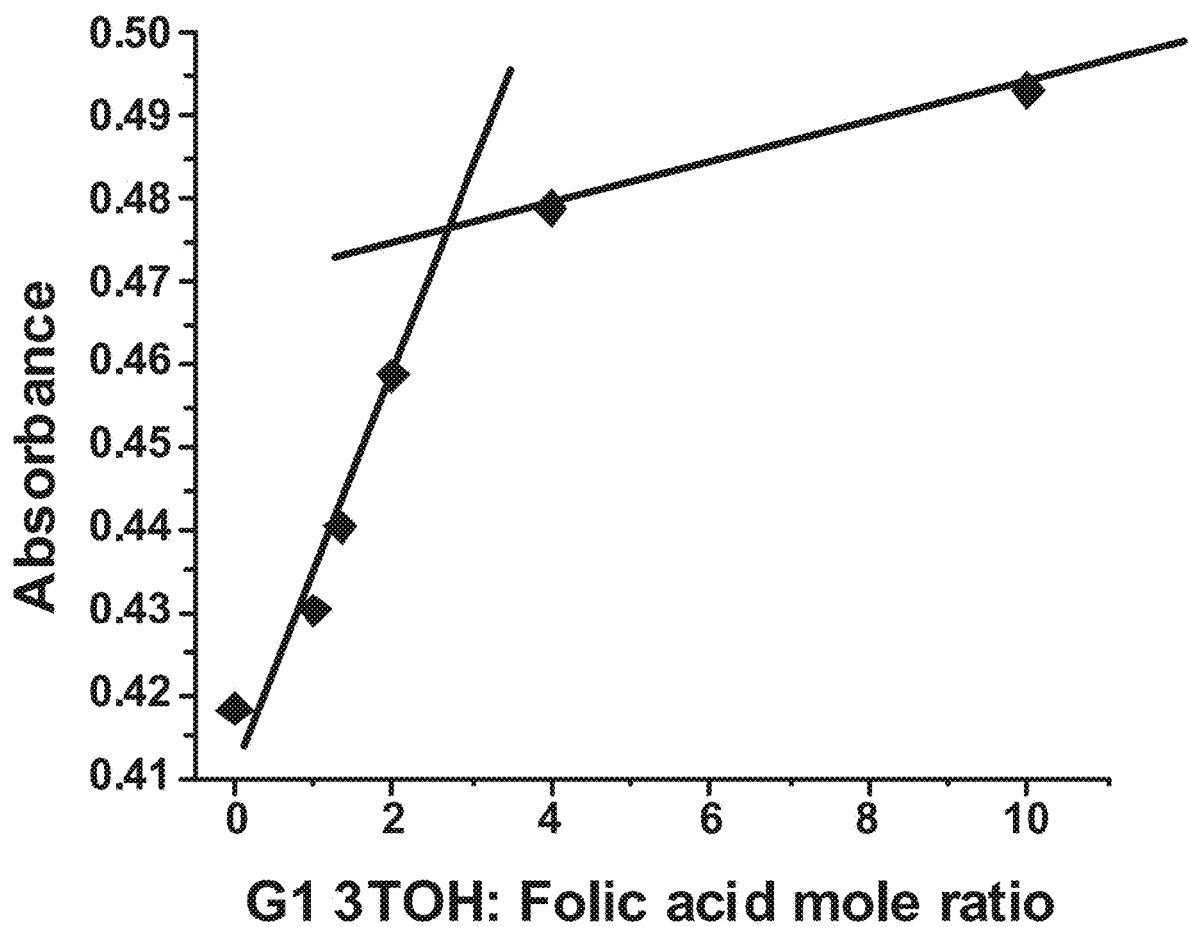
FIG. 4.12

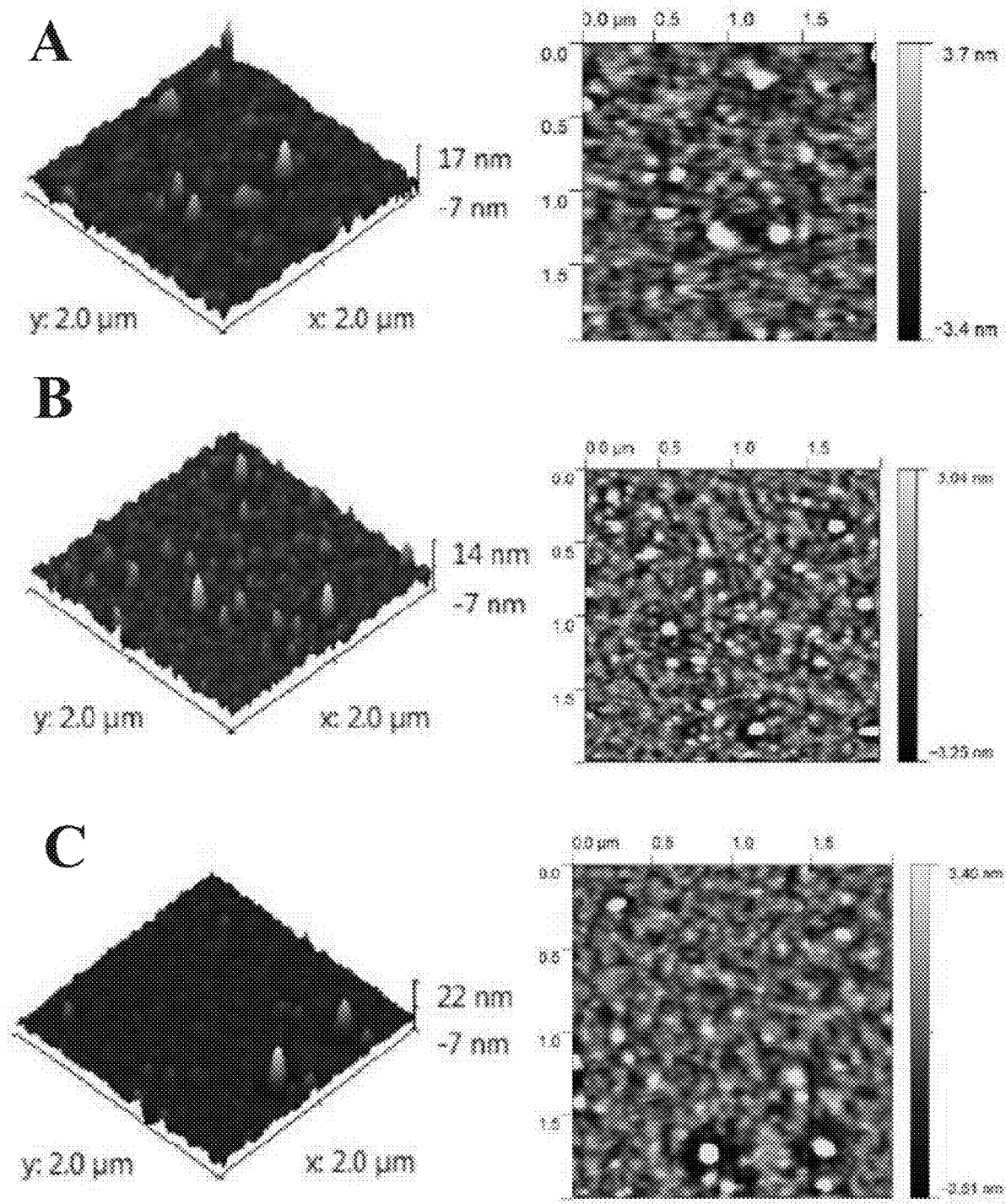
FIG. 4.13A-C

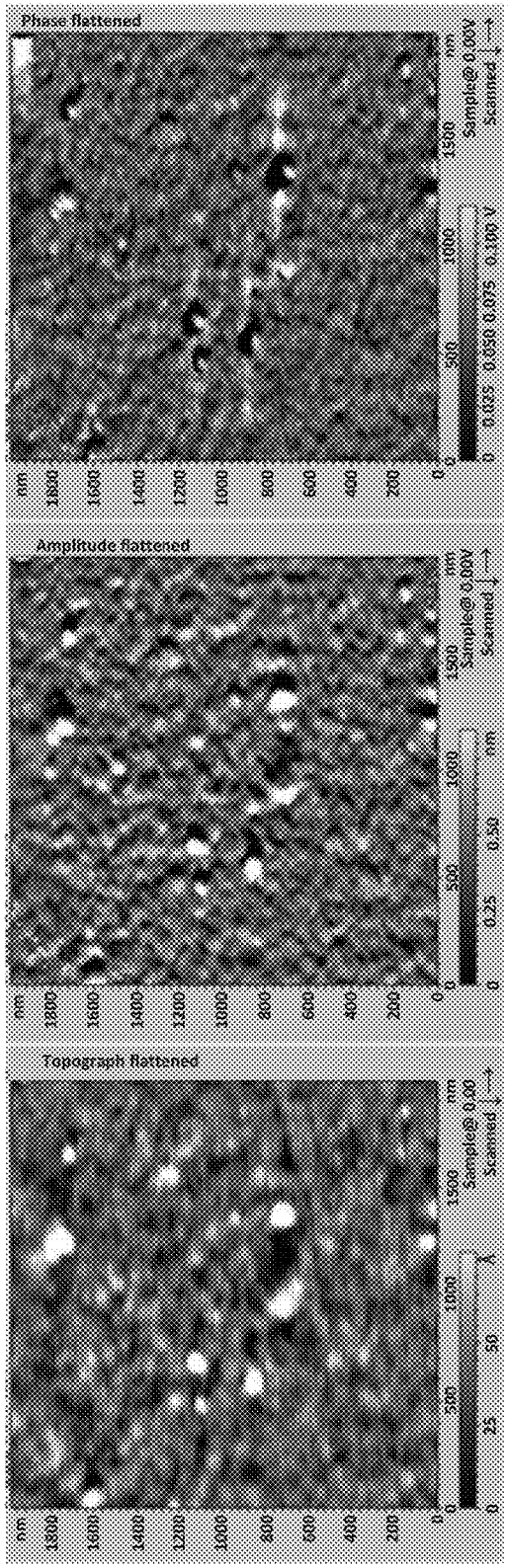
FIG. 4.14A
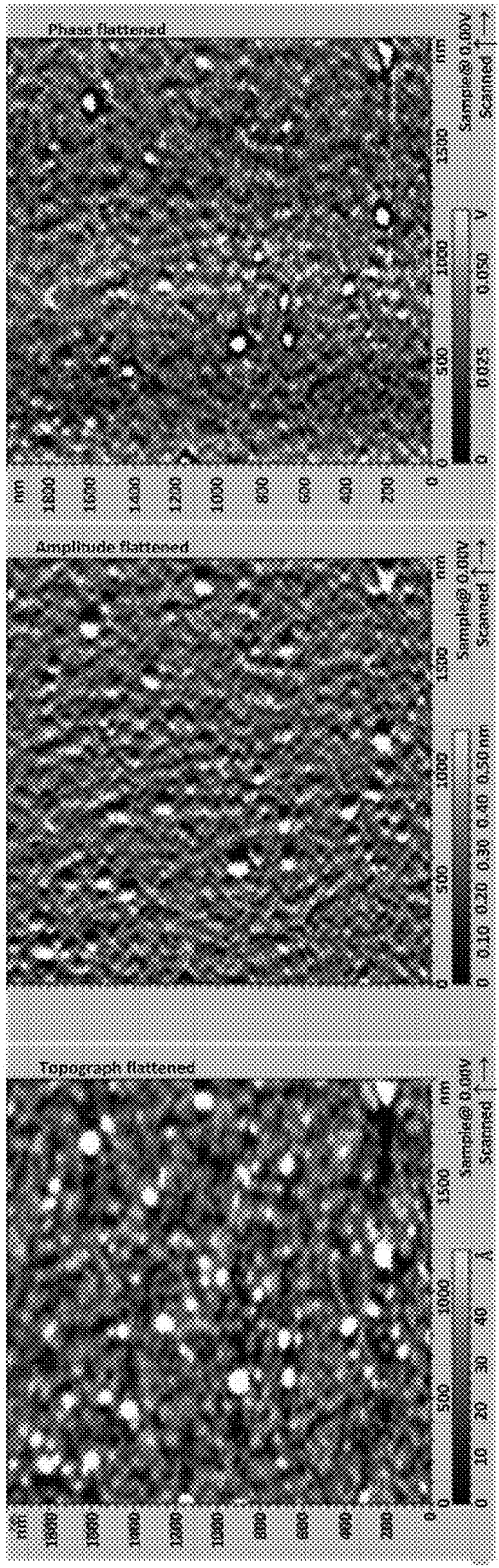
FIG. 4.14B

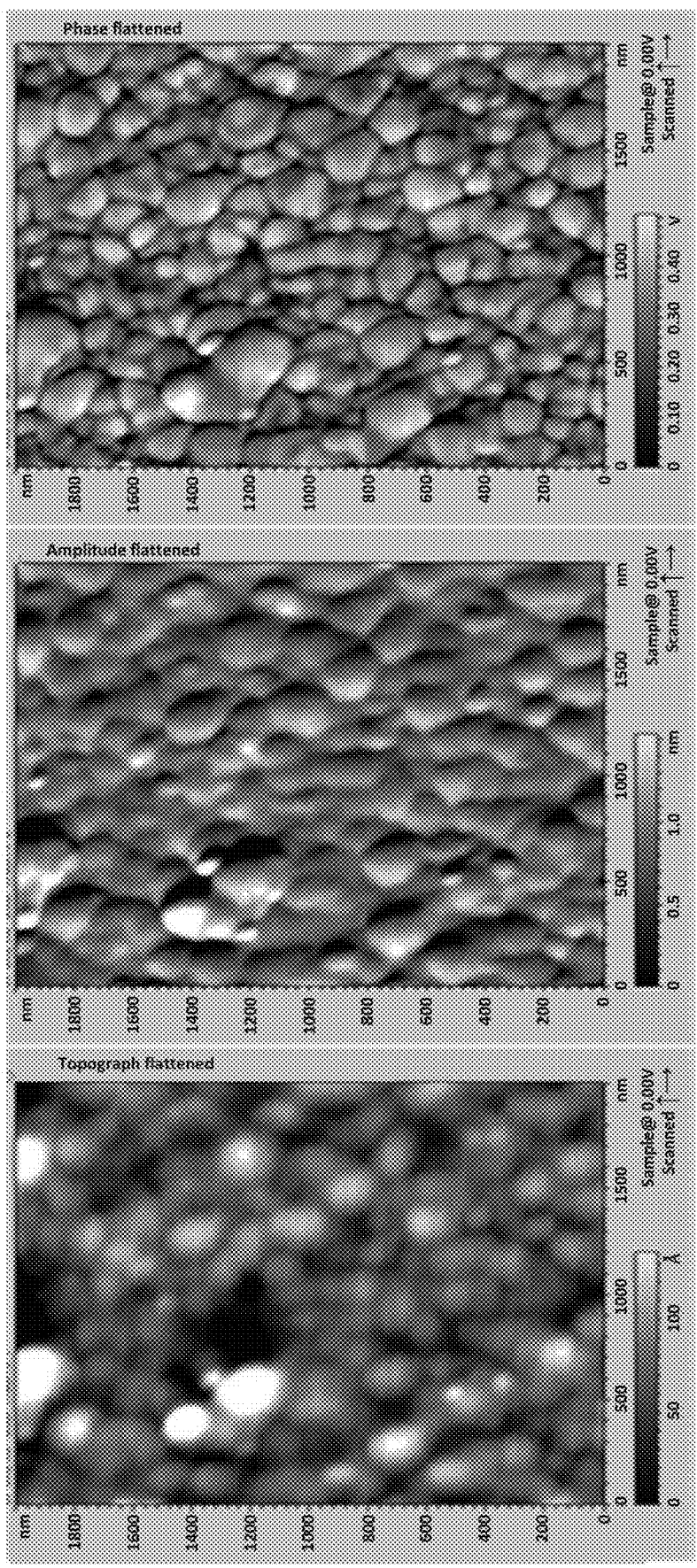
FIG. 4.14C

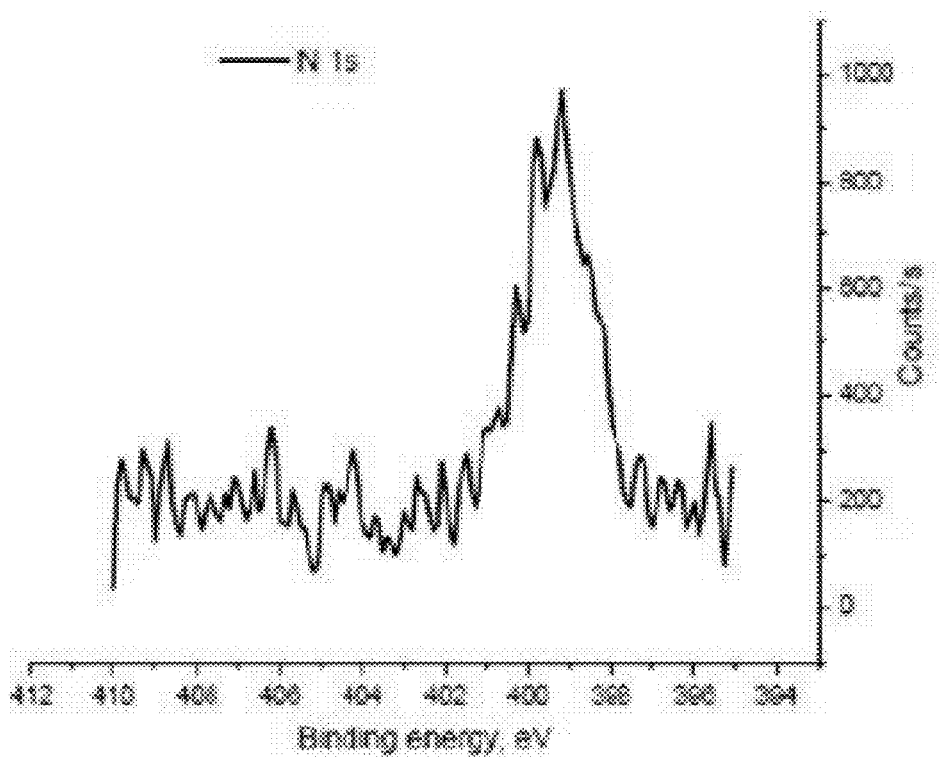
FIG. 4.15A
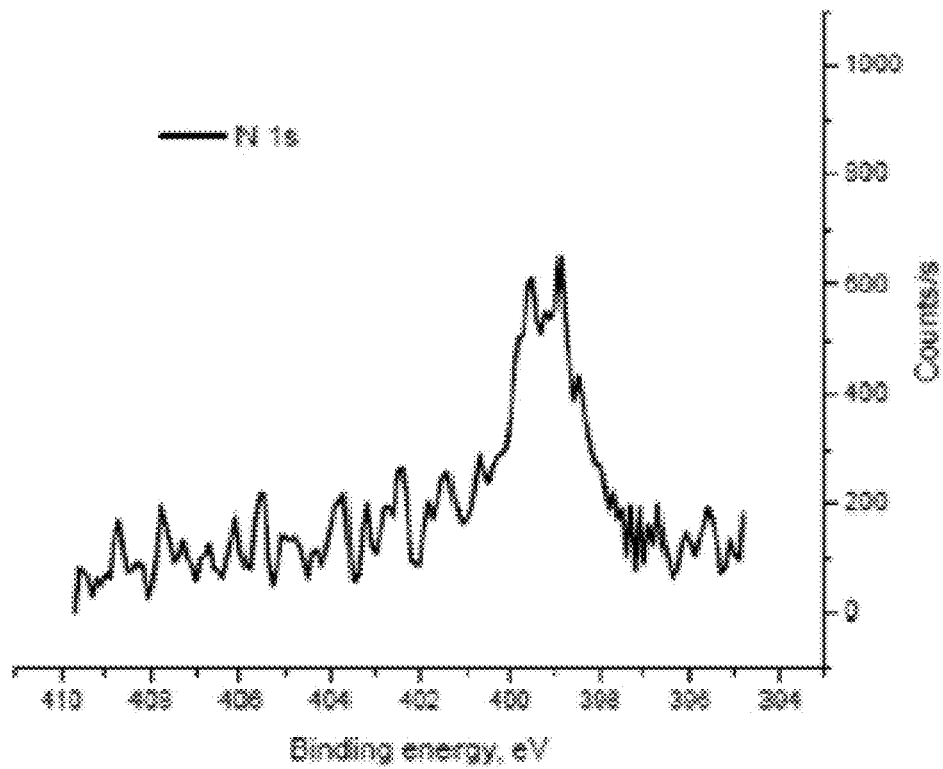
FIG. 4.15B

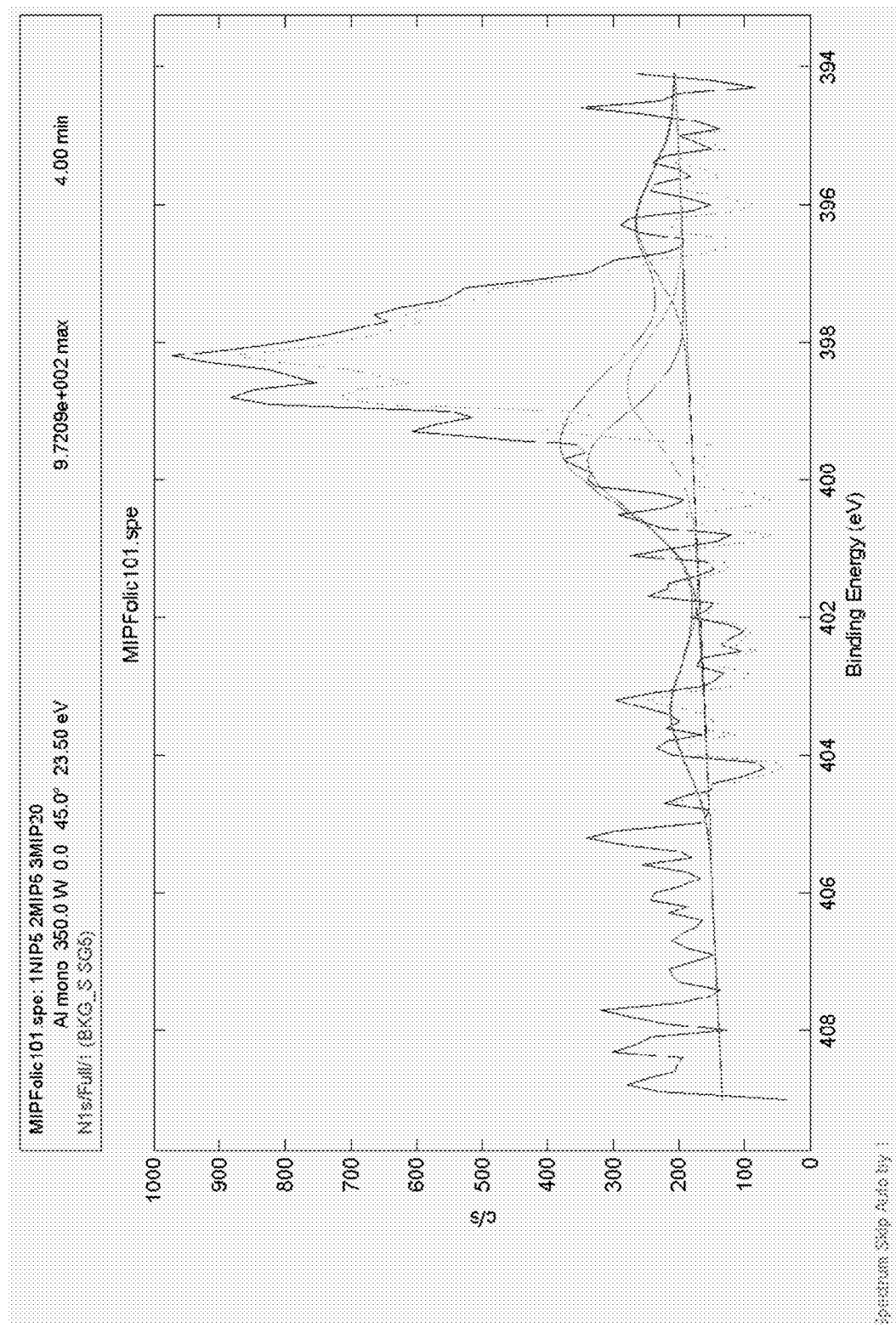
FIG. 4.16

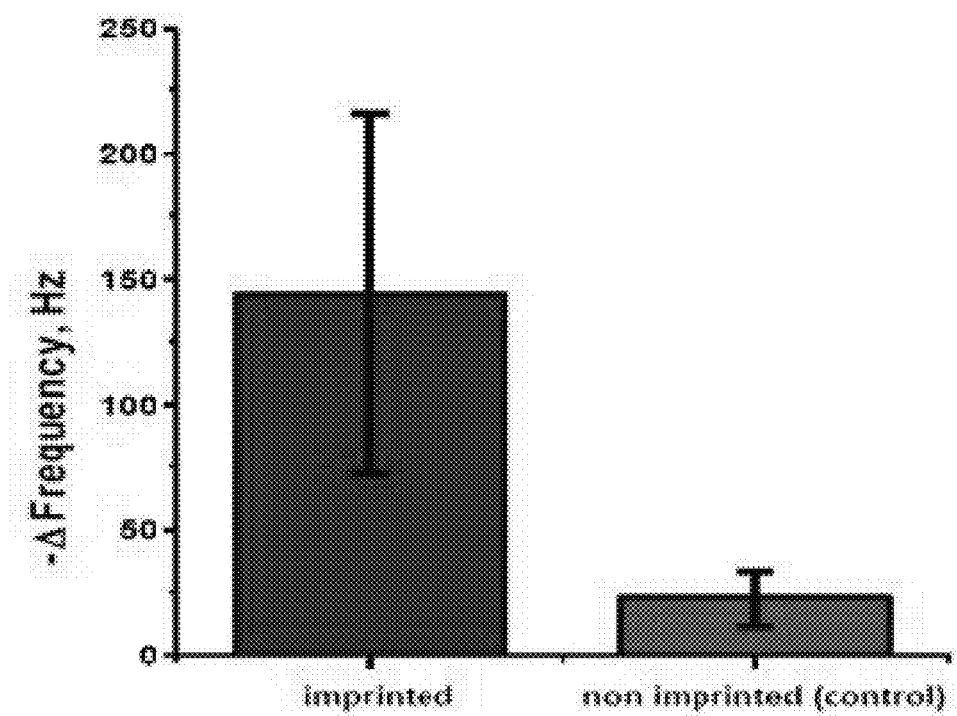
FIG. 4.17A
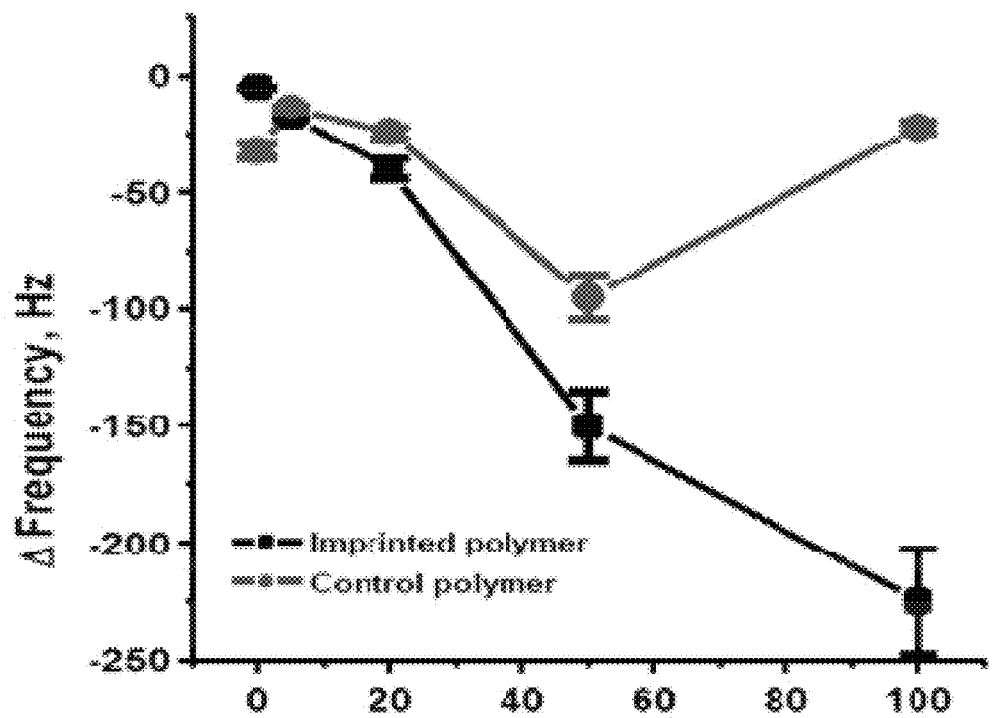
FIG. 4.17B

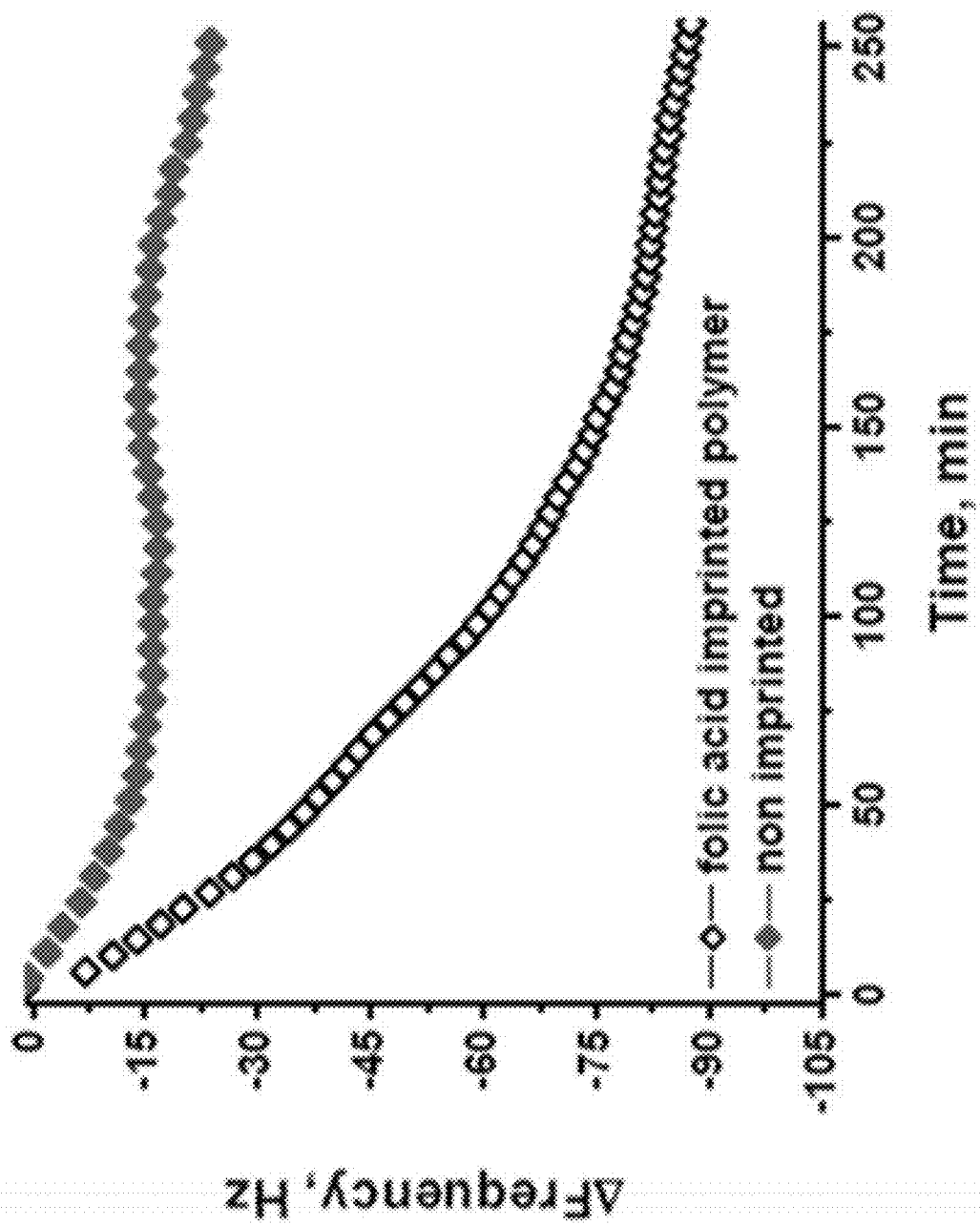
FIG. 4.18

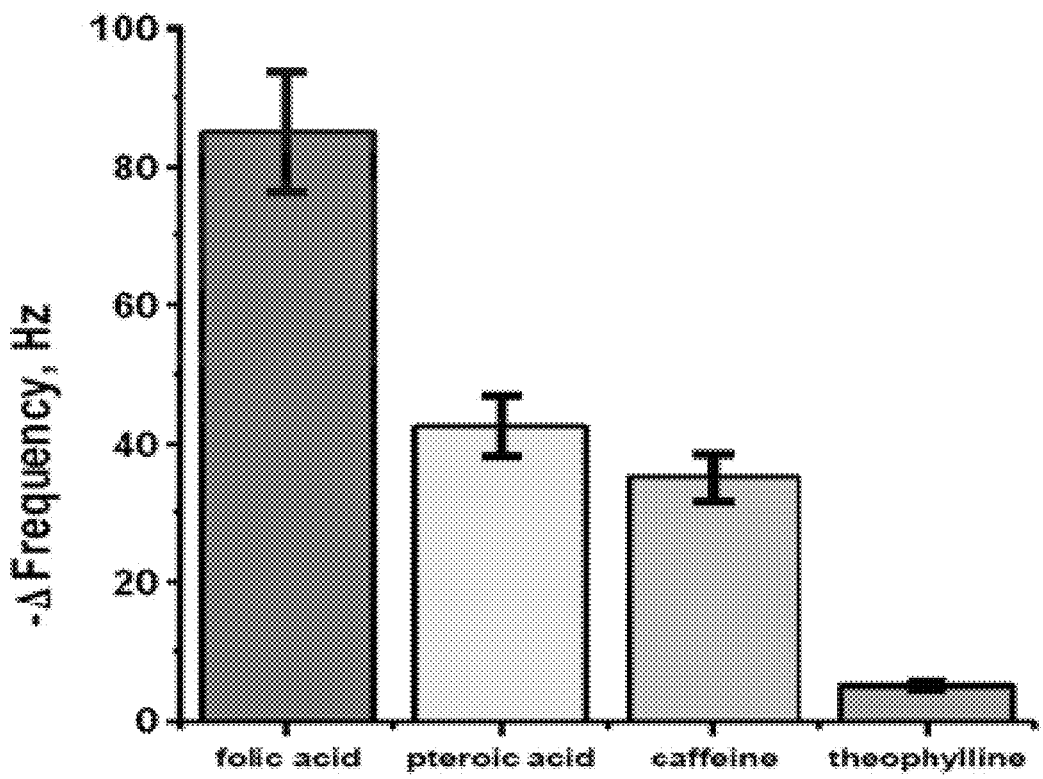
FIG. 4.19A
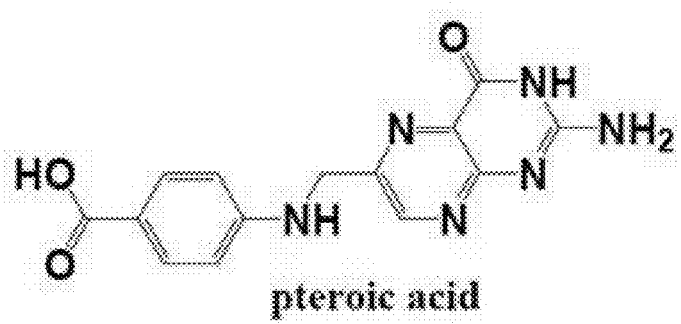
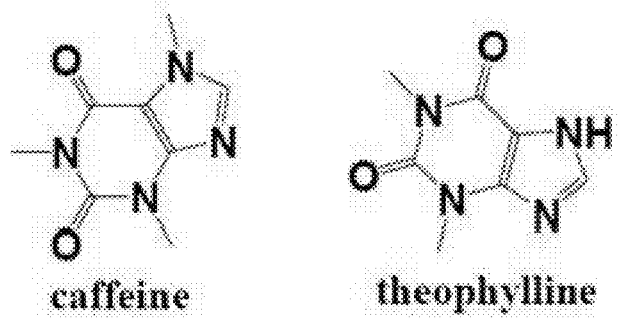
FIG. 4.19B

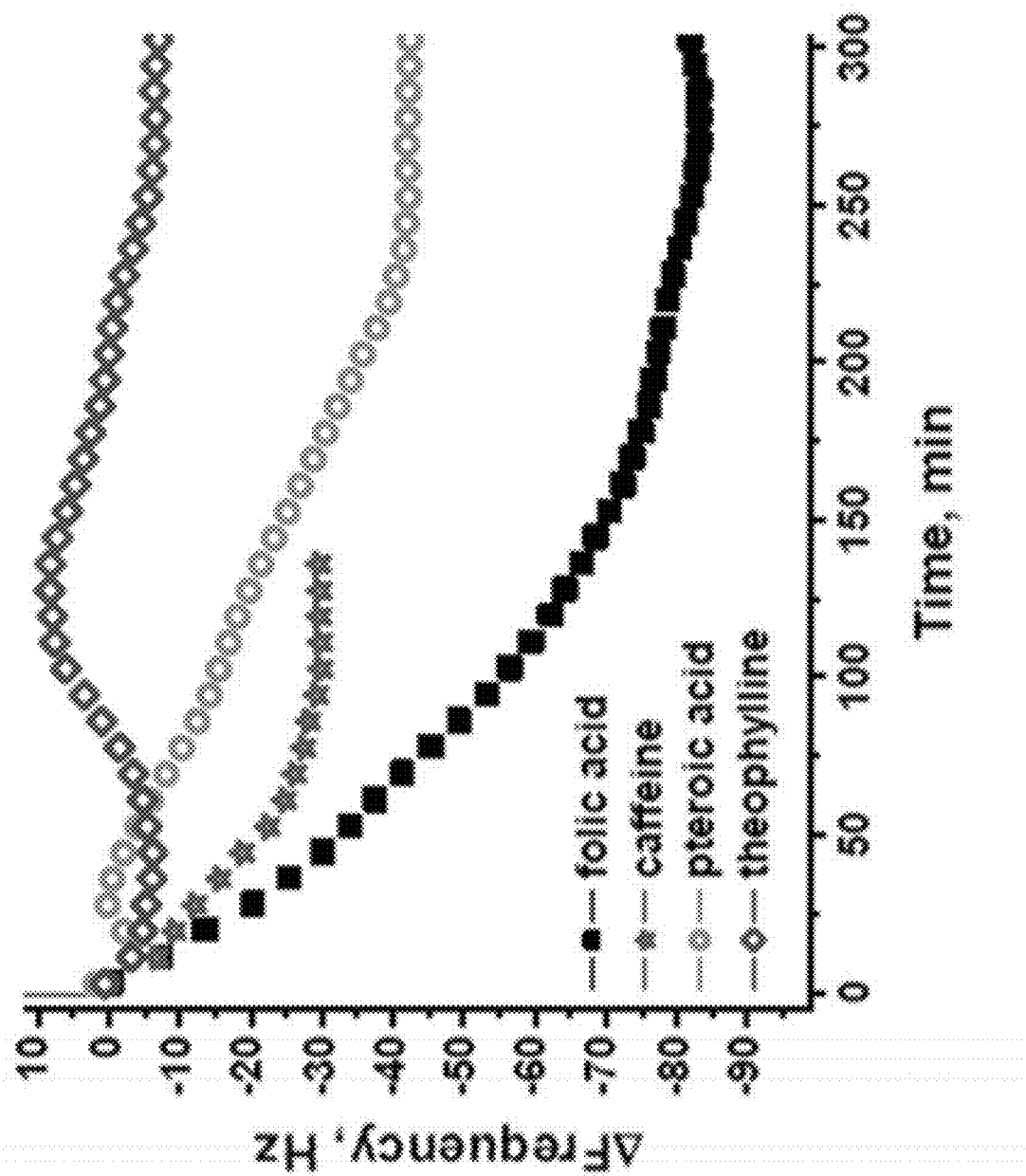
FIG. 4.20

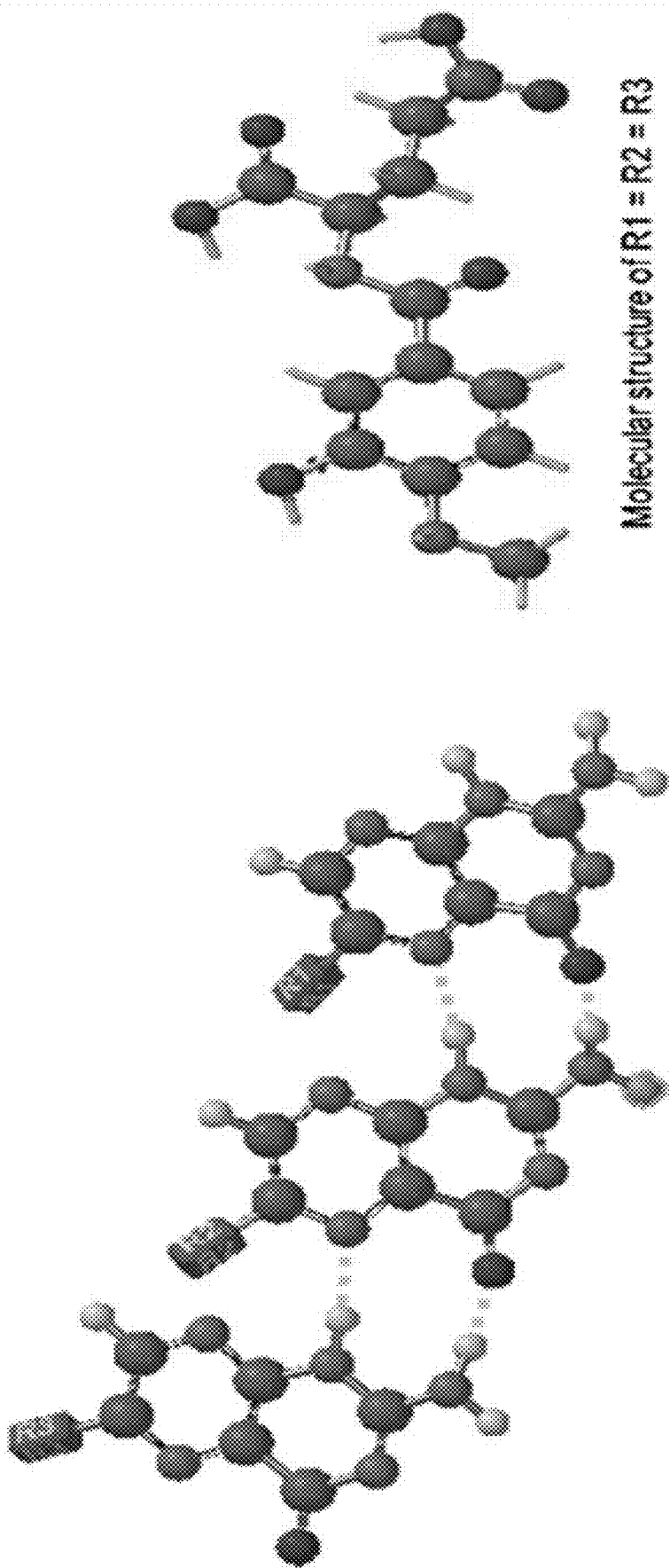
FIG. 4.21

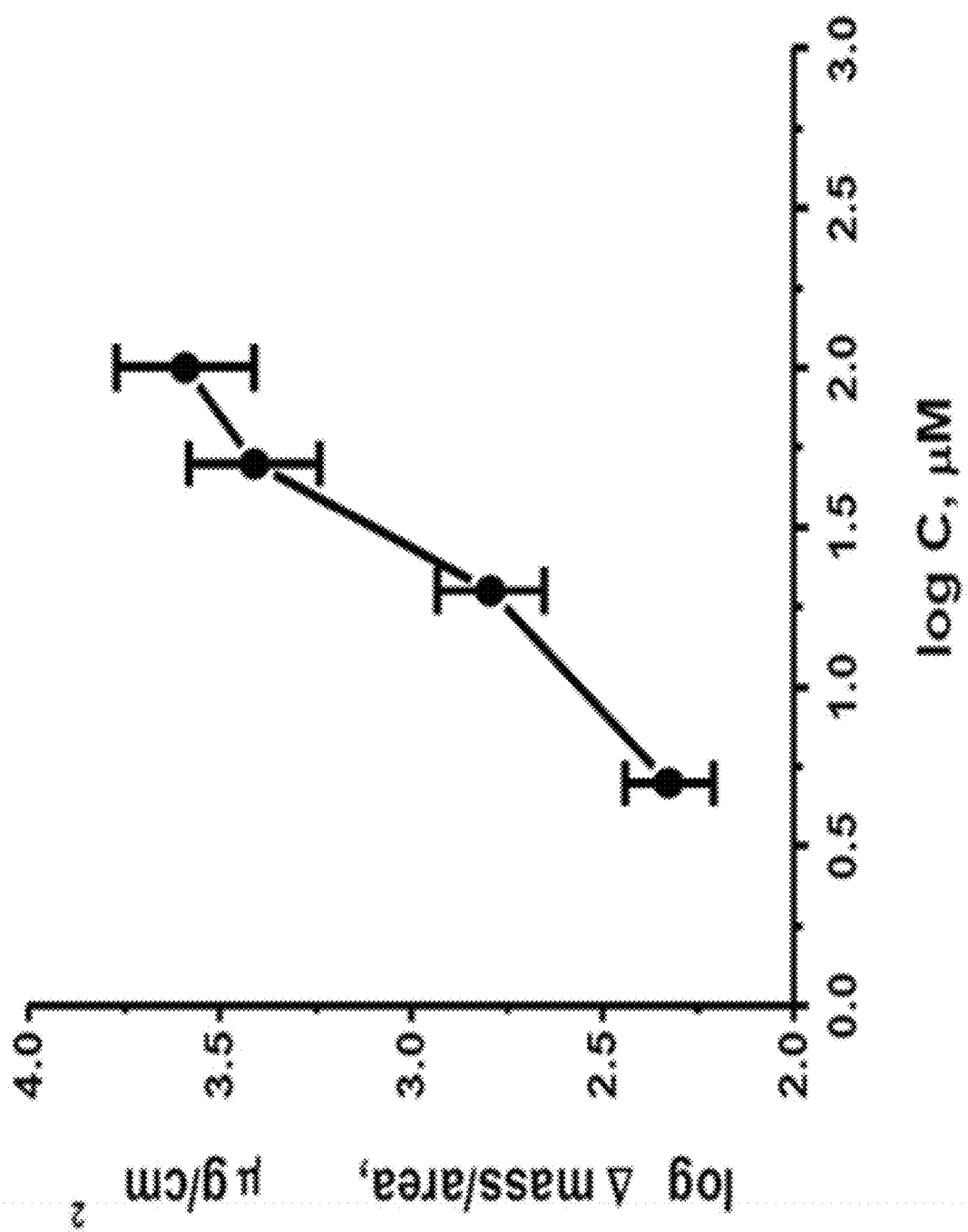
FIG. 4.22

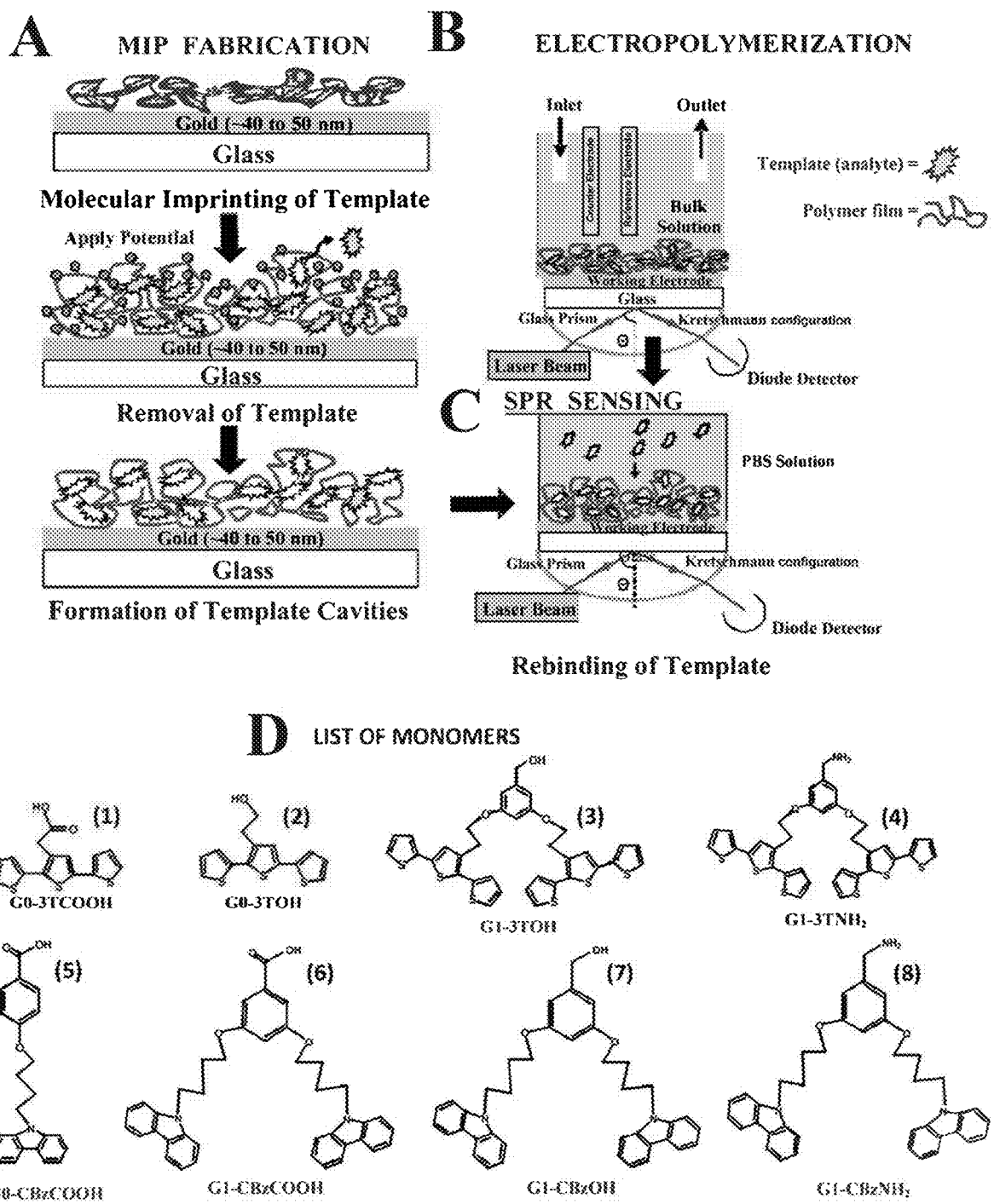
FIG. 5.1A-D

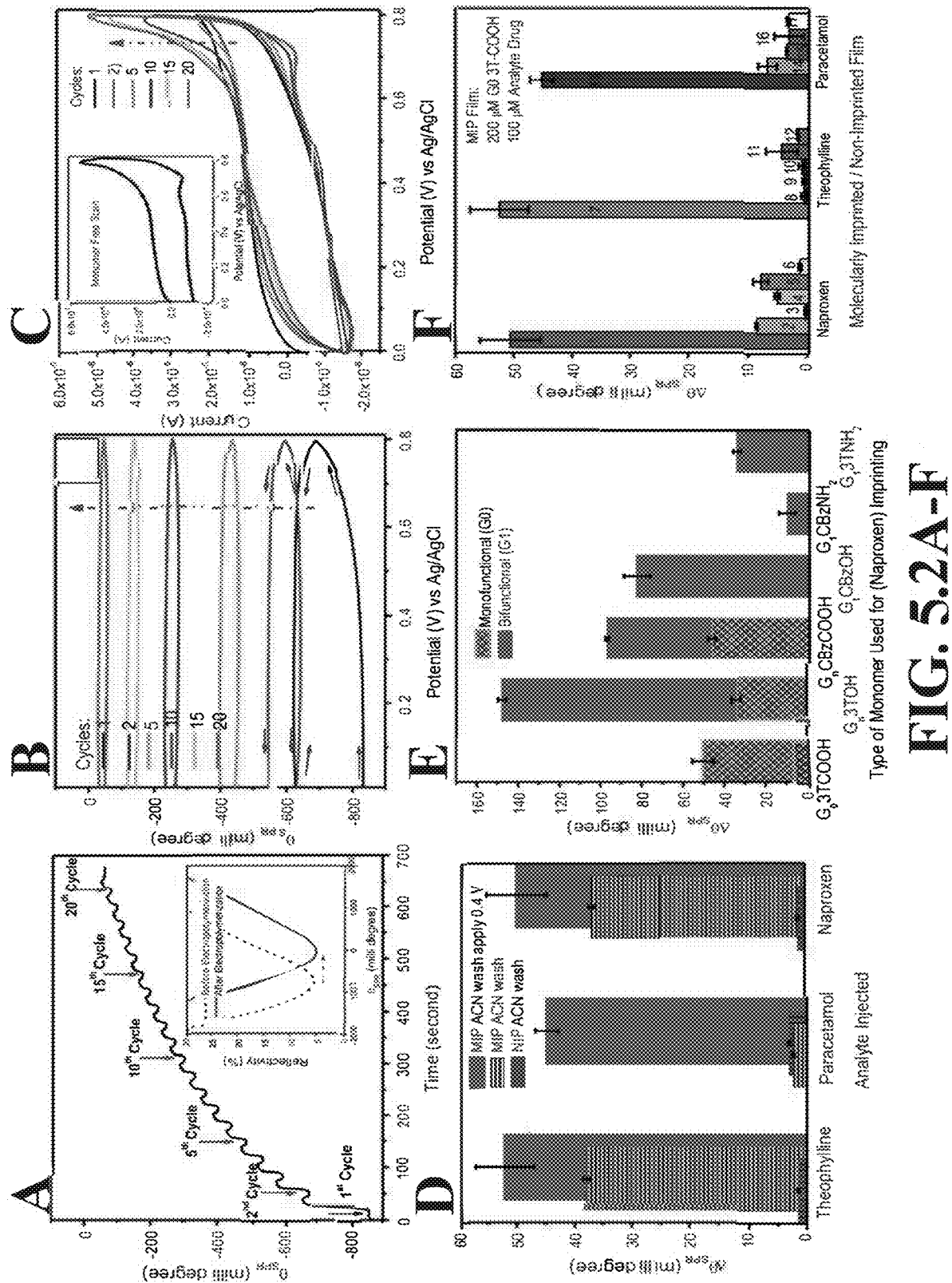
FIG. 5.2A-F

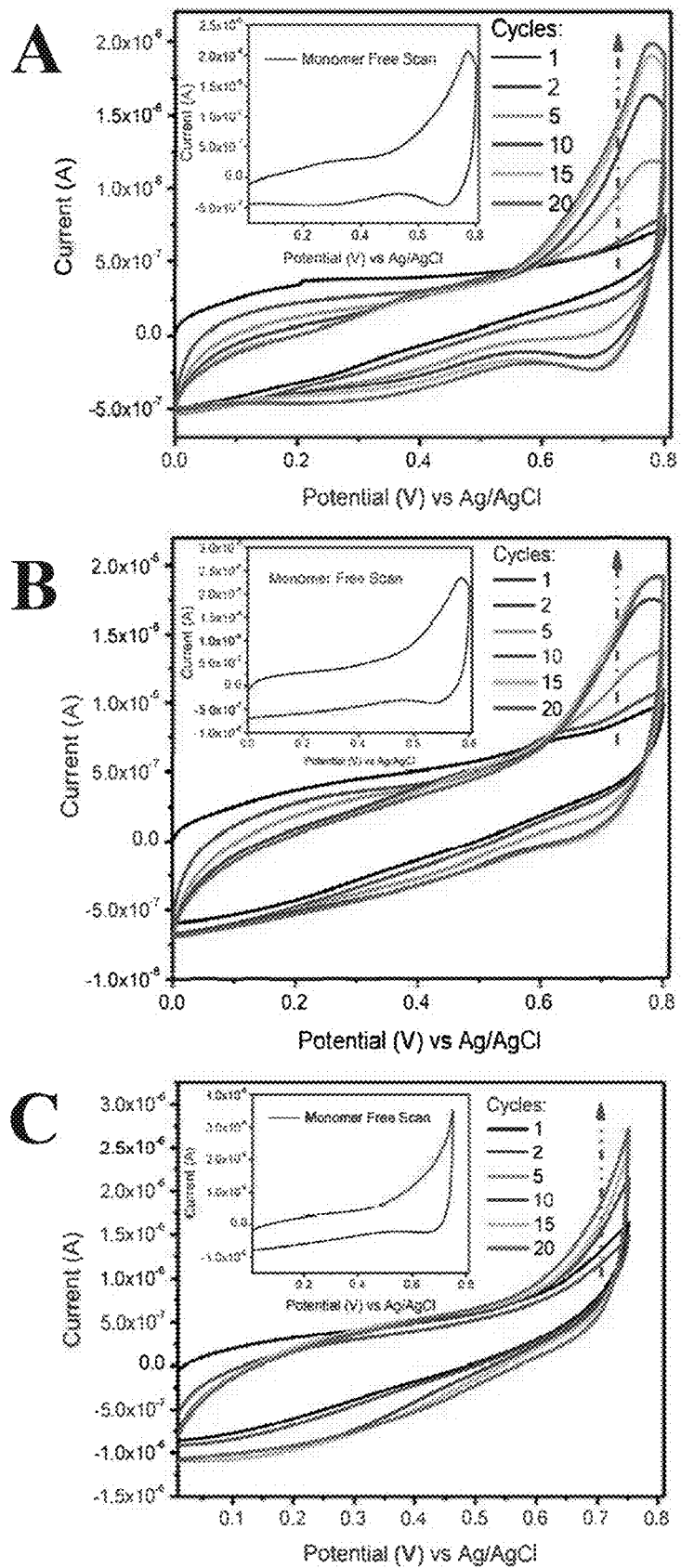
FIG. 5.3A-C

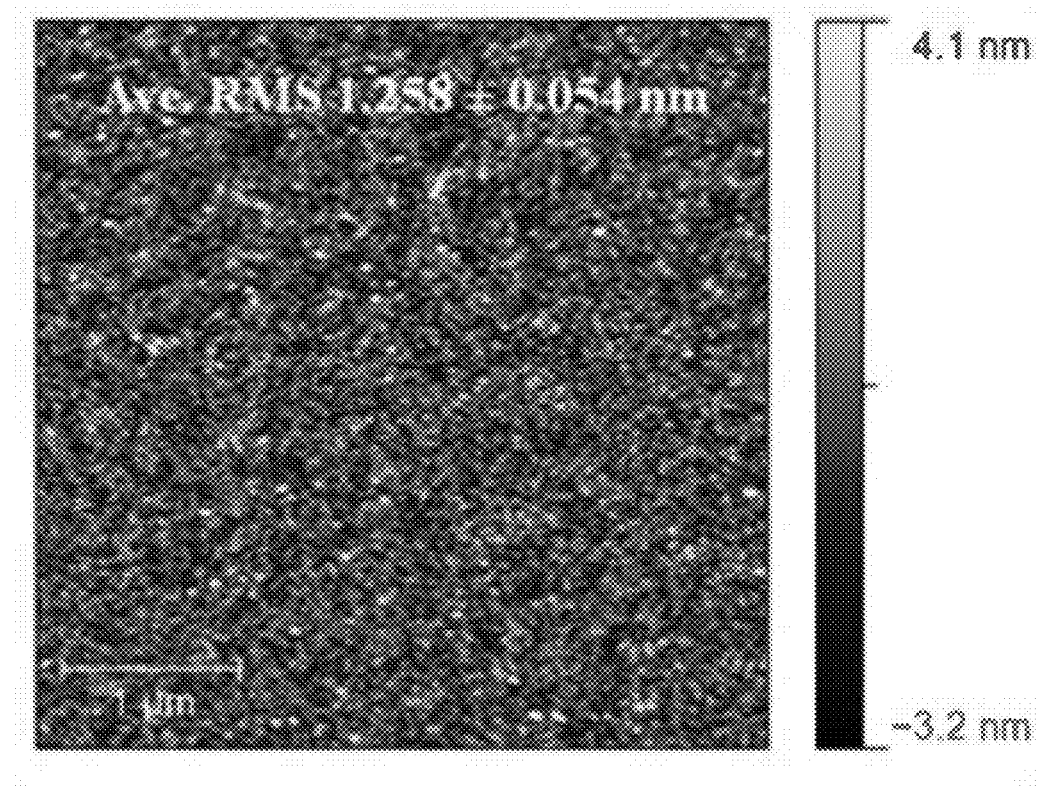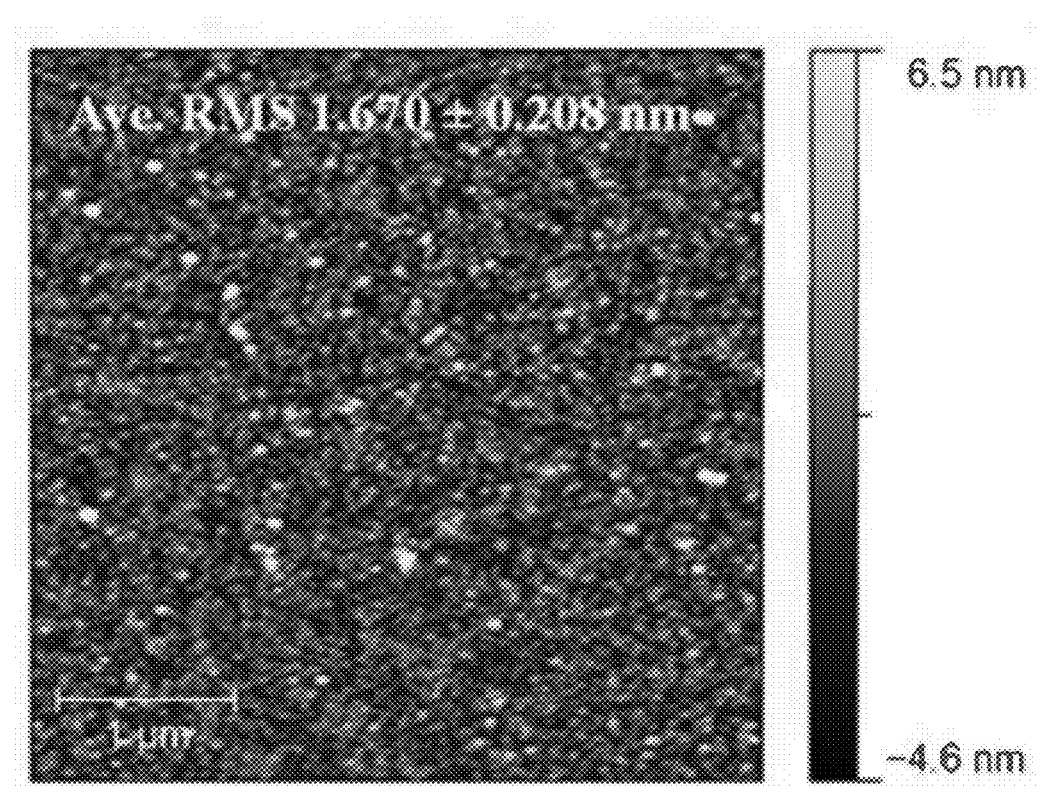
FIG. 5.4A

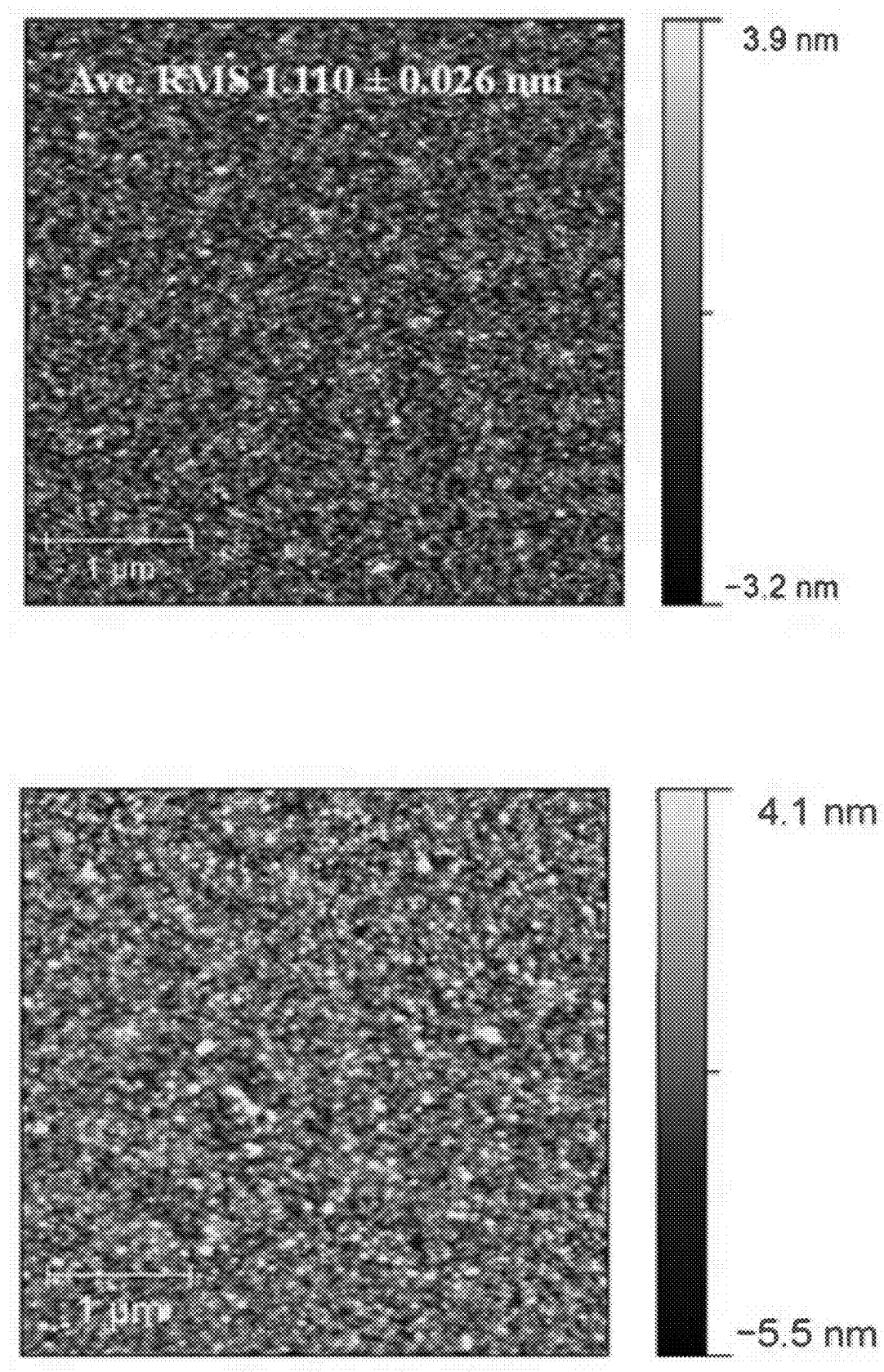
FIG. 5.4B

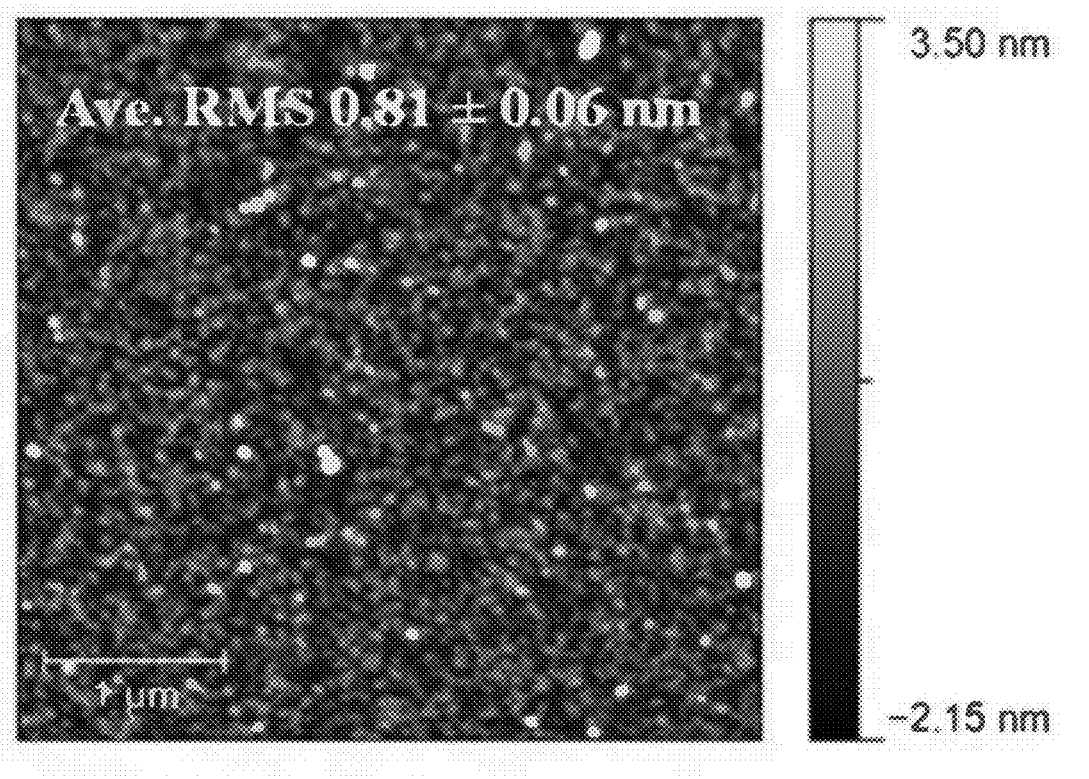
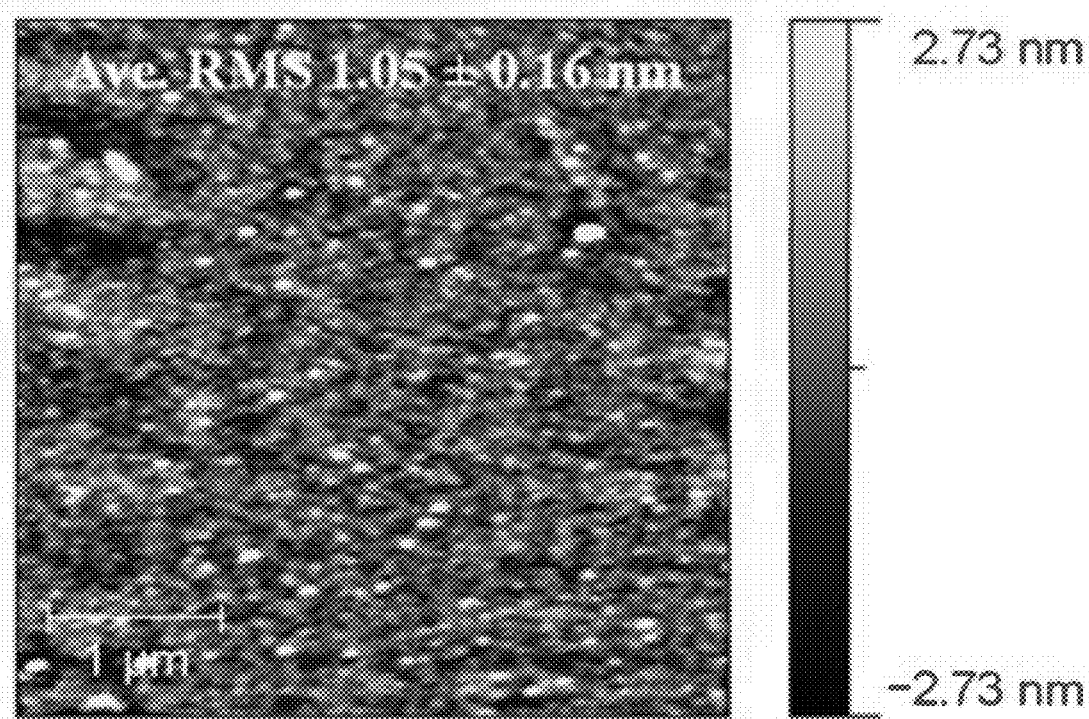
FIG. 5.4C

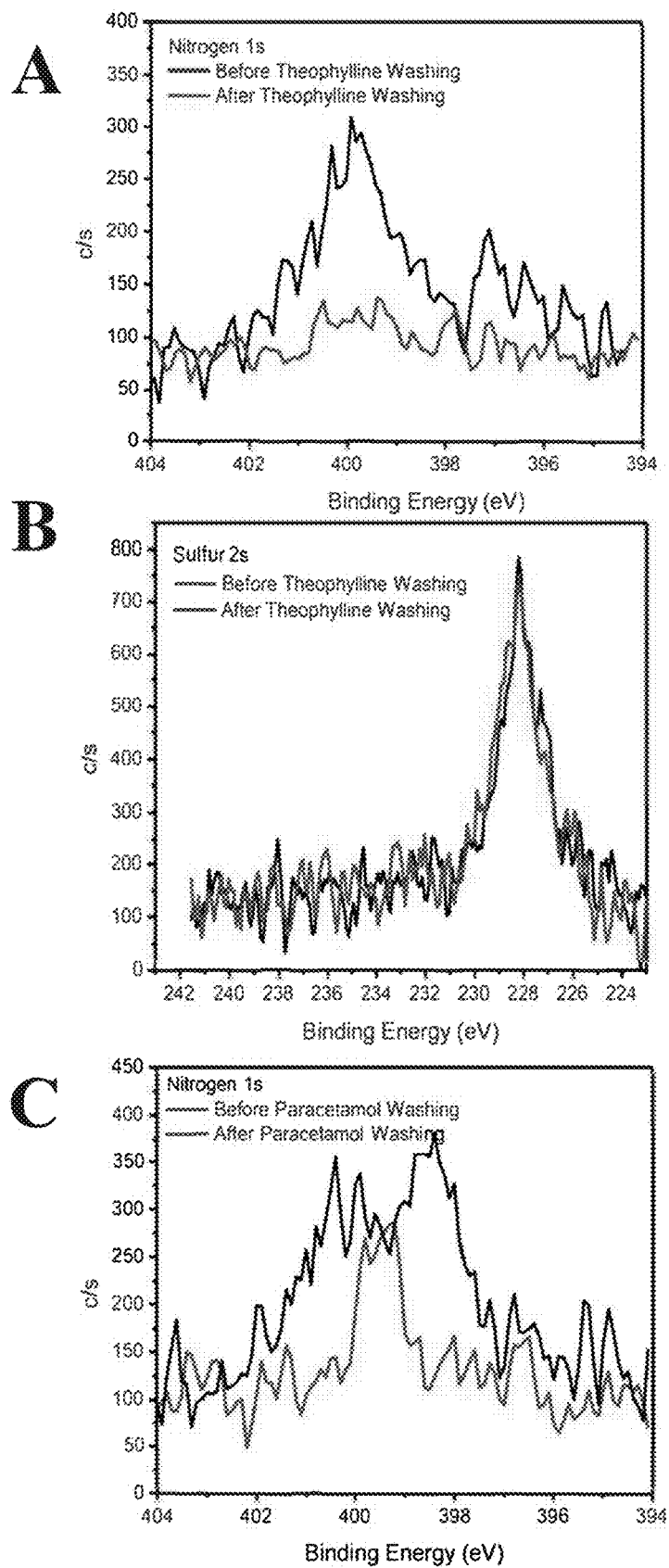
FIG. 5.5A-C

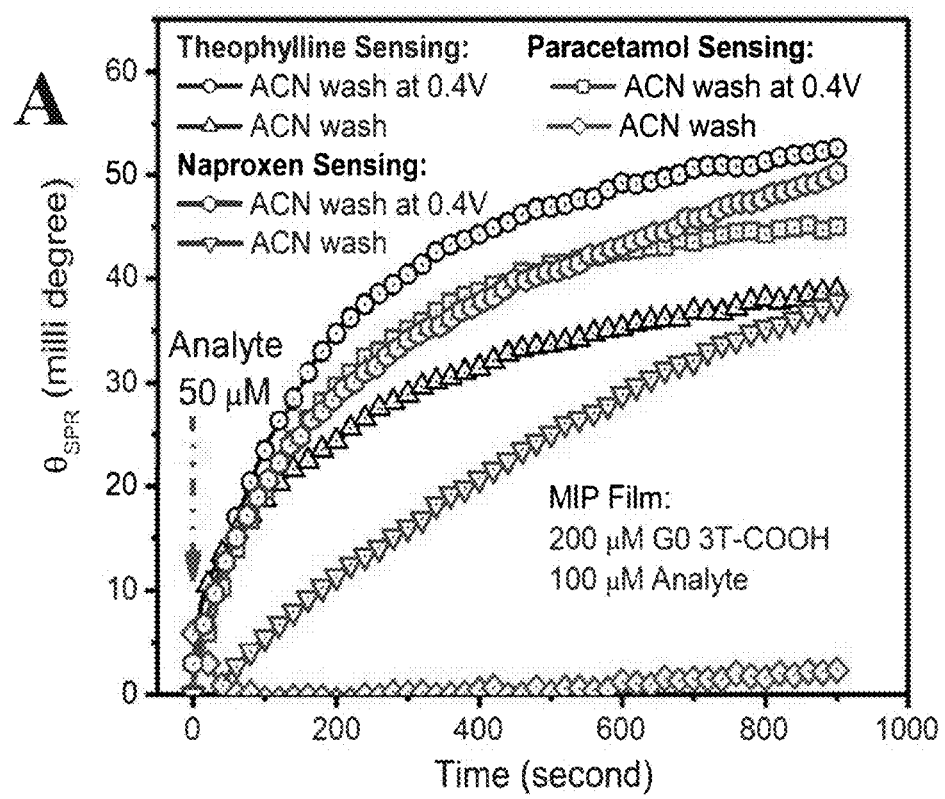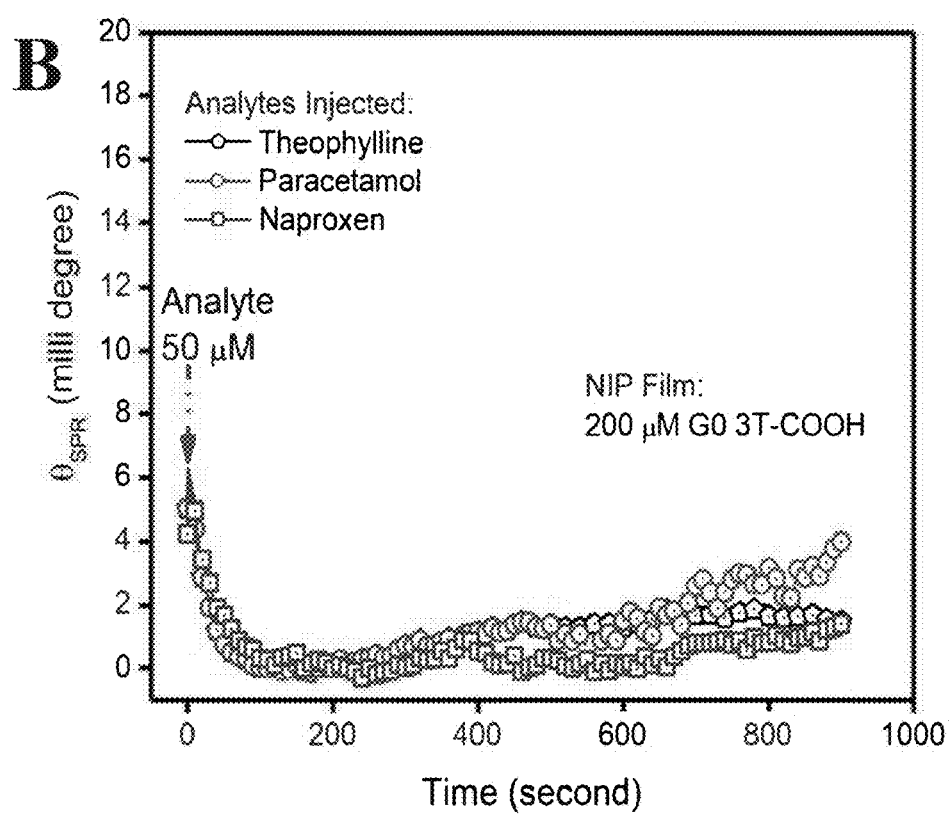
FIG. 5.6A&B

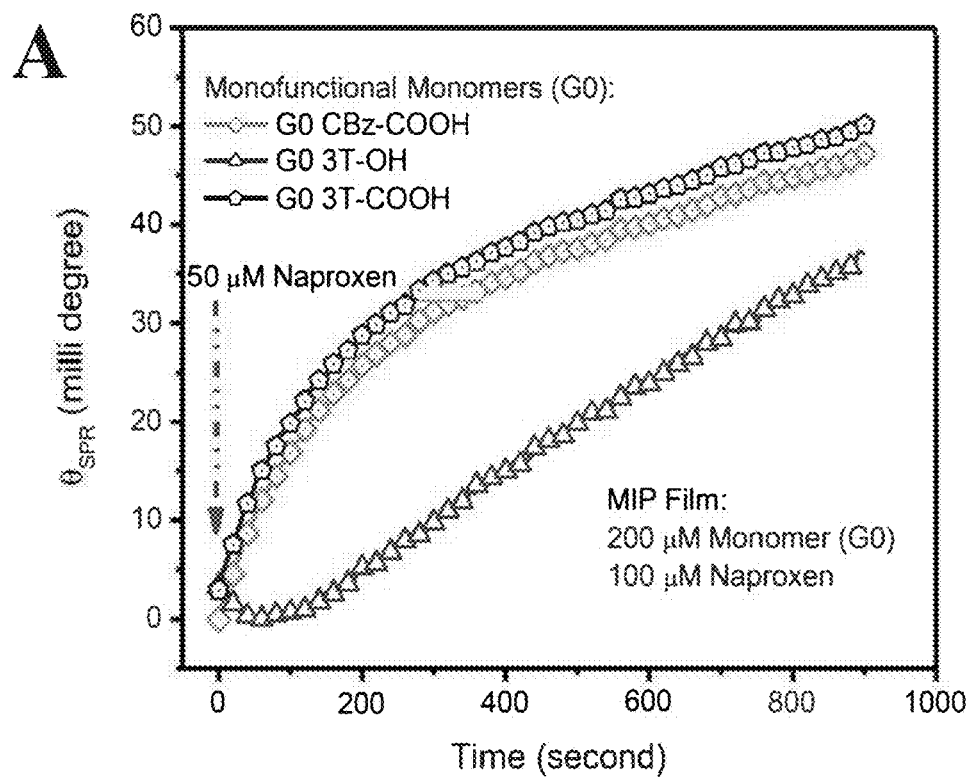
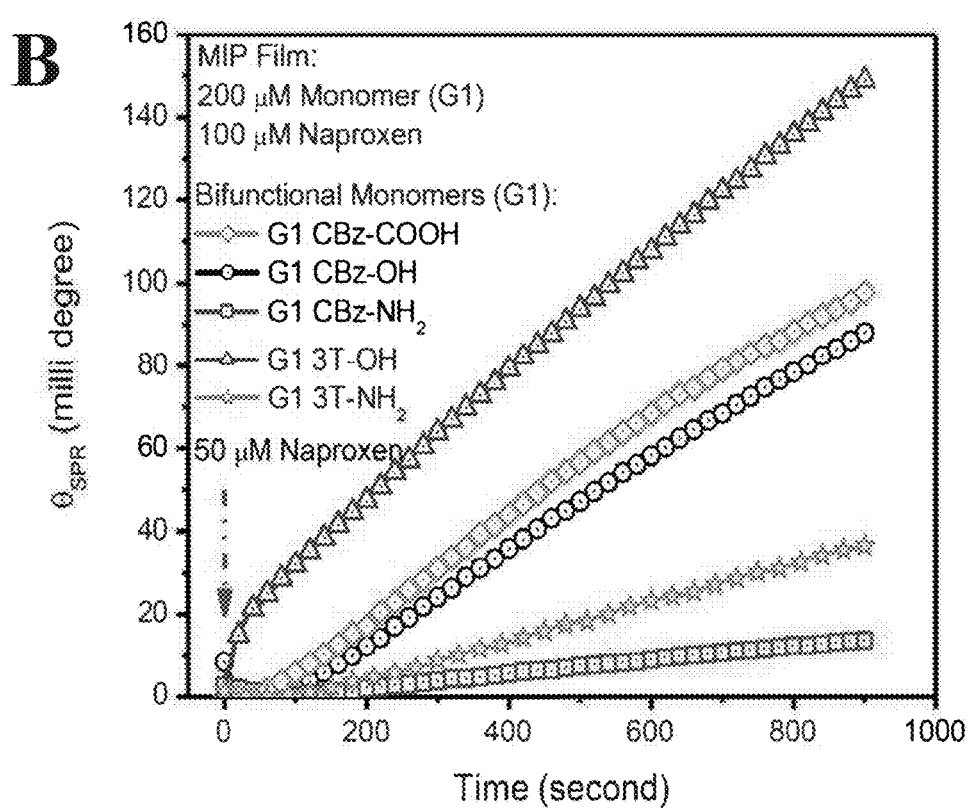
FIG. 5.7A&B

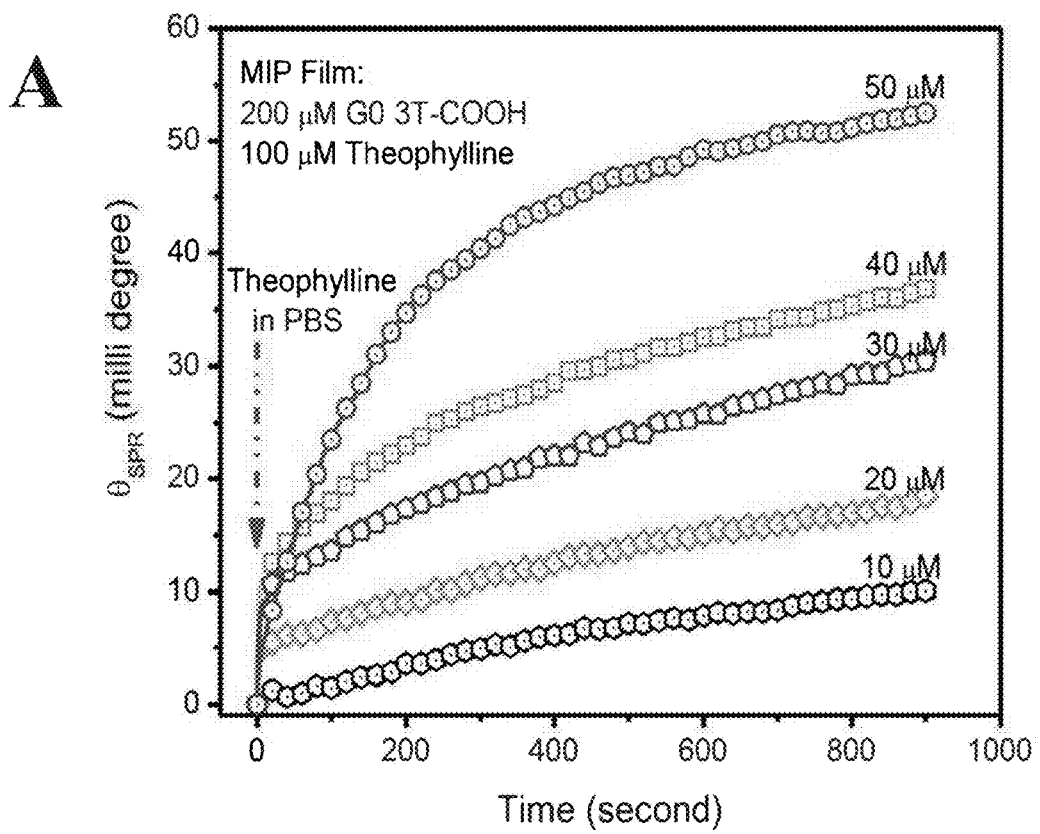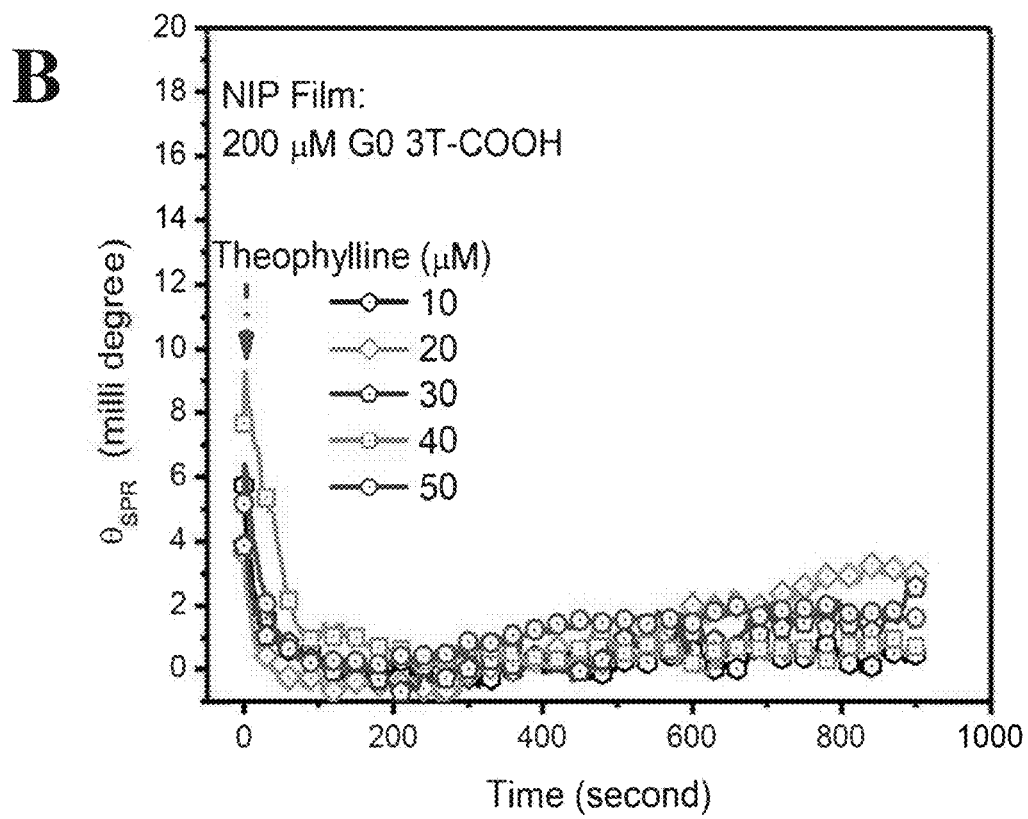
FIG. 5.8A&B

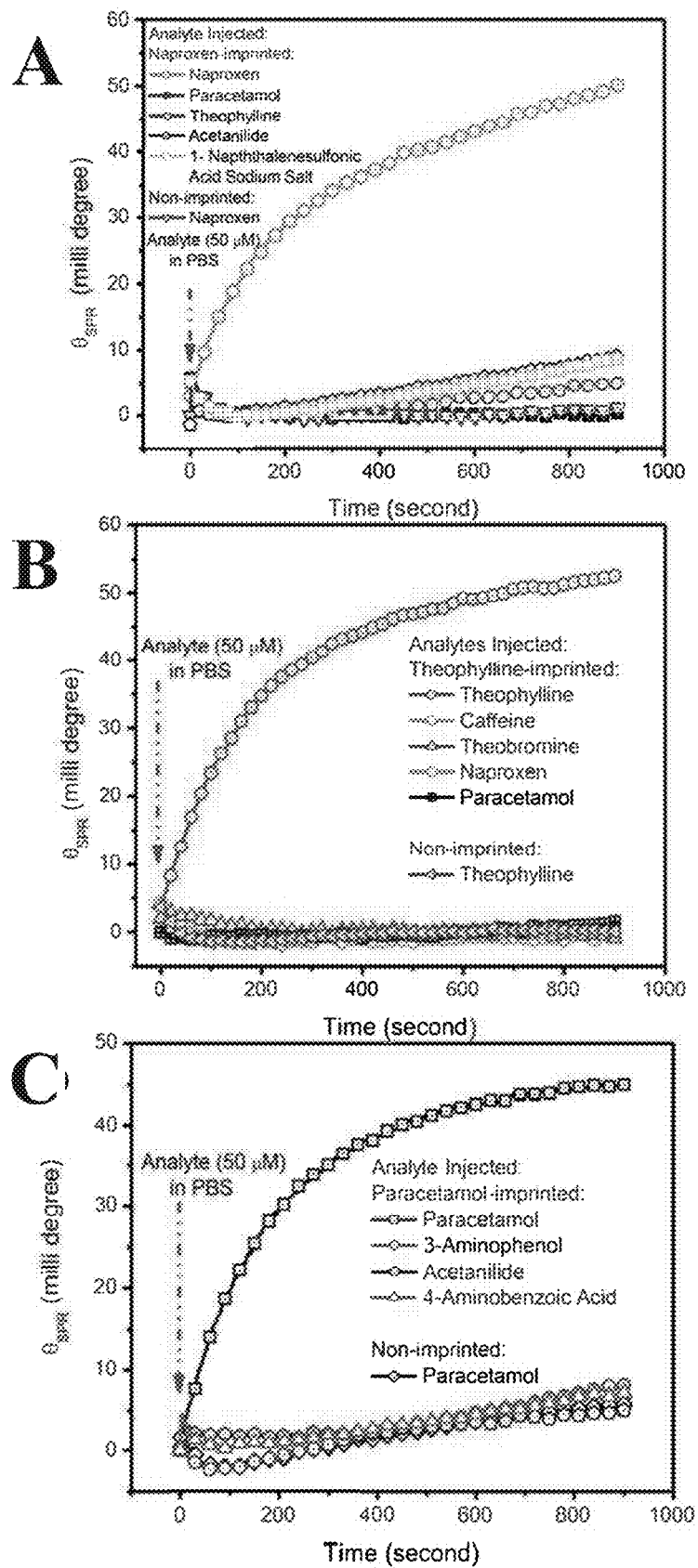
FIG. 5.9A-C

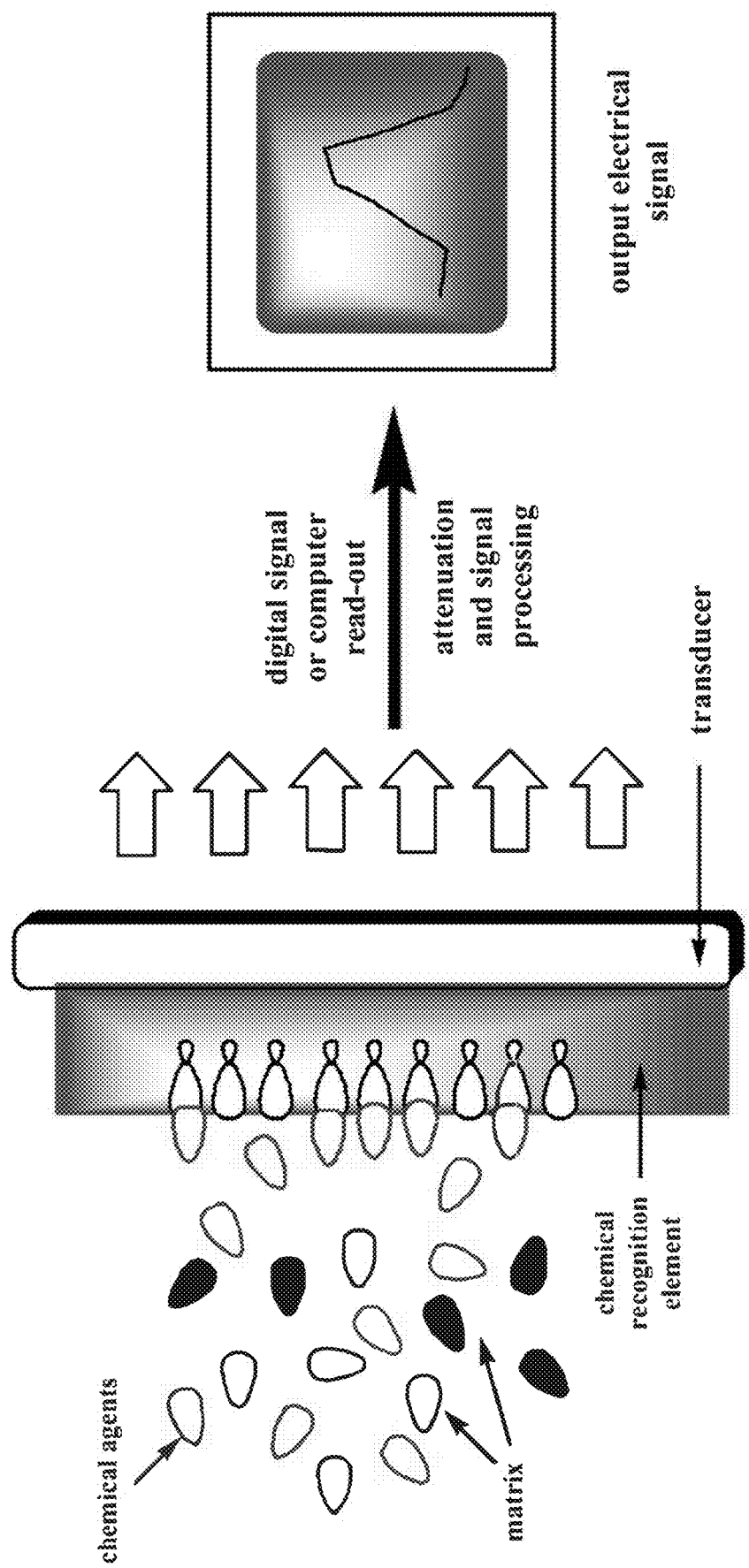
FIG. 6.1

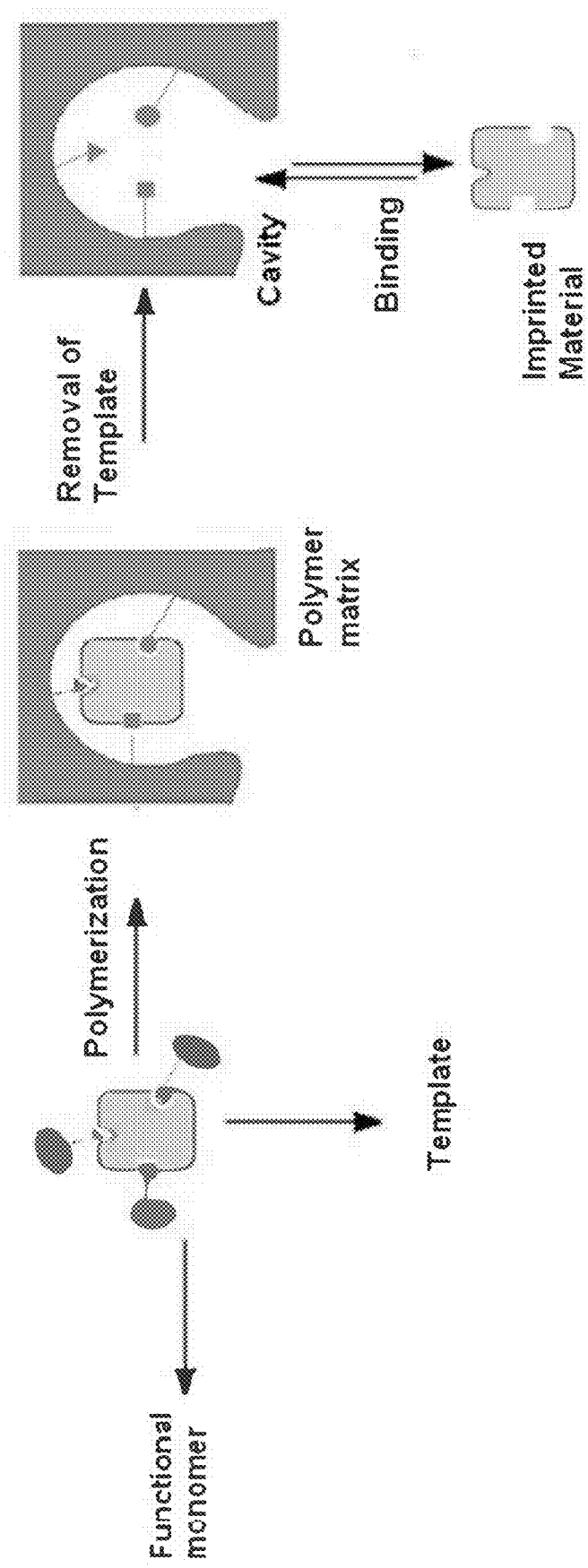
FIG. 6.2

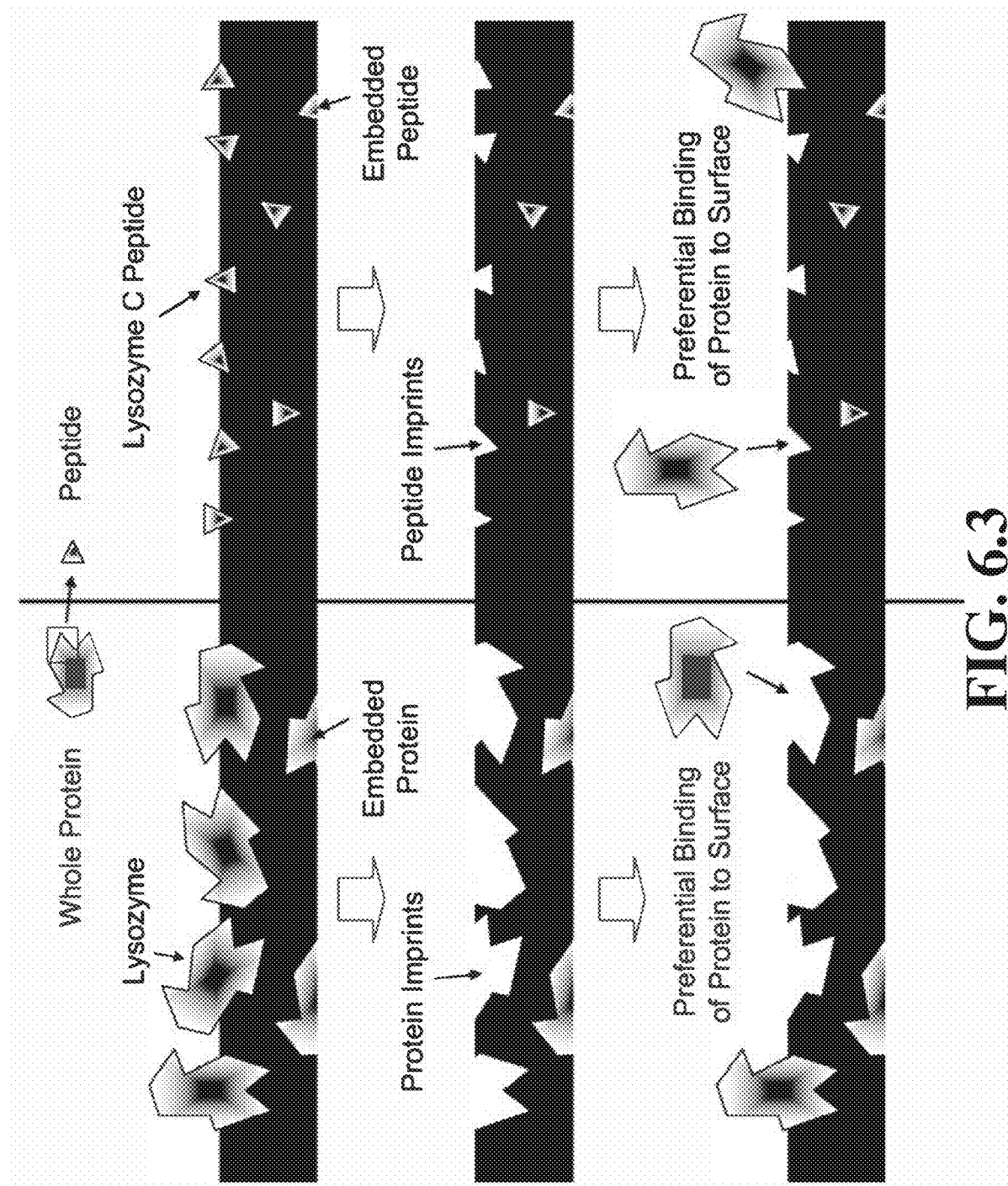
FIG. 6.3

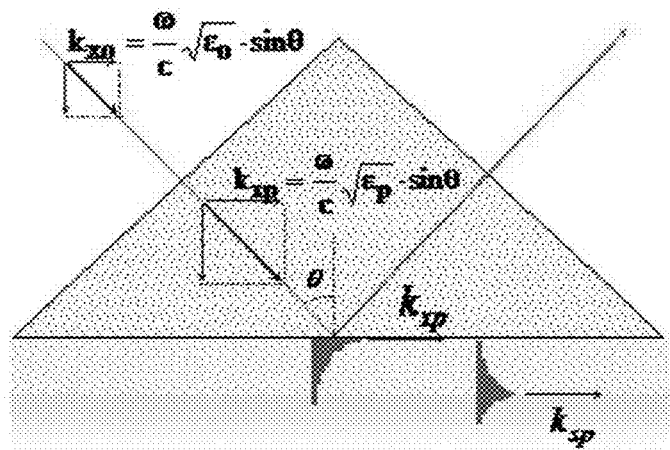
FIG. 6.4A
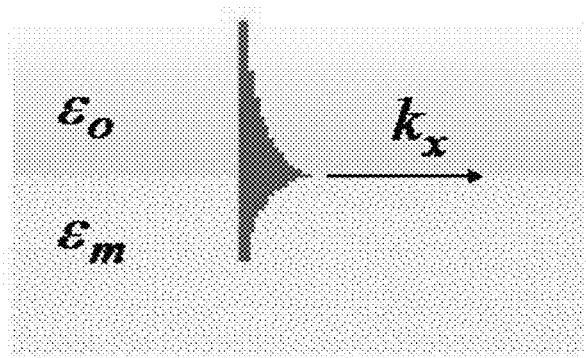
FIG. 6.4B
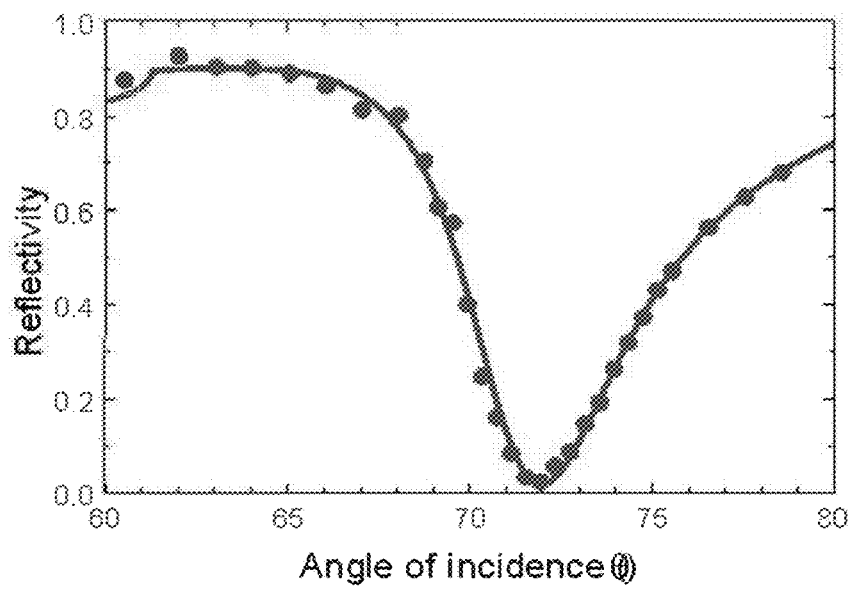
FIG. 6.4C

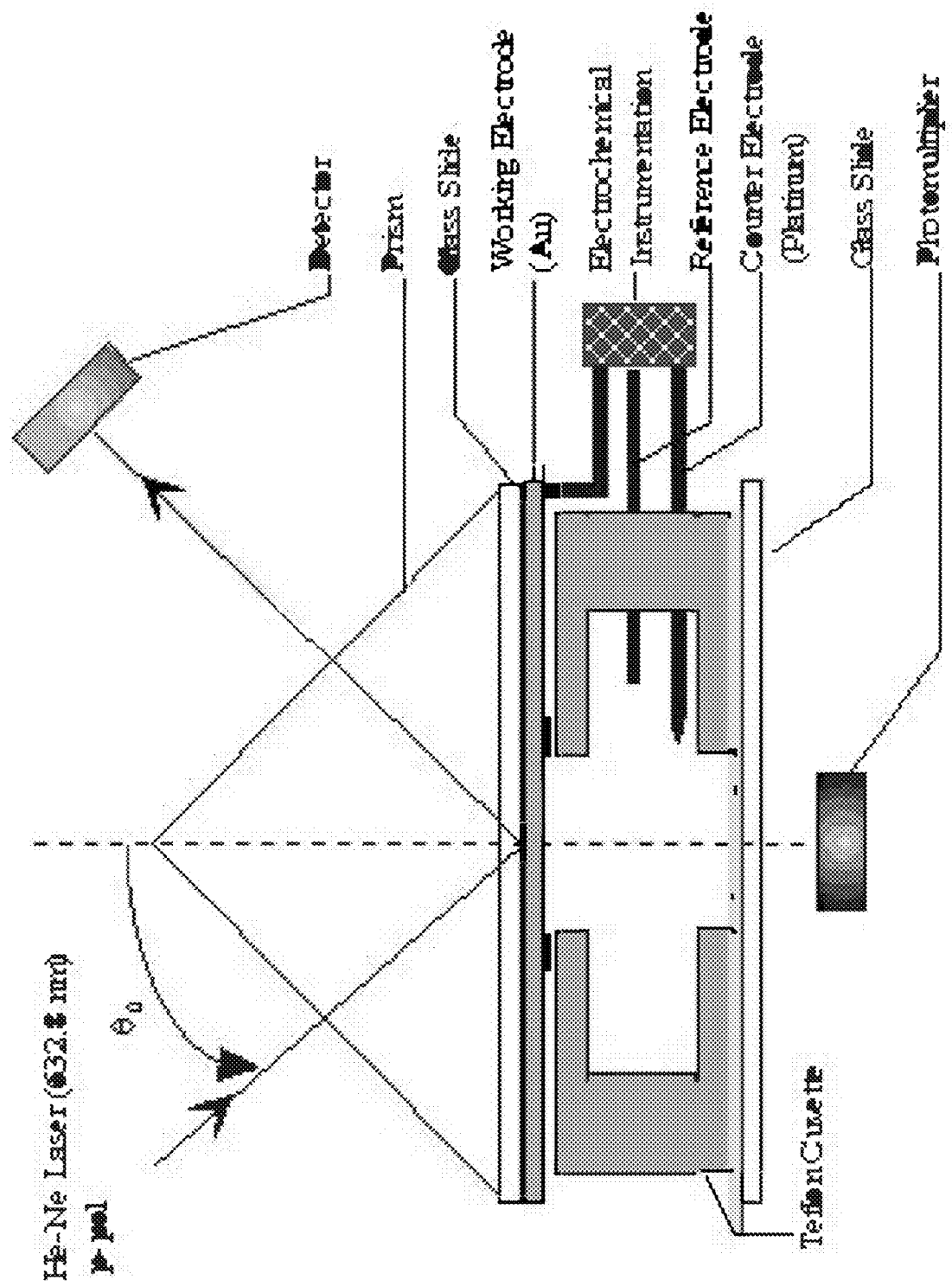
FIG. 6.5

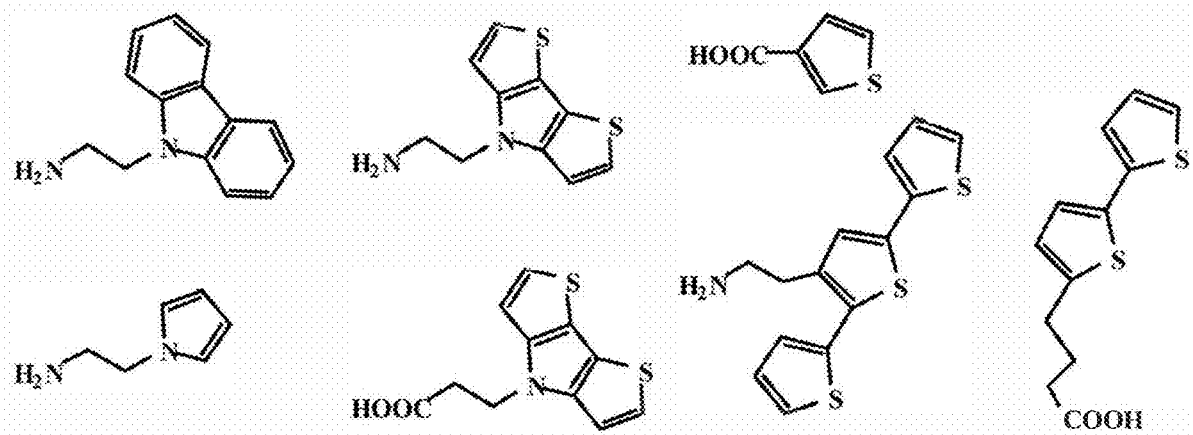
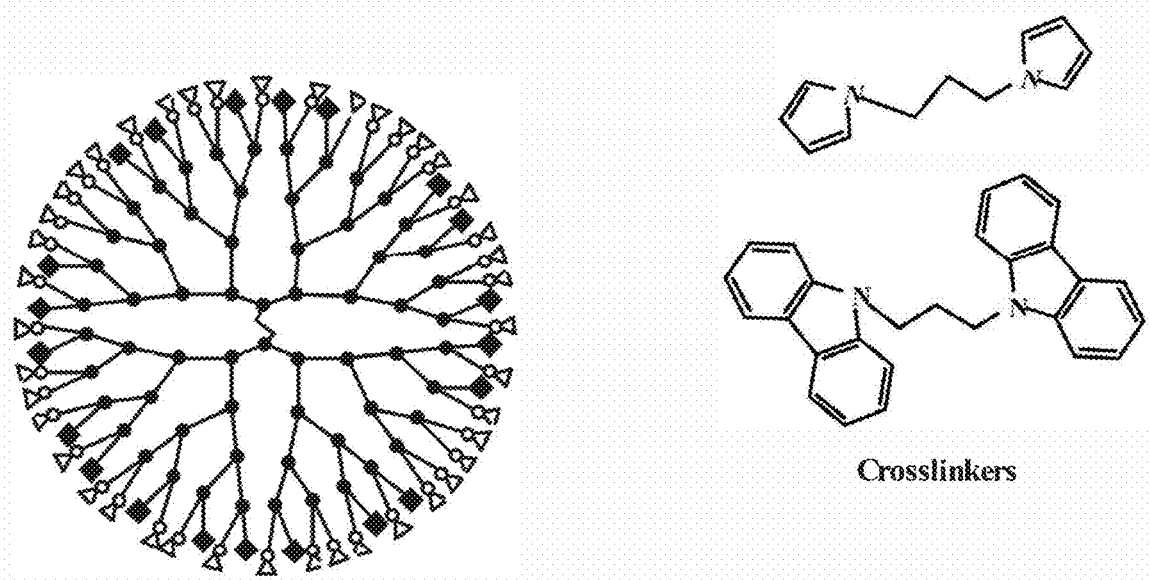
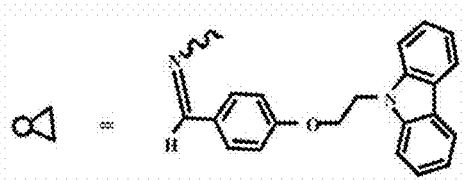
FIG. 6.6

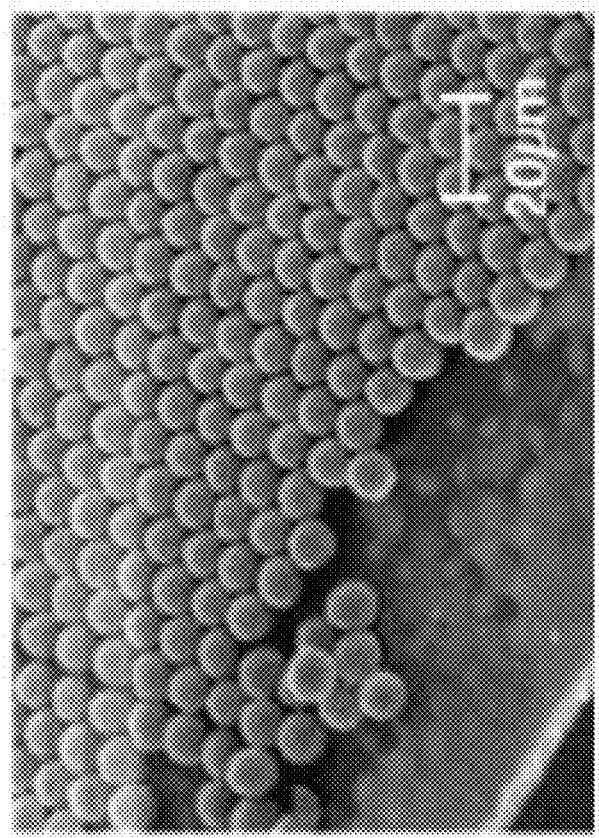
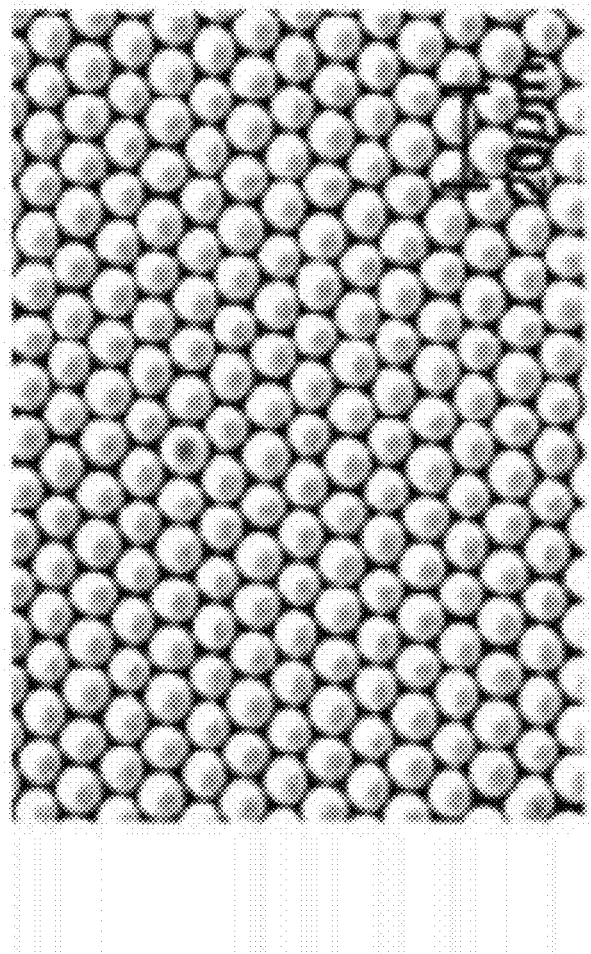
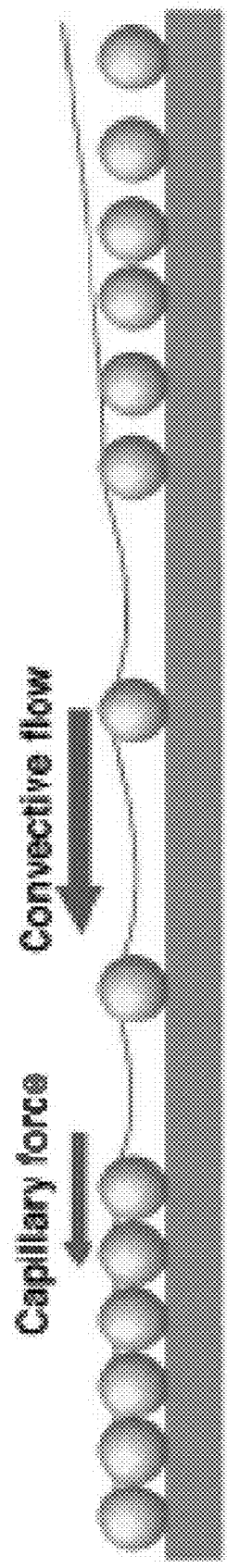
FIG. 6.7

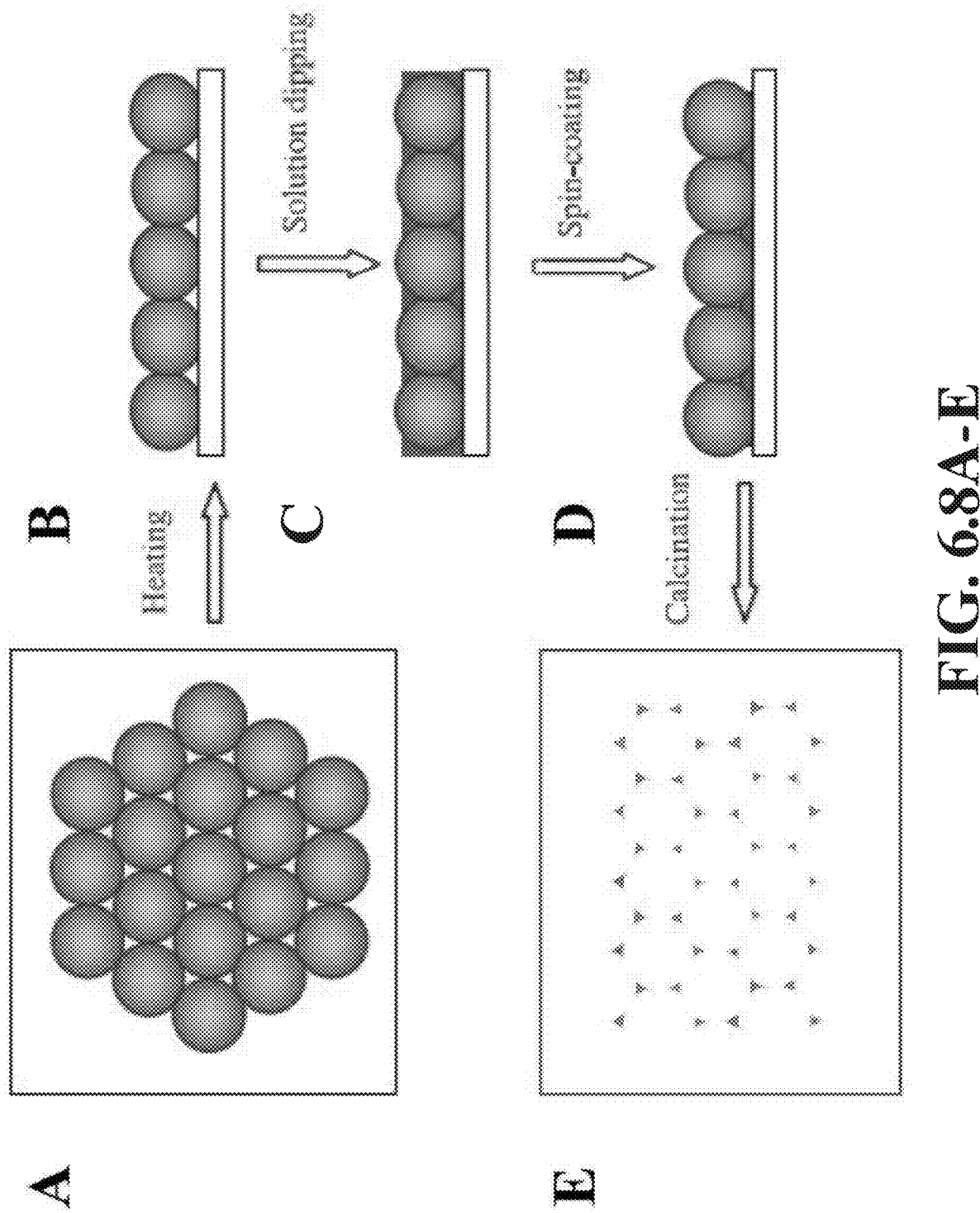
FIG. 6.8A-E

A
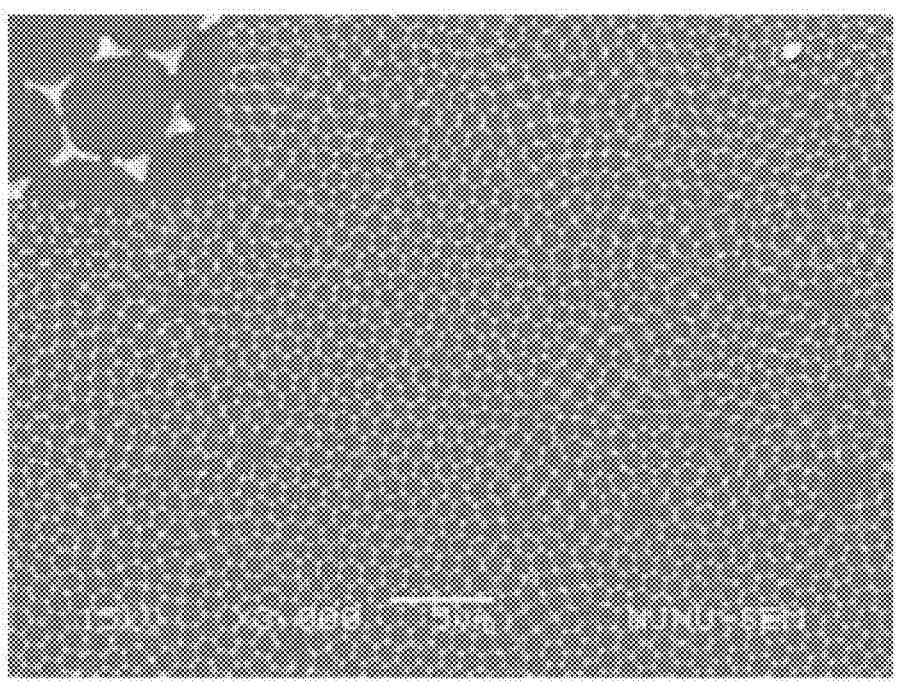
B
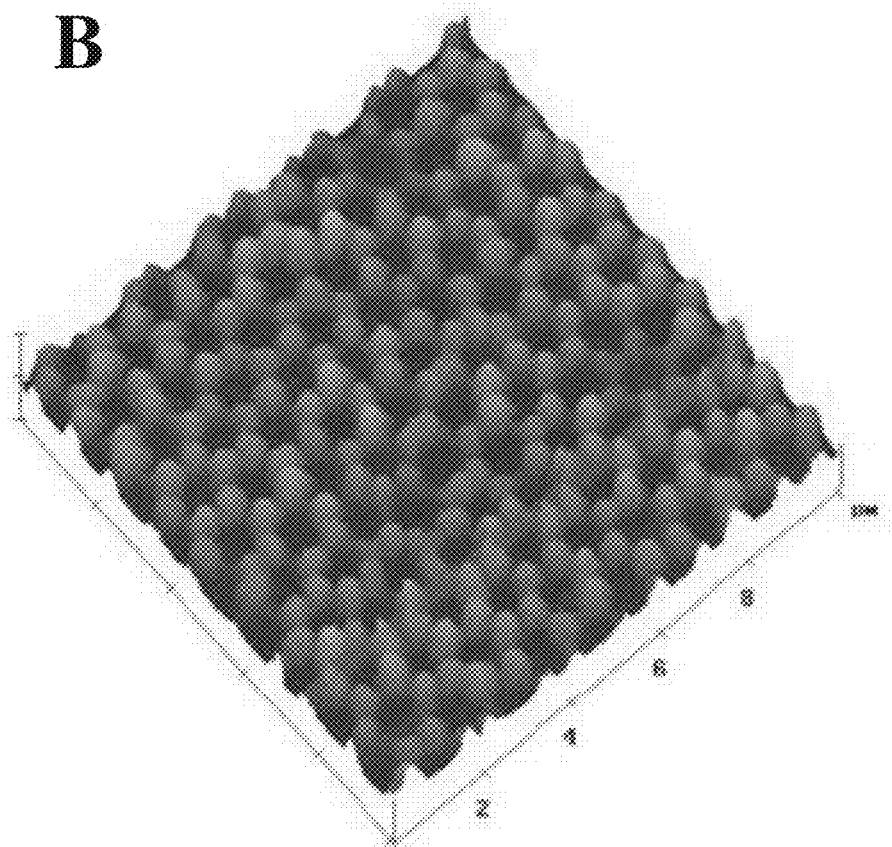
FIG. 6.9A&B

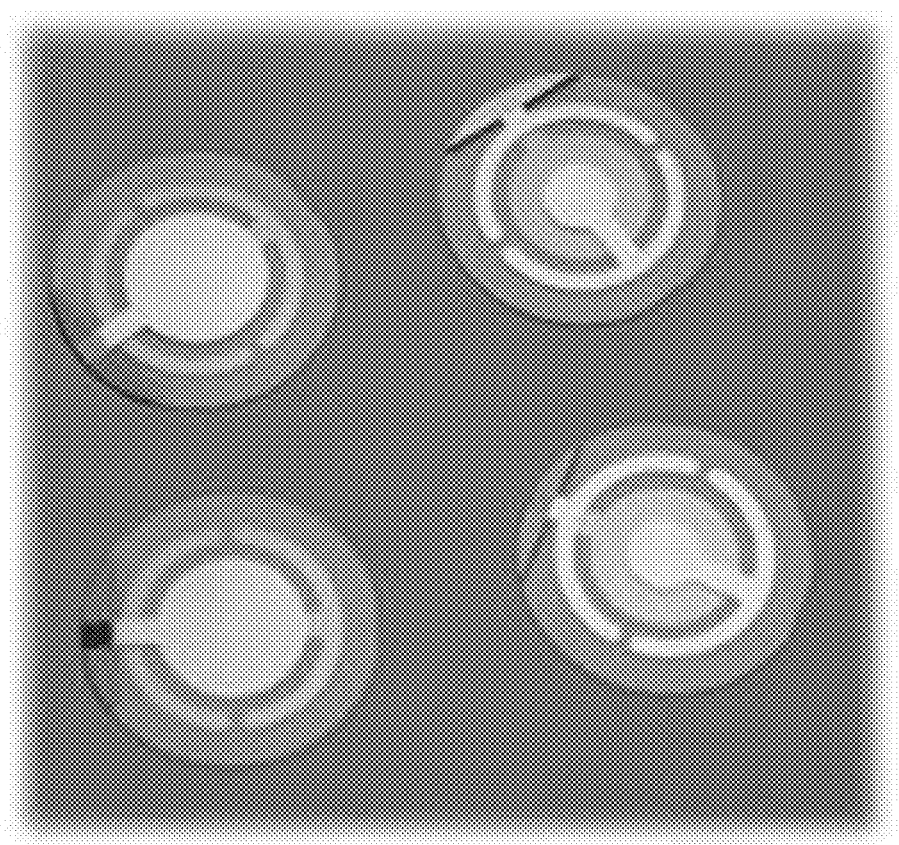
FIG. 6.10A
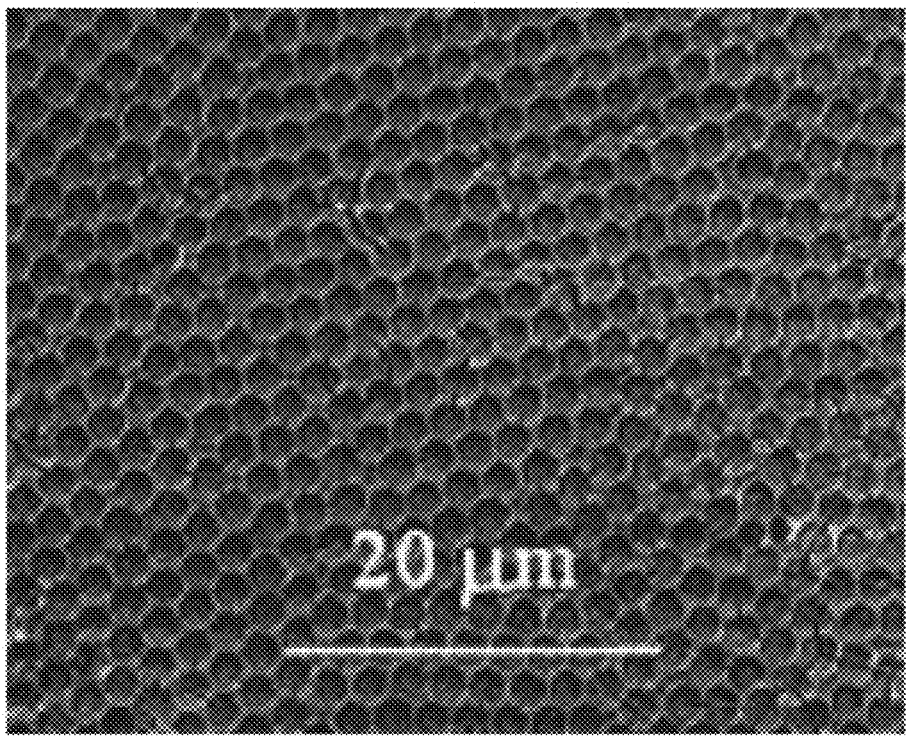
FIG. 6.10B

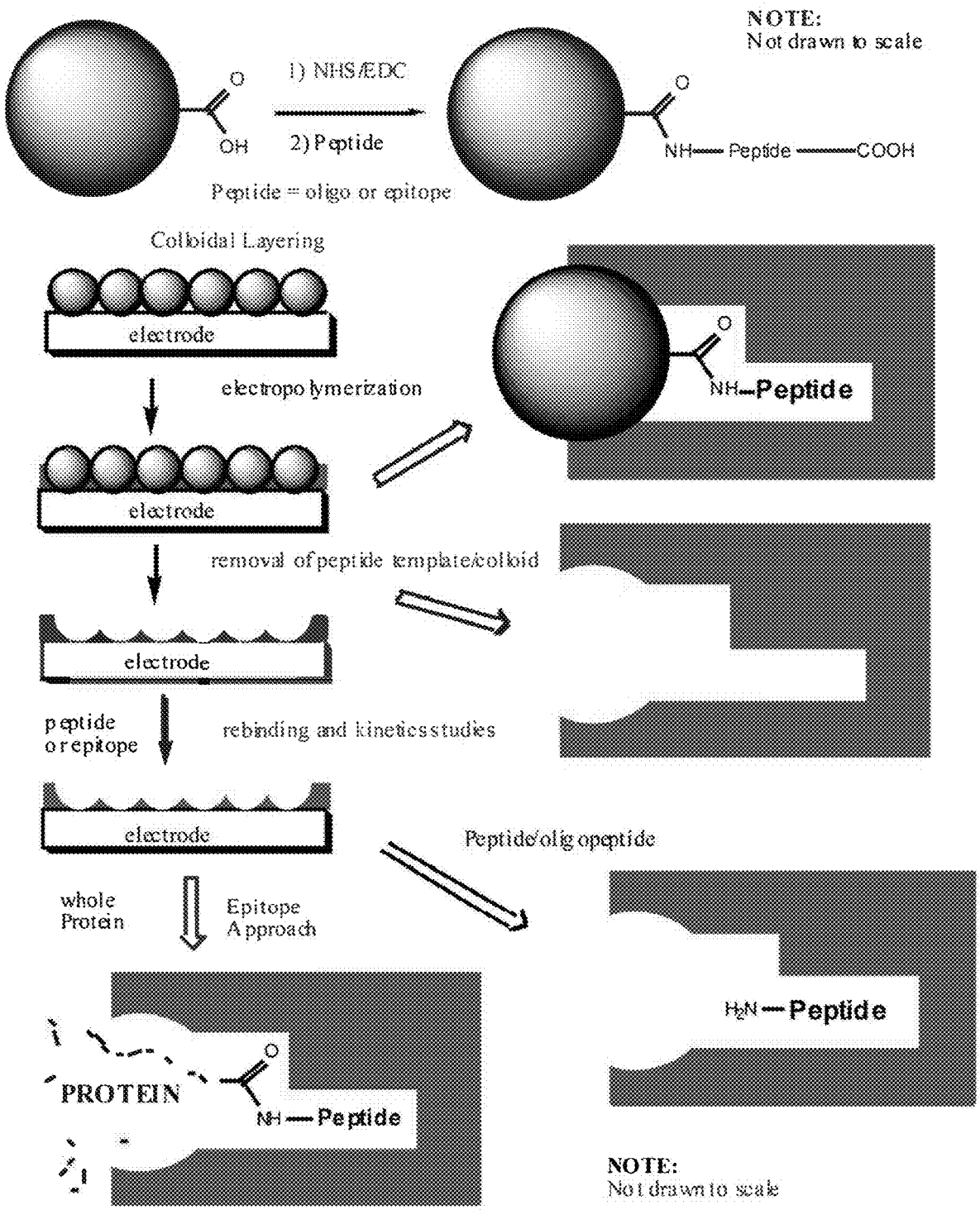
FIG. 6.11

SENSORS AND SEPARATION BASED ON MOLECULAR RECOGNITION VIA ELECTROPOLYMERIZATION AND COLLOIDAL LAYER TEMPLATES

RELATED APPLICATIONS

This application claims the benefit of and priority to U.S. Provisional Patent Application Ser. No. 61/363,738 filed 13 Jul. 2010.

GOVERNMENTAL SPONSORSHIP

Embodiments of the inventions set forth herein were in part funded by NSF CBET-0854979 and governmental rights may attach to these embodiments or portions thereof.

REFERENCE TO A SEQUENTIAL LISTING

Not Applicable.

BACKGROUND OF THE INVENTION

1. Field of the Invention

Embodiments of the present invention relate to the designs and methods of fabrication of a molecularly imprinted film for sensing and separation purposes based on the use of electropolymerization, chemical oxidative or radical polymerization, where the monomers of this invention are based on a bifunctional or multifunctional branched dendron-like design that is advantageous for simultaneous polymerization and cross-linking reactions.

More specifically, templating of the analyte is done using the prescribed monomers utilizing potentiodynamic and potentiostatic electropolymerization methods or chemical oxidative, chemical reductive, and radical polymerization methods in solution. The present invention also uses a constant potential to improve analyte removal, ultrathin film or high interfacial contact area geometry, and the use of colloidal particle surfaces for templating and improving binding efficiency.

2. Description of the Related Art

Molecularly imprinted polymer (MIP) is one of the most promising techniques in modern sensor technology because of its simplicity, reliability, capability of miniaturization, and low cost method of fabrication thereby having a potential for mass production. It has also gained significant attention in the area of solid phase extraction.[1] Although this technique originated from the seminal work of Polyakov[2] in 1931, a dramatic increase[3] of research about MIP started in the early 1990s and continued until now. MIP can be prepared by electropolymerization of functional and cross-linkable monomers in the presence of the target analyte (called the template) in a proper solvent. Extraction of the template from the polymer film creates complimentary cavities or as imprint sites that contain the memory of the size, shape and functional group orientation of the imprinted molecule.[4] As a result, the polymer film incorporates a selective recognition element for the rebinding of the template.

To this day, electrically conducting polymers have attracted much attention in numerous applications such as batteries, electronic devices, ion selective membranes, and chemical and biosensors. Incorporating these types of polymers as a selective recognition element for sensing has shown to be promising due to the real-time response to ligand-receptor binding events.[5] Moreover, conducting polymers are highly sensitive to small perturbations of its properties such as electrical, optical, and electrochemical by changes in temperature, solvent, and chemical environment;[6] thus, making them ideal for chemical and biosensing.

Thus there is a need in the art for new and useful sensors for chemical and biological materials.

SUMMARY OF THE INVENTION

The present invention overcomes many of the existing limitations found in the prior art partly because the MIP is generated using electrochemical means, which provides desired properties to the resultant film. More specifically, the present invention describes a method for the fabrication of electropolymerized (E)-MIP. This is achieved by the electropolymerization of functional and cross-linking heterocyclic monomers such as terthiophene and carbazole monomers that are non-covalently complexed with the template analyte, drug or peptide. Unlike most MIP films, the fabrication of the E-MIP is simpler because no cross-linker is required for electropolymerization. The advantages of electropolymerization as practiced in the present inventions are: 1) a better control of the polymer layer thickness, which is crucial to a sensitive sensing of an analyte, 2) a greater ability to attach the sensor film to electrode surfaces of any shape and size, and 3) a higher compatibility of the technique with combinatorial and high-throughput approaches, which is critical for the commercial development of molecular imprinting. The present invention also makes use of an efficient and fast protocol for the removal of the template analyte, while avoiding the use of harsh solvent conditions—based on the application of a constant potential during washing. Constant potential during washing significantly improves the sensitivity of the analyte detection by Surface Plasmon Resonance (SPR) kinetic measurements for example.

While the present invention emphasizes the use of conducting polymers by anodic polymerization, it is possible to extend the proposed design to non-conducting polymers such as, but not limited to acrylate, styrene, or vinyl functional monomer groups via cathodic electropolymerization or chemical reductive polymerization, involving radical or anion mechanisms. That is, electropolymerizability can be in the form of radical cation or radical anion generation. The electrochemical methods may be done using various shapes, sizes, and geometries of the electrode and may include a choice between potentiodynamic and potentiostatic or chronoamperometric and pulsed methods and other variants involving chemical redox methods. Other electrode or solid support substrates include noble metals, steel, stainless steel, metal alloys, metal oxides, graphite or carbon electrode surfaces, transparent electrodes, plastic surfaces, and other surfaces capable of colloidal templating and deposition or polymerization of monomers of the same or analogous procedure. Also, the method of transduction is not limited to SPR but may be extended to other optical, electrochemical, acoustic, spectroscopic methods in which the sensing element can be deposited or electrodeposited directly on the relevant electrode surface.

Colloidal templating in combination with other surface chemistry, polymer grafting, and lithographic and non-lithographic patterning will enable the construction of improved sensors and separation medium. Thus, the colloidally templated features and electrode maybe subject to: 1) molecular imprinting polymerization of selected analytes, 2) further chemisorption by self-assembled monolayers (SAMs), 3) growth of polymer brushes or click chemistry, and 4) hierarchical patterning by combining with lithographic and non-lithographic patterned substrates.

Embodiments of the present invention provide anodic electropolymerizable monomers of the general formula (I):

where A is an anodic electropolymerizable or chemical oxidative polymerizable group, where A is selected from the group consisting of an $A_p$ or $L(A_p)_n$, where L is a linking group and the R group of is bonded to L and n is an integer having a value between 1 and 4, R is alkenyl group having between 1 and about 20 carbon atoms, where one or more of the carbon atoms may be replaced by oxygen atoms, amino groups, amide groups, ester groups, or mixtures thereof, and Z is an end group selected from the group consisting of OH, COOH, COOR$^1$, NR$^2$R$^3$, CONR$^4$R$^5$, A$^1$OH, A$^1$COOH, A$^1$COOR$^1$, A$^1$NR$^2$R$^3$, A$^1$CONR$^4$R$^5$, and mixtures thereof, where R$^{1-5}$ are carbyl group having between 1 and about 10 carbon atoms. In certain embodiments, the compounds of formula (I) are simply $A_p$-RZ. In other embodiments, the compounds of formula (I) are simply $(A_p)_n$L-RZ.

Embodiments of the present invention provide cathodic electropolymerizable or chemical reductive polymerizable monomers including ethylenically unsaturated monomers, diene monomers or mixtures or combinations thereof, where the monomers are polymerized through radical or radical anion generation with cathodic polymerization, a complement to anodic electropolymerization.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention can be better understood with reference to the following detailed description together with the appended illustrative drawings in which like elements are numbered the same:

DRAWING OF SECTION I

Part 1

E-MIP on Planar Au-Surface

An SPR Sensing

FIG. 1.1 depicts synthetic Scheme 1 used to prepare conventional MIP and high surface area MIP film on planar Au surface.

FIGS. 1.2A-C depicts a fabrication scheme of E-MIP on planar surface for the detection of drugs: (A) Sensor film generation by molecular imprinting and template removal by constant potential wash at 0.4 V (versus Ag/AgCl). (B) ESPR in-situ set-up for electropolymerization and (C)SPR sensing of the imprinted guest molecule onto an E-MIP SPR Au disk.

FIG. 1.3 depicts structures of different mono and bi functional carbazole and terthiophene monomers used for molecular imprinting of guest molecule drugs and peptides. Monofunctional monomers include G0-3TCOOH and G0-3TOH. Bifunctional monomers include G1-3TOH, G1-3TNH$_2$, G1-CBzOH, and G1-CBzNH$_2$.

FIGS. 1.4A-C depict EC-SPR results during MIP film (model system consists of 200 μM G0-3TCOOH and 100 μM Theophylline) formation: (A) SPR kinetic curve with SPR angular curve (inset) before and after electropolymerization, (B) potential ramp versus time, and (C)SPR angular scan (broken lines) and current response versus the scanning potential with inset of the monomer free scan (representative CV cycles 1, 2, 5, 10, 15, 20).

FIGS. 1.5A-F depict XPS high resolution scans of the MIP film (200 μM G0-3TCOOH 100 μM Theophylline) showing the different elemental peaks: (A) nitrogen 1s, (B) sulfur 2s, (C) sulfur 2p, (D) carbon 1s, (E) oxygen 1s, and (F) gold 4f.

FIGS. 1.6A-D depict SPR angular and CV curves of (A, C) MIP (200 μM G0-3TCOOH 100 μM Theophylline) and (B, D) NIP (G0-3TCOOH) before and after washing of the template at constant potential in acetonitrile.

FIGS. 1.7A&B depict XPS high resolution scans of the MIP film (200 μM G0-3TCOOH 100 μM Theophylline) before and after the washing of the template in ACN at 0.4 V: (A) nitrogen 1s and (B) sulfur 2s elemental peaks.

FIGS. 1.8A-C depicts AFM topography images of the MIP films (200 μM G0-3TCOOH 100 μM template) before (left) and after (right) the washing of the template in ACN at 0.4 V: (A) naproxen-imprinted, (B) theophylline-imprinted, and (C) paracetamol-imprinted.

FIG. 1.9A-C depicts SPR adsorption kinetics of the analyte drugs (naproxen, theophylline and paracetamol) onto the (A) MIP and (B) NIP films electropolymerized using a monofunctional monomer (G0) of G0-3TCOOH (200 μM concentration). (C) Bar graph summary of SPR sensing with different MIP films: Theophylline, Paracetamol, and Naproxen as guest molecules.

FIGS. 1.10A-C depicts Sensitivity Studies: (A) SPR adsorption kinetics of the different concentrations of theophylline onto a theophylline-imprinted (A) MIP (200 μM G0-3TCOOH and 100 μM Theophylline) and (B) NIP (bottom) films of poly(G0-3TCOOH). (C) Calibration plot.

FIGS. 1.11A-C depicts (Selectivity studies) SPR adsorption kinetics of different analytes/analogs onto NIP and MIP films: (A) naproxen-, (B) theophylline-, and (C) paracetamol-imprinted. Note: MIP film was prepared by electropolymerization of 200 μM G0-3TCOOH with 100 μM template drug (naproxen, paracetamol, and theophylline).

FIGS. 1.12A&B depicts (A) Stability studies of the MIP film (200 μM G0-3TCOOH 100 μM Theophylline) using SPR technique: Injection of 50 μM (orange bar graph) and 35 μM (violet bar graph) concentration of theophylline. (B) Reusability study of the MIP (200 μM G1-CBzOH 100 μM naproxen) sensor film by SPR sensing. The naproxen-imprinted film is reused for 5 times after regeneration by washing in ACN ($2^{nd}$ to $5^{th}$) and by constant potential wash at 0.4 V ($6^{th}$) in ACN.

FIGS. 1.13A-C depicts SPR adsorption kinetics of naproxen (and paracetamol) onto the MIP films (200 μM monomer and 100 μM naproxen or paracetamol) using different (A) monofunctional and (B) bifunctional monomers of poly(carbazole) and poly(terthiophene). (C) Bar graph summary of SPR sensing of naproxen after constant potential wash using monofunctional and bifunctional monomers of carbazole and terthiophene.

DRAWING OF SECTION I

Part 2

E-MIP by Colloidal Particle Templating on a 2-D Plane

A QCM Sensing Approach

FIGS. 1.14A&B depicts fabrication method of (A) colloidal crystals and inverse colloidal crystals (or microhole arrays) of conducting polymer and (B) inverse colloidal crystals of conducting polymer with imprinted peptide as template onto QCM sensor Au-crystal.

FIGS. 1.15A-E depicts AFM topography images (3D on inset) of different sizes of PS assembled on Au: (A) 100 nm, (B) 200 nm (c) 350 nm, (D) 500 nm, and (E) 2000 nm.

FIGS. 1.16A-H depicts CV diagrams (right column) of the electropolymerization of G0-3TCOOH (400 µM) onto PS (500 nm size) layered Au slide (monomer free scan on inset) and AFM topography images (left column) of the electropolymerized PS Au slide done on varying CV scan rates (3D on inset): (A), (E) 10 mV/s; (B), (F) 50 mV/s; (C), (g) 100 mV/s; (D), (H) 200 mV/s.

FIGS. 1.17A-F depicts AFM topography images (3D on inset) and contact angle measurements after washing the PS (500 nm size) particles from the electropolymerized film done on varying CV scan rates: (A) 10 mV/s, (B) 50 mV/s, (C) 100 mV/s and (d) 200 mV/s. (E) AFM high magnification image with (F) line profile of film (C).

FIGS. 1.18A-F depicts in-situ EQCM measurements. CV diagram of the MIP electrodeposition (A) onto 500 nm size PS layered Au QCM crystal and (B) on bare Au QCM crystal. QCM measurements of the MIP versus NIP electrodeposition (C) onto 500 nm size PS layered Au QCM crystal and (D) on bare Au QCM crystal. Change in resonance resistance versus change in frequency of the MIP versus NIP electrodeposition (E) onto 500 nm size PS layered Au QCM crystal and (F) on bare Au QCM crystal.

FIG. 1.19 depicts XPS high resolution scan of the nitrogen element (N 1s) of the MIP onto 500 nm size PS layered Au before and after peptide (aspartame) washing and NIP onto 500 nm size PS layered Au as control.

FIGS. 1.20A-C depicts QCM sensing of peptides. (A) Sensing response of the MIP versus NIP film. (B) Sensing response as affected by the number of CV cycles and duration of washing of the template. (C) Sensing response of MIP (aspartame-imprinted) PS Au QCM crystal to other closely-related peptides.

DRAWINGS OF SECTION II

FIGS. 2.1A-C depict (A) Molecular imprinting of the template (B) Formation of cavity after washing the template (C)SPR set-up for sensing of the template.

FIG. 2.2 depicts NMR spectrum of ethyl 2-(2,5-dibromothiophen-3-yl)acetate.

FIG. 2.3 depicts NMR spectrum of ethyl 2-(2,5-di(thiophen-2-yl)thiophen-3-yl)acetate (3T-ET).

FIG. 2.4 depicts NMR spectrum of 2-(2,5-di(thiophen-2-yl)thiophen-3-yl)acetic acid (G0-3TCOOH).

FIGS. 2.5A-F depict computer generated images of the 2D optimized structures (Ball and Spoke (A,C,E), and Space Filling (B,D,F) models) of the pre-polymerization complex between monomer and template at different ratios: (A,B) 1:1 (C,D) 3:1, and (E,F) 4:1. Note: (1) Color representation of elements: carbon (gray), hydrogen (white), nitrogen (blue), oxygen (red), and sulfur (yellow). (2) Calculations performed in Spartan, Wavefunction Inc, semi-empirical AM1.[3]

FIG. 2.6A-C depict computer generated images of the 2D optimized structures (Ball and Spoke (A), Tube (B), and Space Filling (C) models) of the pre-polymerization complex between monomer and template (Spartan, Wavefunction Inc, semi-empirical AM1 quantum calculations). Note color representation of elements: carbon (gray), hydrogen (white), nitrogen (blue), oxygen (red), and sulfur (yellow).

FIGS. 2.7A-D depict EC-SPR results during MIP film (200 µM G0-3TCOOH and 100 µM Theophylline) formation: (A) SPR kinetic curve with SPR angular curve (inset) before and after electropolymerization, (B) potential ramp versus time, (C)SPR angular scan (broken lines) and current response versus the scanning potential with inset of the monomer free scan (representative CV cycles 1, 2, 5, 10, 15, 20) and (D) EC-SPR set-up of in-situ electropolymerization.

FIGS. 2.8A-D depict (A) SPR Kinetic measurements, (B) SPR angular curve, (C) CV-SPR measurements of NIP (200 µM G0-3TCOOH) Electropolymerization. (D) CV scan of the NIP film in the monomer free-solution (solvent with supporting electrolyte only).

FIGS. 2.9A-I depict AFM analysis of the NIP (A,B,C), MIP before (D, E, F) and after (G, H, I) potential induced washing: topography 2D images with 3D inset (A, D, G), line profiles of the topography images (B, E, H), and phase 2D images with 3D inset (C, F, I). Note: AFM scanning area is 4 µm×4 µm.

FIGS. 2.10A-F depict XPS high resolutions scan of the MIP film showing different peaks: nitrogen (N) 1s (A), carbon (C) 1s (D), oxygen (O) 1s (E), sulfur (S) 2s (B), and sulfur (S) 2p (C), gold (Au) 4f (F).

FIGS. 2.11A&B depict XPS high resolution scan of the MIP film (200 µM G03T-COOH 100 µM template) before and after the washing of the template in ACN at 0.4 V: nitrogen 1s (A) and sulfur 2s (B).

FIGS. 2.12A-D depict (A) Electropolymerization of NIP scanned from 0V to 1.15 V. (B) CV scan of the NIP film in a monomer free-solution and (inset of b) its contact angle measurements (76.94°±0.50). (C) 2D and (D) 3D AFM image of the NIP film scanned from 0V to 1.15V (Thickness 48.92±1.87 nm.

FIGS. 2.13A-D depict SPR angular scan of (A) MIP and (B) NIP. CV curve of (C) MIP and (D) NIP before and after washing of the template at constant potential in acetonitrile.

FIGS. 2.14A&B depict (A) In-situ SPR sensing of theophylline (50 µM) using MIP film after ACN wash at 0.4 V (▨), MIP film after ACN wash only (●), NIP film (▼), and bare gold (▲). (B) Calibration curve (each point taken at 900 seconds, raw data on inset) for theophylline using MIP (◆) vs. NIP film (●). Buffer shift and bulk response were subtracted from the original sensogram.

FIGS. 2.15A&B depict SPR adsorption kinetics of the analyte drugs (naproxen, theophylline and paracetamol) onto the MIP (A) and NIP (B) films electropolymerized using a monofunctional monomer (G0) of G03T-COOH (200 µM concentration).

FIG. 2.16 depicts SPR adsorption kinetics of the different concentrations of theophylline onto NIP film of poly(G03T-COOH) (control experiment).

FIG. 2.17A-F depict non-linear fitting of SPR association curves of the different concentrations of theophylline rebinding onto the MIP film: 10 µM (A), 20 µM (B), 30 µM (C), 40 µM (D), and 50 µM (E). Plot of the calculated observed rate constant ($k_{obs}$) determine from curve fitting versus concentration (F). The association rate constant ($k_a$) is determined from the slope of the line of the linear best fit for the plot $k_{obs}$ versus concentration.

FIGS. 2.18A&B depict (A) Selectivity study of the MIP sensor film using in-situ SPR sensing of theophylline, 50 µM (▨) versus different analytes: theobromine, 500 µM (◈); caffeine, 500 µM (▲); paracetamol, 50 µM (▼); and naproxen, 50 µM (?). Note: Buffer shift and bulk response were subtracted from the original sensogram. (B) Chemical structure of the compounds used for selectivity study.

FIGS. 2.19A&B depict (Selectivity studies) SPR adsorption kinetics of different analytes/analogs onto NIP and MIP films: (A) naproxen- and (B) paracetamol-imprinted. (Note:

E-MIP film was prepared by electropolymerization of 200 μM G0-3TCOOH with 100 μM of the template drug).

FIG. 2.20 depicts stability study of the MIP film: Injection of 50 μM (orange bar graph) and 35 μM (violet bar graph) concentration of theophylline.

DRAWING OF SECTION III

FIGS. 3.1A-C depicts structures of the carbazole monomer (A) and terthiophene monomer (B) used in this study and a molecular model representation of (2,2-bis(4-hydroxyphenyl)propane) or Bisphenol-A (C).

FIG. 3.2 depicts crosslinked structure of the molecularly imprinted copolymer with the bisphenol A template (space filling model).

FIGS. 3.3A-B depict cyclic voltammograms of the imprinted and non imprinted polymer films: (A) 75 μM G0-3TOH and 25 μM CBzCOOH; (B) 25 μM G0-3TOH and 75 μM CbzCOOH. Potential cycling from 0V to 1.1V at a scan rate of 50 mV/s for 10 cycles with 0.1M of TBAH as supporting electrolyte.

FIGS. 3.4A-C depicts cyclic voltammograms of the imprinted and non imprinted polymer films: (A) using carbazole monomer, 50 μM; (B) using G03TOH monomer, 50 μM and (C) equimolar ratio of G0-3TOH and CbzCOOH. Potential cycling from 0V to 1.1V at a scan rate of 50 mV/s for 10 cycles with 0.1M of TBAH as supporting electrolyte.

FIGS. 3.5A&B depict UV-Vis spectra of the (A) imprinted (MIP) and (B) non imprinted (NIP) G0-3TOH films. Films were electrodeposited on ITO via CV employing two potential scan windows: 0-1.1V and 0-1.3V.

FIGS. 3.6A&B depict raw data of QCM response during electropolymerization of (A) imprinted and (B) non imprinted equimolar ratio of G0-3TOH and CbzCOOH films: Plot of change in frequency as a function of potential. First part with electrodeposition followed by monomer free-scan or end of electropolymerization.

FIGS. 3.7A&B depicts different thickness of the: (A) imprinted and (B) non imprinted polymer films at various composition ratios as measured by ellipsometry.

FIGS. 3.8A&B depict observed shifts in the minima of the SPR curve to higher angle in the presence of bisphenol A. SPR curves before and after electropolymerization and after template (BPA) removal: a) non imprinted film and b) imprinted polymer film. SPR curve for bare gold was used as reference.

FIG. 3.9 depicts SPR shifts observed for non imprinted (right) and imprinted (left) copolymer films with the following composition: 75 μM G0 3TOH and 25 μM CbzCOOH (top) and 25 μM G03TOH and 75 μM CbzCOOH (bottom).

FIGS. 3.10A-C depict predicted complex structure between bisphenol A and G0-3TOH and CbzCOOH monomers within the imprinted polymer matrix through PM3 semi empirical calculations using Spartan 08, Wavefunction, Inc.: (A) equimolar ratio of G0-3TOH-CbzCOOH; (B) 75:25 G0-3TOH-CbzCOOH and (C) 25:75 G0-3TOH-CbzCOOH.

FIGS. 3.11A&B depicts (A) Predicted conformation of bisphenol A generated after performing single point energy calculations, i.e., in the absence of the functional monomers; (B) Plot correlating changes in the bond angle ($C_{10}$-$C_{13}$-$C_2$ of BPA) with varying polymer composition.

FIG. 3.12 depict XPS high resolution scan (C 1s) of the imprinted (E-MIP) polymer film before and after removal of bisphenol A (template).

FIG. 3.13 depicts water contact angle of the imprinted and non imprinted polymer films prepared from different G0-3TOH and CbzCOOH molar ratios.

FIG. 3.14 depicts an embodiment of a Randles circuit represented by R1 (Cap [R2W]) was adopted to model the rebinding of BPA. This equivalent circuit is preferentially used to model modified surfaces with defects/channels for ion transport or adsorption. The model represents the physical structure of the interface in terms of three layers, each with its own unique electrical properties: 1) electrolyte; 2) molecular layer which represents the copolymer film and 3) the gold substrate.

FIGS. 3.15A-C depict (A) Nyquist plot; (B) Bode magnitude; and (C) Bode phase angles reflective of the interfacial properties of the imprinted (E-MIP) and non imprinted (NIP) G0-3TOH/CbzCOOH copolymer films.

FIGS. 3.16A&B depicts pPlots reflecting the influence of a) dc potential and b) time, on the impedance of the E-MIP and NIP copolymer films. EIS was conducted under a varied dc potential from +0.2 to −0.2 V.

FIGS. 3.17A-D depicts fitting of Bode and Phase angle plots for non imprinted (NIP) and imprinted (E-MIP) copolymer.

FIGS. 3.18A&B depicts EIS response of (A) imprinted (E-MIP) G0-3TOH-CbzCOOH polymer film (B) non imprinted (NIP) to bisphenol A.

FIG. 3.19 depicts dependence of total impedance on increasing BPA concentrations: calibration plot of the BPA imprinted copolymer sensor.

FIGS. 3.20A&B depict plots depicting the observed variations on the capacitance of the imprinted (A) and non imprinted polymer films (B) against increasing concentrations of the bisphenol A.

FIGS. 3.21A-D depict the molecular structure of bisphenol AF (A) and diphenolic acid (B) and observed changes in (C) capacitance and (D) charge-transfer resistance upon re-binding of bisphenol AF and diphenolic acid: demonstrating the relative selectivity of the imprinted polymer film towards bisphenol A. The chemical structures of the competing molecules are also shown.

FIGS. 3.22A&B depict observed changes in impedance upon re-binding of A) bisphenol AF and B) diphenolic acid on the templated BPA E-MIP film: demonstrating the relative selectivity of the imprinted polymer film towards BPA.

DRAWING OF SECTION IV

FIG. 4.1 depicts a schematic illustration of the fabrication of polythiophene based sensor for folic acid.

FIGS. 4.2A&B depicts cyclic voltammograms of the imprinted (A) and non imprinted (B) polymer films: potential cycling from 0V to 1.1V at a scan rate of 500 mV/s for 20 cycles with 0.1M of TBAH as supporting electrolyte.

FIGS. 4.3A&B depict QCM response during electropolymerization: (A) Plot of change in frequency as a function of time and (B) plot of change in mass against the number of CV cycles. The mass was converted using the Sauerbrey equation.

FIG. 4.4 depict a plot of resistance against resonance frequency of the quartz crystal illustrating the observed variations on the viscoelastic behavior of electropolymerized imprinted polythiophene films prepared using different monomer concentrations.

FIG. 4.5 depicts illustration of the viscoelastic behavior of the non imprinted and imprinted polymer films.

FIG. 4.6 depict a QCM response of films prepared from different G1-3TOH:folic acid ratios toward folic acid (100 µM in water:acetonitrile, 9:1, v/v).

FIGS. 4.7A&B depict (A) Plot of resistance against resonance frequency of the quartz crystal illustrating the observed variations on the viscoelastic behavior of electropolymerized imprinted polythiophene films prepared at varying scan rates. (B) QCM response of films prepared from different G1-3TOH:folic acid ratios toward folic acid (100 µM in water:acetonitrile, 9:1, v/v).

FIGS. 4.8A&B depict (A) Plot of resistance against resonance frequency of the quartz crystal illustrating the observed variations on the viscoelastic behavior of electropolymerized imprinted polythiophene films by addition of more terthiophenes (copolymer). (B) QCM response of films prepared from different G1-3TOH:folic acid ratios toward folic acid (100 µM in water:acetonitrile, 9:1, v/v).

FIG. 4.9 depict predicted complex structure between folic acid and G1-3TOH (1:2 ratio) within the imprinted polymer matrix (space filling model, left image) through AM1 semi empirical calculations using Spartan 08, Wavefunction, Inc.

FIGS. 4.10A-C depict cpace filling models illustrating the optimized geometry calculations for (A) 1:4 and (B) 1:1 template:monomer ratios using Spartan 08 (Wavefunction, Inc.) software. The approximate molecular size of folic acid is also shown in (C).

FIG. 4.11 depict UV-Vis spectra of terthiophene dendron in the presence of increasing concentrations of folic acid in solution (optical path length=1 cm).

FIG. 4.12 depict a plot of absorbance as a function of G1-3TOH:folic acid mole ratio to determine the most favorable template:monomer ratio.

FIGS. 4.13A-C depict 3D (left) and 2D (right) AFM topography images (2 µm×2 µm scan): non imprinted (A), imprinted (B) and imprinted polymer after template removal (C).

FIGS. 4.14A-C depict 2D AFM topography (left), amplitude (middle) and phase images (right), 2 µm×2 µm scan: non imprinted (A), imprinted (B) and imprinted polymer after template removal (C).

FIGS. 4.15A&B depict XPS high resolution scan of the imprinted polymer film (N 1s) before (A) and after removal (B) of the template.

FIG. 4.16 depict XPS high resolution scan of the imprinted polymer film (N 1s) showing peak deconvolution.

FIGS. 4.17A&B depicts (A) QCM responses of both imprinted and non imprinted sensor towards 100 µM folic acid and (B) calibration plot for the rebinding of folic acid by the folic acid-imprinted polymer.

FIG. 4.18 depict QCM response of the imprinted polythiophene and the non-imprinted film.

FIGS. 4.19A&B depict (A) Observed changes in frequency of the QCM crystal (5 MHz) upon re-binding of competing molecules: demonstrating the relative selectivity of the imprinted polymer film towards folic acid; (B) chemical structures of the competing molecules.

FIG. 4.20 depict QCM response illustrating the selectivity of the imprinted polymer film with different analytes.

FIG. 4.21 depicts Illustration of the proposed cooperative binding among folic acid molecules due to hydrogen bonding. (Spartan 08, Wavefunction, Inc.)

FIG. 4.22 depicts plot illustrating the changes on the surface mass density of the polymer film against increasing concentrations of folic acid.

DRAWING OF SECTION V

FIGS. 5.1A-D depicts (A) Sensor film fabrication by molecular imprinting and template removal by constant potential wash at 0.4 V (versus Ag/AgCl). (B) ESPR in-situ set-up for electropolymerization and (C)SPR sensing of the imprinted guest molecule using (D) different monomers of poly(terthiophene), G0-3TCOOH (1), G0-3TOH (2), G1-3TOH (3), G1-3TNH$_2$(4) and of poly(carbazole), G0-CBzCOOH (5), G1-CBzCOOH (6), G1-CBzOH (7), G1-CBzNH$_2$(8).

FIGS. 5.2A-F depicts in-situ ESPR measurements of MIP film formation: (A) kinetic curve with (inset) SPR angular curve before (solid lines) and after electropolymerization of 200 G0-3T-COOH with 100 µM Naproxen and (B) SPR scan and (C) current response versus scanning potential (representative cycles) with CV scan (inset) of the MIP film in monomer free solution. (D) SPR sensing (30 minutes analyte incubation) before and after constant potential (0.4 V vs Ag/AgCl) washing using different MIP films with the imprinted molecules of theophylline, paracetamol, and naproxen as compared to NIP. (E) SPR sensing of naproxen after constant potential washing using monofunctional (G0) and bifunctional (G1) monomers of carbazole and terthiophene. (F) Selectivity study of the different MIP films (naproxen, theophylline, paracetamol) and sensing response of the non-imprinted polymer film. The molecules used for this study are naproxen (1), (6), (10); 1-Napththalenesulfonic Acid Sodium Salt (2); paracetamol (3), (11), (13), (17); theophylline (4), (7), (12); acetanilide (5), (14); caffeine (8); theobromine (9); 3-aminophenol (15); 4-aminobenzoic Acid (16).

FIGS. 5.3A-C depict cyclic voltammogram of the NIP and MIP electropolymerizations with inset of the monomer free scan (CV cycle 1 in ACN with 0.1 M TBAH supporting electrolyte): (A) non-imprinted, (B) theophylline-imprinted, and (C) paracetamol-imprinted. (Note: Paracetamol-imprinted film was scanned until 0.75 V only because the template drug shows an oxidation peak beyond this range.)

FIGS. 5.4A-C depict AFM topography images of the MIP films (200 µM G0-3TCOOH with 100 µM template) before (left) and after (right) the washing of the template in ACN at 0.4 V: (A) naproxen-imprinted, (B) theophylline-imprinted, and (C) paracetamol-imprinted.

FIGS. 5.5A-C depicts XPS high resolution scan of the MIP films (200 µM G0-3TCOOH 100 µM template) before and after the washing of the template in ACN at 0.4 V: (A) N 1s and (B) S 2s of the theophylline-imprinted and (C)N 1s of the paracetamol-imprinted.

FIGS. 5.6A&B depict SPR adsorption kinetics of the analyte drugs (naproxen, theophylline and paracetamol) onto the (A) MIP and (B) NIP films electropolymerized using a monofunctional monomer of G0-3TCOOH (200 µM concentration).

FIGS. 5.7A&B depict SPR adsorption kinetics of naproxen onto the MIP films (200 monomer and 100 µM naproxen) using different (A) monofunctional and (B) bifunctional monomers of poly(carbazole) and poly(terthiophene).

FIG. 5.8A&B depict (Sensitivity studies) SPR adsorption kinetics of the different concentrations of theophylline onto (A) theophylline-imprinted MIP and (B) NIP films of poly (terthiophene)-COOH.

FIG. 5.9A-C depict (Selectivity studies) SPR adsorption kinetics of different analytes/analogs onto NIP and MIP films: (A) naproxen-, (B) theophylline-, and (C) paracetamol-imprinted. (Note: MIP film was prepared by electropolymerization of 200 µM G0 3T-COOH with 100 µM of the template drug).

DRAWING OF SECTION VI

FIG. 6.1 depict elements of an embodiment of a prototypical sensor.

FIG. 6.2 depicts the MIP self-assembly process: components are binding monomer, inert monomer, and imprint. A highly cross-linked monomer or thin film is formed.

FIG. 6.3 depicts whole protein vs. peptide-imprinting: (left) the entire protein molecule creates large imprints with high surface availability; (right), a small polypeptide sequence from the protein creates small imprints that bind the template molecule at only a specific location.

FIGS. 6.4A-C depict (A) The Kretschmann configuration showing the excitation of the SPR via the evanescent field (k=wave vector of the incident light, θ=incident angle, ε=dielectric constant, w=is frequency). (B) Propagation of the plasmon field along the metal/dielectric media interface. (C) A sharp reflectance minimum at the resonance angle.

FIG. 6.5 depicts EC-SPR set-up for real time sensing.

FIG. 6.6 depicts functional dendrimer, monomers, and crosslinkers for electrochemical MIPs.

FIG. 6.7 depicts colloidal particle layer assembly.

FIGS. 6.8A-E depict schematic for colloidal particle layer assembly, electrochemical crosslinking, and dissolution.

FIGS. 6.9A&B depict expected nanostructured array on electrode surface.

FIGS. 6.10A&B depict nanostructured Array on QCM Crystal.

FIG. 6.11 depicts protocol for protein immobilization, templating, sensing, and epitope-whole protein differentiation.

DETAILED DESCRIPTION OF THE INVENTION

The present invention relates to the designs and methods of fabrication of a molecularly imprinted polymer (MIP) films for sensing and separation purposes based on the use of electropolymerization, where the monomer is based on a bifunctional or multifunctional branched dendron-like design that is advantageous for a high degree of printing (polymerization and crosslinking reactions). More specifically, it makes uses of a conducting polymer that can be tuned in order to vary its electrical conductivity, doping level, and wettability. Such arrangement leads to a sensor with high sensitivity and selectivity that can be used with any sensing element system bound to an electrode surface that has electro-optical property. The compositions and sensors of this invention can also find applications in sensors that use chromatographic or other separation methods of analytes or small molecules based on MIP principles. The advantages of electropolymerization as practiced in the present inventions are: 1) a better control of the polymer layer thickness, which is crucial to a sensitive sensing of the analyte, 2) a greater ability to attach the sensor film to electrode surfaces of any shape and size, and 3) a higher compatibility of the technique with combinatorial and high-throughput approaches, which is critical for the commercial development of molecular imprinting for various applications. The present invention also makes use of an efficient and fast protocol for the removal of the template analyte while avoiding the use of harsh solvent conditions based on the application of a constant potential during washing. It significantly improves the sensitivity of the analyte detection by Surface Plasmon Resonance (SPR) kinetic measurements for example. While the present invention emphasizes the use of conducting polymers by anodic polymerization or chemical oxidative polymerization, it is possible to extend the proposed design to non-conducting polymers such as, but not limited to acrylate, styrene, or vinyl functional monomer groups via cathodic electropolymerization or chemical reductive polymerization involving radical or radical anion generation. The electrochemical methods maybe done using various shapes, sizes, and geometries of the electrode and may include a choice between potentiodynamic and potentiostatic or chronoamperometric and pulsed methods. Other electrode or solid support substrates include noble metals, steel, stainless steel, metal alloys, metal oxides, graphite or carbon electrode surfaces, transparent electrodes, plastic surfaces, and other surfaces capable of colloidal templating and deposition or polymerization of monomers of the same or analogous procedure. Also, the method of transduction is not limited to SPR but may be extended to other optical, electrochemical, acoustic, spectroscopic methods in which the sensing element can be electrodeposited directly on the relevant electrode surface. Colloidal templating in combination with other surface chemistry, polymer grafting, and lithographic and non-lithographic patterning should enable improved sensor and separation response. Thus, the colloidally templated features and electrode maybe subject to: 1) molecular imprinting polymerization of selected analytes, 2) further chemisorption by self-assembled monolayers (SAMs), 3) growth of polymer brushes or click chemistry, and 4) hierarchical patterning by combining with lithographic and non-lithographic patterned substrates.

Suitable Reagents

Suitable anodic electropolymerizable heterocylic aryl or aromatic group $A_p$ for use in the present invention include, without limitation, single group compounds and multigroup compounds. Exemplary single group compounds including, without limitation, pyrrole, thiophene, carbazole, indole, aniline, fluorene, and their fused heteroaromatic, oligomeric, and copolymeric derivatives such as 2-(thiophen-2-yl)thiophene, 2,5-di(thiophen-2-yl)thiophene, higher thiophene 2,5 oligomers, other anodic electropolymerizable heterocylic aryl or aromatic groups and mixtures thereof. Exemplary multigroup compounds include compounds of the general formula (II):

$$L(R'A_p)_n \qquad \text{(II)}$$

where $A_p$ is as set forth above and L is a linking group selected from the group an aromatic group, a dihydroxy aromatic group, a symmetrical dihydroxy substituted aromatic group, or mixtures thereof. Exemplary diether substituted aromatic groups include, without limitation, methyl-3,5-dihydroxybenzoate, where the ester group is the RZ group.

Suitable ethylenically unsaturated monomers for cathodic electropolymerization include, without limitation, ethylene, propylene, butylene, higher alpha olefins, styrene, other aromatic vinyl monomers, vinyl alcohol, vinyl acetate, fluorinated vinyl monomers, acrylates monomers, carbonate monomers, other ethylenically unsaturated monomers Suitable diene monomers for cathodic electropolymerization include, without limitation, butadiene, substituted butadiene monomer, isoprene substituted isoprene monomers, or mixtures or combinations thereof.

Suitable crosslinking agents for anionic electropolymerization include, without limitation, compounds of the general formula (III)

$$A^2\text{-R''-}A^3 \qquad \text{(III)}$$

where A2 and A3 are the same or different and are selected from the heterocyclic compounds set forth above and where R" is an alkenyl group having between 1 and about 20 carbon atoms, where one or more of the carbon atoms may be replaced by oxygen atoms, amino groups, amide groups, ester groups, or mixtures thereof. Suitable crosslinking agents for cathodic electropolymerization include, without limitation, divinyl alkyenyl crosslinking agents, divinyl aromatic crosslinking agents, other divinyl crosslinking agents or mixture or combinations thereof.

Suitable particles for templates upon which the coating of this invention may be deposited include, without limitation, polymer particles, polymer latex particles, metal oxide particles, ceramic particles, salt particles, other conductive or non-conductive polymers or mixtures or combinations thereof. In certain embodiments, the polymer latex particles are polyethylene latex particles, polypropylene latex particles, polystyrene latex particles, natural rubber latex particles, liposomal particles, or mixtures or combinations thereof. In certain embodiments, the particles are capable of being removed by standard methods such as washing, dissolving, etching, or other removal methods generally known in the art.

Suitable substrates on which the coating of this invention may be deposited include, without limitation, metal substrates, plastics substrates, ceramic substrates, or mixtures and combinations thereof. For substrates transparent substrate, the substrates include optically transparent ceramics such as glass, transparent plastics such as polycarbonates, polyethylene, polypropylenes, polystyrenes, transparent metals or mixtures and combinations thereof. Exemplary metals including iron and iron alloys (e.g., steels, stainless steel, etc.), aluminum and aluminum alloys, copper and copper alloys, tungsten and tungsten alloys, nickel and nickel alloys, other transition metals and their alloys or mixtures or combinations thereof.

Suitable conducting layer include, without limitation, any suitable metal, metal alloy, metal oxide, polymer, and non-polymer surface, where the metal or metal alloys comprise gold (Au), platinum (Pt), indium tin oxide (ITO), iridium (Ir), rhodium (Rh), iron (Fe), titanium (Ti), Zinc (Zn), aluminum (Al) and other metal, metal oxide, or metal alloy electrode and conducting electrodes, mixtures or combinations thereof.

Suitable analytes for use with the sensors and separators of this invention include, without limitation, molecular analytes, pharmaceutical analytes, biological analytes or a mixture thereof, provided that the coating including recognition sites for the mixture.

Suitable molecular analytes include, without limitation, molecules with functional groups that interact with the monomers to form releaseable intermolecular association complexes, or mixture or combinations thereof, provided that the composition includes analyte specific binding regions.

Suitable biological analytes include, without limitation, proteins, enzymes, ribozymes, lipoprotein, glycoproteins, phospholipids, nucleic acids, nucleosides, nucleotides, monosaccharides, polysaccharides, carbohydrates, membranes, protein assemblies, other biomolecular entities or mixture or combinations thereof, provided that the composition includes analyte specific binding regions.

Suitable pharmaceutical analyte include, without limitation, any drug that can interact with the monomers to form releaseable intermolecular association complexes, or mixture or combinations thereof, provided that the composition includes analyte specific binding regions. Exemplary examples of such pharmaceutical agents include, without limitation, 5-alpha-reductase inhibitors, 5-aminosalicylates, 5HT3 receptor antagonists, adamantane antivirals, adrenal cortical steroids, adrenal corticosteroid inhibitors, adrenergic bronchodilators, agents for hypertensive emergencies, agents for pulmonary hypertension, aldosterone receptor antagonists, alkylating agents, alpha-adrenoreceptor antagonists, alpha-glucosidase inhibitors, alternative medicines, amebicides, aminoglycosides, aminopenicillins, aminosalicylates, amylin analogs, analgesic combinations, analgesics, androgens and anabolic steroids, angiotensin converting enzyme inhibitors, angiotensin II inhibitors, anorectal preparations, anorexiants, antacids, anthelmintics, anti-angiogenic ophthalmic agents, anti-CTLA-4 monoclonal antibodies, anti-infectives, antiadrenergic agents, centrally acting, antiadrenergic agents, peripherally acting, anti-androgens, antianginal agents, antiarrhythmic agents, antiasthmatic combinations, antibiotics/antineoplastics, anticholinergic antiemetics, anticholinergic antiparkinson agents, anticholinergic bronchodilators, anticholinergic chronotropic agents, anticholinergics/antispasmodics, anticoagulants, anticonvulsants, antidepressants, antidiabetic agents, antidiabetic combinations, antidiarrheals, antidiuretic hormones, antidotes, antiemetic/antivertigo agents, antifungals, antigonadotropic agents, antigout agents, antihistamines, antihyperlipidemic agents, antihyperlipidemic combinations, antihypertensive combinations, antihyperuricemic agents, antimalarial agents, antimalarial combinations, antimalarial quinolines, antimetabolites, antimigraine agents, antineoplastic detoxifying agents, antineoplastic interferons, antineoplastic monoclonal antibodies, antineoplastics, antiparkinson agents, antiplatelet agents, antipseudomonal penicillins, antipsoriatics, antipsychotics, antirheumatics, antiseptic and germicides, antithyroid agents, antitoxins and antivenins, antituberculosis agents, antituberculosis combinations, antitussives, antiviral agents, antiviral combinations, antiviral interferons, anxiolytics, sedatives, and hypnotics, aromatase inhibitors, atypical antipsychotics, azole antifungals, bacterial vaccines, barbiturate anticonvulsants, barbiturates, BCR-ABL tyrosine kinase inhibitors, benzodiazepine anticonvulsants, benzodiazepines, beta-adrenergic blocking agents, beta-lactamase inhibitors, bile acid sequestrants, biologicals, bisphosphonates, BLyS-specific inhibitors, bone resorption inhibitors, bronchodilator combinations, bronchodilators, calcineurin inhibitors, calcitonin, calcium channel blocking agents, carbamate anticonvulsants, carbapenems, carbonic anhydrase inhibitor anticonvulsants, carbonic anhydrase inhibitors, cardiac stressing agents, cardioselective beta blockers, cardiovascular agents, catecholamines, CD20 monoclonal antibodies, CD33 monoclonal antibodies, CD52 monoclonal antibodies, central nervous system agents, cephalosporins, cerumenolytics, chelating agents, chemokine receptor antagonist, chloride channel activators, cholesterol absorption inhibitors, cholinergic agonists, cholinergic muscle stimulants, cholinesterase inhibitors, CNS stimulants, coagulation modifiers, colony stimulating factors, contraceptives, corticotropin, coumarins and indandiones, cox-2 inhibitors, decongestants, dermatological agents, diagnostic radiopharmaceuticals, dibenzazepine anticonvulsants, digestive enzymes, dipeptidyl peptidase 4 inhibitors, diuretics, dopaminergic antiparkinsonism agents, drugs used in alcohol dependence, echinocandins, EGFR inhibitors, estrogen receptor antagonists, estrogens, expectorants, factor Xa inhibitors, fatty acid derivative anticonvulsants, fabric acid derivatives, first generation cephalosporins, fourth generation cephalosporins, functional bowel disorder agents, gallstone solubilizing agents, gamma-aminobutyric acid analogs, gamma-aminobutyric acid reuptake inhibitors, gamma-aminobutyric acid transaminase inhibitors, gastrointestinal agents, general anesthetics, genitourinary tract agents, GI stimulants, glucocorticoids, glucose elevating agents, glycopeptide antibiotics, glycoprotein platelet inhibitors, glycylcyclines, gonadotropin releasing hormones, gonadotropin-releasing hormone antagonists, gonadotropins, group I antiarrhythmics, group II antiarrhythmics, group III antiarrhythmics, group IV antiarrhythmics, group V antiarrhythmics, growth hormone receptor blockers, growth hormones, *H. pylori* eradication agents, H2 antagonists, hematopoietic stem cell mobilizer, heparin antagonists, heparins, HER2 inhibitors, herbal products, histone deacetylase inhibitors, hormone replacement therapy, hormones, hormones/antineoplastics, hydantoin anticonvulsants, illicit (street) drugs, immune globulins, immunologic agents, immunostimulants, immunosuppressive agents, impotence agents, in vivo diagnostic biologicals, incretin mimetics, inhaled anti-infectives, inhaled corticosteroids, inotropic agents, insulin, insulin-like growth factor, integrase strand transfer inhibitor, interferons, interleukin inhibitors, interleukins, intravenous nutritional products, iodinated contrast media, ionic iodinated contrast media, iron products, ketolides, laxatives, leprostatics, leukotriene modifiers, lincomycin derivatives, lipoglycopeptides, local injectable anesthetics, loop diuretics, lung surfactants, lymphatic staining agents, lysosomal enzymes, macrolide derivatives, macrolides, magnetic resonance imaging contrast media, mast cell stabilizers, medical gas, meglitinides, metabolic agents, methylxanthines, mineralocorticoids, minerals and electrolytes, miscellaneous agents, miscellaneous analgesics, miscellaneous antibiotics, miscellaneous anticonvulsants, miscellaneous antidepressants, miscellaneous antidiabetic agents, miscellaneous antiemetics, miscellaneous antifungals, miscellaneous antihyperlipidemic agents, miscellaneous antimalarials, miscellaneous antineoplastics, miscellaneous antiparkinson agents, miscellaneous antipsychotic agents, miscellaneous antituberculosis agents, miscellaneous antivirals, miscellaneous anxiolytics, sedatives and hypnotics, miscellaneous biologicals, miscellaneous bone resorption inhibitors, miscellaneous cardiovascular agents, miscellaneous central nervous system agents, miscellaneous coagulation modifiers, miscellaneous diuretics, miscellaneous genitourinary tract agents, miscellaneous GI agents, miscellaneous hormones, miscellaneous metabolic agents, miscellaneous ophthalmic agents, miscellaneous otic agents, miscellaneous respiratory agents, miscellaneous sex hormones, miscellaneous topical agents, miscellaneous uncategorized agents, miscellaneous vaginal agents, mitotic inhibitors, monoamine oxidase inhibitors, monoclonal antibodies, mouth and throat products, mTOR inhibitors, mTOR kinase inhibitors, mucolytics, multikinase inhibitors, muscle relaxants, mydriatics, narcotic analgesic combinations, narcotic analgesics, nasal anti-infectives, nasal antihistamines and decongestants, nasal lubricants and irrigations, nasal preparations, nasal steroids, natural penicillins, neuraminidase inhibitors, neuromuscular blocking agents, next generation cephalosporins, nicotinic acid derivatives, nitrates, NNRTIs, non-cardioselective beta blockers, non-iodinated contrast media, non-ionic iodinated contrast media, non-sulfonylureas, nonsteroidal anti-inflammatory agents, norepinephrine reuptake inhibitors, norepinephrine-dopamine reuptake inhibitors, nucleoside reverse transcriptase inhibitors (NRTIs), nutraceutical products, nutritional products, ophthalmic anesthetics, ophthalmic anti-infectives, ophthalmic anti-inflammatory agents, ophthalmic antihistamines and decongestants, ophthalmic diagnostic agents, ophthalmic glaucoma agents, ophthalmic lubricants and irrigations, ophthalmic preparations, ophthalmic steroids, ophthalmic steroids with anti-infectives, ophthalmic surgical agents, oral nutritional supplements, other immunostimulants, other immunosuppressants, otic anesthetics, otic anti-infectives, otic preparations, otic steroids, otic steroids with anti-infectives, oxazolidinedione anticonvulsants, parathyroid hormone and analogs, penicillinase resistant penicillins, penicillins, peripheral opioid receptor antagonists, peripheral vasodilators, peripherally acting anti-obesity agents, phenothiazine antiemetics, phenothiazine antipsychotics, phenylpiperazine antidepressants, plasma expanders, platelet aggregation inhibitors, platelet-stimulating agents, polyenes, potassium-sparing diuretics, probiotics, progesterone receptor modulators, progestins, prolactin inhibitors, prostaglandin D2 antagonists, protease inhibitors, proton pump inhibitors, psoralens, psychotherapeutic agents, psychotherapeutic combinations, purine nucleosides, pyrrolidine anticonvulsants, quinolones, radiocontrast agents, radiologic adjuncts, radiologic agents, radiologic conjugating agents, radiopharmaceuticals, RANK ligand inhibitors, recombinant human erythropoietins, renin inhibitors, respiratory agents, respiratory inhalant products, rifamycin derivatives, salicylates, sclerosing agents, second generation cephalosporins, selective estrogen receptor modulators, selective immunosuppressants, selective phosphodiesterase-4 inhibitors, selective serotonin reuptake inhibitors, serotonin-norepinephrine reuptake inhibitors, serotoninergic neuroenteric modulators, sex hormone combinations, sex hormones, skeletal muscle relaxant combinations, skeletal muscle relaxants, smoking cessation agents, somatostatin and somatostatin analogs, spermicides, sphingosine 1-phosphate receptor modulators, statins, sterile irrigating solutions, *streptomyces* derivatives, succinimide anticonvulsants, sulfonamides, sulfonylureas, synthetic ovulation stimulants, tetracyclic antidepressants, tetracyclines, therapeutic radiopharmaceuticals, therapeutic vaccines, thiazide diuretics, thiazolidinediones, thioxanthenes, third generation cephalosporins, thrombin inhibitors, thrombolytics, thyroid drugs, TNF alfa inhibitors, tocolytic agents, topical acne agents, topical agents, topical anesthetics, topical anti-infectives, topical antibiotics, topical antifungals, topical antihistamines, topical antipsoriatics, topical antivirals, topical astringents, topical debriding agents, topical depigmenting agents, topical emollients, topical keratolytics, topical steroids, topical steroids with anti-infectives, toxoids, triazine anticonvulsants, tricyclic antidepressants, trifunctional monoclonal antibodies, tumor necrosis factor (TNF) inhibitors, tyrosine kinase inhibitors, ultrasound contrast media, upper respiratory combinations, urea anticonvulsants, urinary anti-infectives, urinary antispasmodics, urinary pH modifiers, uterotonic agents, vaccine, vaccine combinations, vaginal anti-infectives, vaginal preparations, vasodilators, vasopressin antagonists, vasopressors, VEGF/VEGFR inhibitors, viral vaccines, viscosupplementation agents, vitamin and mineral combinations, vitamins, or mixtures and combinations thereof provided that the coating includes analyte specific binding regions.

Suitable surfactants for use in reversibly changing the properties of the coatings of this invention include, without limitation, fluorinated surfactants, anionic surfactants, non-ionic surfactants and/or cationic surfactants or mixture or combinations thereof. Exemplary examples of fluorinated surfactants include, without limitation, perfluorooctanesulfonic acid (PFOS), perfluorooctanoic acid (PFOA), perfluorononanoic acid (PFNA), DuPont Zonyl® FSO Fluorinated Surfactant, DuPont™ Forafac® fluorinated surfactants, or mixture thereof.

Suitable anionic surfactants include, without limitation, anionic sulfate surfactant, alkyl ether sulfonates, alkylaryl sulfonates, or mixture or combinations. Preferred sodium or ammonium alcohol ether sulfate surfactants include those having the general formula $R^1O$—$(CH_2CH_2O)_nSO_3NH_4$, where $R^1$ is a carbon-containing group including an alkyl group, an aryl group, an alkaryl group, an aralkyl group or mixture thereof. Particularly preferred sodium or ammonium alcohol ether sulfate surfactants include short chain sodium or ammonium alcohol ether sulfate surfactants having between 2 and about 10 carbon atoms, especially, between about 4 and 10 carbon atoms and long chain sodium or ammonium alcohol ether sulfate surfactants having between about 10 to about 24 carbon atoms, more particularly, between about 12 and about 18 carbon atoms, especially, between about 12 and about 14 carbon atoms. The sodium ammonium alcohol ether sulfate surfactants are prepared by reacting 1 to 10 moles of ethylene oxide per mole of alkanol, preferred, are prepared by reacting 3 moles of ethylene oxide per mole of alkanol.

Preferred alkylaryl sulfonates including, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

Preferred alkyl ether sulfonates including, without limitation, alkyl ether sulfonates having the general formula $R^2[—(O—R^3O)m-(R^4O)n-(R^5)]_y$, where: $R^2$=alkyl, alkenyl, amine, alkylamine, dialkylamine, trialkylamine, aromatic, polyaromatic, cycloalkane, cycloalkene, $R^3$, $R^4$=$C_2H_4$ or $C_3H_6$ or $C_4H_8$, $R^4$=linear or branched $C_7H_{14}SO_3X$ to $C_{30}H_{60}$ $SO_3X$ when y=1, $R^5$=linear or branched $C_7H_{14}SO_3X$ to $C_{30}H_{60}SO_3X$ or H when y>1 but at least one $R^4$ must be linear or branched $C_7H_{14}SO_3X$ to $C_{30}H_{60}$ $SO_3X$, M is greater or equal to l, n is greater or equal to 0, n+m=1 to 30+, y is greater or equal to 1, X=alkali metal or alkaline earth metal or ammonium or amine.

Suitable cationic surfactants include, without limitation, any cationic surfactant such as monocarbyl ammonium salts, dicarbyl ammonium salts, tricarbyl ammonium salts, monocarbyl phosphonium salts, dicarbyl phosphonium salts, tricarbyl phosphonium salts, carbylcarboxy salts, quaternary ammonium salts, imidazolines, ethoxylated amines, quaternary phospholipids, gemini, bis or di quaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether (DCEE). Preferred bis quaternary ammonium halides are prepared from substituted dimethyl tertiary amines, where the substituent includes between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety. Particularly preferred bis quaternary ammonium halides hydrocarbons are prepared from naturally occurring acids, such as fatty acids, synthetic acids, modified naturally occurring acids, or mixture or combinations thereof. Preferred naturally occurring acids are those found in naturally occurring oils such as coconut oil, palm oil, palm kernel oil, soya, safflower oil, sunflower oil, peanut oil, canola oil, or from animal such as tallow oil and its derivatives. Preferred bis quaternary ammonium halides are prepared from disubstituted methyltertiaryamines, where the substituents include between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine (DMAPA) or similar terminated primary-tertiary diamines, reacted with the above mentioned oils or their corresponding fatty acids, or hydroxy acids. Other preferred cationic surfactants are dimer acids or anhydrides including alkylsubstituted maleic anhydride, alkylsubstituted diethylmalonic acid, or alkyl-substituted higher diacids such as azelaic acid (C9), trimer acids as NTA(nitriloacetic acid), and aconitic acid and trimetellic anhydride are useful though producing a higher trimer. the tertiary amine may be accomplished by reaction of a diamine with a fatty acid or oil, reacting with one amine and then converting the other primary amine to tertiary by the addition of tetrahydrofuran, ethylene oxide, propylene oxide, butylene oxide, epichlorohydrin, or the like and further where the terminal hydrogens of the primary amine can be alkylated using formaldehyde/formic acid mixtures.

Suitable non-ionic surfactants include, without limitation, polyglycols comprising polymers of ethylene oxide (EO), propylene oxide (PO), and/or butylene oxide (BO), polyethyleneoxide polymers such as alcohol ethoxylates and the alkylphenol ethoxylates, alkyl polyglycosides, sorbitan ester surfactants, distribution of the polyoxyethylene chain, polyoxyethylene alkylphenols, polyoxyethylene alcohols, polyoxyethylene esters of fatty acids, polyoxyethylene mercaptans, polyoxyethylene alkylamines, nonionic surfactants containing an amide group, polyol ester surfactants, and mixtures or combinations thereof.

Suitable zwitterionic compounds include, without limitation: (1) any compound having the general structure $R^6,R^7$, $R^8N^+$—$R^9$—$CO_2^-$, where $R^6$, $R^7$, and $R^8$ are the same or different carbon-containing group, amido carbon-containing group, ether carbon-containing group, or mixtures thereof, and $R^9$ is an alkenyl group, alkenyloxide group or mixtures thereof; (2) any compound having the general structure $R^{10}(R^7,R^8N^+$—$R^9$—$CO_2^-)_n$, where $R^7$ and $R^8$ are the same or different carbon-containing group, amido carbon-containing group, ether carbon-containing group, or mixtures thereof, $R^9$ is an alkenyl group, alkenyloxide group or mixtures thereof, and $R^{10}$ is a multivalent substituent having a valency n between 2 and about 6, e.g., $CH_2$ moiety when n is 2, a CH moiety when n is 3 and a C atom when n is 4; (3) any compound having the general structure $R^{12}$—C(O)—$N(R^{11})$—$R^{13}$—$N^+(R^7,R^8)$—$R^9$—$CO_2^-$, where $R^7$, $R^8$, $R^{11}$ and $R^{12}$ are the same or different carbon-containing group, amido carbon-containing group, ether carbon-containing group, or mixtures thereof, and $R^9$ and $R^{13}$ are the same or different alkenyl group, alkenyloxide group or mixtures thereof; (4) any compound having the general structure $R^{14}$—$[R^{15}$—C(O)—$N(R^{11})$—$R^{13}$—$N^+(R^7,R^8)$—$R^9$—$CO_2^-]_m$, where $R^7$, $R^8$ and $R^{11}$ are the same or different carbon-containing group, amido carbon-containing group, ether carbon-containing group, or mixtures thereof, $R^9$, $R^{13}$ and $R^{15}$ are the same or different alkenyl group, alkenyloxide group or mixtures thereof and $R^{14}$ is a multivalent substituent having a valency m between 2 and about 6; other similar ammonium acid zwitterionic agent; or mixtures or combinations thereof. Preferred zwitterionic compounds are betaines such as cocamidopropyl betaine, 5-(1-piperidiniomethyl)-1H-tetrazolide, or similar zwitterionic compounds. Other zwitterionic compounds for use in this invention include, without limitation, phospholipids capable of assuming a zwitterionic state such as phosphatidylcholine, phosphatidylserine, phosphalidylethanolamine, sphingomyelin and other ceramides, as well as various other zwitterionic phospholipids. Preferred sulfo-betaines and related zwitterionic compounds include, without limitation, N-Decyl-N,N-dimethyl-3-ammonio-1-propanesulfonate; Dimethylbenzyl-(3-sulfopropyl)ammonium; Dimethylethyl-(3-sulfopropyl)ammonium; Dimethyl-(2-hydroxyethyl)-(3-sulfopropyl)ammonium; 4-n-Hexylbenzoylamido-propyl-dimethylammoniosulfobetaine; -Methyl-N-(3-sulfopropyl) morpholinium; 4-n-Octylbenzoylamido-propyl-dimethylammoniosulfobetaine; 1-(3-Sulfopropyl)pyridium; N-Tetradecyl-N,N-Dimethyl-3-Ammonio-1-Propanesulfonate, or the like or mixtures or combination thereof.

DETAILED DESCRIPTION OF SECTION I

In another embodiment, the present invention also makes use of colloidal particles to improve the interfacial area that provide better conditions for efficient templating and sensitive sensing Scheme I.1 as shown in FIG. 1.1. The colloidal particles can host analytes on the surface and separately ordered at the surface of a solid-substrate electrode. The fabricated E-MIP film is improved over existing ones by increasing the surface area of the film, and thereby creating more cavities for template rebinding. This is accomplished by introducing layer ordered sub-micron spherical particles onto the Au substrate. Then a template-assisted electropolymerization of the monomer with the template is performed onto the polystyrene (PS)-coated gold (Au) substrate for example. This step is followed by the removal of the template and the spherical particles to create a high surface area of imprinted conducting polymer film leading to a two-dimensional (2D) E-MIP film. Such approach allows for more templates to be first incorporated into the polymer film, and subsequently removed from the polymer network Scheme I.1 as shown in FIG. 1.1. A variation of this involves the modification of the particle surface with an analyte template instead of introducing it with the monomer. In this case, most of the cavities will be imprinted on the interface between the colloidal particle and the electrodeposited polymer matrix. This is referred to as reversed colloidal molecular imprinting.

In another embodiment, the present invention also describes the use of a solid-support of any geometry as electrode substrate (working electrode) to enable the utilization of various electrochemical procedures based on Au-coated glass, such as but not limited to Indium-tin-oxide (ITO) glass, Ag-glass, Pt-glass, or any metal or metal oxide electrode for deposition of the electropolymerized films. The ultrathin or template films can then be utilized for various sensor transduction experiments including surface plasmon resonance (SPR) spectroscopy, electrochemical impedance spectroscopy (EIS), optical waveguide spectroscopy (OWS) and other optical, electrical, acoustic, and spectroscopic transduction methods. It should be noted that electrochemistry can be done in various shapes, sizes, and geometries of the electrode.

Materials

Preparation of E-MIP on Planar Surface

All chemicals are used as received unless otherwise specified. The templates (naproxen, paracetamol, and naproxen), analogous analytes (1-napththalenesulfonic acid sodium salt, acetanilide, caffeine, theobromine, 3-aminophenol, and 4-aminobenzoic acid) used in selectivity studies, supporting electrolyte (tetrabutylammonium hexafluorophosphate), and acetonitrile are purchased from Sigma-Aldrich. Glass slides (BK 7) are acquired from VWR. All the mono- and bi-functional monomers used to fabricate the ultrathin films are synthesized in our lab using a modified procedure, and the details of the synthesis can be found elsewhere.[7] The MIP solution is prepared by mixing 200 μM of the monomer (e.g. 3-carboxylic acid terthiophene (G0-3TCOOH)) and 100 μM of the template in acetonitrile (ACN) containing 0.1 M tetrabutylammonium hexafluorophosphate (TBAH). After mixing, the MIP solution is kept initially in cool, dark and dry conditions for at least 48 hrs to allow the intermolecular interaction between the monomer and the drug molecule template (called pre-polymerization complexation[8]). Similarly, the non-imprinted polymer (NIP) solution is prepared but without the addition of the template. For sensing experiments, the solutions of the template and other analytes are prepared in 0.1 M phosphate buffer saline (PBS) solution. The 0.1 M PBS solution is prepared by dissolving 1 tablet of the PBS (Sigma-Aldrich) into 200 ml Milli-Q water. Prior to the injection into the SPR cell, the solution of the template and other analytes is filtered using a micro syringe filter (0.45 μm). The gold-coated slide is prepared by thermally evaporating gold (50 nm thick) onto BK 7 glass and silicon wafer with chromium adhesion layer (2-5 nm thick) under high vacuum ($10^{-6}$ bar).[9] The Cr and Au deposition is done at a rate ~0.4 Å $sec^{-1}$ and ~1.1 Å $sec^{-1}$, respectively, using a thermal evaporator (Edwards, E-306). Prior to use, the evaporated Au slides and commercially available Au disks (obtained from Eco Chemie and Brinkmann Instruments) for SPR sensing are plasma cleaned (with oxygen gas) for 120 sec.

Preparation of E-MIP with Colloidal Templating on a 2D Plane

Polystyrene (PS) latex microbeads (2.61 wt % solids in aqueous suspension) are purchased from Polysciences, Inc. and are used without further purification. Acetonitrile (ACN), sodium n-dodecyl sulfate (SDS), tetrahydrofuran (THF), and tetrabutylammonium hexafluorophosphate (TBAH) are obtained from Sigma-Aldrich. The sample peptides (N-L-a-aspartyl-L-phenylalanine 1-methyl ester or aspartame, leucine-leucine, alanine-phenylalanine, glycine-glycine, alanine-glutamine, and Arginine-glycine-aspartic acid or RGD are all bought from Sigma-Aldrich. Au-coated QCM crystals (5 MHz, 90 C cut, polished) are obtained from Inficon, Inc. Similarly, the monomer (terthiophene acetic acid or G0-3TCOOH) used in electropolymerization is synthesized in our lab, and the details of the synthesis are reported in the literature.[7] The gold slide is prepared in the same manner as mentioned above using a thermal evaporator (Edwards). The deionized water (18 mΩ) used for the dilution of PS particles is purified by a Milli-Q Academic® system (Millipore Cooperation) with a 0.22 micron Millistack filter at the outlet. Also, the MIP solution (2:1 monomer-to-template molar ratio) is kept in cold (~4 degree) and dark place for at least 48 hrs to allow the intermolecular interaction between the monomer and the peptide template.

Preparation of PS Coated Surfaces

Prior to the deposition of PS, the substrates (Au coated BK7 glass, Au QCM crystal, and ITO) are cleaned. The Au coated slide and Au QCM crystal are cleaned with an oxygen plasma etcher (Plasmod, March) for 120 seconds, while the ITO was sonicated in various solvents followed by oxygen plasma cleaning also for 120 seconds. The layering of different sizes (0.1, 0.2, 0.35, 0.5 and 2 μm) of PS microspheres is done on Au-coated BK 7 glass, Au-coated QCM crystal, and ITO using a similar procedure described earlier by Grady and co-workers called Langmuir-Blodgett (LB)-like technique.[21] As shown in Scheme I.1, the substrate is attached into the dipper motor via Teflon clip and is dipped into a solution of PS particles (1 wt % solids in water for 0.2, 0.35, 0.5 and 2 μm sizes and 2.5 wt % solids in water for 0.1 μm size) and SDS (34.7 mM) as spreading agent. A solution of 1 wt % solids is first tried for the 100 nm size, but high coverage is not attained. Therefore, a solution containing 2.5 wt % solids is used for the 100 nm size PS to increase the coverage of the particles onto the substrate. The substrate is then withdrawn vertically from the solution at a lift-up rate of 0.1 to 0.3 mm/s. Then the substrate is dried by suspending it in air for a few minutes.

Electropolymerization of the Monomer

The electropolymerization of the monomer is done using the potentiodynamic cyclic voltammetry technique in a standard three electrode measuring cell (fabricated electrochemical cell with a diameter of 1.0 cm and 0.785 cm$^3$, Teflon made) with platinum wire as the counter electrode, Ag/AgCl wire as the reference electrode, and the bare Au or PS coated Au or PS coated ITO as the working electrode (Scheme I.1). The potential is scanned between 0V to 0.8V (or 0.75V) for the E-MIP on planar surface at 50 mV/s and 20 CV cycles and 0 V to 1.1 V for the E-MIP on 2D surface at 100 mV/s and 15 CV cycles. After electrodeposition, the resulting film is washed in ACN (for 3 times), and a monomer free scan (in ACN with 0.1 M TBAH) is performed by using exactly the same experimental parameters but for 1 CV cycle only. Finally, the film is dried with nitrogen gas. For the fabrication of the E-MIP sensor for drug detection, the MIP solution (2:1 monomer-to template molar ratio) is electropolymerized by cyclic voltammetry technique as described above onto an SPR sensor Au disk. On the other hand, the making of the E-MIP sensor for peptide detection is done onto QCM Au crystal by cyclic voltammetry as describe also above.

The electrochemical principles and methods described herein can also be done using potentiostatic or chronoamperometric methods.

Removal of Template Molecules and PS Microbeads

Washing of the Template Drug Molecule from E-MIP Film on Planar Surface

The template drug molecule is removed from the polymer film by potential induced washing. This experiment is accomplished by applying a constant positive potential of 0.4 V for 10 minutes to the film that is soaked in ACN with 0.1 M TBAH as supporting electrolyte. Afterwards, the film is subjected to flow washing in ACN for several minutes. A monomer free scan (CV 1 cycle in ACN with 0.1 M TBAH) is performed after washing the film in ACN.

The application of this constant potential washing step is a key enabling step in this present invention for improved templating performance and eventually improved sensitivity and selectivity.

Washing of the PS Microspheres (and Peptide Template)

The PS microspheres are removed from the surface after electropolymerization by dipping the PS coated substrate in THF for 30 minutes (2 times). The film is allowed to dry naturally under ambient condition.

Washing of the Template Peptide Molecule from E-MIP Film on 2D Surface

In the case of the peptide imprinted electropolymerized film (electropolymerization of G0-3TCOOH mixed with the peptide onto the PS microbeads layer), the template peptide is removed prior to the washing of the PS particles (used as the sacrificial templates). The removal of the peptide is done by soaking the substrate in Milli-Q water for 5 minutes (at least 6 times) and then in methanol for 10 minutes (at least 2 times) using a modified procedure describe elsewhere.[8] Then the washing of PS is performed using the above procedure.

Instrumentation

Electrochemistry

Cyclic voltammetry is performed in an Autolab PGSTAT 12 potentiostat (Brinkmann Instruments) using the conventional three-electrode cell with Pt rod as counter electrode, Ag/AgCl wire as reference electrode, and Au substrate of either Au coated slide (BK7 glass) or SPR disk or QCM crystal as working electrode). The potentiostat is controlled by GPES software (version 4.9). Chronoamperommetry is done on the same set up with the three electrode system. This technique is performed during the washing of the template drug molecule from an E-MIP on planar surface.

Surface Plasmon Resonance (SPR) Spectroscopy

The SPR set-up (Autolab ESPRIT from Eco Chemie) that is coupled to a potentiostat (Brinkmann Instruments now MetroOhm USA) adopted a Kretschmann configuration with a 670 nm laser source. The SPR and potentiostat instruments are controlled by ESPRIT version 4 and GPES version 4.9 softwares, respectively. The SPR Au disk that served as the surface plasmon resonator is also used as the working electrode for the electrochemistry set-up in a standard three electrode measuring cell with platinum rod as the counter electrode and Ag/AgCl wire as the reference electrode (inserted at the top of the sample channel).

Quartz Crystal Microbalance (QCM)

The fabrication of the peptide imprinted sensor surface is performed in QCM coupled to an electrochemistry set-up (Amel 2049 potentiostat) with the same standard three electrode system described above. The QCM apparatus, probe, and crystals are made available from Maxtek, Inc. The AT-cut polished QCM crystals (5 MHz) with 13 mm diameter is used as the working electrode. The data acquisition is done with an R-QCM system equipped with a built-in phase lock oscillator and the R-QCM Data-Log software. The resulting change in frequency can then be used to calculate the mass change due to the adsorbed material onto the film using the Sauerbrey equation:

$$\Delta F = \frac{-2F_q^2 \Delta m}{A\sqrt{\rho_q \mu_q}}$$

where ΔF is the change in frequency, Δm is the mass change, $F_q$ (=5 MHz) is the resonant frequency of the QCM crystal, A (=1.227 cm$^2$) is the area of the electrode, $\rho_q$ (=2.65 g/cm$^3$) is the density of the quartz, and $\mu_q$ is the shear modulus of the quartz.

Static Contact Angle

The water contact angle is done using a CAM 200 optical contact angle meter (KSV Instruments Ltd) with CAM 200 software. The experiment is carried out by moving slowly upward the sample stage with the sample on top to come into contact with the water droplet (~1 μL) that is suspended at the tip of the micro syringe (200 μL). The reading of the contact angle is done after 30 seconds when the droplet has been made into the surface, and at least three trials are performed at various positions of the surface.

Ellipsometry

The thickness of the electropolymerized film is determined by ellipsometry using the Multiskop ellipsometer (Optrel GmbH, Germany) equipped with a 632.8 nm laser.

The measurement is done at 60° angle of incidence at dry and ambient conditions. At least three measurements are performed at various spots of the film. The measured values of Δ and Ψ are used to simulate the thickness of the film using integrated specialized software (Elli, Optrel) that is provided with the instrument.

Atomic Force Microscopy (AFM)

The AFM scanning is carried out in a piezo scanner from Agilent Technologies. The scanning rate is 0.8-1.5 lines/s. Commercially available tapping mode tips (TAP300, Silicon AFM Probes, Ted Pella, Inc.) are used on cantilevers with a resonance frequency in the range of 290-410 kHz. The scanning of the PS coated Au and ITO is performed under ambient and dry conditions. All AFM topographic images (AAC tapping mode) are filtered and analyzed by using Gwyddion software (version 2.19).

X-Ray Photoelectron Spectroscopy (XPS)

A PHI 5700 X-ray photoelectron spectrometer is equipped with a monochromatic Al Kα X-ray source (hv=1486.7 eV) incident at 90° relative to the axis of a hemispherical energy analyzer. The spectrometer is operated both at high and low resolutions with pass energies of 23.5 eV and 187.85 eV, respectively, with photoelectron take off angle of 45° from the surface and an analyzer spot diameter of 1.1 mm. Electron binding energies are calibrated with respect to the Au $4f_{7/2}$ peak at 84.0 eV for the E-MIP on planar surface and C1s peak at 284.6 eV for the E-MIP on 2D surface. The survey spectra are collected from 0 to 1400 eV, and the high resolution spectrum are obtained for C1s, O1s, S 2p, S 2s, N1s and Au 4f. All spectra are collected at room temperature with a base pressure of $1\times10^{-8}$. The XPS data are processed using the PHI Multipak Software (version 5.0A).

Part 1: E-MIP on Planar Surface: An SPR Sensing

FIG. 1.2 summarizes the fabrication scheme of the E-MIP on Au substrate consisting of the electropolymerization of the functional and cross-linking monomers in the presence of the template followed by potential induced washing of the resulting film to create the complimentary template-shaped cavities for sensing. FIG. 1.2B and FIG. 1.2C illustrate the EC-SPR set-up for the electropolymerization and SPR set-up for the rebinding of the template, respectively.

FIG. 1.3 shows the chemical structure of the different monomers that are used for electropolymerization. Note that these monomers have the advantage of being both monomer and cross-linker, a key enabling design for the high sensitivity and selectivity for sensing. The carbazole or terthiophene pendant groups are electropolymerizable units that can propagate to form the conjugated polymer network by anodic polymerization while the pre-grafted functional groups (—COOH, —OH, and —NH$_2$) serve as the binding site for complexing with the template via non-covalent interaction.[9] Other anodic electropolymerizable monomers can be used which incorporates thiophene, aniline, pyrrole, fluorene, and its fused heteroaromatic, oligomeric, and copolymeric derivatives. Again, this monomer concept can be extended to electropolymerizable vinyl, acrylate, styrenic monomers with a branched dendron-like architecture.

FIG. 1.4 displays the EC-SPR monitoring during the MIP film (theophylline imprinting onto poly(terthiophene)-COOH) formation. The electrodeposition of the E-MIP film shows a recurring oscillation of the SPR kinetic curves (FIG. 1.4A) for each CV cycles, which is due to changes in the dielectric property[10] of the poly(terthiophene) film as it switches from oxidized to reduced states. This result is complemented by the change in the SPR angle as the potential is swept forward to 0.8 V (oxidation process) and reversed backward to 0 V (reduction process) (FIG. 1.4C).

The profile achieved in the kinetic curve (FIG. 1.4A) agrees with our earlier results on electropolymerization of polyaniline[11] and polycarbazole[12] where the SPR response increases during oxidation and decreases upon reduction. The change in the dielectric property of the film has been explained as a result of the doping/dedoping of the conducting polymer. Upon oxidation, the doping process occurs when an anionic dopant (PF$^{6-}$ from the TBAH) from the bulk solution is incorporated into the film to compensate for the cationic charge carried by the polymer backbone.[13] The inserted dopant is then released into the bulk solution upon reduction (dedoping process). At doped states, the electrical conductivity of a conducting polymer is highest. The insertion/ejection of the counter ion from/to solution during the doping and dedoping of a conducting polymer has been observed previously using EC-QCM measurements.[14] The shifting of the minimum of the SPR angle (inset of FIG. 1.4A) after electropolymerization has been explained to be a combined effect of the change in dielectric constant and thickness as a result of the E-MIP film deposition on Au substrate.[14] The CV diagram depicts an increasing current in the oxidation regime (~0.6 V to 0.8 V) from the $1^{st}$ cycle to $20^{th}$ cycle, indicating the deposition of the conducting polymer film (FIG. 1.4C). The same oxidation peak is observed with the electropolymerization of the monomer alone (NIP), which means that the template is electrochemically stable at the scanned potential window and only the monomer undergoes electropolymerization. A similar trend is shown in the SPR kinetic and CV diagram with imprinting of naproxen and paracetamol. To confirm the adsorption of the E-MIP film on gold substrate, a monomer free scan is performed on the same potential window (0 V-0.8 V) after electropolymerization. Prior to scanning the CV in the monomer free solution, the electropolymerized film is rinsed thoroughly in ACN to remove the excess monomers and weakly adsorbed molecules on gold substrate. A similar reduction-oxidation (redox) peak is seen in the CV diagram of the monomer free scan (inset of FIG. 1.4C), which corroborates the formation of the E-MIP film.

FIG. 1.5 displays the XPS high resolution scans to verify the formation of the poly(terthiophene) and the imprinting of the template (theophylline). The N 1s peak, which is a unique elemental maker only found in the structure of the template, proves the imprinting of theophylline. The appearance of S 2s and S 2p validates the electrodeposition of the poly(terthiophene). Also, the other elements such as C 1s, and O 1s support the formation of the MIP film on Au substrate. The presence of the Au 4f peak explains that a thin MIP film is deposited on Au substrate. The thickness of the films is measured by ellipsometry, which is summarized on Table I.1.

TABLE I.1

Summary of the Surface Characterization Measurements of the Three Mip Film Before and after the Template (Drug Molecules) Removal by Constant Potential Wash (applying 0.4 V)

| MIP Film | Water Contact Angle (degree) | Ellipsometry Thickness (nm) | AFM RMS (nm) | XPS N1s (a.u.) Peak Area |
|---|---|---|---|---|
| A. MIP film with 200 μM G0-3TCOOH and 100 μM Naproxen (NP) | | | | |
| a. Before NP Removal | 54.50 ± 0.55 | 5.18 ± 0.03 | 1.26 ± 0.05 | n.a. |
| b. After NP Removal | 53.31 ± 0.48 | 5.02 ± 0.10 | 1.67 ± 0.21 | n.a. |

TABLE I.1-continued

Summary of the Surface Characterization Measurements of the Three Mip Film Before and after the Template (Drug Molecules) Removal by Constant Potential Wash (applying 0.4 V)

| MIP Film | Water Contact Angle (degree) | Ellipsometry Thickness (nm) | AFM RMS (nm) | XPS N1s (a.u.) Peak Area |
|---|---|---|---|---|
| B. MIP film with 200 µM G0-3TCOOH and 100 µM Theophylline (Th) | | | | |
| a. Before Th Removal | 56.20 ± 0.56 | 11.87 ± 0.26 | 1.11 ± 0.03 | 424 |
| b. After Th Removal | 52.45 ± 1.22 | 10.73 ± 0.23 | 1.60 ± 0.02 | 55 |
| C. MIP film with 200 µM G0-3TCOOH and 100 µM Paracetamol (PCM) | | | | |
| a. Before PCM Removal | 56.86 ± 0.52 | 2.06 ± 0.31 | 0.81 ± 0.06 | 732 |
| b. After PCM Removal | 52.24 ± 0.98 | 1.78 ± 0.10 | 1.05 ± 0.16 | 138 |

FIG. 1.6 shows the removal of the template by potential induced washing. SPR angular and CV measurements are used to study the release of the template drug (theophylline as model drug) from the polymer film. The distinct shift in the SPR minimum (FIG. 1.6A and FIG. 1.6B) relative to the curve before applying a constant potential can be attributed to: (1) the change in thickness due to swelling and (2) the change in optical property (refractive index) resulting from the increase in conductivity of the polymer film. Unlike with thicker films (greater than 0.5 µm), the change in the SPR minimum is caused only by the change in refractive index.[15] Previously, the doping process of thiophene-based polymers has been reported to create charges within the polymer network.[16] With charging, an electrostatic repulsion between the charges may occur resulting in swelling of the polythiophene film. This facilitates the release of more template molecules, creating cavities for a sensor recognition element. In order to confirm the swelling of the imprinted polymer, the same experiment is performed with the NIP film (control), which showed a similar increase in the SPR minimum. Upon comparison, the MIP exhibits less angular change (about 20 to 40 milli degree) versus the NIP film (about 70 to 80 milli degree). This result can be attributed to the angular shift of the MIP through a combination of refractive index decrease (as a result of the formation of cavities or pores) and thickness increase of the polymer film due to swelling. The latter might be a more dominant effect, causing the SPR curve to shift still to higher angular minima value. In addition, the MIP film has less swelling than NIP due to the imprinted templates entrapped inside the highly cross-linked polymer network. By applying a constant positive potential (doping), the conductivity of conjugated polymers will change. Its conductivity is largest for the doped state and decreases for the dedoped state. The increase in conductivity of the polymer film varies with the dielectric constant because of the effect of the imaginary part. As a consequence, the SPR minimum will change in terms of width (angular) and depth (peak reflectivity) after applying a constant potential. A very similar trend about the SPR minimum shift is observed with a polypyrrole film after oxidation (doping).[16] The dashed lines in FIG. 1.6A and FIG. 1.6B are for 0.4 V corresponding to the doped (charge) state while the solid lines are for 0 V corresponding to the dedoped (neutral) state of poly(terthiophene). To further investigate the doping of the poly(terthiophene) and the release of theophylline, electrochemical experiments are utilized. From the CV scan, both films (MIP and NIP) showed an increase in current at the oxidation peak regime (~0.6 to 0.8V) after applying a constant positive potential during washing. This result indicates an increase in conductivity of the polymer films, validating the doping process. Interestingly, the MIP had a higher current increase as compared to the NIP film. This phenomenon can be attributed to the diffusion of more redox probe ($PF^{6-}$) into the doped polymer film as a result of the formation of more pores within the MIP film. Previously, the creation of porous MIP film after solvent extraction is determined by the insertion of more redox probe as monitored by an electrochemistry technique.[17] Nevertheless, the peak potentials of both NIP and MIP films remains the same, which proves the stability of the poly(terthiophene).

In summary, the present invention as described herein offers significant improvements over the known prior art by, for example:

Emphasizing the use of a constant potential washing. This procedure induces changes in the swelling, wettability, and surface energy of the polymer host, which help to release the analyte.

Emphasizing the use of specific solvents that is advantageous for these procedures.

Emphasizing the use of ultrathin films and high surface area to improved the sensing characteristics.

FIG. 1.7 presents the decrease in the N 1s peak from the earlier XPS high resolution scan after the potential induced washing of the film. The N 1s peak is only due to the theophylline, imprinted drug molecule. With the decrease in the peak area (decrease by more than 80%) of the N1 s, the removal of theophylline from the poly(terthiophene) is verified. Moreover, the S 2s peak area, which is only due to poly(terthiophene), remained almost constant, verifying the stability of the polymer film despite the application of a potential during the template washing. The same result is observed with the paracetamol-imprinted film as described in Table I.1.

FIG. 1.8 demonstrates the AFM analysis of the MIP films before and after the potential induced washing at 0.4 V in ACN. The three MIP films have shown changes in the surface morphology (AFM topography images) of the films after washing them, and the RMS values have increased, indicating the formation of more porous films. This result is expected since cavities are generated onto the polymer film as a result of the template removal. The RMS data for the three MIP films are recorded in Table I.1.

Table I.1 also summarizes the results obtained with the different characterization techniques for the three MIP films (naproxen, theophylline, and paracetamol imprinted) before and after potential induced washing. A decrease in the water contact angle and ellipsometric thickness are observed after the washing of the films. Furthermore, the RMS value has increased and the peak area of the N 1s due to the template has decreased. These results are consistent with the three MIP films proving the release of the templates from the polymer film.

FIG. 1.9 reveals the SPR sensing response of the MIP film after washing in ACN only versus potential induced washing in ACN. The sensing response is also compared with the response of the NIP film (control). During the 30 minute incubation with the templates after washing in ACN, the E-MIP films (FIG. 1.9A) reveals an obviously higher angular change (delta) in the SPR than the NIP (FIG. 1.9B) when exposed to the imprinted drug molecules except the paracetamol-imprinted film. This result proves clearly that molecular imprinting has taken place, where the sensing of the analyte drug by E-MIP is attributed to the presence of the complimentary cavities that retained the size, shape and orientation of the chemical functionalities of the template drug molecule. The slight angular response in the SPR upon exposure of the NIP film onto a solution of drug can be attributed to non-specific binding. Interestingly, the E-MIP films that are subjected to constant potential washing (at 0.4V in ACN) demonstrated a considerable improvement on sensing compared to the earlier method of washing in ACN. This is more apparent with the paracetamol-imprinted film, where the earlier washing did not probably removed most of the imprinted drug. The bar graph (FIG. 1.9C) summarizes the results of the sensing experiments.

FIG. 1.10 shows the SPR sensing response of the MIP (FIG. 1.10A) and NIP (FIG. 1.10B) films upon injection of the different concentrations of the template (theophylline). The injection of different concentrations (10 to 50 μM) of theophylline shows a linear increase in the SPR angle, which is not observed in the NIP film (FIG. 8c. The sensitivity of the E-MIP SPR sensor is determined from the slope of the calibration curve with a correlation coefficient of 0.994. and is equivalent to 1.044 milli degree $\mu M^{-1}$.

FIG. 1.11 shows the selectivity studies of the three MIP films. The E-MIP films show a greater binding response to the original imprinted molecule and only a limited response to the other analytes (called analogs), even though some of them closely resemble the chemical structure of the template. This result is generally manifested in the three E-MIP films.

FIG. 1.12A demonstrates the stability studies of the E-MIP (theophylline-imprinted) film. The experiment is carried out by injecting 35 μM and 50 μM concentration of the template onto the E-MIP film, and then monitoring the SPR response as a result of the in-situ template binding. After 14 days, the SPR response due to template binding has decreased by ~2.08% and ~1.40% for 50 μM and 35 μM concentrations of theophylline, respectively. Moreover, after 45 days, the sensing response has decreased further to ~14.12% and ~15.89% for 50 μM and 35 μM concentrations of the template, respectively. Therefore, the fabricated E-MIP film does not only exhibit high selectivity and high sensitivity but also good stability, which can retain about 85% of its original response after 45 days of storage in dry conditions under vacuum. FIG. 1.12B shows the reusability of the MIP film after washing in ACN ($2^{nd}$ to $5^{th}$ cycles) and potential induced washing ($6^{th}$ cycle). Upon introduction of the imprinted analyte, a higher sensing response is observed with the MIP film that is subjected to constant potential washing than washing the film in ACN.

FIG. 1.13 illustrates the SPR sensing response of E-MIP films electropolymerized using mono-functional (FIG. 1.13A) and bi-functional monomers (FIG. 1.13B) of terthiophene and carbazole derivatives. The bifunctional monomer (G1) with —OH functional group has shown the best sensing response as compared to the monofunctional monomers (G0). This is possibly due to a greater amount of template-G1 monomer complexes deposited per unit volume on the film. The bifunctional $NH_2$ of both carbazole and terthiophene-based monomers exhibited lower template rebinding. This finding might be a result of the weaker H-bonding ability of the $NH_2$ than —COOH and —OH when complexing with the analyte drug, and thus less number of templates were imprinted.[18] However, the E-MIP films generated by the bifunctional G1 monomers required more time (>30 mins) to reach the saturation point.

In summary, the present invention offers advantages over known prior art, including:

Emphasizing the use of ultrathin films and high surface area to improved the sensing Emphasizing the improved stability of the polymer matrix for templating, sensor regeneration, and sensing (sensitivity and selectivity).

Emphasizing the regeneration, reusability, and stability of the sensing element.

Emphasizing the dynamic range and concentration dependence of these materials.

Emphasizing the integral use of H-bonding and other non-covalent interactions to pre-complex the monomer to the analyte.

These same principles use for imprinting can also be used for the preparation of separation technologies based on imprinting of template analyte, where separation of the desired analyte species can be made from other non-templated analytes. For example, this includes chromatography, electrophoresis, solid phase extraction, etc.

Part 2

E-MIP by Colloidal Templating on 2D Plane

QCM Sensing

FIG. 1.14 exhibits the fabrication scheme of colloidal crystals and inverse colloidal crystals of conducting polymers on Au or ITO. The scheme (FIG. 1.14A) includes the layering of PS microbeads onto thermally evaporated Au slide followed by CV-electropolymerization of monomer onto the interstitial void spaces in between the particles. The rinsing of the PS microbeads mask creates PS cavities (inverse colloidal crystal or microholes). This fabrication method is simulated into Au QCM crystal (FIG. 1.14B) to create the 2D E-MIP sensor film for peptide recognition. For instance, the same above procedure is followed except that a monomer with peptide (actual template) is electropolymerized into the void spaces in between the particles (sacrificial template). Moreover, the peptide is removed first according to the procedure mentioned in the experimental part followed by the removal of PS microbeads. Thus, an imprint of peptide and PS particles is formed in the inverse colloidal crystals of conducting polymers. The imprinted QCM crystal is then used for the rebinding of the peptide molecule using in-situ QCM measurements.

FIG. 1.15 displays the AFM topography images (3D on inset) of the layering of different sizes of PS microbeads on Au substrate (called colloidal crystal). The PS microbeads show high ordering and close packing in hexagonal arrangement except for the 100 nm size. For the 100 nm size PS, high coverage but stacking of particles is seen. The layering of particles is accomplished by using the so-called Langmuir Blodgett (LB)-like technique,[19] which is useful for mass fabrication and layering of different microbeads on a larger substrate. This technique uses only a vertical lifting motor and does not employ floating barriers as compared to the conventional LB technique.

FIG. 1.16 shows the CV-electropolymerization of the conducting poly(terthiophene) onto the PS coated Au substrates and their corresponding AFM images after electrodeposition. Different CV scan rates are used during the cyclic potential deposition to obtain the best condition for the electropolymerization of the monomer onto the void spaces in between the particles only. With the lowest scan rate (10 mV/s), the spherical features of PS microbeads are hardly seen in the AFM image of the film (FIG. 1.16E). This result implies that the polymer film is electrodeposited on top of the PS particles and a thicker film is formed. Upon increasing the CV scan rate to 50 mV/s, rough spherical features with a hole in the middle are observed in the AFM image (FIG. 1.16F). This finding shows that the polymer film is also deposited on top of the PS microbeads but is possibly thinner than the earlier deposition since the spherical features of PS now appear. Also, from the 3D AFM image, less aggregation is seen as compared to the earlier film. The CV scan rate of 100 mV/s shows the best deposition condition for the electropolymerization of monomer. The spherical features of PS are clearly shown without any aggregations of the polymer film. We now suggest that the electropolymerization of the conducting polymer film occurs at the interstitial voids in between the microsphere particles. Furthermore, the high degree of ordering and hexagonal close packing arrangement of the PS microbeads is preserved and is not disrupted during the electropolymerization step. The choice of ACN as solvent for electropolymerization is proven to be an appropriate medium to dissolve the monomer and not to destroy or dissolve the high ordering of PS microbeads on Au surface. A linear increase of the oxidation peak with an onset potential at 0.4 V due to the polymer film is witnessed in the CV diagram (FIG. 1.16C). The mechanism of the anodic electropolymerization of thiophene has been explained elsewhere.[20] Upon increasing the scan rate to 200 mV/s, the spherical features of PS are also seen but small aggregations start to occur on top of the PS microbeads. The same CV curve is shown with the 200 mV/s scan rate. The monomer free scan (CV cycle 1 in ACN with 0.1 M TBAH only) that is performed after electropolymerization confirms the electrodeposition of the conducting polymer film onto the PS coated Au (inset on each CV diagrams). This experiment is done after washing the film thoroughly in ACN to remove the excess monomers and physically adsorbed molecules on the surface. While this work emphasizes the use of conducting polymers by anodic polymerization, it is possible to extend this design to non-conducting polymers such as acrylate, styrene, vinyl functional groups via cathodic electropolymerization.

FIG. 1.17 shows the AFM images and water contact angle of the electropolymerized PS coated Au after washing the PS microbeads from the surface. Note that the same substrates used in FIG. 1.16 are subjected to the washing step. Unlike the use of more complicated techniques,[21] the removal of the PS microbeads is simply done by dipping the substrate into THF. With the washing of the film electropolymerized at lower scan rates such as the 10 mV/s and 50 mV/s, PS cavities are not formed instead spherical shapes with nanometer roughness on top of the micron scale features are observed in the AFM images. A less defined spherical shape is observed with the 10 mV/s scan rate. The washing of these films are continued for few days but the same images are seen in the AFM. This result suggests that the thicker polymer film deposited on top of the PS hinders the removal of the particles from the surface even with the longer washing time. It is also not discounted that the THF washing of the film may have removed some of the polymer film from the surface. That is why a more defined spherical feature is seen in FIG. 1.17B as compared to FIG. 1.16F before THF washing. Only the 100 mV/s scan rate manifests a well defined cavity of the PS microbeads after THF washing (FIG. 1.17C). A high AFM magnification image of one PS cavity is presented on FIG. 1.17E. From the line profile analysis of the high magnification AFM image, a height of 60 nm and a cavity opening between 500 size to 600 nm size are determined (FIG. 1.17F). The THF washing of the film prepared at 200 mV/s (FIG. 1.16D) also shows the removal of PS but less-defined cavity is formed. The AFM image illustrates that the wall might have collapse resulting to a distorted PS-cavity. The contact angle analysis is used to verify the results of the AFM images. From the water contact angle, the film prepared at 10 mV/s has the highest value of ~125 degrees followed by the 50 mV/s with a value of ~102 degrees. Then the contact angle decreases to ~90 degrees and ~79 degrees for the films prepared at 100 mV/s and 200 mV/s, respectively. With the high contact angle of the films prepared at lower scan rates, thick polymer films depositing on top of the PS microbeads are confirmed. As a control, the water contact angle of the PS microbeads after layering is determined to be ~46 degrees.

FIG. 1.18 displays the EQCM measurements of the fabrication of the E-MIP sensor film for peptide recognition. FIG. 1.18A and FIG. 1.18B illustrate the electropolymerization of the functional and cross-linking monomer (G0-3TCOOH) onto PS (500 nm size) coated Au and bare Au, respectively. A linear increase of the oxidation peak (between 0.8V to 1.0V) with an onset potential at ~0.4 V is observed in both electropolymerizations, signifying the cyclic potential growth of the polymer film. This result is supported by the in-situ QCM measurements of the polymer film deposition. FIG. 1.18C and FIG. 1.18D show the frequency change of the Au QCM crystal upon electropolymerization of the monomer onto the PS coated Au (500 nm size) and bare Au, respectively. The change in frequency of the QCM crystal for the MIP electrodeposition onto the PS (500 nm size) coated Au and bare Au is much greater (more negative) than the NIP electropolymerization (control). The pre-complexation of the monomer and the peptide (MIP solution prepared at least 12 hrs before use) possibly facilitates the electrodeposition of more MIP film as compared to the NIP. The visco-elastic property of the electropolymerized films is also determined using the QCM data by plotting the change in resistance ($\Delta R$) versus the change in frequency ($\Delta F$) (FIG. 1.18E and FIG. 1.18F). With a lower $\Delta R$, the NIP film shows to be more rigid than the MIP film in both PS (500 nm size) coated Au and bare Au. The change in the visco-elastic property of the MIP film as compared to NIP in both PS coated Au and bare Au explains the imprinting of the peptide onto the conducting polymer film.

FIG. 1.19 displays the high resolution XPS measurements of the N 1s element, which is a unique elemental marker due to the peptide only. The MIP film on PS (500 nm size) coated Au shows a strong N 1s peak that is not shown in the NIP film on PS (500 nm size) coated Au. The N is peak of the MIP film decreases after the washing of the peptide, explaining the removal of the template molecule from the polymer film. Therefore, the XPS data validate the incorporation and removal of the peptide molecule from the poly(terthiophene).

FIG. 1.20 exhibits the QCM sensing of the E-MIP film on QCM crystals after washing the template peptide and PS microbeads. From the FIG. 1.20A, the E-MIP film on PS coated Au demonstrates more change in delta frequency as compared to the other films like the NIP on PS coated Au, MIP on bare Au, and NIP on bare Au. Moreover, the two MIP films have more binding than the NIP films during the injection of the peptide solution in PBS buffer. The injection of blank solution (PBS only) into the MIP PS coated Au reveals a small change in the delta frequency (FIG. 1.20B). The thicker E-MIP film electropolymerized on PS (500 nm size) coated Au at more CV cycles (15 cycles) and subjected to longer washing displays more change in delta frequency than the rest of the films. FIG. 1.20D displays the selectivity studies of the fabricated E-MIP film on PS (500 nm size)

coated Au. The E-MIP film on PS (500 nm size) coated Au illustrates a higher binding response (or more change in delta frequency) to the original template imprinted as compared to other peptides (analogs) that are not imprinted. These analogs have almost similar structures to the imprinted peptide (aspartame). Therefore, the E-MIP film is selective to the imprinted peptide but still shows minimal response to the injection of other peptide molecules.

Note that the principle of colloidal templating can be extended to the use of analytes tethered to the surface of the colloidal particle, wherein the analyte is templated at the interface to which the colloidal particle is exposed to the electropolymerizing matrix. This will result in a higher concentration of the analytes and therefore cavities present at the polymer matrix once the PS particles has been washed. This is termed as reversed colloidal molecular imprinting.

Note that the same principles use for imprinting can be used for the preparation of separation technologies based on imprinting of template analyte, where separation of the desired analyte species can be made from other non-templated analytes. For example, this includes chromatography, electrophoresis, solid phase extraction, etc.

In summary, the improvements of the present invention over the known prior art include:

Emphasizing the use of electropolymerization as described herein by making use of: a) multifunctional branched monomers, b) a constant potential washing, c) an ultrathin film or high surface area geometry, and d) any working electrode surface.

Emphasizing the importance of increasing the surface area generated by controlled colloidal particle size and ordering 2-D on planar electrodes.

Emphasizing the use of colloidal and shape ordering of surfaces and arraying with the possibility of specific electro-optical effects on the thin film. This can result in multiplexing with the specific transducer system.

Emphasizing the use of colloidal surface to increase the amount of templated analytes or cavities present between the subphase medium (solution) and the matrix film. This is achieved by using analyte surface modified colloidal particles in a reversed colloidal molecular imprinting.

REFERENCES CITED IN SECTION I

The following references were cited in the specification:
(1) (a) Andersson, L. I.; Patricia, A. *Chromatography.* 1997, 46, 57-62. (b) Muldoon, M. T.; Stanker, L. H. *Anal. Chem.* 1997, 69, 803-808. (c) Sellergren, E. *Anal. Chem.* 1994, 66, 1578-1582. (d) Matsui, J.; Okada, M.; Tsuruoka, M.; Takeuchi, T. *Anal. Commun.* 1997, 34, 85-87.
(2) Polyakov M. V. *Zhur. Fiz. Khim.* 1931. 2, 799-805.
(3) Alexander, C.; Andersson, H. S.; Andersson, L. I.; Ansell, R. J.; Kirsch, N.; Nicholls, I. A.; O'Mahony, J.; Whitcombe, M. J. *J. Mol. Recognit.* 2006, 19, 106-180
(4) Mullet, W. M.; Lai, E. P. C. *Anal. Chem.* 1998, 70, 3636-3641.
(5) (a) Okada, S.; Peng, S.; Spevak, W.; Charych, D. *Acc. Chem. Res.* 1998, 31, 229. (b) Lu, W.; Zhao, H.; Wallace, G. G. *Anal. Chem. Acta.* 1995, 315, 2.
(6) (a) Leclerc, M. *Adv. Mater.* 1999, 11, 1491. (b) McQuade, D. T.; Pullen, A. E.; Swager, T. M. *Chem. Rev.* 2000, 100, 2537.
(7) (a) Taranekar, P.; Fulghum, T.; Baba, A.; Patton, D. and Advincula, R. *Langmuir* 2007, 23, 908-917. (b) Yassar, A.; Moustrou, C.; Youssoufi, H. K.; Samat, A.; Guglielmetti, R. F.; Garnier, F. *Macromolecules* 1995, 28, 4548-4553.
(8) Batra, D.; Shea, K. J. *Curr. Opin. Chem. Biol.* 2003, 7, 434-442.
(9) Jiang, G.; Baba, A.; Advincula, R. *Langmuir* 2007, 23, 817-825.
(10) (a) Wolman, F. J.; Smolko, E. E.; Cascone, O.; Grasselli, M. *React. Funct. Polym.* 2006, 66, 1199-1205. (b) Wang, Y.; Zhou, Y.; Sokolov, J.; Rigas, B.; Levon, K.; Rafailovich, M. *Biosens. Bioelectron.* 2008, 24, 162-166.
(11) (a) Khan, F. L. A.; Sivagurunathan, P. *Phys. Chem. Liq.* 2008, 46, 504-509. (b) Batra, D.; Shea, K. J. *Curr. Opin. Chem. Biol.* 2003, 7, 434-442. (c) Alexander, C.; Andersson, H. S.; Andersson, L. I.; Ansell, R. J.; Kirsch, N.; Nicholls, I. A.; O'Mahony, J.; Whitcombe, M. J. *J. Mol. Recognit.* 2006, 19, 106-180.
(12) Georgiadis, R.; Peterlinz, K. A.; Rahn, J. R.; Peterson, A. W.; Grassi, J. H. *Langmuir* 2000, 16, 6759-6762.
(13) Baba, A.; Tian, S.; Stefani, F.; Xia, C.; Wang, Z.; Advincula, R.; Johannsmann, D.; Knoll, W. *J. Electroanal. Chem.* 2004, 562, 95-103.
(14) Ravindranath, R.; Ajikumar, P.; Baba, A.; Bahuleyan, S.; Hanafiah, N.; Advincula, R.; Knoll, W.; Valiyaveettil, S. *J. Phys. Chem. B.* 2007, 111, 6336-6343.
(15) (a) Hutchins, R. S.; Bachas, L. G. *Anal. Chem.* 1995, 67, 1654-1660. (b) Yamaura, M., Hagiwara, T., Iwata, K. *Synth. Met.* 1988, 26, 209-224.
(16) Deore, B.; Chen, Z.; Nagaoka, T. *Anal. Sci.* 1999, 15, 827-828.
(17) Kuckling, D.; Harmon, M. E.; Frank, C. W. *Macromolecules.* 2002, 35, 6377-6383.
(18) (a) Schopf, G.; Koβmehl, G. *Advances in Polymer Science: Polythiophenes-Electrically Conductive Polymers. Spinger.* 1997, 80. (b) Koβmehl, G.; Kabbeck-Kupijai, D.; Niemitz, M. *Chiuz.* 1990, 24, 106. (c) Niemitz, M.; Koβmehl, G. *Angew. Makron. Chem.* 1991, 185-186, 147. (d) Koβmehl, G.; Niemitz, M. *Synth. Met.* 1991, 41, 1065.
(19) Pietrzyk, A.; Kutner, W.; Chitta, R.; Zandler, M. E.; D'Souza, F.; Sannicolo, F.; Mussini, P. R. *Anal. Chem.* 2009, 81, 10061-10070.
(20) (a) Fiedler, P.; Böhm, S.; Kulhanek, J.; Exner, O. *Org. Biomol. Chem.* 2006, 2003-2011; (b) Sibrian-Vazquez, M.; Spivak, D. A. *J. Am. Chem. Soc.* 2004, 126, 7827-7833; (c) Jeffrey, G. A. An introduction to hydrogen bonding, Oxford University Press, Oxford New York 1997.
(21) Marquez, M.; Grady, B. P. *Langmuir* 2004, 20, 10998-11004.
(22) Roncali, J. *Chem. Rev.* 1992, 92, 711-738.
(23) Live, L. S.; Bolduc, O. R.; Masson, J-F. *Anal. Chem.* 2010, 82, 3780-3787.

DETAILED DESCRIPTION OF SECTION II

Surface Plasmon Resonance (SPR) Detection of Theophylline Via Electropolymerized Molecularly Imprinted Polythiophenes Summary of the Invention Section II A facile approach to tailor-made, highly-selective, and robust ultrathin sensor film for theophylline detection was demonstrated by an electropolymerized molecularly imprinted polymer (E-MIP) film of a terthiophene derivative. The method involved direct electropolymerization of the H-bond complexing terthiophene monomer. A key enabling step in sensor fabrication is the use of an electrochemically mediated washing step of the template. The formation of the E-MIP film was monitored by in-situ Electrochemical-Surface Plasmon Resonance (EC-SPR) spectroscopy, allowing real-time observation of the simultaneous changes in electrochemical and optical properties of the film. Surface characterization techniques for the electropolymerized films include: Atomic Force Microscopy (AFM), Ellipsometry, Static Contact Angle, X-ray Photoelectron Spectroscopy (XPS), and Quartz Crystal Microbalance (QCM). A linear calibration curve (R=0.994) of the E-MIP/SPR sensor for theophylline detection was obtained with a 10 to 50 range and a limit of detection (LOD) of 3.36 $\mu M^{-1}$. The fabricated E-MIP sensor film showed a homogeneous surface coverage, high sensitivity, long term stability, and strong selectivity towards the imprinted template molecule. This indicated the formation of precise and stable cavities that retained the exact memory of the size, shape, and orientation of the functional groups during the templating electropolymerization steps.

Introduction to Section II

Theophylline, one of the most clinically monitored drugs, is frequently used as bronchodilators and respiratory stimulators for the treatment of the symptoms of acute and chronic asthmatic condition. However, an overdose of theophylline can be lethal or lead to permanent neurological damage.[1] The safe and effective use of this drug molecule relies on careful dosage adjustments based on accurate measurements of theophylline concentration in the blood serum. Theophylline with theobromine and caffeine (and other xanthine derivatives) can also be found in food products such as tea, coffee, cocoa beans, and chocolates. These compounds, which have been reported by the National Institute of Standards and Technology (NIST), have received increased attention in the food and nutrition industry for their various physiological effects.[2] It is necessary and important to cautiously analyze food products that might have an excess amount of these xanthine classes of compounds. Thus, convenient and reliable methods for detection and rapid on-line analysis of theophylline are of high importance.

The ideal measurement system of theophylline should be sensitive, selective, robust, and relatively inexpensive. The molecular imprinted polymer (MIP) technique has been demonstrated as one of the most promising techniques in sensor technology because of its simplicity, reliability, capability of miniaturization, and low cost method of fabrication. Generally, the imprinting procedure involves polymerizing functionalized monomers with cross-linkers in the presence of the template molecule (analyte). The subsequent solvent extraction of the template from the polymer film creates complementary cavities (also called imprint sites) that contain the memory of the size, shape, and functional group orientation of the imprinted molecule. As a result, the polymer film serves as a selective recognition element or artificial receptor for the rebinding of the template.

A non-covalent MIP approach[3] involves a template that is not covalently bound to the monomer. It relies mainly on weak intermolecular interactions resulting from electrostatic attractions, hydrophobic interactions, H-bonding, π-π stacking, metal coordination, charge transfer, etc. Most MIP films are prepared using this approach because of its simplicity of fabrication, commercial availability of functional monomers that are capable of hydrophobic interactions and H-bonding, and ease of removal of the template molecule by simple washing even with a mild solvent condition. The idea of non-covalent MIP using organic polymers was first introduced by Mosbach in 1980s.[3] Since then, a large number of studies have been reported to detect a variety of analytes using non-covalent MIP.[4]

Surface Plasmon Resonance (SPR) sensing of theophylline was performed using the MIP film prepared by in-situ electrochemical polymerization. SPR is a well-established, noninvasive, and surface sensitive analytical technique capable of providing information about interfacial phenomena. SPR spectroscopy measures the optical dielectric constants of thin films deposited onto noble metal coated substrates. Recently, label-free sensors based on imprinted thin films on SPR chips have been reported.[5] Rapid, label-free, high-sensitivity, and real-time measurements are the hallmarks of SPR for sensing. In general, sensing occurs when light is coupled to a metal under total internal reflection conditions. In the presence of an external event on a dielectric layer, the refractive index and the thickness of the sensor surface change upon binding of the target analyte to the surface. SPR has also been proven to be highly sensitive for monitoring changes at the electrode and electrolyte solution interface.[6] For example, the technique has been successfully demonstrated by our group in sensing various analytes[7] including a nerve agent analog.[8] More detailed information about the principles of SPR measurements can be found elsewhere.[9] The combination of SPR with electrochemical measurements or EC-SPR is a powerful analytical technique for the simultaneous characterization and manipulation of electrode|electrolyte interfaces:[7,8] An advantage of using the EC-SPR technique is that the electrochemical and optical properties are simultaneously obtained on surfaces and ultrathin films at the nanometer scale. It has been employed to monitor the interfacial reactions and the build-up of complex architectures at solid-liquid interfaces.[10] In EC-SPR, the Au-substrate which carries the optical surface mode is also used as the working electrode for electrochemical/potential experiments. In the past, our group has shown the use of SPR, EC-SPR, and AFM-EC-SPR in characterizing the formation of ultrathin films of conducting polymers on gold substrates.[11] The latter involved the simultaneous monitoring with an atomic force microscope (AFM).

SCHEME II.1
Synthesis route of 2-(2,5-di(thiophen-2-yl)thiophen-3-yl)acetic acid
(G0-3TCOOH)

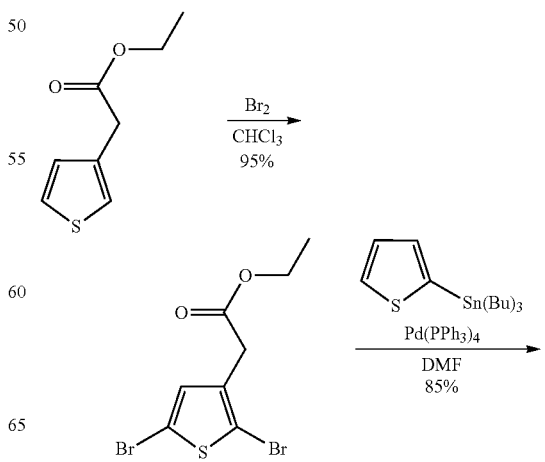

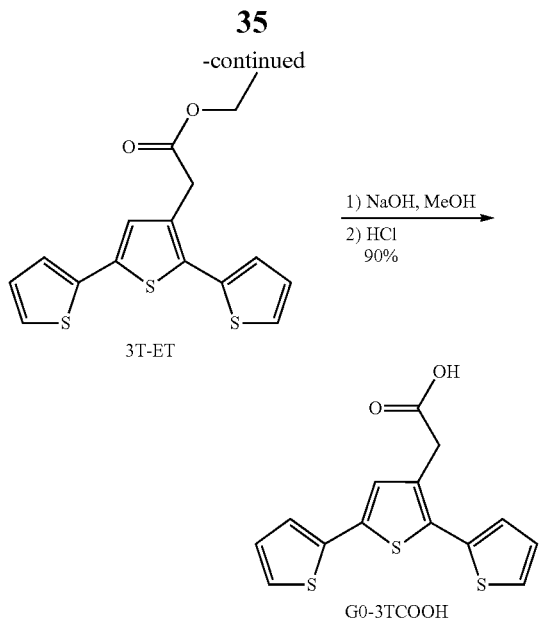

3T-ET

G0-3TCOOH

In this paper, the sensing of theophylline by SPR utilizing ultra-thin films of electrochemically molecularly imprinted polymer (E-MIP) films of the carboxyl functionalized-terthiophene monomer is reported (FIG. 2.1). This monomer has several advantages compared to direct electropolymerization of thiophene. These include non-covalent binding with the analyte, lower oxidation potential, and cross-linkability. To the best of our knowledge, the use of poly(terthiopene) as a conducting polymer for imprinting and sensing of theophylline has not been previously reported. It should be noted also that its advantage in template removal or sensor regeneration has not been carefully explored. The imprinting of theophylline was achieved previously by either electropolymerization of phenol or methylene green[12] as functional monomers. Unlike most MIPs, our method employs the complexing ability of a single monomer to the template via the orthogonal —COOH functional group and also facilitate cross-linking through the terthiophene pendant group. The terthiophene units are then free to polymerize both in an intra- and inter-complex manner more similar to a cross-linking process. Thus, the use of a p-conjugated poly(terthiophene) presented the proper combination of electropolymerizability, stability, and doping (swelling) properties that enabled the demonstration of an improved sensitivity, high selectivity and robust chemical sensing. In addition, an efficient and faster method of template removal employing the electrochemical properties of the poly(terthiophene) matrix has been developed. This has led to better sensitivity and selectivity for analyte detection. Moreover, we demonstrate the robust characteristics of this chemical recognition element through several cycles of sensing (i.e. 45 days) with only 15% attenuation.

Experimental Section II

Materials

The chemicals used were purchased from Sigma-Aldrich except for the terthiophene monomer with carboxylic acid functional group (2-(2,5-di(thiophen-2-yl)thiophen-3-yl) acetic acid abbreviated as G0-3TCOOH), which was synthesized by a modified procedure reported previously (SCHEME II.1).[13]

Synthesis of Monomer (G0-3TCOOH)

Synthesis of ethyl 2-(2,5-di(thiophen-2-yl)thiophen-3-yl)acetate (3T-ET)

The synthesis of 3T-ET was carried by first synthesizing ethyl 2-(2,5-dibromothiophen-3-yl)acetate as reported in the literature.[13] The same literature procedure was modified to synthesize 3T-ET. Ethyl 2-(2,5-dibromothiophen-3-yl)acetate (6.4 g, 10 mmol) and 2-(tributylstannyl)thiophene (15 g, 20 mmol) were added to a 30 mL dry DMF solution of dichlorobis(triphenylphosphine)palladium (1.3 g, 1.5 mmol). After three freeze thaw cycles, the mixture was heated at 100° C. for 48 h. The mixture was cooled to room temperature and poured into a beaker containing 150 mL of water and subsequently extracted with $CH_2Cl_2$. The extracted $CH_2Cl_2$ mixture was dried with $Na_2SO_4$. After filtering and evaporation of the solvent, the crude product was purified by chromatography on silica gel using toluene as an eluent. The final product was obtained in 85% yield as pale yellow oil. The characterization of the compound was found in accordance with the literature.[13]

Synthesis of 2-(2,5-di(thiophen-2-yl)thiophen-3-yl) acetic acid (G0-3T COOH)

A total of 4 g of 3T-ET was dissolved in methanol and added to a 20% aqueous sodium hydroxide solution (200 mL). The mixture was then refluxed for 4 h. After removal of methanol, the aqueous solution was washed with ether, acidified with concentrated HCl to pH 1 and extracted by ether. The ether solution was washed several times with water and evaporation of ether yielded 3.4 g G0-3TCOOH. The characterization of the compound was found in accordance with the literature.[13a]

The NMR spectra (FIG. 2.2, FIG. 2.3, FIG. 2.4) of starting compounds, intermediates and final product are shown. A monomer-to-template ratio of 2:1 molar ratio was used in making the MIP film. This optimum ratio was determined from the theoretical modeling studies, which is later discussed. For instance, the MIP solution was prepared by mixing 200 of G0-3TCOOH (monomer) with 100 μM theophylline (template) in acetonitrile (ACN) with 0.1 M tetrabutylammonium hexafluorophosphate (TBAH) or 0.1 M lithium perchlorate ($LiClO_4$). The non-imprinted polymer (NIP) solution was prepared in the same manner but without the addition of the template. For sensing experiments, the solutions of theophylline and the other analytes were prepared in 0.1 M PBS (phosphate buffered saline) solution at different concentrations. The MIP solution was prepared at least 24 h prior to the electropolymerization to allow complexation of the monomer and template in solution (called pre-polymerization complex).[14]

Gold-coated (c.a. 50 nm) BK 7 glass slide or silicon wafer was used for all electropolymerization and optimization studies in an ex-situ set-up. Electropolymerization of the MIP and NIP films for XPS measurements was performed onto gold-coated BK7 glass slide or silicon wafer. The gold coating was deposited onto the BK7 glass substrates or silicon wafer with 2-5 nm thick chromium adhesion layer by thermal evaporation (Edwards E306) at a rate of 1.0 Å sec$^{-1}$ to 1.2 Å sec$^{-1}$ operating under high vacuum ($10^{-6}$ bar). For in-situ electropolymerization and SPR sensing, the gold substrate (50 nm) with titanium interface (1.5 nm) was provided by Brinkmann Instruments (now Metro Ohm USA) and Eco Chemie. Prior to electropolymerization, the evaporated and commercially available gold substrates were subjected to oxygen plasma cleaning (Plasmod, March Instruments) for 120 seconds.

EC-SPR Electropolymerization and SPR Sensing

All electropolymerizations were performed in an Autolab PGSTAT 12 potentiostat (Brinkmann Instruments) coupled with an SPR instrument (Autolab ESPRIT from Eco Chemie). The Autolab SPR set-up is based on a Kretschmann configuration with a 670 nm laser source. The gold substrate, which served as the surface plasmon resonator, was also used as the working electrode for the electrochemistry set-up in a standard three electrode measuring cell with platinum rod as the counter electrode and Ag/AgCl wire as the reference electrode (inserted at the top of the sample channel). The potentiostat and SPR instruments were controlled using GPES version 4.9 and ESPRIT version 4 programs. Both softwares were provided by Metro Ohm and Eco Chemie. The electropolymerization was performed using the cyclic voltammetry technique (CV) by sweeping the voltage from 0 V to 0.8 V for 20 cycles at a scan rate of 50 mV/s. For ex-situ set-up (not coupled to SPR instrument), the electropolymerization was performed using the evaporated gold substrate inserted onto a fabricated electrochemical cell (Teflon made) with a diameter of 1.0 cm and volume of 0.785 $cm^3$. Prior to sensing, the stabilization of the electropolymerized films were completed by injecting 50 µL PBS buffer onto the substrate several times until a stable SPR response is achieved. During sensing, the Autolab SPR was set to automated injection of the background solution (PBS buffer) for 120 seconds followed by sample injection (50 µL volume) for 900 seconds, and then rinsing of the film with the background solution for 300 seconds. The SPR response due to the binding of the template and other analytes only were compared and plotted after the abrupt change in angle, which is mainly due to the change in refractive index of the bulk solution. All the SPR angular and kinetic curves were normalized to zero. Curve and peak analysis were done using Origin Lab version 7.

QCM Measurements

The fabrication of the MIP film using in-situ electropolymerization was also monitored by quartz crystal microbalance (QCM) coupled to an electrochemistry set-up with the same standard three electrode system. The QCM apparatus, probe, and crystals were made available from Maxtek Inc. (Inficon). The AT-cut polished QCM crystals (5 MHz) with 13 mm diameter was used as the working electrode. The data acquisition was done with an R-QCM system equipped with a built-in phase lock oscillator and the R-QCM Data-Log software. The QCM crystals were cleaned with an oxygen plasma etcher (Plasmod, March) immediately prior to use. The resulting change in frequency can be used to calculate the mass change due to the adsorbed material onto the film using the Sauerbrey Equation II.1:[15]

$$\Delta F = \frac{-2F_q^2 \Delta m}{A\sqrt{\rho_q \mu_q}}$$

where $\Delta F$ is the change in frequency, $\Delta m$ is the mass change, $F_q$ (=5 MHz) is the resonant frequency of the QCM crystal, $A$ (=1.227 $cm^2$) is the area of the electrode, $\rho_q$ (=2.65 $g/cm^3$) is the density of the quartz, and $\mu_q$ (=2.95×$10^6$ $N/cm^2$) is the shear modulus of the quartz.

Ellipsometry Measurements

The thickness of the electropolymerized film was measured by ellipsometry using the Multiskop ellipsometer (Optrel GmbH, Germany) equipped with a 632.8 nm laser. The measurements were all done at 60° angle of incidence with respect to the surface normal under dry and ambient conditions. Several measurements were performed for each film at various positions. The measured values of delta and psi were used to calculate the thickness of the film using an integrated specialized software (Elli, Optrel) that was provided with the instrument.

Water Contact Angle Measurements

The static contact angle of the electropolymerized film was measured using a CAM 200 optical contact angle meter (KSV Instruments Ltd) with CAM 200 software. The measurement was achieved by making approximately a 1 µL drop of Milli-Q water onto the film. Several measurements were also performed for each film at various positions.

AFM Measurements

Atomic force microscopy (AFM) with an Agilent 5500 AFM/SPM System, Agilent Technologies) was used to investigate surface morphologies of the electropolymerized film. The AFM measurements were carried out using a piezo scanner capable of scanning an area of ~10×10 $mm^2$ at room temperature. The scanning rate was 0.8-1.0 lines/s. Commercially available tapping mode tips (TAP300, Silicon AFM Probes, Ted Pella, Inc.) were used on cantilevers with a resonance frequency in the range of 290-410 kHz. For AFM scanning under ambient and dry conditions, all electropolymerized films were rinsed thoroughly with solvent and carefully dried under nitrogen gas. All AFM topographic images (MAC and tapping mode) were filtered, and analyzed by using SPIP software (Scanning Probe Image Processor, Imagemet.com).

XPS Measurements

A PHI 5700x-ray photoelectron spectrometer was equipped with a monochromatic Al Kα X-ray source (hn=1486.7 eV) incident at 90° relative to the axis of a hemispherical energy analyzer. The spectrometer was operated both at high and low resolutions with pass energies of 23.5 eV and 187.85 eV, respectively, a photoelectron take off angle of 45° from the surface, and an analyzer spot diameter of 1.1 mm. The survey spectra were collected from 0 to 1400 eV, and the high resolution spectrum were obtained for C 1s, O 1s, S 2p, S 2s, Au 4f and N 1s. All spectra were collected at room temperature with a base pressure of 1×$10^{-8}$. Electron binding energies were calibrated with respect to the Au $4f_{7/2}$ peak at 84.0 eV.[16] The peaks were analyzed first by background subtraction using the Shirley routine. The binding energies for each peak were assigned based on published literature values. All the samples (electropolymerized film on gold-evaporated silicon wafer or BK 7 glass) were completely dried in argon gas prior to XPS measurements.

Results and Discussion of Section II

Theoretical Modeling of the Monomer-Template Complex in Solution (Pre-Polymerization)

The MIP sensor film was prepared by electropolymerizing 2-(2,5-di(thiophen-2-yl)thiophen-3-yl)acetic acid (G0-3TCOOH) with theophylline in a 2:1 molar ratio, respectively. This ratio was deemed optimum based on the H-bonding site in a donor-acceptor pair as determined by modeling. The complexation between the monomer and template was modeled using Spartan '08 (V1.2.0), Wavefunction Inc (AM1 semi-empirical calculation), and the net binding energy ($\Delta E_f$) of the monomer-template complex was achieved from the calculated enthalpies of formation ($\Delta H_f$) using the formula Equation II.2:

$$\Delta Ef = (\Delta H_{f,monomer\text{-}template}) - (\Delta H_{f,monomer} + \Delta H_{f,template}) \quad (II.2)$$

The same modeling and procedure have been applied to calculate for the interaction energy of other monomers and templates prior to polymerization to form an MIP.[17] The net binding energy of the complex with 2:1 momomer-to-template ratio was determined to be −104.731 kJ/mol, which indicates an energetically favorable complexation. The $\Delta E_f$ values of the other ratios were also calculated by using the same method, and the results are as follows −23.678 and −3.965 kJ/mol for 1:1 and 3:1 ratio, respectively. Computer generated images of the 2D optimized structures (Ball and Spoke and Space Filling models of the pre-polymerization complex between monomer and template at different ratios are shown in FIG. 2.5A-F. The 2:1 ratio showed the most negative energy of formation signifying that a relatively stable pre-polymerization complex is formed between theophylline and G0-3TCOOH. The geometry optimized structure is shown in FIGS. 2.6A-C where the theophylline is surrounded by the monomers. In this model, a desired cross-linkable conformation of the complex is evident which is necessary for robust and effective imprinting of the template molecule. Furthermore, the extent of H-bonding interaction between monomer and template was also determined. From the Spartan calculation, the 2:1 ratio displays a more stable complexation with higher probability of forming H-bonding between monomer and template. Clearly, the H-bonding (represented in broken lines) was formed between the oxygen atom of the theophylline and the OH functional group of the monomer (G0-3TCOOH), and the H-bond distance is calculated to be ~2.094 Å. For other ratios, H-bonding is not very evident. Thus, the 2:1 ratio was used for the MIP electropolymerization.

Surface Imprinting of Theophylline by EC-SPR Monitoring

The CV-electrodeposition was monitored in-situ by the hyphenated EC-SPR technique, allowing the direct interfacing of the imprinted polymer film onto an electrode optical transducer surface (SPR Au substrate). The same in-situ measurements were performed during the fabrication of the non-imprinted polymer (NIP) control film by electropolymerization. FIG. 2.7A shows the SPR kinetic measurement during potential cycling (from 0 V to 0.8 V and reverse) while FIG. 2.7B depicts the potential ramp over time. A recurring oscillation is observed for each CV cycle that involved an oxidation followed by a reduction process. In FIG. 2.7A, the angle increased instantaneously at the start of the anodic scan (oxidation) and slightly decreased at the beginning of the cathodic scan (reduction). The profile achieved in the kinetic curve (FIG. 2.7A) concurs with our earlier results on electropolymerization of conducting polymers, where the SPR response increases during oxidation and decreases upon reduction.[11c,11e] This sequential oscillation is due to the changes in the dielectric property (related to the optical constants) of the poly(terthiophene) as it switches from oxidized (doped) to reduced (dedoped) states. The change in the optical property of the film is clearly seen in FIG. 2.7A, where the SPR angle changes upon oxidation-reduction. A conducting material like poly(terthiophene) is characterized by a complex dielectric function[18] as it undergoes the doping/dedoping process Equation II.3:

$$\varepsilon = \varepsilon_{real} + \varepsilon_{imaginary} \quad (II.3)$$

where $\varepsilon_{imaginary} = (2\sigma\lambda/c)$, $\sigma$ as conductivity, $\lambda$ as wavelength of incident light and c as the speed of light. From the equation, the variation of conductivity of the polymer film changes the imaginary part of the dielectric constant resulting to changes in the optical constant manifested in the oscillation of the SPR kinetics during the cyclic potential growth of the polymer film.

The film formation was observed by an increasing SPR angle in the in-situ kinetic measurement (FIG. 2.7A) and SPR angle response versus the scanning potential (FIG. 2.7C) during the whole process of polymerization. The SPR angular scan (inset of FIG. 2.7A) taken before and after the electropolymerization process confirmed the result of the kinetic measurement. What is of interest is that the trend in reflectivity increase is linear and the sinusoidal behavior of the oscillation, nearly constant. This indicates a well-behaved film that is constantly coupled to the SPR resonance despite the changes in the dielectric properties with thicker films. A similar kinetic profile was observed during the NIP film fabrication by in-situ electropolymerization (FIGS. 2.8A-D). It was evident from SPR kinetic measurements that the angular shift response value is higher during E-MIP film fabrication (angular shift ~800 milli degrees) than the NIP (~510 milli degrees), indicating that more materials were deposited during MIP film fabrication. This observation is also consistent with the QCM measurements, which shows more mass adsorbed with the MIP than the NIP (see Table II.1).

TABLE II.1

Summary of QCM Measurements of the Electropolymerized Films on Au QCM Crystal

| Film | $\Delta F^a$ (hertz) | mass/area[b] ($\mu g/cm^{-2}$) | Thickness[c] (nm) | Density[d] ($g/cm^{-3}$) |
|---|---|---|---|---|
| NIP | −34.90 | 0.62 | 8.57 ± 0.28 | 0.72 |
| MIP | −67.58 | 1.20 | 11.87 ± 0.26 | 1.01 |

[a]Measurement in air (not in solution).
[b]Calculated using the Sauerbrey equation (1)[4]
[c]Determined from Ellipsometry (using a refractive index = 1.45)
[d]Calculated using the formula: Density = Mass/(Area QCM crystal × Thickness)

It is possible that the effective complexation of the monomer and template makes the monomer more easily oxidized to form the ultrathin polymer film on the substrate. Further investigation about the kinetics of the film deposition is beyond the scope of the present paper.

The formation of the E-MIP film was also confirmed in the CV scan (FIG. 2.7C, left y-axis) by an increasing current in the oxidation peak regime (~0.6 to 0.8V), demonstrating an increase in conductivity of the substrate as a result of the deposition of the conducting polymer film. The increase in current during the anodic scan is accompanied by an increase in the SPR angle particularly at the onset potential of 0.6 V except for the 1$^{st}$ CV cycle that immediately rise at 0.2 V (FIG. 2.7C, right y-axis). As earlier reported,[11b, 11c, 13] the increase in the SPR angle upon sweeping the potential is attributed to the changes in optical dielectric properties and thickness combined due to the electrodeposition of the conducting polymer film onto the Au substrate. Then the SPR angle faintly decrease (ca. 0.3V in FIG. 2.7C, right y-axis) during the reversal scan, which is attributed to the slight shrinking of the film as a result of releasing the counter ions back into the bulk solution.[19] Note that the SPR angle did not return to its initial value but rather it continues to augment until the last CV cycle that is similar to FIG. 7A. During the potential growth of the polymer film, the peak potentials remained constant with increasing number of cycles (FIG. 2.7C, left y-axis). This illustrates the stability of the redox property of the film regardless of the changes in both the thickness and the dielectric properties. Moreover, the same CV curve (inset of FIG. 2.7C) was observed with the E-MIP film after scanning in the solvent containing only the supporting electrolyte (monomer free scan or post polymerization CV). This measurement was performed when the substrate was rinsed thoroughly with the solvent to remove excess monomer after completion of the electropolymerization process. Comparing the CV curve of the E-MIP with the NIP, no additional peak was observed within the scanned window, indicating that the template has no contribution to the electrochemical oxidation of the monomer. In addition, a separate study was performed to determine the electrochemical stability of the template by scanning the potential from 0 to 1.1 V. The results showed that an oxidation peak was formed in the anodic scan beyond 0.8V, but further investigation was not performed on these findings. Hence, the sensor film was typically prepared by scanning up to 0.8V in order to avoid any complications arising from possible electrochemical activity of the template.

The E-MIP film fabrication was also characterized by the QCM technique, which is a highly sensitive measurement for observing mass changes as a thin layer of material is adsorbed onto the quartz crystal. This technique has been used extensively by our group to study the in-situ formation of a conducting polymer on Au QCM crystal.[11e, 13, 20] In QCM analysis, the amount of material deposited was determined using the Sauerbrey equation[15] from the frequency measurement of the QCM crystal before and after electropolymerization in air. With this condition, the viscous losses or viscoelastic effect can be neglected, which is not accounted for in the Sauerbrey approximation.[11e] Using the Sauerbrey equation, the absolute mass per unit area was calculated from the change in frequency ($\Delta F$) due to the deposition of the polymer film. The amount of material deposited during E-MIP and NIP film fabrication was determined to be 1.20 $\mu g\ cm^{-2}$ and 0.62 $\mu g\ cm^{-2}$, respectively. The calculated density of the films (see Table II.1) were comparable to the reported density of the melamine-imprinted polymer film electropolymerized using a bis(bithiophene) derivative.[21]

Characterization of the Fabricated E-MIP and NIP Films

Additional surface sensitive techniques were utilized to characterize the E-MIP and NIP films after fabrication by electrochemical polymerization. The use of different techniques to carefully analyze the E-MIP film before and after template removal is seldom performed in most MIP studies. The results of the ellipsometry, contact angle, and AFM measurements are summarized in Table II.2.

TABLE II.2

Surface Characterization Measurements of the Three Electropolymerized Films on FIGS. 7A-C

| Film | Water Contact Angle (degree) | Ellipsometry Thickness (nm) | AFM RMS (nm) |
|---|---|---|---|
| (a) NIP | 55.84 ± 0.47 | 8.57 ± 0.28 | 1.15 ± 0.03 |
| (b) MIP Before template washing | 56.20 ± 0.56 | 11.87 ± 0.26 | 1.11 ± 0.03 |
| (c) MIP After template washing | 52.45 ± 1.22 | 10.73 ± 0.23 | 1.60 ± 0.02 |

FIG. 2.9A-I show the AFM analysis of the films. Although the AFM image cannot be used to directly verify that theophylline is indeed imprinted onto the polymer film, important informations such as topography, porosity, and surface roughness of the films can be determined by the technique. The NIP film is analyzed first by AFM. Its topography and line profile scans were closer to the MIP film before constant potential washing. The AFM image of the NIP film showed good surface coverage and homogeneity for a conducting polymer film. The AFM results validate the earlier morphology studies of poly(thiophene) films that is characterized by high surface coverage and good homogeneity.[22] The use of terthiophene as functional and cross-linking monomer is advantageous because it can achieve a more ordered polymer structure as a result of the regular $\alpha,\alpha$-coupling (2, 5 position) of the monomer units, resulting in more conjugated linear polymer segments.[23] In the case of monothiophene, $\alpha$, $\beta$-coupling (2, 4 position) can also take place during the polymerization,[24] hence resulting in a more disordered covalent connectivity (lower conjugation) and rougher surface polymer film. However, in terms of cross-linkability, the terthiophene monomer has an advantage in that both a positions of the terminal thiophene rings have a lower oxidation potential.

The Hbonding[25] ability of the orthogonal —COOH group[3b,26] of terthiophene enables anchoring of theophylline units in the middle while the electroactive group is intended for cross-linking with another monomer inter- or intra-complex to form a type of conjugated polymer network (CPN). Note that two or more monomers units present in the complex, possibly surrounding the template, should enable cross-linking polymerization as a matrix for MIP. The minimum requirement for crosslinking is a functionality or f=3, whereas the 2:1 complex will have f=4. This was confirmed by the theoretical modeling studies (FIG. 2.1).

After subjecting the E-MIP film to potential induced washing, its topography image changed (FIG. 2.9G compared to 2.9D), which is more evident in the phase image (FIG. 2.9I compared to 2.9F). The E-MIP film appeared to be swollen as characterized by the slight increase in size of the features on the surface. This observation is confirmed by the values of the x and y scales in the line profile measurements after the constant potential washing. The x and y scales had increased by ~0.07 µm and ~3.5 nm, respectively. Furthermore, ellipsometry measurements verified the decrease in thickness of the polymer film, and the contact angle also decreased becoming slightly hydrophilic (Table 1) which is essential for the rebinding of the template that is in aqueous media. Thus, cavities of the guest molecule, a vital component as a sensor recognition element, were formed by carefully releasing the template from the polymer network. As an additional evidence on the successful removal of the imprinted molecule, the root-mean-square (rms) roughness (FIGS. 2.9A, 2.9B, 2.9C) of the three films were calculated, and their values were shown to be comparable to the rms values of the E-MIP films created by electropolymerization of a bis(bithiophene) monomer derivative.[21] Prior to removal of the template, the rms of the imprinted film is closer to the NIP film. After releasing the template from the highly cross-linked E-MIP film, the rms had increased; and thus, indicating a more porous film was created as a result of the formation of template cavities.

High resolution XPS was performed with the E-MIP film to clearly validate the electropolymerization of the monomer and the entrapment of the template (FIG. 2.10A-D) and later on the removal of the imprinted template (FIGS. 2.11A&B). The appearance of the peak for S 2s at ~228.2 eV (FIG. 2.10B) and S 2p doublet peak between 163.0 eV to 166.0 eV (FIG. 2.10C) confirmed the formation of the polymer film. The doublet S 2p peak has been reported as a chemisorbed thiophene.[27] The peak at ~400.0 eV with a small peak shoulder at ~397.3 eV (FIG. 2.10A) indicates the presence of N 1s, which is attributed to the nitrogen atoms in the heterocyclic ring of theophylline. This result verified the non-covalent immobilization of theophylline onto the poly (terthiophene). The nitrogen element is a unique elemental marker of the template molecule, which is not present in the poly(terthiophene) film. The N 1s spectrum resembled that of the theophylline-modified surface, which contains two shouldering peaks due to the presence of two types of nitrogen functionalities (N1, 8 and N3, 5) in the structure of theophylline.[28] Moreover, earlier studies reported that the N 1s peaks located at the range between 400.0 eV and 400.5 eV were due to the H-bonding interactions of tertiary amine nitrogen and amide nitrogen atoms.[29] The other elements on the surface (FIGS. 2.10D and 2.10E) such as C 1s (between 283.0 eV to 291.0 eV) and O 1s (between 529.0 eV to 537.0 eV) divulge the successful modification of the Au surface with the MIP film.[35,37] The appearance of the Au doublet peak between 83.0 eV and 89.0 eV (FIG. 2.10F) confirmed that a thin and porous MIP film was fabricated on Au substrate.

Removal of the Template Guest Molecule: Importance of Constant Potential Washing Following the MIP electropolymerization is the removal of the guest molecule, which was carried out to create an imprinted site. The efficiency of template removal from the highly cross-linked polymer film is very crucial to MIP film sensing. Moreover, upon removal of the template, the integrity of the cavities with its memory about the size, shape and orientation of the chemical template functionality needs to be maintained. The inability to satisfy these important conditions would result in poor selectivity, limited sensitivity, and lack of stability of the MIP sensors. In order to overcome these challenges, thinner films of nanoscale thickness were used to enable easy removal of the template and to avoid deep burial of binding sites. AFM analysis showed the advantage of a thin film over a thick film. With a thicker polymer film (~50 nm), the AFM image demonstrates greater aggregations on its surface despite thorough washing with the solvent after electropolymerization (FIG. 2.12A-D). Aside from making thin MIP films, the choice of appropriate solvents for template removal was also investigated. Sensing responses were compared for several solvents during the rebinding of the analyte (results not shown here) after solvent washing (in flow system). Acetonitrile, which can dissolve theophylline completely but not the poly(terthiophene), gave the highest sensing response compared to other solvents. Additionally, during the washing of the template with the best solvent (acetonitrile), a constant potential (0.4 V) was applied to dope (oxidize) the polymer film. The selected voltage was determined from the highest sensing response of the MIP film when different potentials were applied to it during washing.

In FIGS. 2.13A and 2.13B, the distinct shift in the SPR minimum relative to the curve before applying a constant potential can be attributed to: (1) the change in thickness due to swelling and (2) the change in optical property (refractive index) resulting from the increase in conductivity of the polymer film. Unlike thicker films (greater than 0.5 μm), the change in the SPR minimum was caused only by the change in refractive index.[30]

Note that previously, the doping process of thiophene-based polymers has been reported to create charges within the polymer network.[31] With charging, an electrostatic repulsion between the charges may occur resulting in swelling of the polythiophene film. This facilitates the release of more template molecules, creating cavities for a sensor recognition element. In order to confirm the swelling of the imprinted polymer, the same experiment was performed with the NIP film (control), which showed a similar increase in the SPR minimum. Upon comparison, the E-MIP exhibited less angular change (about 20 to 40 milli degree) versus the NIP film (about 70 to 80 milli degree). This result can be due to the angular shift of the E-MIP through a combination of refractive index decrease (as a result of the formation of cavities or pores) and thickness increase of the polymer film due to swelling. The latter might be a more dominant effect, causing the SPR curve to shift further to higher angular minima values. In addition, the E-MIP film will have less swelling due to the imprinted templates entrapped inside the highly cross-linked polymer network.

By applying a constant positive potential (doping), the conductivity of the conjugated polymers will change accordingly. Conductivity is largest for the doped state and decreases for the dedoped state.[18] The increase in conductivity of the polymer film changes the imaginary part of the dielectric constant (Equation II.3). As a consequence, the SPR minimum will change in terms of width (angular) and depth (peak reflectivity) after applying a constant potential. A very similar trend about the SPR minimum shift was observed with a polypyrrole film after oxidation (doping).[10d] The dashed lines in FIGS. 2.13A and 2.13B are for 0.4 V corresponding to the doped (charge) state while the solid lines are for 0 V corresponding the dedoped (neutral) state of poly(terthiophene).

To further investigate poly(terthiophene) doping and the release of theophylline, CV electrochemical experiments were utilized. From the CV scan, both films (MIP and NIP) showed an increase in current at the oxidation peak regime (~0.6 to 0.8V) after applying a constant positive potential during washing. This result indicates an increase in conductivity of the polymer films, validating the doping process. Interestingly, the E-MIP had a higher current increase compared to the NIP film. This can be attributed to the diffusion of more redox probe ($PF_6^-$) into the doped polymer film as a result of the formation of more pores within the MIP. Previously, the creation of porous MIP film after solvent extraction was determined by the insertion of more redox probe as monitored by an electrochemistry technique.[21] Nevertheless, the peak potentials of both NIP and E-MIP films remained the same, proving the stability of the poly (terthiophene) against the washing steps.

The various characterization techniques employed reveal evidences of the release of the template molecule from the polymer film. In order to confirm the results, an XPS high resolution scan was performed with the MIP film to determine approximately the quantitative amount of template molecules that were removed during the constant potential washing. Results showed that the N 1s peak from the theophylline had decreased by about 87% (FIG. 2.11A). This observation suggested an efficient removal of the template was achieved. Moreover, the S 2s peak area, which is only due to poly(terthiophene), remained almost constant, verifying the stability of the polymer film even with the potential induced washing (FIG. 2.11B). The constant potential washing enabled the fast and effective removal of imprinted molecules for only 10 minutes, much faster than the earlier methods that took hours and used a harsh solvent condition (i.e. acids or bases) for template extraction.[12,32] With a mild solvent condition that we applied for washing, the integrity of the imprinted cavities that serve as the recognition element of the MIP sensor is well maintained.

Performance of the SPR Sensor Platform

The MIP film activity was evaluated by sensing of the template using in-situ SPR measurements.[33] In terms of analyte detection, SPR offers a direct and efficient method over other analytical techniques. Currently, the measurement of theophylline is carried out regularly in many clinical laboratories using gas/liquid chromatography methods and commercial immunoassays, all of which are relatively tedious and time-consuming as compared to SPR detection.[1a,b] FIG. 2.14A illustrates the kinetic profile of the rebinding of theophylline onto different substrates from a 50 µM solution. The E-MIP film shows a good sensing response creating a shift in the SPR angle of up to ~40 milli degrees. The same MIP film was used for other sensing experiments after washing the bound analyte with application of a constant potential of 0.4 V in acetonitrile. An equivalent amount of time was used when the E-MIP film was washed with acetonitrile without applying a constant potential. A change in the SPR angle of about 50 milli degrees was observed after the rebinding of the template. Compared to solvent washing alone, a ~30% increase in the SPR response was observed from the E-MIP film after constant potential washing in acetonitrile was applied. This result supported our claim that by applying a constant potential at 0.4 V during washing, more guest molecules are removed from the polymer network, and therefore creating more imprinted sites for template sensing. Two control experiments were also performed to compare with the sensing response of the MIP film: adsorption of 50 µM theophylline (1) onto NIP film and (2) on bare gold. It is evident that there is no observable change in the SPR angle during the adsorption of theophylline on these substrates. These data proved that the sensing of theophylline observed in the MIP film was mainly due to the formation of cavities or imprinted sites, which served as the selective sensor recognition element for the MIP film. Moreover, the improved sensing of the imprinted template by the MIP film was further confirmed by imprinting other drug molecules such as paracetamol and naproxen using exactly the same monomer and fabrication procedure. Likewise, a higher sensing response was observed with the MIP films that were subjected to potential induced washing at 0.4 V (FIGS. 2.15A&B).

Sensitivity Study

To determine the sensitivity of the fabricated MIP film, a calibration study was performed by injecting different concentrations of the templates (FIG. 2.14B). This experiment was also performed using the NIP film (control) (FIG. 2.16), which showed no observable response as compared to the MIP film. The slight increase in the SPR angle is due to non-specific binding of the theophylline onto the NIP film. The concentration of interest to detect theophylline is within 10 µM to 50 µM dynamic range which corroborates to a recent work regarding the detection of theophylline using RNA-aptamer.[34] The calibration plot (FIG. 2.14B) showed a linearity in the range of 10 µM to 50 µM concentrations of theophylline with a correlation coefficient (R) of 0.994. The sensitivity of the MIP SPR sensor was determined from the slope of the calibration curve[35,36] and was equivalent to 1.044 milli degree µM$^{-1}$. The limit of detection (LOD, equal to 3σm$^{-1}$) and limit of quantification (LOQ, equal to 10σm$^{-1}$) of determining theophylline were 3.362 µM and 11.207 µM, respectively, where cy is the standard deviation and m is the slope of the calibration plot.[37] Finally, the sensogram curves were evaluated by numerical integration algorithm (OriginLab, version 7) of non-linear curve fitting using monomolecular growth model to calculate for the association rate constant ($k_a$).[38] The calculated observed rate constant ($k_{obs}$) in the association phase was plotted against the concentration of theophylline to determine $k_a$ from the resulting straight line using linear regression (FIGS. 2.17A-F) where the calculated $k_a$ value is equivalent to 82.1 M$^{-1}$ s$^{-1}$.

Selectivity Study

Selectivity is the ability of the sensor to discriminate between different analytes. Thus, in order to test the binding selectivity of the MIP film, a sensing experiment was conducted using different but structurally analogous compounds (also called interference compounds or analogs). Finding a sensor that will respond to only one analyte is ideal. However, it is more typical to find a sensor that will respond primarily to one analyte with limited responses to other similar analytes.[39] This sensor platform showed a high selectivity during real-time sensing of closely related analytes such as caffeine and theobromine. Theobromine and theophylline have identical molecular weights (180.06 g/mol). The only difference between theobromine to the target analyte is the substitution of 5-N with a methyl group instead of the 8-N position (FIG. 2.18B). Moreover, caffeine, theobromine and theophylline are closely-related compounds by a metabolic process occurring in the liver.[40] At present, clinical laboratories that employ gas/liquid chromatography and commercial immunoassay in detecting theophylline are experiencing interfering responses from caffeine and theobromine,[1a,b] hence resulting in an inaccurate measurement of theophylline concentration. In addition to these two analytes, paracetamol and naproxen were also used to distinguish the selectivity of the MIP sensor.

From FIG. 2.18A, it is observed that the MIP film did not show any observable response upon exposure to theobromine (500 µM) and caffeine (500 µM) albeit the concentration is ten times greater than theophylline (50 µM), which showed a ~50 milli degree change. Similarly, the MIP film did not demonstrate a noticeable response for paracetamol and naproxen making the fabricated MIP film highly selective to only the template molecule. To better express the effect of the interference compounds, the interference ratio (I.R.) is determined.[41] It is calculated by taking the ratio of the SPR angular change in the E-MIP film upon binding the interference compounds to the SPR angular change due to the binding of theophylline (I.R.=$\Delta\theta_{SPR,analog}/\Delta\theta_{SPR,theophylline}$). A lower I.R. value (<<1) denotes very less or minimal interaction between the E-MIP film and the analog, whereas a value of 1 means a complete binding. The I.R. of the theobromine and caffeine (with concentration 10 fold higher than theophylline) are both equal to 0.02, which means that the E-MIP film has very less affinity to these compounds. To verify the high selectivity of the E-MIP film, other drug molecules (i.e. paracetamol and naproxen) were also imprinted using the same functional and cross-linking monomer (G0-3TCOOH), and the fabricated E-MIPs were subjected to different compounds with some of them closely resembling the structure of the template molecule. The results are summarized in FIG. 2.19 of the supporting document. Similarly, the other E-MIP films demonstrated a high selectivity towards the imprinted drug molecule and only a limited response to other compounds due to non-specific binding. The outstanding selectivity of the E-MIP is attributed to the robust imprinted sites or cavities of the polymer film that retained precisely the memory of the size, shape and orientation of chemical functionality of the template molecule theophylline.

Stability Study

The working lifetime of the MIP sensor film was evaluated by performing a stability study (FIG. 2.20). This study measures the ability of the sensor in maintaining its sensing performance over a certain period of time. Briefly, the experiment was carried out by injecting 35 μM and 50 μM concentration of the template onto the MIP film and then monitoring the SPR response as a result of the in-situ analyte binding. Two concentrations were selected to confirm the result. Also, this experiment was repeated on different areas of the same substrate that was kept under dry and ambient conditions for 14 and 45 days. After 14 days, the SPR response has decreased by ~2.08% and ~1.40% for 50 μM and 35 μM concentrations of theophylline, respectively, due to template binding. Moreover, after 45 days, the sensing response has decreased further to ~14.12% and ~15.89% for 50 μM and 35 μM concentrations of the template, respectively. Therefore, the fabricated MIP film does not only exhibit outstanding selectivity and high sensitivity but also very good stability, which can retain about 85% of its original response after 45 days of storage in dry and ambient conditions.

Conclusions of Section II

A facile protocol for making an E-MIP/SPR sensor device that is highly sensitive and selective to the target analyte has been demonstrated using polyterthiophene. Unlike most MIP systems, the E-MIP sensor device uses an electropolymerization-cross-linking procedure with a template-monomer complex for molecular recognition, providing a binding functionality to a future analyte molecule. The theoretical modeling studies by Spartan (AM1, semi-empirical calculations) highlighted the interactions between the functional monomer and the template (pre-polymerization complex), forming an energetically stable cross-linkable conformation. The use of an electrostatic induced washing highlighted a more efficient and rapid way of removing the guest molecule from the highly cross-linked polymer film. With the versatility of the molecular imprinting technique combined with electropolymerization, the E-MIP should a promising approach to the fabrication of ultrathin sensor films that can be easily attached to various electrode transducers other than SPR. This work has a potential not only for the fabrication of a sensor film that would detect theophylline, but also for distinguishing other important analytes from their more closely related molecular structures in separation procedures.

REFERENCES CITED IN SECTION II

The following references were cite in the section of the specification:
1 (a) Kawa, M.; Kato, M.; *Methods Find. Exp. Clin. Pharmacol.* 2000, 22, 309-320. (b) Rowe, D. J.; Watson, I. D.; Williams, J.; Berry, D. J.; *Ann. Clin. Biochem.* 1988, 25, 4-26. (c) Howard, C. E.; Capers, C. C.; Bess, D. T.; Anderson, R. J. *Am. J. Hosp. Pharm.* 1994, 51, 1672. (d) Herrmann, G.; Aynesworth, M. B.; Martin, J. *J. Lab. Clin. Med.* 1937, 23, 135-148.
2 Thomas, J. B.; Yen, J. H.; Schantz, M. M.; Porter, B. J.; Sharpless, K. E. *J. Agric. Food Chem.* 2004, 52, 3259-3263.
3 ((a) Arshady R, Mosbach K. *Macromol. Chem. Phys.* 1981. 182, 687-692. (b) Vlatakis, G.; Andersson, L. I.; Muller, R.; Mosbach, K. *Nature* 1993, 361, 645-647.
4 (a) Hart, B. R.; Rush, D. J.; Shea, K. J.; *J. Am. Chem. Soc.* 2000, 122, 460-465. (b) Matsui, J.; Miyoshi, Y.; Doblhoff-Dier, O.; Takeuchi, T. *Anal. Chem.* 1995, 67, 4404-4408. (c) Ferrer, I.; Lanza, F.; Tolokan, A.; Horvath, V.; Sellergren, B.; Horvai, G.; Barcelo, D. *Anal. Chem.* 2000, 72, 3934-3941. (d) Piletsky, S. A.; Karim, K.; Piletska, E. V.; Day, C. J.; Freebairn, K. W.; Legge, C.; Turner, A. P. F. *Analyst.* 2001, 126, 1826-1830.
5 (a) Turner, N. W.; Liu, X.; Piletsky, S. A.; Hlady, V.; Britt, D. W. *Biomacromolecules.* 2007, 8, 2781-2787. (b) Mayuko Tatemichi, M.; Sakamoto, M.; Mizuhata, M.; Deki, S.; Takeuchi, T. *J. Am. Chem. Soc.,* 2007, 129, 135, 10906-10910.
6 (a) Kang, X.; Jin, Y.; Cheng, G.; Dong, S. *Langmuir.* 2002, 18, 1713-1718. (b) Bailey, L. E.; Kambhampati, D.; Kanazawa, K. K.; Knoll, W.; Frank, C. W. *Langmuir.* 2002, 18, 479-489.
7 (a) Baba, A.; Taranekar, P.; Ponnapati, R. R.; Knoll, W.; Advincula, R. C. ACS Appl. Mater. Interfaces., Articles ASAP. (b) Kaewtong, C.; Jiang, G.; Park, Y.; Fulghum, T.; Baba, A.; Pulpoka, P.; Advincula, R. C. *Chem. Mater.* 2008, 20, 4915-4924.
8 Taranekar, P.; Baba, A.; Park, J. Y.; Fulghum, T. Advincula, R. *Adv. Funct. Mater.* 2006, 16, 2000-2007.
9 Knoll, W. *Annu. Rev. Phys. Chem.* 1998, 49, 569-638.
10 (a) Baba, A.; Lübben, J.; Tamada, K.; Knoll, W. *Langmuir.* 2003, 19, 9058-9064. (b) Baba, A.; Knoll, W. *J. Phys. Chem. B.* 2003, 107, 7733-7738. (c) Schweiss, R.; Lübben, J.; Johannsmann, D.; Knoll, W. *Electrochim. Acta.* 2005, 50, 2849-2856. (d) Damos, F. S.; Luz, R. C. S.; Kubota, L. T. *Electrochim. Acta.* 2006, 51, 1304-1312.
11 (a) Baba, A.; Advincula, R.; Knoll, W. *J. Phys. Chem. B.* 2002, 106, 1581-1587. (b) Baba, A.; Knoll, W.; Advincula, R. *Rev. Sci. Instrum.* 2006, 77, 064101-1-064101-6. (c) Ravindranath, R.; Ajikumar, P.; Baba, A.; Bahuleyan, S.; Hanafiah, N.; Advincula, R.; Knoll, W.; Valiyaveettil, S. *J. Phys. Chem. B.* 2007, 111, 6336-6343. (d) Baba, A.; Onishi, K.; Knoll, W.; Advincula, R. *J. Phys. Chem. B.* 2004, 108, 18949-18955. (e) Baba, A.; Tian, S.; Stefani, F.; Xia, C.; Wang, Z.; Advincula, R. Johannsmann, D.; Knoll, W. *J. Electroanal. Chem.* 2004, 562, 95-103. (f) Baba, A.; Park, M.-K.; Advincula, R.; Knoll, W. *Langmuir,* 2002, 18, 12, 4648-4652. (g) Xia, C.; Advincula, R. *Langmuir.* 2002, 18, 9, 3555-3560.
12 Ulyanova, Y. V.; Blackwell, A. E.; Minteer, S. D. *Analyst,* 2006, 131, 257-261.
13 Taranekar P.; Fulghum, T.; Baba, A.; Patton, D.; Advincula, R. *Langmuir.* 2007, 23, 908-917.
13a Yassar, A.; Moustrou, C.; Youssoufi, H. K.; Samat, A.; Guglielmetti, R.; F. Garnier, F. *Macromolecules.* 1995, 28, 4548-4553.
14 Batra, D.; Shea, K. J. *Curr. Opin. Chem. Biol.* 2003, 7, 434-442.
15 Sauerbrey, G. *Z Phys.* 1959, 155, 206-222.
16 Bethencourt, M. I.; Srisombat, L.; Chinwangso, P.; Lee, T. R. *Langmuir.* 2009, 25, 1265-1271.
17 (a) Schwarz, L.; Bowyer, M. C.; Holdsworth, C. I.; McCluskey, A. *Aust. J. Chem.* 2006, 59, 129-134. (b) Holdsworth, C. I.; Bowyer, M. C.; Lennard, C. *Aust. J. Chem.* 2005, 58, 315-320. (c) Schwarz, L.; Holdsworth, C. I.; McCluskey, A.; Bowyer, M. C. *Aust. J. Chem.* 2004, 57, 759-764.
18 Georgiadis, R.; Peterlinz, K. A.; Rahn, J. R.; Peterson, A. W.; Grassi, J. H. *Langmuir.* 2000, 16, 17, 6759-6762.
19 a) Dong, H.; Cao, X.; Li, C. M.; Hu, W. *Biosens. Bioelectron.* 2008, 23, 1055-1062. (b) Hu, W.; Li, C. M.; Cui, X.; Dong, H.; Zhou, Q. *Langmuir* 2007, 23, 2761-2767. (c) Chegel, V.; Raitman, O.; Katz, E.; Gabai, R.; Willner, I. *Chem. Commun.* 2001, 883-884.
20 Fulghum, T.; Abdul Karim, S, M; Baba, A.; Taranekar, P.; Nakai, T.; Masuda, T.; Advincula, R. C. *Macromol-* ecules 2006, 39, 1467-1473. (b) Patton, D.; Taranekar, P.; Fulghum, T.; Advincula, R. C. *Macromolecules* 2008, 41, 6703-6713. (c) Taranekar, P.; Fulghum, T.; Patton, D.; Ponnapati, R. Clyde, G.; Advincula, R. C. *J. Am. Chem. Soc.* 2007, 129, 12537-12548.
21 Pietrzyk, A.; Kutner, W.; Chitta, R.; Zandler, M. E.; D'Souza, F.; Sannicolo, F.; Mussini, P. R. *Anal. Chem.* 2009, 81, 10061-10070.
22 Koβmehl, G.; Fechler, D.; Plieth, W.; Zhang, W.F.; Zerbino, J. *DECHEMA Monogr.* (Werkst Elektrochem). 1990, 121, 279.
23 Rasch, B.; Vielstich, W. *J. Electroanal. Chem.* 1994, 370, 109-117.
24 Roncali, J. Chem. Rev. 1992, 92, 711-738.
25 (a) Mathieu, S.; Trinquier, G. *Phys. Chem. Chem. Phys.* 2009, 11, 8183-8190. (b) Khan, F. L. A., Sivagurunathan, P. *Phys. Chem. Liq.* 2008, 46, 504-509. (c) Sibrian-Vazquez, M.; Spivak, D. A.; *J. Am. Chem. Soc.* 2004, 126, 7827-7833.
26 (a) Kobayashi, T.; Fukaya, T.; Abe, M.; Fujii, N. *Langmuir* 2002, 18, 2866-287. (b) Han, M.; Kane, R.; Goto, M.; Belfort, G. *Macromolecules* 2003, 36, 4472-4477.
27 (a) Rodriguez, J. A.; Dvorak, J.; Jirsak. T. *Surf. Sci.* 2000, 457, L413-L420. (b) Liu, G.; Rodriguez, J. A.; Dvorak, J.; Hrbek, J.; Jirsak, T. *Surf. Sci.* 2002, 505, 295-307.
28 Kuijpens, J. M. H.; Kardaum, G. A.; Blezer, R.; Pijpers, A. P.; Koole, L. H. *J. Am. Chem. Soc.* 1995, 117, 34, 8691-8697.
29 (a) Luo, X.; Goh, S. H.; Lee, S. Y.; Tan, K. L. *Macromolecules.* 1998, 31, 3251-3254. (b) Liu, Y.; Goh, S. H.; Lee, S. Y.; Huan, C. H. A.; *Macromolecules.* 1999, 32, 1967-1971. (c) Zhou, X.; Goh, S. H.; Lee, S. Y.; Tan, K. L. *Polymer* 1998, 39, 3631-3640. (d) Zhou, X.; Goh, S. H.; Lee, S. Y.; Tan, K. L. *Appl. Stuf. Sci.* 1997, 119, 60-66.
30 Kuckling, D.; Harmon, M. E.; Frank, C. W. *Macromolecules.* 2002, 35, 6377-6383.
31 (a) Schopf, G.; Koβmehl, G. *Advances in Polymer Science: Polythiophenes-Electrically Conductive Polymers. Spinger.* 1997,80. (b) Koβmehl, G.; Kabbeck-Kupijai, D.; Niemitz, M. *Chiuz.* 1990, 24, 106. (c) Niemitz, M.; Koβmehl, G. *Angew. Makron. Chem.* 1991, 185-186, 147. (d) Koβmehl, G.; Niemitz, M. *Synth. Met.* 1991, 41, 1065-1071.
32 (a) Niu, J.; Liu, Z.; Fu, L.; Shi, F.; Ma, H.; Ozaki, Y.; Zhang, X. *Langmuir.* 2008, 24, 11988-11994. (b) Ersoz, A.; Diltemiz, S. E.; Ozcan, A. A.; Denizli, A.; Say, R. *Biosens. Bioelectron.* 2008, 24, 742-747. (c) Gong, J-L.; Gong, F-C.; Kuang, Y.; Zeng, G-M.; Shen, G-L.; Yu, R-Q. *Anal. Bioanal. Chem.* 2004, 379, 302-307. (d) Tan, Y.; Zhou, Z.; Wang, P.; Nie, L.; Yao, S. *Talanta* 2001, 55, 337-347. (e) Weetall, H.; Rogers, K. R. *Talanta* 2004, 62, 329-335. (f) Yan, H.; Row, K. H.; Yang, G. *Talanta* 2008, 75, 227-232.
33 (a) Bolduc, O. R.; Masson, J.-F. *Langmuir* 2008, 24, 12085-12091. (b) Hyoungwon Baac, H.; Hajos, J. P.; Lee, J.; Kim, D.; Kim, S. J.; Shuler, M. L. *Biotechnol. Bioeng.* 2006, 94, 4, 815-819. (c) Siegers, C.; Biesalski, M.; Haag, R. *Chem. Eur. J.* 2004, 10, 2831-2838.
34 (a) Ferapontova, E. E.: Olsen, E. M.; Gothelf, K. V. *J. Am. Chem. Soc.* 2008, 130, 4256-4258. (b) Ferapontova, E. E.; Shipovskov, S.; Gorton, L. *Biosens. Bioelectron.* 2007, 22, 2508-2515.
35 Syu, M-J.; Chiu, T-C.; Lai, C-Y.; Chang, Y. S. *Biosens. Bioelectron.* 2006, 550-557.
36 (a) Rudy, J. L. *Clin. Chem.* 1989, 35, 509. (b) Cha, W.; Tung, W-C.; Meyerhoff, M. E.; Takayama, S. *Anal. Chem.* 2010, 82, 3300-3305.
37 (a) Adhoum, N.; Monser, L.; Toumi, M.; Boujlel, K. *Anal. Chim. Acta.* 2003, 495, 69-75. (b) Hasebe, K.; Osteryoung, J. *Anal. Chem.* 1975, 47, 2412-2418.
38 Gronewold, T. M. A.; Antje Baumgartner, A.; Weckmann, A.; Knekties, J.; Egler, C. *Acta Biomaterialia.* 2009, 5, 794-800.
39 (a) Bui, B. T. S.; Belmont, A-S.; Witters, H.; Haupt, K. *Anal. Bioanal. Chem.* 2008, 390, 2081-2088. (b) Gomez-Caballero, A.; Goicolea, A.; Barrio, R. J. *Analyst.* 2005, 130, 1012-1018. (c) Yang, M-L.; Li, Y-Z. *Anal. Lett.* 2004, 37, 10, 2043-2052.
40 The Pharmacogenetics and Pharmacogenomics Knowledge Base. Retrieved on 2006 08-14.
41 Mazzotta, E.; Picca, R. A.; Malitesta, C.; Piletsky, S. A.; Piletska, E. V. *Biosens. Bioelectron.* 2008, 23, 1152-1156.

DETAILED DESCRIPTION OF SECTION III

Electropolymerized Molecularly Imprinted Polymer Film: EIS Sensing of Bisphenol A

SUMMARY OF THE INVENTION SECTION III

Bisphenol A (BPA) sensing was investigated based on electrochemical impedance spectroscopy (EIS) measurements of an electropolymerized molecularly imprinted polymer (E-MIP) film. The E-MIP film is composed of varying ratios of BPA-terthiophene and carbazole monomer complex deposited onto indium tin oxide (ITO) substrates via anodic electropolymerization using cyclic voltammetry (CV). Subsequently, the interfacial properties of these films were studied using the non-Faradaic EIS technique. The same technique was then used to measure the presence of templated BPA which is a known endocrine disrupting chemical (EDC). Analyses of the EIS results were performed using equivalent circuits in order to model the electrical and impedance properties through the interface. A linear calibration curve was established in the range 0 to 12 mM concentrations of the analyte. Moreover, the selectivity of the films against bisphenol AF and diphenolic Acid were demonstrated. The E-MIP sensor may have advantages in environmental monitoring of bisphenol A in aqueous analyte/pollutant samples.

Introduction of Section III

Bisphenol A (2,2-bis(4-hydroxyphenyl)propane) or BPA is a chemical of particular importance because of its extensive use in industry. It is primarily used in the production of plastics mainly polycarbonate and epoxy resins and as an additive. Owing to the high use of BPA in manufacturing consumer products, high levels are expected in surface and industrial wastewaters. Reports have indicated the health risk posed by exposure to significant levels of BPA since it exhibits an estrogen-like activity.[1] Its high blood levels in men and women are associated with reproduction dysfunction, endometrial hyperplasia, recurrent miscarriages, abnormal karyotypes and polycystic ovarian syndrome, a health hazard to both infant and the general population.[2] Gas chromatography coupled with mass spectroscopy (GC-MS) and high performance liquid chromatography (HPLC) has been commonly used for quantitative determination of BPA in environmental water and packaged food product samples.

These methods require several sample preparation steps including extraction and pre-concentration. Immunoaffinity chromatography is also useful for the extraction of endocrine disrupting chemicals (EDC)s and pesticide residues. Most of the reported immunoaffinity columns use polyclonal and monoclonal antibodies. However, these types of antibodies can be difficult to reproduce in large quantities and can interfere with the antigen-binding reactions. While analytically useful, these techniques cannot meet the demand to regularly monitor the level of processing additives that may end-up as pollutants. This necessitates the development of alternative and portable analytical methods including the development of chemical and biosensors to fill the need.

Molecular recognition or artificial receptors with molecularly imprinted polymers (MIP) has been a significant tool for the development of micro and multi-analyte sensors.[3,4,5,6,7,8] Binding of the target analyte with the polymer network is made possible by the formation of shape-complementary cavities. The MIP technique is an effective and robust method for obtaining a recognition element for incorporation in chemical and biological sensors.[9] MIPs are usually prepared via the traditional bulk polymerization of functional monomer, template, and cross linker in the presence of a porogen. In bulk polymerization, it is imperative that the functional monomer must have a considerable interaction with the template in order to achieve good imprinting. Moreover, a crosslinker is commonly included in order to fix the functional monomers in place and keep the binding cavities intact. Choices for cross linkers in vinyl free-radical polymerization generally include ethyleneglycol dimethacrylate (EGDMA), divinylbenzene (DVB), trimethylolpropane trimethacrylate (TRIM) and others. While this particular method and materials has been widely used in MIPs for chromatographic separation, surface imprinting has proven to be a challenge for polymer films used as recognition elements in flat surface transduced chemical and biological sensors. There are several considerations: 1) molecular recognition is a function of the surface chemistry at the polymer-template interface, 2) the generation of signal resulting from the detection of template is significantly enhanced when the MIP is directly interfaced on the transducer's surface, and 3) analyte binding is both a function of porosity and gradient affinity (adsorption) to the film. In principle, an imprinted polymer can be grown directly from a surface with a chemically or physically adsorbed initiator, a technique demonstrated by Schweitz.[10] Living/controlled polymerization techniques have also been employed to produce an imprinted polymer from the surface. Sellergren and co-workers modified a surface with a photosensitive dithiocarbamate which functions as an iniferter.[11] On the other hand, Malitesta et al.[12] reported very thin molecularly imprinted film on a gold coated quartz crystal (QCM) by electropolymerization of phenols and aromatic amines.

In general, imprinting electropolymerization may prove advantageous pertaining to mass transfer and accessibility by enabling the direct immobilization of the polymer matrix film onto the transducer's surface and allowing control over film thickness. These factors are regarded to be very important in achieving the desired sensitivity of a sensor. Early reports of glucose oxidase entrapped in polypyrrole[13] paved the way for the use of conducting polymers in the development of biosensors, with the potential benefit of an enhanced charge transport across the polymer matrix. Despite the number of strategies employed for the preparation of imprinted polymers on surfaces, a standard protocol is yet to be established for surface molecular imprinting with respect to electropolymerized conducting polymers.

Conjugated polymers have advantages for surface MIP including electropolymerizability and doping-dedoping or redox reversibility.[14] Like polypyrrole and polyaniline, polythiophenes can be both oxidatively or reductively doped in a proper solvent.[15] The presence of sulfur in polythiophenes also enables it to be reduced and thus n-doped.[29] Moreover, the electron density distribution of the thiophene ring in the presence of other functional groups enhances the reactivity of the thiophene monomer.[16] There have been a number of studies on electrochemically prepared polythiophene films for sensing applications.[17] On the other hand, the use of carbazole has gained considerable attention since the discovery of photoconductivity in poly(N-vinylcarbazole) (PVK) by Hoegl.[18] Carbazole based polymers exhibit properties such as formation of relatively stable radical cations (holes), high-charge carrier mobilities, and high thermal and photochemical stability.[19] Moreover, carbazoles have been studied as photoconductive polymers and organic photoreceptors.[20]

In this study, we have utilized the anodic electropolymerization of both terthiophene and carbazole monomers to prepare electropolymerized MIPs or E-MIPS for the detection of BPA. The monomer 2-(2,5-di(thiophen-2-yl)thiophen-3-yl)ethanol or simply labeled as G0-3TOH is a terthiophene-based π-conjugated monomer. Since, it has been established that the polymer morphology is also affected by the stoichiometry and the concentration of the template and monomer', we have also investigated the effect of co-polymerization of G0-3TOH with carbazole, 2-(9H-carbazol-9-yl)acetic acid. The design of the polymer network composition should complement the size, shape and orientation of the monomer functional group to the imprint template. The intrinsic conductivity, stability and processabiltiy of both the terthiophene and the carbazole monomers both in doped and neutral states[22] make them good candidates for the preparation of imprinted polymers via co-electropolymerization. Their quantitative co-electropolymerization has been previously demonstrated by us resulting in smooth film formation and a high degree of compatibilization.[22] The chemical structures of the functional monomers utilized in this study are shown in FIG. 3.1 (See FIG. 3.2 for monomer-BPA complexation modeling studies).

Although a range of MIP-based chemosensors have already been reported,[23] the electrochemical approach in tandem with the MIP protocol process has not been largely explored because of issues pertaining to homogeneous film formation and difficulty in in-situ characterization.[24] Also, the possible interference or degradation of the template/analyte with the electropolymerization process is a main concern. It is therefore important to develop E-MIP methods in which templating is efficient and an in-situ monitoring method be employed with electrodeposition. In previous studies, electrochemistry coupled with the QCM or E-QCM was employed for the in-situ growth monitoring of the MIP films on a gold electrode surface as well as for analyte sensing.[7,25] In particular, the frequency (mass) and the viscoelastic behavior of the film can be monitored simultaneously during electrodeposition.[26] At the same time, the I-V or I-T (current versus time) measurements can be made on the same Au-QCM electrode since it is also a working electrode for a three-electrode cell electrochemical set-up. Another method is be electrochemical surface plasmon resonance spectroscopy or EC-SPR.[8]

Thus, we present a protocol for depositing E-MIP films based on copolymers of terthiophene and carbazole derivatives utilizing electrochemical impedance spectroscopy (EIS) to generate a BPA sensor. In this case, an advantage is that an electropolymerized film brings about a network film containing cavities for the binding of BPA without the use of an added crosslinker.[8] The sensitivity and selectivity of the E-MIP film towards BPA were determined using the EIS technique. EIS may yet be demonstrated to be an effective and robust method for investigating electrode processes, determination of surface adsorption kinetics and mass-transport parameters, and adopting smaller electrochemical perturbations for analyte detection in sensors.[27]

phen-3-yl)ethanol (G0-3TOH). In principle, the dendron synthesis can be carried out to succeeding generations, G2, G3, G4 as needed in an AB$_2$ convergent manner.[14,29]

SCHEME III.1
Synthesis of G0-3TOH Terthiophen Dendron

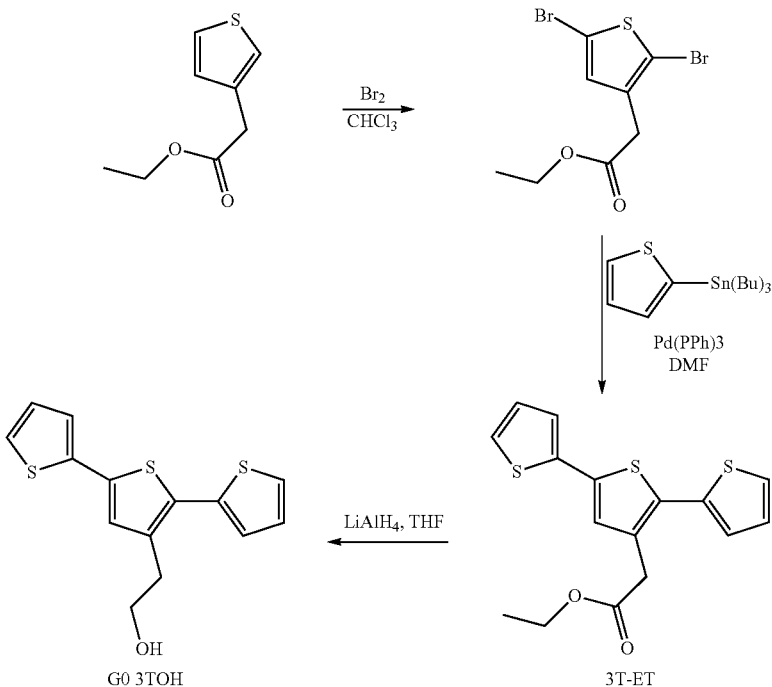

Experiments of Section III

Chemicals 2-(9H-carbazol-9-yl)acetic acid (labeled as CbzCOOH), bisphenol A, tetrabutylammonium hexafluorophosphate (TBAH), bisphenol AF, and diphenolic Acid were purchased from Sigma-Aldrich. All chemicals were used as received. Aqueous solutions were prepared from water purified using a Millipore system (resistivity 18.2 MΩ·cm). The synthesis of the G0-3TOH is as follows:[28,27] the synthesis of ethyl 2-(2,5-di(thiophen-2-yl)thiophen-3-yl)acetate (3T-ET) was carried out by first synthesizing ethyl 2-(2,5-dibromothiophen-3-yl)acetate as reported in the literature.[21] Ethyl 2-(2, 5-dibromothiophen-3-yl)acetate and 2-(tributylstannyl)thiophene was then added to a dry DMF solution of dichlorobis (triphenylphosphine)palladium. After three freeze thaw cycles, the mixture was heated at 100° C. for 48 hrs. The mixture was cooled to room temperature and poured into a beaker containing 150 ml of water and subsequently extracted with CH$_2$Cl$_2$. The compound 3T-ET was reduced under the following conditions: 10 ml THF was added, dropwise, under nitrogen to an ice-cooled 100 ml THF suspension of LiAlH$_4$, to yield 2-(2,5-di(thiophen-2-yl)thio-

Instrumentation Used in this Section

Cyclic voltammetry (CV) was performed on an Autolab General Purpose Electrochemical System (GPES) PGSTAT12 module with a three-electrode cell. The conditions and parameters for the procedure are specified in the Discussion and Results section since they vary with the experiments. GPES software was used to run data acquisition. Electropolymerization were performed on gold coated glass slides or Indium Tin Oxide (ITO) surfaces which were cleaned according to the following protocol: The gold coated glass slide were cleaned in piranha solution for 60 sec (H$_2$O$_2$/H$_2$SO$_4$, 1:3, v/v) whereas 3×1.5 cm cut ITO slides were washed with Alconox (Sparkleen) and were subsequently rinsed and sonicated in Milli Q water for 5 minutes. Successive washing in different solvents ensued namely, in isopropyl alcohol, hexane and toluene, in which each washing was accompanied with 10-minute sonication. Both gold and ITO slides were then subjected to plasma cleaning using a March Plasmod GCM 200 for 300 sec at 10 watts with Ar gas purge.

This electrochemical set up is also equipped with a Frequency Response Analyzer module (FRA). The FRA hardware consists of a digital signal generator module, a signal conditioning unit and a fast analog to digital converter with two channels. The Fit and Simulation version 1.7, built in the FRA software, allowed the fitting of the circuit parameters to the measured data using the nonlinear least squares method. EIS sensing was done by monitoring actual kinetic curves. A typical measurement for comparison was done with 0 to 12 mM concentrations of BPA in acetonitrile. Various concentrations were specified for sensitivity studies. The EIS curve was recorded three times with an average deviation of 5% from the shape of the curves before choosing the final representative plot.

For X-ray Photoelectron Spectroscopy (XPS), photoelectrons were collected on a Physical Electronics Model 5700×PS instrument using a monochromatic Al-Kα x-ray source (1486.6 eV) operated at 350 W. The analyzed area, collection solid cone and take off angle were set at 800 mm, 5° and 45° respectively. A pass energy of 11.75 eV was employed resulting to an energy resolution of better than 0.51 eV. All spectra were acquired in vacuum ($5\times10^{-9}$ torr or better) and at room temperature. A Shirley background subtraction routine was applied throughout the experiment. The binding energy scale was calibrated prior to analysis using the Au $4f_{7/2}$ line. Charge neutralization was ensured through co-bombardment of the irradiated area with an electron beam. Data processing was carried out using the Multipak™ software package.

Ellipsometry measurements were conducted using the OPTREL-Multiskop at an angle of 60° with respect to the surface normal and at a fixed wavelength of 632.8 nm. Δ and ψ values were obtained for the polymer films and the clean gold coated quartz crystal surface. The ellipsometry data were then fitted using a fitting program (Elli, Optrel), assuming a refractive index (RI) of 1.5 for the polymer layer.[30]

UV-Vis spectroscopy measurements were carried out on a Perkin-Elmer Lambda 20. Fluorescence spectra were obtained in a Perkin-Elmer LS50B spectrometer using 250 nm excitation.

Modeling studies were performed to predict the energy of the complex that may have formed between the G0-3TOH and carbazole monomers and BPA in a particular conformation. The extent of such interaction is quantified through calculated free energy changes exerted by the interacting molecules. The energy value calculated was compared with the energy value obtained for the same complex or different complexes assuming changes in the conformation has taken place. Specifically, equilibrium geometry calculations at the ground state using the semi-empirical method, PM3 was carried out using Spartan 08 (Wavefunction, Inc.). It is based on the neglect of diatomic differential overlap integral approximation. Specifically, it is a generalization of the modified neglect of differential diatomic overlap (MNDO) approximation in which the central approximation asserts that the atomic orbitals residing on different atomic centers do not overlap, thus reducing overall computations. In setting up each calculation, energy minimization was always performed to generate the coordinates which correspond to a minimum energy. It must be emphasized that, energy minimization alone will not yield the geometry having the lowest energy conformation or "global conformation." Hence, it was observed that several conformations exist and that they exhibit very similar energies. Single point calculations were also performed using the same theoretical model on the separate BPA and monomer components in order to determine if the observed differences in the enthalpy of formation, $\Delta H_f$ were induced by monomer-monomer interactions.

Results and Discussion Section III

In Situ CV Deposition of Imprinted and Non Imprinted Films

The imprinted polymer film was prepared by in-situ CV deposition on the surface of ITO. The technique allows for the preparation of films with varying thickness by CV and directly interfaces the imprinted polymer onto the surface of a working electrode which can also be interfaced to an EIS system. The potential window, number of cyclic scans, and polymer composition were optimized to establish the most appropriate conditions in obtaining the best film that will exhibit high sensitivity and selectivity toward BPA. Consequently, polymerization was typically conducted by cycling the potential from 0V to 1.1V at a scan rate of 50 mV/s for ten times (10 cycles). The E-MIP film was prepared from a 50 μM solution of monomers and 5 mM BPA complex in acetonitrile (ACN) containing 0.1M of tetrabutylammonium hexafluorophosphate (TBAH) as supporting electrolyte. A control polymer film, i.e. the non-imprinted polymer (NIP) film, was prepared under the same conditions but in the absence of the template (bisphenol A). Table III.2 gives the details on the monomer composition used to prepare the imprinted and non imprinted electropolymerized films.

TABLE III.2

Molar Ratio of the CbzCOOH and G0-3TOH Monomers in the Prepolymer Solutions Used in the Electropolymerization of Imprinted (With Bisphenol A) and non Imprinted (Without Bisphenol A) Polymer Films

| Pre-polymer solution | [CbzCOOH] | [G0-3TOH] |
|---|---|---|
| 1 | 50 μM | ~ |
| 2 | ~ | 50 μM |
| 3 | 25 μM | 75 μM |
| 4 | 50 μM | 50 μM |
| 5 | 75 μM | 25 μM |

In a typical CV experiment, the film formation was monitored through changes in current per cycle. At each CV cycle, the oxidation current increases, suggesting a stepwise growth of the polymer film. The electrochemical polymerization represents a statistical reaction between the terthiophene units and the carbazole group resulting to further cross linking [31] The term cross-linking is referred to the ability of the monomer-template complex to enable terthiophene-terthiophene, terthiophene-carbazole, carbazole-carbazole reactivity intra- or inter-molecularly. During the electropolymerization process, the formation of linear polymeric or oligomeric species is also possible from free terthiophene and carbazole units. The dual function of the monomers that is, as functional monomers and as cross linkers is regarded to be responsible for the generation of binding cavities that complement the size and shape of BPA for subsequent detection of this analyte. Hence, it was significant to look at the effect of varying polymer composition of the imprinted polymer film for optimization. Thus, variations in the polymer composition was performed by electropolymerizing different molar ratios of G0-3TOH and CbzCOOH as tabulated in Table III.1. Each resulting film was characterized and compared to films prepared from only one monomer, i.e., either G0-3TOH or CbzCOOH only.

In detail, first, the growth formation of each polymer film was characterized by CV. FIGS. 3.3A&B gives the voltammogram for 75 mM G0-3TOH and 25 mM CBzCOOH copolymer film composition. The CV of the other different molar ratios of G0-3TOH and CbzCOOH are shown in the supporting information.

As shown in the voltammogram, the film formation for the imprinted polymer was different from the growth formation of the non-imprinted polymer film. The deposition of the imprinted polymers resulted to a relatively higher increase in anodic peak current compared with the non imprinted films. This evidently shows that the presence of BPA enhanced the crosslinking of the monomers and thus resulting in a higher current. The polymer films containing a higher amount of G0-3TOH tend to give a moderately higher oxidation peak current (FIGS. 3.4A-C). This leads to the assumption of distinct structures between the E-MIP and the NIP films and that higher density films were obtained from imprinted films compared to non-imprinted films. It is also noteworthy to discuss the observed changes in the doping behavior of the formed conjugated polymer backbone which may have been influenced by the pre-polymer complexation of the template with the monomers. The anodic peak potentials were found to have shifted after the $10^{th}$ cycle of deposition of the E-MIP compared to the non-imprinted films on the ITO surface. This suggests that incorporation of the BPA may have caused conformational changes on the polymer backbone brought about by more H-bonding and other possible non-covalent interactions between the template and the monomer. Moreover, it may be speculated that transitions observed in the peak potential have lead to the formation of polymer networks that are highly crosslinked and yet with a lower extent of π-conjugation depending on the respective amount of G0-3TOH or CbzCOOH present in the film.[32,22]

The UV-Vis spectroscopy technique was also employed in this study to ascertain the changes in the π-conjugation of the polymer films formed after electrochemical deposition on ITO. A shift of the absorption maximum to longer wavelength signifies greater p-conjugation. On the other hand, it can be assumed that the polymer backbone conformation is more disordered if the absorption maximum is shifted to shorter wavelength. To illustrate this point, the UV-Vis spectra of the G0-3TOH films were compared (FIGS. 3.5A&B). It is assumed that in the presence of BPA, conformational changes may have occurred causing a decrease in p-conjugation and a more aggregated structure of the formed polythiophene-polycarbazole resulting to a slight shift in the $\lambda_{max}$ to shorter wavelength (blue shift) and to decrease in intensity (hypochromic shift). This was indeed observed in the case of the E-MIP film. The observed hypochromic shift may be attributed to the occurrence of more conformational defects disrupting the π-conjugation within the polymer structure compared to the NIP films. This is a consequence of the presence of the BPA in the matrix affording a more conformationally disordered backbone and networked structure.

We also attempted to explain the observations generated from the CV experiments using the in-situ E-QCM technique. With the E-QCM technique, it is possible to correlate electrochemically induced mass changes on the quartz crystal electrode per CV cycle. Simultaneous with the reduction and oxidation peaks on the voltammograms, the changes in frequency can be recorded from the QCM. During the anodic cycle (oxidation), the polymer film is deposited simultaneously with the doping of hexafluorophosphate counterions resulting in a corresponding decrease in the frequency due to an increase in mass. On the other hand, during the cathodic cycle (reduction), the change in the frequency (increase) is due to de-doping of ions, signaling a decrease in mass. The changes in frequency can then be translated into the corresponding deposited mass of the polymer film adsorbed on the surface through the Sauerbrey equation.[33]

$$\Delta f = -2f_0^2 \Delta m / A(\rho_q \mu_q)^{1/2} \quad (III.1)$$

where $f_0$ is the fundamental resonant frequency of the QCM (5 MHz), A is the area of the electrode (1.327 cm$^2$), $\rho_q$ is the density of the quartz (2.65 g/cm$^3$), and $\mu_q$ is the shear modulus of the quartz (2.95×10$^6$ N/cm$^2$).

FIGS. 6A&B show the progress of electropolymerization (raw data) of the imprinted and non imprinted (control) polymer films on gold coated quartz crystal. As illustrated in the plot, the electrochemical deposition of polymers after 10 CV cycles brings about the formation of polymer films as indicated by a large shift on the frequency of the quartz crystal. In both plots, it was shown that a relatively denser film was obtained when the template (BPA) was incorporated in the pre polymer mix (E-MIP). These correspond to a higher surface mass density for the imprinted polymer films relative to the non imprinted films, regardless of the polymer composition. However, the mass deposition is more well-behaved for the electrochemical deposition of the imprinted copolymer films, which resulted in the observed linear growth rate coincident with a highly reversible redox behavior for the film.

Characterization of the Imprinted and Non Imprinted Polymer Films

The effect of polymer composition was investigated in the preparation of the E-MIP as this may eventually affect the structural integrity of the resulting film and sensor performance.[34] It has been previously pointed out that an E-MIP film must possess a reasonable mechanical stability with the desired amount of recognition sites and allow for facile release and re-binding of the template.[7,8] In a traditional bulk MIP polymerization, a cross linker is incorporated to enable polymer network formation which could hold and maintain the cavities that were formed even after washing. In this study, it was ascertained that co-polymerization of the two monomers brings about the same effect as that of the addition of a crosslinker. The —OH and —COOH terminal groups present in each monomer provide additional sites in which BPA could possibly interact non-covalently towards complex formation.

The film thickness of both imprinted and non imprinted polymer films prepared from different monomer concentrations of G0-3TOH and CbzCOOH was determined using ellipsometry. Generally, thin films were obtained from the electropolymerization of imprinted films as shown in FIGS. 3.7A&B. Imprinted polymer films have thicknesses ranging from 2 to 15 nm. The films were also evaluated by SPR.

A Detailed Treatment of the SPR Measurements is Given as Follows

SPR gives a highly sensitive response due to change in refractive index on the gold surface.[1] To quantify the polymer thickness, the Fresnel equations, given below, were adopted to obtain the theoretical reflectance of a four-layer system comprising the prism (1$^{st}$ layer), chromium (2$^{nd}$ layer), gold (3$^{rd}$ layer) and external dielectric environment (air, 4$^{th}$ layer):[2]

$$R = \left( \frac{r_{12} + r_{23}S_1^2 + r_{34}S_1^2 S_2^2 + r_{12}r_{23}r_{34}S_2^2}{1 + r_{12}r_{23}S_1^2 + r_{23}r_{34}S_2^2 + r_{12}r_{34}S_1^2 S_2^2} \right)$$

where $$S_i = e^{(i\delta_{xi} d_i)}, \quad r_{ij} = \frac{\varepsilon_i \delta_{xj} - \varepsilon_j \delta_{xi}}{\varepsilon_i \delta_{xj} + \varepsilon_j \delta_{xi}}, \quad \varepsilon + (n+ik)^{1/2},$$

$$\delta_{xi} = 2\pi/\lambda(\varepsilon_i - \varepsilon_i \sin^2\theta)^{1/2}$$

$\varepsilon_i$ is the dielectric constant of the ith layer, $\delta_i$ is the thickness of the ith layer, $\theta$ is the incident angle at the prism-gold interface and $\lambda$ is the wavelength of the light source. The dielectric constant can be defined as a complex index of refraction, which is relative to a refractive index (n) and an extinction coefficient (k). The resulting best fit (as calculated and then compared with the measured curves) gives the optical thickness of the MIP film.[3] This gives an indication of a better mass transport of the target analyte during template removal and template rebinding processes. The desired property of the imprinted films to re bind with BPA is dictated by the film's surface mass density and thickness as these will enhance the efficiency of template removal and will facilitate the penetration of the template molecules within the polymer film resulting to occupation of the pre formed cavities. The wetting properties of the electropolymerized films (contact angle measurements with water) vary with polymer composition and in the presence of the template. However, no significant trend was observed both in the absence and presence of the template and regardless of the polymer composition clearly demonstrating differences on the film morphology may not be an important factor in distinguishing between the E-MIP and NIP films. This may be important in assessing the effect of non-specific adsorption with these films. The results comparing the various thicknesses and their wetting properties are also summarized in the Table III.3.

TABLE III.3

Tabulated Data on Film Thickness (Ellipsometry) and Contact Angle for the Different Polymer Films

| | Film Sample | Thickness (nm) | Contact Angle (degrees) |
|---|---|---|---|
| MIP | 50 µM G0-3TOH | 11.6 | 64.4 ± 3.5 |
| NIP | 50 µM G0-3TOH | 7.3 | 77.9 ± 2.6 |
| MIP | 50 µM CBzCOOH | 2.2 | 55.8 ± 3.3 |
| NIP | 50 µM CbzCOOH | N.D. | 65.4 ± 0.5 |
| MIP | 50 µM G0-3TOH 50 µM CBzCOOH | 11.7 | 60.5 ± 2.7 |
| NIP | 50 µM G0-3TOH 50 µM CBzCOOH | 7.5 | 63.9 ± 7.2 |
| MIP | 25 µM G0-3TOH 75 µM CBzCOOH | 5.5 | 77.1 ± 3.7 |
| NIP | 25 µM G0-3TOH 75 µM CBzCOOH | 2.3 | 65.3 ± 0.2 |
| MIP | 75 µM G0-3TOH 25 µM CBzCOOH | 14.7 | 77.0 ± 10.2 |
| NIP | 75 µM G0-3TOH 25 µM CBzCOOH | 6.2 | 63.9 ± 5.1 |

In fitting the EIS data, the Randles circuit represented by R1(Cap[R2W]) was adopted to model the rebinding of BPA. This equivalent circuit is preferentially used to model modified surfaces with defects/channels for ion transport or adsorption. The model represents the physical structure of the interface in terms of three layers, each with its own unique electrical properties: 1) electrolyte; 2) molecular layer which represents the copolymer film and 3) the gold substrate.

It was also observed that the film thickness of the imprinted films was found to be dependent on the amount of G0-3TOH, that is, film thickness tends to increase with increasing concentration of the G0-3TOH in the polymer film. Thus, in addition to ellipsometry, surface plasmon resonance (SPR) analysis was conducted. SPR gives a highly sensitive response due to change in refractive index on the gold surface.[35] The resulting best fit (as calculated and then compared with the measured curves) gives the optical thickness of the MIP film.[36]

A significant shift on the minima of the SPR curve as shown in FIGS. 3.8A and 3.8B was observed upon the electrochemical deposition of equimolar amounts of G0-3TOH and CbzCOOH on Au substrate, both for non imprinted and BPA imprinted polymer films. This is indicative of a change in the dielectric constant of the dielectric layer on top of the gold surface upon the formation of the polymer film. Specifically, an increase in the resonance angle was observed upon the interaction of the electropolymerized G0-3TOH and CbzCOOH films with the template (BPA). The resonance angle shifted from 43.9° to 48° in the case of the MIP film against the observed shift from 43.8° to 45.1° for the electrodeposition of NIP film. Such shift on the minima of the SPR curves (but without affecting the reflectance of the SPR curves) reflects on the specific recognition between the binding sites of the E-MIP film and BPA as well as the successful incorporation of the template molecules within the polymer structure (BPA). This observation was further affirmed when the resonance angle decreased to 47.4° when the MIP film was subjected to washing with various solvents such as methanol: acetic acid (80:20 v/v), methanol and acetonitrile to effect the removal of the template. However, the resonance angle of the non imprinted G0-3TOH and CbzCOOH film only shifted by a mere 0.1°, i.e., from 45.1° to 45.0°. This minute shift can be ascribed to the weak and nonspecific adsorption due to the variation in the crosslinking/conformational arrangement of the copolymer film without the template. FIGS. 3.8A and III.8B show observed shifts in the minima of the SPR curve after template washing for non imprinted and MIP films, respectively. As such, the SPR results give a clear demonstration of the finite change in the thickness and/or refractive index of the polymer films with and without BPA as template. On the basis of experimental results and the fitting parameters employed during simulations using Winspall software (employing algorithms based on the above shown Fresnel equations), E-MIP film thickness depicts a change from 24.2 nm to 14.2 nm after BPA washing. On the other hand, template removal for the non imprinted film renders the film thickness to vary from 9.1 nm to 7.2 nm. FIG. 3.9 show observed shifts in the minima of the SPR curve after template washing for other non imprinted and MIP films, respectively.

Theoretical Modeling of the Template-Monomer Complex

A molecular modeling study is an important tool in predicting the conformation of the monomers in the presence of the template and in gauging the extent of the interaction of the monomers with the template. Thus, a theoretical model of the template with different ratios of G0-3TOH and CbzCOOH was obtained from semi-empirical PM3 calculations using Spartan 08 as shown on FIG. 3.10A-C. This shows the possible pre formed arrangement of the monomers and template within the network. The interaction energy between the monomers and template was obtained from calculated heats of formation using Equation (III.3):

$$\Delta E = E_{bisphenol\ A/G1\text{-}3TOH/CbzCOOH\ complex} - [E_{G0\text{-}3TOH} + E_{bisphenol\ A} + E_{cbzCOOH}] \quad (III.3)$$

A negative value for ΔE denotes favorable interaction between the monomer and the target analyte.[37] The calculated interaction energy for such conformation or arrangement of the G0-3TOH/CbzCOOH-BPA complex, 1:3:1 ratio, is −35.8715 kJ/mol, suggesting that a relatively stable complex is formed at a high molar ratio of the carbazole derivative. This suggests a fairly good affinity of the BPA with the CbzCOOH functional monomer. A complex may also be expected for a 1:1 pre polymer ratio of CbzCOOH and BPA, as this also gives and negative stabilization energy equal to −11.844 kJ/mol. As displayed FIGS. III.10A-C, the proposed arrangement of molecules may have been made possible by an H-bonding interaction providing such stability to the formed complex between G0-3TOH, CbzCOOH and BPA. In particular, a favorable donor-acceptor H-bonding between the oxygen atoms in the HO— of the G0-3TOH monomer, the carboxyl moiety present in CbzCOOH and the hydrogens of the hydroxyl groups of the template (bisphenol A) are possibly formed as implied by the calculated bond distances. To effect H-bond formation, calculated bond distances due to H-bonding (represented by broken lines) must be less than or equal to 2.00 Å.

The interaction of excess amount of G0-3TOH with BPA and CbzCOOH cannot be discounted too as results of semi empirical calculations show that a relatively stable complex can also be formed giving a net stabilization energy for the complex equal to −24.2945 kJ/mol. The disordered arrangement observed is caused by the random orientation of the monomer units. The reliability of the E-MIP film as a receptor may also be gauged by the relative flexibility of the template in the presence of functional monomers. The orientation of the template at each stage of E-MIP preparation, i.e., electropolymerization, solvent washing and template rebinding, must be preserved in order to attain high rebinding efficiency. To monitor the changes on the conformation of BPA, a single point energy calculation was performed so as to determine the conformation of BPA in the absence of the functional monomers (FIGS. 3.11A&B). From such calculation, the angle generated by C2 (phenyl ring 1), C13 (tertiary carbon) and C10 (phenyl ring 2) was measured and was used as reference to determine the extent of twisting that may have occurred to the two phenyl rings when in contact with monomer molecules. The angle obtained was 111.22°.

It is clearly seen from FIG. 3.11B that the bond angle varies with polymer composition. A decrease in the bond angle was observed upon interaction of BPA with 3:1 molar ratio of G0-3TOH:CbzCOOH. Nevertheless, it may be generalized that as the amount of the functional monomer is increased, the bond angle between the phenyl ring has also increased. This manifests the interaction of the BPA with the functional monomers, with the two phenyl ring tend to pull away from each other due to hydrogen bond formation of the hydroxyl group attached to each phenyl ring.

Thus, modeling studies was performed in order to provide important structural or mechanistic information leading to the formation of high affinity sites in an electropolymerized terthiophene MIP film. The efficiency and selectivity of the resulting E-MIP film are dictated by the number and the relative strength of the pre polymer complex or template-monomer interactions hence must be given utmost importance.

Template Removal Studies by XPS and Fluorescence Spectroscopy

The XPS technique was used to confirm the successful incorporation of the template molecule on the imprinted polymer. XPS spectra were obtained from film samples electropolymerized on a gold coated BK7 glass (FIG. 3.12). BPA was then removed from the imprinted polymer by dissolution in the following solvents: methanol/acetic acid (1:4, v/v), acetonitrile, followed by washing with methanol and subsequently dried under a stream of nitrogen gas. Washing of the polymer film was repeatedly done for each solvent for a total washing time of 6.5 hours. The NIP which served as control was also treated in the same way as the MIP. In the absence of an elemental marker on the template's structure, the high resolution scan for C 1s electron for imprinted film samples was used in measuring the extent of BPA removal from the polymer films. C 1s electron signal from E-MIP film can be tracked at binding energy equal to 284 eV. A decrease in the number of counts per second indicates successful removal of BPA. Translating this decrease in the number of counts per second into atomic concentration of C 1s, the E-MIP film was found to contain ~81.08% C whereas upon BPA removal, the atomic concentration for C 1s was found to be ~80.38%. Though, high resolution scans for O 1s was not considered, per se, due to the presence of adventitious oxygen, it was also deemed relevant to obtain the ratio of O atom concentration with C atom concentration before and after template removal. Experimental results yield ~0.144 O 1s/C 1s ratio before BPA removal while approximately 0.116 O 1s/C 1s ratio was calculated after the release of the template from the E-MIP network. This clearly reinforces the results obtained from SPR measurements wherein it was shown that the film thickness diverged before and after template washing, which proved successful formation of binding cavities within the polymer network via the liberation of BPA molecules.

The results show that the electrochemical deposition of G0-3TOH and carbazole polymers permits the preparation of not only thin films at ~15 nm, but also enables the formation of imprinted films possessing appropriate rigidity, and is relatively hydrophilic which should be good for wettability in aqueous medium. The wetting properties are important with respect to the bulk liquid or subphase to which the analyte will diffuse to the surface and into the film. This should lead to unhindered diffusion of BPA into the polymer matrix. It can also be ascertained from FIG. 3.13, that the wetting properties of the electropolymerized films vary with polymer composition and in the presence of the template. However, in the absence of the template and regardless of the polymer composition, no significant changes were observed on the water contact angle of the polymer films.

Proof of Template Removal Studies by XPS and Fluorescence Spectroscopy

The XPS technique was first used to confirm the successful incorporation of the template molecule on the imprinted polymer. XPS spectra were obtained from film samples electropolymerized on a gold coated BK7 glass. BPA was then removed from the imprinted polymer by dissolution in the following solvents: methanol/acetic acid (1:4, v/v), acetonitrile, followed by washing with methanol and subsequently dried under a stream of nitrogen gas. Washing of the polymer film was repeatedly done for each solvent for a total washing time of 6.5 hours. The NIP which served as control was also treated in the same way as the MIP. In the absence of an elemental marker on the template's structure, the high resolution scan for C 1s electron for imprinted film samples was used in measuring the extent of BPA removal from the polymer films. C 1s electron signal from E-MIP film can be tracked at binding energy equal to 284 eV. A decrease in the number of counts per second indicates successful removal of BPA. Translating this decrease in the number of counts per second into atomic concentration of C 1s, the E-MIP film was found to contain ~81.08% C whereas upon BPA removal, the atomic concentration for C is was found to be ~80.38%. Though, high resolution scans for O 1s was not considered, per se, due to the presence of adventitious oxygen, it was also deemed relevant to obtain the ratio of O atom concentration with C atom concentration before and after template removal. Experimental results yield ~0.144 O 1s/C 1s ratio before BPA removal while approximately 0.116 O 1s/C 1s ratio was calculated after the release of the template from the E-MIP network. This clearly reinforces the results obtained from SPR measurements wherein it was shown that the film thickness diverged before and after template washing, which proved successful formation of binding cavities within the polymer network via the liberation of BPA molecules.

The film samples without template were subjected to fluorescence analysis. A summary of the emission intensities obtained from imprinted and non imprinted polymer films before and after template removal is presented in Table III.4.

TABLE III.4

Summary of the Emission Intensities Obtained for Copolymer Films after Electropolymerization

| MIP Film Samples | EI (506.72 nm) | NIP Film Samples | EI (506.72 nm) |
|---|---|---|---|
| 50 μM CBzCOOH | 114.79 | 50 μM CBzCOOH | 95.1 |
| 50 μM G0-3TOH | 75.50 | 50 μM G0-3TOH | 158.87 |
| 25 μM G0-3TOH- | 80.17 | 25 μM G0-3TOH- | 80.02 |
| 75 μM CBzCOOH | (73.98) | 75 μM CBzCOOH | (87.83) |
| 50 μM G0-3TOH- | 254.39 | 50 μM G0-3TOH- | 126.72 |
| 50 μM CBzCOOH | (221.59) | 50 μM CBzCOOH | (112.83) |
| 75 μM G0-3TOH- | 95.35 | 75 μM G0-3TOH- | 110.85 |
| 25 μM CBzCOOH | (81.68) 188.99 | 25 μM CBzCOOH | (95.01) |

EI—Emission intensity

Fluorescence is the emission which results from the return to the lower orbital of the paired electron.[38] Polythiophenes and polycarbazoles generally display significant fluorescence due to the presence of delocalized electrons present in conjugated double bonds. The relatively high fluorescence of these compounds can be explained by the position of the nonbonding orbital which is perpendicular to the plane of the ring, allowing it to overlap the p orbitals on the adjacent carbon atoms.[39] Comparison of the emission intensities of the imprinted and non imprinted polymer films after electropolymerization showed that BPA enhances the fluorescence emission of the polymer film. The observed enhancement may be attributed to the complexation of BPA with the copolymer facilitated by the formation of H-bonds arising from interactions of the —COOH group of the carbazole, —OH group of the G0-3TOH and that of phenolic —OH groups of BPA.[40] The conformational flexibility of the crosslinked polymer film was assumed to have been further hindered due to the efficient trapping of BPA in the binding cavities within the polymer network:[41,42] Thus, successful template removal may be gauged by a decrease in the intensity.

Analytical Performance of the E-MIP Sensor by Electrochemical Impedance Spectroscopy (EIS)

Electrochemical impedance spectroscopy has been used to demonstrate the difference in the interfacial properties of conducting polymer films[43] deposited on the ITO substrate. Changes in the dielectric and electrical properties of the copolymer films during rebinding of BPA were investigated. Specifically, BPI imprinted and nonimprinted copolymers of G0-3TOH and CBzCOOH films were electrodeposited (CV) onto the surface of ITO. The potential was cycled from 0 to 1.1 V ten (10 cycles) times at scan rate of 50 mV/s. Consequently, the respective electrical responses of the films were obtained using the Autolab Frequency Analyzer (Brinkmann). The impedance data (amplitude and the phase shift of the resulting current) were recorded at each frequency from 100 kHz to 0.01 Hz. A total of 50 points were collected for each impedance measurement. A sinusoidal potential modulation of 10 mV amplitude was superimposed on a constant dc potential (0 V) during impedance measurements. The data obtained were then fitted (minimum of 50 iterations) into a particular equivalent electrical circuit using the complex nonlinear least squares (CNLS) admittance fitting program with the instrument. This is to obtain the following parameters: solution resistance ($R_1$), charge-transfer resistance ($R_2$), n, CPE or differential capacitance ($C_1$). The Warburg circuit represented by $R_1(C_1[R_2W_1])$ may be used to describe the rebinding of BPA with the imprinted polymer films as shown in the scheme set forth in FIG. 3.14. This equivalent circuit is preferentially used to model those modified surfaces with defects/channels for ion transport or adsorption. Components of the electrochemical polymer sensor system represented by the corresponding terms in the equivalent electrical circuit are as follows: a) $R_1$, the ohmic resistance of the electrolyte solution; b) $R_2$, the resistance of the polymer film layer and c) $C_1$, capacitor reflecting the properties of the double layer.

The Nyquist plots, in which the imaginary impedance, Z" is plotted against the real number, Z' are shown in FIGS. 3.15A-C. This type of plot provides information as to the nature of the electrochemical process occurring at the electrode-electrolyte interface. The Nyquist plot indicates that the imprinted copolymer film exhibited both diffusion-related and charge transfer-related processes, represented by the straight line and the semi-circle region (green curve), respectively.[44] On the other hand, the non-imprinted copolymer exhibited only a diffusional-limited electrochemical process. Nonetheless, electropolymerization of the imprinted films on the ITO surface bring about changes on the electrochemical surfaces and that the behavior of NIP and E-MIP films can be differentiated using the EIS technique. Specifically, the Bode phase plots from the E-MIP and NIP films indicate that at lower frequencies, the phase angles deviated from 90°, suggesting that the materials on the ITO surface are not free of defects. As a result, current leakage, through either ionic channels or electronic conduction exists.[45] This could be attributed to the intrinsic structure of the polymer film. This supports the assumption that the polymer films are permeable, which is an important property especially if the films are intended to be used for molecular recognition.

The effect of the dc potential during impedance measurements as well as of time on the permeability of the imprinted G0-3TOH polymer film was also investigated. The applied dc potential was varied from +0.2 to −0.2V and the impedance spectra was obtained at each dc potential over a frequency range of 100 kHz to 0.01 Hz as shown in FIGS. 3.16A&B. As demonstrated in FIG. 3.17A-D, it is evident that the total impedance of both the E-MIP and NIP polymer films increases as the electric potential is shifted towards the cathodic range, implying a reduction on the permeability of the polymer film brought about by minimal structural changes in the film. Interestingly, anodic shift of the electric potential causes the NIP film to be resistant to the penetration of ions or molecules. In contrast, the E-MIP film manifested a relatively good permeability at this potential range as indicated by the lower total impedance magnitude. However, since the E-MIP films are electrochemically active, sensing of BPA was performed at 0V dc potential, in which the polymer possesses an intermediate permeability. This is to prevent the films from undergoing structural changes brought about by the applied electric potential.

FIGS. 3.18A&B shows the EIS response of the E-MIP against the NIP in sensing BPA, thus confirming successful imprinting. The E-MIP film was exposed to varying concentrations of BPA, i.e., from 0 to 12 mM, noting the change in the differential capacitance ($C_1$) at each concentration.[45] It can be observed from the Nyquist plots that the radii of the semi circles decrease linearly with increasing concentration of BPA. It is assumed that the template (bisphenol A) molecules were able to penetrate and bind with the cavities present within the imprinted polymer network. On the other hand, the binding (or non-binding) of BPA with the NIP did not result to any change in the impedance values. This provides support to the assumption that the NIP film was impermeable to ions or molecules.

The efficient trapping of BPA molecules in binding cavities within the E-MIP film caused the decrease on the electrochemical current brought about by an impediment in the flow of the electrons in an ac circuit. BPA molecules are assumed to have blocked the electrode surface and that the extent of such blockage is dependent on the concentration of BPA.[46] Changes in the total impedance obtained during the rebinding of the different concentrations of BPA on the imprinted film were used to calculate the amount of BPA using the equation of the line, [BPA]/Z=0.00411 [BPA]− 0.00078 ($R^2$=0.9989), as illustrated in FIG. 3.19. Sensitivity of the sensor, which is a measure of its ability to discriminate between small differences in BPA concentration, was found to be equal to 0.004111 Ω/mM. The limit of detection (LOD), which gives the minimum concentration of BPA that can be detected at a known confidence level, was calculated to be 0.42 Mm.

As also demonstrated in FIGS. 3.20A&B, differential capacitance of the E-MIP film was found to increase linearly with concentration of BPA. This denotes successful immobilization of BPA onto the cavities formed within the E-MIP sensor film. It is based on the assumption that the change in capacitance is due to the permeation of BPA molecules into the cavities formed within the film.[47] A relatively good linearity ($r^2$=0.97778) was obtained from the plot of differential capacitance with this concentration range of BPA. The observed changes on the capacitance can be correlated to the ratio of the dielectric constant to the thickness of the polymer film. The permeation of BPA may have resulted in the corresponding increase in the dielectric constant of the polymer film causing the increase in capacitance values.[48] The eventual change in the thickness of the imprinted copolymer film upon rebinding of BPA may also be attributed to the changes in the structural properties such as porosity or mechanical of the copolymer films which usually accompanies the absorption process.[48] Both variables are associated with the packing structure of the polymer films deposited on the ITO surface. Jennings et al.[48] attributed higher packing density and conformational order to surfaces possessing a) a smaller dielectric constant due to the exclusion of polar solvent molecules from the hydrophobic surface and b) a thicker film due to a correspondingly smaller tilt angle.

Recognition Selectivity of BPA Imprinted Polymer

The selectivity of the BPA-imprinted polymer was investigated by exposing the E-MIP polymer film to increasing concentrations of bisphenol AF and diphenolic acid. The structures of these compounds are similarly related to that of the structure of bisphenol A. Diphenolic acid has a carboxylic acid group while bisphenolic AF contains several fluorine atoms. Their chemical structures are shown in FIGS. 3.21A&B and their observed changes in capacitance and charge transfer resistance are shown in FIGS. 3.21C&D. EIS data show that there was a dramatic change in the electric response of the polymer films to these competing molecules. The polymer films used for this experiment manifested insulating properties as displayed in the Bode phase and total impedance magnitude plots shown in FIG. 15A-C. Hence, the films can be regarded as near-ideal capacitor and thus the data pertaining to capacitance and charge transfer resistance can be obtained by fitting it to a simple series $R_1(R_2C_1)$ equivalent circuit. The Nyquist plots of bisphenolic AF and diphenolic acid are more similar to the NIP films. Unlike the Nyquist plots of the BPA which showed that the radii of the semi circles decrease linearly with increasing concentration of BPA these plots showed only a straight plot with some deviation in linearity at lower concentrations, FIGS. 3.22A&B. It is assumed that only the original template (bisphenol A) molecules were able to penetrate and bind with the cavities present within the imprinted polymer network. On the other hand, the binding (or non-binding) of bisphenolic AF and diphenolic acid with the E-MIP resulted only in a very small change in the impedance values unlike with the original BPA template (FIGS. 3.18A&B). This provides support to the assumption that the E-MIP film was impermeable to these analogous molecules.

Comparing the response of the bisphenol A selective E-MIP/EIS sensor to bisphenol AF and diphenolic acid, it can be derived from (FIG. 3.21, FIG. 3.22) that the polymer film's capacitance did not change in the presence of increasing concentrations of these analogs. However, the capacitance values obtained after the rebinding of these analogs were found to be higher than the capacitance values obtained from the rebinding of BPA. This suggests the possible occurrence of some non-selective binding as the films exhibited a small resistance to penetration of these analogs.

The charge transfer resistance noted during the binding of the competing molecules accounts for the inherent electrochemical activity of the polymer film. This could represent some of the diffusion-limited processes occurring at the polymer film-electrode interface. Plot of charge-transfer resistance versus concentrations of the diphenolic acid indicates non selective binding at lower concentrations ranging of 0-2 mM concentration, FIG. 3.21. As the concentration was increased, the inability of the film to recognize diphenolic acid becomes more prominent as indicated by an almost constant charge transfer resistance. On the other hand, bisphenol AF can be a potential competitor for the binding of BPA at this concentration range as suggested by the linear plot of charge-transfer resistance against increasing concentrations of BPA. The charge transfer resistance values obtained for the rebinding of bisphenol AF were found to be higher than the charge transfer resistance obtained from the rebinding of BPA. Still, this is indicative of a more efficient rebinding of the original templated BPA molecules to the imprinted polymer surface since the bisphenol AF did not exhibit both diffusion-related and charge transfer-related processes.

Thus, it was demonstrated that the polymer E-MIP films exhibited preference to the original BPA template over bisphenol AF and diphenolic acid and that the EIS techniques has been demonstrated to be an effective technique in assessing the interfacial properties of the E-MIP as well as functioning as a sensor with very good sensitivity and selectivity figures of merit.

Conclusions of Section III

We have demonstrated the application of electrochemical impedance spectroscopy (EIS) in an artificial chemical receptor prepared as E-MIP using electropolymerizable terthiophene and carbazole monomers for the imprinting of bisphenol A, a known endocrine disrupting chemical. The copolymers of bifunctional monomers of —COOH from the carbazole derivative and —OH functional group from terthiophene were found to possess good molecular recognition properties than when these respective monomers were singly electropolymerized. As in any electropolymerized films for sensing applications, a compromise of thickness and efficient formation of pre polymer complexes must be achieved in order to ensure maximum rebinding of the template molecules. Cyclic voltammetry offers a simple means of depositing sensor films directly onto substrate surfaces while the EIS techniques provides a versatile means of measuring the amount of template bound to the polymer matrix. Moreover, in this study, the EIS has been demonstrated to give extensive information related to the permeability and thickness of the polymer material deposited on the surface that may be used in advancing technologies relating to sensing via reversible surfaces through electric potential control and to development of dynamic surfaces for advanced sensing technology.

REFERENCES CITED IN SECTION III

The following references are cited in this section.
1 Yoshida, T.; Horie, M.; Hoshino, Y.; Nakazawa, H. *Food Addit. Contam.* 2001, 18, 69-75.
2 Cao, X-L.; Corriveau, J.; Popovic, S. *J. Agric. Food Chem.* 2009, 57, 1307-1311.
3 Malitesta, C., Losito, I. and Zambonin, P. G. *Anal. Chem.* 1999, 71, 1366-1370.
4 Dickert, F. L., Hayden, O., and Halikias, K. P. *Analyst,* 2001, 126, 766-771.
5 Piletsky, S. A., Terpetschnig, E., Andersson, H. S., Nicholls, I. A. and Wolfbeis, O, S. *Fresenius J. Anal. Chem.,* 1999, 364, 512-516.
6 Lin, J. M. and Yamada, M. *Analyst,* 2001, 126, 810-815.
7 Apodaca, D.; Pernites, R.; Ponnapati, R.; Del Mundo, F.; Advincula, R. *ACS Applied Materials and Interfaces* 2011, 3 (2), 191-203.
8 (a) Pernites, R.; Ponnapati, R.; Advincula, R. *Macromolecules* 2010, 43 (23), 9724-9735. (b) Pernites, R.; Ponnapati, R.; Felipe, J.; Advincula, R. *Biosensors and Bioelectronics* 2011, 26 (5), 2766-2771.
9 Wu, X. and Shimizu, K. D. in Molecular recognition and polymers: control of polymer structure and self-assembly, Rotello, V. and Thayumanavan, S. 2008, pp. 397, John Wiley and Sons, New Jersey.
10 Schweitz, L. *Anal. Chem.* 2002, 74, 1192-1196.
11 Sellergren, B.; Ruckert, B.; Hall, A. J. *Adv. Mater.* 2002, 14, 1204-1208.
12 Malitesta, C.; Losito, I.; Zambonin, P. G. *Anal. Chem.* 1999, 71, 1366-1370.
13 Foulds, N. C.; Lowe, C. R., *J. Chem. Soc., Faraday Trans.* 1, 1986, 82, 1259-1264.
14 Taranekar, P.; Fulghum, T.; Baba, A.; Patton, D.; Advincula, R. *Langmuir* 2007, 23, 908-917.
15 Nalwa, H. S. (Ed.), Handbook of Organic Conductive Molecules and Polymers, John Wiley and Sons, New York, 1997.
16 Roncali, J. *Chem. Rev.* 1992, 92, 711-738.
17 (a) Welzel, H. P.; Kossmehl, G.; Schneider, J.; Plieth, W. *Macromolecules,* 1995, 28, 5575-5580; (b) Zhang, W.; Dong, S., *J. Electroanal. Chem.* 1990, 284, 517; (c) Atta, N. F.; Galal, A.; Karagozler, A. E.; Russell, G. C.; Zimmer, H.; Mark, H. B., *Biosens. Bioelectron.* 1991, 6, 333-341.
18 (a) H. Hoegl, O, Su, W., Neugebauer, EU Patent (1957) 1068115. (b) Hoegl, H. *J. Phys. Chem.* 1965, 69, 755.
19 Koyuncu, S.; Kaya, I.; Koyuncu, F. B.; Ozdemir, E. Synthetic *Metals* 2009, 159, 1034-1042.
20 (a) Grazulevicius, J. V.; Strohriegl, P.; Pelichowski, J.; Pelichowski, K. *Prog. Polym. Sci.* 2003, 28, 1297. (b) Grigoras, M.; Antonia, M. C. *Eur. Poly. J.* 2005, 41, 1079. (c) Kimoto, A.; Cho, J. S.; Higuchi, M.; Yamamoto, K. *Macromolecules* 2004, 37, 5531. (d) Stephan, O.; Vial, J.-C. *Synth. Met.* 1999, 106, 115.
21 Schopf, G. and Koβmehl, G. Polythiophenes-Electrically Conductive Polymers, Springer, Berlin, 1995.
22 Taranekar, P.; Baba, A.; Fulghum, T. M.; Advincula, R. C. *Macromolecules,* 2005, 38, 3679-3687.
23 (a) Blanco-Lopez, M. C.; Lobo-Castanon, M. J.; Miranda-Ordieres, A. J.; Tunon-Blanco, P. *Trends Anal. Chem.* 2004, 23, 36-48; (b) Piletsky, S. A.; Turner, A. P. F. *Electroanalysis* 2002, 14, 317-323; (c) Henry, O. Y. F.; Cullen, D.C.; Piletsky, S. A. *Anal. Bioanal. Chem.* 2005, 382, 947-956.
24 Sellergren, B. Molecularly Imprinted Polymers: Man-made Mimics of Antibodies and their Applications in Analytical Chemistry, Elsevier, 2000.
25 (a) Bi, X.; Yang, K. *Anal. Chem.* 2009, 81, 527-532; (b) Jenik, M.; Schirhagl, R.; Schirk, C.; Hayden, O.; Lieberzeit, P.; Blaas, D.; Paul, G.; Dickert, F. L. *Anal. Chem.* 2009, 81, 5320-5326; (c) Alexander, C.; Andersson, H. S.; Andersson, L. I.; Ansell, R. J.; Kirsch, N.; Nicholls, I. A.; O'Mahony, J.; Whitcombe, M. J. *J. Mol. Recognit.* 2006, 19, 106-180; (d) Jiang, G.; Baba, A.; Advincula, R. *Langmuir,* 2007, 23, 817-825.
26 Millan, M. D.; Locklin, J.; Fulghum, T.; Baba, A.; Advincula, R. C. *Polymer,* 2005, 46, 5556-5568.
27 (a) Cao, C. N. Electrochim. Acta 1990, 35, 831-836. (b) Liu, M.; Zhang, Y.; Wang, M.; Deng, C.; Xie, Q.; Yao, S. Polymer 2006, 47, 3372-3381.
28 Ponnapati, R.; Felipe, M. J.; Park, J. Y.; Vargas, J.; Advincula, R. C. *Macromolecules* 2010, 43, 10414-10421.
29 Taranekar, P.; Fulghum, T.; Baba, A.; Patton, D.; Ponnapati, R.; Clyde, G.; Advincula, R. *J. Am. Chem. Soc.* 2007, 129, 12537.
30 (a) Ulman, A. An Introduction to Ultrathin Organic Films: From Langmuir-Blodgett to Self Assembly; Academic: New York, 1991; (b) Sullivan, J. T.; Harrison, K. E.; Mizzell, J. P. III; Kilbey, S. M. II *Langmuir* 2000, 16, 9797-9803.
31 Taranekar, P.; Park, J. Y.; Patton, D.; Fulghum, T.; Ramon, J. G.; Advincula, R. C. *Adv. Mater.* 2006, 18, 2461-2465.
32 Sezer, E.; Hooren, V. M.; Sarac, S. A.; Hallensleben, L. M. *J. Polym. Sci., Part A: Polym. Chem.* 1999, 37, 379-381.
33 Sauerbrey, G. *Z. Phys.* 1959, 155, 206-222.
34 Yilmaz, E.; Mosbach, K.; Haupt, K. *Anal. Commun.* 1999, 36, 167-170.

35 Choi, S. W.; Chang, H. J.; Lee, N.; Kim, J. H.; Chun, H. S. *J. Agric. Food Chem.* 2009, 57, 1113-1118.
36 Knoll, W. *Annu. Rev. Phys. Chem.* 1998, 49, 569-638.
37 (a) Holdsworth, C. I.; Bowyer, M. C.; Lennard, C.; McCluskey, A. *Aust. J. Chem.* 2005, 58, 315-320; (b) Schwarz, L.; Bowyer, M. C.; Holdsworth, C. I.; McCluskey, A. *Aust. J. Chem.* 2006, 59, 129-134; (c) Schwarz, L.; Holdsworth, C. I.; McCluskey, A.; Bowyer, M. C. *Aust. J. Chem.* 2004, 57, 759-764.
38 Lakowicz, J. R. Principles of Fluorescence Spectroscopy; Plenium Press: New York, 1983.
39 Valeur, B. Molecular Fluorescence: Principles and Applications; Wiley-VCH Verlag GmbH, 2001.
40 Konishi, K.; Takase, E.; Fukunaga, N. *Langmuir* 2011, 27, 1332-1335.
41 Tazuke, S.; Guo, R. K.; Hayashi, R. *Macromolecules* 1988, 21, 1046-1051.
42 Hu, R.; Lager, E.; Aguilar, A. A.; Liu, J.; Lam, J. W. Y.; Sung, H. H. Y.; Williams, I. D.; Zhong, Y.; Wong, K. S.; Peña-Cabrera, E.; Tang, B. Z. *J. Phys. Chem. C* 2009, 113, 15845-15853.
43 Gu, H.; di Su, X.; Loh, K.-P. *J. Phys. Chem. B* 2005, 109, 13611-13618.
44 Katz, E.; Willner, I. *Electroanalysis* 2003, 15, 913.
45 Wang, W.; Zhang, S.; Chinwangso, P.; Advincula, R. C.; Lee, T. R. *J. Phys. Chem. C* 2009, 113, 3717-3725.
46 Park, J-Y.; Lee, Y-S; Kim, B. H.; Park, S-M. *Anal. Chem.* 2008, 80, 4986.
47 Sharma, R.; Henderson, C.; Warren, G. W.; Burkett, S. L. *J. Applied Polym. Sci.* 1998, 68, 553-560.
48 Jennings, G. K.; Munro, J. C.; Yong, T.-H.; Laibinis, P. E. *Langmuir* 1998, 14, 6130.

DETAILED DESCRIPTION OF SECTION IV

Electropolymerized Molecularly Imprinted Polymer (E-MIP) Films of a Bis-Terthiophene Dendron: Folic Acid Quartz Crystal Microbalance Sensing

SUMMARY OF THE INVENTION FOR SECTION IV

A folic acid sensor was prepared via electropolymerized molecularly imprinted polymer (E-MIP) film of a bis-terthiophene dendron on a quartz crystal microbalance (QCM). The cyclic voltammetric (CV) electrodeposition of the imprinted polymer film was monitored by electrochemical QCM or E-QCM, enabling in-situ monitoring and characterization of E-MIP film formation and viscoelastic behavior of the film. A key component of the E-MIP process is the use of a bifunctional monomer design to pre-complex with the template and function as a cross-linker. The complex was electropolymerized and cross-linked by CV to form a polythiophene matrix. Stable cavities were formed which specifically fit the size and shape of the folic acid template. The same substrate surface was used for folic acid sensing. The predicted geometry of the 1:2 folic acid/terthiophene complex was obtained through semi-empirical AM1 quantum calculations. The analytical performance, expressed through the figures of merit, of the sensor in aqueous solutions of the analyte was investigated. A relatively good linearity, $R^2=0.985$, was obtained within the concentration range 0-100 µM folic acid. The detection limit was found to be equal to 15.4 µM (6.8 µg). The relative cross selectivity of the folic acid imprinted polymer against the three molecules follows this trend: pteroic acid (=50%)>caffeine (=41%) >theophylline (=6%). The potential and limitations of the E-MIP method were also discussed.

Introduction for Section IV

Molecular imprinting (MIP) is a technique widely used for the preparation of polymeric materials for molecular recognition.[1,2,3,4] In MIP, the specific interaction of a functional monomer with the template is manifested through the organization of specific binding sites, which usually occur during fabrication of a three-dimensional polymer monolith or film. Regardless of the type of interaction, i.e. whether covalent or non-covalent, the pre-organized interaction creates a geometry that is complementary to the size and shape of the template or target molecule. This enables recognition of the template by the polymer matrix in subsequent rebinding studies or applications. MIP is a valuable component in the preparation of sensors.[5,6,7,8,9,10] The biomimetic properties of MIPs render them attractive as chemical recognition elements in sensors or artificial receptors. For recognition, MIP offers a very promising alternative to natural receptors such as antibodies and enzymes which have relatively poor stability and short shelf life.[11] Due to low cost, ease of preparation, robustness, coupled with a wide choice of templates and functional monomers, and increase in demand in the fields of food analysis, environmental monitoring, pharmaceutical assays, and security monitoring that includes the detection of explosives, chemical warfare agents and illicit drugs,[12] MIP has become one of the most widely used methods for the preparation of sensor films.[13] However, MIP has some limitations which include poor recognition properties in water, long equilibrium binding kinetics, and slow leaching of template from the polymer matrix, which must be addressed appropriately.[13,14]

A main challenge in designing MIP-based chemical sensors is that these materials are usually prepared in bulk as monoliths, thus lack the ability to form a smooth film that is directly interfaced with a transducer or electrode. Other groups have resorted to obtaining bulk polymer films or membranes.[15,16,17,18,19] Another option is surface imprinting by spray coating or spin coating techniques that have been used to obtain thin films on piezoelectric devices.[20] Spin coating in particular often suffers from the following drawbacks: difficulty in depositing high quality films of submicron thickness, tendency to form coating defects (e.g. orange peel effect), poor homogeneity in composition, and unwanted precipitation of the polymer due to premature evaporation of solvents.[21] To this end, direct electrochemical deposition of polymers offers a viable means of introducing the recognition domain as films on the surface of a transducer.[22]

Electrodeposition of polymers is a method for directly adsorbing an electropolymerized material on an electrode interface.[23] Electrodeposition of polymers is accomplished by either anodic or cathodic electropolymerization. These methods can be distinguished in terms of a radical cation[24] (anodic) and a radical anion (cathodic) mechanism. Also electrodeposition, in contrast with the usual bulk polymerization, eliminates the need for rigorous synthesis and film preparation typically required by spin or solvent casting techniques. Film thickness and composition can be easily achieved by controlling the electrochemical parameters in cyclic voltammetry (CV) or potentiostatic deposition methods. Film thickness directly affects the sensor's response time and hence, is a critical controlling factor for most sensing applications.[25]

Polythiophenes have been one of the most notable among p-conjugated polymers[26] because of its intrinsic electrical conductivity, stability, and processability in both doped and neutral states.[27] Like polypyrrole and polyaniline, polythiophenes can be both oxidatively or reductively doped in a proper solvent.[28] The presence of sulfur in polythiophenes also enables it to be reduced and thus n-doped.[28] Significantly, polythiophenes can be straightforwardly synthesized using anodic electrodeposition techniques. There have been a number of studies conducted on electrochemically prepared polythiophene films for sensing applications.[29,30] Other than sensors, the high interest on polythiophene materials is its potential for various applications such as smart coatings, organic light-emitting diodes (OLED)s, photovoltaics, and electrochromic windows.[31]

Though a range of MIP-based chemosensors have already been devised[32], the electrochemical approach in tandem with the MIP process has not been largely explored because of issues pertaining to homogeneous film formation and difficulty in in-situ characterization.[33] Also, the possible interference or degradation of the template/analyte with the electropolymerization process is a main concern. It is important therefore to develop an MIP method in which the template can be protected and an in-situ monitoring method be employed to characterize the MIP process. Although it is possible to monitor the MIP process primarily by electrochemical analysis (current versus potential or I-V) measurements, hyphenated techniques with quartz crystal microbalance (QCM)[34] and surface plasmon resonance spectroscopy (SPR)[35] is attractive. Electrochemistry coupled with QCM, which is also known as E-QCM as well as electrochemistry in tandem with SPR or simply termed as E-SPR should enable the in-situ growth monitoring of the MIP films on a gold electrode surface.[36] For E-QCM, the frequency (mass) and the viscoelastic behavior of the film can be monitored simultaneously during electrodeposition.[37] At the same time, the I-V or I-T (current versus time) measurements can be made since the Au-QCM electrode is also a working electrode for a three-electrode cell electrochemical set-up.

Folic acid (also known as folacin and folate) is an important nutrient for the human body as it plays an essential role in the synthesis of purines, pyrimidines for DNA and in cell replication. By chemical structure, it belongs to a group of heterocyclic compounds based on 4-[(pteridin-6-ylmethyl)amino]benzoic acid structure. It plays a vital role in tissue growth and formation of red blood cells. A number of studies have focused on its ability to act as an optimal targeting ligand for imaging and cancer therapy.[38] Folic acid is known to exhibit high affinity to folate receptors ($K_d \sim 10^{-10}$ mol/L) which makes it very attractive for targeting cytotoxic agents.[39]

As a nutraceutical additive, folic acid is also routinely measured in food and biological samples. There is a need to monitor its concentration in fortified foods in compliance with government regulations and product monitoring.[40] The standard microbiological assays commonly used for routine analysis of folic acid are based on light scattering dispersion of the flocculent growth of the organisms *L. helveticus* and *Streptococcus faecalis* in a folate-enriched media.[41,42] However, these are not sensitive to various chemical forms of the vitamin.[43] Others have used a wide range of analytical techniques, including polarographic methods which is the official method used in Russian pharmacopoeia.[44] Fluorimetric procedures have found useful application in determining folic acid in natural extracts and yeasts.[45] A colorimetric method based on color development with 1,2-naphthoquinone-4-sulfonic acid, sodium salt, has been used successfully for assaying folic acid tablets containing folic acid alone or in combination with iron and vitamin $B_{12}$.[46]

In this study, E-MIP films based on polyterthiophenes were used to generate a folic acid QCM sensor. In principle, the E-MIP film serves as a chemical recognition element directly interfaced with QCM transduction for subsequent quantification based on frequency shift and resistance response. On the other hand, the gold surface of the QCM is also a working-electrode in a three-electrode electrochemical cell set-up. It is important to have the monomer complexed with the analyte together with a cross-linker. In this case, a bis-terthiophene or bifunctional monomer derivative, 3,5-bis(2-(2,5-di(thiophen-2-yl)thiophen-3-yl)ethoxy)phenyl)methanol, a dendron and simply referred to as G1-3TOH was synthesized. A key feature of this design is that the $AB_2$ dendron acts both as a monomer complexing agent and cross-linker for the MIP process. This interaction was modeled by semi-empirical AM1 quantum calculation method. Another important consideration is to monitor the deposition of the folic-acid bis-terthiophene complex as it forms a polythiophene MIP matrix film.[28] This condition was largely accomplished by employing the hyphenated E-QCM set-up. After electrodeposition, the analytical performance of the sensor, quantified through the figures of merit, was determined in water/acetonitrile (9:1, v/v) solution of folic acid. The E-MIP film was also found to exhibit comparatively high selectivity towards folic acid against structurally similar analogues. Moreover, E-MIP film preparation has been shown to be simple, reproducible, and their performance more robust than standard microbiological based assays.

Experiments of Section IV

Chemical

Folic acid, tetrabutylammonium hexafluorophosphate (TBAH) and pteroic acid were purchased from Sigma-Aldrich (St. Louis, USA). All chemicals were used as received. Aqueous solutions were prepared from water purified using a Millipore (Massachusetts, USA) system (resistivity 18.2 MΩ·cm). The G1-3TOH $AB_2$ dendron was synthesized according to a literature procedure previously reported.[37] Briefly, ethyl-3-thiophene-3-acetate was used as the starting material to produce a G0-3TOH monomer. This was then subjected to a modified Mitsunobu etherification reaction accompanied with sonication to give the G1-3T ester monomer. The G1-3T ester was then reduced using lithium aluminum hydride to produce the G1-3TOH monomer as a pale yellow solid in 90% yield. In principle, the dendron synthesis can be carried out to succeeding generations, G2, G3, G4 . . . as needed in an $AB_2$ convergent manner.

Instrumentation

Cyclic voltammetry was performed on an Amel 2049 Potentiostat and Power Lab system (Milano, Italy) with a three-electrode cell. The conditions and parameters for the procedure are specified in the Discussion and Results section since they vary with the experiments. EChem Windows was used to run data acquisition. This electrochemical set up is attached to a Research Quartz Crystal Microbalance or RQCM obtained from MAXTEK, Inc. (now Inficon Corp., New York, USA). The gold surface of the QCM was used as the working electrode in the three-electrode electrochemical cell set up. The instrument is equipped with a built in phase lock oscillator and is controlled using the RQCM Data-Log Software. Prior to electropolymerization, a standard AT-cut, 5 MHz, 1-inch diameter polished quartz crystal was cleaned in piranha solution for 60 sec ($H_2O_2/H_2SO_4$, 1:3, v/v) and was then subjected to plasma cleaning using a March Plasmod GCM 200 (Calif., USA) for 150 sec at 10 watts with Ar gas purge. Caution Piranha solution is highly corrosive and reacts violently with organic compounds; extreme precaution must be observed in handling this solution. QCM sensing was done by monitoring actual kinetic curves. A typical measurement for comparison was done with 100 µM of folic acid in water:acetonitrile 9:1, v/v, unless various concentrations were specified for sensitivity studies. The QCM curve was recorded three times with an average deviation of 5% from the shape of the curves, i.e. until a plateau is obtained, before choosing the final representative plot. The surface morphology was studied using Atomic Force Microscopy (AFM) imaging, performed in ambient air with a PicoScan SPM system (Molecular Imaging, now Agilent Technologies, Calif., USA) equipped with 10×10 µm² scanner. Magnetic-AC (MAC) mode and/or tapping mode were used for all the AFM images.

Commercially available tapping mode tips (TAP300, Silicon AFM Probes, Ted Pella, Inc., Calif., USA) were used on cantilevers with a resonance frequency ranging from 290 to 410 kHz. For X-ray Photoelectron Spectroscopy (XPS), photo-electrons were collected on a Physical Electronics Model 5700 XPS instrument (Minnesota, USA) using a monochromatic Al-Kα x-ray source (1486.6 eV) operated at 350 W. The analyzed area, collection solid cone and take off angle were set at 800 mm, 5° and 45° respectively. A pass energy of 11.75 eV was employed resulting to an energy resolution of better than 0.51 eV. All spectra were acquired in vacuum (5×10$^{-9}$ torr or better) and at room temperature. A Shirley background subtraction routine was applied throughout the experiment. The binding energy scale was calibrated prior to analysis using the Au 4f$_{7/2}$ line. Charge neutralization was ensured through co-bombardment of the irradiated area with an electron beam. Data processing was carried out using the Multipak™ software package. Ellipsometry measurements were conducted using the OPTREL-Multiskop (Bavaria, Germany) at an angle of 60° with respect to the surface normal and at a fixed wavelength of 632.8 nm. Δ and ψ values were obtained for the polymer films and the clean gold coated quartz crystal surface. The ellipsometry data were then fitted using a fitting program (Elli, Optrel), assuming a refractive index (RI) of 1.5 for the polymer layer.[48]

Modeling studies were performed to determine the extent of interaction that exists between the G1-3TOH monomer and folic acid. The extent of such interaction is quantified through calculated free energy changes exerted by the interacting molecules. Specifically, equilibrium geometry calculations at the ground state using the semi-empirical method, AM1 was carried out using Spartan 08 (Wavefunction, Inc., California, USA). It is based on the neglect of diatomic differential overlap integral approximation. Specifically, it is a generalization of the modified neglect of differential diatomic overlap (MNDO) approximation in which the central approximation asserts that the atomic orbitals residing on different atomic centers do not overlap, thus reducing overall computations. Single point calculations were also performed using the same theoretical model on the separate folic acid and monomer components in order to determine if the observed differences in the enthalpy of formation, $\Delta H_f$ were induced by monomer-monomer interactions. Energy minimization was performed to obtain the initial geometries of each individual molecule and of folic acid-G1-3TOH complexes. This procedure was performed before submitting each structure for final geometry optimization. Also, global minimum search was included in setting up each calculation.

The reliability of the E-MIP film as a receptor may also be gauged by the relative rigidity of the template. As shown in Table IV.3, the interaction of two dendron units with folic acid brought about a favorable calculated ΔE value of −605.504 kJ/mol, indicate a suitable template conformation for pre-polymer complexation. It is also noteworthy to emphasize that the calculated ΔE value for the folic acid in a 1:2 molar ratio, did not deviate largely from the calculated heat of formation for an isolated folic acid molecule. This means that a reasonable number of solution conformation/complexes are formed (less heterogeneity in binding sites), which will eventually yield greater homogeneity in E-MIP/folic acid affinity due to higher levels of specific but similar type of binding sites. Table IV.1 summarizes the calculated energies for the different folic acid/G1-3TOH complex systems.

TABLE IV.1

Calculated energies (kJ/mol) of G1 3TOH/Folic acid interactions through AM1 semi calculations using Spartan 08 software, Wavefunction, Inc.

| Molar ratio, G1-3TOH/ Folic acid | Heat of Formation of complex | ΣE of components | Single point calculations of heat of formation of G1-3TOH:G1-3TOH interactions | ΔE of Folic acid from complex |
|---|---|---|---|---|
| 1:1 | −344.999 | −332.266 | 262.651 | −594.917 |
| 1:2 | −107.419 | −66.871 | 538.633 | −605.504 |
| 1:4 | 402.054 | 464.463 | 1059.380 | −594.917 |

Heat of formation of an isolated folic acid molecule = −594.918 kJ/mol; Heat of formation of a single unit of G1-3TOH monomer = 262.651 kJ/mol Briefly, just to give information on the values indicated in Table IV.1, the first column of values is the energy (heat of formation) of the optimized geometry of the complex formed by the interaction of folic acid with varying numbers of G1-3TOH units. On the other hand, the second column contains the sum of the energies of the individual components which make up the complex: ΣE (heat of formation) =ΣE G1-3TOH units+E folic acid molecule. The third column gives the single point energy of the G1-3TOH units calculated at different ratios while the 4$^{th}$ column shows the energy of the folic acid molecule extracted from the optimized geometries for each folic acid:G1-3TOH molar ratio.

NMR spectra were recorded on a 1H 400 MHz General Electric QE 300 spectrometer (Colorado, USA). UV-Vis spectra were recorded using Agilent 8453 spectrometer (California, USA).

Results and Discussion of Section IV

Surface Imprinting by In Situ Electrochemical-Quartz Crystal Microbalance

The formation of the non imprinted and folic acid-imprinted polymer films was monitored in-situ on the surface of a Au-quartz crystal electrode by E-QCM. The E-QCM technique allows the preparation of films with varying thickness by changing the CV parameters and enables the direct deposition of the imprinted and non imprinted polymer films onto a piezoelectric transducer surface. As shown schematically in FIG. 4.1, a three-electrode electrochemical set up was attached to the Kynar QCM cell connected to a potentiostat. Ag/AgCl, platinum (Pt), and the Au-quartz crystal were used as the reference, auxiliary, and working electrodes, respectively. Polymerization was conducted by cycling the potential from 0V to 1.1V at a scan rate of 500 mV/s for twenty times (20 cycles). The MIP film was prepared from a 200 μM solution of G1-3TOH and 100 μM folic acid complex in acetonitrile (ACN) containing 0.1 M of tetrabutylammonium hexafluorophosphate (TBAH) as supporting electrolyte. A control polymer film, i.e. the non-imprinted polymer (NIP) film, was prepared under the same conditions but in the absence of the template (folic acid). A brown (rust-like) colored film was obtained from the electrochemical polymerization of G1-3TOH, with and without the template. Essentially, the brown color represents the absorption properties of a polythiophene film.[37]

Film formation was monitored through the changes in the current per cycle as shown in FIGS. 4.2A&B. At each CV cycle, the oxidation current increases, suggesting a stepwise growth of the polymer film.[49] The electrochemical polymerization represents an intra- and inter-molecular reaction between the terthiophene units. For clarity, the term polymerization indicates the formation of linear polymeric or oligomeric species mainly coming from free terthiophene or bis-terthiophene units. The term cross-linking is referred mostly to the reaction of the terthiophene units in the template-dendron complex. The presence of folic acid as template facilitated the creation of a polyterthiophene-based E-MIP film, which is complementary to the use of linear polythiophene for molecular recognition.[50] As a result, binding cavities, templated by the size and shape of folic acid, were formed and were used for subsequent detection of this analyte.

It was further noted that initially, two peaks seem to be observed for both voltammograms which eventually evolved into one single peak at higher CV cycles. This could represent initially a two-electron oxidation process which later transitioned into a one electron process. This behavior changes with the use of different solvents and/or temperature and can also be kinetically induced.[51] It is similar to what has been previously observed with polyterthiophene electrodeposition from a precursor polymer.[37] The NIP film also deposited more materials per cycle as compared to the E-MIP film, depicted by a fairly larger change in the anodic peak current. Table IV.2 provides a summary of the electrochemical data obtained for the deposition of MIP and NIP polymer films on the QCM gold surface.

TABLE IV.2

Anodic and Cathodic Currents and Potentials of Imprinted and non Imprinted Polythiophene Films

| Polymer film | $E_{pa}$ (V) | $i_{pa}$ (mA) | $E_{pc}$ (V) | $i_{pc}$ (mA) | ΔE (V) |
|---|---|---|---|---|---|
| Imprinted film | 0.90 | 0.10 | 0.82 | −0.075 | 0.08 |
| non imprinted | 0.78 | 0.125 | 0.72 | −0.125 | 0.06 |

$E_{pa}$ refers to anodic peak potential while $E_{pc}$ pertains to cathodic peak potential. $i_{pa}$ and $i_{pc}$ refer to anodic peak current and cathodic peak current, respectively. Net potential change is represented by ΔE.

While CV clearly illustrates the successful deposition of E-MIP films, interfacing it with QCM permits the correlation of electrochemically induced mass changes on the quartz crystal electrode per CV cycle.[52] Simultaneous with the reduction and oxidation peaks on the voltammograms, the changes in the frequency of the quartz crystal electrode was also obtained from the QCM, which in turn, can be translated into the corresponding deposited mass arising from polymer film formation, through the Sauerbrey Equation IV.1.[53]

$$\Delta f = -2 f_0^2 \Delta m / A (\rho_q \mu_q)^{1/2}$$

where $f_0$ is the fundamental resonant frequency of the QCM (5 MHz), A is the area of the electrode (1.327 cm$^2$), $\rho_q$ is the density of the quartz (2.65 g/cm$^3$), and $\mu_q$ is the shear modulus of the quartz (2.95×106 N/cm$^2$). The negative sign in the equation signifies that as the film is deposited on the gold surface of the QCM crystal during electropolymerization, the corresponding frequency of the crystal decreases.[37] Moreover, this equation can also be used in translating the changes in frequency observed during the doping and de-doping process (oxidation and reduction) to mass transport. To clearly illustrate the doping and de-doping process, during the anodic cycle (oxidation), the polyterthiophene film is deposited simultaneously with doping of hexafluorophosphate counterions which constitutes a corresponding decrease in the frequency due to an increase in mass. On the other hand, during the cathodic cycle (reduction), the change in the frequency (increase) is due to de-doping of ions, indicating a decrease in mass.[37]

As shown in FIGS. 4.3A&B, as the electropolymerization progresses, the change in the amplitude of the oscillator became more pronounced. At the end of the 20$^{th}$ cycle for the MIP, the change in frequency has reached −187.5 Hz as compared to −213.75 Hz for the NIP control polymer film. These correspond to a higher surface mass density for the control NIP film relative to the imprinted MIP film, i.e. 3.5 μg/cm$^2$ ($A_q$=1.327 cm$^2$) against 3.1 μg/cm$^2$. A plot of change in mass deposited at each cycle is given as shown in FIGS. 4.3A&B. What is common for both MIP and NIP film is that the mass deposition is well behaved and gives a linear growth rate coincident with a highly reversible redox behavior.

In E-MIP, the viscoelastic property may be an important issue for the polymer matrix, which provides support for the formation of binding sites and access by the analyte. Coupling the electrodeposition process with the QCM technique enables determination of the changes in the damping resistance. A change in the damping resonant resistance usually accompanies changes occurring on the surface of the quartz crystal such as adsorption, antibody-antigen interaction, and others. Thus, we attempted to correlate viscoelastic property changes concomitant with the electrochemical polymerization process as shown in FIG. 4.4. Changes on the motional resistance, ΔR, can be used to validate the formation of a structured template-complex and film thermo-mechanical stability. E-MIP films may be gauged as stable if it is rigid enough to maintain the structure of the cavities after template removal, yet elastic enough or porous to allow high re-uptake of template. This should be possible with the right balance of linear polymerization and cross-linking reactions during the imprinting process.

We obtained a plot of ΔR as a function of ΔF for the imprinted E-MIP and control NIP film under the same conditions: 20 cycles and 0.1 M concentration in TBAH as shown in FIG. 4.5. The results show that as the polymer film grows by CV, a smaller ΔR vs ΔF change is observed for the MIP compared to the NIP film. Assuming that the template-dendron complex (pre-polymer interaction[54]) has been preserved during the electropolymerization process, this indicates a more rigid film compared to the NIP, which does not incorporate any template molecule. The reaction is primarily dominated by cross-linking of the terthiophene units both inter- and intra-template.[55] During cycling in acetonitrile (termed as template solvation), the functional groups responsible for the template-dendron interactions should retain its stable arrangement, e.g. stable H-bonding arrangement, since the polar acetonitrile is not expected to disrupt the stronger donor-acceptor H-bond pairing of the template-dendron complex. If this is the case, then the MIP film deposited on the gold surface should retain the shape and subsequently the cavity of the template. The fact that the MIP contains less amount of the terthiophene/volume, but still retained a rigid viscoelastic response compared to NIP suggests that this template-dendron complex was effective in making the terthiophenes available for crosslinking[47] thus, yielding a high number of fidelity sites for binding.[57] On the other hand, more linear polythiophene species will then be expected from the NIP film, which would mean less thermosetting properties of a cross-linked system. The result is a more lossy film behavior. The CV behavior verifies the formation of more linear polythiophene species for the NIP as discussed previously based on differences in the onset oxidation potential and current/cycle.

The demonstrated differences in structural rigidity between the MIP and NIP films may also be validated by the difference in mass density, with the NIP film having a higher surface mass density. The template-dendron complex in the MIP enables efficient crosslinking ability for the terthiophene but at the same time, reduces the amount of material deposited because the film becomes more insulating early on. In this case, the film becomes more resistant early, i.e. increase in heterogeneous electron-transfer kinetics, current-resistance or IR drop of the film ($V_{total}=V_{across\ film}+I(R_{film}+R_{soln})$), and a decrease of the film conductivity.[58] This situation is favorable with the E-MIP film since a high ratio of effective imprinted sites on the sensor surface is created.[57]

Optimization by Using the In Situ E-QCM Method

The in situ E-QCM method is a convenient technique for introducing and monitoring E-MIP deposition directly on the surface of an electrode/transducer. For sensing applications, optimizing the film/transducer interface requires a large surface/volume ratio capable of providing fast rebinding kinetics[59] and should be robust and even reusable. Interplay between surface mass density and thickness may also have an effect on the film's response toward template molecule incorporation. A thick film will cause deep embedding of binding/active sites, resulting to poor removal of the template as well as to poor accessibility of the cavities for diffusion.[60] Thus, to further explore this potential and utilize the capabilities of in situ E-QCM monitoring, we directed our efforts to optimizing the parameters commonly associated with electrochemical deposition. Particularly, we have looked into the effect of the following parameters: template-monomer ratio, scan rate, and thickness on the resulting E-MIP film using the relationship of ΔR vs ΔF.[61] Consequently, we correlated the viscoelastic properties to explain the observed sensitivity and selectivity toward folic acid by the E-MIP film.

In view of the results obtained from optimization experiments (relevant data shown in FIG. 4.6, FIGS. 4.7A&B and FIGS. 4.8A&B, Table IV.3, it may be expressed that an ideal E-MIP film should be a compromise between the right viscoelastic behavior and electropolymerization conditions (e.g., template-monomer ratio, scan rate, solvent) to effect template removal and analyte rebinding.

TABLE IV.3

Data on the Surface Mass Density, Thickness, and Contact Angle of the Imprinted Polymer Films Prepared at Different Scan Rates

| Film Samples | Surface Mass Density µg/cm² | Thickness* nm | Contact angle θ |
| --- | --- | --- | --- |
| @ 500 mV/s | 1.1 | 25.5 ± 3.2 | 60.4 ± 1.3 |
| @ 200 mV/s | 5.5 | 41.2 ± 3.1 | 63.0 ± 3.3 |
| @ 100 mV/s | 8.6 | 22.4 ± 0.8 | 67.1 ± 3.3 |

*determined by ellipsometry

At the same time, this should be thin enough to have very good coupling with the transduction mechanism and analyte access. This compromise seemed to have been achieved by the following conditions: 1:2 template-monomer ratios, scan rate of 500 mV/s, using a 200 µM solution of G1-3TOH and 100 µM folic acid complex in acetonitrile containing 0.1 M of TBAH as supporting electrolyte, and finally a thickness of ~25 nm. From henceforth, all films prepared for further studies on sensitivity and selectivity of the MIP films was done using these conditions.

Theoretical Modeling of the Template-Monomer Complex

To further confirm the importance of the 1:2 template-dendron ratio previously discussed, a theoretical model of the 1:2 folic acid/G1-3TOH complex was obtained from semi-empirical AM1 calculations using Spartan 08 as shown on FIG. 4.9. This predicts the possible arrangement of the dendrons and template within the network (FIG. 4.10A&B and Table IV.1). The interaction energy between G1-3TOH and folic acid was obtained from calculated heats of formation using Equation (IV.2):

$$\Delta E = E_{folic\ acid/G1-3TOH\ complex} - [E_{G1-3TOH} + E_{folic\ acid}] \quad (IV.2)$$

A negative value for ΔE denotes favorable interaction between the monomer and the target analyte.[62] The calculated interaction energy for such conformation or arrangement of the G1-3TOH/folic acid complex is −53.8785 kJ/mol, suggesting that a relatively stable complex is formed between G1-3TOH and folic acid. As displayed in the space filling figure, the two monomer units of G1-3TOH are arranged in an intertwined manner, creating a cross linkable conformation with the folic acid (template) being sandwiched by these monomer units. The proposed arrangement of molecules may have been made possible by an H-bonding interaction providing such stability to the formed complex between G1-3TOH and folic acid. In particular, a favorable donor-acceptor H-bonding between the oxygen atoms in the HO— of the G1-3TOH monomer and the hydrogens of the amine groups of the template (folic acid) are possibly formed as implied by the calculated bond distances. To effect H-bond formation, calculated bond distances due to H-bonding (represented by broken lines) must be less than or equal to 2.00 Å. The calculated bond distances for the H-bonds formed between atoms of G1-3TOH and folic acid were found to be as follows: 1.755, 1.916 and 2.028 Å.

To further affirm template-monomer interactions in a folic acid-terthiophene dendron system, NMR and UV-Vis studies[63] were also performed. NMR titration experiments have long been widely used in determining protonation sites[64], structure and H-bonding[65], and association constants. In this particular experiment, increasing amount of G1-3TOH monomer was added to a fixed amount of folic acid. The corresponding ¹H NMR spectra were then measured in deuterated dimethylsulfoxide (d⁶-dmso). The interaction of folic acid with the terthiophene dendron was ascertained by noting the ¹H NMR spectral shifts, of hydroxyl, amine and the hydrogenated nitrogen atom moieties of folic acid. It has been reported in a study by Sellergren et. al.[63,66] that amine protonation is supported by an upheld shift in the $^1$H NMR spectrum of folic acid. The shift changes are tabulated in Table IV.4A and IV.4B.

TABLE IV.4A

Experimental NMR Chemical Shifts (In Ppm) Observed upon the Addition of G1-3TOH to a Fixed Amount of Folic Acid

| Functional Group | Folic acid:G1 3TOH ratio | | | |
|---|---|---|---|---|
| (in folic acid) | 1:0 | 1:1 | 1:2 | 1:4 |
| —OH | 11.4402 | 11.4238 | 11.3809 | 11.4363 |
| —NH$_2$ | 2.0490 | 2.0552 | 2.0031 | 2.0581 |
| —NH | 8.1606 | 8.1522 | 8.1071 | 8.1625 |
| —NH | 8.1411 | 8.1328 | 8.0877 | 8.1430 |

Chemical structure of folic acid, highlighting the functional groups to which H-bonding with monomer (G1-3TOH) can be ascribed to.

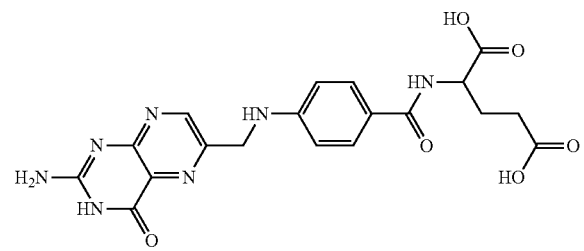 [SMILES: Nc1nc2ncc(CNc3ccc(C(=O)NC(CCC(=O)O)C(=O)O)cc3)nc2c(=O)[nH]1]

TABLE IV.4B

Complexation Induced Chemical Shift Changes, Δδ, Observed upon the Addition of G1-3TOH to a Fixed Amount of Folic Acid (Δδ = Chemical Shift Observed Without G1-3TOH – Chemical Shift Observed in the Presence of G1-3TOH)

| Functional group | Folic acid:G1 3TOH ratio | | | |
|---|---|---|---|---|
| (in folic acid) | 1:0 | 1:1 | 1:2 | 1:4 |
| —OH | ~ | 0.0164 | 0.0593 | 0.0039 |
| —NH$_2$ | ~ | −0.0062 | 0.0459 | −0.0091 |
| —NH | ~ | 0.0084 | 0.0535 | −0.0019 |
| —NH | ~ | 0.0083 | 0.0534 | −0.0019 |

The addition of two monomer units of G1-3TOH with folic acid yielded relatively large and significant changes on the chemical shifts of the above mentioned functionalities.

While the NMR data further support the results of modeling studies, UV-Vis technique was also employed in this study to determine the formation constant for the most favorable template:monomer ratio and to display the binding capacity of the terthiophene dendron. The mole ratio method was employed in this particular experiment. The concentration of G1-3TOH monomer was held constant ($10^{-5}$ M) while that of the concentration of folic acid was varied (1 to 10 μM). The changes in the UV-Vis spectra are shown in FIG. 4.11, and these changes have been translated into a plot of absorbance as a function of G1-3TOH:folic acid ratio, FIG. 4.12. The intersection of the two slopes from the plot implies that 2:1 G1-3TOH:folic acid ratio yields the most pronounced spectral change. It is assumed that in the presence of folic acid, conformational changes may have occurred causing alterations on the disordered, aggregated structure of the terthiophene units. This, in turn, resulted to the observed increase in the absorbance and slight shift of the $\lambda_{max}$.

In summary, modeling studies coupled with NMR and UV-Vis analyses provide important structural or mechanistic information on pre-polymerization template-monomer complexes, which eventually lead to affinity sites in an electropolymerized terthiophene MIP film. The efficiency and selectivity of the resulting E-MIP film are dictated by the number and the relative strength of this pre-polymer complex or template-monomer interactions and hence must be given utmost importance for future E-MIP procedures.

AFM Morphology Studies

The AFM images, as shown in FIG. 4.13A-C, depict the surface topography of the NIP (A), MIP (B) and MIP after template removal (C). The images were taken using a 2×2 μm$^2$ scanned area. The AFM images substantiate the E-QCM data which suggests a successful deposition of polymer film on the gold surface. Though the E-QCM data show that a relatively denser film is obtained in the absence of folic acid, a rather non-homogeneous NIP polythiophene film was observed in the AFM images. This can be explained by the rapid propagation step for the polymerization and precipitation of linear polymer species from the solution.[67] This was also revealed through the observed differences in the roughness of the surfaces (expressed in terms of the RMS value). The NIP exhibited a rougher surface with a calculated RMS value of 1.66 nm as compared to the imprinted polymer with which the template is still incorporated into the polymer network, having an RMS value of 1.38 nm. The roughness of the E-MIP film after washing with methanol/acetic acid is increased though, i.e. RMS value=3.87 nm.

Additionally, the AFM images suggest differences in terms of the electropolymerization mechanism.[68] The electrodeposition of the films should be affected by the presence of the template (folic acid). The effect of the folic acid onto the formation of the polythiophene network may be based on nucleation density. The AFM image of the E-MIP display more grains on its surface as compared with that of the surface of the NIP film. The occurrence of grains may be attributed to the dynamics of the electropolymerization. It is well known that both three-dimensional (3D) nucleation and two-dimensional (2D) instantaneous nucleation are involved with the electrochemical deposition process of thiophene monomers.[69] However, in the case of MIP electropolymerization, more uniform and greater numbers of nucleation sites are initially formed to give a moderately smoother surface relative to the surface of the NIP. In the presence of these nucleation sites, the MIP film grows, as manifested by the increasing size of the domains and aggregates.[70] These grains may be attributed to aggregates formed by the template-dendron pre-complex in solution and extended onto the polymer electrodeposition. Furthermore, the interaction of G1-3TOH with folic acid based on H-bonding and other associated non-covalent interactions induced changes not only on monomer-monomer and monomer-solvent forces, but also on the overall complex aggregate stability in solution. For some compositions and scan rates, the changes in this template-monomer complex could lead to a reduction in the amount of self-aggregation or unsuccessful incorporation of folic acid with the polymer network. The eventual properties of the deposited film such as polymer-polymer entanglement and degree of cross-linking would also account for the ability of the polymer film to swell, thereby affecting the rebinding kinetics. With various solvent washings, these differences could be further highlighted, e.g. AFM image of the film after methanol/acetic acid wash.

Notably, the polymer film should not be excessively swollen so as to cause the collapse of the binding cavities formed during electropolymerization. 2D AFM amplitude and phase images are shown in FIGS. 4.14A-C.

Template Removal Studies by XPS

The XPS was used to confirm the successful incorporation of the template molecule on the imprinted polymer. XPS spectra were obtained from film samples electropolymerized on a gold coated BK7 glass. Folic acid was then removed from the imprinted polymer by dissolution in methanol: acetic acid solution (9:1, v/v), then rinsed with methanol only, to remove traces of acetic acid and subsequently dried under a stream of nitrogen gas. Washing of the polymer film was done repeatedly for six consecutive times or a total washing time of at least 1.5 hours. The NIP which served as control was also treated in the same way as the MIP. We tracked the signal coming from the N 1s electron as a unique marker since this atom can only be associated with the template (folic acid). As shown on the N 1s spectrum of the MIP, a band at about 398-401 eV corresponds to the nitrogen atoms of folic acid in different environments (FIGS. 4.15A&B). Specifically, binding energies 399.3, 398.3, and 395.7 eV correspond to the amine moiety (—$NH_2$), nonhydrogenated (—N=) and hydrogenated (—NH) nitrogen atoms of folic acid, respectively (FIG. 4.16).[71,23] The deconvoluted spectrum also showed band at 405.5 eV which refer to the nitrogen atom of trace quaternary ammonium cation, of the supporting electrolyte that may have been trapped in the MIP film during electrodeposition.[72]

Percentage atomic concentrations of nitrogen in the control (non imprinted), imprinted E-MIP film before and after template extraction are as follows: 0.10, 1.72 and 0.85, respectively. The small percentage of N obtained from the control or non imprinted polymer may be due to the supporting electrolyte used, tetrabutyl ammonium hexafluorophosphate (TBAH) during the electropolymerization process. These counterions may have been trapped within the polymer network even after the dedoping process. Removal of folic acid by methanol/acetic acid washing would only account for 50% of the folic acid present in the polymer network (FIG. 4.15B). It should be possible to optimize template removal using a constant potential-assisted washing procedure. We also calculated the N/S ratio to assess the relative effect of the washing solution on the polymer matrix. Since the percentage atomic concentration of sulfur did not change significantly (before and after template removal the S 2p % atomic concentrations are 9.12 and 8.98, respectively), it can be ascertained that the polymer structure is not greatly affected by the applied methanol/acetic acid washing procedure.

Analytical Performance of the MIP/QCM Sensor

Sensor's Response to Varying Concentrations of Folic Acid

FIG. 4.17A gives the QCM response of the E-MIP against the NIP in folic acid sensing, confirming successful imprinting of folic acid. The imprinting factor can be calculated from the ratio of the folic acid binding capacity on the imprinted E-MIP film to that of the control NIP film.[73] Calculations made using the experimental results yield an imprinting factor of 3.89. The frequency shift as a function of time (kinetics curve) of the QCM is shown in FIG. 4.18.

The MIP film was exposed to varying concentrations of folic acid, i.e. from 0 to 100 µM, noting the extent of frequency shift at each concentration. A calibration curve, illustrated on FIG. 4.17B, was obtained from the plot of the change in frequency as a function of folic acid concentration in µM. As shown in the plot, the imprinting effect is not clearly demonstrated at low folic acid concentrations however starting at 20 µM, the ability of the E-MIP/QCM sensor to distinguish folic acid was efficiently demonstrated. Also, based from the plot, a relatively good linearity was obtained within this concentration range of folic acid with $R^2$=0.985. The detection limit[74] which is defined as the minimum concentration or mass of analyte that can be detected at a known confidence level (multiple k=3 i.e. the confidence level of detection will be 95%) was also calculated. The detection limit for folic acid sensing by the E-MIP film was found to be equal to 15.4 µM (6.8 µg) and was obtained by dividing three times the standard deviation (3σ) with the experimentally determined slope (m) of the calibration plot. Also to verify the importance of the electrodeposition of the 1:2 template-dendron ratio on the E-MIP preparation, the highest frequency shift at −275 Hz was only observed for this composition (FIG. 4.6). Moreover, as with the other compositions of the MIP, the performance was similar to the NIP, only up to −25 Hz shift. Similarly, as previously discussed in the section describing the details of optimization procedures performed, the films prepared at 500 mV/s showed the largest frequency shift at −225 Hz, as compared to the average of −50 Hz for both the MIP and NIP films prepared at lower scan rates (FIG. 4.7). Note that lower scan rates endow formation of a thicker polymer film. This highlighted the importance of the right thickness in achieving optimal sensitivity.

Recognition Selectivity of Folic Acid E-MIP

The selectivity of the folic acid-imprinted polymer was investigated by exposing the polymer film to a 100-µM solution each of caffeine, pteroic acid and theophylline. The structures of these compounds (FIG. 4.19B) are similarly related to that of folic acid. A bar chart, shown in FIG. 4.19A, displays the observed changes in the frequency of the QCM crystal upon exposure of the E-MIP film to each solution of the competing molecule. Interestingly, the most pronounced change in the frequency of the E-MIP/QCM was observed only upon binding of folic acid. The large shift with the frequency denotes that more molecules are bound onto the E-MIP/QCM sensor film, which is mainly due to the rebinding of the template molecule into the imprinted cavities within the polymer matrix. Consequently, data obtained from this plot were used to calculate for the % cross selectivity[75] of the E-MIP film sensor. The efficiency of binding of folic acid to the imprinted cavities is best described by the cross selectivity ratio. The cross reactivity ratio is referred to as the ratio of the change in the frequency of the crystal observed upon binding of the competing molecule, to the change in the frequency when the film was exposed to a solution containing the target analyte i.e. $\Delta f_{x\ molecule}/\Delta f_{folic\ acid}$. The relative cross selectivity of the folic acid imprinted polymer against the three molecules follows this trend: pteroic acid (=50%)>caffeine (=41%)>theophylline (=6%). A significantly small cross selectivity ratio indicates very little and/or absence of interaction between that of the imprinted polymer film and the competing molecule. Hence, among the three molecules subjected to re-binding, theophylline gave the poorest rebinding response with the imprinted polymer film, thus theophylline will not significantly interfere with the sensing of folic acid. Moreover, as shown in FIG. 4.20, the binding of theophylline with the imprinted polymer film was unstable relative to the other molecules, as suggested by a hump in the QCM response, after about 100 minutes of exposure. On the other hand, pteroic acid which also belongs to the pterin family may potentially interfere with the sensing of folic acid.

Determining the Binding Mechanism

Changes in the QCM frequency obtained during the rebinding of different concentrations of folic acid on the imprinted polymer were used to calculate the amount of folic acid that rebinds with the imprinted polymer film. The calculated values were then used to establish the relationship of the surface mass density with folic acid concentration in the bulk. This can be done by employing the Langmuir adsorption isotherm which assumes a monolayer adsorption. The Langmuir equation adopted for this study may be expressed as in Equation (IV.3), $$(\Delta m/A) + (\Delta m_{max}/A) = C/(C+K_d) \quad\quad (IV.3)$$

where $Dm_{max}/A$ is the maximum surface mass density while $K_d$ gives the dissociation constant. However, the binding kinetics of folic acid to the imprinted polymer deviates from the Langmuir model upon fitting of the experimental data. This suggests that the binding of folic acid to the imprinted polymer involve specific-adsorption or multilayer adsorption unlike the Langmuir isotherm which is more general for non-specific adsorption. Instead, we used the Hill equation[76], commonly applied to enzyme-substrate binding, to describe the binding event between folic acid and the imprinted polymer. Equation (IV.4) has been modified to follow the Hill equation, $$\log(\Delta m/A) = n \log [C] - \log K_d \quad\quad (IV.4)$$

where n is a constant, [C] is the concentration of folic acid in μM and $K_d$ is the dissociation constant. Fitting of the experimental data gives the equation, y=1.018x+1.577 ($R^2$=0.975), indicating that cooperativity occurred during the binding of the template with the polymer, commonly associated with enzyme kinetics. Moreover, n obtained is greater than 1 suggesting a positive cooperativity. This implies that once a folic acid molecule binds to the polymer network, its affinity for other folic acid molecules increases. It has been reported in several papers that the pterin ring of folic acid possess the potential to show two H— bonded self assembling patterns.[77] This ability to form self assembling patterns of hydrogen bonds is illustrated in the figure below (Spartan 08, Wavefunction). FIG. 4.21 illustrates what the inventors believe is the cooperative binding among folic acid molecules due to hydrogen bonding.

It can also be seen from the plot that there is a small change on the surface mass density as the concentration of folic acid varies, as manifested by the slightly sigmoidal curve. It could be that the polymer network may possess a flexible structure, induced by the presence of folic acid molecules, making the cavities reversibly accessible to the template for binding. This means that the template has reorganized itself as it approaches the binding sites, allowing for a better fit with the preformed cavities. It must be noted however, that the $K_d$ obtained from the experimental data is relatively large, i.e. 37.76 μM. At some point, folic acid molecules may tend to dissociate and to desorb from the polymer binding sites. This could possibly explain for the reversible binding observed during the rebinding process. FIG. 4.22 shows a plot illustrating the changes on the surface mass density of the polymer film against increasing concentrations of folic acid.

Conclusions of Section IV

On the basis of our results, we have successfully prepared a bis-terthiophene dendron-based E-MIP sensor film for the detection of folic acid with monitoring through an in situ E-QCM. It was found that the relative rigidity of the imprinted polythiophene film, prepared via optimized electropolymerization conditions, is a function of scan rate, template-dendron composition, and thickness. Furthermore, the creation of the binding sites for these artificial receptors would also depend on the affinity of the folic acid towards the terthiophene dendron. This was confirmed through the existence of a favorable pre polymer complex at 1:2 ratio. Conformational changes brought about by complexation and other noncovalent interactions were clearly demonstrated using modeling studies verified with NMR and UV-Vis analyses. Moreover, these tools proved to be vital in determining the nature of interaction, the number of binding sites and the formation constant of the folic acid:G1-3TOH complex so as to permit the fabrication of effective E-MIP films, i.e. exhibiting sensitivity and high selectivity towards the template molecule. A relatively good linearity was achieved ($R^2$=0.985) for the rebinding of folic acid by the E-MIP/QCM film sensor within the concentration range between 0 and 100 μM. The polythiophene-based sensor also exhibited good selectivity towards folic acid as compared with structurally related compounds such as pteroic acid, theophylline and caffeine. Indeed, the observed sensitivity and selectivity of the polythiophene-based E-MIP sensor film towards folic acid is due to optimized template-monomer incorporation in the polymer matrix and the right viscoelastic properties of the film. Moreover, a positive cooperativity occurs during binding of folic acid as verified by semi-empirical quantum calculations. Our current effort is directed towards understanding better the mechanism of binding, with focus on characterizing other electropolymerized imprinted polymers by other transduction methods such as the Electrochemical Impedance Spectroscopy (EIS). Also, we are presently focused on testing this concept of electropolymerized MIP based chemical sensors for various classes of analytes ranging from food adulterant and additives, endocrine disrupting compounds, pesticides, illicit drugs and explosives.

REFERENCES CITED IN SECTION IV

The following references were cited in this section.

1 Shea K. J.; Spivak, D. A.; Sellergren B. *J. Am. Chem. Soc.* 1993, 115, 3368-3369.
2 Yamazaki, T.; Yilmaz, E.; Mosbach, K.; Sode, K. *Anal. Chim. Acta* 2001, 435, 209-214.
3 Vlatakis, G.; Andersson, L. I.; Muller, R.; Mosbach, K. *Nature* 1993, 361, 645-647.
4 Cheong, S. H.; McNiven, S.; Rachkov, K.; Levi, R.; Yano, K.; Karube, I.; *Macromolecules* 1997, 30, 1317-1322.
5 Malitesta, C.; Losito, I.; Zambonin, P. G. *Anal. Chem.* 1999, 71, 1366-1370.
6 Dickert, F. L.; Hayden, O.; Halikias, K. P. *Analyst* 2001, 126, 766-771.
7 Piletsky, S. A.; Terpetschnig, E.; Andersson, H. S.; Nicholls, I. A.; Wolfbeis, O. S. *Fresenius J. Anal. Chem.* 1999, 364, 512-516.
8 Lin, J. M.; Yamada, M. *Analyst* 2001, 126, 810-815.
9 Kriz, D.; Mosbach, K. *Anal. Chim. Acta* 1995, 300, 71-75.
10 Sergeyeva, T. A.; Piletsky, S. A.; Brovko, A. A.; Slinchenko, E. A.; Sergeeva, L. M.; El'skaya, A. V. *Anal. Chim. Acta* 1999, 392, 105-111.
11 Lou, X.; He, P.; Okelo, G. O.; He, L. *Anal. Bioanal. Chem.* 2006, 386, 525-531.
12 Haupt, K.; Mosbach, K. *Chem. Rev.* 2000, 100, 2495-2504.

13 Wu, X., Shimizu, K. D. *In Molecular Recognition and Polymers: Control of Polymer Structure and Self-assembly*; Rotello, V., Thayumanavan, S., Eds.; John Wiley and Sons: New Jersey, 2008; p. 397

14 Allender, C. J. *Adv. Drug. Deliv. Rev.* 2005, 57, 1731-1732.

15 Nopper, D.; Lammershop, O.; Wulff, G.; Gauglitz, G. *Anal. Bioanal. Chem.* 2003, 377, 608-613.

16 D'Agostino, G.; Alberti, G.; Biesuz, R.; Pesavento, M. *Biosensors and Bioelectronics* 2006, 22, 145-152.

17 Piletsky, S. A.; Piletskaya, E. V.; Sergeyeva, T. A.; Panasyuk, T. L.; El'skaya, A. V.; Levi, R.; Karube, I.; Wulff, G. *Macromolecules* 1998, 31, 2137-2140.

18 Pogorelova, S. P.; Bourenko, T.; Kharitonov, A. B.; Willner, I. *Analyst* 2002, 127, 1484-1491.

Sergeyeva, T. A.; Piletsky, S. A.; Brovko, A. A.; Slinchenko, E. A.; Sergeeva, L. M.; Panasyuk, T. L.; El'skaya, A. V. *Analyst* 1999, 124, 331-334.

20 Dickert, F. L.; Hayden, O. *Anal. Chem.* 2002, 74, 1302-1306.

21 Bai, J.; Snively, C. M.; Delgass, W. N.; Lauterbach, J. *Macromolecules* 2001, 34, 1214-1220.

22 Walton, D. J.; Hall, C. E.; Chyla, A. *Analyst* 1992, 117, 1305-1311.

23 Pietrzyk, A.; Suriyanarayanan, S.; Kutzer, W.; Chitta, R.; D'Souza, F. *Anal. Chem.* 2009, 81, 2633-2643.

24 (a) *In The Handbook of Conducting Polymers*; Skotheim, T. A., Ed.; Marcel Dekker: New York, 1986; Vol. 1-2. (b) Asavapiriyanout, S.; Chandler, G. K.; Gunawardena, G. A.; Pletcher, D. *J. Electroanal. Chem.* 1984, 177, 229-244. (c) Morse, N. J.; Rosseinsky, D. R.; Mortimer, R. J.; Walton, D. J. *J. Electroanal. Chem.* 1988, 255, 119-141.

25 Ayad, M. M.; El-Hefnawey, G.; Torad, N. L. *J. Hazard. Mat.* 2009, 168, 85-88.

26 Teasdale, P. R.; Wallace, G. G. *Analyst* 1993, 118, 329-334.

27 Schopf, G., Koßmehl, G. *Polythiophenes-Electrically Conductive Polymers*, Springer: Berlin, 1995.

28 *In Handbook of Organic Conductive Molecules and Polymers*; Nalwa, H. S., Ed.; John Wiley and Sons: New York, 1997.

29 (a) Welzel, H. P.; Kossmehl, G.; Schneider, J.; Plieth, W. *Macromolecules* 1995, 28, 5575-5580. (b) Hagen, G.; Thoresen, A. H.; Sunde, S.; Hesjevik, S. M.; Odegard, R. Mol. Cryst. Liq. Cryst. 1990, 189, 213-219. (c) Zhang, W.; Dong, S. *J. Electroanal. Chem.* 1990, 284, 517-521. (d) Atta, N. F.; Galal, A.; Karagozler, A. E.; Russell, G. C.; Zimmer, H.; Mark, H. B. *Biosens. Bioelectron* 1991, 6, 333-341.

30 (a) Pietrzyk, A.; Kutner, W.; Chitta, R.; Zandler, M. E.; D'Souza, F.; Sannicolo, F.; Mussini, P. R *Anal. Chem.* 2009, 81, 10061-10070. (b) Pietrzyk, A.; Suriyanaraynan, S.; Kutner, W.; Chitta, R. Zandler, M. E.; D'Souza, F. *Biosens. Bioelectron.* 2010, 25, 2522-2529.

31 (a) Sheats, J. R.; Antoniadis, H.; Hueschen, M.; Leonard, W.; Miller, J.; Moon, R.; Roitman, D.; Stocking, A. *Science* 1996, 273, 884-888. (b) Horowitz, G. *Adv. Mater.* 1998, 10, 365-377. (c) Burroughes, J. H.; Bradley, D. D. C.; Brown, A. R.; Marks, R. N.; Mackay, K.; Friend, R. H.; Burns, P. L.; Holmes, A. B. *Nature* 1990, 347, 539-541.

32 (a) Blanco-Lopez, M. C.; Lobo-Castanon, M. J.; Miranda-Ordieres, A. J.; Tunon-Blanco, P. *Trends Anal. Chem.* 2004, 23, 36-48. (b) Piletsky, S. A.; Turner, A. P. F. *Electroanalysis* 2002, 14, 317-323. (c) Henry, O. Y. F.; Cullen, D.C.; Piletsky, S. A. *Anal. Bioanal. Chem.* 2005, 382, 947-956.

33 Sellergren, B. *Molecularly Imprinted Polymers: Man-made Mimics of Antibodies and their Applications in Analytical Chemistry*; Elsevier; 2000.

34 (a) Marx, S.; Zaltsman, A.; Turyan, I.; Mandler, D. *Anal. Chem.* . 2004, 76, 120-126. (b) Kriz, D.; Ramstrom, O.; Mosbach, K. *Anal. Chem.* 1997, 69, 345A-349A.

35 (a) Baba, A.; Knoll, W.; Advincula, R. *Rev. Sci. Instru.* 2006, 77, 064101-1-064101-6. (b) Baba, A.; Knoll, W.; Advincula, R. *J. Phys. Chem. B* 2002, 106, 1581-1587. (c) Xia, C.; Advincula, R. C. *Langmuir* 2002, 18, 3555-3560. (c) Park, M-K.; Youk, J-H.; Pispas, S.; Hadjichristidis, N.; Advincula, R. C. *Langmuir* 2002, 18, 8040-8044.

36 (a) Bi, X.; Yang, K. *Anal. Chem.* 2009, 81, 527-532. (b) Jenik, M.; Schirhagl, R.; Schirk, C.; Hayden, O.; Lieberzeit, P.; Blaas, D.; Paul, G.; Dickert, F. L. *Anal. Chem.* 2009, 81, 5320-5326. (c) Alexander, C.; Andersson, H. S.; Andersson, L. I.; Ansell, R. J.; Kirsch, N.; Nicholls, I. A.; O'Mahony, J.; Whitcombe, M. J. *J. Mol. Recognit.* 2006, 19, 106-180. (d) Jiang, G.; Baba, A.; Advincula, R. *Langmuir*, 2007, 23, 817-825.

37 (a) Taranekar, P.; Baba, A.; Fulghum, T. M.; Advincula, R. C. *Macromolecules* 2005, 38, 3679-3687. (b) Millan, M. D.; Locklin, J.; Fulghum, T.; Baba, A.; Advincula, R. C. *Polymer* 2005, 46, 5556-5568.

38 Wang, E.; Li, G.; Li, D.; Zhai, J.; Zhang, L. *Chem. Eur. J.* 2009, 15, 9868-9873.

39 (a) Reddy, J. A.; Dean, D.; Kennedy, M. D.; Low, P. S. *J. Pharm. Sci.* 1999, 88, 1112-1118. (b) Ladino, C. A.; Chari, R. V. J.; Bourret, L. A.; Kedersha, N. L.; Goldmacher, V. S. *Int. J. Cancer* 1997, 73, 859-864.

40 (a) Tucker, K. L.; Mahnken, B.; Wilson, P. W. F.; Jacques, P.; Selhub, J. *J. Am. Med. Assoc.* 1996, 276, 1879-1885. (b) Rader, J. I. Issues relating to folic acid fortification of cereal grains products: Update from FDA, Cereal Foods World, 1998, p. 545.

41 Pawlosky, R. J.; Flanagan, V. P. *J. Agric. Food Chem.* 2001, 49, 1282-1286.

42 (a) Sato, K.; Muramatsu, K.; Amano, S. *Anal. Biochem.* 2002, 308, 1-4. (b) Fitzpatrick, J.; Tompsett, S. L. *J. Clin. Path.* 1949, 2, 121-125. (c) Harris, D. A. *Anal. Chem.* 1955, 27, 1690-1694.

43 Wright, A. J. A.; Philips, D. R. *Br. J. Nutr.* 1985, 53, 569-573.

44 *In State Pharmacopoeia of USSR,* 10th ed; Ministry of Health, Moscow, 1968; p. 49.

45 Allfrey, V.; Teply, L. J.; Greffen, C.; King, C. G. *J. Biol. Chem.* 1949, 178, 465-481.

46 Kanjilal, G.; Mahajan, S, N.; Ramana Rao, G. *Analyst* 1975, 100, 19-24.

47 (a) Taranekar, P.; Fulghum, T.; Baba, A.; Patton, D.; Advincula, R. *Langmuir* 2007, 23, 908-917. (b) Taranekar, P.; Fulghum, T.; Baba, A.; Patton, D.; Ponnapati, R.; Clyde, G.; Advincula, R. *J. Am. Chem. Soc.* 2007, 129, 12537-12548.

48 (a) Ulman, A. An *Introduction to Ultrathin Organic Films: From Langmuir-Blodgett to Self Assembly*; Academic: New York, 1991. (b) Sullivan, J. T.; Harrison, K. E.; Mizzell, J. P. III; Kilbey, S. M. II *Langmuir* 2000, 16, 9797-9803.

49 Taranekar, P.; Park, J. Y.; Patton, D.; Fulghum, T.; Ramon, J. G.; Advincula, R. C. *Adv. Mater.* 2006, 18, 2461-2465.

50 McCullough, R. D.; Ewbank, P. C.; Loewe, R. S. *J. Am. Chem. Soc.* 1997, 119, 633-634.

51 Bockris, J. O. M., Khan, S. U. M. In *Surface Electrochemistry, A Molecular Level Approach*; Kluwer Academic/Plenum Publishers: New York, 1993.

52 (a) Buttry, D. A.; Ward, M. D. *Chem. Rev.* 1992, 92, 1355-1379. (b) Geelhood, S. J.; Frank, C. W.; Kanazawa, K. *J. Electrochem. Soc.* 2002 149, 33-38. (c) Muramatsu, H.; Tamiya, E.; Karube, I. *Anal. Chem.* 1988, 60, 2142-2146.

53 Sauerbrey, G. *Z. Phys.* 1959, 155, 206-222.

54 Xie, C; Li, H.; Li, S.; Wu, J.; Zhang, Z. *Anal. Chem.* 2010, 82, 241-249.

55 Li, Y.; Yang, H.; You, Q.; Zhuang, Z.; Wang, X. *Anal. Chem.* 2006, 78, 317-320.

56 Sajonz, P.; Kele, M.; Zhong, G.; Sellergren, B.; Guiochon, G. *J. Chromatogr. A* 1998, 810, 1-17.

57 Nicholls, I. A.; Adbo, K.; Andersson, H. S.; Andersson, P. O.; Ankarloo, J.; Hedin-Dahlstrom, J.; Jokela, P.; Karlsson, J. G.; Olofsson, L.; Rosengren, J. *Anal. Chim. Acta* 2001, 435, 9-18.

58 (a) Ferraris, J. P.; Haillon, T. R. *Polymer* 1989, 30, 1319-1327. (b) Yassar, A.; Roncali, J.; Garnier, F. *Macromol.* 1989, 22, 804-809. (c) Wei, Y.; Chan, C. C.; Tian, J.; Jang, G. W.; Hseuh, K. F. *Chem. Mater.* 1991, 3, 888-897.

59 Riskin, M.; Tel-Vered, R.; Bourenko, T.; Granot, E.; Willner, I. *J. Am. Chem. Soc.* 2008, 130, 9726-9733.

60 Kan, X.; Zhao, Y.; Geng, Z.; Wang, Z.; and Zhu, J. *J. Phys. Chem. C* 2008, 112, 4849-4854.

61 (a) Sellergren, B. *Macromolecules* 2006, 39, 6306-6309. (b) McCullough, R. D. *Adv. Mater.* 1998, 10, 93-116.

62 (a) Holdsworth, C. I.; Bowyer, M. C.; Lennard, C.; McCluskey, A. *Aust. J. Chem.* 2005, 58, 315-320. (b) Schwarz, L.; Bowyer, M. C.; Holdsworth, C. I.; McCluskey, A. *Aust. J. Chem.* 2006, 59, 129-134. (c) Schwarz, L.; Holdsworth, C. I.; McCluskey, A.; Bowyer, M. C. *Aust. J. Chem.* 2004, 57, 759-764.

63 (a) Whitcombe, M. J.; Martin, L.; Vulfson, E. N. *Chromatographia* 1998 47, 457-464. (b) Tanabe, K.; Takeuchi, T.; Matsui, J.; Ikebukuro, K.; Yano, K.; Karube, I. *J. Chem. Soc. Commun.* 1995, 2303-2304. (c) Sellergren, B.; Lepisto, M.; Mosbach, K. *J. Am. Chem. Soc.* 1988, 110, 5853-5960. (d) Lepisto, M.; Sellergren, B. *J. Org. Chem.* 1989, 6010-6012.

64 Sarneski, J. E.; Surprenant, H. L.; Reilley, C. N. *Spectrosc. Lett.* 1976, 9, 885-894.

65 (a) Yonezawa, T.; Morishima, I.; Takeuchi, K. *Bull. Chem. Soc. Jpn.* 1967, 40, 1807-1813. (b) Rebek, J. Jr.; Askew, B.; Killoran, M.; Nemeth, D.; Lin, F. T. *J. Am. Chem. Soc.* 1987, 109, 2426-2431.

66 Manesiotis, P.; Hall, A. J.; Sellergren, B. *J. Org. Chem.* 2005, 70, 2729-2738.

67 Berlin, A. In *Electrical and optical polymer systems—fundamentals, methods and applications*; Wise, D. L., Wner, G. E., Trantolo, D. J., Cooper, T. M., Gresser, J. D., Eds.; Marcel Dekker: New York, 1993; p. 47.

68 (a) Willicut, R. J.; McCarley, R. L. *Adv. Mater.* 1995, 7, 759-762. (b) Lukkari, J.; Alanko, M.; Pitkanen, V.; Kleemola, K.; Kankare, J. *J. Phys. Chem.* 1994, 98, 8525-8535.

69 Xia, C.; Fan, X.; Park, M.; Advincula, R. C. *Langmuir* 2001, 17, 7893-7898.

70 Schwartz, B. J. *Annu. Rev. Phys. Chem.* 2003, 54, 141-172.

71 Beamson, G. and Briggs, D. In *High Resolution XPS of Organic Polymers: The Scienta ESCA 300 Database*; John Wiley & Sons Ltd.: Chichester, 1992.

72 Wojtowicz, M. A.; Pels, J. R.; Moulijn, J. A. *Fuel* 1995, 74, 507-516.

73 (a) Cutivet, A.; Schembri, C.; Kovensky, J.; Haupt, K. *J. Am. Chem. Soc.* 2009, 131, 14699-14702. (b) Qin, L.; He, X-W; Zhang, W.; Li, W-Y.; Zhang, Y-K. *Anal. Chem.* 2009, 81, 7206-7216. (c) Bolisay, L. D.; Culver, J. N.; Kofina, P. *Biomacromol.* 2007, 8, 3893-3899. (d) Ceolin, G.; Navarro-Villoslada, F. et. al. *J. Comb. Chem.* 2009, 11, 645-652. (e) Kobayashi, T.; Reddy, P. S.; Ohta, M.; Abe, M.; Fujii, N. *Chem. Mater.* 2002, 14, 2499-2505.

74 (a) Kaiser, H. *Anal. Chem.* 1970, 42, 26A-59a; (b) Long, G. L.; Winefordner, J. D. *Anal. Chem.* 1983, 55, 712A-724A. (c) Thomsen, V.; Schatzlein, D.; Mercuro, D. *Spectroscopy*, 2003, 18, 112-114. (d) Skoog, D. A., Holler, F. J. and Nieman, T. A. In *Principles of Instrumental Analysis*; Harcourt Asia PTE Ltd: India, 1998; p. 13.

75 (a) Batra, D.; Shea, K. J. *Current Opinion in Chem. Bio.* 2003, 7.434-442. (b) Vlatakis, G.; Andersson, L. I.; Muller, R.; Mosbach, K. *Nature* 1993, 361, 645-647.

76 (a) Wyman, J. *Advan. Protein Chem.* 1964 19, 223. (b) Heck, H. d'A. *J. Am. Chem. Soc.* 1971, 93, 23-29.

77 Kamikawa, Y.; Nishii, M.; Kato, T. *Chem.—A Euro. Journal* 2004, 10, 5942-5951.

DETAILED DESCRIPTION OF SECTION V

Electropolymerization Molecularly Imprinted Polymer (E-MIP) SPR Sensing of Drug Molecules: Pre-Polymerization Complexed Terthiophene and Carbazole Electroactive Monomers

SUMMARY OF THE INVENTION FOR SECTION V

A novel chemosensitive ultrathin film with high selectivity was developed for the detection of naproxen, paracetamol, and theophylline using non-covalent electropolymerized molecular imprinted polymers (E-MIP). A series of monofunctional and bifunctional H-bonding terthiophene and carbazole monomers were compared for imprinting these drugs without the use of a separate cross-linker. A key step is the fast and efficient potentiostatic method of washing the template, which facilitated enhanced real-time sensing by surface plasmon resonance (SPR) spectroscopy. Various surface characterizations (contact angle, ellipsometry, XPS, AFM) of the E-MIP film verified the templating and release of the drug from the cross-linked conducting polymer film.

Introduction of Section V

Molecularly imprinted polymer (MIP) is now established as one of the most adaptable methods in fabricating tailor-made sensor films with an artificial receptor based on an imprinted cavity. This cavity retains the exact memory of the size, shape and chemical group orientation of the target analyte or template molecule (Mosbach and Ramstrom, 1996). Because of its low cost, simple preparation, high reliability, stability, and film formation on a wide range of transducers, MIP has been extensively applied in separation and isolation technologies having been developed to mimic biological receptors and enzymes (Wulff, 1995). Although MIP originated from the pioneering work of Polyakov in 1930s (Polyakov, 1931), many key enabling breakthroughs started only in the 1990s (Alexander et al., 2006).

Paracetamol and naproxen are efficient antipyretic and analgesic drugs that are potent ingredients in most painkiller medicines. However, an overdose of paracetamol is a foremost cause of acute liver failure (Bosch et al., 2006; Hawton et al., 2001). In fact, paracetamol is reported as the most common drug used in self-poisoning (overdose) with a high rate of morbidity and mortality (Sheen et al., 2002). Also, a strict international regulation is imposed to pharmaceutical companies about the handling of naproxen in both raw material and final product because it is easily degraded under high temperatures (Adhoum et al., 2003). Theophylline is normally used as bronchodilators and respiratory stimulators for treatment of acute and chronic asthmatic conditions and is reported as the most frequent clinically monitored drug in the USA (Kawai and Kato, 2000; Rowe et al., 1988). The plasma level useful for effective bronchodilation action is within 20-100 concentration range. At higher concentration, it is lethal, leading to a permanent neurological damage (Kawai and Kato, 2000; Rowe et al., 1988). The safe and effective use of theophylline relies on careful dosage adjustments based on accurate measurements in blood serum. Therefore, fast and reliable detection of these drugs are of high importance.

In this communication, we report a novel approach of imprinting naproxen, paracetamol, and theophylline based on an electropolymerized MIP (E-MIP) of conducting polymers (CPs). A review of conducting polymers applied in chemical sensors and arrays has been published recently (Lange et al., 2008). In our work, the fabrication of the E-MIP was achieved by in-situ electropolymerization of functional and cross-linking terthiophene and carbazole monomers that are non-covalently complexed with the template drug. These monomers have been investigated for their interesting electrochemical copolymerization behavior (Taranekar et al., 2005) and electrochromic properties (Witker and Reynolds, 2005). A quantitative electrochemical and electrochromic study of terthiophene and carbazole monomers to form conjugated polymer network (CPN) films have been done by our group using in-situ measurements, electrochemical-surface plasmon resonance (EC-SPR) spectroscopy and electrochemical-quartz crystal microbalance (EC-QCM) (Taranekar et al., 2007) methods.

The advantages of electropolymerization are: (1) thickness control of the polymer layer that is crucial to the sensing of the analyte, (2) ability to attach the sensor film to electrode surfaces of any shape and size, and (3) compatibility with combinatorial and high-throughput approaches critical for the commercial development of molecular imprinting (Lange et al., 2008; Malitesta et al., 1999). To the best of our knowledge, the imprinting of these three important drugs by poly(terthiophene) and poly(carbazole) has not been previously reported. Moreover, we demonstrate an efficient and fast protocol of removing the template drug, which improves the sensitivity of the analyte detection by SPR kinetic measurements. Our group has used this technique to study the formation of ultrathin CPN films (Jiang et al., 2007; Kato et al., 2003; Baba et al., 2002), interfaces (Baba et al., 2006), and kinetic processes at surfaces (Kaewtong et al., 2008; Sriwichai et al., 2008; Taranekar et al., 2007). We have also demonstrated the use of SPR using an electropolymerized dendrimer-coated sensor chip for the detection of a nerve agent gas analog (Taranekar et al., 2006). A review of the SPR methods summarizes the potential for efficient optical/dielectric transduction with thin film sensing elements (Knoll, 1998).

Experiments of Section V

Materials

All chemicals were used as received unless otherwise specified. The templates (naproxen, paracetamol, and naproxen), analogous analytes (1-napththalenesulfonic acid sodium salt, acetanilide, caffeine, theobromine, 3-aminophenol, and 4-aminobenzoic acid) used in selectivity studies, supporting electrolyte (tetrabutylammonium hexafluorophosphate or TBAH), tetrahydrofuran (THF) and acetonitrile (ACN) were purchased from Sigma-Aldrich. The glass slides (BK 7) were acquired from VWR. All the mono (G0) and bifunctional (G1) monomers used to fabricate the ultrathin films were synthesized in our lab, and the details of the synthesis can be found elsewhere (Yassar et al., 1995; Taranekar et al., 2008). The MIP solution was prepared by mixing 200 μM of the monomer (e.g. 3-carboxylic acid terthiophene (G0-3TCOOH)) and 100 μM of the template in ACN containing 0.1 M TBAH. After mixing, the MIP solution was kept initially in cool, dark and dry conditions for at least 48 hrs to allow the intermolecular interaction between the monomer and the template (called pre-polymerization complexation). Similarly, the non-imprinted polymer (NIP) solution is prepared but without the addition of the template drug. For sensing experiments, the solutions of the template and other analytes were prepared in 0.1 M phosphate buffer saline (PBS) solution. The 0.1 M PBS solution was prepared by dissolving 1 tablet of the PBS (Sigma-Aldrich) into 200 ml Milli-Q water. Prior to the injection into the SPR cell, the solution of the template and other analytes was filtered using a micro syringe filter (0.45 μm). The gold-coated slide was prepared by thermally evaporating gold (45-50 nm thick) onto BK 7 glass and silicon wafer with chromium adhesion layer (2-5 nm thick) under high vacuum ($10^{-6}$ bar). The Cr and Au deposition was done at a rate ~0.4 Å $sec^{-1}$ and ~1.1 Å $sec^{-1}$, respectively, using a thermal evaporator (Edwards, E-306). Prior to use, the evaporated Au slides and commercially available Au disks for SPR sensing were plasma cleaned (with oxygen gas) for 120 sec. The E-MIP and non-imprinted (NIP) electrodeposition on Au-electrode and SPR substrate as illustrated in FIGS. 5.1A-D.

Film Fabrication and Template Washing

The E-MIP film deposition was done in an Autolab PGSTAT 12 potentiostat (Brinkmann Instruments now MetroOhm USA) coupled with an SPR instrument (Autolab ESPRIT from Eco Chemie). The SPR set-up adopted a Kretschmann configuration with a 670 nm laser source. The gold disk that served as the surface plasmon resonator was also used as the working electrode for the electrochemistry set-up in a standard three electrode measuring cell with platinum rod as the counter electrode and Ag/AgCl wire as the reference electrode. The potentiostat and SPR instruments were controlled with a GPES version 4.9 and ESPRIT version 4. Both softwares were provided by Brinkmann and Eco Chemie. The MIP film was prepared by scanning the voltage from 0 V to 0.8 V (1.0 V for carbazole-based monomer) for 20 cycles at a scan rate of 50 mV $sec^{-1}$ using a cyclic voltammetry (CV) technique. After the cyclic potential growth of the film on Au substrate, the MIP film was rinsed 3 times in ACN to remove the weakly adsorbed materials from the substrate. Then a monomer-free scan (in solution of 0.1 M TBAH in ACN) was performed by scanning the potential at the same potential window but for 1 CV cycle only.

Film Characterizations

Ellipsometry Measurement

The thickness of the electropolymerized film was measured by ellipsometry using the Multiskop ellipsometer (Optrel GmbH, Germany) equipped with a 632.8 nm laser. The measurement was done at 60° angle of incidence at dry and ambient conditions. At least three measurements were performed at various spots of the film. The measured values of Δ and Y were used to simulate the thickness of the film using an integrated specialized software (Elli, Optrel) that was provided with the instrument.

Contact Angle Measurement

A static contact angle analysis of the electropolymerized film was done using a CAM 200 optical contact angle meter (KSV Instruments Ltd) with CAM 200 software. The measurement was achieved by making ~1 μL drop of Milli-Q water onto the film. At least three measurements were performed at various positions of the film.

Atomic Force Microscopy (AFM) Measurement

The AFM measurements were carried out in a piezo scanner from Agilent Technologies. The scanning rate was 0.8-1.0 lines/s, and the scanning area was 4 μm×4 μm. Commercially available tapping mode tips (TAP300, Silicon AFM Probes, Ted Pella, Inc.) were used on cantilevers with a resonance frequency in the range of 290-410 kHz. The scanning of the electropolymerized film was performed under ambient and dry conditions. All AFM topographic images (AAC tapping mode) were filtered, and analyzed by using SPIP software (Scanning Probe Image Processor, Imagemet.com).

X-ray Photoelectron Spectroscopy (XPS) Measurement

A PHI 5700 X-ray photoelectron spectrometer was equipped with a monochromatic Al Kα X-ray source (hn=1486.7 eV) incident at 90° relative to the axis of a hemispherical energy analyzer. The spectrometer was operated both at high and low resolutions with pass energies of 23.5 eV and 187.85 eV, respectively, a photoelectron take off angle of 45° from the surface, and an analyzer spot diameter of 1.1 mm. Electron binding energies were aligned with respect to the Au $4f_{7/2}$ peak at 84.0 eV. All spectra were collected at room temperature with a base pressure of $1\times10^{-8}$ torr. The peaks were analyzed first by background subtraction using the Shirley routine. The binding energies for each peak were assigned based on published literature values. All the samples (electropolymerized film on gold-evaporated silicon wafer or BK 7 glass) were completely dried in argon gas prior to XPS measurements.

Sensing

The sensing of the target analyte (imprinted drug) using the fabricated E-MIP film was performed on the Autolab SPR with a flow channel set-up. During sensing, the SPR was set to automated injection of the 0.1 M phosphate buffer saline (PBS) solution (baseline) for 120 sec followed by sample injection (50 μL) for 900 sec, and then rinsing of the MIP film with the background solution for 300 sec. The SPR response due to the binding of the template and other analytes were compared and plotted after the abrupt change in angle, which is mainly due to the change in the refractive index of the bulk solution. All the SPR angular and kinetic curves were normalized to zero and plotted in OriginLab (version 7).

Results and Discussion of Section V

Sensor Fabrication

The formation of the E-MIP film was monitored in-situ by EC-SPR. Among the synthesized monomers, the electropolymerization of the 3-carboxylic acid terthiophene (G0-3TCOOH) in the presence of the drug template (naproxen, paracetamol, and theophylline) was first investigated in a 2:1 monomer to template molar ratio. Terthiophene monomer was reported to have the advantage of forming a more ordered film and lower oxidation potential than mono and bithiophenes (Rasch and Vielstich, 1994; Roncali, 1992). The mechanism of the anodic electropolymerization of thiophene has been explained elsewhere (Roncali, 1992).

The electrodeposition of the E-MIP film showed a recurring oscillation of the SPR kinetic curves (FIG. 5.2A) for each CV cycles, which is due to changes in the dielectric property (Georgiadis et al., 2000) of the poly(terthiophene) film as it switches from oxidized to reduced states. This result is complemented by the change in the SPR angle as the potential is swept forward to 0.8 V (oxidation process) and reversed backward to 0 V (reduction process) (FIG. 5.2B). The profile achieved in the kinetic curve (FIG. 5.2A) agreed with our earlier results about the electropolymerization of poly(aniline) (Baba et al., 2004) and poly(carbazole) (Ravindranath et al., 2007) where the SPR response increases during oxidation and decreases upon reduction. The change in the dielectric property of the film has been explained as a result of the doping/dedoping of the conducting polymer. Upon oxidation, the doping process occurs when an anionic dopant (PF6 from the TBAH) from the bulk solution is incorporated into the film to compensate for the cationic charge carried by the polymer backbone (Hutchins and Bachas, 1995; Yamaura et al., 1988). The inserted dopant is then released back into the bulk solution upon reduction (dedoping process). At doped states, the electrical conductivity of a conducting polymer is highest (Georgiadis et al., 2000; Yamaura et al., 1988). The insertion/ejection of the counter ion from/to solution during the doping and dedoping of a conducting polymer has been observed previously using EC-QCM measurements (Deore et al., 1999).

The shifting of the minimum in the SPR angle (inset of FIG. 5.2A) after electropolymerization has been explained to be a combined effect of the change in dielectric constant and thickness as a result of the E-MIP film deposition on Au substrate (Ravindranath et al., 2007). The CV diagram depicts an increasing current in the oxidation regime (~0.6 V to 0.8 V) from the $1^{st}$ cycle to $20^{th}$ cycle, indicating the deposition of the conducting polymer film (FIG. 5.2C). The same oxidation peak was observed with the electropolymerization of the monomer alone (NIP), which means that the template is electrochemically stable at the scanned potential window and only the monomer undergoes electropolymerization (FIG. 5.3A). A similar trend was observed in the SPR kinetic and CV diagram with imprinting of theophylline and paracetamol. To confirm the adsorption of the E-MIP film on gold substrate, a monomer free scan was performed on the same potential window (0 V-0.8 V) after electropolymerization. Prior to scanning the CV in the monomer free solution, the electropolymerized film was rinsed thoroughly in ACN to remove the weakly adsorbed molecules on gold substrate. A similar reduction-oxidation (redox) peak was seen in the CV diagram of the monomer free scan (inset of FIG. 5.2C), which corroborated the formation of the E-MIP film.

Surface Characterizations

The surface analysis of the E-MIP films before and after the release of the guest molecules (naproxen, theophylline and paracetamol) are summarized in Table V.1.

TABLE V.1

Summary of the Surface Characterization Measurements of the E-MIP Film Before and after Template (Drug Molecule) Removal by Constant Potential Wash (at 0.4 V)

| MIP Film | Water Contact Angle (degree) | Ellipsometry Thickness (nm) | AFM RMS (nm) | XPS N 1s (a.u.) Peak Area |
|---|---|---|---|---|
| A. MIP film with 200 µM G0-3TCOOH and 100 µM Naproxen (NP) | | | | |
| a. Before NP Removal | 54.50 ± 0.55 | 5.18 ± 0.03 | 1.26 ± 0.05 | n.a. |
| b. After NP Removal | 53.31 ± 0.48 | 5.02 ± 0.10 | 1.67 ± 0.21 | n.a. |
| B. MIP film with 200 µM G0-3TCOOH and 100 µM Theophylline (Th) | | | | |
| a. Before Th Removal | 56.20 ± 0.56 | 11.87 ± 0.26 | 1.11 ± 0.03 | 424 |
| b. After Th Removal | 52.45 ± 1.22 | 10.73 ± 0.23 | 1.60 ± 0.02 | 55 |
| C. MIP film with 200 µM G0-3TCOOH and 100 µM Paracetamol (PCM) | | | | |
| a. Before PCM Removal | 56.86 ± 0.52 | 2.06 ± 0.31 | 0.81 ± 0.06 | 732 |
| b. After PCM Removal | 52.24 ± 0.98 | 1.78 ± 0.10 | 1.05 ± 0.16 | 138 |

Note:
n.a. stands for not applicable

After washing the films in ACN and simultaneously applying a constant potential (0.4 V), the contact angle and thickness decreased, and the root-mean-square (rms) roughness increased. The observed trends are consistent with all three imprinted films. For this communication, only 0.4 V was applied during the washing. From the contact angle data, the films turned slightly hydrophilic after the release of the three organic guest molecules (templates), which are entrapped in the highly cross-linked poly(terthiophene) films. The release of the templates is evident from ellipsometry measurements which showed a decrease in film thickness. The theophylline E-MIP showed the highest thickness before the constant potential washing as compared to paracetamol and naproxen. This might be due to higher theophylline loading into the polymer film. The chemical structure of theophylline shows four possible H-bonding sites while the paracetamol and naproxen have only three possible H-bonding sites. Furthermore, the removal of the imprinted template molecule is confirmed by the increasing rms roughness as determined by AFM (FIG. 5.4A-F). As expected, the rms of the films had increased because of the many cavities formed in the polymer film. In order to quantify the amount of templates removed from the polymer film, high resolution XPS scan was performed with the theophylline- and paracetamol-imprinted films, which contain the N element not found in poly(terthiophene) film. After constant potential washing of the films, the N 1s peak area (~396 eV to ~403 eV) had decreased by ~87% and ~81% for theophylline and paracetamol, respectively (FIG. 5.5A-C). These results confirmed that most of the imprinted guest molecules were removed from the polymer films. Earlier studies suggested that the N 1s peak located at this range were due to H-bonding interactions of tertiary amine and amide nitrogen atoms (Luo et al., 1998; Liu et al., 1999; Zhou et al., 1998; Zhou et al., 1997). However, there is no N element with naproxen and thus, its percentage removal from the MIP film was not determined using XPS. Also, the S 2s peak (~225 eV to ~233 eV) of the films remained constant ~0.71%, which illustrates stability of the poly (terthiophene) film during washing. Furthermore, in a separate experiment, the thickness of the poly(terthiophene) was measured by ellipsometry after dipping the film to ACN for different time intervals until 17 hrs. The result showed no thickness change in the polymer film. This finding implies that the resulting polymer film, unlike the monomer and template, is not soluble in ACN. Therefore, ACN is a good solvent for the chosen polymer-drug E-MIP combination.

Sensing and Selectivity Studies

Unlike other monomers for MIP synthesis (O'Conor et al., 2007; Caballero et al., 2005; Blanco-Lopez et al., 2003; Peng et al., 2000; Weetall and Rogers, 2004; Sanbe et al., 2003; Chegel et al., 2008), the G0-3TCOOH and the rest listed (FIG. 5.1D) have the advantage of being both monomer and cross-linker to complex with the desired template in solution prior to the electropolymerization process (Batra and Shea, 2003). A similar concept for monomer orientation has been reported also (Yeh and Ho, 2005; Sibrian-Vazquez and Spivak, 2004). The functional group (—COOH, —OH, —NH$_2$) in the monomer is believed to be the binding site for the template via H-bonding (Mathieu and Trinquier, 2009; Khan and Sivagurunathan, 2008; Batra and Shea, 2003; Alexander et al., 2006) while the electroactive group (pendant carbazole or thiophene) is intended for cross-linking with another monomer to form a type of CPN. With the prior complexation of the monomer and the template in solution as suggested, a more robust cavity of the template is expected within the E-MIP film during imprinting. This can be generally termed as a "pre-polymerization complex" approach (Batra and Shea, 2003; Alexander et al., 2006).

The detection of the target analyte was accomplished by an SPR fixed angle or kinetic measurements. The sensing of naproxen, theophylline, and paracetamol using the three imprinted films of poly(terthiophene-COOH) is summarized in FIG. 5.2D (original kinetic binding curves FIG. 5.6). During the 30 minute incubation with the templates after washing in ACN, the E-MIP films revealed an obviously higher angular change (delta) in the SPR than the NIP when exposed to the imprinted drug molecules except for the paracetamol-imprinted film. This result proves clearly that molecular imprinting has taken place (Batra and Shea, 2003; Alexander et al., 2006), where the sensing of the analyte drug by E-MIP is attributed to the presence of the complementary cavities that retained the exact size, shape, and orientation of the chemical functionalities of the template drug molecule. The diminutive SPR angular response of the NIP films upon exposure to a solution of drugs can be attributed to non-specific binding. Interestingly, the E-MIP films that were subjected to constant potential washing (at 0.4V in ACN) demonstrated a considerable improvement on sensing compared to the earlier method of washing with solvent only. This outcome is more apparent with the paracetamol-imprinted film, where the earlier washing did not probably removed most of the imprinted drug. Among the solvents tried (dichloromethane, THF, PBS buffer), ACN has proven to be a good solvent for washing since the E-MIP film showed a higher sensing response during the rebinding studies. We suggest that the application of a constant potential during washing resulted to more swelling of the polymer film, which facilitates the release of more template from the polymer network. This hypothesis is currently being further investigated. To the best of our knowledge, the application of a constant potential during the washing of the template from an MIP film has not been previously emphasized.

Aside from using the same monomer (G0-3TCOOH) for the imprinting of the three drugs, several other terthiophene and carbazole monofunctional (G0) and bifunctional (G1) monomers (FIG. 5.1D) were also tested for molecular imprinting with naproxen as the model drug (FIG. 7). The bifunctional monomers (G1) with —COOH and —OH functional groups have shown the best sensing response compared to the monofunctional monomers (G0) (FIG. 5.2E). This finding could be due to a greater amount of template-G1 monomer complexes deposited per unit volume on the film. The bifunctional $NH_2$ of both carbazole and terthiophene-based monomers exhibited lower template rebinding. This might be a result of the weaker H-bonding ability of the $NH_2$ than —COOH and —OH (Fiedler et al., 2006; Sibrian-Vazquez and Spivak, 2004; Jeffrey, 1997) when complexing with the analyte drug, and thus less number of templates were imprinted. However, the E-MIP films generated by the bifunctional G1 monomers required more time (>30 mins) to reach the saturation point. A future work on determining the maximum point of the association curve is being done to understand the adsorption kinetics in detail. Preliminary sensitivity studies were made with the combination of G0-3TCOOH and theophylline (2:1 molar ratio). The injection of different concentrations (10 to 50 μM) of theophylline showed a linear increase in the SPR angle (Supporting Information, FIGS. 5.8A&B), which was not observed with the NIP film. Finally, the selectivity of the imprinted films was evaluated by exposing them to other analytes (FIG. 5.2F). The E-MIP films showed a greater binding response to the original imprinted molecule and only a limited response to the other analytes (FIG. 9), even though some of them closely resemble the chemical structure of the template. This result is generally manifested in the three separate E-MIP films tested. Furthermore, the response of the NIP film to the target analyte represents any non-specific binding events which were found to be minimal (FIG. 5.9).

Conclusion of Section V

We have demonstrated the feasibility of using a series of electropolymerizable terthiophene and carbazole monomers for the imprinting of drug molecules without the use of a separate cross-linker. The bifunctional (G1) monomers of —COOH and —OH functional groups were found to be most effective for imprinting than their monofunctional counterparts and the bifunctional $NH_2$, but results in a longer time to reach saturation. A possible compromise is the use of thinner films. We have also shown a novel and effective method of removing the template by potential-induced washing, which significantly improved the sensitivity of the E-MIP film. With the versatility and simplicity of the technique, the E-MIP sensor is a promising approach to the fabrication of different sensor films that can be easily attached via electropolymerization onto various, but limited to conducting, electrode transducers.

REFERENCES CITED SECTION V

The following references were cited in this section:
Adhoum, N., Monser, L., Toumi, M., Boujlel, K., 2003. Anal. Chim. Acta 495, 69-75.
Alexander, C., Andersson, H. S., Andersson, L. I., Ansell, R. J., Kirsch, N., Nicholls, I. A., O'Mahony, J., Whitcombe, M. J., 2006. J. Mol. Recognit. 19, 106-180.
Baba, A., Knoll, W., Advincula, R., 2006. Rev. Sci. Instrum. 77, 064101-6-064101-6.
Baba, A., Tian, S., Stefani, F., Xia, C., Wang, Z., Advincula, R., Johannsmann, D., Knoll, W., 2004. J. Electroanal. Chem. 562, 95-103.
Baba, A., Advincula, R., Knoll, W., 2002. J. Phys. Chem. B. 106, 1581-1587.
Batra, D., Shea, K. J., 2003. Curr. Opin. Chem. Biol. 7, 434-442.
Blanco-Lopez, M. C., Lobo-Castan˜´n, M. J., Miranda-Ordieres, A. J., Tun˜´n-Blanco, P. 2003. Biosens. Bioelectron. 18, 353-362.
Bosch, M. E., Sanchez, A. J. R., Rojas, F. S., Ojeda, C. B., 2006. J. Pharm. Biomed. Anal. 42, 291-321.
Caballero, A-G., Goicolea, M. A., Barrio, R. J., 2005, Analyst 130, 1012-1018.
Chegel, V., Whitcombe, M. J., Turner, N. W., Piletsky, S. A., 2009. Biosens Bioelectron. 24, 1270-1275.
Deore, B., Chen, Z., Nagaoka, T., 1999. Anal. Sci. 15, 827-828.
Fiedler, P., Böhm, S., Kulhanek, J., Exner, O., 2006. Org. Biomol. Chem. 4, 2003-2011.
Georgiadis, R., Peterlinz, K. A., Rahn, J. R., Peterson, A. W., Grassi, J. H., 2000. Langmuir 16, 6759-6762.
Hawton, K., Townsend, E., Deeks, J., Appleby, L., Gunnell, D., Bennewith, O., Cooper, J., 2001. Br. Med. J. 322, 1203-1207.
Hutchins, R. S., Bachas, L. G., 1995. Anal. Chem. 67, 1654-1660.
Jeffrey, G. A., 1997. An introduction to hydrogen bonding, Oxford University Press, Oxford New York.
Jiang, G., Baba, A., Advincula, R., 2007. Langmuir 23, 817-825.
Kaewtong, C., Jiang, G., Park, Y., Fulghum, T., Baba, A., Pulpoka, B., Advincula, R., 2008. Chem. Mater. 20, 4915-4924.
Khan, F. L. A., Sivagurunathan, P. 2008. Phys. Chem. Liq. 46, 504-509.
Kato, K., Kawashima, J., Baba, A., Shinbo, K., Kaneko, F., Advincula, R., 2003. Thin Solid Films 101-107.
Kawai, M., Kato, M., 2000. Methods Find. Exp. Clin. Pharmacol. 22, 309-320.
Knoll, K., 1998. Annu Rev. Phys. Chem. 49, 569-638.
Lange, U., Roznyatouskaya, N. V., Mirsky, V. M., 2008. Anal. Chim. Acta 614, 1-26.
Liu, Y., Goh, S. H., Lee, S. Y., Huan, C. H. A., 1999. Macromolecules 32, 1967-1971
Luo, X., Goh, S. H., Lee, S. Y., Tan, K. L., 1998. Macromolecules 31, 3251-3254.
Malitesta, C., Losito, L., Zambonin, P. G., 1999. Anal. Chem. 71, 4609-4613.
Mathieu, S., Trinquier, G., 2009. Phys. Chem. Chem. Phys. 11, 8183-8190.
Mosbach, K., Ramstrom, O., 1996. Nature Bio/Technology 14, 163-170.
O'Connor, N. A., Paisner, D. A., Huryn, D., Shea, K. J., 2007. J. Am. Chem. Soc. 129, 1680-1689.
Peng, H., Liang, C., Zhou, A., Zhang, Y., Xie, Q., Yao, S., 2000. Anal. Chim. Acta 423, 221-228.
Polyakov, M. V., 1931. Zhur. Fiz. Khim. 2, 799-805.
Rasch, B., Vielstich, W., 1994. J. Electroanal. Chem. 370, 109-117.
Ravindranath, R., Ajikumar, P., Baba, A., Bahuleyan, S., Hanafiah, N., Advincula, R., Knoll, W., Valiyaveettil, S., 2007. J. Phys. Chem. B. 111, 6336-6343.
Roncali, J., 1992. Chem. Rev. 92, 711-738.
Rowe, D. J., Watson, I. D., Williams, J., Berry, D. J., 1988. Ann Clin. Biochem. 25, 4-26.
Sanbe, H., Hosoya, K., Haginaka, J., 2003. Anal. Sci. 19, 715-719.
Sibrian-Vazquez, M., Spivak, D. A., 2004. J. Am. Chem. Soc. 126, 7827-7833.

Sriwichai, S., Baba, A., Deng, S., Huang, C., Phanichphant, S., Advincula, R., 2008. Langmuir 24, 9017-9023.

Sheen, C. L., Dillon, J. F., Bateman, D. N., Simpson, K. J., Mcdonald, T. M., 2002. Q. J. Med. 95, 609-619.

Taranekar, P., Fulghum, T., Patton, D., Ponnapati, R., Clyde, G., Advincula, R., 2007. J. Am. Chem. Soc. 129, 12537-12548.

Taranekar, P., Fulghum, T., Baba, A., Patton, D., Advincula, R., 2007. Langmuir 23, 908-917.

Taranekar, P., Baba, A., Park, J. Y., Fulghum, T. M., Advincula, R. C., 2006. Adv. Funct. Mater. 16, 2000-2007.

Taranekar, P., Baba, A., Fulghum, T., Advincula, R., 2005. Macromolecules 38, 3679-3687.

Weetall, H. H., Rogers, K. R., 2004. Talanta 62, 329-335.

Witker, D., Reynolds, J. R., 2005. Macromolecules 38, 7636-7644.

Wulff, G., 1995. Angew. Chem., Int. Ed. 34, 1812-1832.

Yamaura, M., Hagiwara, T., Iwata, K. 1988. Synth. Met. 26, 209-224.

Yassar, A., Moustrou, C., Youssoufi, H. K., Samat, A., Guglielmetti, R., Garnier, F., 1995. Macromolecules 28, 4548-4553.

Yeh, W-M., K-C., 2005. Anal. Chim. Acta 542, 76-82.

Zhou, X., Goh, S. H., Lee, S. Y., Tan, K. L., 1998. Polymer 39, 3631-3640.

Zhou, X., Goh, S. H., Lee, S. Y., Tan, K. L., 1997. Appl. Surf. Sci. 119, 60-66.

DETAILED DESCRIPTION OF SECTION VI

Detection and Screening of Bioactive Peptides by Reverse Colloidal Layer Template Molecular Imprinting with Electrochemical SPR and QCM Sensing Objectives
1. The detection and screening of bioactive peptides and epitopes can be performed using reverse colloidal layer molecular imprinting polymerization (RCL-MIP) combined with electrochemical surface plasmon resonance (EC-SPR) sensing. This will result in increased sensitivity, selectivity, detection limits, and combinatorial library screening compared to current analytical and sensor formats.
2. The RCL-MIP will utilize electropolymerization and cross-linking using electro-active cross-linking dendrimers, template peptides, and electroactive monomers. This will result in the formation of highly stable nanopatterned arrays left by the dissolution of the particle-peptide templates.
3. The nanoarray biosensor recognition elements and ultrathin films will be analyzed for: electrochemical, spectroscopic, and optical properties; morphology; thermal and mechanical stability, etc., with and without the templated peptides.
4. The sensing and combinatorial library screening protocols will be validated utilizing surface plasmon resonance (SPR), quartz crystal microbalance (QCM), EC-SPR, and electrochemical-QCM (EC-QCM) to allow for differentiation of dielectric, acoustic, and viscoelastic response from the array-films.
5. The use of electrostatic charging and redox doping can be used to investigate the influence on binding constants (sensitivity), regeneration (reusability), discrimination (selectivity) and gain some insight into conformational effects of bound protein molecules. In principle, hydrophobicity, ionophilicity, and porosity can be controlled on the conjugated polymer network (CPN) matrix by electrochemical methods, i.e. controlled diffusion kinetics and reversibility of binding. Structure-property relationships for sensing with different redox states of the arrays can be described. Electrostatic charging will allow control of surface potential towards understanding conformation changes on bound protein analytes.
6. Lastly, the sensor performance in terms of: detection limits (figures of merit), binding constants, specific and non-specific binding, mechanical and thermal sensor stability, and cyclic (repeat) stability. These parameters will be evaluated that will be useful for any future development of commercial point-detectors with available sensor technologies as well as for combinatorial library screening.

Background

Importance of Discrimination, Screening, and Sensing of Biopeptides

Sensors are devices that convert molecular information into analytically useful signals.[1] It selectively recognizes a target molecule in a complex matrix and generates an output signal using a transducer that correlates to the presence and concentration of the analyte. The sensor recognition element is a "physical layer" responsible for the selective binding (or conversion) of the analyte in a matrix containing both related and unrelated compounds (FIG. 6.1). When the analyte interacts with the recognition element, a change in one or more physico-chemical parameters associated with the interaction occurs. This change may produce ions, electrons, gases, heat, mass changes, or light, and the transducer converts these parameters into an electrical output signal that can be amplified, processed, and displayed. The successful performance of a sensor depends to a large extent on a highly selective, sensitive, and stable recognition element and efficient transducer.

Selectivity is a measure of how well a sensor discriminates between the analyte and compounds of similar, or different chemical structure and is a primary function of the recognition element. Sensitivity is determined both by the recognition element and the transducer. Depending on the S/N ratio, additional amplification steps can enhance sensitivity and improve analyte detection limits. Maintaining long-term stability and reusability, withstanding harsh chemical environments, and operating at high temperatures and/or pressures are challenges for sensors.

Although a number of interesting sensors have been applied to a variety of analytes, this project will focus on research and development of biosensors for detecting and screening bioactive peptides and protein epitopes.[2] Bioactive peptides have been defined as specific protein fragments that have a physiological impact on body functions or conditions and may ultimately influence health.[2,3] This includes many different classes of endogenous peptides such as the multiple types of neuropeptides and peptide hormones, involved in the regulation of a given biological function or metabolic activity. Peptides encrypted in food proteins and peptides synthesized with pharmacological or health benefit activities are also bioactive peptides.[3] Moreover, biomarker peptides which inform about diagnosis, prognosis or the evolution of certain diseases constitute a closely related category of peptides. An extensive knowledge of this area has been presented in recent books.[4,5] In recent years it has been recognized that dietary proteins provide a rich source of biologically active peptides. Such peptides are inactive within the sequence of the parent protein and can be released via: (a) hydrolysis by digestive enzymes, (b) hydrolysis by proteolytic microorganisms, and (c) through the action of proteolytic enzymes derived from microorganisms or plants. Upon oral or intravenous administration though, bioactive peptides, may affect the major body systems—namely, the cardiovascular, digestive, lymphatic, and nervous systems depending on their amino acid sequence.[6]

| | |
|---|---|
| Lys-Ala-Ala | b-lactam receptor protein fordetection of β-lactam antibiotics |
| Ala-Tyr-Leu-Lys-Lys-Ala-Thr-Asn-Glu | An Epitope of Cyt C from bovine-heart |
| Gly-Arg-Tyr-Val-Val-Asp-Thr-Ser-Lys | alcohol dehydrogenase (ADH) from yeast amino acids |
| Pro-Asn-Ala-Asn-Pro-Asn-Ala-Asn-Pro-Asn-Ala-Asn-Pro-Asn-Ala | Epitope of the circumsporozoite protein of Plasmodium fakiparum, a promising malaria vaccine candidate. |

Although there has been remarkable progress in protein analysis as a consequence of proteomics research and as a consequence of drug discovery/development initiatives, the field of screening and absolute quantification of peptides has not grown as rapidly. Quantification and high throughput analysis of peptides or proteins are quite challenging because of the vast complexity of the problem. Current approaches towards peptide screening and quantification in biological fluids typically include mass spectrometric techniques and immunoassays.[7,8] Immunoassays, although sensitive, lack the necessary selectivity for distinction between peptide and metabolites. Modified molecules induced by metabolic transformations (e.g., N- or C-terminal truncation of the peptide) might not be differentiated by the antibody used in the assay, leading to cross-reactivity. Although it is generally accepted that mass spectrometry (MS) is an ideal technique for the quantification of trace levels of analytes in biological fluids, immunological techniques are still characterized by better limits of peptide detection. The combination of a separation technique such as micro/nano-HPLC with a detection method as MS is a very selective and sensitive approach.[9] Also, the capillary separation technique has been applied to the analysis of bioactive peptides.[10,11] But all these methods for unambiguous detection and quantification of bioactive peptides usually involve separate sampling and analysis steps using complex, expensive, and bulky spectrochemical and chromatographic techniques—making them undesirable for real-time field analysis. Recent advances in optical fibers, surface acoustic wave (SAW) devices, and electronic noses, offer many advantages though they typically lack selectivity, making false positive readings a major concern.

Molecular Imprinting of Chemical Agents and Peptides

Molecularly imprinted polymers (MIP) are a class of synthetic materials that may be tailored for high sensor and separation performance.[12] The MIP technique involves a network polymer, which has been synthesized in the presence of a target molecule template. Molecular recognition between a molecular receptor (host) and a substrate (guest) in a matrix containing structurally related molecules requires discrimination and binding. This can happen only if binding sites of the host and guest molecules complement each other in size, shape, and chemical functionality in a type of "lock and key" mechanism (FIG. 6.2). Molecular imprinting can be approached in two ways: the self-assembly approach and the preorganized approach.[12] The self-assembly approach involves host-guest complexes produced from weak intermolecular interactions (ionic or hydrophobic interactions, H-bonding, metal coordination, etc.) between the analyte template and monomer precursors. These complexes are spontaneously established in liquid phase and then sterically fixed by network polymerization (crosslinking) After removal of template molecules from the resulting macroporous network polymer matrix, vacant recognition sites specific to the print molecule are formed. The shape of the sites, maintained by the rigid network polymer and the arrangement of the functional groups in the recognition sites, results in affinity for the analyte. The preorganized approach involves formation of strong, reversible, covalent arrangements (e.g., esters, imines, and ketals) of the monomers with the template molecules before polymerization. The template molecules need to be "derivatized" with the monomers before actual imprinting is performed. After cleaving the covalent bonds that hold the template molecules to the macroporous polymer matrix, recognition sites complementary to the analyte remain in the polymer.

While MIPs have been prepared for a large number of target molecules and applications[13-16] over the years, the majority of the template molecules studied have been characterized by their low molecular weight and insolubility in aqueous systems. Much of the pioneering work in the molecular imprinting of peptides and proteins was conducted by Mosbach[17-21] using amino acid derivatives as template molecules to create stationary phases for chromatographic applications. The chemical structure of proteins, with their numerous functional groups, allows many binding opportunities for a variety of functional monomers. While imprinting MIPs with protein is becoming a popular concept, many challenges, including the accessibility of binding sites, non-specific binding, and flexible conformation of the molecules, remain in creating materials that selectively bind the desired molecules.[22] A newer method of molecular imprinting, called the epitope approach, has been explored.[23] The epitope approach is so named because of its similarity in concept to antigen-antibody interactions. When an antibody of the immune system binds a specific antigen, it does not need to recognize the entire molecule, but rather only a small portion of it, called the epitope. In an epitope MIP, a peptide sequence from the surface of the protein is synthesized and imprinted into the material. When the original whole protein is exposed to the imprinted material, the region containing the peptide used as template can recognize its spatial and chemical mimic in the polymer (FIG. 6.3).[22] In this manner, only a portion of the entire molecule is needed for preferential binding. It is also more amenable towards rapid screening of larger protein analytes.

In this project, we will use oligopeptide and epitope templates tethered to colloidal particles to develop a protocol for forming highly selective and sensitive molecular recognition elements for sensing. We will prepare layers of these particles with the RCL-MIP process on the EC-SPR sensor surface/transducer to allow for the discrimination, screening, and sensing of peptides and proteins.

Utilization and Hyphenation of SPR, QCM, and Electrochemistry

Surface plasmon resonance (SPR)[24] and the quartz crystal microbalance (QCM)[25] are both well-established noninvasive and surface sensitive analytical techniques capable of providing a wealth of information about interfacial phenomena. SPR spectroscopy measures the optical dielectric constants of thin films deposited onto noble metal coated substrates.[24] QCM is an oscillator that records the acoustic (frequency) perturbation of absorbed masses on a piezoelectric element and electrode, i.e., the collective effect of the deposited molecules and viscoelastic properties.[26-30] For a given surface adsorption process, the comparison between SPR and QCM masses can give very complementary information: dielectric properties, wavelength (absorbance), and optical thickness dependence from SPR, whereas QCM gives frequency change (mass) and viscoelastic (mechanical) properties of the adsorbed film, which may relate in some cases to the conformation of adsorbed molecules.[31-34] The reliability for comparison heavily depends on the extent of the similarity of the experimental conditions (sample concentration, temperature, liquid flow, surface conditions, etc.) of the two sets of experiments.[35] One way to improve the reliability for data collection and analysis is to couple SPR and QCM functions in one device so that both the optical and the acoustic signals can be acquired simultaneously and in real time. This was realized by combining a grating-coupled surface plasmon resonance (G-SPR) spectrometer with a QCM[36-38] as shown in FIG. 6.4A-C.

Another important combination is that of SPR with electrochemical measurements (FIG. 6.5) which have been demonstrated by the Advincula group and others as a powerful analytical technique for the simultaneous characterization and manipulation of electrode/electrolyte interfaces.[54,63] In electrochemical-SPR (EC-SPR) measurements, the gold substrate that carries the optical surface mode is also used as the working electrode in the electrochemical experiments.[63] The advantage of using the EC-SPR technique is that the electrochemical and optical properties are simultaneously obtained on surfaces and ultrathin films at the nanometer scale. A number of groups have been applying the EC-SPR technique for the characterization of conducting polymer thin films.[39] This involved the in situ monitoring of the film swelling/contraction and of electrochromic properties during electropolymerization or during the anion doping/dedoping process of deposited conducting polymers.[63] Also, the PI's group has recently developed a selective and highly sensitive chemosensor for nerve agent detection at the nanomolar level using electrochemically crosslinked ultrathin films.[40] The adsorption kinetics was monitored simultaneously by using in situ SPR/potentiometric changes at varying concentrations of the analyte. In principle, SPR can be hyphenated with a number of other spectroscopic and microscopic techniques such as SPR-fluorescence and SPR-optical imaging to enhance and complement detection. Complex sample delivery in microfluidic-SPR devices have also been recently reported.[43]

In this project, we will utilize SPR, QCM, EC-SPR, and EC-QCM instruments to acquire both optical and acoustic signals in combination with the electrochemical signal.[63] The optical and the acoustic methods allow for dielectric property evaluation and independent mass detection of absorbed peptides for quantitative kinetics and verification of combinatorial library methods that will be explored. Electrochemical methods allow for potentiometric and electrochemical detection and control of surface potential that can affect analyte affinity, sensor regeneration, and conformational changes on protein analytes.

Molecular Imprinting with Conjugated Polymers and Dendrimers for MIP and Sensors π-Conjugated polymers (CP) are interesting electrically conducting, electro-optically active, and electrochemically responsive polymer materials.[41] They have been used as rudimentary selective partitioning phases on electrodes and have been shown to retain an ion-sieving "memory" effect for the anion used for doping.[42] They are easily polymerized (by anodic electropolymerization) to substrates of various shapes and sizes.[42] Their potential as materials for electrochemical, chemical, and biological sensors has been investigated by a number of groups.[44] In addition, their interesting electro-optical and spectroscopic properties make them useful for a variety of optical and spectroscopic transduction mechanisms for sensors.[45] Materials exhibiting predetermined molecular recognition selectivity in combination with electrical conductivity are an important application for electrochemical sensors. An electropolymerized MIP should provide the basis for a new line of electrochemically sensitive sensor recognition element integrated with transduction. At present, primarily acrylate-based, styrene-based and silane-based polymeric materials are frequently used for MIP. Very little work has been reported using electrochemically active heteroaromatic monomers.[46] The preparation and characterization of MIP materials on a finger array device containing an electrically conducting polymer (polypyrrole) and an MIP for morphine has been reported.[47] We have demonstrated nerve agent sensing using cross-linked conjugated carbazole units in dendrimers although not by MIP.[40] In general, there is a need to demonstrate how molecularly imprinted CP materials can influence integration between the transducer and the recognition sites for a peptide analyte as well as control sensor response, regeneration, and analyte activity by electrochemical methods.

Dendrimers and hyperbranched polymers present unique opportunities to design sterically selective, chemoselective, and even enantioselective materials for molecular recognition. Functional dendrimer, monomers, and crosslinkers for electrochemical MIP as shown in FIG. 6.6. These are macromolecules synthesized using a convergent or divergent approach with specific branching topology and generational growth.[48] Chemical agent capture, detection, and destruction are possible with these macromolecules through the tailoring of the interior and peripheral architectures with catalytic or selective binding sites.[49] The large number of functional end-groups is a main advantage over linear macromolecules and networks. By careful design of dendrimer topology and generation, one can control globular macromolecular shape and functional group reactivity. MIP has been demonstrated at the periphery and core of the dendrimers.[50] Specificity and stability of complexes both in the core and periphery, can be strengthened by introducing intermolecular forces such as; ionic and hydrophobic interactions, H-bonding, and dipole interaction. In order to take advantage of dendrimers for molecular imprinting, there is a need to investigate the design and synthesis of reactive monomers as well as template-interacting functional groups at the periphery of dendritic macromolecules capable of specific binding within a network material. A wide range of possibilities exists, including both covalent linkages and strongly hydrogen bonded self-assemblies for the template molecule. One may prepare precursor dendrimer complexes with a specific molecular template at the periphery and then polymerize around it, thus integrating the template with the network in a very high concentration. Another advantage is the increased dimensional stability due to the high degree of cross-linking Colloidal Particle Layers and Ultrathin Films Colloidal particles can be used to assemble in-plane monolayer topographies.[51] When micron to submicron colloidal dimensions are selected to produce topographies, adsorption techniques are required to adhere the particles to a base substrate where nanoscale control over morphology of packing is possible (FIG. 6.7). Many methods exist to produce surface functionality at this level.[51] The most simple approach is drop-casting where the sol is simply added to the base substrate in question and the solvent left to evaporate, while the colloids remaining self-assemble on the substrate surface. The degree of order in the pattern is primarily determined by the rate of evaporation, polydispersity of the colloids, and affinity between colloid and substrate. Other methods for colloid immobilization to produce in-plane nanotopographies include: spincoating, chemically grown hydrophilic oxide layers, electrophoretic deposition of colloids, triple layer charged precursor films, and Langmuir-Blodgett (LB) technique.[51] Furthermore, a number of methods have recently emerged allowing the production of linear patterns formed by colloids. A dynamic self-assembly technique involves electrostatic attraction between drop-cast sols on charged silicon wafer. This has been employed to produce lines of particles with controlled colloidal density.[51c] However, the nanoparticle lattices fabricated in this manner have a configurational disorder that is not easily reproduced. Thus, alterations in electrostatic repulsion, which is dependent upon the size and shape of each colloid, can affect the spacing between individual nanoparticles and, subsequently, pattern configuration.

Using monodispersed colloidal particles with attached peptide templates, monolayers of ordered particles will be prepared, used for electropolymerization, and subsequently removed. This will result in ordered pore nano array films with different morphologies that will be used for EC-SPR, EC-QCM, and SPR-QCM sensing. The morphology and order of the arrays will be controlled by the size and size distribution of the particles as well as the method of layering. On the other hand, the particles themselves will have tethered peptides of various composition (homogeneous, heterogeneous, combinatorial, etc.). It is important to pay particular attention to electrostatic interaction between colloidal particles and the electrode substrate surface to optimize order-control and arraying.

Methodology

Several Hypotheses can be Tested
1. The RCL-MIP process with dendrimers is advantageous over traditional MIP techniques because of the high surface area, rigidity, increased intermolecular interaction with the template peptide and the monomer, and the possibilities for phase-crosslinking optimization.
2. The use of the colloidal layer and peptide allows greater control for peptide surface orientation and composition in an RCL-MIP process. A high surface area is introduced since the peptide is made readily available from the surface of the colloid. There is more versatility for peptide screening based on functionalization density, architecture, size of particle, combination of particles, etc. The method if developed can be used to a wide number of surfaces and transducer elements
3. The use of both SPR and QCM techniques gives complementary optical and acoustic data for investigating the analyte sensing process resulting in better data correlation and quantification of sensor detection limits. It will allow the researchers to: (a) calculate interfacial density and refractive index (RI) values to distinguish from bulk media, (b) analyze changes on the viscoelastic properties with adsorbed analyte, (c) compare binding-dissociation kinetics, (d) distinguish the influence on the real and imaginary parts of the RI, and (e) investigate the influence on the swelling behavior of the array.
4. The EC-SPR set-up is a rational and convenient design for incorporating simultaneously the ability for optical and electrochemical sensing, monitor the electrodeposition of the CPN matrix, and electrochemical manipulation of the sensor film. The variation on the electrochemical parameters (potential, electrolyte, current, etc.) with electrostatic charging will allow control on the hydrophobicity, hydrophilicity, and porosity of the deposited CPN arrays because of their redox-doping behavior. Also, the use of electrostatic charging will affect the rebinding of the peptide depending on the charge of the exposed amino acids and conformational changes on the bound analyte.
5. The properties and detection limits of the sensors can be tuned and optimized by changing the: colloidal particle size and ordering, electrochemical deposition parameters (concentration, electrolyte, potential, cycles), dendrimer microstructure, and electroactive monomer composition.
6. The combinatorial methods in proteomics can be designed based on the rational use of a sub-set of peptide or epitope sequences as templates—that is associated for screening of biomarkers in diseases, synthetic hormones, proteases, etc. The composition of the colloidal templates can be varied rationally (both during functionalization and layering). The EC-SPR, SPR, and QCM data can be correlated with the variation of parameters and statistics of data that will be collected.

Experimental Methodology of Section VI

Synthesis of Monomer, Crosslinker, and Dendrimer

Dendrimers functionalized on the surface with electroactive monomers will be synthesized. A Frechet type convergent synthesis route may be used for the design of specific dendrimers and generations.[52] The electroactive monomers will be compatible for electrochemical cross-linking of the dendrimers and provide control on linear CP sequences that may determine redox-doping behavior. In self-assembly imprinting protocols, specificity is imbued by ionic interactions, H-bonding, and hydrophobic interactions all contributing to the three-dimensional geometry of the sites. The peptide sequence will be surrounded with the electroactive monomers during the pre-MIP self-assembly stage. The polar amine or acid groups are expected to allow association with the template prior to electropolymerization. The different heteroaromatic monomers are shown in FIG. 6.6. To begin with, the preparation of dendrimeric crosslinkers utilizing different generations of the polyamidoamine (PAMAM) scaffolds will be utilized. The combination with other monomers will result in the formation of various CPN matrices suitable for electrochemical REDOX studies.

Other dendrimer architectures, topology, and chemical structure will be explored together with different electropolymerizable monomers (pyrroles, aniline, carbazole, etc.). The PI's group has extensive experience in the synthesis of different dendrimer architectures and branching topologies as well as the CPN process.[53,55]

Surface Modification of Particles and Colloidal Layering

Monodispersed colloidal latex particles of different sizes (100, 250,500 nm, 1 mm, 2.5 mm) based on Polystyrene (PS), sulfonated PS, PMMA, PMMA-methacrylic acid and melamine resins (MF) capable of forming 2-D crystallized and highly packed monolayers on surfaces will be synthesized. It is important that these particles are soluble, after the RCL-MIP process. The particle size used also has limitations on the effective evanescent wave mode from the SPR but less for the QCM. The SPR mode is sensitive up to 200 nm (632.8 HeNe) and at 1 µm, thicknesses, more amenable to evanescent waveguide modes. These colloidal particles will be bioconjugated with oligo-peptides and epitopes of various sequences primarily through end-tethering at the N-terminus. The particles will have —OH and —COOH groups that will be activated and modified for bioconjugation. This will consist of amidation of activated esters or imine formation for attaching the peptide on the surface of the colloidal particles. Various particle sizes and epitopes will be rationally designed for combinatorial synthesis and analysis protocols that will be developed (FIG. 6.8).

For colloidal layering, many methods exist.[51] The most simple approach for producing colloidal monolayers is drop-casting a very dilute solution where the sol is simply added to the base substrate and the solvent left to evaporate, with the colloids remaining on the substrate surface. The degree of order in the pattern is primarily determined by the rate of evaporation and the dispersity of the particles. Other methods of colloid immobilization to produce in-plane nano-topographies will be explored including: spincoating, electrophoretic deposition, colloidal particle-surface electrostatic attraction, and Langmuir-Blodgett (LB) technique. The LB method will be utilized in the PI's lab specifically for effective control on the dewetting-drainage and withdrawing angle as a function of surface area from the air-water interface.

Electrochemical Molecular Imprinting and Colloid Dissolution

The PI's group has considerable experience with the precursor polymer cross-linking approach to form conjugated polymer network systems.[55] This includes co-monomer approaches with various compositions of an electropolymerizable precursor. Although conducting polymers have possible advantages for molecular recognition through redox control, they have been scarcely used as MIP polymer matrices. In principle, the dopant can determine the porosity (network spacing) primarily by changing polymer hydrophobicity with redox properties. This feature can be utilized to control selectivity and binding kinetics in these MI systems, i.e. correlate matrix redox properties with binding kinetics of the target molecule. It will be interesting to study these electrochemical properties (using a potentiostat/galvanostat electrochemical workstation) by cyclic voltammetry (CV), amperometry, potentiostatic methods, etc. MIP thin film arrays will be electrochemically deposited in situ on the Au surface of SPR or QCM (the Au working electrode) using CV or potentiostatic techniques. Adhesion can be improved with self-assembled monolayers (SAM)s. The MIP anodic electropolymerization (for heteroaromatic monomers) will utilize the dendrimers with carbazole, thiophene, aniline, and pyrrole, etc. The pre-organized peptide template-electroactive monomer complex will be mixed with the dendrimers along with a defined composition of other monomers and cross-linkers. Various types of electrosynthesized polymers based on molecular imprinting have been reported in the literature but rarely with dendrimers.[56-19]

The degree of crosslinking and mesoporous structure of the arrays will be controlled by the composition of the dendrimers and the electroactive monomers (comonomers). The addition of more monomers tends to increase the amount of linear CP species that are not cross-linked, changing the porosity and electrochemical activity of the materials.

After electrodeposition, the colloidal particles will be removed leaving arrays of triangular on the electrode surface that has been imbedded with the biopeptide template (FIG. 6.9). We will investigate composition, morphology, microstructure, thermal and mechanical stability, etc. for these arrays by atomic force microscopy (AFM), scanning electron microscopy (SEM), and X-ray photoelectron spectroscopy (XPS). It is possible to do the arraying procedure on indium tin oxide (ITO) to allow access for spectroscopic UV-vis and Fluorescence methods for characterizing the chemical composition of the arrays. Note that interesting features are expected based on the pillar array periodicity and refractive index that will make it of high interest for plasmonics and photonic structures. Some of the optical properties of these arrays can also be investigated using the SPR studies with different wavelengths of excitation. On the other hand, the mechanical properties as well as density measurements can be made with the QCM method (FIG. 6.10).

Sensor Fabrication and Investigation

Sensing studies will be done in three thin film sensor formats: a) SPR—change in the dielectric and optical properties, thickness; b) QCM—change in frequency, mass, and viscoelastic responses; c) electrochemical—change in potential, conductivity, current, and ion transport; A broad investigation on these sensor formats is necessary to realize the potential for point-sensor applications and combinatorial methods. Particular attention will be made on: sensor response time, linearity and range, sensitivity, calibration methods, and sensor drift. Structure-property relationships will be defined relating composition and structure to sensing properties, i.e. a feed-back loop for further combinatorial RCL-MIP[60] or modifications in the preparation protocol. The PI's group has experience in electrochemical[54,55], acoustic[62], evanescent waveguide[54], and surface plasmon spectroscopy studies.[63]

As surface analytical tools, SPR and QCM, each has its own specific strengths, weaknesses, and assumptions inherent in data collection and analysis. A combined QCM and SPR data collection and analysis allows one to take the advantage of the strengths, test the validity of the assumptions and gain a better understanding of a specific interfacial reaction. Both the peptide-imprinted and non-imprinted films will be tested. The signal output is a differential frequency between the coated and reference (uncoated) resonators. The sensitivity change is calculated as difference between the sensitivity of the imprinted and non-imprinted polymer divided by the sensitivity of the non-imprinted polymer. Sensitivity is defined as the slope of the calibration curves. Selectivity measurements will be done by both serial and simultaneous studies of different biopeptide sequences.

SPR and EC-SPR

Ultrathin films of the RCL-MIP arrays on the Au-reflecting surfaces (50 nm) on BK-7 or high R.I. glass, will be prepared by electropolymerization. These films can then be configured in an optical Kretchsman configuration experiment for SPR with array heights of 50-150 nm.[67] This will allow determination of changes in the dielectric constant (refractive index) and optical thickness (using a Fresnel algorithm) with specific and non-specific binding of molecules. The Advincula group have considerable experience in the development of SPR and waveguide techniques for investigating ultrathin films including the EC-SPR experiment.[54,63,65] Other groups have used these methods for a variety of optical sensing techniques.[68] The PI will investigate the sensing parameters correlating controlled thicknesses and height of the RCL-MIP sensing element, controlled solution buffer conditions, and experimental SPR conditions, i.e. primarily wavelength dependence.

During electrochemical deposition, the functional and cross-linking monomers are electropolymerized in the presence of template molecule using CV or potentiostatic electrodeposition at programmed compositions. The electropolymerization/electrochemical crosslinking will be simultaneously monitored with changes in the reflectivity indicating the growth of the film (change in thickness and/or dielectric constant) using EC-SPR. The characteristic changes at both reduction and oxidation states can be correlated with specific film formation events. Chronoamperometric measurements simultaneous with reflectivity allow the monitoring of film growth at specific potentials.

QCM

QCM will be used to detect mass changes in the nanogram range. The QCM device will consist of the input transducer, a chemical recognition layer, and an output transducer on a piezoelectric substrate. An acoustic wave traveling through the chemical film will have a characteristic frequency (attenuation of the signal) that is sensitive to the mass change and viscoelasticity of the film, allowing identification of the target analyte. The PI's group has experience in the use of QCM method to investigate these properties.[61]

In a QCM dissipation (QCM-D) method, the AT-cut piezoelectric quartz crystal is oscillated in shear mode at its fundamental resonant frequency by passing an alternating current through the crystal. The dissipation and resonant frequency of the crystal can be recorded in real time.[70] The measurement of changes in frequency and dissipation using QCM-D allows one to estimate the viscoelasticity of the non-elastic adsorbed layer by using Voigt viscoelastic model[71-73], which has been used to probe the rheological properties of proteins[74,75] and synthetic polymers[76-78] at the solid-liquid interface. To this regard, the PI's group will investigate the viscoelastic properties of the RCL-MIP arrays during formation as well as during the sensing experiments.

Electrochemical Sensors

This can be categorized as: (1) potentiometric (voltage); (2) amperometric (current); and (3) conductometric (conductivity) in sensing mechanism.[45,64] The electrochemical properties of the RCL-MIP array films with and without the templates will be investigated. The redox behavior can be investigated by CV. In principle, hydrophobicity and porosity can be controlled by electrochemical methods through electrostatic charging. This will allow controlled diffusion kinetics and reversibility of binding to the chemical recognition layer. The counter, working, reference electrodes and the rate (mV/sec) for the electrochemical cell will be optimized. The experiments will be straightforward since the same substrate is used for anodic electropolymerization (cross-linking) to form the MIP array-film. Thus, it is possible to study the composition and structure-property relationships for sensing with different redox states of the film. In particular, binding kinetics, ion transport, rate of charge/current injection, ion/solvent combinations and peptide concentrations will be investigated. Potentiometric sensing can be investigated by obtaining a chronopotentiogram, corresponding to an open-circuit potential response to incremental additions of the analyte. A potentiometric detection curve can be derived based on different analyte concentrations, ions, and solution conditions. Other electrochemical sensor systems can be investigated including spectroelectrochemistry on ITO.[64] A combined electrochemical surface plasmon spectroscopy (EC-SPR) can be used to investigate in-situ changes in the dielectric and optical response with an electrochemical experiment (FIG. 6.5). The Advincula group has published a number of papers on the use of this hyphenated technique.[65] Electrochemical-QCM will be used to investigate binding of the peptide with different reduced or oxidized forms of the MI material by determining mass (frequency) change as well.[66]

Peptide Analysis and Combinatorial Methods

The use of peptide and protein targets for MIP is a challenge due to their structural complexity and incompatibility with organic solvents used for imprinting.[79] Furthermore, as most MIP methods use target molecules as templates, it is critical to remove all template molecules before their use. The use of larger protein targets is a concern.[22] In principle, this can be overcome by utilizing "exposed" epitopes of proteins to imprint the capture site.[23] In this work, epitopes of proteins with exposed C-termini will be selected since it is a less frequent target for posttranslational modification. A number of oligopeptides are of interest both for environmental and disease monitoring as outlined at the beginning For epitopes, nonapeptides can be utilized as the sequence represents a more unique code in unstructured domains for identification of a specific protein. The choice of short epitopes focuses on developing capture agents for the primary structure of the peptide rather than the more-complex secondary and tertiary structures of a target protein. This approach should be similar to the use of peptide fragments to generate epitope selective antibodies in proteomics. Furthermore, the capture conditions can be designed to be compatible with the native protein structure.

Initially, we will investigate three protein targets that conform to the above criteria: cytochrome c (Cyt c), alcohol dehydrogenase (ADH), and bovine serum albumen (BSA (FIG. 6.11). The peptide sequences corresponding to the C-terminus domains of these proteins (Cyt c from bovine-heart amino acids 97-104, AYLKKATNE; ADH from yeast amino acids 339-347, GRYVVDTSK; and BSA amino acids 599-607, VVSTQTALA) will be used as the imprinting epitope/peptides. The nonapeptide will then be attached to the particles at the N-terminal amino acid. The attachment protocol is outlined in FIG. 6.11. The surface of the particle, with terminal carboxylic acid groups, will be activated with 1-ethyl-3-(3-dimethylaminopropyl)carbodiimide (EDC)/N-hydroxylsuccinimde (NHS) and then kept in a phosphate buffer. Other bioconjugation chemistries are possible depending on the particle surface functionality. The modified particles can be analyzed by IR, NMR, and XPS. XPS and elemental analysis together with thermogravimetric analysis (TGA) and titration analysis to allow calculation of the density of grafting. It is important that this protocol be established for subsequent grafting of homogeneous and heterogeneous compositions as well as with different latex particles.

The subsequent procedure will involve layering of the colloidal particles onto the electrode substrate and subsequent electropolymerization cross-linking as mentioned earlier. Control of the electrochemical cross-linking will allow high degrees of templating. Afterwards, the template particle-peptide will be removed by solvent dissolution to result in the formation of the pillar arrays. This solvent treatment can be coupled with electrochemical charging to ensure high template removal as well as fidelity of the cavity formed on the arrays.

For whole protein selective affinity studies, the RCL-MIP arrays will be immersed in a buffer solution containing a mixture five proteins (BSA, ADH, carbonic anhydrase (CA; from bovine erythrocytes, C-terminus NRQVRGFPK), trypsine inhibitor (T.I.; from soybean, C-terminus FQKLD- KESL), and Cyt c), gently mixed and incubated overnight.[23] Films will then be washed with phosphate buffer to remove material that was nonspecifically bound. This protocol will be used for selectivity measurements on any one of the template proteins. The mismatched proteins in general are expected to give a response below the detection limits of the experiment. The dominant protein that will be captured should correspond to the epitope that was used for imprinting.[23] The binding specificity of the epitope-imprinted matrix is based on complementary domain and cooperative multivalent interactions. Because of sequence complementarity, the number of H-bonding and dipole interactions between a specific target and a non-target protein should be distinguishable. Consequently, the binding strength will be high for the target and low for the non-target. To obtain more-quantitative information regarding protein binding to the imprinted polymer film, a protein adsorption isotherm will be constructed and the average, binding, $K_b$, and dissociation constant, $K_d$, will be calculated. For control, binding to a non-imprinted control film (templated particle only) will be investigated. The non-imprinted array film should give a baseline for non-specific binding. From the binding curve at the point of saturation, it is possible to calculate the degree analyte coverage of the RCL-MIP array film. The sensitivity of this method can also be determined by examining the tolerance to single amino acid mismatches in the target. For example, the native C-terminus of BSA (STQTALA)] and four single amino acid (STQAALA, STQLALA, STQEALA and STQYALA) mutations of template peptides will be compared. The sequences differed only at position four from the C-terminus sequence of BSA (STQTALA).

To demonstrate combinatorial library approaches, tripeptide RCL-MIP sequences will be used based on a peptide library generated from a collection of 60 cell lines derived from human tumors (NCI-60), that has been used as a tool for anti-cancer drug discovery.[80] The peptide sequences have been profiled from NCI-60 cell surfaces previously by high-throughput screening of a phage-displayed random peptide library which allowed classification of the cell lines according to the binding selectivity of 26,031 recovered tripeptide motifs. By analyzing selected cell-homing peptide motifs and their NCI-60 recognition patterns, it was possible to establish that some of these motifs (a) are similar to domains of human proteins known as ligands for tumor cell receptors and (b) segregate among the NCI-60 in a pattern correlating with expression profiles of the corresponding receptors. The results indicated that ligand-directed profiling of tumor cell lines can select functional peptides from combinatorial libraries based on the expression of tumor cell surface molecules. Using the approach mentioned above, it is possible to recreate a library for one single type of cancer cell line, e.g. NCI-H23 for lung cancer, based on imprinting of tri-peptides, e.g. RLS, RGV, RGS, RAV, RAS, GAG, AVS, etc. that can be statistically templated on individual particles or as batches of particles in a high throughput analysis. The sensor response and statistics from a mixture of tri-peptides corresponding to other cell lines can be differentiated from the SPR or QCM sensing result to verify the presence or absence for the particular biomarker for NCI-H23.

Embodiments of the present invention may be tailored through the rationally designed monomers and crosslinkers that form stable complexes with genres of bioactive peptides for effective RCL-MIP electropolymerization templating. Embodiments of the present invention may also be tailored for other REDOX mechanisms that occur during the electropolymerization that can eventually affect the templating and recognition process by reducing side reactions and stabilizing of peptides complexes. Embodiments of the present invention may be optimized during MIP film fabrication for highest analyste sensitivity and selectivity, colloid size, peptide density and cross-linker/monomer compositions. Embodiments of the present invention may be optimized for unique aspects of the transduction mechanism between the recognition element and the transducer in a combined electrochemical, SPR, and QCM sensing. Embodiments of the present invention may have optimized structure-property relationship of the molecularly imprinted materials with composition and sensor performance. Embodiments of the present invention may have optimized degrees of non-specific binding or minimized degrees of non-specific binging. Embodiments of the present invention may have optimized quantitation of sensor performance. Embodiments of the present invention may have optimized linear dynamic ranges and detection limits. Embodiments of the present invention may have optimized for extracting the templates from the RCL-MIP matrix. Embodiments of the present invention may provide stable and reusable molecularly imprinted polymer receptors for eventual point-of-care and network use. Embodiments of the present invention may miniaturized. Embodiments of the present invention may have optimized for sensors adapted for high-throughput screening and combinatorial library methods, comparative mass spectrometry, protein arrays and immuno-assays.

REFERENCES CITED IN SECTION VI

The following references were cited in Section VI:
13. (a) "Chemical Sensors and Biosensors", Eggins, B. Wiley Publishers; New York 2002, p. 1-298. (b) "Chemical Sensors Special Issue", Foote, C. S. Acc. Chem. Res., 1998, 31(5), 199-199.
14. "Survey of the year 2006 commercial optical biosensor literature", Rich, R. L., Myszka, D. G. J. Mol. Recognit., 2007, 20, 300-366.
15. "Bioactive proteins and peptides from food sources. Applications of bioprocesses used in isolation and recovery", Kitts, D. D., Weiler, K. Current Pharmaceutical Design, 2003, 9, 1309-1323.
16. "Handbook of Biologically Active Peptides", Kastin, A. J., Academic Press, New York 2006.
17. "Peptides: Chemistry and Biology", Sewald, N., Jakubke, H. D., Wiley-VCH Verlag, Weinheim 2002.
18. "Bioactive peptides: Production and functionality", Korhonen, H., Pihlanto, A. International Diary Journal, 2006, 16, 945-960.
19. "Mass Spectrometry for the quantification of bioactive peptides in biological fluids", Tamvakopoulos, C. Mass Spectrometry Reviews, 2007, 26, 389-402.
20. "A peptide-based immunoassay for anti-bodies against botulinum neutroxin A" Attasi, Z., Dolimbek, B., Deitiker, P., Jankovic, J., Aoki, R., J. Molec. Recognition. 2007, 20, 15-21.
21. "Application of micro- and nano-HPLC to the determination and characterization of bioactive and biomarker peptides", J. Sep. Sci., 2008, 31, 446-458.
22. "Capillary electrochromatography of proteins and peptides", Miksik, I., Sedlakova, P. J. Sep. Sci., 2007, 30, 1686-1703.
23. "Recent developments in capillary electrophoresis and capillary electrochromatography of peptides", Kasicka, V. Electrophoresis, 2006, 27, 142-175.

24. "Capturing molecules with templated materials—analysis and rational design of molecularly imprinted polymers", Wei, S., Jakusch, M., Mizaikoff, B. Anal. Chim. Acta., 2006, 578, 50-58.
25. "Molecularly Imprinted Polymers and Their Use in Biomimetic Sensors", Haupt, K., Mosbach, K. Chem. Rev., 2000, 100, 2495-2504.
26. "Imprinted polymers with memory for small molecules, proteins, or crystals" Sellergren, B. Angew Chem Int Ed Engl., 2000, 39, 1031-1037.
27. "Molecular imprinting within hydrogels", Byrne, M. E., Park, K., Peppas, N. A. Adv Drug Deliv Rev., 2002, 54, 149-161.
28. "Noncovalent molecular imprinting: antibody-like molecular recognition in polymeric network materials", Sellergren, B. Trends Anal Chem., 1997, 16, 310-320.
29. "Enantiomeric resolution on molecularly imprinted polymers prepared with only noncovalent and nonionic interactions", Andersson, L. I., Mosbach, K. J Chromatogr., 1990, 516, 313-322.
30. "Separation of amino acids, peptides and proteins on molecularly imprinted stationary phases", Kempe, M., Mosbach, K. J Chromatogr. A, 1995, 691, 317-323.
31. "Highly enantioselective and substrate-selective polymers obtained by molecular imprinting utilizing noncovalent interactions. NMR and chromatographic studies on the nature of recognition", Sellergren, B., Lepisto, M., Mosbach, K. J Am Chem. Soc., 1988, 110, 5853-5860.
32. "Molecular recognition in synthetic polymers: preparation of chiral stationary phases by molecular imprinting of amino acid amides", Andersson, L. I., O'Shannessy, D. J., Mosbach, K. J Chromatogr., 1990, 513, 167-179.
33. "Enantiomeric resolution of amino acid derivatives on molecularly imprinted polymers as monitored by potentiometric measurements", Andersson, L. I., Miyabayashi, A., O'Shannessy, D. J., Mosbach, K. J Chromatogr., 1990, 516, 323-331.
34. "Molecularly imprinted polymers for the recognition of proteins: the state of the art", Bossi, A., Bonini, F., Turner, A. P. F., Piletsky, S. A. Biosens. Bioelectron., 2007, 22, 1131-1137.
35. (a) "Towards molecularly imprinted polymers selective to peptides and proteins. The epitope approach", Rachkov, A., Minoura, N. Biochim. Biophys. Acta Protein Struct. M, 2001, 1544, 255-266. (b) "Selective protein capture by epitope imprinting" Nishino, H., Huang, C., Shea, K. Angew. Chem. Int. Ed. 2006, 45, 2392-2396
36. "Interfaces and thin films as seen by bound electromagnetic waves", Knoll, W. Annu Rev. Phys. Chem. 1998, 49, 569-638.
37. "In Applications of Piezoelectric Quartz Crystal Microbalances, Methods and Phenomena", Czanderna, A. W., Lu, C. 7th ed., Lu, C., Czanderna, A. W., Eds., Elsevier: New York, 1984.
38. "Acousto-electrical and surface plasmon resonant responses from NOX-doped Langmuir-Blodgett films of macrocycles", Odonnell, J., Honeybourne, C. L. J. Phys.: Condens. Matter, 1991, 3, S337-S346.
39. "Quartz Crystal Microbalance and Surface Plasmon Resonance Study of Surfactant Adsorption onto Gold and Chromium Oxide Surfaces", Caruso, F., Serizawa, T., Furlong, D. N., Okahata, Y. Langmuir, 1995, 11, 1546-1552.
40. "Comparison of the QCM and the SPR method for surface studies and immunological applications", Kosslinger, C., Uttenthaler, E., Drost, S., Aberl, F., Wolf, H., Brink, G., Stanglmaier, A., Sackmann, E. Sens. Actuators B., 1995, 24, 107-112.
41. "Comparison of surface plasmon resonance and quartz crystal microbalance in the study of whole blood and plasma coagulation", Vikinge, T. P., Hansson, K. M., Sandstrom, P., Liedberg, B., Lindahl, T. L., Lundstrom, I., Tengvall, P., Ho"o"k, F. Biosens. Bioelectron, 2000, 15, 605-613.
42. "Characterization of the swelling of acrylamidophenylboronic acid-acrylamide hydrogels upon interaction with glucose by Faradaic impedance spectroscopy, chronopotentiometry, quartz-crystal microbalance (QCM), and surface plasmon resonance (SPR) experiments", Gabai, R., Sallacan, N., Chegel, V., Bourenko, T., Katz, E., Willner, I. J. Phys. Chem. B., 2001, 105, 8196-8202.
43. "In Situ Evaluation of Density, Viscosity, and Thickness of Adsorbed Soft Layers by Combined Surface Acoustic Wave and Surface Plasmon Resonance", Francis, L. A., Friedt, J. M., Zhou, C., Bertrand, P. Anal. Chem., 2006, 78, 4200-4209.
44. "Growth of cadmium sulfide particles in cadmium arachidate films: monitoring by surface plasmon resonance, UV-visible absorption spectroscopy, and quartz crystal microgravimetry", Geddes, N. J., Urquhart, R. S., Furlong, D. N., Lawrence, C. R., Tanaka, K., Okahata, Y. J. Phys. Chem., 1993, 97, 13767-13772.
45. "Variations in coupled water, viscoelastic properties, and film thickness of a Mefp-1 protein film during adsorption and cross-linking: a quartz crystal microbalance with dissipation monitoring, ellipsometry, and surface plasmon resonance study", Hook, F., Kasemo, B., Nylander, T., Fant, C., Sott, K., Elwing, H. Anal. Chem., 2001, 73, 5796-5804.
46. "Combinational Application of Surface Plasmon Resonance Spectroscopy and Quartz Crystal Microbalance for Studying Nuclear Hormone Receptor-Response Element Interactions", Su, X. D., Lin, C. Y., O'Shea, S. J., Teh, H. F., Peh, W. Y. X., Thomsen, J. S. Anal. Chem., 2006, 78, 5552-5558.
47. "Simultaneous surface plasmon resonance and quartz crystal microbalance with dissipation monitoring measurements of biomolecular adsorption events involving structural transformations and variations in coupled water", Reimhult, E., Larsson, C., Kasemo, B., Hook, F. Anal. Chem., 2004, 76, 7211-7220.
48. "Simultaneous determination of optical and acoustic thicknesses of protein layers using surface plasmon resonance spectroscopy and quartz crystal microweighing", Laschitsch, A., Menges, B., Johannsmann, D. Appl. Phys. Lett., 2000, 77, 2252-2254.
49. "Using Surface Plasmon Resonance and the Quartz Crystal Microbalance to Monitor in Situ the Interfacial Behavior of Thin Organic Films", Bailey, L. E., Kambhampati, D., Kanazawa, K. K., Knoll, W., Frank, C. W. Langmuir, 2002, 18, 479-489.
50. (a) "Adsorption of pNIPAM Layers on Hydrophobic Gold Surfaces, Measured in Situ by QCM and SPR", Plunkett, M. A., Wang, Z. H., Rutland, M. W., Johannsmann, D. Langmuir, 2003, 19, 6837-6844. (b) "Combining Surface Plasmon Resonance and Quartz Crystal Microbalance for the in Situ Investigation of the Electropolymerization and Doping/Dedoping of Poly(pyrrole)", Bund, A., Baba, A., Berg, S., Johannsmann, D., Lubben, J., Wang, Z. H., Knoll, W. J. Phys. Chem. B, 2003, 107, 6743-6747, (c) "Quartz Crystal Microbalance with Integrated Surface Plasmon Grating Coupler", Zong, Y., Xu, F., Xiaodi, S., Knoll, W. Anal. Chem., 2008, 80, 5246-5250.
51. "Integration of polyaniline/poly(acrylic acid) films and redox enzymes on electrode supports: An in situ electrochemical/surface plasmon resonance study of the bioelectrocatalyzed oxidation of glucose or lactate in the integrated bioelectrocatalytic systems" Raitman, O., Katz, E., Bueckmann, A., Willner, I. J. Amer. Chem. Soc. 2002, 124, 6487-6496.
52. "Dendrimer Precursors for Nanomolar and Picomolar Real-Time SPR/Potentiometric Chemical Nerve Agent Sensing using Electrochemically Cross-linked Ultrathin Films" Taranekar, P., Baba, A., Park, J., Fulghum, T., Advincula, R. Adv. Funct. Mater. 2006, 16, 2000-2007.
53. "Handbook of Conducting Polymers", 2nd ed.; Skotheim, T. A., Elsenbaumer, R. L., Reynolds, J. R., Eds.; Marcel Dekker: New York, 1998.
54. (a) "Preparation of Soluble Polypyrrole Composites and Their Uptake Properties for Anionic Compounds" Chen, Z., Okimoto, A., Kiyonaga, T., Nagaoka, T., Anal. Chem., 1999, 71(9), 1834-1839. (b) "Electropolymerization of Pyrrole and Electrochemical Study of Polypyrrole. 5. Controlled Electrochemical Synthesis and Solid-State Transition of Well-Defined Polypyrrole Variants" Zhou, M., Pagels, M., Geschke, B., Heinze, J., J. Phys. Chem. B.; 2002, 106(39), 10065-10073.
55. "On-Chip Enzyme Immunoassay of a Cardiac Marker Using a Microfluidic Device Combined with a Portable Surface Plasmon Resonance System" Kurita, R., Yokota, Y., Sato, Y., Mizutani, F., Niwa, O. Anal. Chem. 2006, 78, 5525-5531.
56. "Electropolymerized Molecularly Imprinted Polymers as Receptor Layers in Capacitive Chemical Sensors" Panasyuk, T. L., Mirsky, V. M., Piletsky, S. A., Wolfbeis, O, S., Anal. Chem., 1999, 71(20), 4609-4613.
57. "Conjugated Polymer-Based Chemical Sensors" McQuade, D. T., Pullen, A. E., Swager, T. M. Chem. Rev., 2000, 100(7), 2537-2574.
58. "Electrochemical sensors based on molecularly imprinted polymers" Piletsky, S., Turner, A. Electroanalysis, 2002, 14 (5), 317-323.
59. (a) "Competitive Amperometric Morphine Sensor-based on an agarose immobilized Molecularly imprinted polymer", Kriz, D., Mosbach, K. Anal. Chim. Acta., 1995, 300 (1-3), 71-75 (b) "Preparation and characterization of composite polymers exhibiting both selective molecular recognition and electrical conductivity", Kriz, D., Andersson, L. I., Khayyami, M., Danielsson, B., Larsson, P-O., Mosbach, K. Biomimetics, 1995, 3, 81-90.
60. (a) "Convergent Dendrons and Dendrimers: from Synthesis to Applications" Grayson, S. M., Frechet, J. M. J., Chem. Rev., 2001, 101(12), 3819-3868. (b) "Dendritic Molecules. Concepts, Syntheses, Perspectives", Newkome, G. R., Moorefield, C. N., Vogtle, F., VCH: Weinheim, 1996.
61. "About Dendrimers: Structure, Physical Properties, and Applications"Bosman, A. W., Janssen, H. M., Meijer, E.W. Chem. Rev., 1999, 99(7), 1665-1688.
62. (a) "Dendrimers in Supramolecular Chemistry: From Molecular Recognition to Self-Assembly" Zeng, F., Zimmerman, S., Chem. Rev., 1997, 97(5), 1681-1712. (b) "Synthetic hosts by monomolecular imprinting inside dendrimers", Zimmerman, S. C., Wendland, M. S., Rakow, N. A., Zharov, I., Suslick, K. S, Nature, 2002, 418(6896), 399-403.
63. (a) "Colloidal lithography and current fabrication techniques producing in-plane nanotopography for biological applications" Wood, M. A. J. R. Soc. Interface 2007, 4, 1-17. (b) "Ordered Micro/Nanostructured Arrays Based on the Monolayer Colloidal Crystals" Li, Y., Cai, W., Duan, G., Chem. Mater. 2008, 20, 615-624. (c) "Dynamic Self-Assembly of Polymer Colloids To Form Linear Patterns" Ray, M. A., Kim, H., Jia, L. Langmuir 2005, 21, 4786-4789.
64. "Preparation of polymers with controlled molecular architecture. A new convergent approach to dendritic macromolecules", Hawker, C. J., Frechet, J. M. J. Am. Chem. Soc., 1990, 112(21), 7638-7647.
65. (a) "A First Synthesis of Thiophene Dendrimers" Xia, C., Fan, X., Locklin, J., Advincula, R. C., Org. Lett., 2002, 4(12), 2067-2070. (b) related work: "Design and Synthesis of Photoresponsive Poly(benzyl ester) Dendrimers with all-Azobenzene Repeating Units", Wang, S., Advincula, R. C., Org. Lett., 2001, 3(24), 3831-3834. (c) "Investigating Carbazole Jacketed Precursor Dendrimers Sonochemical Synthesis, Characterization, and Electrochemical Crosslinking Properties" Taranekar, P.; Fulghum, T.; Patton, D.; Ponnapati, R.; Clyde, G.; Advincula, R. J. Am. Chem. Soc. 2007, 129, 12537-12548. (d) "Conjugated Polymer Nanoparticles via Intra-molecular Cross-linking of Dendrimeric Precursors" Taranekar, P.; Park, J.; Patton, D.; Fulghum, T.; Ramon, G.; Advincula, R. Adv. Mater. 2006, 18, 2461-2465.
66. "Evanescent Waveguide and Photochemical Characterization of Azobenzene-Functionalized Dendrimer Ultrathin Films", Patton, D., Park, M.-K., Wang, S., Advincula, R. C. Langmuir, 2002, 18(5), 1688-1694.
67. (a) "Ultrathin Film Electrodeposition of Polythiophene Conjugated Networks through a Polymer Precursor Route" Xia, C., Fan, X., Park, M.-K., Advincula, R. C. Langmuir, 2001, 17(25), 7893-7898. (b)"Polymethacrylate Functionalized Polypyrrole Network Films on Indium Tin Oxide: Electropolymerization of a Precursor Polymer and Comonomer" Deng, S., Advincula, R. C. Chem. Mater., 2002, 14(10), 4073-4080. (c) "Distinct Surface Morphologies of Electropolymerized Polymethylsiloxane Network Polypyrrole and Comonomer Films", Taranekar, P., Fan, X., Advincula, R. Langmuir, 2002, 18(21), 7943-7952. (d) "Electro-Copolymerization of Layer-by-Layer Deposited Polythiophene and Polycarbazole Precursor Ultrathin Films"Waenkaew, P.; Taranekar, P.; Phanichphant, P.; Advincula, R. Macrom. Rapid Comm. 2007, 28, 1522-1527. (e) "Quantitative Electrochemical and Electrochromic Behavior of Terthiophene and Carbazole Containing Conjugated Polymer Network Film Precursors: EC-QCM and EC-SPR" Taranekar, P.; Fulghum, T.; Baba, A.; Patton, D.; Advincula, R. Langmuir—2007, 23, 908-917. (f) "Conjugated Poly(phenylacetylene) Films Cross-Linked with Electropolymerized Polycarbazole Precursors" Fulghum, T.; Karim, S.; Baba, A.; Taranekar, P.; Nakai, T.; Masuda, T.; Advincula, R. Macromolecules 2006, 39, 1467-1473.
68. "Molecularly Imprinted Electrosynthesized Polymers: New Materials for Biomimetic Sensors", Malitesta, C., Losito, I., Zambonin, P. G. Anal. Chem., 1999, 71, 1366-1370.

69. "Electropolymerized molecularly imprinted polymers as receptor layers in capacitive chemical sensors", Panasyuk, T. L., Mirsky, V. M., Piletsky, S. A., Wolfbeis, O, S. Anal. Chem., 1999, 71, 4609-4613.
70. "Potential-induced enantioselective uptake of amino acid into molecularly imprinted overoxidized polypyrrole", Deore, B., Chen, Z. D., Nagaoka, T. Anal. Chem., 2000, 72, 3989-3994.
71. "Development of a new atropine sulfate bulk acoustic wave sensor based on a molecularly imprinted electrosynthesized copolymer of aniline with o-phenylenediamine", Peng, H., Liang, C. D., Zhou, A. H., Zhang, Y. Y., Xie, Q. J., Yao, S. Z. Anal. Chim. Acta., 2000, 423, 221-228.
72. "Combinatorial Molecular Imprinting: An Approach to Synthetic Polymer Receptors" Takeuchi, T., Fukuma, D., Matsui, J., Anal. Chem., 1999, 71(2), 285-290.
73. (a) "Adsorption Behavior of Polystyrene-Polyisoprene Diblock Copolymers with Zwitterionic Groups Using Quartz Crystal Microbalance: Effect of Different Microstructures" Park, M.-K., Youk, J. H., Pispas, S., Hadjichristidis, N., Advincula, R. Langmuir, 2002, 18(21), 8040-8044. (b) "Polyelectrolyte Adsorption Processes Characterized In Situ Using the Quartz Crystal Microbalance Technique: Alternate Adsorption Properties in Ultrathin Polymer Films", Advincula, R., Baba, A., Kaneko, F. Colloids and Surfaces: A. Physicochemical and Engineering Aspects, 2000, 173, 39-49. (c) "Adsorption Properties of Polyelectrolytes in Ultrathin Multilayer Assemblies: Investigations using the Quartz Crystal Microbalance (QCM) Technique", Advincula, R., Baba, A., Kaneko, F. Polymer Prep. (Am. Chem. Soc., Div. Polym. Chem.), 1999, 40, 488. (d) "Functional Ultrathin Multilayer Assemblies: Adsorption Properties of Charged Azo Dyes and Polyelectrolytes Investigated using the Quartz Crystal Microbalance (QCM) Technique", Advincula, R., Baba, A., Kaneko, F. Polym Mat. Sci. Eng. Prep.(Am. Chem. Soc., Div. PMSE), 1999, 81, 95. (e) "Block Copolymer Amphiphiles of Different Architectures Investigated using the Quartz Crystal Microbalance (QCM) Technique: In-situ Investigation of Adsorption Properties", Advincula, R., Park, M., Baba, A., Kaneko, F., Yang, J., Mays, J. Polymer Prep.(Am. Chem. Soc., Div. Polym. Chem.), 1999, 40, 1001. (f) "Subphase Adsorption of Polyelectrolyte Block Copolymer Amphiphiles at the Air-Water Interface: In-situ Investigations using the Quartz Crystal Microbalance Technique and the Langmuir-Blodgett Trough", Advincula, R., Park, M., Yang, J., Mays, J. Polymer Prep.(Am. Chem. Soc., Div. Polym. Chem.), 1999, 40, 1084. (g) "In-Situ Adsorption Studies of Functionalized Poly (Styrene-B-Isoprene) With Zwitterionic Groups Correlation With Quartz Crystal Microbalance (QCM) and Surface Plasmon Spectroscopy (SPS)", Advincula, R., Pispas, S., Hadjichristides, N., Park, M., Youk, J. Polymer Prep. (Am. Chem. Soc., Div. Polym. Chem.), 2001, 42, 1, 283.
74. "Evanescent Waveguide and Photochemical Characterization of Azobenzene-Functionalized Dendrimer Ultrathin Films", Patton, D., Park, M.-K., Wang, S., Advincula, R. C. Langmuir, 2002, 18(5), 1688-1694.
75. (a) "In Situ Investigations on the Electrochemical Polymerization and Properties of Polyaniline Thin Films by Surface Plasmon Optical Techniques", Baba, A., Advincula, R. C., Knoll, W. J. Phys. Chem. B., 2002, 106(7), 1581-1587. (b) "In Situ Investigations of Polymer Self-Assembly Solution Adsorption by Surface Plasmon Spectroscopy", Advincula, R., Aust, E., Meyer, W., Knoll, W., Langmuir, 1996, 12(15), 3536-3540. (c) "Fabrication and Surface Plasmon Resonance (SPR) Properties of Polystyrene Microsphere Thin Film Arrays", Shinbo, R., Miyabayashi, S., Kato, K., Tanaka, M.,_Advincula, R., Kaneko, F. Polymer Prep. (Am. Chem. Soc., Div. Polym. Chem.), 2002, 43, 39. (d) "In-situ Investigations on Electrochemical Deposition and Properties of Polyaniline Ultrathin Films Electrochemical—Surface Plasmon Resonance Spectroscopy Using Two Wavelengths", Stefani, F., Baba, A., Knoll, W., Xia, C., Advincula, R. Polymer Prep. (Am. Chem. Soc., Div. Polym. Chem.), 2002, 43, 424, (e) "In-situ Investigations on Electrodeposition and Electrochromic Properties of Poly(3,4-ethylenedioxythiophene) (PEDOT) by Surface Plasmon Spectroscopy (SPS)", Baba, A., Xia, C., Advincula, R., Knoll, W. Polym Mat. Sci. Eng. Prep. (Am. Chem. Soc., Div. PMSE), 2002, 86, 65. (f) "In-situ Investigation of Adsorption Properties of Block-Copolymer Amphiphiles by Surface Plasmon Spectroscopy (SPS)", Advincula, R., Holloway, C., Wang, Y., Stepleton, S., Park, M-K., Youk, J., Yang, J., Knoll, W., Mays, J. Polymer Prep. (Am. Chem. Soc., Div. Polym. Chem.), 2001, 42 (1), 285.
76. (a) "Electrochemical Sensors", Bakker, E., Telting-Diaz, M., Anal. Chem., 2002, 74(12), 2781-2800. (b) "Spectroelectrochemical Sensing Based on Multimode Selectivity Simultaneously Achievable in a Single Device. 5. Simulation of Sensor Response for Different Excitation Potential Waveforms", Slaterbeck, A. F., Stegemiller, M. L., Seliskar, C. J., Ridgway, T. H., Heineman, W. R. Anal. Chem.,; 2000, 72(22), 5567-5575. (c) "Electrochemical and ultraviolet-visible spectroelectrochemical investigation of selectivity of potentiometric gas sensors based on polypyrrole", Josowicz, M., Janata, J., Ashley, K., Pons, S. Anal. Chem., 1987, 59(2), 253-258.
77. (a) "Quantitative Electrochemical and Electrochromic Behavior of Terthiophene and Carbazole Containing Conjugated Polymer Network Film Precursors: EC-QCM and EC-SPR" Taranekar, P.; Fulghum, T.; Baba, A.; Patton, D.; Advincula, R. Langmuir—2007, 23, 908-917. (b) "Electropolymerization and Doping/dedoping Properties of Polyaniline Thin Films as Studied by Electrochemical-surface Plasmon Spectroscopy and by the Quartz Crystal Microbalance" Baba, A.; Tian, S.; Stefani, F.; Xia, C.; Wang, Z.; Advincula, R.; Johannsmann, D.; Knoll, W. J. Electroanalytical Chem. 2004, 562, 95-103. (c) "Simultaneous Surface Plasmon Optical and Electrochemical Investigation of Layer-by-Layer Self-Assembled Conducting Ultrathin Polymer Films", Baba, A., Park, M.-K., Advincula, R. C., Knoll, W. Langmuir, 2002, 18(12), 4648-4652. (d) "In Situ Investigations of the Electrodeposition and Electrochromic Properties of Poly(3,4-ethylenedioxythiophene) Ultrathin Films by Electrochemical-Surface Plasmon Spectroscopy", Xia, C., Advincula, R. C., Baba, A., Knoll, W. Langmuir, 2002, 18(9), 3555-3560. (e) "In-situ Investigations on Electrochemical Deposition and Properties of Polyaniline Ultrathin Films: Electrochemical—Surface Plasmon Resonance Spectroscopy Using Two Wavelengths", Stefani, F., Baba, A., Knoll, W., Xia, C., Advincula, R. Polymer Prep. (Am. Chem. Soc., Div. Polym. Chem.), 2002, 43, 424

(f) "Investigating Electropolymerization Process of Conducting Polymer Ultrathin Films by Surface Plasmon Field-Enhanced Light-Scattering", Baba, A., Advincula, R., Knoll, W. Polym Mat. Sci. Eng. Prep. (Am. Chem. Soc., Div. PMSE), 2001, 85, 21 (g) "Electropolymerization process of aniline: Investigations using surface plasmon optical techniques", Baba, A., Advincula, R., Knoll, W. Polym Mat. Sci. Eng. Prep. (Am. Chem. Soc., Div. PMSE), 2001, 84, 674-675.

78. "Electrochemical Polymerization and Depolymerization of 2,5-Dimercapto-1,3,4-thiadiazole. QCM and Spectroscopic Analysis", Tatsuma, T., Yokoyama, Y., Buttry, D. A., Oyama, N. J. Phys. Chem. B.,; 1997, 101(38), 7556-7562.

79. "Interfaces and Thin Films as seen by bound electromagnetic waves", Knoll, W. Ann Rev. of Phys. Chem., 1998, 49, 569.

80. (a) "Waveguides as chemical sensors", Dessy, R. Anal. Chem., 1989, 61(19), 1079A-1094A. (b) "Molecularly Imprinted Polymers and Infrared Evanescent Wave Spectroscopy. A Chemical Sensors Approach", Jakusch, M., Janotta, M., Mizaikoff, B., Mosbach, K., Haupt, K., Anal. Chem., 1999, 71(20), 4786-4791.

81. (a) "Molecular-Imprinted, Polymer-Coated Quartz Crystal Microbalances for the Detection of Terpenes", Percival, C. J., Stanley, S., Galle, M., Braithwaite, A., Newton, M. I., McHale, G. M., Hayes, W. Anal. Chem., 2001, 73(17), 4225-4228. (b) "A selective SAW-based organophosphonate chemical sensor employing a self-assembled, composite monolayer: a new paradigm for sensor design", Kepley, L., Crooks, R., Ricco, A. Anal. Chem., 1992, 64(24), 3191-3193.

82. "Quartz crystal microbalance setup for frequency and Q-factor measurements in gaseous and liquid environments", Rodahl, M., Höök, F., Krozer, A., Brzezinski, P., Kasemo, B. Rev. Sci. Instrum., 1995, 66, 3924-3930.

83. "Viscoelastic acoustic response of layered polymer films at fluid-solid interfaces: continuum mechanics approach", Voinova, M., Rohdal, M., Jonson, M., Kasemo, B. Phys. Scri., 1999, 59, 391-396.

84. "Viscoelastic modeling of template-directed DNA synthesis", Stengel, G., Höök, F., Knoll, W. Anal. Chem., 2005, 77, 3709-3714.

85. "Swelling of a polymer brush probed with a quartz crystal resonator", Domack, A., Prucker, O., Riihe, J., Johannsmann, D. Phys. Rev. E, 1997, 56, 680-689.

86. "Variations in coupled water, viscoelastic properties, and film thickness of a Mefp-1 protein film during adsorption and cross-linking: a quartz crystal microbalance with dissipation monitoring, ellipsometry, and surface plasmon resonance study", Höök, F., Kasemo, B., Nylander, T., Fant, C., Sott, K., Elwing, H. Anal. Chem., 2001, 73, 5796-5804.

87. "Influence of collagen denaturation on the nanoscale organization of adsorbed layers", Gurdak, E., Booth, J., Roberts, C. J., Rouxhet, P. G., Dupont-Gillain, C. C. J. Colloid Interface Sci., 2006, 302, 475-484.

88. "Adsorption Behavior and Cross-Linking of EHEC and HM-EHEC at Hydrophilic and Hydrophobic Modified Surfaces Monitored by SPR and QCM-D", Hedin, J., Löfroth, J.-E., Nyden, M. Langmuir, 2007, 23, 6148-6155.

89. "Adsorbed Gels versus Brushes: Viscoelastic Differences", Dutta, A. K., Belfort, G. Langmuir, 2007, 23, 3088-3094.

90. "Analysis of Interpenetrating Polymer Networks via Quartz Crystal Microbalance with Dissipation Monitoring", Irwin, E. F., Ho, J. E., Kane, S. R., Healy, K. E. Langmuir, 2005, 21, 5529-5536.

91. "Molecular imprinting ofpeptides and proteins in aqueous media" Janiak, D., Kofinas, P. Anal Bioanal. Chem. 2007, 389:399-404.

92. "Ligand-Directed Surface Profiling of Human Cancer Cells with Combinatorial Peptide Libraries" Kolonin, M., Boyer, L., Sun, J., Zurita, A., Do, K., Landenranta, J., Cardo'-Vila, M., Giordano, R., Jaalouk, D., Ozawa, M., Moya, C., Souza, G., I. Staquicini, F., Kunyiasu, A., Scudiero, D., Holbeck, S., Sausville, E., Arap, W., Pasqualini, R. Cancer Res 2006 66, 34-40.

93. (a) "Nanostructured Sexithiophene/Clay Hybrid Multilayers: A Comparative Structural and Morphological Characterization" Fan, X.; Locklin, J.; Youk, J. H.; Blanton, W.; Xia, C.; Advincula, R. Chem. Mater. 2002, 14, 2184-2191. (b) "In-Plane Photoalignment of Liquid Crystals by Azobenzene-Polyelectrolyte Layer-by-Layer Ultrathin Films," Park, M.-K.; Advincula, R.* Langmuir; 2002, 18, 4532-4535. (c) "In Situ Investigations of the Electrodeposition and Electrochromic Properties of Poly(3,4-ethylenedioxythiophene) Ultrathin Films by Electrochemical-Surface Plasmon Spectroscopy" Xia, C.; Advincula, R.*; Baba, A.; Knoll, W. Langmuir 2002, 18, 3555-3560. (d) "Synthesis and Oxidative Cross-Linking of Fluorene-Containing Polymers to Form Conjugated Network Polyfluorenes: Poly (fluoren-9,9-diyl-alt-alkan-a,w-diyl)" Inaoka, S.; Advincula, R.* Macromolecules 2002, 35, 2426-2428. (e) "Preparation of Aggregation Stable Gold Nanoparticles Using Star-Block Copolymers" Youk, J. H.; Park, M.-K.; Locklin, J.; Advincula, R.*; Yang, J.; Mays, J.; "Langmuir 2002, 18, 2455-2458. (f) "A First Synthesis of Thiophene Dendrimers" Xia, C.; Fan, X.; Locklin, J.; Advincula, R.* Org. Lett. 2002, 4, 2067-2070. (g) "In-Plane Photoalignment of Liquid Crystals by Azobenzene-Polyelectrolyte Layer-by-Layer Ultrathin Films" Park, M.-K.; Advincula, R.* Langmuir 2002, 18, 4532-4535. (h) "Simultaneous Surface Plasmon Optical and Electrochemical Investigation of Layer-by-Layer Self-Assembled Conducting Ultrathin Polymer Films" Baba, A.; Park, M.-K.; Advincula, R.*; Knoll, W.* Langmuir 2002, 18, 4648-4652. (i)"Nanostructured Ultrathin Films of Water-soluble Sexithiophene Bolaform Amphiphiles Prepared Using Layer-by-Layer Self-Assembly" Advincula, R.*; Locklin, J.; Youk, J.; Xia, C.; Park, M.-K.; Fan, X Langmuir 2002, 18, 877-883. (j) "Distinct Aggregation and Fluorescence Properties of a Water-Soluble Oligothiophene (6TN) Bolaform Amphiphile" Xia, C.; Locklin, J.; Youk, J.; Fulghum, T.; Advincula, R.* Langmuir 2001, 18, 955-957. (k) "Ultrathin Film Electrodeposition of Polythiophene Conjugated Networks through a Polymer Precursor Route" Xia, C.; Fan, X.; Park, M.-K.; Advincula, R.* Langmuir 2001, 17, 7893-7898.

94. "Simultaneous in situ electrochemical, surface plasmon optical, and atomic force microscopy measurements: Investigation of conjugated polymer electropolymerization" Baba, A.; Knoll, W.; Advincula, R. Rev, Sci. Inst. 2006, 77, 064101.

95. "Dendrimer Precursors for Nanomolar and Picomolar Real-Time SPR/Potentiometric Chemical Nerve Agent Sensing using Electrochemically Cross-linked Ultrathin Films" Taranekar, P.; Baba, A.; Park, J.; Fulghum, T.; Advincula, R. Adv. Funct. Mater. 2006, 16, 2000-2007.
96. (a) "Polyfluorene Copolymer and Carbazole-Thiol Capped Au-Nanoparticle Nanocomposite Films: Electrochemical Cross-linking and Energy Transfer Properties" Taranekar, P.; Huang, C.; Fulghum, T. M.; Baba, A.; Park, J.; Jiang, G.; Advincula, R. Adv. Funct. Mater. 2008, 18, 347-354. (b) "Signal Enhancement and Tuning of Surface Plasmon Resonance in Au Nanoparticle/Polyelectrolyte Ultrathin Films" Jiang, G.; Baba, A.; Ikarashi, H.; Xu, R.; Locklin, J.; Kashif, K. R.; Shinbo, K.; Kato, K.; Kaneko, F.; Advincula, R. J. Phys. Chem. C. 2007, 111, 18687-18694. (c) "Ultrathin Network LB Films of Carbazole Functionalized Poly(p-phenylenes) by Electropolymerization" Ravindranath, R.; Ajikumar, P.; Baba, A.; Bahuleyan, S.; Hanafiah, N.; Advincula, R.; Knoll, W.; Valiyaveettil, S. J. Phys. Chem. B. 2007, 111, 6336-6343. (d) "Electro-Copolymerization of Layer-by-Layer Deposited Polythiophene and Polycarbazole Precursor Ultrathin Films" Waenkaew, P.; Taranekar, P.; Phanichphant, P.; Advincula, R. Macrom. Rapid Comm. 2007, 28, 1522-1527. (e) "Quantitative Electrochemical and Electrochromic Behavior of Terthiophene and Carbazole Containing Conjugated Polymer Network Film Precursors: EC-QCM and EC-SPR" Taranekar, P.; Fulghum, T.; Baba, A.; Patton, D.; Advincula, R. Langmuir—2007, 23, 908-917. (f) "Nanopatterning and Fabrication of Memory Devices from Layer-by-Layer Poly(3,4-ethylenedioxythiophene): Poly (styrene sulfonate) (PEDOT: PSS) Ultrathin Films" Jiang, J.; Baba, A.; Advincula, R. Langmuir 2007, 23, 817-825. (g) "Fabrication and Characterization of Multilayer Films from Amphiphilic Poly(p-phenylene)s" Ravindranath, R.; Ajikumar, P.; Advincula, R.; Knoll, W.; Valiyaveettil, S. Langmuir 2006, 22, 9002-9008. (h) "Electro-Nananopatterning of Surface Relief Gratings (SRG)s on Azobenzene Layer-by-Layer Ultrathin Films by Current-sensing Atomic Force Microscopy" Baba, A.; Jiang, G.; Park, K.; Park, J.; Shin, H.; Advincula, R. J. Phys. Chem. 2006, 110, 17309-17314 (i) "Pinacolyl Methyl Phosphonate (PMP) detection by Molecularly Imprinted Polymers: A labile covalent bonding approach" Taranekar, P.; Huang, C.; Advincula, R. Polymer 2006, 47, 6485-6490. (j) "Structure and Band-Gap Design of a New Series of Light-Emitting Poly(cyanofluorene-alt-o/m/p-phenylenevinylene)-Based Copolymers for Light-Emitting Diodes" Taranekar, P.; Abdulbaki, M.; Krishnamoorti, R.; Phanichphant, S.; Waenkaew, P.; Patton, D.; Fulghum, T.; Advincula, R. Macromolecules 2006, 39, 3848-3854. (k) "Electrochemically Nanopatterned Conducting Coronas of a Conjugated Polymer Precursor: SPM Parameters and Polymer Composition" Jegadesan, S.; Sindhu, S.; Advincula, R.; Valiyaveettil, S. Langmuir 2006, 22, 3807-3811. (l) "Nanopatterning and Nanocharge Writing in Layer-by-Layer Quinquethiophene/Phthalocyanine Ultrathin Films" Baba, A.; Locklin, J.; Xu, R.; Advincula, R. J. Phys. Chem. B. 2006, 110, 42-45. (m) "Direct Electrochemical Nanopatterning of Polycarbazole Monomer and Precursor Polymer Films Ambient Formation of Thermally Stable Conducting Nanopatterns" Jegadesan, S.; Sindhu, S.; Advincula, R.; Valiyaveettil, S. Langmuir 2006, 22, 780-786.

While the invention described here specifically relates to the design, fabrication, characterization, and use of new types of electrodeposited polymer coatings that offer both unique reversible wettability and electro-optical properties, one of ordinary skills in the art, with the benefit of this disclosure, would recognize the extension of this design to non-conducting polymers such as but not limited to acrylate, styrene, vinyl functional groups via cathodic, and other classes of materials.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:
1. A method comprising:
forming a conducting layer on a surface of a substrate,
anodic electropolymerizing one electropolymerizable monomer or a plurality electropolymerizable monomers onto the conducting layer in the presence of an analyte to form a sensor film including analyte releasable monomer complexes, wherein the analyte is selected from the group consisting of a molecular analyte, a drug, and a peptide, and
removing the analyte from the releasable complexes in the sensor film via an electrochemically mediated wash to form a sensor film including complimentary template-shaped cavities,
wherein each of the monomers includes a terthiophene (3T) electropolymerizable group or a carbazole (CBz) electropolymerizable group and a $CH_2COOH$ pendant group, a $CH_2CH_2OH$ pendant group, a $CH_2OH$ pendant group, or a $CH_2NH_2$ pendant group and are selected from the group consisting of 2-(2,5-di(thiophen-2-yl)thiophen-3-yl)acetic acid (G0-3T$CH_2$COOH), 2-(2,5-di(thiophen-2-yl)thiophen-3-yl)ethanol (G0-3T$CH_2CH_2$OH), 3,5-bis(2-(2,5-di(thiophen-2-yl)thiophen-3-yl)ethoxy)phenyl)methanol (G1-3T $CH_2$OH), 3,5-bis(2-(2,5-di(thiophen-2-yl)thiophen-3-yl)ethoxy)phenyl)methamine (G1-3T $CH_2NH_2$), 3,5-bis(4-(9H-carbazol-9-yl)butoxy)methanol (G1-CBz$CH_2$OH), 3,5-bis(4-(9H-carbazol-9-yl)butoxy)methamine (G1-CBz$CH_2NH_2$), and mixtures thereof.

2. The method of claim 1, further comprising:
prior to anodic electropolymerizing, depositing one type of templating particle or plurality of types of templating particles on the conducting layer to influence a morphology of the sensor film, and
after anodic electropolymerizing, removing the particles so that the sensor fil has an open structure.

3. The method of claim 1 wherein:
the molecular analyte comprise molecules with functional groups that interact with the monomers pendant groups to form releasable intermolecular association complexes within the sensor film;
the peptide include any peptide with functional groups that interact with the monomer pendant groups to form releasable intermolecular associated complexes within the sensor film; and
the drug comprises any drug with functional groups that interact with the monomer pendant groups.

4. The method of claim 1, wherein the sensor film has a thickness between 2 nm and 12 nm.

5. The method of claim 2, further comprising:
injecting a template onto the film, and
measuring real-time changes in properties of the sensor film due to template binding to the film using (a) SPR spectroscopy or (b) QCM sensing, wherein the sensor film is situated in the electrochemical SPR apparatus or the electrochemical QCM apparatus.

6. The method of claim 5, wherein:
the molecular analyte comprise molecules with functional groups that interact with the monomers pendant groups to form releasable intermolecular association complexes within the sensor film;
the peptide include any peptide with functional groups that interact with the monomer pendant groups to form releasable intermolecular associated complexes within the sensor film; and
the drug comprises any drug with functional groups that interact with the monomer pendant groups to form releasable intermolecular association complexes within the sensor film.

7. The method of claim 5, wherein a concentration range of the template is from 10 µM to 50 µM and the sensor film has a thickness between 2 nm and 12 nm.

8. The method of claim 1, further comprising:
injecting a template onto the sensor film, wherein the film is situated in an electrochemical Surface Plasmon Resonance (SPR) apparatus or an electrochemical Quartz Crystal Microbalance (QCM) apparatus.

9. The method of claim 8, wherein:
the molecular analyte comprise molecules with functional groups that interact with the monomers pendant groups to form releasable intermolecular association complexes within the sensor film;
the peptide include any peptide with functional groups that interact with the monomer pendant groups to form releasable intermolecular associated complexes within the sensor film; and
the drug comprises any drug with functional groups that interact with the monomer pendant groups to form releasable intermolecular association complexes within the sensor film.

10. The method of claim 9, wherein a concentration range of the template is from 10 µM to 50 µM and the film has a thickness between 2 nm and 12 nm.

11. A method comprising:
forming a conducting layer on a surface of a substrate,
anodic electropolymerizing one electropolymerizable monomer or a plurality electropolymerizable monomers onto the conducting layer in the presence of an analyte to form a sensor film including analyte releasable monomer complexes, wherein the analyte is selected from the group consisting of drug, and a peptide,
removing the analyte from the releasable complexes in the sensor film via an electrochemically mediated wash to form a sensor film including complimentary template-shaped cavities,
injecting a template onto the sensor film, wherein the film is situated in an electrochemical Surface Plasmon Resonance (SPR) apparatus or an electrochemical Quartz Crystal Microbalance (QCM) apparatus, and
measuring a response to the injected template using (a) SPR spectroscopy or (b) QCM sensmg,
wherein each of the monomers includes a terthiophene electropolymerizable group or a carbazole electropolymerizable group and a $CH_2COOH$ pendant group, a $CH_2CH_2OH$ pendant group, a $CH_2OH$ pendant group, or a $CH_2NH_2$ pendant group and are selected from the group consisting of 2-(2,5-di(thiophen-2-yl)thiophen-3-yl)acetic acid (G0-3TCH$_2$COOH), 2-(2,5-di(thiophen-2-yl)thiophen-3-yl)ethanol (G0-3TCH$_2$CH$_2$OH), 3,5-bis(2-(2,5-di(thiophen-2-yl)thiophen-3-yl)ethoxy)phenyl)methanol (G1-3TCH$_2$OH), 3,5-bis(2-(2,5-di(thiophen-2-yl)thiophen-3-yl)ethoxy)phenyl)methamine (G 1-3TCH2NH2), 3,5-bis(4-(9H-carbazol-9-yl)butoxy)methanol (G1-CBzCH$_2$OH), 3,5-bis(4-(9H-carbazol-9-yl)butoxy)methamine (G1-CBzCH$_2$NH$_2$), and mixtures thereof.

12. The method of claim 11, wherein
the molecular analyte comprise molecules with functional groups that interact with the monnomers pendant groups to form releasable intermolecular association complexes within the sensor film;
the peptide include any peptide with functional groups that interact with the monomer pendant groups to form releasable intermolecular associated complexes within the sensor film; and
the drug comprises any drug with functional groups that interact with the monomer pendant groups to form releasable intermolecular association complexes within the sensor film.

13. The method of claim 12, wherein a concentration range of the template is from 10 µM to 50 µM and the film has a thickness between 2 nm and 12 nm.

14. A method comprising:
forming a conducting layer on a surface of a substrate,
depositing one type of templating particle or plurality of types of templating particles on the conducting layer of the substrate to influence a morphology of the sensor film, where the particles improve analyte binding efficiency,
anodic electropolymerization one electropolymerizable monomer or a plurality of electropolymerizable monomers onto the conducting layer in the presence of an analyte to form a sensor film including analyte releasable monomer complexes, wherein the analyte is selected from the group consisting of a molecular analyte, a drug, and a peptide, wherein the substrate from forming and depositing step is situated in an electrochemical Surface Plasmon Resonance (SPR) apparatus or an electrochemical Quartz Crystal Microbalance (QCM) apparatus,
removing the analyte from the releasable complexes in the sensor film via an electrochemically mediated wash to form a sensor film including complementary template-shaped cavities,
injecting a template onto the sensor film, and
measuring changes in properties of the sensor film using (a) SPR spectroscopy or (b) QCM sensing in response to the injected template, wherein the response is substantially linear,
wherein each of the monomers includes a terthiophene (3T) electropolymerizable group or a carbazole (CBz) electropolymerizable group and a $CH_2COOH$ pendant group, a $CH_2CH_2OH$ pendant group, a $CH_2OH$ pendant group, or a $CH_2NH_2$ pendant group and are selected from the group consisting of 2-(2,5-di(thiophen-2-yl)thiophen-3-yl)acetic acid (G0-3TCH$_2$COOH), 2-(2,5-di(thiophen-2-yl)thiophen-3-yl)ethanol (G0-3T CH$_2$CH$_2$OH), 3,5-bis(2-(2,5-di(thiophen-2-yl)thiophen-3-yl)ethoxy)phenyl)methanol (G1-3T CH$_2$OH), 3,5-bis(2-(2,5-di(thiophen-2-yl)thiophen-3-yl)ethoxy)phenyl)methamine (G1-3T CH$_2$NH$_2$), 3,5-bis(4-(9H-carbazol-9-yl)butoxy)methanol (G1-CBzCH$_2$OH), 3,5-bis(4-(9H-carbazol-9-yl)butoxy)methamine (G1-CBzCH$_2$NH$_2$), and mixtures thereof.

15. The method of claim 14, wherein:

the molecular analyte comprise molecules with functional groups that interact with the monnomers pendant groups to form releasable intermolecular association complexes within the sensor film;

the peptide include any peptide with functional groups that interact with the monomer pendant groups to form releasable intermolecular associated complexes within the sensor film; and the drug comprises any drug with functional groups that interact with the monomer pendant groups to form releasable intermolecular association complexes within the sensor film.

16. The method of claim 14, wherein a concentration range of the template is from 10 μM to 50 μM and the film has a thickness between 2 nm and 12 nm.

* * * * *